US011836807B2

(12) United States Patent
Conboy

(10) Patent No.: US 11,836,807 B2
(45) Date of Patent: Dec. 5, 2023

(54) SYSTEM, NETWORK AND METHODS FOR ESTIMATING AND RECORDING QUANTITIES OF CARBON SECURELY STORED IN CLASS-A FIRE-PROTECTED WOOD-FRAMED AND MASS-TIMBER BUILDINGS ON CONSTRUCTION JOB-SITES, AND CLASS-A FIRE-PROTECTED WOOD-FRAMED AND MASS TIMBER COMPONENTS IN FACTORY ENVIRONMENTS

(71) Applicant: Mighty Fire Breaker LLC, Lima, OH (US)

(72) Inventor: Stephen Conboy, Carlsbad, CA (US)

(73) Assignee: MIGHTY FIRE BREAKER LLC, Lima, OH (US)

( * ) Notice: Subject to any disclaimer, the term of this patent is extended or adjusted under 35 U.S.C. 154(b) by 1294 days.

(21) Appl. No.: 16/029,861

(22) Filed: Jul. 9, 2018

(65) Prior Publication Data

US 2019/0172149 A1 Jun. 6, 2019

Related U.S. Application Data

(63) Continuation-in-part of application No. 15/952,183, filed on Apr. 12, 2018, now abandoned, which is a (Continued)

(51) Int. Cl.

*B27K 3/00* (2006.01)
*G06Q 40/10* (2023.01)

(Continued)

(52) U.S. Cl.

CPC ............... *G06Q 40/10* (2013.01); *B27K 3/02* (2013.01); *C09K 21/00* (2013.01); *B05D 7/06* (2013.01); *B27K 2240/30* (2013.01); *G06F 16/27* (2019.01)

(58) Field of Classification Search

None

See application file for complete search history.

(56) References Cited

U.S. PATENT DOCUMENTS

| | | | |
|---|---|---|---|
| 25,358 | A | 9/1859 | Wilder |
| 1,185,154 | A | 5/1916 | Wilds |

(Continued)

FOREIGN PATENT DOCUMENTS

| | | |
|---|---|---|
| AU | 5986501 | 11/2001 |
| AU | 2001259865 | 2/2007 |

(Continued)

OTHER PUBLICATIONS

US 8,460,513 B2, 06/2013, Sealey (withdrawn)

(Continued)

*Primary Examiner* — David P Turocy

(74) *Attorney, Agent, or Firm* — THOMAS J. PERKOWSKI, ESQ. PC

(57) ABSTRACT

A method, system and network for prefabricating and constructing Class-A fire-protected wood-framed and mass timber buildings, while builders and owners are provided with knowledge of the quantity of carbon mass securely stored in Class-A fire-protected wood, represented by fire-protected carbon units (FPCUs), certified by the system and network. The network includes a system and mobile devices for estimating, recording and reporting the quantities of carbon mass securely stored in Class-A fire-protected wood-framed and mass-timber buildings on construction job-sites, and Class-A fire-protected wood-framed and mass timber components in factory environments, including engineered wood products (EWPs), mass timber assemblies and buildings constructed therefrom, whose quantized fire-protected carbon units (FPCUs) are also registered on the network for use in supporting various credits of value.

16 Claims, 198 Drawing Sheets

Related U.S. Application Data continuation-in-part of application No. 15/921,617, filed on Mar. 14, 2018, now Pat. No. 10,290,004, which is a continuation-in-part of application No. 15/866,456, filed on Jan. 9, 2018, now Pat. No. 10,311,444, and a continuation-in-part of application No. 15/866,454, filed on Jan. 9, 2018, now Pat. No. 10,332,222, which is a continuation-in-part of application No. 15/829,914, filed on Dec. 2, 2017, now Pat. No. 10,260,232.

(51) Int. Cl.

| | |
|---|---|
| ***C09K 21/00*** | (2006.01) |
| ***B27K 3/02*** | (2006.01) |
| *B05D 7/06* | (2006.01) |
| *G06F 16/27* | (2019.01) |

(56) References Cited

U.S. PATENT DOCUMENTS

| | | | |
|---|---|---|---|
| 3,304,675 | A | 2/1967 | Graham-Wood |
| 3,305,431 | A | 2/1967 | Peterson |
| 3,328,231 | A | 6/1967 | Sergovic |
| 3,383,274 | A | 5/1968 | Craig |
| 3,427,216 | A | 2/1969 | Quinn |
| 3,457,702 | A | 7/1969 | Brown |
| 3,468,092 | A | 9/1969 | Chalmers |
| 3,470,062 | A | 9/1969 | Ollinger |
| 3,501,419 | A | 3/1970 | Bridgeford |
| 3,506,479 | A | 4/1970 | Breens |
| 3,508,872 | A | 4/1970 | Stuetz |
| 3,509,083 | A | 4/1970 | Winebrenner |
| 3,511,748 | A | 5/1970 | Heeb |
| 3,539,423 | A | 11/1970 | Simison |
| 3,607,811 | A | 9/1971 | Hovd |
| 3,639,326 | A | 2/1972 | Kray |
| 3,650,820 | A | 3/1972 | DiPietro |
| 3,663,267 | A | 5/1972 | Moran |
| 3,703,394 | A | 11/1972 | Hemming |
| 3,795,637 | A | 3/1974 | Kandler |
| 3,899,855 | A | 8/1975 | Gadsby |
| 3,934,066 | A | 1/1976 | Murch |
| 3,935,343 | A | 1/1976 | Nuttall |
| 3,944,688 | A | 3/1976 | Inman |
| 3,994,110 | A | 11/1976 | Ropella |
| 4,013,599 | A | 3/1977 | Strauss |
| 4,065,413 | A | 12/1977 | MacInnis |
| 4,104,073 | A | 8/1978 | Koide |
| 4,176,115 | A | 11/1979 | Hartman |
| 4,197,913 | A | 4/1980 | Korenowski |
| 4,198,328 | A | 4/1980 | Bertelli |
| 4,209,561 | A | 6/1980 | Sawko |
| 4,228,202 | A | 10/1980 | Tjannberg |
| 4,237,182 | A | 12/1980 | Fulmer |
| 4,248,976 | A | 2/1981 | Clubley |
| 4,251,579 | A | 2/1981 | Lee |
| 4,254,177 | A | 3/1981 | Fulmer |
| 4,265,963 | A | 5/1981 | Matalon |
| 4,266,384 | A | 5/1981 | Orals |
| 4,364,987 | A | 12/1982 | Goodwin |
| 4,382,884 | A | 5/1983 | Rohringer |
| 4,392,994 | A | 7/1983 | Wagener |
| 4,419,256 | A | 12/1983 | Loomis |
| 4,514,327 | A | 4/1985 | Rock |
| 4,530,877 | A | 7/1985 | Hadley |
| 4,560,485 | A | 12/1985 | Szekely |
| 4,563,287 | A | 1/1986 | Hisamoto |
| 4,572,862 | A | 2/1986 | Ellis |
| 4,578,913 | A | 4/1986 | Eich |
| 4,659,381 | A | 4/1987 | Walters |
| 4,661,398 | A | 4/1987 | Ellis |
| 4,663,226 | A | 5/1987 | Vajs |
| 4,666,960 | A | 5/1987 | Spain |
| 4,690,859 | A | 9/1987 | Porter |
| 4,714,652 | A | 12/1987 | Poletto |
| 4,720,414 | A | 1/1988 | Burga |
| 4,724,250 | A | 2/1988 | Schubert |
| 4,737,406 | A | 4/1988 | Bumpus |
| 4,740,527 | A | 4/1988 | Von Bonin |
| 4,743,625 | A | 5/1988 | Vajs |
| 4,756,839 | A | 7/1988 | Curzon |
| 4,770,794 | A | 9/1988 | Cundasawmy |
| 4,810,741 | A | 3/1989 | Kim |
| 4,824,483 | A | 4/1989 | Bumpus |
| 4,824,484 | A | 4/1989 | Metzner |
| 4,871,477 | A | 10/1989 | Dimanshteyn |
| 4,879,320 | A | 11/1989 | Hastings |
| 4,888,136 | A | 12/1989 | Chellapa |
| 4,895,878 | A | 1/1990 | Jourquin |
| 4,965,296 | A | 10/1990 | Hastings |
| 5,021,484 | A | 6/1991 | Schreiber |
| 5,023,019 | A | 6/1991 | Bumpus |
| 5,039,454 | A | 8/1991 | Policastro |
| 5,053,147 | A | 10/1991 | Kaylor |
| 5,055,208 | A | 10/1991 | Stewart |
| 5,130,184 | A | 7/1992 | Ellis |
| 5,156,775 | A | 10/1992 | Blount |
| 5,162,394 | A | 11/1992 | Trocino |
| 5,182,049 | A | 1/1993 | Von Bonin |
| 5,185,214 | A | 2/1993 | Levan |
| 5,214,894 | A | 6/1993 | Glesser-Lott |
| 5,250,200 | A | 10/1993 | Sallet |
| 5,283,998 | A | 2/1994 | Jong |
| 5,284,700 | A | 2/1994 | Strauss |
| 5,356,568 | A | 10/1994 | Levine |
| 5,391,246 | A | 2/1995 | Stephens |
| 5,393,437 | A | 2/1995 | Bower |
| 5,405,661 | A | 4/1995 | Kim |
| 5,491,022 | A | 2/1996 | Smith |
| 5,534,301 | A | 7/1996 | Shutt |
| 5,605,767 | A | 2/1997 | Fuller |
| 5,609,915 | A | 3/1997 | Fuller |
| 5,631,047 | A | 5/1997 | Friloux |
| 5,709,821 | A | 1/1998 | Von Bonin |
| 5,729,936 | A | 3/1998 | Maxwell |
| 5,738,924 | A | 4/1998 | Sing |
| 5,833,874 | A | 11/1998 | Stewart |
| 5,834,535 | A | 11/1998 | Abu-Isa |
| 5,840,413 | A | 11/1998 | Kajander |
| 5,968,669 | A | 10/1999 | Liu |
| 6,000,189 | A | 12/1999 | Breuer |
| 6,042,639 | A | 3/2000 | Valso |
| 6,073,410 | A | 6/2000 | Schimpf |
| 6,146,557 | A | 11/2000 | Inata |
| 6,150,449 | A | 11/2000 | Valkanas |
| 6,153,682 | A | 11/2000 | Bannat |
| 6,245,842 | B1 | 6/2001 | Buxton |
| 6,271,156 | B1 | 8/2001 | Gleason |
| 6,415,571 | B2 | 7/2002 | Risser |
| 6,423,129 | B1 | 7/2002 | Fitzgibbons, Jr. |
| 6,423,251 | B1 | 7/2002 | Blount |
| 6,442,912 | B1 | 9/2002 | Phillips |
| 6,444,718 | B1 | 9/2002 | Blount |
| 6,464,903 | B1 | 10/2002 | Blount |
| 6,491,254 | B1 | 12/2002 | Walkinshaw |
| 6,517,748 | B2 | 2/2003 | Richards |
| 6,608,123 | B2 | 8/2003 | Galli |
| 6,613,391 | B1 | 9/2003 | Gang |
| 6,629,392 | B1 | 10/2003 | Harrel |
| 6,706,774 | B2 | 3/2004 | Muenzenberger |
| 6,713,411 | B2 | 3/2004 | Cox |
| 6,772,562 | B1 | 8/2004 | Dadamo |
| 6,800,352 | B1 | 10/2004 | Hejna |
| 6,869,669 | B2 | 3/2005 | Jensen |
| 6,881,247 | B2 | 4/2005 | Batdorf |
| 6,881,367 | B1 | 4/2005 | Baker |
| 6,897,173 | B2 | 5/2005 | Bernard |
| 6,930,138 | B2 | 8/2005 | Schell |
| 6,982,049 | B1 | 1/2006 | Mabey |
| 7,210,537 | B1 | 5/2007 | McNeil |
| 7,261,165 | B1 | 8/2007 | Black |
| 7,273,634 | B2 | 9/2007 | Fitzgibbons, Jr. |
| 7,323,248 | B2 | 1/2008 | Ramsey |

(56) References Cited

U.S. PATENT DOCUMENTS 7,331,399 B2 2/2008 Multer
7,337,156 B2 2/2008 Wippich
7,341,113 B2 3/2008 Fallis
7,478,680 B2 1/2009 Sridharan
7,479,513 B2 1/2009 Reinheimer
7,482,395 B2 1/2009 Mabey
7,504,449 B2 3/2009 Mazor
7,560,041 B2 7/2009 Yoon
7,588,087 B2 9/2009 Cafferata
7,614,456 B2 11/2009 Twum
7,673,696 B1 3/2010 Gunn
7,686,093 B2 3/2010 Reilly
7,744,687 B2 6/2010 Pablo
7,748,662 B2 7/2010 Hale
7,754,808 B2 7/2010 Goossens
7,766,090 B2 8/2010 Mohr
7,767,010 B2 8/2010 Curzon
7,785,712 B2 8/2010 Miller
7,789,165 B1 9/2010 Yen
7,820,736 B2 10/2010 Reinheimer
7,824,583 B2 11/2010 Gang
7,828,069 B2 11/2010 Lee
7,832,492 B1 11/2010 Eldridge
7,837,009 B2 11/2010 Gross
7,849,542 B2 12/2010 DeFranks
7,863,355 B2 1/2011 Futterer
7,886,836 B2 2/2011 Haaland
7,886,837 B1 2/2011 Helfgott
7,897,070 B2 3/2011 Knocke
7,897,673 B2 3/2011 Flat
7,934,564 B1 5/2011 Stell
8,006,447 B2 8/2011 Beele
8,080,186 B1 12/2011 Pennartz
8,088,310 B2 1/2012 Orr
8,206,620 B1 6/2012 Bolton
8,217,093 B2 7/2012 Reinheimer
8,226,017 B2 7/2012 Cohen
8,263,231 B2 9/2012 Mesa
8,273,813 B2 9/2012 Beck
8,276,679 B2 10/2012 Bui
8,281,550 B1 10/2012 Bolton
8,286,405 B1 10/2012 Bolton
8,291,990 B1 10/2012 Mohr
8,344,055 B1 1/2013 Mabey
8,366,955 B2 2/2013 Thomas
8,403,070 B1 3/2013 Lowe
8,409,479 B2 4/2013 Alexander
8,453,752 B2 6/2013 Katsuraku
8,458,971 B2 6/2013 Winterowd
8,465,833 B2 6/2013 Lee
8,534,370 B1 9/2013 Al Azemi
8,586,657 B2 11/2013 Lopez
8,603,231 B2 12/2013 Wagh
8,647,524 B2 2/2014 Rueda-Nunez
8,662,192 B2 3/2014 Dunster
8,663,427 B2 3/2014 Sealey
8,663,774 B2 3/2014 Fernando
8,663,788 B2 3/2014 Oh
8,668,988 B2 3/2014 Schoots
8,685,206 B2 4/2014 Sealey
8,746,355 B2 6/2014 Demmitt
8,746,357 B2 6/2014 Butz
8,789,769 B2 7/2014 Fenton
8,808,850 B2 8/2014 Dion
8,820,421 B2 9/2014 Rahgozar
8,871,053 B2 10/2014 Sealey
8,871,058 B2 10/2014 Sealey
8,893,814 B2 11/2014 Bui
8,944,174 B2 2/2015 Thomas
8,973,669 B2 3/2015 Connery
8,980,145 B2 3/2015 Baroux
9,005,396 B2 4/2015 Baroux
9,005,642 B2 4/2015 Mabey
9,027,303 B2 5/2015 Lichtinger
9,089,730 B2 7/2015 Shalev
9,120,570 B2 9/2015 Hoisington
9,174,074 B2 11/2015 Medina
9,187,674 B2 11/2015 Ulcar
9,199,108 B2 12/2015 Guo
9,249,021 B2 2/2016 Mundheim
9,265,978 B2 2/2016 Klaffmo
9,328,317 B2 5/2016 Peng
9,382,153 B2 7/2016 Fisher
9,409,045 B2 8/2016 Berezovsky
9,498,787 B2 11/2016 Mayhall
9,597,538 B2 3/2017 Langselius
9,616,590 B2 4/2017 Birkeland
9,663,943 B2 5/2017 Dimakis
9,776,029 B2 10/2017 Izumida
9,782,944 B2 10/2017 Martin
9,851,718 B2 12/2017 Booher
9,920,250 B1 3/2018 Vuozzo
9,931,648 B2 4/2018 Fenton
9,956,446 B2 5/2018 Connery
2001/0025712 A1 10/2001 Pagan
2001/0029706 A1 10/2001 Risser
2002/0005288 A1 1/2002 Haase
2002/0011593 A1 1/2002 Richards
2002/0045688 A1 4/2002 Galli
2002/0079379 A1 6/2002 Cheung
2002/0096668 A1 7/2002 Vandersall
2002/0110696 A1 8/2002 Slimak
2002/0125016 A1 9/2002 Cofield
2002/0139056 A1 10/2002 Finnell
2002/0168476 A1 11/2002 Pasek
2003/0029622 A1 2/2003 Clauss
2003/0047723 A1 3/2003 Santoro
2003/0051886 A1 3/2003 Adiga
2003/0066990 A1 4/2003 Vandersall
2003/0146843 A1 8/2003 Dittmer
2003/0155133 A1 8/2003 Matsukawa
2003/0159836 A1 8/2003 Kashiki
2003/0160111 A1 8/2003 Multer
2003/0168225 A1 9/2003 Denne
2003/0170317 A1 9/2003 Curzon
2004/0003569 A1 1/2004 Frederickson
2004/0051086 A1 3/2004 Pasek
2004/0099178 A1 5/2004 Jones
2004/0109853 A1 6/2004 McDaniel
2004/0134378 A1 7/2004 Batdorf
2004/0163825 A1 8/2004 Dunster
2004/0173783 A1 9/2004 Curzon
2004/0175407 A1 9/2004 McDaniel
2004/0194657 A1 10/2004 Lally
2004/0209982 A1 10/2004 Horacek
2004/0231252 A1 11/2004 Benjamin
2005/0009965 A1 1/2005 Schell
2005/0009966 A1 1/2005 Rowen
2005/0011652 A1 1/2005 Hua
2005/0022466 A1 2/2005 Kish
2005/0058689 A1 3/2005 McDaniel
2005/0066619 A1 3/2005 McDonald
2005/0103507 A1 5/2005 Brown
2005/0139363 A1 6/2005 Thomas
2005/0229809 A1 10/2005 Lally
2005/0269109 A1 12/2005 Maguire
2005/0279972 A1 12/2005 Santoro
2006/0037277 A1 2/2006 Fitzgibbons, Jr.
2006/0048466 A1 3/2006 Darnell
2006/0131035 A1 6/2006 French
2006/0157668 A1 7/2006 Erdner
2006/0167131 A1 7/2006 Mabey
2006/0168906 A1 8/2006 Tonyan
2006/0196681 A1 9/2006 Adiga
2006/0208236 A1 9/2006 Gang
2006/0213672 A1 9/2006 Mohr
2007/0084554 A1 4/2007 Miller
2007/0090322 A1 4/2007 Yoon
2007/0119334 A1 5/2007 Atkinson
2007/0125880 A1 6/2007 Palle
2007/0176156 A1 8/2007 Mabey
2007/0193753 A1 8/2007 Adiga
2007/0194289 A1 8/2007 Anglin
2007/0197112 A1 8/2007 Mazor

(56) References Cited

U.S. PATENT DOCUMENTS

| | | | | |
|---|---|---|---|---|
| 2007/0227085 | A1* | 10/2007 | Mader | E04B 1/26 52/233 |
| 2007/0232731 | A1 | 10/2007 | Knocke | |
| 2007/0289709 | A1 | 12/2007 | Chong | |
| 2007/0289752 | A1 | 12/2007 | Beck | |
| 2008/0000649 | A1 | 1/2008 | Guirguis | |
| 2008/0050578 | A1 | 2/2008 | Sinclair, Sr. | |
| 2008/0054230 | A1 | 3/2008 | Mabey | |
| 2008/0115949 | A1 | 5/2008 | Li | |
| 2008/0179067 | A1 | 7/2008 | Ho | |
| 2008/0184642 | A1 | 8/2008 | Sebastian | |
| 2008/0265223 | A1* | 10/2008 | Sopheap | C09K 21/12 252/607 |
| 2009/0039660 | A1 | 2/2009 | Gonzalez | |
| 2009/0044484 | A1 | 2/2009 | Berger | |
| 2009/0188567 | A1 | 7/2009 | McHugh | |
| 2009/0215926 | A1 | 8/2009 | Kozlowski | |
| 2009/0249556 | A1 | 10/2009 | Dermeik | |
| 2009/0266025 | A1 | 10/2009 | Toas | |
| 2009/0280345 | A1 | 11/2009 | Maynard | |
| 2009/0301001 | A1 | 12/2009 | Kish | |
| 2009/0313931 | A1 | 12/2009 | Porter | |
| 2009/0314500 | A1 | 12/2009 | Fenton | |
| 2009/0326117 | A1 | 12/2009 | Benussi | |
| 2010/0032175 | A1 | 2/2010 | Boyd | |
| 2010/0062153 | A1 | 3/2010 | Curzon | |
| 2010/0069488 | A1 | 3/2010 | Mabey | |
| 2010/0175897 | A1 | 7/2010 | Crump | |
| 2010/0176353 | A1 | 7/2010 | Hanna | |
| 2010/0181084 | A1 | 7/2010 | Carmo | |
| 2010/0200819 | A1 | 8/2010 | Mans Fibla | |
| 2010/0267853 | A1 | 10/2010 | Edry | |
| 2010/0281784 | A1 | 11/2010 | Leo | |
| 2010/0314138 | A1 | 12/2010 | Weatherspoon | |
| 2010/0326677 | A1 | 12/2010 | Jepsen | |
| 2011/0000142 | A1 | 1/2011 | Bui | |
| 2011/0061336 | A1 | 3/2011 | Thomas | |
| 2011/0073331 | A1 | 3/2011 | Xu | |
| 2011/0089386 | A1 | 4/2011 | Berry | |
| 2011/0091713 | A1 | 4/2011 | Miller | |
| 2011/0146173 | A1 | 6/2011 | Visser | |
| 2011/0203813 | A1 | 8/2011 | Fenton | |
| 2011/0266486 | A1 | 11/2011 | Orr | |
| 2011/0284250 | A1 | 11/2011 | Thomas | |
| 2011/0315406 | A1 | 12/2011 | Connery | |
| 2012/0045584 | A1 | 2/2012 | Dettbarn | |
| 2012/0121809 | A1 | 5/2012 | Vuozzo | |
| 2012/0145418 | A1 | 6/2012 | Su | |
| 2012/0168185 | A1 | 7/2012 | Yount | |
| 2012/0199781 | A1 | 8/2012 | Rueda-Nunez | |
| 2012/0241535 | A1 | 9/2012 | Carriere | |
| 2012/0256143 | A1 | 10/2012 | Ulcar | |
| 2012/0258327 | A1 | 10/2012 | McArthur | |
| 2012/0295996 | A1 | 11/2012 | Wang | |
| 2012/0308631 | A1 | 12/2012 | Shirley | |
| 2013/0000239 | A1 | 1/2013 | Winterowd | |
| 2013/0101839 | A1 | 4/2013 | Dion | |
| 2013/0111839 | A1 | 5/2013 | Efros | |
| 2013/0239848 | A1 | 9/2013 | Fisher | |
| 2013/0288031 | A1 | 10/2013 | Labock | |
| 2014/0079942 | A1 | 3/2014 | Lally | |
| 2014/0123572 | A1 | 5/2014 | Segall | |
| 2014/0202716 | A1 | 7/2014 | Klaffmo | |
| 2014/0202717 | A1 | 7/2014 | Klaffmo | |
| 2014/0206767 | A1 | 7/2014 | Klaffmo | |
| 2014/0239123 | A1 | 8/2014 | Hoisington | |
| 2014/0245693 | A1 | 9/2014 | Efros | |
| 2014/0245696 | A1 | 9/2014 | Anderson | |
| 2014/0284067 | A1 | 9/2014 | Klaffmo | |
| 2014/0284511 | A1 | 9/2014 | Klaffmo | |
| 2014/0284512 | A1 | 9/2014 | Klaffmo | |
| 2014/0290970 | A1 | 10/2014 | Izumida | |
| 2014/0295164 | A1 | 10/2014 | Parker | |
| 2014/0299339 | A1 | 10/2014 | Klaffmo | |
| 2014/0322548 | A1 | 10/2014 | Boldizsar | |
| 2015/0020476 | A1 | 1/2015 | Winterowd | |
| 2015/0021053 | A1 | 1/2015 | Klaffmo | |
| 2015/0021055 | A1 | 1/2015 | Klaffmo | |
| 2015/0147478 | A1 | 5/2015 | Shutt | |
| 2015/0167291 | A1 | 6/2015 | Bundy | |
| 2015/0224352 | A1 | 8/2015 | Klaffmo | |
| 2015/0314564 | A1 | 11/2015 | Mancini | |
| 2015/0335926 | A1 | 11/2015 | Klaffmo | |
| 2015/0335928 | A1 | 11/2015 | Klaffmo | |
| 2015/0368560 | A1 | 12/2015 | Pascal | |
| 2016/0107014 | A1 | 4/2016 | Klaffmo | |
| 2016/0137853 | A1 | 5/2016 | Lopez | |
| 2016/0243789 | A1 | 8/2016 | Baroux | |
| 2017/0029632 | A1 | 2/2017 | Couturier | |
| 2017/0056698 | A1 | 3/2017 | Pai | |
| 2017/0121965 | A1 | 5/2017 | Dettbarn | |
| 2017/0138049 | A1 | 5/2017 | King | |
| 2017/0182341 | A1 | 6/2017 | Libal | |
| 2017/0210098 | A1 | 7/2017 | Moore | |
| 2017/0226424 | A1* | 8/2017 | Moon | B27K 3/08 |

FOREIGN PATENT DOCUMENTS

| | | |
|---|---|---|
| AU | 2005220194 | 4/2007 |
| AU | 2005220196 | 4/2007 |
| AU | 2002240521 | 12/2007 |
| AU | 2011244837 | 5/2012 |
| CA | 2593435 | 8/2006 |
| CA | 2811358 | 1/2013 |
| CA | 2846076 | 9/2014 |
| CA | 2862380 | 4/2015 |
| CA | 2868719 | 6/2015 |
| CN | 1397613 | 2/2003 |
| CN | 101293752 | 10/2008 |
| CN | 101434760 | 5/2009 |
| CN | 202045944 | 11/2011 |
| CN | 102337770 | 2/2012 |
| CN | 104540556 | 4/2015 |
| EP | 2898925 | 7/2015 |
| EP | 2902077 | 8/2015 |
| GB | 832691 | 4/1960 |
| GB | 2301122 | 11/1996 |
| WO | 8704145 | 7/1987 |
| WO | 9010668 | 9/1990 |
| WO | 9100327 | 1/1991 |
| WO | 0022255 | 4/2000 |
| WO | 0145932 | 6/2001 |
| WO | 0166669 | 9/2001 |
| WO | 0243812 | 6/2002 |
| WO | 0244305 | 6/2002 |
| WO | 2005014115 | 2/2005 |
| WO | 2006006829 | 1/2006 |
| WO | 2006010667 | 2/2006 |
| WO | 2006013180 | 2/2006 |
| WO | 2006032130 | 3/2006 |
| WO | 2006056379 | 6/2006 |
| WO | 2006072672 | 7/2006 |
| WO | 2006081156 | 8/2006 |
| WO | 2006126181 | 11/2006 |
| WO | 2007030982 | 3/2007 |
| WO | 2007048149 | 5/2007 |
| WO | 2007140676 | 12/2007 |
| WO | 2008031559 | 3/2008 |
| WO | 2008150157 | 12/2008 |
| WO | 2009012546 | 1/2009 |
| WO | 2009020251 | 2/2009 |
| WO | 2009057104 | 5/2009 |
| WO | 2010041228 | 4/2010 |
| WO | 2010046696 | 4/2010 |
| WO | 2010061059 | 6/2010 |
| WO | 2010082073 | 7/2010 |
| WO | 2010089604 | 8/2010 |
| WO | 2010104286 | 9/2010 |
| WO | 2010139124 | 12/2010 |
| WO | 2011016773 | 2/2011 |
| WO | 2011042609 | 4/2011 |
| WO | 2011054345 | 5/2011 |
| WO | 2011078728 | 6/2011 |
| WO | 2011116450 | 9/2011 |

(56) References Cited

FOREIGN PATENT DOCUMENTS

| | | |
|---|---|---|
| WO | 2012031762 | 3/2012 |
| WO | 2012060491 | 5/2012 |
| WO | 2012071577 | 5/2012 |
| WO | 2012076905 | 6/2012 |
| WO | 2012164478 | 12/2012 |
| WO | 2013003097 | 1/2013 |
| WO | 2013062295 | 5/2013 |
| WO | 2013068260 | 5/2013 |
| WO | 2013098859 | 7/2013 |
| WO | 2013179218 | 12/2013 |
| WO | 2014001417 | 1/2014 |
| WO | 2014115036 | 7/2014 |
| WO | 2014115038 | 7/2014 |
| WO | 2014152528 | 9/2014 |
| WO | 2014179904 | 11/2014 |
| WO | 2015020388 | 2/2015 |
| WO | 2015051917 | 4/2015 |
| WO | 2015076842 | 5/2015 |
| WO | 2015126854 | 8/2015 |
| WO | 2015153843 | 10/2015 |
| WO | 2015168456 | 11/2015 |
| WO | 2015172619 | 11/2015 |
| WO | 2016075480 | 5/2016 |
| WO | 2016088026 | 6/2016 |
| WO | 2016186450 | 11/2016 |
| WO | 2017014782 | 1/2017 |
| WO | 2017015585 | 1/2017 |
| WO | 2017016143 | 2/2017 |
| WO | 2017094918 | 6/2017 |

OTHER PUBLICATIONS

Tzoulis et al. Emerging Traceability Technologies as a Tool for Quality Wood Trade. Procedia Technology 8 ( 2013 ) 606-611.*
Lacovidou et al. The use of smart technologies in enabling construction components reuse: A viable method or a problem creating solution? Journal of Environmental Management 216 (2018) 214-223. Online May 5, 2017.*
Bergman et al. The Carbon Impacts of Wood Products. Forest Products Journal vol. 64, No. 7/8. 2014.*
Taylor et al. EPD—Environmental Product Declarations for Wood Products—An Application of Life Cycle Information About Forest Products. Forest Products Journal, vol. 61, No. 3, pp. 192-201; 2011.*
U.S. Department of Energy, "Method for Calculating Carbon Sequestration by Trees in Urban and Suburban Settings", Apr. 1998, (pp. 1-16).
U.S. Department of Agriculture, "Carbon Storage and Accumulation in United States Forest Ecosystems", Aug. 1992, (pp. 1-55).
NCASI, Brad Upton, Reid Miner, Kirsten Vice, "The Greenhouse Gas and Carbon Profile of the Canadian Forest Products Industry", Oct. 2007, (pp. 1-41).
FPInnovations, "A Synthesis of Research on Wood Products & Greenhouse Gas Impacts 2nd Edition", Oct. 2010, (pp. 123).
Forest and Wood Products Australia, Andrea Jane Leys PhD, "How is Carbon Stored in Trees and Wood Products?", Jan. 2012, (pp. 1-10).
Cornell Law School, "26 U.S. Code § 45Q—Credit for Carbon Dioxide Sequestration", Dec. 2014, (pp. 1-3).
Rethink Wood, "Evaluating the Carbon Footprint of Wood Buildings: Reducing Greenhouse Gases with High-Perfromance Structures", Apr. 2015, (pp. 1-8).
Maureen Puettmann, Woodlife Environmental Consultants, LLC, Dominik Kaestner, Adam Taylor, University of Tennessee, "Corrim Report—Module E Life Cycle assessment of Oriented Strandboard (OSB) Production", Oct. 2016, (pp. 1-71).
Global CSS Institute, "The Global Status of CSS: 2017", Oct. 2017, (pp. 1-43).
Greentech Media, "Can Updated Tax Credits Bring Carbon Capture Into the Mainstream?", Feb. 2018, (pp. 1-8).
Woodworks, "Carbon Calculator: Reference & Notes", Jan. 2016, (pp. 1-8).
Woodworks, "Carbon Estimator", Jul. 2018, (pp. 1).
Woodworks, "Carbon Calculator and Estimator App", Jul. 2018 , (pp. 1-12).
National Enhanced Oil Recovery Initiative (NEORI), "Recommended Modifications to the 45Q Tax Credit for Carbon Dioxide Sequestration", Feb. 2012, (12 Pages).
Ledinek, "X-Press", Nov. 2017, (pp. 1-5).
Underwriters Laboratories Inc., " BPVV R7002 Lumber, Treated", Jan. 2011, (pp. 1-5).
Hoover Inc., "Leed and FSC Chain of Custody Information", Feb. 2016, (pp. 1).
Chemical Specialties Inc., "D-Blaze Fire Retardant Treated Wood, The New Generation Building Material", Mar. 2004, (pp. 1-2).
Treated Wood, "TimberSaver", Nov. 2017, (pp. 1-6).
Reed Construction Data, "Osmose Inc., FirePro Fire Retardant", Jan. 2004, (pp. 1-3).
ICC Evaluation Service Inc., "FirePro", Nov. 2005, (pp. 1-4).
Marketwired, "WoodSmart Solutions, Inc. Tests Hartindo AF21 in BluWood Solution", Nov. 2007, (pp. 1-2).
Marketwired, "Megola Announces AF21 Test Results", Aug. 2007, (pp. 1-2).
Marketwired, Megola Updates on Hartindo AF21, a Total Fire Inhibitor, Aug. 2010, (pp. 1-3).
Treated Wood, "Fire Retardant Treated Wood for Commercial and Residential Structures", Jan. 2012, (pp. 1-73).
Fire Retardant Coatings of Texas, "FX Lumber Guard", Nov. 2015, (pp. 1).
QAI Laboratories, "Test Report #T1003-1: FX Lumber Guard", Apr. 2015, (pp. 1-10).
Treated Wood, "D-Blaze: Fire Retardant Treated Wood", Jan. 2015, (pp. 1-13).
Arch Wood Protection Inc., "Dricon: Application Guide", Jan. 2016, (pp. 1-28).
ICC Evaluation Service Inc., "ICC-ES Listing Report: FX Lumber Guard/FX Lumber Guard XT Fire-Retardant Coatings", Oct. 2016, (pp. 1-3).
ICC Evaluation Service Inc., "ICC-ES Report: Pyro-Guard Fire Retardant-Treated Wood", Dec. 2016, (pp. 1-8).
Intelligent Wood Systems, "Treated Timber—Customer Information", Nov. 2016, (pp. 1-8).
Intelligent Wood Systems, "IWS FR Fire Retardant Treated Wood Corrosion Information", Jan. 2016, (pp. 1).
Intelligent Wood Systems, "Treated Timber—Consumer Information", Nov. 2016, (pp. 1-15).
Nelson Pine, "How LVL is Made", Nov. 2017, (pp. 1).
Eco Building Products Inc, "Eco Red Shield Material Safety Data Sheet : Wood Dust", Jun. 2005, (pp. 1-2).
LSU Agcenter Wood Durability Laboratory, "Eco Red Shield: Technical Specifications—Strength Testing", Aug. 2011, (pp. 1-21).
Eco Building Products, "Technical Bulletin: Corrosive Effects From Eco Red Shield Coatings", Jan. 2011, (pp. 1).
Underwriters Laboratories Inc., "Greenguard Certification Test for Eco Building Products, Inc.: Eco Red Shield—01", Mar. 2015, (pp. 1-21).
DRJ, "Technical Evaluation Report: Eco Red Shield Fire Treated Wood Protection Coating", Apr. 2016, (pp. 1-8).
Eco Building Products, "Safety Data Sheet: Eco Red Shield", May 2016, (pp. 1-6).
CSE Inc, "AC479: Proposed AC for Wood Structural Panels with Factory-Applied Fire-Retardant Coating", Feb. 2017, (pp. 1-101).
ASTM International, "Standard Test Method for Hygroscopic Properties of Fire-Retardant Wood and Wood-Based Products", Jul. 2013, (pp. 1-3).
ASTM International, "Standard Test Method for Extended Duration Surface Burning Characteristics of Building Materials (30 min Tunnel Test)," Aug. 2011, (pp. 1-4).
Phos-Chek, "Protect Your Home From Wildfire", Nov. 2017, (pp. 1-4).
American Wood Council, "Design for Code Acceptance: Flame Spread Performance of Wood Products Used for Interior Finish", Apr. 2014, (pp. 1-5).

(56) References Cited

OTHER PUBLICATIONS

Department of the Navy, "Military Specification: Lumber and Plywood", Jun. 1984, (pp. 1-16).
Bank Insurance, Michael D. White, "How Benjamin Franklin Became the 'Father of Insurance", Dec. 1998, (pp. 1-3).
ASTM International, "Standard Test Methods for Fire Tests of Building Construction and Materials", Oct. 2000, (pp. 1-24).
ASTM International, "Standard Test Method for Evaluating the Flexural Properties of Fire-retardant Treated Softwood Plywood Exposed to Elevated Temperatures", May 2001, (pp. 1-7).
Treated Wood "D-Blaze Fire Retardant Treated Wood: The New Generation Building Material", Mar. 2004, (pp. 1-2).
Swiss Krono, "Swiss Krono OSB: Prefabricated Construction" Nov. 2017, (pp. 1-6).
NRC CNRC, "Fire Performance of Houses. Phase I. Study of Unprotected Floor Assemblies in Basement Fire Scenarios. Summary Report", Dec. 2008, (pp. 1-55).
Underwriters Laboratories, "Report on Structural Stability of Engineered Lumber in Fire Conditions", Sep. 2008, (pp. 1-178).
Marketwire, "Megola Updates on Hartindo AF21, a Total Fire Inhibitor", Aug. 4, 2010, (pp. 1-3).
D.G. Fraser, "Break the Flame Chain Reaction", Jun. 1962, (pp. 1-3).
National Fire Protection Association, "Standard for Fire Retardant-Treated Wood and Fire-Retardant Coatings for Building Materials", Jan. 2015, (pp. 1-16).
Underwriters Laboratories, "Project 90419—GREENGUARD and GREENGUARD Gold Annual Certification Test Results", Mar. 2015, (pp. 1-21).
Structural Building Components Association, "Fire Retardants and Truss Design", Jan. 2015, (pp. 1-48).
Western Wood Preservers Institute, "Fire Retardant Wood and the 2015 International Building Code", Jan. 2015, (pp. 1-2).
Structural Building Components Association, "Research Report: Lumber Use in Type III-A Buildings", Jul. 2016, (pp. 1-8).
ASTM International, "Standard Test Method for Evaluating the Effects of Fire-Retardant Treatments and Elevated Temperatures on Strength Properies of Fire-Retardant treated Lumber", Jul. 2010, (pp. 1-6).
ASTM International, "Standard Practice for Calculating Bending Strength Design Adjustment Factors for Fire-Retardant-Treated Plywood Roof Sheathing", Oct. 2015, (pp. 1-6).
ASTM International, "Standard Practice for Calculating Design Value Treatment Adjustment Factors for Fire-Retardant-Treated Lumber", Apr. 2016, (pp. 1-7).
State of California Environmental Protection Agency, "Chemicals Known to the State to Cause Cancer or Reproductive Toxicity", Jan. 2017, (pp. 1-22).
Marketwired, "Megola Obtains Class A Rating for Hartindo AF31", Nov. 2007, (pp. 1-2).
Marketwire, "Megola Inc. Signs 'Hartindo AF21' Licensing Agreement with Eco Blu Products, Inc.", Nov. 2009, (pp. 1-2).
Conception R.P. Inc., "The Cutting Edge of Finger Jointing", Feb. 2005, (pp. 1-16).
Marketwired, "Megola Sells Hartindo AF21, a Total Fire Inhibitor, to One of the World's Largest Textile and Chemical Manufactures", Aug. 2010, (pp. 1-3).
Marketwired, "Megola Continues Sales of Hartindo AF21 to EcoBlu Products, Inc.", Dec. 2010, (pp. 1-2).
Woodworking Network, "Megola to Buy Wood-Protecting Hartindo AF21 Fire Inhibitor", Aug. 2011, (pp. 1-2).
CMA Robotics, "GR 630", Nov. 2017, (pp. 2).
Hoover Inc., "Exterior Fire-X Treated Wood: Material Safety Data Sheet", Oct. 2005, (pp. 1-9).
CMA Robotics, " GR 650", Nov. 2017, (pp. 1-2).
CMA Robotics, "GR 6100-HW", Nov. 2017, (pp. 1-2).
CMA Robotics, "Gr 6100-HW-S", Nov. 2017, (pp. 1-2).
USDA Forest Service, "Mass Laminated Timber in the United States: Past, Present, and Future", Nov. 2017, (pp. 1-13).
Western Wood Products Association, "Flame-spread Ratings & Smoke-Developed Indices; Conformance with Model Building codes", Nov. 2017, (pp. 1-2).
Robert H. White, Erik V. Nordheim, "Charring Rate of Wood for ASTM E 119 Exposure", Feb. 1992, (pp. 1-2).
Forest Products Laboratory, Robert H. White, Mark A. Dietenberger, "Chapter 17: Fire Safety", Feb. 1999, (pp. 1-17).
National Research Council of Canada, Zhigang Liu, Andrew K. Kim, Don Carpenter, Fountain Fire Protection Inc., Ping-Li Yen, "Portable Water Mist Fire Extinguishers as an Alternative for Halon 1211", Apr. 2001, (pp. 1-5).
Hoover Wood Products, "Exterior Fire-X Material Safety Data Sheet", Oct. 2005, (pp. 1-5).
Hardwood Plywood & Veneer Association, "Report on Surface Burning Characteristics Determined by ASTM E 84 Twenty-Five Foot Tunnel Furnace Test Method", Jan. 2008, (pp. 1-7).
Chemical Online, "Mse Enviro-Tech Corp. Introduces Dectan", May 2007, (pp. 1).
Studiengemeinschaft Holzleimbau, "Building with Cross Laminated Timber", Jan. 2011, (pp. 1-36).
James Hardie Technology, "30-Year Limited Warranty", Oct. 2011, (pp. 1-8).
MGB Achitecture & DESIGN, "The Case for Tall Wood Buildings: How Mass Timber Offers a Safe, Economical, and Environmentally Friendly Alternative for Tall Building Structures", Feb. 2012, (pp. 1-240).
NY Times, "Building with Engineered Timber", Jun. 2012, (pp. 1-3).
Gerhard Schickhofer, Andreas Ringhofer, "The Seismic Behaviour of Buildings Erected in Solid Timber", Aug. 2012, (pp. 1-124).
Jerrold E. Winandy, Qingwen Wang, Robert E. White, "Fire-Retardant-Treated Strandboard: Properties and Fire Performance", May 2007, (pp. 1-10).
2012 CLT Handbook, Christian Dagenais, Robert H. White, Kuma Sumathipala, "Chapter 8—Fire", Nov. 2012, (pp. 1-55).
FPInnovations, "CLT Handbook: Cross-Laminated Timber", Jan. 2013, (pp. 1-572).
Siemens, "Transforming Timbers into Houses", Jan. 2013, (pp. 1-3).
Holzforschung Austria, "Construction with Cross-Laminated Timber in Multi-Storey Buildings: Focus on Building Physics", Apr. 2013, (pp. 1-160).
Fire Protection Research Foundation, Robert Gerard, David Barber, "Fire Safety Challenges of Tall Wood Buildings", Dec. 2013, (pp. 1-162).
Andrew Buchanan, Birgit Ostman, Andrea Frangi, "Fire Resistance of Timber Structures", Mar. 2014, (pp. 1-20).
American Wood Council, "2015 NDS Changes", Jul. 2015, (pp. 1-66).
USDA, "Hygrothermal Performance of Mass Timber Construction", Nov. 2015, (pp. 1-21).
Holzforshung Austria, "Short Report: Renewal of the abridged report on the fire resistance REI 60 according to EN 13501-2 of Stora Enso CLT as load-carying cross-laminated timber wall elements ≥80 mm unplanked and planked with plaster boards", Dec. 2012, (pp. 1-5).
Charlotte Pipe and Foundry Company, "Techinncal Bulletin: Understanding Flame Spread Index (FSI) and Smoke Developed Index (SDI) Ratings", Jan. 2016, (pp. 1-2).
Drjohnson Lumber Company, "Cross Laminated Timbers: Mass Timber Construction", Jan. 2016, (pp. 1).
Globe Advisors, "Study of Insurance Costs for Mid-Rise Wood Frame and Conrete Residential Buildings", Jan. 2016, (pp. 1-61).
Stora Enso, "CLT Engineer: The Stora Enso CLT Design Software User Manual," Jan. 2016, (pp. 1-118).
Stora Enso, "CLT—Cross Laminated Timber: Fire Protection", Jan. 2016, (pp. 1-51).
Wood Works, "The Case for Cross Laminated Timber", Jan. 2016, (pp. 1-212).
Lendlease, Jeff Morrow, "More with Less: An Overview of the 1st CLT Hotel in the U.S.", Apr. 2016, (pp. 1-45).
DCI Engineers, "Cross-Laminate Timber", May 2016, (pp. 1-5).
Calgary Herald, Andrea Cox, "Homebuilder Wants Buyers to be in the Pink", Oct. 2011, (pp. 1-6).

(56) References Cited

OTHER PUBLICATIONS

Andrew Crampton, "Cross Laminated Timber: The Future of Mid-Rise Construction," Jun. 2016, (pp. 1-5).
Callisonrtkl, "Seattle Mass Timber Tower, Feasibility Study: Design and Construction Analysis" Aug. 2016, (pp. 1-34).
Fire Engineering, "Charred Wood and Fire Resistance", Oct. 2016, (pp. 1-6).
Rubner Holzbau, "Timber Engineering in the 21st Century", Jan. 2017, (pp. 1-21).
Metroscape, "Building the Future: New Technology and the Changing Workforce", Jan. 2017, (pp. 1-32).
Stora Enso, "Stora Enso CLT Technical Brochure", Feb. 2017, (pp. 1-32).
Spiritos Properties, "Mass Timber—101 and Beyond", Apr. 2017, (pp. 1-17).
Inland Marine Underwriters Association, "CLT and Builder's Risk", May 2017, (pp. 1-26).
Asia Pacific Fire, "Approaching the Flame Fire Fighting", Jun. 2017, (pp. 1-2).
Rubner Holzbau, "Wood Culture 21: Construction Expertise for Architects, Designers and Building Owners", Jul. 2017, (pp. 1-23).
Treehugger, Lloyd Alter, "Katerra to Build Giant New CLT Factory in Spokane, Washington", Sep. 2017, (pp. 1-16).
SFPE, Peter Johnson, "Fire Safety Engineering Education—Part of a Certification Framework", Jan. 2012, (pp. 1-11).
Fire Engineering, Phillip Paff, "Mass Timber Construction in High-Rise Residential Structures: How Safe is it?", Jan. 2018, (pp. 1-9).
Fire Engineeering, Len Garis, Karin Mark, "Tall Wood Buildings: Maximizing Their Safety Potential", Jan. 2018, (pp. 1-12).
XLam, "Technical: XLam Panel Specifications", Jan. 2018, (pp. 11).
Archpaper, Antonio Pacheco, "Katerra's approach could make factory construction a model for the future", Apr. 2018, (pp. 1-4).
AIG, "AIG Global Property Construction Risk Engineering", Nov. 2017, (pp. 1-6).
LA Times, Sam Byker, "Fire Retardants That Protect the Home", Nov. 25, 2007, (pp. 1-4).
Firetect, "Safe-T-Guard Product Data Sheet", Apr. 2008, (pp. 1-6).
ICL Performance Products LP, "Material Safety Data Sheet", Jul. 2014, (pp. 1-6).
Treehugger, Lloyd Alter, "Wood Frame Construction is Safe, Really", Dec. 2014, (pp. 1-5).
LP Building Products, "Material Safety Data Sheet", May 2014, (pp. 1-4).
Cyril N. Hinshelwood, "Chemical Kinetics in the Past Few Decades", Nobel Lecture, Dec. 1956, (pp. 1-11).
Lon H. Ferguson, Christopher A. Janicak, "Fundamentals of Fire Protection for the Safety Professional", Jul. 2005, (pp. 1-341).
Roseburg Forest Products, "Wood I-Joists", Jan. 2016, (pp. 1-6).
Spraying Systems Co., "Industrial Hydraulic Spray Products", Jan. 2015, (pp. 1-220).
Conrad Forest Products, "Bluwood: The Color of Protection", http://www.conradfp.com/building-products-bluwood.php, Nov. 2017, (pp. 1-8).
The University of Chicago, Salen Churi, Harrison Hawkes, Noah Driggs, "Internet of Things: Risk Manager Checklist, U.S.", Dec. 2016, (pp. 1-23).
DRJ, "AAF21 Fire Treated Wood Protection Coating Applied to Lumber", Sep. 2017, (pp. 1-8).
Roseburg Forest Products, "Roseburg EWP Commerical Design and Installation Guide", Mar. 2017, http://www.roseburg.com., (pp. 1-48).
Fire Retardant Coatings of Texas, "FX Lumber Guard XT: Technical Data Submittal Sheet", Aug. 2018, (pp. 1).
Fire Retardant Coatings of Texas, M. Mueller, "Residential Home Builders", Oct. 2016, (pp. 1-5).
Fire Retardant Coatings of Texas, M. Mueller, "Architects", Oct. 2016, (pp. 1-5).
Fire Retardant Coatings of Texas, "FX Lumber Guard: Technical Data Submittal Sheet", Aug. 2018, (pp. 1).
Trusjoist, Weyerhauser, "Fire-Rated Assemblies and Sprinkler Systems", May 2017, (pp. 1-24).
NFPA, "Certified Fire Protection Specialist: Candidate Handbook", Apr. 2018, (pp. 1-34).
Hoover Inc., "Pyro-Guard, Exterior Fire-X", Dec. 2017, (pp. 1-12).
Coastal Forest Products, "Multi-Ply CP-LAM Beam Assembly", Nov. 2017, (pp. 1-5).
NFPA Journal, Jesse Roman, "Build. Burn. Repeat?", Feb. 2018, (pp. 1-9).
Kallesoe Machinery, "CLT Production Line", Nov. 2017, (pp. 1-5).
Hoover, "2hr Fire Resistant Load Bearing Wall", Nov. 2017, (pp. 1).
ECO Building Products, "ECO Disaster Break: Class A Fire Rated, UV Resistant, High Performance, Non-Toxic, Acrylic Coating", Feb. 2013, (pp. 1).
ECO Building Products, "Affiliate Program Screenshots", Apr. 2013, (pp. 1-3).
Mitsui Home America, "Mitsui Homes Inc. Website and Screenshots", Dec. 2012, (pp. 1-38).
Fire Retardant Coatings of Texas, "FlameStop Screenshots", Nov. 2017, (pp. 1-2).
Fire Retardant Coatings of Texas, "FX Flame Guard Screenshot", Nov. 2017, (pp. 1).
RDR Technologies, "BanFire Screenshot", Nov. 2017, (pp. 1).
Lousiana-Pacific, "LP Solutions Software", Mar. 2012, (pp. 1-8).
RDR Technologies, Fire Retardant Coatings of Texas, "FX Lumber Guard Screenshots", Nov. 2017, (pp. 1-2).
Fire Retardant Coatings of Texas, "Product Certifications & Featured Products Screenshots", Nov. 2017, (pp. 1-4).
Fire Retardant Coatings of Texas, "Product Certifications Screenshot", Nov. 2017, (pp. 1).
Fire Retardant Coatings of Texas, "Safety Data Sheet Screenshot", Nov. 2017, (pp. 1).
Fire Retardant Coatings of Texas, "Fx Lumber Guard Screenshot", (pp. 1).
Metsawood, "Kerto LVL Screenshot", Nov. 2017, (pp. 1).
Raute, "LVL Technology Screenshot", (pp. 1).
Newstar Chemicals, Hartindo Anti Fire Products, Nov. 2017, (pp. 1).
Natural Fire Solutions, "Website Screenshots", Nov. 2017, (pp. 1-4).
RFID Journal, Ask The Experts Forum, "How Is RFID Being Used in the Construction Industry ?", Jun. 27, 2013, (2 Pages).
Autodesk, Inc., "AUTODESK® BIM 360 DOCS: A Cloud-Based Document Management Service for Construction Project and Project Teams," 2017 (3 Pages).
Autodesk, Inc., "AUTODESK® BIM 360 DOCS: A Cloud-Based Document Management Service for Construction Project and Project Teams," 2016 (1 Pages).
Autodesk, Inc., "AUTODESK® BIM 360 DOCS: A Cloud-Based Document Management Service for Construction Project and Project Teams," 2017 (2 Pages).
Autodesk, Inc., Sander Lijbers, AEC Industry Manager, Presentation at CADAC BIM Congres 2015 on AUTODESK® BIM 360®, 2015 (33 Pages).
Procore Technologies, Inc, Brochure for Procore® Cloud-Based Construction Management Software, Nov. 2018, (11 Pages).
Woodworks, "Wood Brings the Savings Home", Jan. 2013, (pp. 1-8).
Procore Technologies, Inc, Brochure for Procore® Construction Operating System and Cloud-Based Construction Management System , 2018, (15 Pages).
Insurance Institute for Business & Home Safety (IBHS), Oct. 22, 2018, "Colorado Property & Insurance WildfirePreparedness Guide", 2018 (2 Pages).
Pendu Manufacturing, Inc., North Holland, PA, Slide Show of Youtube Video of a Pendu Automated Wood Board Dip Tank System in Operation, Feb. 8, 2012, (30 Pages).
Woodworks, "Case Study: UW West Campus Student Housing", Jan. 2013, (pp. 1-8).
Woodworks, "Options for Brick Veneer on Mid-Rise Wood-Frame Buildings", Oct. 2015, (pp. 1-8).
Rethink Wood, "Mid-Rise Wood Construction", Apr. 2015, (pp. 1-12).

(56) References Cited

OTHER PUBLICATIONS

Rethink Wood, "Designing for Fire Protection: Expanding the Possibilities of Wood Design", Aug. 2015, (pp. 1-8).
Woodworks, "Design Example: Five-Story Wood-Frame structure Over Podium Slab", Sep. 2016, (pp. 1-79).
Agacad, "Wood Framing", Jan. 2016 (pp. 1-4).
Weyerhauser, Renee Strand, "Mid-Rise, Wood-Framed, Type III Construction—How to Frame the Floor to Wall Intersection at Exterior Walls", Apr. 2016, (pp. 1-8).
Louisiana-Pacific, "FlameBlock: Assemblies and Applications", Aug. 2017, (pp. 1-8).
Globenewswire, "Shazamstocks.com Announces Profile Launch of MSE Enviro-Tech Corp.", Feb. 2008, (pp. 1-3).
Benzinga, "Megola Inc. Files Application to Underwriter Laboratories for Certification", May 2010, (pp. 1-3).
Coastal Forest Products, "CP-LAM 2.0E Design Properties & Floor Beams", Nov. 2017, (pp. 1-5).
Kallesoe Machinery A/S, "System Solutions for Laminated Wood Products", Nov. 2017, (pp. 1-3).
Intertek, "Report of Testing FX Lumber Guard Fire Retardant for I-Joist, Truss Joist (TJI), FLoor Joist, Ceiling Joist, amd OSB", Mar. 2013, (pp. 1-9).
Intertek, "Report of Testing 7'×7' Floor/Ceiling Assembly", Aug. 2013, (pp. 1-6).
Intertek, "Report of Testing FX Lumber Guard", Nov. 2014, (pp. 1-9).
Intertek, "Report of Testing FX Lumber guard Fire Retardant Coating Applied to I-Joists in a Floor Celing Assembly", Aug. 2014, (pp. 1-6).
Intertek, "Report of Testing FX Lumber Guard on SPF Lumber", Jun. 2012, (pp. 1-6).
Intertek, "Report of Testing FX Lumber Guard (Dimensional Lumber)", Apr. 2015, (pp. 1-10).
Intertek, "Report of Testing FX Lumber Guard", Aug. 2015, (pp. 1-6).
Fire Retardant Coatings of Texas, "FX Lumber Guard", Sep. 2016, (pp. 1).
Fire Retardant Coatings of Texas, "Safety Data Sheet (SDS)" Mar. 2016, (pp. 1-7).
Mamoru Kohno, "Outline of the Fire Resistance Verification Method in the Building Standard Law of Japan", May 2000, (pp. 1-7).
Department of Financial Services, "Certification of Insurance Fire Protection System Contractor, State of Florida," Aug. 2007, (pp. 1).
Intertek, "Building & Construction Information Bulletin: Introduction to Astm E84 & Frequently Asked Questions", Jun. 2017, (pp. 1-2).
Australian Building Codes Board, "NCC 2019, Fire Safety Verification Method", Jan. 2018, (pp. 1-95).
Hoover Inc., "Exterior-Fire X", Nov. 2017, (pp. 1).
Hoover Inc., "Pyro-Guard", Nov. 2017, (pp. 1).
Marleyeternit, "JB FireSafe Scaffold Boards", Jan. 2016, (pp. 1-2).
John Packer, NZ Institute of Chemistry, "Chemistry in Fire Fighting", Oct. 2017, (6 Pages).
Flamestop, "Flamestop II: Fire Retardant Spray for Wood", Jan. 2017, (pp. 1-3).
Flamestop, "Learn About Flamestop Inc.", Jan. 2017, (pp. 1-3).
Lousiana-Pacific, "FlameBlock: Assemblies and Applications", Aug. 2017, (pp. 1-8).
MagTech, "MagTech OSB", Nov. 2017, (pp. 1-2).
Hoover Inc., "Fasteners for Pyro-Guard: Interior Fire Retardant Treated Wood Products", Oct. 2013, (pp. 1).
Hoover Inc., "Code References: Fire-Retardant-Treated Wood", Mar. 2014, (pp. 1-2).
Hoover Inc., "Guidelines For Finishing and Use of Adhesives with Pyro-Guard Fire Retardant Treated Wood", Jan. 2014, (pp. 1).
Hoover Inc., "Specification for Pyro-Guard: Interior Fire Retardant Treated Wood", Apr. 2014, (pp. 1).
Hoover Inc., "Pyro-Guard Storage, Handling, and Installation Recommendations", Jan. 2014, (pp. 1).
3M, Building and Commerical Services Division, "Brochure for 3M FireDam™ Spray 200 Sealing Agent", 2009,(2 Pages).
Wildfire Defense Systems, Inc., Web Brochure on WDSPRo Mobile Application for Wildfire Hazard Property Assessment, 2017, (3 Pages).
Wildfire Defense Systems, Inc., Web Brochure on WDSFire Wildfire Reporting Dashboard Service for Wildfire Risk During an Active Wildfire, 2017, (2 Pages).

* cited by examiner

THE GREENHOUSE EFFECT

THE GREENHOUSE EFFECT

CARBON-DIOXIDE IS CAPTURED AND SEQUESTRATED DURING THE NATURALLY OCCURRING PHOTO-SYNTHESIS PROCESS WITHIN GROWING TREES

The chemical formula for photosynthesis $$6\ CO_2 + 12\ H_2O + \text{photons} \longrightarrow C_6H_{12}O_6 + 6\ O_2 + 6\ H_2O$$

(carobon dioxide + water + light energy ⟶ gluclose + oxygen + water).

THE ATOMIC STRUCTURE OF A CARBON ATOM

Carbon atom

CLOUD-BASED PROCESS FOR ESTIMATING (I.E. QUANTIZING) AND RECORDING QUANTITIES OF CARBON SECURELY STORED IN CLASS-A FIRE-PROTECTED WOOD-FRAMED AND MASS-TIMBER BUILDING COMPONENTS, ASSEMBLIES AND BUILDINGS

SYSTEM FOR ESTIMATING (I.E. QUANTIZING) AND RECORDING THE QUANTITY OF CARBON NATURALLY CAPTURED AND SEQUESTERED IN WOOD PRODUCTS USED IN WOOD-FRAMED AND MASS TIMBER BUILDING COMPONENTS, ASSEMBLIES AND BUILDINGS AFTER BEING TREATED WITH CLEAN FIRE-PROTECTION CHEMICALS

AUTOMATED PROCESS SUPPORTING THE REAL-TIME ESTIMATING AND RECORDING (I.E. QUANTIZING) THE QUANTITY OF FIRE-PROTECTED CARBON STORED IN WOOD PRODUCTS USED IN WOOD-FRAMED AND MASS TIMBER BUILDING COMPONENTS, ASSEMBLIES AND BUILDINGS AFTER BEING TREATED AND FIRE-PROTECTED WITH CLEAN FIRE-PROTECTION CHEMICALS

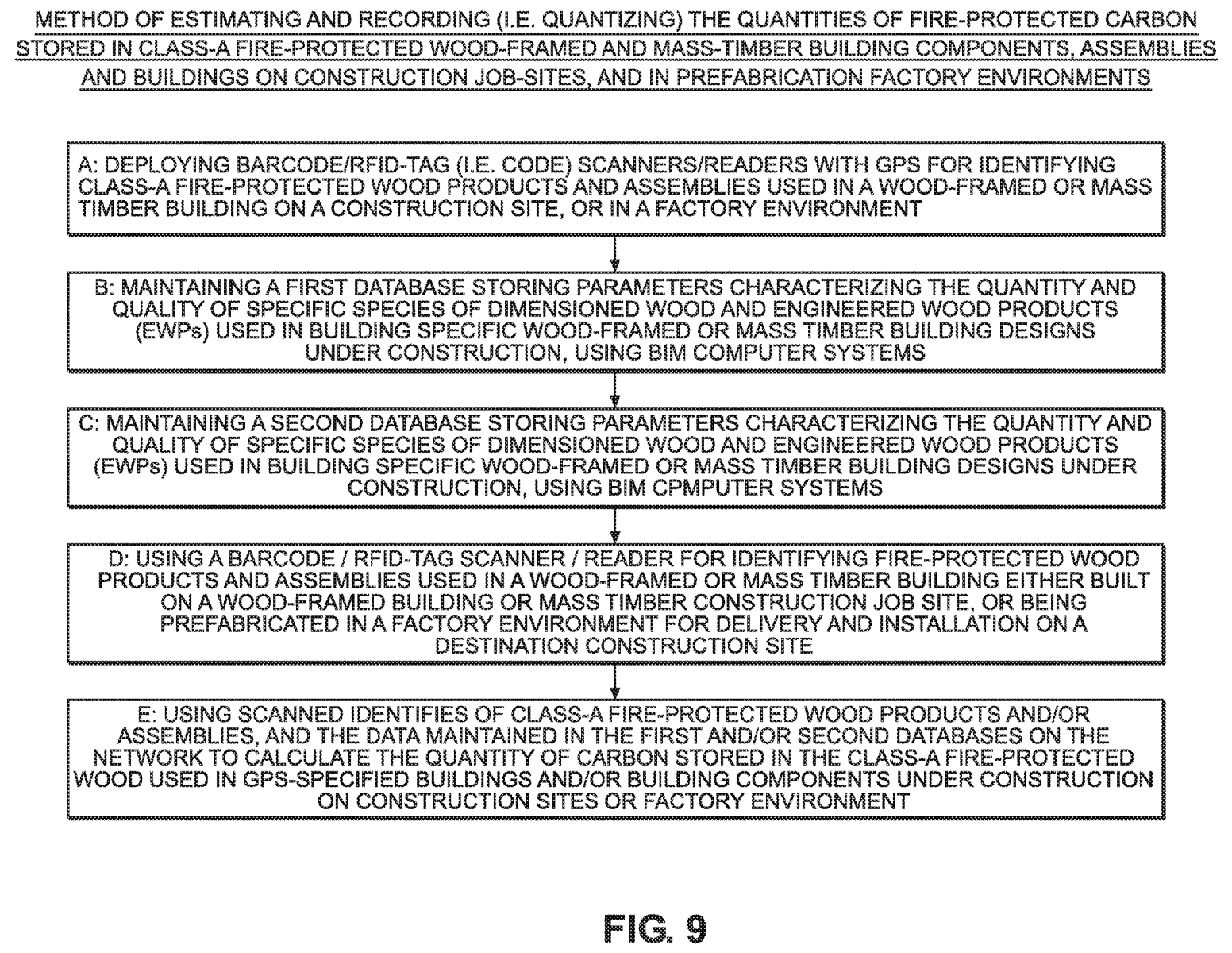

METHOD OF ESTIMATING AND RECORDING (I.E. QUANTIZING) THE QUANTITIES OF FIRE-PROTECTED CARBON STORED IN CLASS-A FIRE-PROTECTED WOOD-FRAMED AND MASS-TIMBER BUILDING COMPONENTS, ASSEMBLIES AND BUILDINGS ON CONSTRUCTION JOB-SITES, AND IN PREFABRICATION FACTORY ENVIRONMENTS

A: DEPLOYING BARCODE/RFID-TAG (I.E. CODE) SCANNERS/READERS WITH GPS FOR IDENTIFYING CLASS-A FIRE-PROTECTED WOOD PRODUCTS AND ASSEMBLIES USED IN A WOOD-FRAMED OR MASS TIMBER BUILDING ON A CONSTRUCTION SITE, OR IN A FACTORY ENVIRONMENT

B: MAINTAINING A FIRST DATABASE STORING PARAMETERS CHARACTERIZING THE QUANTITY AND QUALITY OF SPECIFIC SPECIES OF DIMENSIONED WOOD AND ENGINEERED WOOD PRODUCTS (EWPs) USED IN BUILDING SPECIFIC WOOD-FRAMED OR MASS TIMBER BUILDING DESIGNS UNDER CONSTRUCTION, USING BIM COMPUTER SYSTEMS

C: MAINTAINING A SECOND DATABASE STORING PARAMETERS CHARACTERIZING THE QUANTITY AND QUALITY OF SPECIFIC SPECIES OF DIMENSIONED WOOD AND ENGINEERED WOOD PRODUCTS (EWPs) USED IN BUILDING SPECIFIC WOOD-FRAMED OR MASS TIMBER BUILDING DESIGNS UNDER CONSTRUCTION, USING BIM CPMPUTER SYSTEMS

D: USING A BARCODE / RFID-TAG SCANNER / READER FOR IDENTIFYING FIRE-PROTECTED WOOD PRODUCTS AND ASSEMBLIES USED IN A WOOD-FRAMED OR MASS TIMBER BUILDING EITHER BUILT ON A WOOD-FRAMED BUILDING OR MASS TIMBER CONSTRUCTION JOB SITE, OR BEING PREFABRICATED IN A FACTORY ENVIRONMENT FOR DELIVERY AND INSTALLATION ON A DESTINATION CONSTRUCTION SITE

E: USING SCANNED IDENTIFIES OF CLASS-A FIRE-PROTECTED WOOD PRODUCTS AND/OR ASSEMBLIES, AND THE DATA MAINTAINED IN THE FIRST AND/OR SECOND DATABASES ON THE NETWORK TO CALCULATE THE QUANTITY OF CARBON STORED IN THE CLASS-A FIRE-PROTECTED WOOD USED IN GPS-SPECIFIED BUILDINGS AND/OR BUILDING COMPONENTS UNDER CONSTRUCTION ON CONSTRUCTION SITES OR FACTORY ENVIRONMENT

FIG. 9

CLASS-A FIRE PROTECTED CARBON-QUANTIZED FINGER-JOINTED LUMBER PRODUCTS ACCORDING TO THE PRESENT INVENTION

AUTOMATIC DIP-INFUSING STAGE ALONG THE PRODUCTION LINE

METHOD OF PRODUCING CARBON-QUANTIZED CLASS-A FIRE-PROTECTED FINGER-JOINTED LUMBER IN AN AUTOMATED LUMBER FACTORY

FLAME SPREAD AND SMOKE DEVELOPMENT INDICES OBTAINED THROUGH TESTING OF CLASS-A FIRE-PROTECTED CARBON-QUANTIZED LUMBER

| Flame Spread & Smoke Developed Indexes of AAF21 (FT) Protected Lumber | | |
| --- | --- | --- |
| | Flame Spread | Smoke Developed |
| Spruce Pine Fir | 15 | 95 |
| Douglas Fir | 0 | 40 |

1. Tested in accordance with ASTM E84 and UL 723
2. Additionally, the flame front did not progress more than 10.5 feet beyond the centerline of the burners at any time during the test.

FIG. 21

CLASS-A FIRE-PROTECTED CARBON-QUANTIZED TIMBER (CLT) PRODUCTS ACCORDING TO THE PRESENT INVENTION

Figure 24A:
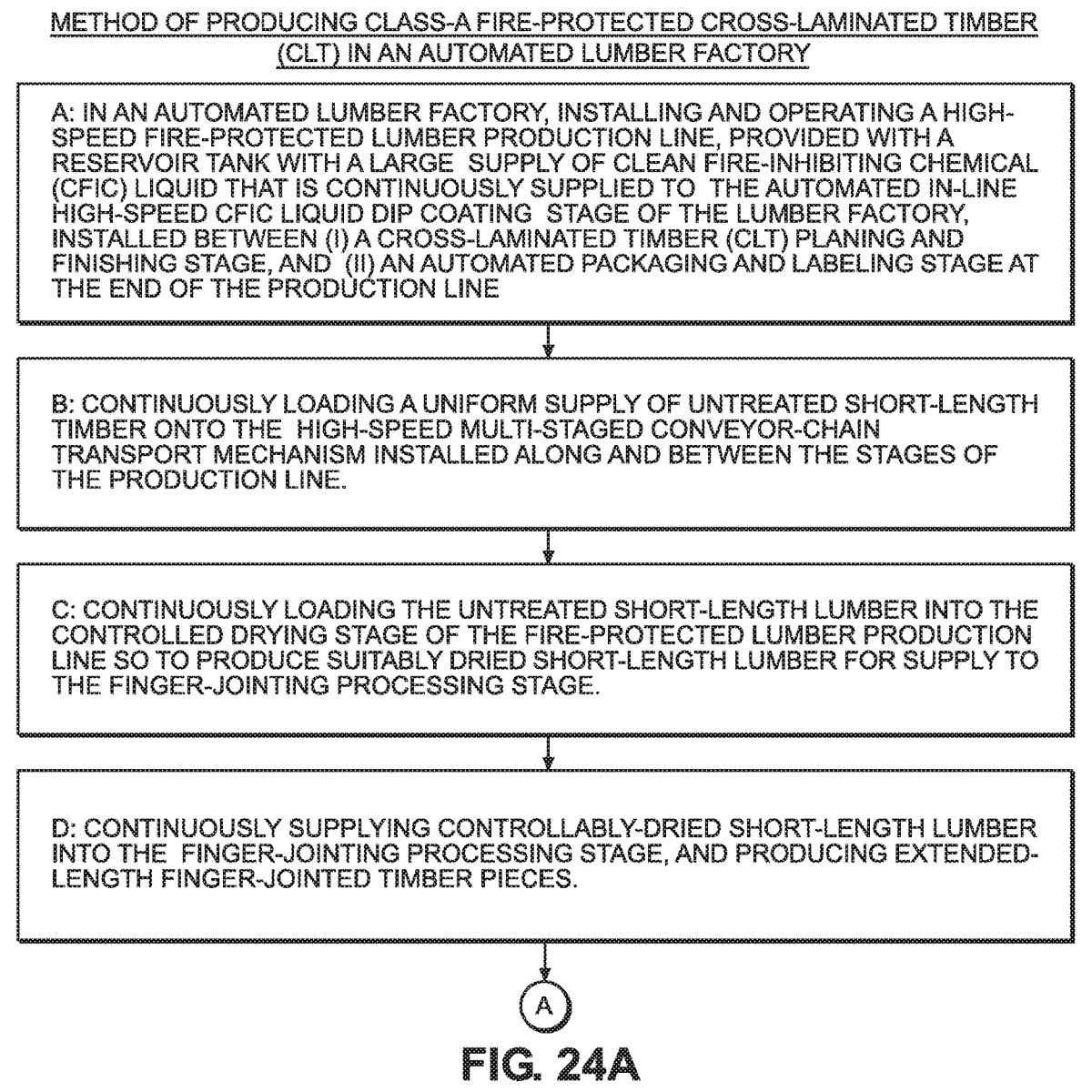

METHOD OF PRODUCING CLASS-A FIRE-PROTECTED CROSS-LAMINATED TIMBER (CLT) IN AN AUTOMATED LUMBER FACTORY

A: IN AN AUTOMATED LUMBER FACTORY, INSTALLING AND OPERATING A HIGH-SPEED FIRE-PROTECTED LUMBER PRODUCTION LINE, PROVIDED WITH A RESERVOIR TANK WITH A LARGE SUPPLY OF CLEAN FIRE-INHIBITING CHEMICAL (CFIC) LIQUID THAT IS CONTINUOUSLY SUPPLIED TO THE AUTOMATED IN-LINE HIGH-SPEED CFIC LIQUID DIP COATING STAGE OF THE LUMBER FACTORY, INSTALLED BETWEEN (I) A CROSS-LAMINATED TIMBER (CLT) PLANING AND FINISHING STAGE, AND (II) AN AUTOMATED PACKAGING AND LABELING STAGE AT THE END OF THE PRODUCTION LINE

↓

B: CONTINUOUSLY LOADING A UNIFORM SUPPLY OF UNTREATED SHORT-LENGTH TIMBER ONTO THE HIGH-SPEED MULTI-STAGED CONVEYOR-CHAIN TRANSPORT MECHANISM INSTALLED ALONG AND BETWEEN THE STAGES OF THE PRODUCTION LINE.

↓

C: CONTINUOUSLY LOADING THE UNTREATED SHORT-LENGTH LUMBER INTO THE CONTROLLED DRYING STAGE OF THE FIRE-PROTECTED LUMBER PRODUCTION LINE SO TO PRODUCE SUITABLY DRIED SHORT-LENGTH LUMBER FOR SUPPLY TO THE FINGER-JOINTING PROCESSING STAGE.

↓

D: CONTINUOUSLY SUPPLYING CONTROLLABLY-DRIED SHORT-LENGTH LUMBER INTO THE FINGER-JOINTING PROCESSING STAGE, AND PRODUCING EXTENDED-LENGTH FINGER-JOINTED TIMBER PIECES.

FLAME SPREAD AND SMOKE DEVELOPMENT CHARACTERISTICS OF FIRE-PROTECTED CARBON-QUANTIZED CROSS-LAMINATED TIMBER (CLT) PRODUCTS (i.e. PANELS, BEAMS, ETC.)

| Flame Spread & Smoke Developed Indexes of AAF21 (FT) Protected Lumber | | |
|---|---|---|
| | Flame Spread | Smoke Developed |
| Spruce Pine Fir | 15 | 95 |
| Douglas Fir | 0 | 40 |

1. Tested in accordance with ASTM E84 and UL 723
2. Additionally, the flame front did not progress more than 10.5 feet beyond the centerline of the burners at any time during the test.

FIG. 25

PRODUCING FIRE-PROTECTED CARBON-QUANTIZED LAMINATED VENEER LUMBER (LVL) PRODUCTS ACCORDING TO THE PRESENT INVENTION

AUTOMATED CFIC DIP-COATING STAGE
(2ND STAGE IN FIG. 27)

Figure 28A:
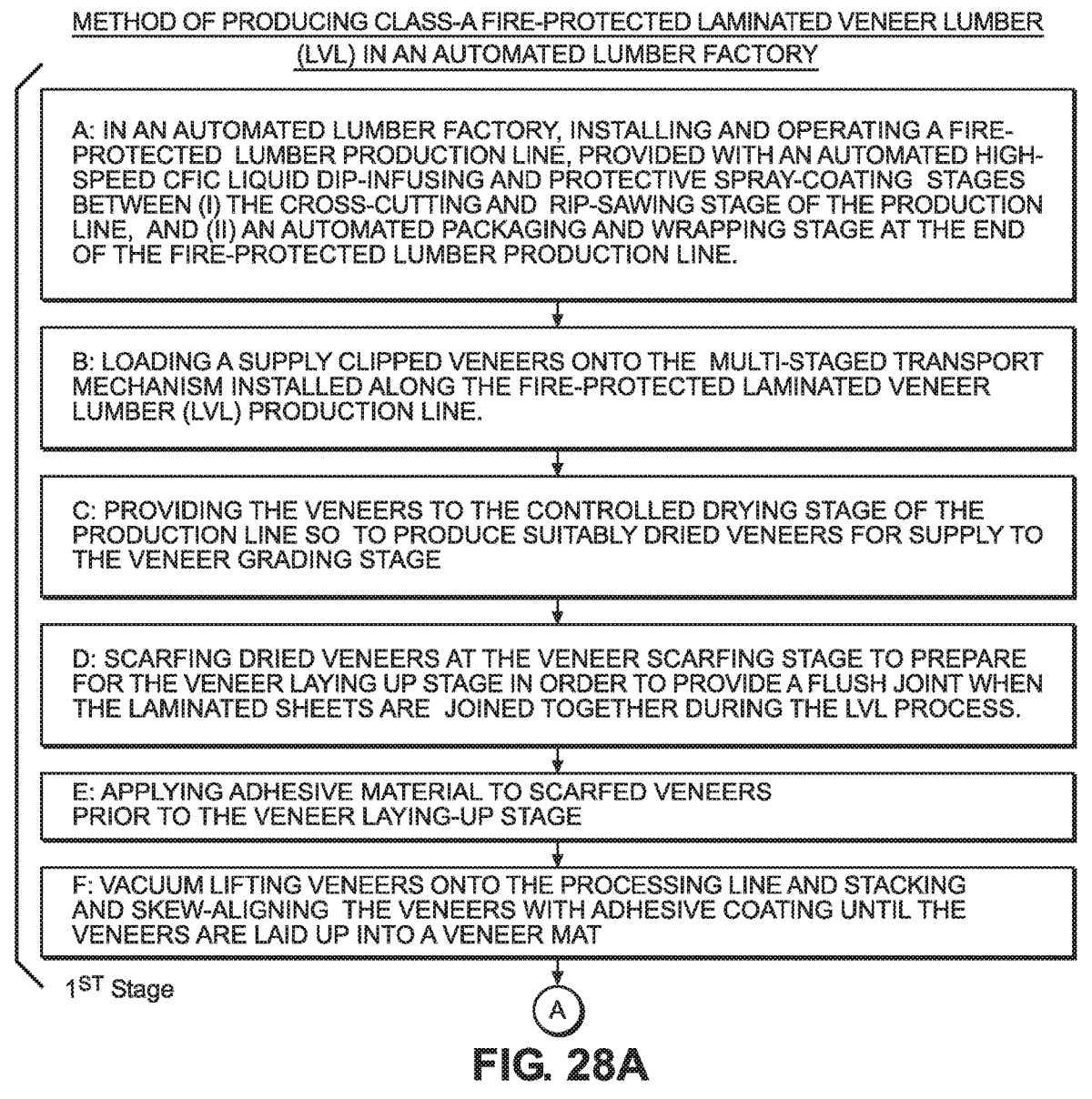

METHOD OF PRODUCING CLASS-A FIRE-PROTECTED LAMINATED VENEER LUMBER (LVL) IN AN AUTOMATED LUMBER FACTORY

A: IN AN AUTOMATED LUMBER FACTORY, INSTALLING AND OPERATING A FIRE-PROTECTED LUMBER PRODUCTION LINE, PROVIDED WITH AN AUTOMATED HIGH-SPEED CFIC LIQUID DIP-INFUSING AND PROTECTIVE SPRAY-COATING STAGES BETWEEN (I) THE CROSS-CUTTING AND RIP-SAWING STAGE OF THE PRODUCTION LINE, AND (II) AN AUTOMATED PACKAGING AND WRAPPING STAGE AT THE END OF THE FIRE-PROTECTED LUMBER PRODUCTION LINE.

B: LOADING A SUPPLY CLIPPED VENEERS ONTO THE MULTI-STAGED TRANSPORT MECHANISM INSTALLED ALONG THE FIRE-PROTECTED LAMINATED VENEER LUMBER (LVL) PRODUCTION LINE.

C: PROVIDING THE VENEERS TO THE CONTROLLED DRYING STAGE OF THE PRODUCTION LINE SO TO PRODUCE SUITABLY DRIED VENEERS FOR SUPPLY TO THE VENEER GRADING STAGE

D: SCARFING DRIED VENEERS AT THE VENEER SCARFING STAGE TO PREPARE FOR THE VENEER LAYING UP STAGE IN ORDER TO PROVIDE A FLUSH JOINT WHEN THE LAMINATED SHEETS ARE JOINED TOGETHER DURING THE LVL PROCESS.

E: APPLYING ADHESIVE MATERIAL TO SCARFED VENEERS PRIOR TO THE VENEER LAYING-UP STAGE

F: VACUUM LIFTING VENEERS ONTO THE PROCESSING LINE AND STACKING AND SKEW-ALIGNING THE VENEERS WITH ADHESIVE COATING UNTIL THE VENEERS ARE LAID UP INTO A VENEER MAT

1ST Stage

FLAME SPREAD AND SMOKE DEVELOPMENT CHARACTERISTICS OF CLASS-A FIRE-PROTECTED CARBON-QUANTIZED LAMINATED VENEER LUMBER (LVL) PRODUCTS (E.G. PANELS, BEAMS, ETC).

| Flame Spread & Smoke Developed Indexes of AAF21 (FT) Protected Lumber | | |
|---|---|---|
| | Flame Spread | Smoke Developed |
| Spruce Pine Fir | 15 | 95 |
| Douglas Fir | 0 | 40 |

1. Tested in accordance with ASTM E84 and UL 723
2. Additionally, the flame front did not progress more than 10.5 feet beyond the centerline of the burners at any time during the test.

FIG. 29

CLASS-A FIRE-PROTECTED ORIENTED STRAND BOARD (OSB) SHEATHING IN ACCORDANCE WITH THE PRINCIPLES OF THE PRESENT INVENTION

CLASS-A FIRE-PROTECTED CARBON-QUANTIZED ORIENTED STRAND BOARD (OSB) SHEATHING IN ACCORDANCE WITH THE PRINCIPLES OF THE PRESENT INVENTION

CLASS-A FIRE-PROTECTED CARBON-QUANTIZED TOP CHORD BEARING (FLOOR) TRUSSES (TCBT)

FLAME SPREAD AND SMOKE DEVELOPMENT CHARACTERISTICS OF CLASS-A FIRE-PROTECTED CROSS-LAMINATED TIMBER (CLT) PRODUCTS

| Flame Spread & Smoke Developed Indexes of AAF21 (FT) Protected Lumber | | |
|---|---|---|
| | Flame Spread | Smoke Developed |
| Spruce Pine Fir | 15 | 95 |
| Douglas Fir | 0 | 40 |

1. Tested in accordance with ASTM E84 and UL 723
2. Additionally, the flame front did not progress more than 10.5 feet beyond the centerline of the burners at any time during the test.

FIG. 39

CLASS-A FIRE-PROTECTED CARBON-QUANTIZED TOP CHORD BEARING (ROOF) TRUSSES (TCBT) IN ACCORDANCE WITH THE PRINCIPLES OF THE PRESENT INVENTION

METHOD OF MAKING CLASS-A FIRE-PROTECTED CARBON-QUANTIZED ROOF TRUSS STRUCTURES IN ACCORDANCE WITH THE PRINCIPLES OF THE PRESENT INVENTION

EXAMPLES OF CLASS-A FIRE-PROTECTED CARBON-QUANTIZEDROOF TRUSS STRUCTURES CONSTRUCTED IN ACCORDANCE WITH THE PRINCIPLES OF THE PRESENT INVENTION

EXAMPLES OF CLASS-A FIRE-PROTECTED CARBON-QUANTIZEDROOF TRUSS STRUCTURES CONSTRUCTED IN ACCORDANCE WITH THE PRINCIPLES OF THE PRESENT INVENTION

FLAME SPREAD AND SMOKE DEVELOPMENT CHARACTERISTICS OF CLASS-A FIRE-PROTECTED CARBON-QUANTIZED ROOF TRUSS STRUCTURES

| Flame Spread & Smoke Developed Indexes of AAF21 (FT) Protected Lumber | | |
|---|---|---|
| | Flame Spread | Smoke Developed |
| Spruce Pine Fir | 15 | 95 |
| Douglas Fir | 0 | 40 |

1. Tested in accordance with ASTM E84 and UL 723
2. Additionally, the flame front did not progress more than 10.5 feet beyond the centerline of the burners at any time during the test.

FIG. 44

CLASS-A FIRE-PROTECTED CARBON-QUANTIZED FLOOR JOIST STRUCTURE OF THE PRESENT INVENTION

FACTORY FOR MAKING CLASS-A FIRE-PROTECTED CARBON-QUANTIZED FLOOR JOIST STRUCTURES IN ACCORDANCE OF THE PRINCIPLES OF THE PRESENT INVENTION

FLAME SPREAD AND SMOKE DEVELOPMENT CHARACTERISTICS OF CLASS-A FIRE-PROTECTED CARBON-QUANTIZED JOIST STRUCTURE OF PRESENT INVENTION

| Flame Spread & Smoke Developed Indexes of AAF21 (FT) Protected Lumber | | |
|---|---|---|
| | Flame Spread | Smoke Developed |
| Spruce Pine Fir | 15 | 95 |
| Douglas Fir | 0 | 40 |

1. Tested in accordance with ASTM E84 and UL 723
2. Additionally, the flame front did not progress more than 10.5 feet beyond the centerline of the burners at any time during the test.

FIG. 48

VIDEO RECORDING OF JOB-SITE FIRE-INHIBITING SPRAY COATING OF RAW AND TREATED LUMBER AND SHEATHING ON WOOD-FRAMED ASSEMBLIES DURING CONSTRUCTION PHASE OF A WOOD-FRAMED BUILDING

GPS-TRACKED MOBILE CLEAN FIRE-INHIBITING CHEMICAL (CFIC) LIQUID SPRAY SYSTEM

GPS-TRACKED MOBILE CLEAN FIRE-INHIBITING CHEMICAL (CHIC) LIQUID SPRAY SYSTEM

JOB -SITE OF MULTI-APARTMENT WOOD FRAMED BUILDING UNDER CONSTRUCTION PREPARED AND READY FOR CLEAN FIRE-INHIBITING CHEMICAL SPRAY COATING TREATMENT

JOB -SITE OF MULTI-APARTMENT WOOD FRAMED BUILDING UNDER CONSTRUCTION
READY FOR CLEAN FIRE-INHIBITING CHEMICAL SPRAY COATING TREATMENT

Figure 52A:
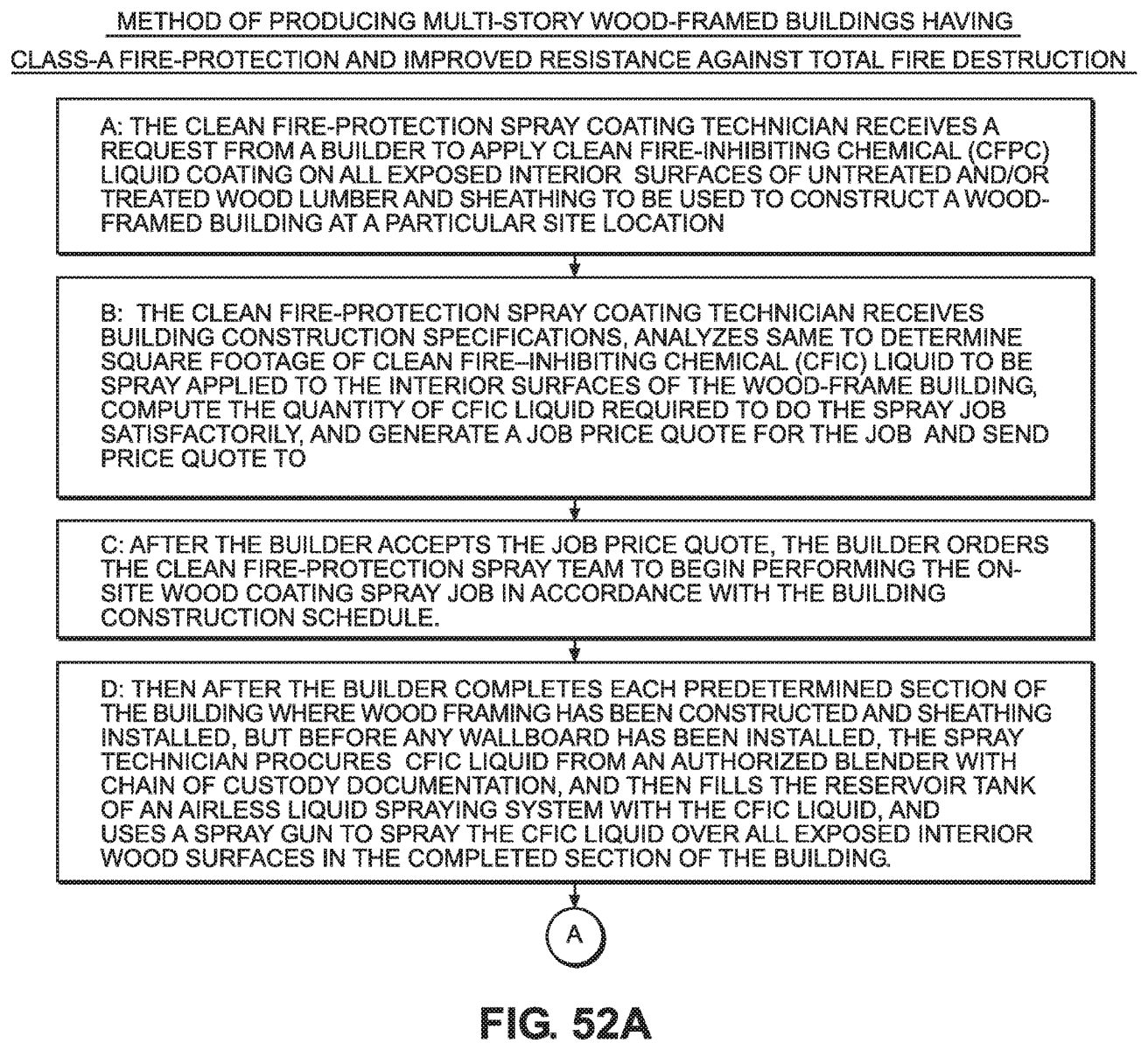

METHOD OF PRODUCING MULTI-STORY WOOD-FRAMED BUILDINGS HAVING CLASS-A FIRE-PROTECTION AND IMPROVED RESISTANCE AGAINST TOTAL FIRE DESTRUCTION

A: THE CLEAN FIRE-PROTECTION SPRAY COATING TECHNICIAN RECEIVES A REQUEST FROM A BUILDER TO APPLY CLEAN FIRE-INHIBITING CHEMICAL (CFPC) LIQUID COATING ON ALL EXPOSED INTERIOR SURFACES OF UNTREATED AND/OR TREATED WOOD LUMBER AND SHEATHING TO BE USED TO CONSTRUCT A WOOD-FRAMED BUILDING AT A PARTICULAR SITE LOCATION

↓

B: THE CLEAN FIRE-PROTECTION SPRAY COATING TECHNICIAN RECEIVES BUILDING CONSTRUCTION SPECIFICATIONS, ANALYZES SAME TO DETERMINE SQUARE FOOTAGE OF CLEAN FIRE--INHIBITING CHEMICAL (CFIC) LIQUID TO BE SPRAY APPLIED TO THE INTERIOR SURFACES OF THE WOOD-FRAME BUILDING, COMPUTE THE QUANTITY OF CFIC LIQUID REQUIRED TO DO THE SPRAY JOB SATISFACTORILY, AND GENERATE A JOB PRICE QUOTE FOR THE JOB AND SEND PRICE QUOTE TO

↓

C: AFTER THE BUILDER ACCEPTS THE JOB PRICE QUOTE, THE BUILDER ORDERS THE CLEAN FIRE-PROTECTION SPRAY TEAM TO BEGIN PERFORMING THE ON-SITE WOOD COATING SPRAY JOB IN ACCORDANCE WITH THE BUILDING CONSTRUCTION SCHEDULE.

↓

D: THEN AFTER THE BUILDER COMPLETES EACH PREDETERMINED SECTION OF THE BUILDING WHERE WOOD FRAMING HAS BEEN CONSTRUCTED AND SHEATHING INSTALLED, BUT BEFORE ANY WALLBOARD HAS BEEN INSTALLED, THE SPRAY TECHNICIAN PROCURES CFIC LIQUID FROM AN AUTHORIZED BLENDER WITH CHAIN OF CUSTODY DOCUMENTATION, AND THEN FILLS THE RESERVOIR TANK OF AN AIRLESS LIQUID SPRAYING SYSTEM WITH THE CFIC LIQUID, AND USES A SPRAY GUN TO SPRAY THE CFIC LIQUID OVER ALL EXPOSED INTERIOR WOOD SURFACES IN THE COMPLETED SECTION OF THE BUILDING.

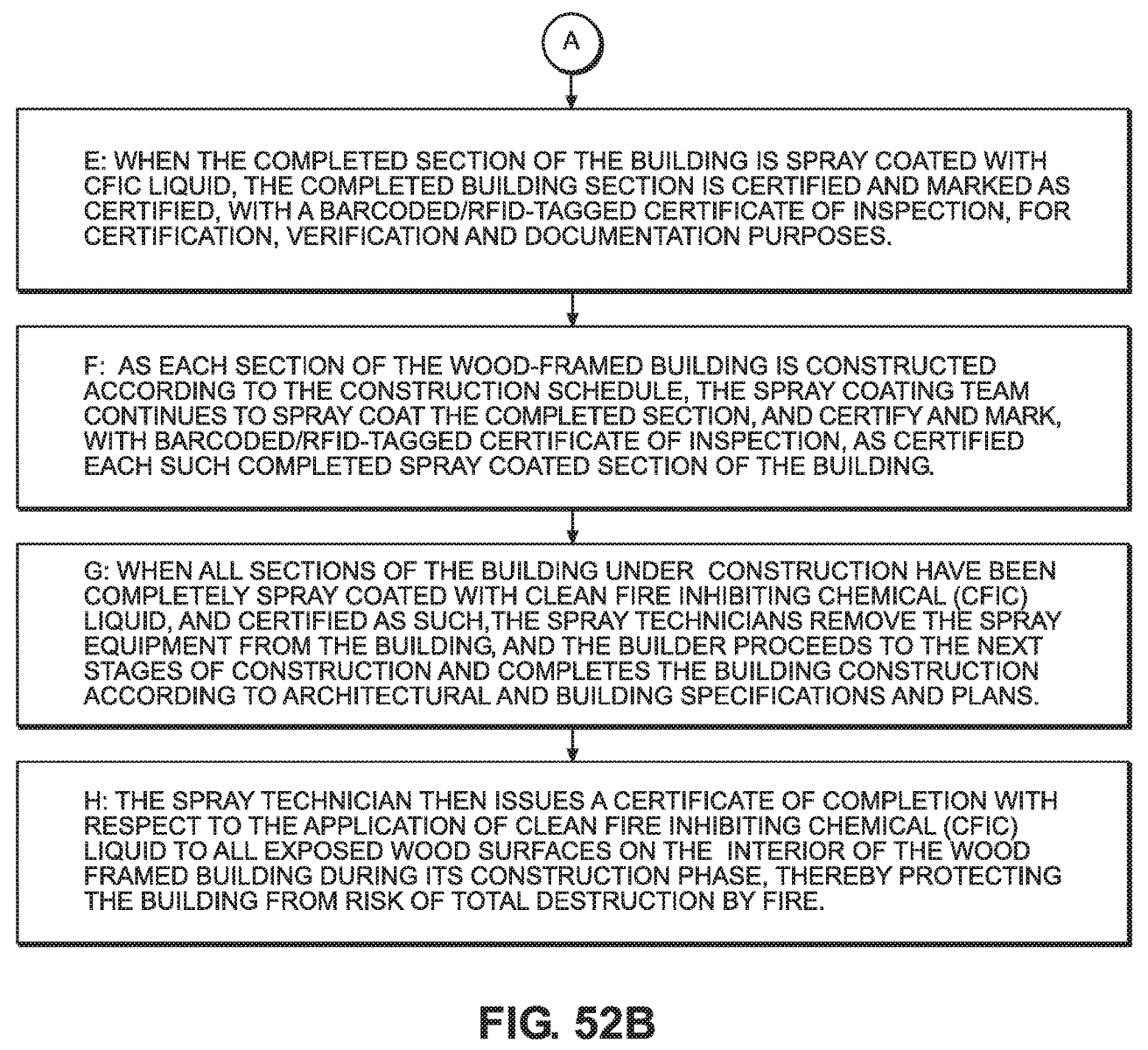

E: WHEN THE COMPLETED SECTION OF THE BUILDING IS SPRAY COATED WITH CFIC LIQUID, THE COMPLETED BUILDING SECTION IS CERTIFIED AND MARKED AS CERTIFIED, WITH A BARCODED/RFID-TAGGED CERTIFICATE OF INSPECTION, FOR CERTIFICATION, VERIFICATION AND DOCUMENTATION PURPOSES.

F: AS EACH SECTION OF THE WOOD-FRAMED BUILDING IS CONSTRUCTED ACCORDING TO THE CONSTRUCTION SCHEDULE, THE SPRAY COATING TEAM CONTINUES TO SPRAY COAT THE COMPLETED SECTION, AND CERTIFY AND MARK, WITH BARCODED/RFID-TAGGED CERTIFICATE OF INSPECTION, AS CERTIFIED EACH SUCH COMPLETED SPRAY COATED SECTION OF THE BUILDING.

G: WHEN ALL SECTIONS OF THE BUILDING UNDER CONSTRUCTION HAVE BEEN COMPLETELY SPRAY COATED WITH CLEAN FIRE INHIBITING CHEMICAL (CFIC) LIQUID, AND CERTIFIED AS SUCH,THE SPRAY TECHNICIANS REMOVE THE SPRAY EQUIPMENT FROM THE BUILDING, AND THE BUILDER PROCEEDS TO THE NEXT STAGES OF CONSTRUCTION AND COMPLETES THE BUILDING CONSTRUCTION ACCORDING TO ARCHITECTURAL AND BUILDING SPECIFICATIONS AND PLANS.

H: THE SPRAY TECHNICIAN THEN ISSUES A CERTIFICATE OF COMPLETION WITH RESPECT TO THE APPLICATION OF CLEAN FIRE INHIBITING CHEMICAL (CFIC) LIQUID TO ALL EXPOSED WOOD SURFACES ON THE INTERIOR OF THE WOOD FRAMED BUILDING DURING ITS CONSTRUCTION PHASE, THEREBY PROTECTING THE BUILDING FROM RISK OF TOTAL DESTRUCTION BY FIRE.

FIG. 52B

METHOD OF OPERATING A LIQUID AIR-LESS SPRAYING SYSTEM USING CLEAN FIRE-INHIBITING CHEMICALS (CFIC) THAT ARE SPRAYED AS A FIRE-PROTECTIVE COATING

FLAME SPREAD AND SMOKE DEVELOPMENT CHARACTERISTICS OF ON-JOB-SITE SPRAY-TREATED CLASS-A FIRE PROTECTED LUMBER AND SHEATHING

CLOUD-BASED SYSTEM FOR VERIFYING AND DOCUMENTING CLASS-A FIRE-PROTECTION TREATMENT OF WOOD-FRAMED BUILDINGS BY ON-SITE SPRAYING OF CLEAN FIRE INHIBITING CHEMICAL (CFIC) LIQUID

MOBILE PHONE OR TABLE COMPUTER

GRAPHICAL USER INTERFACE OF A MOBILE APPLICATION FOR USE BY BUILDING / PROPERTY OWNERS, INSURANCE COMPANIES, AND OTHER STAKEHOLDERS, SHOWING A MENU OF HIGH-LEVEL SERVICES

GRAPHICAL USER INTERFACE OF THE MOBILE APPLICATION FOR USE BY BUILDING/PROPERTY OWNERS, INSURANCE COMPANIES, AND OTHER STAKEHOLDERS SHOWING RECEIPT OF NEW MESSAGE RELATING TO BUILDING STATUS

GRAPHICAL USER INTERFACE OF THE MOBILE APPLICATION FOR USE BY BUILDING/PROPERTY OWNERS, INSURANCE COMPANIES, AND OTHER STAKEHOLDERS TO UPDATE BUILDING PROFILE

GRAPHICAL USER INTERFACE OF THE MOBILE APPLICATION FOR USE BY BUILDING/PROPERTY OWNERS, INSURANCE COMPANIES, AND OTHER STAKEHOLDERS TO REVIEW AND MONITOR THE SPRAY TREATMENT PROJECT AT A PARTICULAR WOOD-FRAMED BUILDING

GRAPHICAL USER INTERFACE OF THE MOBILE APPLICATION FOR USE BY BUILDING/PROPERTY OWNERS, INSURANCE COMPANIES, AND OTHER STAKEHOLDERS TO REVIEW THE FIRE-PROTECTION STATUS OF A WOOD-FRAMED BUILDING

GRAPHICAL USER INTERFACE OF THE MOBILE APPLICATION FOR USE BY BUILDING/PROPERTY OWNERS, INSURANCE COMPANIES, AND OTHER STAKEHOLDERS TO PLACE AN ORDER FOR AN ONSITE WOOD BUILDING SPRAY TREATMENT PROJECT

GRAPHICAL USER INTERFACE OF THE MOBILE APPLICATION FOR USE BY BUILDING/PROPERTY OWNERS, INSURANCE COMPANIES, AND OTHER STAKEHOLDERS TO REVIEW WHEN A PLANNED ONSITE WOOD BUILDING SPRAY TREATMENT PROJECT IS PLANNED

GRAPHICAL USER INTERFACE OF THE MOBILE APPLICATION FOR USE BY BUILDING/PROPERTY OWNERS, INSURANCE COMPANIES, AND OTHER STAKEHOLDERS TO REVIEW AN ACTIVE ONSITE WOOD BUILDING SPRAY TREATMENT PROJECT

GRAPHICAL USER INTERFACE OF THE MOBILE APPLICATION FOR USE BY BUILDING/PROPERTY OWNERS, INSURANCE COMPANIES, AND OTHER STAKEHOLDERS TO REVIEW AN COMPLETED ONSITE WOOD BUILDING SPRAY TREATMENT PROJECT

GRAPHICAL USER INTERFACE OF A MOBILE APPLICATION SHOWING HIGH-LEVEL MENU OF SERVICES FOR USE BY ON-SITE FIRE-PROTECTION SPRAY ADMINISTRATORS AND TECHNICIANS

GRAPHICAL USER INTERFACE OF THE MOBILE APPLICATION FOR USE BY ON-SITE FIRE-PROTECTION SPRAY ADMINISTRATORS AND TECHNICIANS TO SEND AND RECEIVE EMAIL AND SMS MESSAGES WITH REGISTERED USERS

GRAPHICAL USER INTERFACE OF THE MOBILE APPLICATION FOR USE BY ON-SITE FIRE-PROTECTION SPRAY ADMINISTRATORS AND TECHNICIANS TO UPDATE A BUILDING INFORMATION PROFILE

GRAPHICAL USER INTERFACE OF THE MOBILE APPLICATION FOR USE BY ON-SITE FIRE-PROTECTION SPRAY ADMINISTRATORS AND TECHNICIANS TO REVIEW A BUILDING SPRAY-BASED FIRE-PROTECTION PROJECT

GRAPHICAL USER INTERFACE OF THE MOBILE APPLICATION FOR USE BY ON-SITE FIRE-PROTECTION SPRAY ADMINISTRATORS AND TECHNICIANS TO REVIEW THE STATUS OF ANY BUILDING REGISTERED WITH THE SYSTEM NETWORK

GRAPHICAL USER INTERFACE OF THE MOBILE APPLICATION FOR USE BY ON-SITE FIRE-PROTECTION SPRAY ADMINISTRATORS AND TECHNICIANS TO CREATE A NEW PROJECT FOR SPRAY-BASED CLASS-A FIRE-PROTECTION TREATMENT OF A WOOD-FRAMED BUILDING

GRAPHICAL USER INTERFACE OF THE MOBILE APPLICATION FOR USE BY ON-SITE FIRE-PROTECTION SPRAY ADMINISTRATORS AND TECHNICIANS TO REVIEW THE STATUS OF A PLANNED BUILDING FIRE-PROTECTION SPRAY PROJECT

GRAPHICAL USER INTERFACE OF THE MOBILE APPLICATION FOR USE BY ON-SITE FIRE-PROTECTION SPRAY ADMINISTRATORS AND TECHNICIANS TO REVIEW THE STATUS OF AN ACTIVE IN PROGRESS BUILDING FIRE-PROTECTION SPRAY PROJECT

GRAPHICAL USER INTERFACE OF THE MOBILE APPLICATION FOR USE BY ON-SITE FIRE-PROTECTION SPRAY ADMINISTRATORS AND TECHNICIANS TO REVIEW A COMPLETED BUILDING FIRE-PROTECTION SPRAY PROJECT, AND ALL DOCUMENTS COLLECTED THEREWHILE

GRAPHICAL USER INTERFACE OF THE MOBILE APPLICATION FOR USE BY ON-SITE FIRE-PROTECTION SPRAY ADMINISTRATORS AND TECHNICIANS TO GENERATE AND REVIEW REPORTS ON PROJECTS

GRAPHICAL USER INTERFACE OF THE MOBILE APPLICATION FOR USE BY ON-SITE FIRE-PROTECTION SPRAY ADMINISTRATORS AND TECHNICIANS TO GENERATE AND REVIEW REPORTS ON SUPPLIES USED IN FULFILLING ON-SITE CLASS-A FIRE-PROTECTION SPRAY PROJECTS

GRAPHICAL USER INTERFACE OF THE MOBILE APPLICATION FOR USE BY ON-SITE FIRE-PROTECTION SPRAY ADMINISTRATORS AND TECHNICIANS TO TO GENERATE AND REVIEW REPORTS ON REGISTERED USERS ASSOCIATED WITH PARTICULAR ON-SITE CLASS-A FIRE-PROTECTION SPRAY PROJECTS

Figure 60A:
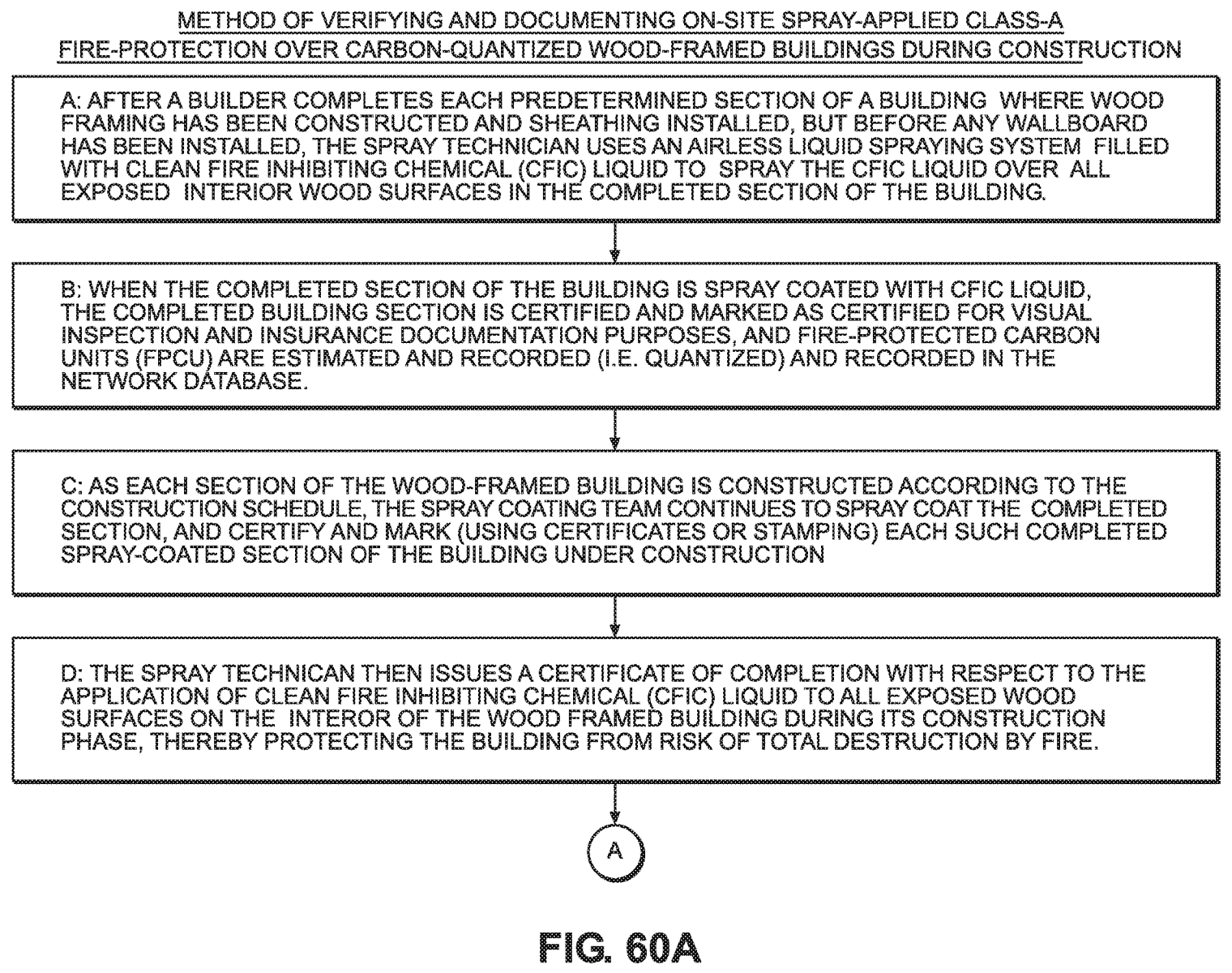

METHOD OF VERIFYING AND DOCUMENTING ON-SITE SPRAY-APPLIED CLASS-A FIRE-PROTECTION OVER CARBON-QUANTIZED WOOD-FRAMED BUILDINGS DURING CONSTRUCTION

A: AFTER A BUILDER COMPLETES EACH PREDETERMINED SECTION OF A BUILDING WHERE WOOD FRAMING HAS BEEN CONSTRUCTED AND SHEATHING INSTALLED, BUT BEFORE ANY WALLBOARD HAS BEEN INSTALLED, THE SPRAY TECHNICIAN USES AN AIRLESS LIQUID SPRAYING SYSTEM FILLED WITH CLEAN FIRE INHIBITING CHEMICAL (CFIC) LIQUID TO SPRAY THE CFIC LIQUID OVER ALL EXPOSED INTERIOR WOOD SURFACES IN THE COMPLETED SECTION OF THE BUILDING.

↓

B: WHEN THE COMPLETED SECTION OF THE BUILDING IS SPRAY COATED WITH CFIC LIQUID, THE COMPLETED BUILDING SECTION IS CERTIFIED AND MARKED AS CERTIFIED FOR VISUAL INSPECTION AND INSURANCE DOCUMENTATION PURPOSES, AND FIRE-PROTECTED CARBON UNITS (FPCU) ARE ESTIMATED AND RECORDED (I.E. QUANTIZED) AND RECORDED IN THE NETWORK DATABASE.

↓

C: AS EACH SECTION OF THE WOOD-FRAMED BUILDING IS CONSTRUCTED ACCORDING TO THE CONSTRUCTION SCHEDULE, THE SPRAY COATING TEAM CONTINUES TO SPRAY COAT THE COMPLETED SECTION, AND CERTIFY AND MARK (USING CERTIFICATES OR STAMPING) EACH SUCH COMPLETED SPRAY-COATED SECTION OF THE BUILDING UNDER CONSTRUCTION

↓

D: THE SPRAY TECHNICAN THEN ISSUES A CERTIFICATE OF COMPLETION WITH RESPECT TO THE APPLICATION OF CLEAN FIRE INHIBITING CHEMICAL (CFIC) LIQUID TO ALL EXPOSED WOOD SURFACES ON THE INTEROR OF THE WOOD FRAMED BUILDING DURING ITS CONSTRUCTION PHASE, THEREBY PROTECTING THE BUILDING FROM RISK OF TOTAL DESTRUCTION BY FIRE.

ARCHITECTURAL FLOOR PLANS FOR A WOOD-FRAMED BUILDING SCHEDULED TO BE SPRAYED WITH CFIC LIQUID TO PROVIDE EXPOSED INTERIOR SURFACES WITH CLASS-A FIRE-PROTECTION AND CARBON QUANTIZATION

ARCHITECTURAL FLOOR PLANS FOR A WOOD-FRAMED BUILDING, WITH A SECTION MARKED UP BY THE BUILDER, AND SCHEDULED TO BE SPRAYED WITH CFIC LIQUID TO PROVIDE CLASS-A FIRE-PROTECTION AND CARBON-QUANTIZATION

MARKED-UP ARCHITECTURAL FLOOR PLANS INDICATING A COMPLETED SECTION THAT HAS BEEN SPRAYED WITH CFIC LIQUID TO PROVIDE EXPOSED INTERIOR SURFACES WITH CLASS-A FIRE-PROTECTION AND CARBON-QUANTIZATION

FIG. 62B
BARCODED/RFID-TAG ENCODED INSPECTION CHECKPOINT WITH INTEGRATED CERTIFICATIONS BY SPRAY TECHNICIAN AND SPRAY SUPERVISOR
300A
MIGHTY
FIRE SUPPRESSION
WE TAME THE FLAMES
300B
PROJECT #:
LOCATION:
BUILDING #:
SECTION #:
FLOOR #:
SUITE/ROOM #:
DATE:
SPRAY TECH:
SPRAY SUPERVISOR:
SITE SUPERVISOR:
300E
CERTIFICATION BY SPRAY TECHNICIAN
I, ____, a Certified M-Fire Suppression Spray Technician, hereby certify that I sprayed the above-specified Wood-Framed Section of the named Building on the date specified above, using Clean Fire Inhibiting Chemical (CFIC) Liquid so as to provide with Building Section with Class-A Fire-Protection as certified by QAI Laboratories on ____ following ASTM E84-17a Engineering Test Standards.
300D
Spray Technician Signature Date: ____
CERTIFICATION BY SPRAY SUPERVISOR
I, ____, a Certified M-Fire Suppression Spray Supervisor, hereby certify that, under my direct supervision, the above-specified Wood-Framed Section of the named Building has been sprayed on the date specified above, using Clean Fire Inhibiting Chemical (CFIC) Liquid to provide with Building Section with Class-A Fire-Protection as Certified By QAI Laboratories on ____ following ASTM E84-17a Engineering Test Standards.
Spray Supervisor Signature Date: ____
FIRE-PROTECTED CARBON UNITS:____[T]
300C
300

METHOD OF QUALIFYING A WOOD-FRAMED OR MASS TIMBER BUILDING FOR REDUCED PROPERTY INSURANCE BASED ON VERIFIED AND DOCUMENTED SPRAY-BASED CLEAN FIRE INHIBITING CHEMICAL (CFIC) LIQUID TREATMENT AND FIRE-PROTECTED CARBON-QUANTIZATION DURING THE CONSTRUCTION PHASE

A: SPRAYING A CLEAN FIRE INHIBITING CHEMICAL (CFIC) LIQUID OVER ALL INTERIOR SURFACES OF COMPLETED SECTIONS OF A WOOD-FRAMED BUILDING TO PROVIDE CLASS-A FIRE-PROTECTION

↓

B: VERIFYING AND DOCUMENTING THE SPRAY-BASED CLASS-A FIRE PROTECTION TREATMENT PROCESS BY CAPTURING GPS-COORDINATES AND TIME/DATE STAMPING DATA GENERATED BY THE GPS-TRACKED CFIC LIQUID SPRAY SYSTEM DEPLOYED ON THE SYSTEM NETWORK, INCLUDING DIGITAL IMAGES AND VIDEOS OF CERTIFICATES OF COMPLETION STAMPED ON COMPLETED SECTIONS AFTER SPRAY TREATMENT.

↓

C: WIRELESSLY TRANSMITTING COLLECTED ON-SITE SPRAY TREATMENT DATA TO A CENTRAL NETWORK DATABASE ON THE SYSTEM NETWORK TO UPDATE THE CENTRAL NETWORK DATABASE ON THE SYSTEM NETWORK.

↓

D: A COMPANY UNDERWRITING PROPERTY INSURANCE FOR THE WOOD-FRAMED BUILDING ACCESSING THE CENTRAL NETWORK DATABASE ON THE SYSTEM NETWORK, TO VERIFY THE DATABASE RECORDS MAINTAINED FOR EACH WOOD-FRAMED BUILDING THAT HAS UNDERGONE SPRAY-BASED CLASS-A FIRE PROTECTION TREATMENT, TO QUALIFY THE BUILDING OWNER FOR LOWER PROPERTY INSURANCE PREMIUMS, BASED ON THE VERIFIED CLASS-A FIRE-PROTECTION STATUS OF THE SPRAYED-TREATED WOOD-FRAMED BUILDING.

↓

E: UPON THE OUTBREAK OF A FIRE IN THE INSURED WOOD-FRAMED BUILDING/PROPERTY, THE LOCAL FIRE DEPARTMENTS INSTANTLY AND REMOTELY ASSESSING THE CENTRAL NETWORK DATABASE USING A MOBILE APPLICATION, SO AS TO QUICKLY DETERMINE CLASS-A FIRE-PROTECTED STATUS OF THE WOOD-FRAMED BUILDING BY VIRTUE OF CFIC LIQUID SPRAY TREATMENT OF THE WOOD-FRAMED BUILDING DURING THE CONSTRUCTION PHASE, AND INFORM FIREMAN TASKED WITH FIGHTING THE FIRE THAT THE WOOD-FRAMED BUILDING HAS BEEN TREATED WITH CLASS-A FIRE-PROTECTION DEFENSE AGAINST FIRE.

FIG. 63

METHOD OF MAINTAINING THE CHAIN OF CUSTODY AND QUALITY CONTROL WHEN PRODUCING AND SUPPLYING CLEAN FIRE INHIBITING CHEMICAL (CFIC) MATERIAL IN TOTES FROM CHEMICAL FACTORY TO A NETWORK OF CONSTRUCTION JOB SITES OR WAREHOUSES

FIRST DATABASE RECORD WITHIN DATABASE SYSTEM

| Purchase Order # | Shipment Item # | Shipped Tote Weight (Lbs) | Shipping Date | GPS Coord. | Shipping Manifest # | Received Date | Weight Difference (Lbs) | Shipment Acceptance (No/Yes) |
|---|---|---|---|---|---|---|---|---|
| | | | | | | | | |
| | | | | | | | | |
| | | | | | | | | |
| | | | | | | | | |
| | | | | | | | | |
| | | | | | | | | |
| | | | | | | | | |
| | | | | | | | | |

FIG. 66A

SECOND DATABASE RECORD WITHIN DATABASE SYSTEM

| | | | | | | |
|---|---|---|---|---|---|---|
| Dealer ID# | | | | | | |
| CFIC Tote Shipments Received and Accepted | | | | | | |
| Quantity Of CFIC Totes In Inventory | | | | | | |
| Quantity of CFIC Totes Used | | | | | | |
| CFIC Totes In Inventory | | | | | | |
| CFIC Totes Out of Inventory | | | | | | |
| Low Inventory Notices | | | | | | |
| Auto CFIC Tote Shipment | | | | | | |
| Dealer CFIC Tote Inventory Reports | | | | | | |

FIG. 66B

GRAPHICAL USER INTERFACE OF THE MOBILE APPLICATION FOR USE BY PROJECT ADMINISTRATORS, MANAGERS, FABRICATORS AND TECHNICIANS, SHOWING THE HIGH-LEVEL MENU OF SERVICES

GRAPHICAL USER INTERFACE OF THE MOBILE APPLICATION FOR USE BY PROJECT ADMINISTRATOR RECEIVING CHEMICAL SUPPLIES FOR APPLYING JOB SITE CLASS-A FIRE-PROTECTION TO A WOOD-FRAMED BUILDING WHOSE SEQUESTERED CARBON IS TO BE FIRE-PROTECTED, ESTIMATED AND RECORDED

GRAPHICAL USER INTERFACE OF THE MOBILE APPLICATION FOR USE BY PROJECT ADMINISTRATOR RECEIVING CHEMICAL SUPPLIES FOR APPLYING JOB SITE CLASS-A FIRE-PROTECTION TO A WOOD-FRAMED BUILDING WHOSE SEQUESTERED CARBON IS TO BE FIRE-PROTECTED, ESTIMATED AND RECORDED

GRAPHICAL USER INTERFACE OF THE MOBILE APPLICATION FOR USE BY PROJECT ADMINISTRATOR RECEIVING CHEMICAL SUPPLIES FOR APPLYING JOB SITE CLASS-A FIRE-PROTECTION TO A WOOD-FRAMED BUILDING WHOSE SEQUESTERED CARBON IS TO BE FIRE-PROTECTED, ESTIMATED AND RECORDED

GRAPHICAL USER INTERFACE OF THE MOBILE APPLICATION FOR USE BY PROJECT ADMINISTRATOR RECEIVING CHEMICAL SUPPLIES FOR APPLYING JOB SITE CLASS-A FIRE-PROTECTION TO A WOOD-FRAMED BUILDING WHOSE SEQUESTERED CARBON IS TO BE FIRE-PROTECTED, ESTIMATED AND RECORDED

GRAPHICAL USER INTERFACE OF THE MOBILE APPLICATION FOR USE BY PROJECT ADMINISTRATOR RECEIVING CHEMICAL SUPPLIES FOR APPLYING JOB SITE CLASS-A FIRE-PROTECTION TO A WOOD-FRAMED BUILDING WHOSE SEQUESTERED CARBON IS TO BE FIRE-PROTECTED, ESTIMATED AND RECORDED

GRAPHICAL USER INTERFACE OF THE MOBILE APPLICATION FOR USE BY PROJECT ADMINISTRATOR RECEIVING CHEMICAL SUPPLIES FOR APPLYING JOB SITE CLASS-A FIRE-PROTECTION TO A WOOD-FRAMED BUILDING WHOSE SEQUESTERED CARBON IS TO BE FIRE-PROTECTED, ESTIMATED AND RECORDED

GRAPHICAL USER INTERFACE OF THE MOBILE APPLICATION FOR USE BY PROJECT ADMINISTRATOR RECEIVING CHEMICAL SUPPLIES FOR APPLYING JOB SITE CLASS-A FIRE-PROTECTION TO A WOOD-FRAMED BUILDING WHOSE SEQUESTERED CARBON IS TO BE FIRE-PROTECTED, ESTIMATED AND RECORDED

GRAPHICAL USER INTERFACE OF THE MOBILE APPLICATION FOR USE BY PROJECT ADMINISTRATOR RECEIVING CHEMICAL SUPPLIES FOR APPLYING JOB SITE CLASS-A FIRE-PROTECTION TO A WOOD-FRAMED BUILDING WHOSE SEQUESTERED CARBON IS TO BE FIRE-PROTECTED, ESTIMATED AND RECORDED

GRAPHICAL USER INTERFACE OF THE MOBILE APPLICATION FOR USE BY PROJECT ADMINISTRATOR RECEIVING CHEMICAL SUPPLIES FOR APPLYING JOB SITE CLASS-A FIRE-PROTECTION TO A WOOD-FRAMED BUILDING WHOSE SEQUESTERED CARBON IS TO BE FIRE-PROTECTED, ESTIMATED AND RECORDED

GRAPHICAL USER INTERFACE OF THE MOBILE APPLICATION FOR USE BY ON-SITE FIRE-PROTECTION SPRAY ADMINISTRATORS AND TECHNICIANS TO REGISTER CFIC TOTE FOR ON-SITE SPRAYING DURING BUILDING FIRE-PROTECTION SPRAY PROJECT

GRAPHICAL USER INTERFACE OF THE MOBILE APPLICATION FOR USE BY ON-SITE FIRE-PROTECTION SPRAY ADMINISTRATORS AND TECHNICIANS TO CAPTURE JOB SITE GPS COORDINATES DURING BUILDING FIRE-PROTECTION SPRAY PROJECT

GRAPHICAL USER INTERFACE OF THE MOBILE APPLICATION FOR USE BY ON-SITE FIRE-PROTECTION SPRAY ADMINISTRATORS AND TECHNICIANS TO UPDATE CFIC TOTE INVENTORY DURING BUILDING FIRE-PROTECTION SPRAY PROJECT

SCHEMA FOR NETWORK DATABASE SUPPORTED BY SYSTEM NETWORK OF THE PRESENT INVENTION

GRAPHICAL USER INTERFACE OF A MOBILE APPLICATION FOR USE BY PREFABRICATED BUILDING CUSTOMERS (E.G. ARCHITECTS, BUILDERS, ET AL) SHOWING A HIGH LEVEL MENU OF SERVICES

GRAPHICAL USER INTERFACE OF THE MOBILE APPLICATION FOR USE BY CUSTOMERS SHOWING DETAILS FOR AN ORDER FOR A CUSTOM PREFABRICATED WOOD-FRAMED BUILDING, OR WOOD-FRAMED BUILDING COMPONENT

GRAPHICAL USER INTERFACE OF THE MOBILE APPLICATION FOR USE BY PROJECT ADMINISTRATOR SHOWING DETAILS FOR AN ORDER FOR A PRE-SPECIFIED PREFABRICATED WOOD-FRAMED BUILDING OR WOOD-FRAMED BUILDING COMPONENT

GRAPHICAL USER INTERFACE OF THE MOBILE APPLICATION FOR USE BY PROJECT ADMINISTRATOR SHOWING STATUS DETAILS FOR A PROJECT FOR A CUSTOM PREFABRICATED WOOD-FRAMED BUILDING, OR WOOD-FRAMED BUILDING COMPONENT

GRAPHICAL USER INTERFACE OF THE MOBILE APPLICATION FOR USE BY PROJECT ADMINISTRATOR SHOWING PROGRESS DETAILS FOR A PROJECT RELATING TO THE FACTORY-FABRICATION OF A WOOD-FRAMED BUILDING, OR WOOD-FRAMED BUILDING COMPONENT

GRAPHICAL USER INTERFACE OF THE MOBILE APPLICATION FOR USE BY PROJECT ADMINISTRATOR SHOWING A MESSAGE RECEIVED INDICATING THAT THE PROJECT RELATING TO A PREFABRICATED WOOD-FRAMED BUILDING IS COMPLETED AND READY FOR SHIPMENT TO DESTINATION SHIPPING LOCATION

GRAPHICAL USER INTERFACE OF THE MOBILE APPLICATION FOR USE BY PROJECT ADMINISTRATORS, MANAGERS, FABRICATORS AND TECHNICIANS, SHOWING THE HIGH-LEVEL MENU OF SERVICES

GRAPHICAL USER INTERFACE OF THE MOBILE APPLICATION FOR USE BY PROJECT ADMINISTRATORS AND/OR FABRICATORS SHOWING THE CREATION OF A NEW MESSAGES

GRAPHICAL USER INTERFACE OF THE MOBILE APPLICATION FOR USE BY PROJECT ADMINISTRATOR SHOWING THE STATUS OF A PURCHASE ORDER FOR A PREFABRICATED CLASS-A FIRE-PROTECTED CARBON-QUANTIZED WOOD-FRAMED BUILDING OR COMPONENT

GRAPHICAL USER INTERFACE OF THE MOBILE APPLICATION FOR USE BY PROJECT ADMINISTRATOR SHOWING THE SUPPLIES REQUIRED TO FULFILL A PURCHASE ORDER FOR A PREFABRICATED CLASS-A FIRE-PROTECTED CARBON-QUANTIZED WOOD-FRAMED BUILDING OR COMPONENT

GRAPHICAL USER INTERFACE OF THE MOBILE APPLICATION FOR USE BY PROJECT ADMINISTRATOR SHOWING THE BILL OF MATERIALS (BOM) REQUIRED TO FULFILL A PURCHASE ORDER FOR A PREFABRICATED CLASS-A FIRE-PROTECTED CARBON-QUANTIZED WOOD-FRAMED BUILDING OR COMPONENT

GRAPHICAL USER INTERFACE OF THE MOBILE APPLICATION FOR USE BY PROJECT ADMINISTRATOR SHOWING THE STATUS OF A FACTORY PROJECT INVOLVING THE PREFABRICATION OF A CLASS-A FIRE-PROTECTED CARBON-QUANTIZED WOOD-FRAMED BUILDING OR COMPONENT

GRAPHICAL USER INTERFACE OF THE MOBILE APPLICATION FOR USE BY PROJECT ADMINISTRATOR SHOWING THE PROGRESS OF A FACTORY PROJECT INVOLVING THE PREFABRICATION OF A CLASS-A FIRE-PROTECTED CARBON-QUANTIZED WOOD-FRAMED BUILDING OR COMPONENT

GRAPHICAL USER INTERFACE OF THE MOBILE APPLICATION FOR USE BY PROJECT ADMINISTRATOR SHOWING THE SUPPLIES REQUIRED BY A FACTORY PROJECT INVOLVING THE PREFABRICATION OF A CLASS-A FIRE-PROTECTED CARBON-QUANTIZED WOOD-FRAMED BUILDING OR COMPONENT

GRAPHICAL USER INTERFACE OF THE MOBILE APPLICATION FOR USE BY PROJECT ADMINISTRATOR SHOWING A REPORT ON PURCHASE ORDERS PLACED FOR THE PREFABRICATION OF A CLASS-A FIRE-PROTECTED CARBON-QUANTIZED WOOD-FRAMED BUILDING OR COMPONENT

GRAPHICAL USER INTERFACE OF THE MOBILE APPLICATION FOR USE BY PROJECT ADMINISTRATOR SHOWING A REPORT ON PROJECTS INVOLVING THE PREFABRICATION OF A CLASS-A FIRE-PROTECTED WOOD-FRAMED CARBON-QUANTIZED BUILDING OR COMPONENT

GRAPHICAL USER INTERFACE OF THE MOBILE APPLICATION FOR USE BY PROJECT ADMINISTRATOR SHOWING A REPORT ON SUPPLIES REQUIRED FOR THE PREFABRICATION OF A CLASS-A FIRE-PROTECTED CARBON-QUANTIZED WOOD-FRAMED BUILDING OR COMPONENT

METHOD OF OPERATING A JUST-IN-TIME PREFABRICATED CLASS-A FIRE-PROTECTED WOOD-FRAMED BUILDING FACTORY SYSTEM SUPPORTING MULTIPLE PRODUCTION LINES FOR PRODUCING CLASS-A FIRE-PROTECTED CARBON-QUANTIZED WOOD-FRAMED COMPONENTS FOR CONSTRUCTING PREFABRICATED CLASS-A FIRE-PROTECTED WOOD-FRAMED BUILDINGS

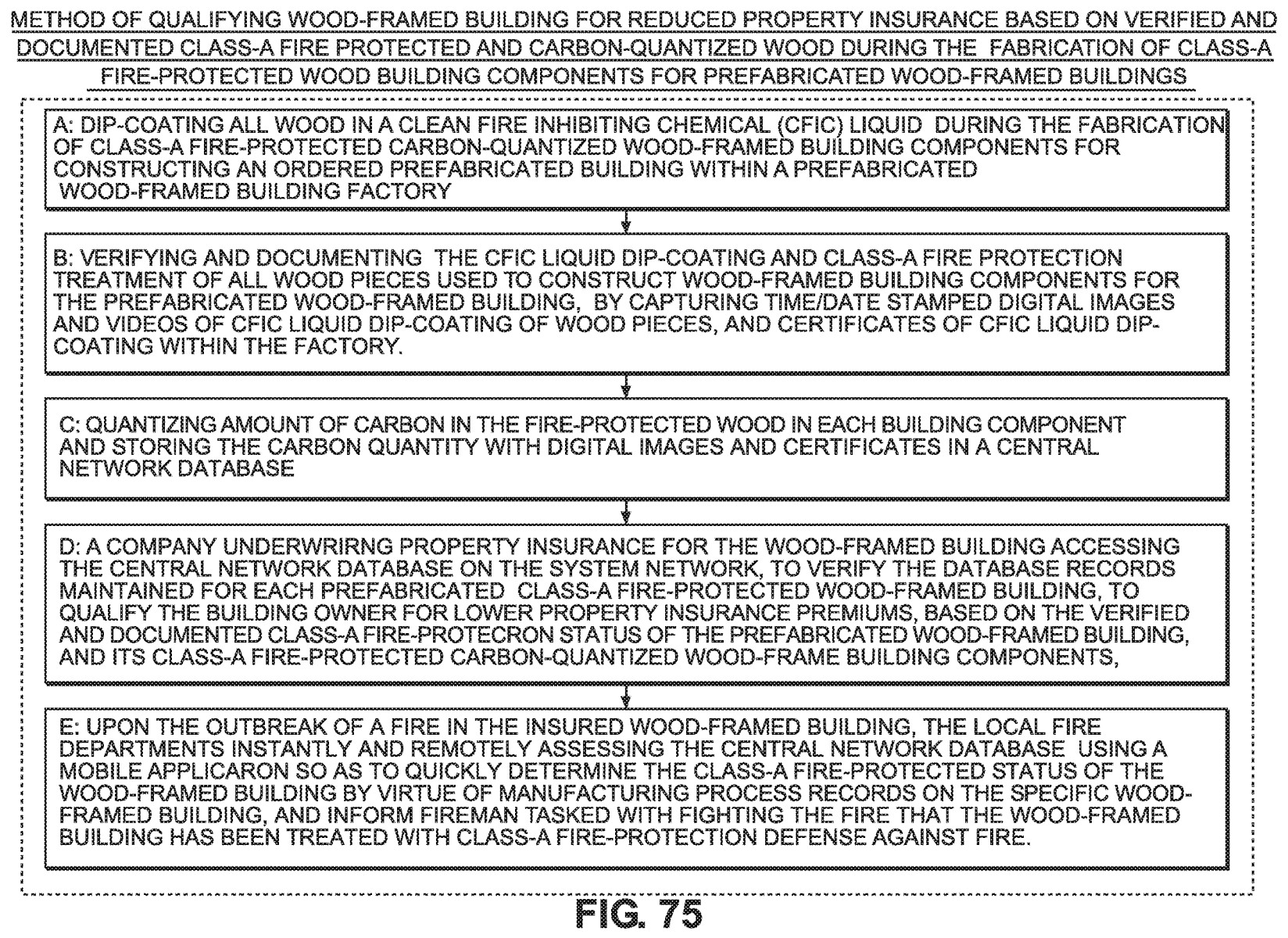

METHOD OF QUALIFYING WOOD-FRAMED BUILDING FOR REDUCED PROPERTY INSURANCE BASED ON VERIFIED AND DOCUMENTED CLASS-A FIRE PROTECTED AND CARBON-QUANTIZED WOOD DURING THE FABRICATION OF CLASS-A FIRE-PROTECTED WOOD BUILDING COMPONENTS FOR PREFABRICATED WOOD-FRAMED BUILDINGS

A: DIP-COATING ALL WOOD IN A CLEAN FIRE INHIBITING CHEMICAL (CFIC) LIQUID DURING THE FABRICATION OF CLASS-A FIRE-PROTECTED CARBON-QUANTIZED WOOD-FRAMED BUILDING COMPONENTS FOR CONSTRUCTING AN ORDERED PREFABRICATED BUILDING WITHIN A PREFABRICATED WOOD-FRAMED BUILDING FACTORY

↓

B: VERIFYING AND DOCUMENTING THE CFIC LIQUID DIP-COATING AND CLASS-A FIRE PROTECTION TREATMENT OF ALL WOOD PIECES USED TO CONSTRUCT WOOD-FRAMED BUILDING COMPONENTS FOR THE PREFABRICATED WOOD-FRAMED BUILDING, BY CAPTURING TIME/DATE STAMPED DIGITAL IMAGES AND VIDEOS OF CFIC LIQUID DIP-COATING OF WOOD PIECES, AND CERTIFICATES OF CFIC LIQUID DIP-COATING WITHIN THE FACTORY.

↓

C: QUANTIZING AMOUNT OF CARBON IN THE FIRE-PROTECTED WOOD IN EACH BUILDING COMPONENT AND STORING THE CARBON QUANTITY WITH DIGITAL IMAGES AND CERTIFICATES IN A CENTRAL NETWORK DATABASE

↓

D: A COMPANY UNDERWRIRNG PROPERTY INSURANCE FOR THE WOOD-FRAMED BUILDING ACCESSING THE CENTRAL NETWORK DATABASE ON THE SYSTEM NETWORK, TO VERIFY THE DATABASE RECORDS MAINTAINED FOR EACH PREFABRICATED CLASS-A FIRE-PROTECTED WOOD-FRAMED BUILDING, TO QUALIFY THE BUILDING OWNER FOR LOWER PROPERTY INSURANCE PREMIUMS, BASED ON THE VERIFIED AND DOCUMENTED CLASS-A FIRE-PROTECRON STATUS OF THE PREFABRICATED WOOD-FRAMED BUILDING, AND ITS CLASS-A FIRE-PROTECTED CARBON-QUANTIZED WOOD-FRAME BUILDING COMPONENTS,

↓

E: UPON THE OUTBREAK OF A FIRE IN THE INSURED WOOD-FRAMED BUILDING, THE LOCAL FIRE DEPARTMENTS INSTANTLY AND REMOTELY ASSESSING THE CENTRAL NETWORK DATABASE USING A MOBILE APPLICARON SO AS TO QUICKLY DETERMINE THE CLASS-A FIRE-PROTECTED STATUS OF THE WOOD-FRAMED BUILDING BY VIRTUE OF MANUFACTURING PROCESS RECORDS ON THE SPECIFIC WOOD-FRAMED BUILDING, AND INFORM FIREMAN TASKED WITH FIGHTING THE FIRE THAT THE WOOD-FRAMED BUILDING HAS BEEN TREATED WITH CLASS-A FIRE-PROTECTION DEFENSE AGAINST FIRE.

FIG. 75

WEIGHING CFIC LIQUID TOTES AT THE CFIC CHEMICAL FACTORY BEFORE SHIPMENT AND RECORDING TOTE WEIGHT IN SUPPLY CHAIN MANAGEMENT DATABASE

WEIGHING CFIC LIQUID TOTES AT BUILDING CONSTRUCTION JOB SITE, AND RECORDING TOTE WEIGHT IN SUPPLY CHAIN MANAGEMENT DATABASE BEFORE ACCEPTANCE

METHOD OF AND SYSTEM FOR MAINTAINING THE CHAIN OF CUSTODY AND QUALITY CONTROL WHEN PRODUCING AND SUPPLYING CLEAN FIRE INHIBITING CHEMICAL LIQUID IN TOTES FROM CHEMICAL FACTORY TO A NETWORK OF WOOD-FRAMED OR MASS TIMBER CONSTRUCTION PROJECTS

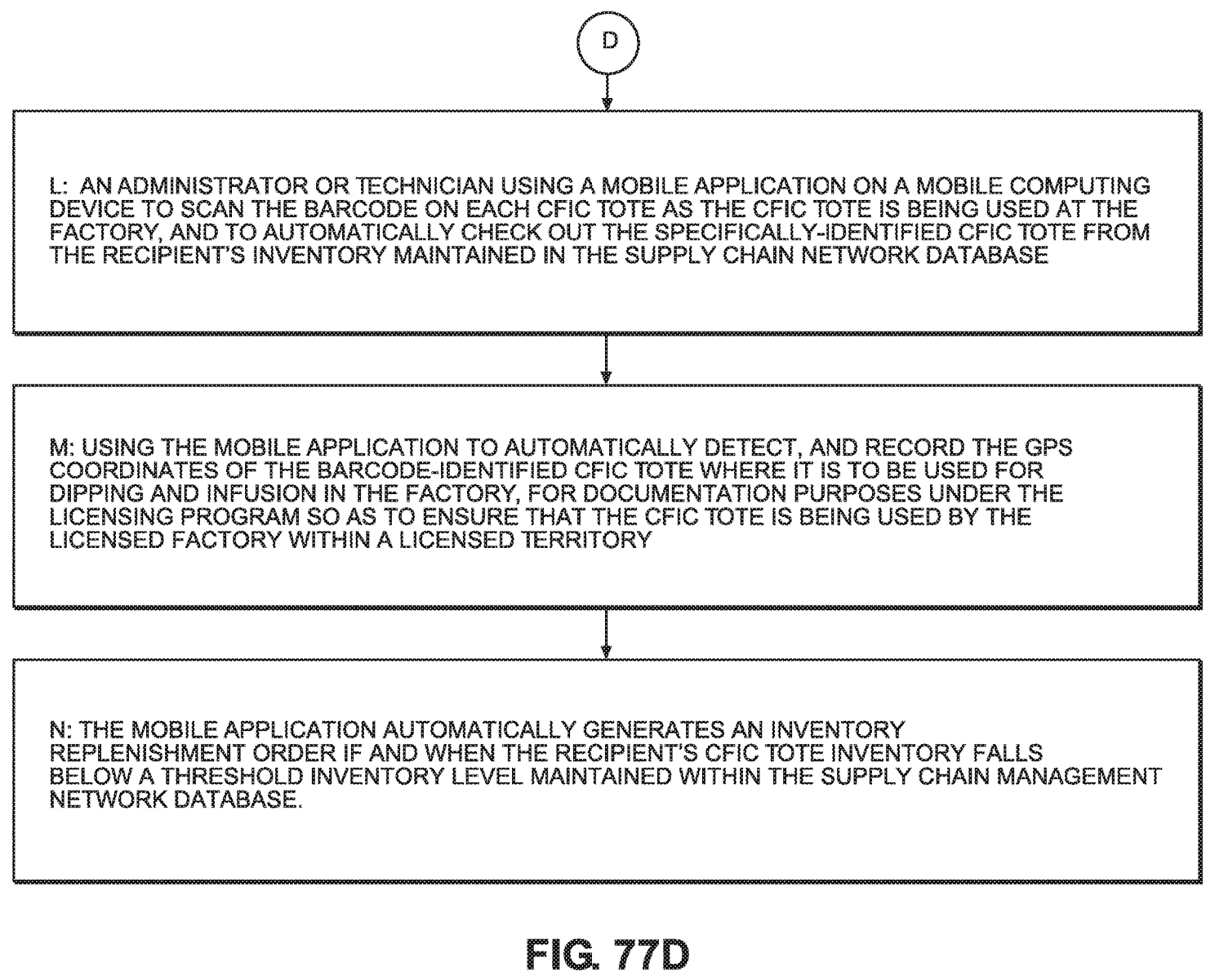

D

L: AN ADMINISTRATOR OR TECHNICIAN USING A MOBILE APPLICATION ON A MOBILE COMPUTING DEVICE TO SCAN THE BARCODE ON EACH CFIC TOTE AS THE CFIC TOTE IS BEING USED AT THE FACTORY, AND TO AUTOMATICALLY CHECK OUT THE SPECIFICALLY-IDENTIFIED CFIC TOTE FROM THE RECIPIENT'S INVENTORY MAINTAINED IN THE SUPPLY CHAIN NETWORK DATABASE

M: USING THE MOBILE APPLICATION TO AUTOMATICALLY DETECT, AND RECORD THE GPS COORDINATES OF THE BARCODE-IDENTIFIED CFIC TOTE WHERE IT IS TO BE USED FOR DIPPING AND INFUSION IN THE FACTORY, FOR DOCUMENTATION PURPOSES UNDER THE LICENSING PROGRAM SO AS TO ENSURE THAT THE CFIC TOTE IS BEING USED BY THE LICENSED FACTORY WITHIN A LICENSED TERRITORY

N: THE MOBILE APPLICATION AUTOMATICALLY GENERATES AN INVENTORY REPLENISHMENT ORDER IF AND WHEN THE RECIPIENT'S CFIC TOTE INVENTORY FALLS BELOW A THRESHOLD INVENTORY LEVEL MAINTAINED WITHIN THE SUPPLY CHAIN MANAGEMENT NETWORK DATABASE.

FIG. 77D

FIRST DATABASE RECORD WITHIN DATABASE SYSTEM

| Purchase Order # | Shipment Item # | Shipped Tote Weight (Lbs) | Shipping Date | GPS Coord. | Shipping Manifest # | Received Date | Weight Difference (Lbs) | Shipment Acceptance (No/Yes) |
|---|---|---|---|---|---|---|---|---|
| | | | | | | | | |
| | | | | | | | | |
| | | | | | | | | |
| | | | | | | | | |
| | | | | | | | | |
| | | | | | | | | |
| | | | | | | | | |
| | | | | | | | | |

FIG. 78A

SECOND DATABASE RECORD WITHIN DATABASE SYSTEM

| | | | | | | |
|---|---|---|---|---|---|---|
| Dealer ID# | | | | | | |
| CFIC Tote Shipments Received and Accepted | | | | | | |
| Quantity Of CFIC Totes In Inventory | | | | | | |
| Quantity of CFIC Totes Used | | | | | | |
| CFIC Totes In Inventory | | | | | | |
| CFIC Totes Out of Inventory | | | | | | |
| Low Inventory Notices | | | | | | |
| Auto CFIC Tote Shipment | | | | | | |
| Dealer CFIC Tote Inventory Reports | | | | | | |

FIG. 78B

GRAPHICAL USER INTERFACE OF THE MOBILE APPLICATION FOR USE BY PROJECT ADMINISTRATORS, MANAGERS, FABRICATORS AND TECHNICIANS, SHOWING THE HIGH-LEVEL MENU OF SERVICES

GRAPHICAL USER INTERFACE OF THE MOBILE APPLICATION FOR USE BY PROJECT ADMINISTRATOR ORDERING CHEMICAL SUPPLIES REQUIRED FOR PRODUCING CLASS-A FIRE-PROTECTED CARBON-QUANTIZED LUMBER OR WOOD-FRAMED BUILDING COMPONENTS

GRAPHICAL USER INTERFACE OF THE MOBILE APPLICATION FOR USE BY PROJECT ADMINISTRATOR ORDERING CHEMICAL SUPPLIES REQUIRED FOR PRODUCING CLASS-A FIRE-PROTECTED CARBON-QUANTIZED LUMBER OR WOOD-FRAMED BUILDING COMPONENTS

GRAPHICAL USER INTERFACE OF THE MOBILE APPLICATION FOR USE BY PROJECT ADMINISTRATOR ORDERING CHEMICAL SUPPLIES REQUIRED FOR PRODUCING CLASS-A FIRE-PROTECTED CARBON-QUANTIZED LUMBER OR WOOD-FRAMED BUILDING COMPONENTS

GRAPHICAL USER INTERFACE OF THE MOBILE APPLICATION FOR USE BY PROJECT ADMINISTRATOR ORDERING CHEMICAL SUPPLIES FOR PRODUCING CLASS-A FIRE-PROTECTED LUMBER OR COMPONENTS

GRAPHICAL USER INTERFACE OF THE MOBILE APPLICATION FOR USE BY PROJECT ADMINISTRATOR RECEIVING CHEMICAL SUPPLIES FOR PRODUCING CLASS-A FIRE-PROTECTED CARBON-QUANTIZED LUMBER AND/OR BUILDING COMPONENTS

GRAPHICAL USER INTERFACE OF THE MOBILE APPLICATION FOR USE BY PROJECT ADMINISTRATOR RECEIVING CHEMICAL SUPPLIES FOR PRODUCING CLASS-A FIRE-PROTECTED CARBON-QUANTIZED LUMBER AND/OR BUILDING COMPONENTS

GRAPHICAL USER INTERFACE OF THE MOBILE APPLICATION FOR USE BY PROJECT ADMINISTRATOR RECEIVING CHEMICAL SUPPLIES FOR PRODUCING CLASS-A FIRE-PROTECTED CARBON-QUANTIZED LUMBER OR COMPONENTS

GRAPHICAL USER INTERFACE OF THE MOBILE APPLICATION FOR USE BY PROJECT ADMINISTRATOR RECEIVING CHEMICAL SUPPLIES FOR A PRODUCING CLASS-A FIRE-PROTECTED CARBON-QUANTIZED LUMBER OR COMPONENTS

GRAPHICAL USER INTERFACE OF THE MOBILE APPLICATION FOR USE BY PROJECT ADMINISTRATOR RECEIVING CHEMICAL SUPPLIES FOR PRODUCING CLASS-A FIRE-PROTECTED CARBON-QUANTIZED LUMBER AND/OR COMPONENTS

GRAPHICAL USER INTERFACE OF THE MOBILE APPLICATION FOR USE BY A PROJECT ADMINISTRATOR TO REGISTER A CFIC TOTE FOR IN FACTORY USE DURING CLASS-A FIRE-PROTECTION OF CARBON-QUANTIZED LUMBER

GRAPHICAL USER INTERFACE OF THE MOBILE APPLICATION FOR USE BY A PROJECT ADMINISTRATOR TO CAPTURE FACTORY GPS COORDINATES OF THE REGISTERED CFIC TOTE

GRAPHICAL USER INTERFACE OF THE MOBILE APPLICATION FOR USE BY A PROJECT ADMINISTRATOR TO UPDATE THE CFIC TOTE INVENTORY FOR THE FACTORY

STAKEHOLDERS SUPPORTED BY THE MOBILE APPLICATION RUNNING ON MOBILE COMPUTING SYSTEMS DEPLOYED ACROSS THE CONSTRUCTION JOB-SITE FIRE-PROTECTION SPRAY SERVICE SYSTEM OF THE PRESENT INVENTION

Property Owner
Financial Institution
Building Construction Manager
Job Site Construction Manager
General Contractor
Building Architects
Job Site Construction Workers
Sales Representative
Logistics Coordinator
Supply Chain Manager
Job Site Spray Manager
Job Site Spray Technicians
Local Fire Department
Local Police Department
Local Building Inspectors
Local Neighbors
Construction Insurance Underwriter
Property/Building Insurance Underwriter
Risk Engineering Managers

FIG. 80A

METHOD OF ORDERING, DELIVERING, INSPECTING, DOCUMENTING AND MANAGING PROFESSIONAL CLASS-A FIRE-PROTECTION SPRAY SERVICES APPLIED TO CARBON-QUANTIZED WOOD-FRAMED AND MASS TIMBER BUILDINGS, USING MOBILE COMPUTING SYSTEMS DEPLOYED OVER WIRELESS COMMUNICATION NETWORKS

Figure 81D:
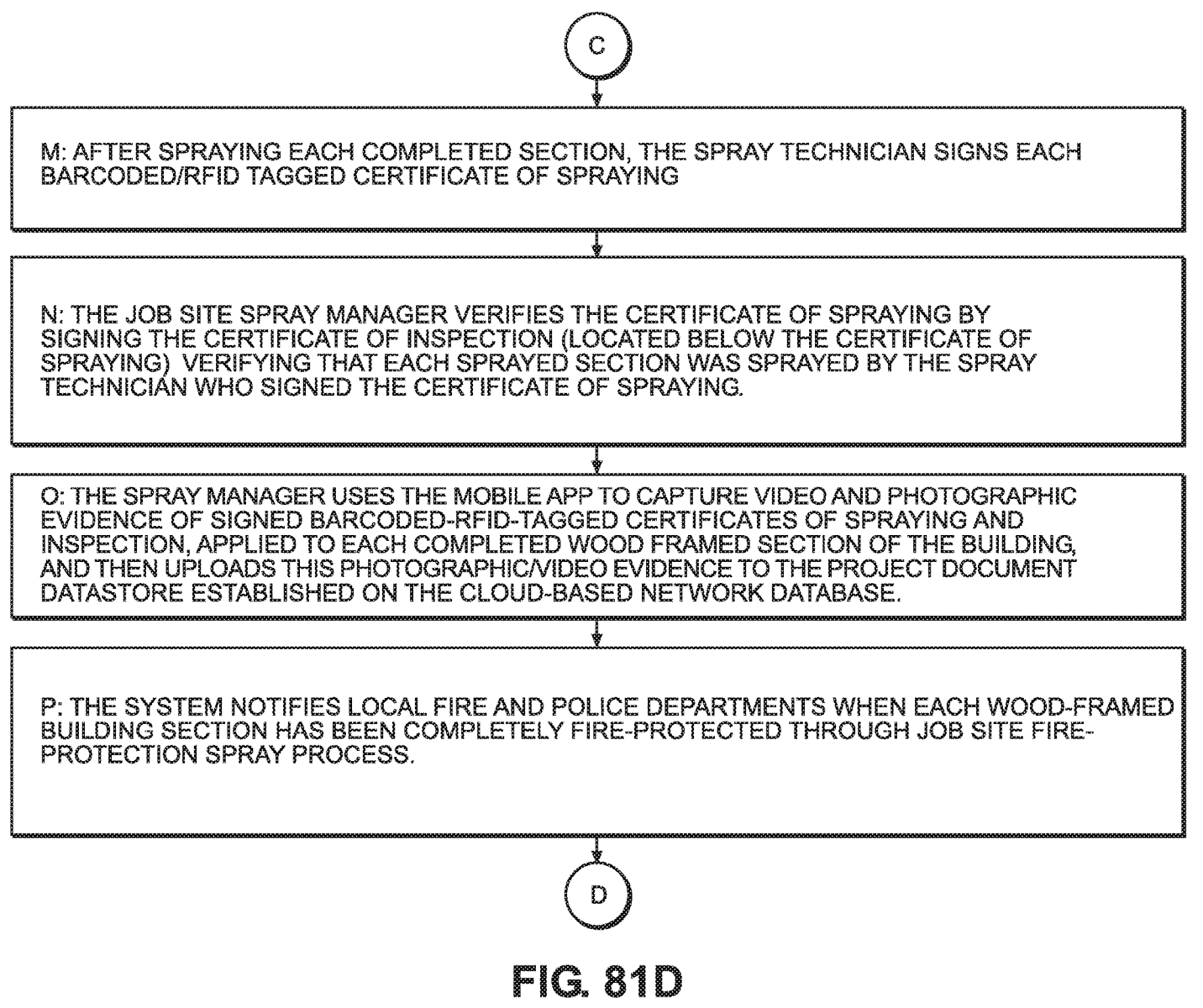

C

M: AFTER SPRAYING EACH COMPLETED SECTION, THE SPRAY TECHNICIAN SIGNS EACH BARCODED/RFID TAGGED CERTIFICATE OF SPRAYING

N: THE JOB SITE SPRAY MANAGER VERIFIES THE CERTIFICATE OF SPRAYING BY SIGNING THE CERTIFICATE OF INSPECTION (LOCATED BELOW THE CERTIFICATE OF SPRAYING) VERIFYING THAT EACH SPRAYED SECTION WAS SPRAYED BY THE SPRAY TECHNICIAN WHO SIGNED THE CERTIFICATE OF SPRAYING.

O: THE SPRAY MANAGER USES THE MOBILE APP TO CAPTURE VIDEO AND PHOTOGRAPHIC EVIDENCE OF SIGNED BARCODED-RFID-TAGGED CERTIFICATES OF SPRAYING AND INSPECTION, APPLIED TO EACH COMPLETED WOOD FRAMED SECTION OF THE BUILDING, AND THEN UPLOADS THIS PHOTOGRAPHIC/VIDEO EVIDENCE TO THE PROJECT DOCUMENT DATASTORE ESTABLISHED ON THE CLOUD-BASED NETWORK DATABASE.

P: THE SYSTEM NOTIFIES LOCAL FIRE AND POLICE DEPARTMENTS WHEN EACH WOOD-FRAMED BUILDING SECTION HAS BEEN COMPLETELY FIRE-PROTECTED THROUGH JOB SITE FIRE-PROTECTION SPRAY PROCESS.

Figure 81E:
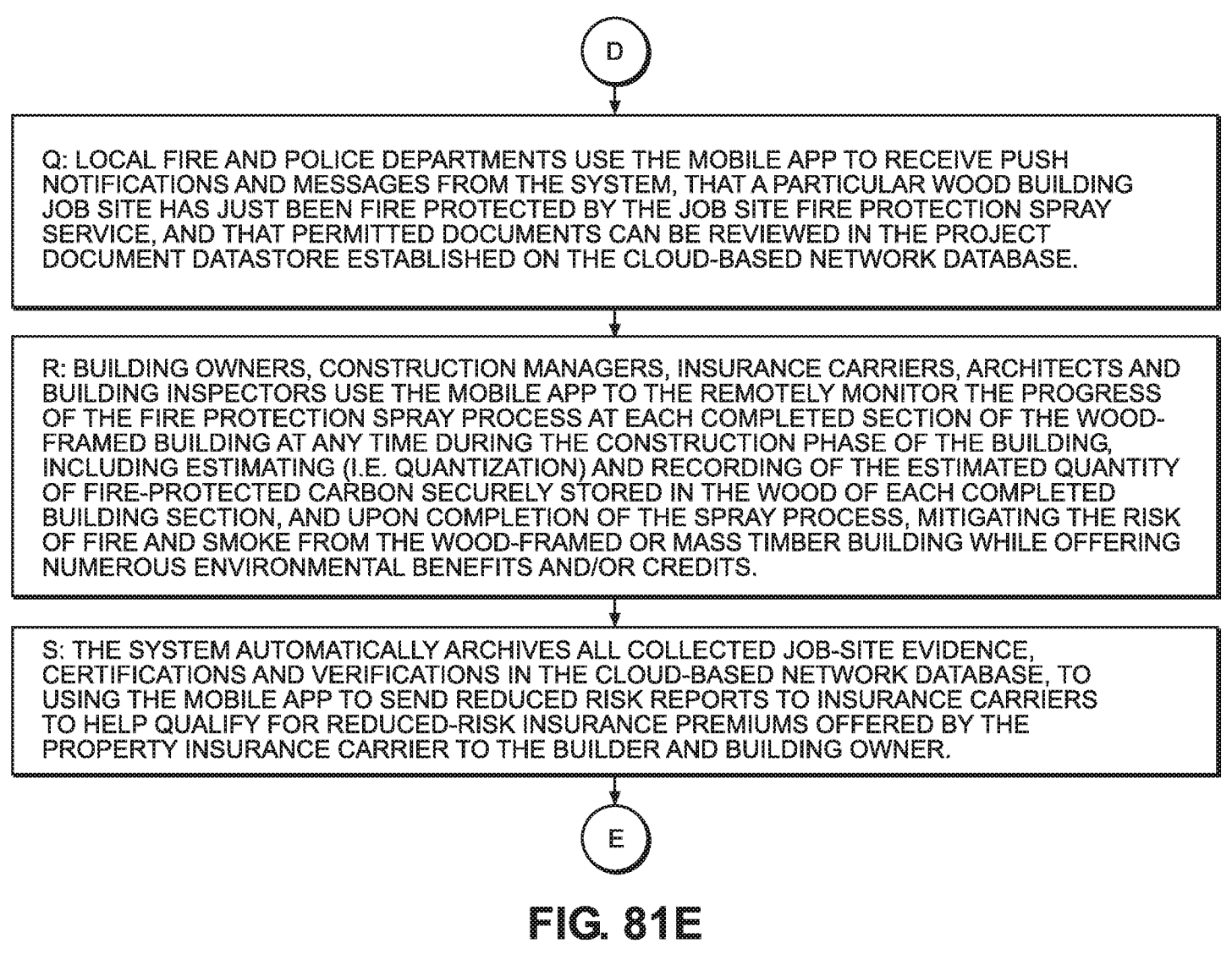

Q: LOCAL FIRE AND POLICE DEPARTMENTS USE THE MOBILE APP TO RECEIVE PUSH NOTIFICATIONS AND MESSAGES FROM THE SYSTEM, THAT A PARTICULAR WOOD BUILDING JOB SITE HAS JUST BEEN FIRE PROTECTED BY THE JOB SITE FIRE PROTECTION SPRAY SERVICE, AND THAT PERMITTED DOCUMENTS CAN BE REVIEWED IN THE PROJECT DOCUMENT DATASTORE ESTABLISHED ON THE CLOUD-BASED NETWORK DATABASE.

R: BUILDING OWNERS, CONSTRUCTION MANAGERS, INSURANCE CARRIERS, ARCHITECTS AND BUILDING INSPECTORS USE THE MOBILE APP TO THE REMOTELY MONITOR THE PROGRESS OF THE FIRE PROTECTION SPRAY PROCESS AT EACH COMPLETED SECTION OF THE WOOD-FRAMED BUILDING AT ANY TIME DURING THE CONSTRUCTION PHASE OF THE BUILDING, INCLUDING ESTIMATING (I.E. QUANTIZATION) AND RECORDING OF THE ESTIMATED QUANTITY OF FIRE-PROTECTED CARBON SECURELY STORED IN THE WOOD OF EACH COMPLETED BUILDING SECTION, AND UPON COMPLETION OF THE SPRAY PROCESS, MITIGATING THE RISK OF FIRE AND SMOKE FROM THE WOOD-FRAMED OR MASS TIMBER BUILDING WHILE OFFERING NUMEROUS ENVIRONMENTAL BENEFITS AND/OR CREDITS.

S: THE SYSTEM AUTOMATICALLY ARCHIVES ALL COLLECTED JOB-SITE EVIDENCE, CERTIFICATIONS AND VERIFICATIONS IN THE CLOUD-BASED NETWORK DATABASE, TO USING THE MOBILE APP TO SEND REDUCED RISK REPORTS TO INSURANCE CARRIERS TO HELP QUALIFY FOR REDUCED-RISK INSURANCE PREMIUMS OFFERED BY THE PROPERTY INSURANCE CARRIER TO THE BUILDER AND BUILDING OWNER.

AR-INSPECTION CHECKPOINT ICON DISPLAYED ALONG A VIRTUAL REALITY (VR) ENABLED FIRE-PROTECTION SPRAYING SERVICE INSPECTION WALK-THROUGH

AR-INSPECTION CHECKPOINT ICON DISPLAYED ALONG A VIRTUAL REALITY (VR) ENABLED FIRE-PROTECTION SPRAYING SERVICE INSPECTION WALK-THROUGH

300' AR-INSPECTION CHECKPOINT

SCHEMATIC REPRESENTATION OF A VIRTUAL REALITY (VR) ENABLED WALK THROUGH INPSECTION OF THE FIRE-PROTECTION SPRAY PROCESS APPLIED TO A FIRE-PROTECTED CARBON-QUANTIZED WOOD-FRAMED BUILDING ON A CONSTRUCTION JOB SITE

VIRTUAL FIRE-PROTECTION JOB-SITE INSPECTION PROCESS USING VIRTUAL REALITY (VR) AND AUGMENTED REALITY (AR) TECHNOLOGIES TO SUPPORT VIRTUAL INSPECTION OF A FIRE-PROTECTED JOB-SITE BASED ON A 3D VIRTUAL MODEL OF THE FIRE-PROTECTED WOOD-FRAMED BUILDING UNDER CONSTRUCTION

GRAPHICAL USER INTERFACE OF THE MOBILE APPLICATION FOR USE BY JOB SITE CONSTRUCITON WORKERS ENABLING THEM TO SEND EMERGENCY MESSAGES TO POLICE AND FIRE DEPARTMENTS WITH A SINGLE CLICK

GRAPHICAL USER INTERFACE OF THE MOBILE APPLICATION FOR USE BY JOB SITE CONSTRUCITON WORKERS ENABLING THEM TO SEND EMERGENCY MESSAGES TO POLICE AND FIRE DEPARTMENTS WITH A SINGLE CLICK

A SET OF PREFABRICATED FIRE-PROTECTED WOOD-FRAMED BUILDING PANELS MANAFACTURED IN A PREFABRICATED BUILDING PANEL FACTORY

A VIRTUAL REALITY (VR) ENABLED WALKTHROUGH INSPECTION OF PREFABRICATED FIRE-PROTECTED CARBON-QUANTIZED WOOD-FRAMED BUILDING (FACTORY-MANUFACTURED) COMPONENTS

VIRTUAL REALITY (VR) ENABLED WALK THROUGH INSPECTION OF THE FIRE-PROTECTION PROCESS APPLIED TO A PREFABRICATED WOOD-FRAMED BUILDING IN A FACTORY

Figure 89A:
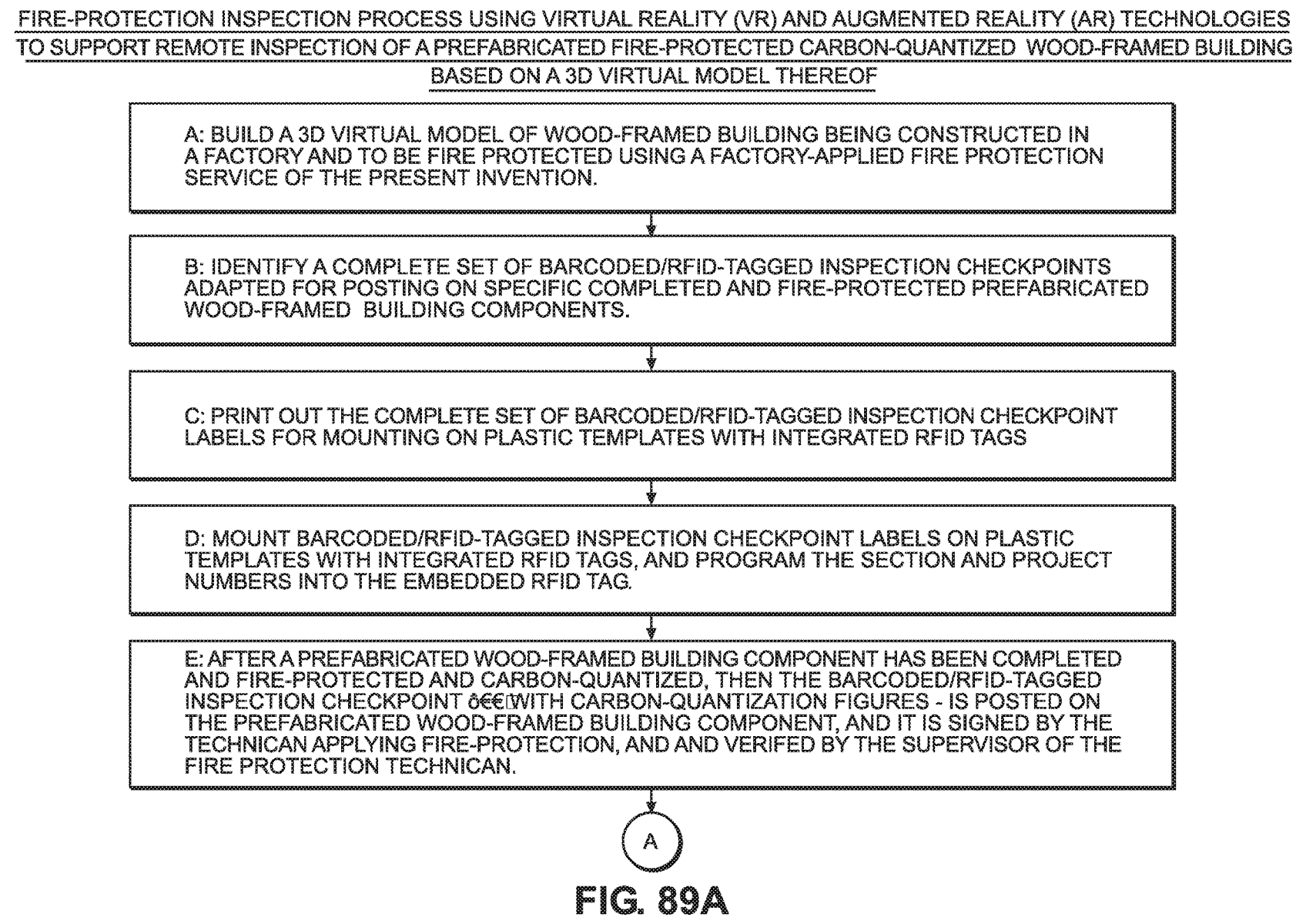

FIRE-PROTECTION INSPECTION PROCESS USING VIRTUAL REALITY (VR) AND AUGMENTED REALITY (AR) TECHNOLOGIES TO SUPPORT REMOTE INSPECTION OF A PREFABRICATED FIRE-PROTECTED CARBON-QUANTIZED WOOD-FRAMED BUILDING BASED ON A 3D VIRTUAL MODEL THEREOF

A: BUILD A 3D VIRTUAL MODEL OF WOOD-FRAMED BUILDING BEING CONSTRUCTED IN A FACTORY AND TO BE FIRE PROTECTED USING A FACTORY-APPLIED FIRE PROTECTION SERVICE OF THE PRESENT INVENTION.

↓

B: IDENTIFY A COMPLETE SET OF BARCODED/RFID-TAGGED INSPECTION CHECKPOINTS ADAPTED FOR POSTING ON SPECIFIC COMPLETED AND FIRE-PROTECTED PREFABRICATED WOOD-FRAMED BUILDING COMPONENTS.

↓

C: PRINT OUT THE COMPLETE SET OF BARCODED/RFID-TAGGED INSPECTION CHECKPOINT LABELS FOR MOUNTING ON PLASTIC TEMPLATES WITH INTEGRATED RFID TAGS

↓

D: MOUNT BARCODED/RFID-TAGGED INSPECTION CHECKPOINT LABELS ON PLASTIC TEMPLATES WITH INTEGRATED RFID TAGS, AND PROGRAM THE SECTION AND PROJECT NUMBERS INTO THE EMBEDDED RFID TAG.

↓

E: AFTER A PREFABRICATED WOOD-FRAMED BUILDING COMPONENT HAS BEEN COMPLETED AND FIRE-PROTECTED AND CARBON-QUANTIZED, THEN THE BARCODED/RFID-TAGGED INSPECTION CHECKPOINT ô€€WITH CARBON-QUANTIZATION FIGURES - IS POSTED ON THE PREFABRICATED WOOD-FRAMED BUILDING COMPONENT, AND IT IS SIGNED BY THE TECHNICAN APPLYING FIRE-PROTECTION, AND AND VERIFED BY THE SUPERVISOR OF THE FIRE PROTECTION TECHNICAN.

SYSTEM, NETWORK AND METHODS FOR ESTIMATING AND RECORDING QUANTITIES OF CARBON SECURELY STORED IN CLASS-A FIRE-PROTECTED WOOD-FRAMED AND MASS-TIMBER BUILDINGS ON CONSTRUCTION JOB-SITES, AND CLASS-A FIRE-PROTECTED WOOD-FRAMED AND MASS TIMBER COMPONENTS IN FACTORY ENVIRONMENTS

RELATED CASES

The present Patent application is a Continuation-in-Part (CIP) of U.S. application Ser. No. 15/952,183 entitled "METHOD OF AND SYSTEM FOR DELIVERING, CERTIFYING AND INSPECTING FIRE-PROTECTION PROVIDED TO WOOD-FRAMED AND MASS-TIMBER BUILDING CONSTRUCTION SITES, AND PREFABRICATED WOOD-FRAMED AND MASS TIMBER BUILDINGS AND COMPONENTS WITHIN A FACTORY" filed on Apr. 12, 2018, which is Continuation-in-Part (CIP) of copending U.S. patent application Ser. No. 15/921,617 filed Mar. 14, 2018 titled "SUPPLY CHAIN MANAGEMENT SYSTEM FOR SUPPLYING CLEAN FIRE INHIBITING CHEMICAL (CFIC) TOTES TO A NETWORK OF WOOD-TREATING LUMBER AND PREFABRICATION PANEL FACTORIES AND WOOD-FRAMED BUILDING CONSTRUCTION JOB SITE", which is a Continuation-in-Production (CIP) copending U.S. patent application Ser. No. 15/866,454 filed Jan. 9, 2018 titled "JUST-IN-TIME FACTORY METHODS, SYSTEM AND NETWORK FOR PREFABRICATING CLASS-A FIRE-PROTECTED WOOD-FRAMED BUILDINGS AND COMPONENTS USED TO CONSTRUCT THE SAME", and a Continuation-in-Part (CIP) of copending U.S. patent application Ser. No. 15/866,456 filed Jan. 9, 2018 titled "METHOD, SYSTEM AND NETWORK FOR VERIFYING AND DOCUMENTING CLASS-A FIRE-PROTECTION TREATMENT OF WOOD-FRAMED BUILDINGS USING ON-SITE SPRAYING OF CLEAN FIRE INHIBITING CHEMICAL LIQUID ON EXPOSED INTERIOR WOOD SURFACES OF THE WOOD-FRAMED BUILDINGS", which is a Continuation-in-Part (CIP) of copending application Ser. No. 15/829,914 filed Dec. 2, 2017 titled "METHODS AND APPARATUS FOR PRODUCING CLASS-A FIRE-PROTECTED WOOD PRODUCTS, AND DESIGNING AND CONSTRUCTING CLASS-A FIRE-PROTECTED WOOD-FRAMED BUILDINGS USING THE SAME", commonly owned by M-Fire Suppression, Inc., and incorporated herein by reference as if fully set forth herein.

BACKGROUND OF INVENTION

Field of Invention

The present invention is directed toward improvements in building construction, and more particularly, the prefabrication and construction of multi-story buildings made from wood, lumber and wood-based products, offering improved defense against fire, while mitigating the adverse effects of climate change caused by enhanced build-up of greenhouse gases about the Earth's atmosphere.

Brief Description of the State of Knowledge in the Art

The Earth's surface supports relatively mild and stable temperatures because its atmosphere contains a thin layer of gases that cover and protect the planet from solar radiation.

As illustrated in FIG. 1A, the Earth is constantly bombarded with enormous amounts of radiation, primarily from the sun. This solar radiation strikes the Earth's atmosphere in the form of visible light, plus ultraviolet (UV), infrared (IR) and other types of radiation that are invisible to the human eye. UV radiation has a shorter wavelength and a higher energy level than visible light, while IR radiation has a longer wavelength and a weaker energy level. According to NASA, about 30 percent of the radiation striking Earth's atmosphere is immediately reflected back out to space by clouds, ice, snow, sand and other reflective surfaces. The remaining 70 percent of incoming solar radiation is absorbed by the oceans, the land and the atmosphere. As they heat up, the oceans, land and atmosphere release heat in the form of IR thermal radiation, which passes out of the atmosphere and into space. It is this equilibrium of incoming and outgoing radiation that makes the Earth habitable, with an average temperature of about 59 degrees Fahrenheit (15 degrees Celsius). Without this atmospheric equilibrium, Earth would be as cold and lifeless as its moon, or as hot as Venus. The moon which has almost no atmosphere, is about minus 243 F (minus 153 C) on its dark side. Venus, on the other hand, has a very dense atmosphere that traps solar radiation and supports an average temperature of about 864 F (462 C).

The exchange of incoming and outgoing solar radiation that warms the Earth is often referred to as the "greenhouse effect" because a greenhouse works in much the same way. Incoming UV radiation from the Sun easily transmits through the glass walls of a greenhouse and is absorbed by the plants and hard surfaces inside. Weaker IR radiation, however, has difficulty transmitting through the glass walls and is trapped inside, thus warming the greenhouse. This effect lets tropical plants thrive inside a greenhouse, even during a cold winter.

As illustrated in FIG. 1B, carbon dioxide ($CO_2$) and other greenhouse gases act like a blanket, absorbing and preventing IR radiation from escaping into outer space. The net effect is the gradual heating of Earth's atmosphere and surface, a process known as global warming. These greenhouse gases include water vapor, $CO_2$, methane ($CO_4$), nitrous oxide ($N_2O$) and other gases, according to the Environmental Protection Agency (EPA).

The greenhouse effect, combined with increasing levels of greenhouse gases and the resulting global warming, is expected to have profound implications, according to a near-universal consensus of scientists. If global warming continues unchecked, it is believed that this will cause significant climate change, a rise in sea levels, increasing ocean acidification, extreme weather events and other severe natural and societal impacts, according to NASA, the EPA and other scientific and governmental bodies.

Many scientists today agree that excess greenhouse gases generated by mankind have caused damage to the Earth's atmosphere and climate, that is now past the point of no return. To many scientists, there are three options going forward: (i) do nothing and live with the consequences; (ii) adapt to the changing climate, which includes things like rising sea level and related flooding; or (iii) mitigate the impact of climate change by aggressively enacting policies that actually reduce the concentration of $CO_2$ in the atmosphere.

Those actively involved in the building design and construction industry can make a choice to use wood-based building materials over steel and concrete, wherever possible, to help sequester $CO_2$ in lumber and reduce the concentration of $CO_2$ in the atmosphere. Promoting the use of wood as a building material can be attractive to many, and could develop significant building trends, like building skyscrapers from mass timber building technologies, with proper amounts of concrete and steel, especially if there are adequate incentives put in place by the government.

To understand how $CO_2$ is collected and sequestered by growing trees and ultimately stored in lumber and wood products, it is important to understand how the element carbon is stored and cycled in trees, and for the life of wood products.

As illustrated in FIG. 3, elemental carbon is represented by the symbol 'C' and is the 6th element in the Periodic Table of Elements, with an atomic number of 6 and an atomic mass of 12.001. It is a non-metal and the fourth most abundant element in our solar system, only surpassed by hydrogen, helium and oxygen. Carbon can take the form of coal, charcoal, and diamonds, and also forms the major component of all living things, including plants and trees. At atmospheric pressure, carbon occurs naturally as either a solid or a gas. The melting/sublimation point of carbon is the highest of all naturally occurring elements at 3550° C.

Carbon is cycled through ecosystems in several different forms. It has a tendency to be attracted to oxygen and form gaseous compounds such as carbon dioxide ($CO_2$) and carbon monoxide (CO) which, in high concentrations, can be considered air pollutants and play a role in climate change. Carbon dioxide gas can be removed from the atmosphere by trees through photosynthesis. As illustrated in FIG. 4, this process involves plant cells converting the carbon from carbon dioxide to a solid form in sugars (the carbohydrates glucose and starch) that can be stored in leaves, stems, trunks, branches and roots, and contribute to tree growth. Oxygen is released back into the atmosphere as a by-product of photosynthesis which animals depend upon for survival. How carbon storage in trees and wood products occurs in nature is illustrated by the chemical formula for photosynthesis:

$$6CO2+12H2O+\text{photons}\rightarrow C6H12O6+6O2+6H2O$$

(carbon dioxide+water+light energy→glucose+oxygen+water).

Starch is also stored in reproductive tissue, including flowers, fruit, nuts, pods or cones, while glucose is used in respiration to help keep the tree alive. Cellulose illustrated in FIG. 4 is another sugar manufactured by the plant, and is particularly important in plant cell walls to help maintain structure and keep plants upright. Wood is around 40% cellulose.

As shown in FIG. 5, the Carbon Cycle demonstrates the various phases of carbon through living things, the soil, water and atmosphere. If the carbon cycle were in equilibrium, the rate at which carbon is removed from stores would equal the amount being taken out of the atmosphere. The current concern about the carbon cycle is that it is considered to be out of equilibrium in response to human intervention.

The burning of fossil fuels high in carbon has disturbed the natural balance of the cycle and enhanced the rate at which carbon is returned to the gas phase. This increase in carbon gas in the atmosphere, particularly as carbon dioxide CO2 and methane CH4, has been found to contribute to global warming and is referred to as the 'man-made greenhouse effect' discussed above, the process where greenhouse gases trap infrared radiation in the atmosphere and cause the earth to warm, as illustrated in FIGS. 1A and 1B.

Carbon constitutes approximately 50% the dry mass of trees and when wood from these trees is used to produce wood products, the carbon is stored for life in that product. For framing in our homes, this carbon storage life is around 100 years, around 30 years in furniture products, around 30 years in railroad ties, and around 6 years in pallets and paper. Carbon stored in wood is only released back to the atmosphere when the wood product is burnt or decays.

The amount of carbon in sawn timber logs can be calculated using average rates of recovery after processing which is estimated at around 35% for hardwoods such as eucalypts, and 50% for softwoods such as pine. The standard moisture content for air-dried timber (and wood products) is 12% which is equivalent to stating the 88% of moisture has been removed from the timber. To calculate the $CO_2$ in construction timber, one must ascertain the following variable parameters:

(i) the air dry mass of the timber log,
(ii) the percentage of moisture removed from the timber log, and
(iii) the recovery rate (% of carbon in timber after processing—estimated at around 35% for hardwoods such as eucalypts, and 50% for softwoods such as pine).

A reliable formula for estimating the quantity of $CO_2$ sequestered in construction timber [kg] is provided by the equation below:

CO2 sequestered in construction timber [kg]=air dry mass of saw log (kg)×88% (oven dry mass)×50% (carbon %)×3.67×recovery rate (%), where the factor of 3.67 is used to determine the equivalent amount of carbon dioxide from knowledge of the carbon figure.

Example

For a 150 kg white cypress saw log (softwood) seasoned in a timber yard then processed into square posts, the amount of carbon sequestered in the timber posts=150 kg×88%×50%×3.67×50%=84.8 kg carbon dioxide. To compute the quantity of carbon in the wood log [kg], simply divide 84.8 [kg] of carbon dioxide by the factor 3.67 to provide 22.98 [kg] of carbon.

When working with lumber beams of specified dimensions, the same mass-based carbon-estimating formula for timber logs recited above can be readily modified and adapted for with lumber beams of specified dimensions, EWPs of various types, mass timber panels, and wood-framed panels.

Clearly, the use of fire-protected wood products in the building construction industry can have a positive impact on $CO_2$ sequestration, and the mitigation of negative effects from climate change, and possibly driving the population in the right direction towards environmental sustainability.

Also, there is a clear and growing need for new and improved technologies that will enable enabling architects, builders and owners of wood-framed and mass timber buildings to account and receive proper credit for designing and building with $CO_2$-absorbing wood materials, over $CO_2$ producing materials such as concrete and steel, and thereby improve our living environment and provide viable pathways toward environmental sustainability and protection for future generations, supported by compelling economic incentives that will promote positive and life-supportive carbon-collecting industrial activity, while overcoming the shortcomings and drawbacks of prior art methods and apparatus.

OBJECTS AND SUMMARY OF THE PRESENT INVENTION

Accordingly, a primary object of the present is to provide new and improved method of and system for designing, prefabricating and constructing high-density wood-framed and mass timber buildings so that such buildings demonstrates Class-A fire-protection, while builders and owners are provided with knowledge of the quantity of carbon stored in the fire-protected wood, represented by fire-protected carbon units (FPCUs), certified by the system, while overcoming the shortcomings and drawbacks of prior art methods and apparatus.

Another object of the present invention is to provide a cloud-based (i.e. Internet-based) system, network and mobile devices for estimating and recording quantities of carbon securely stored in Class-A fire-protected wood-framed and mass-timber buildings on construction job-sites, and class-a fire-protected wood-framed and mass timber components in factory environments.

Another object of the present invention is to provide systems and methods for producing diverse kinds of Class-A fire-protected carbon-quantized wood products, including engineered wood products (EWPs), mass timber assemblies and buildings constructed therefrom, whose fire-protected carbon units (FPCUs) are registered on the cloud-based network of the present invention.

Another object of the present is to provide higher performance Class-A fire-protected carbon-quantized and labeled building products for use in wood-framed buildings for single-family, multi-family, multi-story, as well as light commercial construction markets.

Another object of the present is to provide a new and improved Class-A fire-protected carbon-quantized oriented strand board (OSB) sheathing comprising a core medium layer made of wood pump, binder and/or adhesive materials, a pair of OSB layers bonded to the core medium layer, a clean fire inhibiting chemical (CFIC) coatings deposited on the surface of each OSB layer and sides of the core medium layer, made from clean fire inhibiting chemical (CFIC) liquid solution applied to the surfaces by dipping the OSB sheathing into CFIC liquid in a dipping tank, allowing shallow surface infusion, absorption or impregnation into the OSB layers and ends of the core medium layer at atmospheric pressure, and thereafter, spraying a moisture, fire and UV radiation protection coating sprayed over the CFIC infusion, and a fire-protected carbon unit (FPCU) label certifying the mass quantity of fire-protected carbon stored in the Class-A fire-protected engineered wood product (EWP).

Another object of the present is to provide a Class-A fire-protected carbon-quantized floor truss structure for installation in a wood-framed building housing one or more occupants, comprising: a set of lumber pieces treated with clean fire inhibiting chemical (CFIC) liquid to provide each the lumber piece with a Class-A fire-suppression rating; and a set of heat-resistant metal truss connector plates for connecting the treated pieces of lumber together to form the fire-protected floor truss structure, with a fire-protected carbon unit (FPCU) label certifying the mass quantity of fire-protected carbon stored in the Class-A fire-protected engineered wood product (EWP); wherein each the heat-resistant metal truss connector plate is provided with a heat-resistant chemical coating deposited before the metal truss connector plate is used in constructing the fire-protected floor truss structure; and wherein the heat-resistant chemical coating provides significant reduction in heat transfer across the heat-resistant metal truss connector plate so as to significantly reduce (i) charring of wood behind the heat-resistant metal truss connector plate in the presence of a fire in the building, (ii) disconnection of the treated lumber pieces from the heat-resistant metal truss connector plate, and (iii) the risk of the fire-protected floor truss structure failing during fire in the wood-framed building, and any putting at risk, any of the occupants and any firemen trying to rescue the occupants and/or extinguish the fire in the wood-framed building.

Another object of the present is to provide a Class-A fire-protected carbon-quantized floor joist structure for installation in a wood-framed building housing one or more occupants, comprising: a floor joist made from lumber treated with clean fire inhibiting chemical (CFIC) liquid to provide the joist with a Class-A fire-suppression rating; and a set of heat-resistant metal joist hangers for hanging the treated joist in the wood-framed building to form the fire-protected floor joist structure and a fire-protected carbon unit (FPCU) label certifying the mass quantity of fire-protected carbon stored in the Class-A fire-protected engineered wood product (EWP); wherein each the heat-resistant metal joist hanger is provided with a heat-resistant chemical coating deposited before the metal joist hanger is used in constructing the fire-protected floor joist structure; and wherein the heat-resistant chemical coating provides significant reduction in heat transfer across the heat-resistant metal joist hanger so as to significantly reduce (i) charring of wood behind the heat-resistant metal joist hanger in the presence of a fire in the building, (ii) disconnection of the joist from the heat-resistant metal joist hanger or lumber to which the heat-resistant metal joist hanger is connected, and (iii) the risk of the fire-protected floor joist structure failing during fire in the wood-framed building, and any putting at risk, any of the occupants and any firemen trying to rescue the occupants and/or extinguish the fire in the wood-framed building.

Another object of the present is to provide a factory for making Class-A fire-protected carbon-quantized joist structures comprising: a first stage for dipping untreated lumber components in a dipping tank filled with clean fire inhibiting chemicals (CFIC) liquid to coat the untreated lumber components with liquid CFIC infusion and form a Class-A fire treated lumber components; a second stage for spraying metal joist hangers with heat-resistant chemical liquid to produce metal hanger joists having a heat-resistant coating; and a third stage for assembling the Class-A fire-protected lumber components together using the heat-resistant metal joist plates so as to produce Class-A fire-protected joist structures.

Another object of the present is to provide a method of producing a Class-A fire-protected carbon-quantized joist structure, comprising the steps: (a) producing a supply of water-based clean fire inhibiting chemical (CFIC) liquid; (b) filling a dipping tank with the supply of the water-based CFPC liquid; (c) filling a reservoir tank connected to a liquid spraying system with a quantity of heat-resistant chemical liquid; (d) dipping untreated joist lumber beams into the dipping tank so as to infuse CFIC liquid into the surfaces of each joist lumber beam and allowing the CFIC-coated joist lumber beam to dry so as to produce a Class-A fire-protected joist lumber beam; (e) using the liquid spraying system to coat metal joist hangers with heat-resistant chemical liquid in the reservoir tank, so as to produce heat-resistant metal joist hangers having a heat-resistant chemical coating, for use with the Class-A fire-protected joist lumber beams; (f) stacking and packaging one or more Class-A fire-protected joist lumber beams together into a bundle, using banding or other fasteners, and with the heat-resistant metal joist hangers, shipping the bundle and heat-resistant metal joist hangers to a destination site for use in construction of a wood-framed building; (g) assembling the Class-A fire-protected joist lumber beams using the heat-resistant metal joist hangers so as to make a Class-A fire-protected joist structure in the wood-framed building; and (h) labeling the joist structure with a fire-protected carbon unit (FPCU) label certifying the mass quantity of fire-protected carbon stored in the Class-A fire-protected joist structure.

Another object of the present is to provide a method of producing Class-A fire-protected carbon-quantized finger-jointed lumber from an automated factory having a production line with a plurality of stages, the method comprising the steps of: (a) providing a reservoir tank containing a supply of clean fire inhibiting chemical (CFIC) liquid that is supplied to a dipping tank deployed in an in-line high-speed CFIC liquid dip-infusion stage installed between (i) a lumber planing/dimensioning stage supplied by a finger-jointing stage, and (ii) an automated stacking, packaging, wrapping and banding stage installed at the end of the production line; (b) continuously loading a supply of untreated short-length lumber onto a multi-staged conveyor-chain transport mechanism installed along and between the stages of the production line; (c) loading the untreated short-length lumber into a controlled-drying stage so to produce suitably dried short-length lumber for supply to the finger-jointing stage; (d) continuously supplying controllably-dried short-length lumber into the finger-jointing stage for producing pieces of extended-length finger-jointed lumber in a highly-automated manner; (e) automatically transporting produced pieces of extended-length finger-jointed lumber into the planing/dimensioning stage, so that the finger-jointed lumber is planed/dimensioned into pieces of dimensioned finger-jointed lumber, and outputted onto the multi-stage chain-driven conveyor mechanism; (f) continuously transporting and submerging the dimensioned extended length finger-jointed lumber pieces through a dipping tank for sufficient infusion of CFIC liquid, while being transported on the conveyor-chain transport mechanism; (g) continuously removing the wet dip-coated pieces of dimensioned finger-jointed lumber from the dipping tank, and automatically wet-stacking, packing, banding and wrapping the dip-coated pieces together to produce a packaged bundle of fire-protected finger-jointed lumber while the CFIC liquid infusion in the dip-coated pieces of dimensioned finger-jointed lumber is still wet, and a fire-protected carbon unit (FPCU) label is provided to the pieces certifying the mass quantity of fire-protected carbon stored in the Class-A fire-protected finger-jointed lumber pieces; (h) removing the packaged bundle of fire-protected finger-jointed lumber from the stacking, packaging, wrapping and banding stage, and storing in a storage location and allowed to dry; and (i) painting the ends of each stacked and packaged bundle of fire-protected finger-jointed lumber, using a paint containing clean fire-inhibited chemicals (CFIC), and applying trademarks and/or logos to the packaged bundle of Class-A fire-treated finger-jointed lumber.

Another object of the present is to provide an automated lumber production factory comprising: a production line supporting a finger-jointing stage, a planing and dimensioning stage, a clean fire inhibiting chemical (CFIC) dip-infusion stage, and a stacking, packaging and wrapping stage, arranged in the order; wherein the production line supports an automated production process including the steps of: (a) continuously fabricating finger-jointed lumber pieces at the finger-jointing stage; (b) planing and dimensioning the finger-jointed lumber pieces at the planing and dimensioning stage; (c) after being planed and dimensioned, automatically conveying the finger-jointed lumber pieces from the planing and dimensioning stage to the CFIC dip-infusion stage in a high-speed manner; (d) dip-infusion the finger-jointed lumber pieces in a supply of clean fire inhibiting chemical (CFIC) liquid contained in a dipping tank maintained at the CFIC dip-infusion stage, so as to produce Class-A fire-protected carbon-quantized finger-jointed lumber pieces; and (e) stacking, packaging, wrapping and banding a bundle of the Class-A fire-protected finger-jointed lumber pieces, and providing a fire-protected carbon unit (FPCU) label on each piece certifying the mass quantity of fire-protected carbon stored in the Class-A fire-protected finger-jointed lumber piece.

Another object of the present is to provide such an automated lumber production factory, wherein each finger-jointed lumber piece is a finger-jointed lumber stud, and each bundle of Class-A fire-protected carbon-quantized finger-jointed lumber pieces is a bundle of Class-A fire-protected finger-jointed lumber studs for use in wood-framed building construction.

Another object of the present is to provide a novel in-line CFIC-liquid dip-infusion and spray-coating stage/subsystem for installation along a lumber production line in an automated lumber factory, for the rapid formation of a surface infusion along the surface of each piece of LVL product dipped into a reservoir of CFIC liquid, and then over-coated with a protective coating providing protection to moisture, UV radiation from the sun, and added fire-inhibition.

Another object of the present is to provide an automated factory system for producing Class-A fire-protected carbon-quantized laminated veneer lumber (LVL) products in a high volume manner comprising: a stage for continuously delivering clipped veneer to the front of the LVL production line; a veneer drying stage for receiving veneers from the supply and drying to reach a target moisture content; a conveyor for conveying the components and LVL products along subsequent stages of the production line; an automated veneer grading stage for automatically structurally and visually grading veneers; a veneer scarfing stage for scarfing veneer edges to a uniform thickness at the joints between veneers, during the subsequent laying-up stage and process; an adhesive application stage for applying adhesive to the veneers; a lay-up stage for lifting veneers onto the processing line, and stacking and skew aligning the veneers with adhesive coating until they are laid up into a veneer mat; a pre-pressing stage for pressing the veneer mat together; a hot-pressing and curing stage for continuous hot pressing the veneer mat; a cross-cutting and rip sawing stage for cross-cutting and rip sawing the veneer mat into LVL products (e.g. studs, beams, rim boards and other dimensioned LVL products); a print-marking system for marking each piece of LVL product with a logo and grade for clear visual identification; a CFIC liquid dip-infusion stage having a dipping reservoir through which the chain-driven conveyor transports LVL product into the dipping reservoir and along its length while submerged under CFIC liquid during dip-infusion operations, to form a CFIC infusion along the surfaces of the LVL product, and removing the CFIC-coated LVL product from the dipping reservoir and wet-stacking and allow to dry; spray-coating a protective-coating over the surface of the dried dip-coated LVL product, and transporting the LVL product to the next stage along the production line; and a packaging and wrapping stage for stacking, packaging and wrapping the spray-coated/dip-coated LVL product, so that each fire-protected LVL product is provided with a fire-protected carbon unit (FPCU) label certifying the mass quantity of fire-protected carbon stored in the Class-A fire-protected LVL product.

Another object of the present is to provide such a new lumber factory supporting an automated laminated veneer lumber (LVL) process comprising the steps of: (a) installing and operating a lumber production line employing a controlled drying stage, a veneer grading stage, a veneer scarfing stage, a veneer laying-up stage, a veneer laying-up stage, a pre-pressing stage, a hot-pressing and curing stage, a cross-cutting and rip-sawing stage, an automated in-line dip-infusion and spray-coating stage, a print-marking and paint spraying stage, and an automated packaging and wrapping stage, installed along the lumber production line in named order; (b) continuously providing a supply clipped veneers onto a conveyor installed along the lumber production line; (c) continuously providing the veneers to the controlled drying stage so to produce suitably dried veneers for supply to the veneer grading stage; (d) scarfing dried veneers at the veneer scarfing stage to prepare for the veneer laying-up stage where the leading and trailing edges of each sheet of veneer are scarfed to provide a flush joint when the veneer sheets are joined together at the laying-up stage; (e) applying adhesive material to scarfed veneers prior to the veneer laying-up stage; (f) vacuum lifting veneers onto the processing line and stacked and skew aligned with adhesive coating until the veneers are laid up into a veneer mat of a predetermined number of veneer layers; (g) pressing together the veneer mat at the pre-pressing stage; (h) hot pressing the veneer mat in a hot-pressing/curing machine to produce an LVL mat at the hot-pressing and curing stage; (i) cross-cutting and rip-sawing the produced LVL mat into LVL products (e.g. studs, beams, rim boards and other dimensioned LVL products) at the cross-cutting and rip sawing stage; (j) marking each piece of LVL product with a branded logo and grade for clear visual identification at the print-marking and paint spraying stage; (k) continuously transporting and submerging the cross-cut/rip-sawed LVL product through a dipping reservoir containing clean fire inhibiting chemical (CFIC) liquid, at the dip-infusion stage and then wet stacking and allowed to dry; (l) continuously spray-coating the dip-coated LVL products with a protective coating at a spray-coating stage to produce Class-A fire-protected LVL products on the production line; and (m) stacking, packaging and wrapping the Class-A fire-protected LVL product at the stacking, packaging and wrapping stage, so that each Class-A fire-protected LVL product is provided with a fire-protected carbon unit (FPCU) label certifying the mass quantity of fire-protected carbon stored in the Class-A fire-protected LVL product.

Another object of the present is to provide new and improved Class-A fire-protected carbon-quantized oriented strand board (OSB) sheeting, spray-coated with clean fire inhibiting chemical (CFIC) liquid, and provided with a fire-protected carbon unit (FPCU) label certifying the mass quantity of fire-protected carbon stored in the Class-A fire-protected OSB sheet.

Another object of the present is to provide new and improved Class-A fire-protected carbon-quantized oriented strand board (OSB) Hoist spray-coated with clean fire inhibiting chemical (CFIC) liquid.

Another object of the present is to provide a new and improved Class-A fire-protected carbon-quantized lumber roof trusses spray-coated with clean fire inhibiting chemical (CFIC) liquid.

Another object of the present is to provide new improved Class-A fire-protected carbon-quantized lumber top chord bearing floor truss (TCBT) structure, spray-coated with clean fire inhibiting chemical (CFIC) liquid.

Another object of the present is to provide a new and improved Class-A fire-protected carbon-quantized lumber floor joist structure, spray-coated with clean fire inhibiting chemical (CFIC) liquid.

Another object of the present invention is to provide a new and improved on-job-site method of spray treating wood, lumber, and engineered wood products (EWPs) with clean water-based fire inhibiting chemical (CFIC) that cling to the raw lumber and EPWs and acts as a flame inhibitor, preservative and water repellent, while improving the building's defense against both accidental fire and arson attack, and reducing the risk of fire to neighboring buildings should a fire occur in a wood frame building under construction.

Another object of the present invention is to provide new and improved engineered wood products (EWP) using clean fire suppression technologies to protect lumber and sheathing, without the shortcomings and drawbacks associated with pressure treatment methods which are well known to destroy wood fibers, and lower the strength and performance of such wood products.

Another object of the present invention is to provide a new and improved system for defending high-density multi-story wood-framed buildings from fire during the design and construction phase, so that the risks of wood-framed building burning down due to fire during construction is substantially mitigated to the benefit of all parties.

Another object of the present invention is to provide an Internet-based (i.e. cloud-based) system for verifying and documenting Class-A fire-protection treatment and carbon-quantization of a wood-framed building using on-site spraying of a clean fire inhibiting chemical (CFIC) liquid, comprising (i) a data center with web, application and database servers for supporting a web-based site for hosting images of certificates stamped on spray-treated wood surfaces, and other certification documents, and (ii) mobile smart-phones used to capture digital photographs and video recording of spray-treated wood-framed building sections during the on-site fire-protection spray process, and uploading the captured digital images to the data center, for each spray treatment project, so that insurance companies, builders, and other stakeholders can review such on-site spray completion certifications, as well as fire-protected carbon unit (FPCU) quantization, labeling and certification, during the building construction phase of the wood-framed building.

Another object of the present invention is to provide such an Internet-based system for verifying and documenting Class-A fire-protection spray-applied treatment and carbon-quantization of a wood-framed building, wherein mobile client computing systems provided with a mobile application are used by on-site class-A fire-protection spray administrators and technicians capturing audio-video (AV) recordings of completed sections of the wood-framed building relating to projects during the construction phase so as to verify and document proper Class-A fire-protection of the wood surfaces employed therein, as well as certify and document proper quantity of fire-protected carbon unit (FPCUs) stored in the Class-A fire protected wood elements used to construct the completed wood-framed building.

Another object of the present invention is to provide such an Internet-based system for verifying and documenting Class-A fire-protection spray-applied treatment and carbon-quantization of a wood-framed building, wherein mobile client computing systems provided with a mobile application are used by property owners/building, insurance companies, and other stakeholders for tracking and managing projects involving on-site clean fire inhibiting chemical (CFIC) liquid spray treatment of wood-framed buildings during the construction phase so as to ensure Class-A fire-protection of the wood employed therein, as well as certify and document proper quantity of fire-protected carbon unit (FPCUs) stored in the Class-A fire protected wood elements used to construct the completed wood-framed building.

Another object of the present invention is to provide a just-in-time (JIT) wood-framed building factory system for prefabricating wood-framed buildings in response to customer orders, wherein the factory system supports multiple production lines for producing Class-A fire-protected carbon-quantized wood-framed components including wall panels, floor panels, stair panels, floor trusses, roof trusses, and prefabricated roof sections, as needed, for use in constructing the custom or specified fire-protected wood-framed building components, each of which is identified by a barcoded/RFID-tag, and delivered in an RFID-tagged container, to a destination property location where the prefabricated wood-framed building is to be constructed.

Another object of the present invention is to provide an Internet-based system network supporting a just-in-time (JIT) wood-framed building factory system, comprising (i) the just-in-time wood-framed building factory with multiple production lines for producing Class-A fire-protected carbon-quantized building components, (ii) GPS-tracked ISO-shipping containers and code symbol/RFID tag reading mobile computing system, and (iii) a data center for factory system and supporting a network of mobile computing devices running a mobile application adapted to help track and manage orders for prefabricated Class-A fire-protected wood-framed buildings, and projects involving the same.

Another object of the present invention is to provide such an Internet-based system network for a just-in-time prefabrication wood-framed building factory system, wherein mobile client computing systems, supporting a mobile application are used by project administrators to track and manage customer orders for prefabricated wood-framed buildings, and related projects involving just-in-time fabrication of Class-A fire-protected carbon-quantized wood-framed building components for these ordered wood-framed buildings.

Another object of the present invention is to provide such an Internet-based system network for a just-in-time prefabrication wood-framed building factory system, wherein mobile client computing systems, supporting a mobile application are used by customers to track and manage their orders and related projects involving just-in-time fabrication of Class-A fire-protected carbon-quantized wood-framed building components for ordered prefabricated wood-framed buildings.

Another object of the present invention is provide a new and improved method of fire protecting multi-story wood-framed buildings from fire, by spraying coating, on the job site, before gypsum and wall board is installed over the framing, a clean fire inhibiting chemical (CFIC) liquid over all exposed surfaces of all lumber and wood products used in the construction of the building, with that treats the raw lumber to become Class-A fire-protected, and subsequently, carbon-quantized and labeled with the quantity of fire-protected carbon units (FPCUs) stored in the fire-protected wood-framed building.

Another object of the present is to provide a new and improved method of protecting wood-framed buildings from interior fires by spraying all exposed wood surfaces with clean fire inhibiting chemical (CFIC) liquid so as to achieve A-Class fire-protection throughout the entire wood-framed building, and subsequently carbon quantized, GPS-indexed and certified on a globally accessible information network.

Another object of the present invention is to provide a novel system and method of protecting multi-story wood-framed buildings against fire, when such structures are most vulnerable during the construction stage, involving the spraying of clean fire inhibiting chemical (CFIC) liquid over all interior surfaces of a wood-framed building being treated, including raw untreated lumber, EWPs, OSB sheathing, plywood, composite boards, structural composite lumber and other materials, and tracking and certifying that each completed section of the wood-framed building was properly spray coated with the environmentally clean fire inhibiting chemical, and has achieved Class-A fire-protection and subsequently provided with carbon quantization, labeling and certification.

Another object of the present invention is to provide a novel method of spray treating all surfaces of new raw/untreated and treated lumber and sheathing used to construct wood-framed multi-story buildings, using clean fire inhibiting chemicals (CFIC) that cling to the surface of wood during spray application and inhibit the start or ignition of a fire as well as fire progression and flame spread, wherein the fire inhibitor can be sprayed using a back-pack sprayer, or floor-supported pump sprayer system.

Another object of the present invention is to provide a novel method of spray treating all surfaces of lumber and sheathing used to construct wood-framed multi-story buildings, during framing and sheathing operations, floor by floor, with minor impact to the construction schedule, while minimizing the builder's risk of fire, making fire-protecting and carbon-quantizing 100% of the lumber in a building affordable.

Another object of the present is to provide an on-job-site spray system for coating of clean fire inhibiting liquid chemical (CFIC) liquid all over the interior surfaces of raw and treated lumber and sheathing used in a completed section of a wood-framed assemblies in a wood-framed building during its construction phase, wherein the on-job-site spray system comprises: a liquid spray pumping subsystem including a reservoir tank for containing a supply of CFIC liquid for spray-coating and treating wood surfaces to provide Class-A fire-protection within the wood-framed building; a hand-held liquid spray gun, operably connected to the reservoir tank using a sufficient length of flexible tubing, for holding in the hand of a spray-coating technician, and spraying CFIC liquid from the reservoir tank onto the exposed interior wood surfaces of lumber and sheathing used to construct each completed section of a wood-framed building construction, so as to form a CFIC coating on the treated interior wood surfaces providing Class-A fire-protection; and a spray-certification system for visually marking and certifying the exposed interior wood surfaces of each completed section of the wood-framed building construction has been properly spray-coated to provide Class-A fire-protection within each completed section of the wood-framed building, and carbon quantization of the carbon securely stored in the fire-protected wood.

Another object of the present invention is to provide a new and improved wireless information storage and retrieval system for remotely managing the spray-based Class-A fire-protection of wood-framed buildings by capturing and storing in a central network database system, under the spray project, (i) digital images and videos of the job-site spray process and certificates of completion stamped on completed wood-framed sections of the job-site that have been sprayed with Class-A fire-protective coating, and (ii) various kinds of documentation of events relating to the chain-of-custody of clean fire inhibiting chemical (CFIC) liquid materials blended at a remote location, shipped to the job-site, and then mixed with water to produce an aqueous-based CFIC liquid solution for use in on-site spraying of all exposed wood surfaces on the interior of the wood-framed building being spray-protected against fire.

Another object of the present invention is to provide such as a new and improved wireless information storage and retrieval system, wherein mobile applications are installed and run on a network of mobile computing devices to support a wide array of services provided to project administrators, spray-technicians and building owners, managers and insurance underwriters to help manage, monitor and review on-site Class-A fire-protection spray processes, and fire-protected carbon quantization audits conducted under building-specific projects managed on the system.

Another object of the present invention is to provide such as a new and improved wireless information storage and retrieval system, wherein the mobile application can be used by building/property owners, insurance companies, and other stakeholders, showing a menu of high-level services supported by the system network of the present invention.

Another object of the present invention is to provide such as a new and improved wireless information storage and retrieval system, wherein the mobile application supports a high-level menu of services for use by on-site fire-protection spray administrators and technicians supported by the system network of the present invention.

Another object of the present invention is to provide such as a new and improved wireless information storage and retrieval system, wherein the mobile application can be used by customers who place orders for prefabricated Class-A fire-protected carbon-quantized wood-framed buildings using the system network of the present invention, with the option of also ordering on-site spraying of CFIC liquid over all exposed interior surfaces of Class-A fire-protected prefabricated wood-framed building after construction, so as to provide a double-layer of fire-protection and defense.

Another object of the present invention is to provide such as a new and improved wireless information storage and retrieval system, wherein the mobile application can be used by project administrators, managers, fabricators and technicians showing a high-level menu of services supported by the system network of the present invention.

Another object of the present invention is to providing new and improved methods of and apparatus for protecting wood-framed buildings from wild fires by automatically spraying water-based environmentally clean fire inhibiting chemical (CFIC) liquid over the exterior surfaces of the building, surrounding ground surfaces, shrubs, decking and the like, prior to wild fires reaching such buildings.

Another object of the present invention is to provide a new and improved supply chain management system for supplying clean fire inhibiting chemical (CFIC) totes to a network of wood-treating lumber and prefabrication panel factories and wood-framed building construction job sites.

Another object of the present invention is to provide new and improved method of managing supply chain management operations associated with shipping clean fire inhibiting chemical (CFIC) material in locked CFIC totes from a chemical factory or warehouse to a shipping destination for use in treating wood to provide said treated wood with Class-A fire protection.

Another object of the present invention is to provide new and improved cloud-based system network for managing supply chain operations associated with shipping clean fire inhibiting chemical (CFIC) totes from a chemical factory or warehouse to a shipping destination for use in treating wood to provide said treated wood with Class-A fire protection.

Another object of the present invention is to provide such a method and cloud-based system network, wherein a data center with web, application and database servers supporting one or more mobile applications running on a plurality of mobile computing devices, wherein the one or more mobile applications are configured for supporting various functions on said cloud-based system network.

Another object of the present invention is to provide such a method and cloud-based system network, wherein a purchase order is issued for shipment of a quantity of clean fire inhibiting chemical (CFIC) liquid to shipping destination, for use in treating wood to provide the treated wood with Class-A fire protection services and carbon-quantization services.

Another object of the present invention is to provide such a method and cloud-based system network, wherein the purchase order is received and processed to determine a shipment of CFIC totes required to fulfill the purchase order, and then one or more CFIC totes containing CFIC powder or liquid are procured either by (i) blending CFIC power and/or liquid and then filling up and sealing one or more CFIC totes, and/or (ii) removing one or more CFIC totes containing CFIC material, and from an inventory maintained in a warehouse.

Another object of the present invention is to provide such a method and cloud-based system network, wherein barcoded shipping labels are generated for the shipment of CFIC totes, wherein the shipping labels include the purchase order identification number contained in the purchase order, and the barcoded shipping labels are applied on the shipment of CFIC totes.

Another object of the present invention is to provide such a method and cloud-based system network, wherein before shipping the barcoded CFIC totes to the shipping designation, each barcoded shipping label is scanned, then each CFIC tote is weighed and the measured weight is recorded in a supply chain management database, and thereafter, each barcoded CFIC tote is shipped to the shipping designation.

Another object of the present invention is to provide such a method and cloud-based system network, wherein each shipped barcoded CFIC tote is received at the shipping destination site, the barcoded shipping label on the CFIC tote is scanned, the supply chain management database is accessed, the weight of the scanned barcoded CFIC tote is measured and its GPS coordinates are captured, and then the measured weight and GPS coordinates are uploaded and recorded in the supply chain management database.

Another object of the present invention is to provide such a method and cloud-based system network, wherein at the shipping destination, the weights of each shipped barcoded CFIC tote are compared, and the following rules are applied: (i) if the weight difference is within a predetermined threshold, then the received barcoded CFIC totes in the shipment are accepted and the shipment acceptance is indicated in the supply chain management database; and (ii) if the weight difference is above the predetermined threshold, then the received barcoded CFIC tote in the shipment is rejected, and the shipment rejection is indicated in the supply chain management database.

Another object of the present invention is to provide such a method and cloud-based system network, wherein in the event the CFIC tote weight measurement is within the predetermined threshold, each barcoded CFIC tote is registered as being added to the recipient's inventory maintained within the supply chain management database.

Another object of the present invention is to provide such a method and cloud-based system network, wherein one or more of the received barcoded CFIC totes are transported from the shipping destination to a particular building construction job site where a wood-framed building is under construction.

Another object of the present invention is to provide such a method and cloud-based system network, wherein the barcode on each barcoded CFIC tote is scanned as the barcoded CFIC tote is being used on the building construction job site, and automatically checking out the read barcoded CFIC tote from the recipient's inventory being maintained in the supply chain management database.

Another object of the present invention is to provide such a method and cloud-based system network, wherein the GPS coordinates of the barcode-identified CFIC tote are captured where it is to be used and spray-applied on the building construction job site, and the GPS coordinates are recorded for documentation purposes so as to ensure that the CFIC tote is being used by the recipient within a licensed territory.

Another object of the present invention is to provide such a method and cloud-based system network, wherein an inventory replenishment order is generated if and when the recipient's CFIC tote inventory is determined to fall below a threshold inventory level maintained by the supply chain management network database.

Another object of the present invention is to provide such a method and cloud-based system network, wherein a mobile application is used to support the comparison of the weights of each shipped barcoded CFIC tote.

Another object of the present invention is to provide a new and improved method of and system for ordering, delivering and managing a construction job site fire-protection spray service across a network of wood-framed or mass timber building construction projects.

Another object of the present invention is to provide a novel method of providing fire-protection liquid spray service, and network-supported carbon quantization services, to a wood-framed or mass timber building during construction at a job site, using a plurality of mobile computing systems deployed over a wireless communication network associated with a system network, wherein the method comprises steps of: creating a spray project on the job site; establishing a project document datastore on a network database, operably connected to the wireless communication network; assigning a project logistics coordinator to the project; the project logistics coordinator using a mobile computing system to assign a team of job site spray administrators and technicians to the project; a job site construction manager using a mobile computing system to upload building floor plans and specifications to a folder in the project document datastore established on the network database; the job site construction manager using one the mobile computing system to (i) mark the building floor plans to identify the wood-framed building section that has been completed, and ready for the fire protection liquid spray service, and (ii) request the system network to deliver the fire protection liquid spray service on the identified section of the wood-framed building has been complete; a supply chain manager using one the mobile computing system to ship clean fire inhibiting chemical (CFIC) liquid to the job site in barcoded/RFID-tagged totes; and the job site construction manager uses one the mobile computing system to (i) produce barcoded/RFID-tagged inspection certificates for inspection points within each completed wood-framed section to receive the fire protection liquid spray service, and (ii) then post the barcoded/RFID-tagged inspection certificates at appropriate inspection points within the completed wood-framed section, prior to delivery of the fire protection liquid spray service.

Another object of the present invention is to provide such novel method of providing fire-protection liquid spray service to a wood-framed or mass timber building during construction at a job site, wherein before spraying each barcoded completed wood-framed section with fire protection liquid pray service, the spray technician(s) uses the mobile computing device to (i) read the barcoded/RFID-tag on each barcoded/RFID-tagged inspection certificate posted at various regions of the completed wood-framed building section, and (ii) read the barcoded/RFID tagged tote to be used on the job site, then (iii) capture the GPS coordinates and then upload this read barcode identification data and captured GPS data to the project document datastore established in the network database.

Another object of the present invention is to provide such novel method of providing fire-protection liquid spray service to a wood-framed or mass timber building during construction at a job site, wherein the spray technician(s) using an airless liquid spray system to spray all of the exposed interior wood in each barcoded/RFID-tagged completed section, with clean fire inhibiting chemical (CFIC) liquid pumped out of the barcoded/RFID-tagged tote to provide all exposed interior wood surfaces with fire-protection, and provide increased worker safety from fire and smoke on the job site; after spraying each completed section, the spray technician signs each barcoded/RFID-tagged certificate of spraying, and then job site spray manager verifies the certificate of spraying by signing; and the job site spray manager verifies the certificate of spraying by signing the certificate of inspection verifying that each sprayed section was sprayed by the spray technician who signed the certificate of spraying; the manager uses the mobile computing system to capture video and photographic evidence of signed barcoded-RFID-tagged certificates of spraying and inspection, applied to each inspection point in a completed wood-framed section of the building, and then uploads this photographic/video evidence to the project document datastore established on the network database.

Another object of the present invention is to provide such novel method of providing fire-protection liquid spray service to a wood-framed or mass timber building during construction at a job site, wherein the system notifies local fire and police departments when each wood-framed building section has been completely fire-protected through the fire-protection liquid spray process; local fire and police departments using the mobile computing systems to receive push notifications and messages from the system network, that a particular wood building job site has just been fire protected by the fire protection spray service, and that permitted documents can be reviewed in the project document datastore established on the network database.

Another object of the present invention is to provide such novel method of providing fire-protection liquid spray service to a wood-framed or mass timber building during construction at a job site, wherein building owners, construction managers, insurance carriers, architects and building inspectors use the mobile computing device to the remotely monitor the progress of the fire protection spray process at each completed section of the wood-framed building, at any time during the construction phase of the building, and upon completion of the spray process, mitigating the risk of fire and smoke from the wood-framed building.

Another object of the present invention is to provide such a method of and system for ordering, delivering and managing a construction job site fire protection spray service across a network of wood-framed or mass timber building construction projects, wherein the system supports many different stakeholders using a mobile application running on mobile computing systems deployed across the construction job-site fire-protection spray service system.

Another object of the present invention is to provide such a method of and system for ordering, delivering and managing a construction job site fire protection spray service, wherein the stakeholders include property owner, financial institution, building construction manager, job site construction manager, general contractors, building architects, job site construction workers, sales representative, logistics coordinator, supply chain manager, job site spray manager, job site spray technicians, local fire department, local police department, local building inspectors, local neighbors, construction insurance underwriter, property/building insurance underwriter, and risk engineering managers.

Another object of the present invention is to provide an enterprise-level system for ordering, delivering and managing a construction job site fire protection spray service, that is capable of reliably collecting and archiving diverse kinds of data/information on each job site fire protection spray project (e.g. identifying CFIC totes, wood-framed building sections, spray technicians and spray managers, dates, and times, and events, etc.) that (i) documents the mitigation of risk of each insured wood-framed building from fire (by the job-site fire-protection spray process of the present invention), and allows risk engineers and managers from the insurance companies to remotely monitor the process of every job-site fire-protection spray project at any stage of the job site spray process.

Another object of the present invention is to provide such an enterprise-level system, which functions as a job-site fire protection spray certification and verification documentation system, which can be closely integrated with the systems of the fire and construction insurance industry.

Another object of the present invention is to provide an enterprise-level system for verifying the delivery of fire-protection spray services across wood-framed or mass timber building construction sites, using virtual reality (VR) and augmented reality (AR) technologies to support virtual inspection of a fire-protected job-site based on a 3D virtual model of the fire-protected wood-framed building under construction augmented with real job-site collected data certifying and verifying that the fire protection spray process was properly applied to all exposed wood in the wood-framed building, wherein pre-indexed inspection checkpoints are embedded in the 3D virtual model indicating signed and captured certificates of spraying and verifications along with videographic evidence of sprayed fire-protection.

Another object of the present invention is to provide an enterprise-level system for confirming, verifying and documenting the delivery of professional fire-protection spray services to 100% of all exposed wood surfaces within a wood-framed or mass timber building construction site, which can be considered equivalent to the delivery of fire risk reduction services to such wood-framed or mass timber building construction site, and therefore, documenting the factual scientific basis for receiving a commensurate reduction in fire insurance premiums under a fire insurance contract, underwritten by an particular fire insurance carrier agreeing to provide a certain limited amount of fire insurance coverage on such wood-framed or mass timber building construction site that has actually received such professional fire-protection spray services, as certified and verified by the documents and data collected and managed by the enterprise-level system.

Another object of the present invention is to provide a method of providing a fire-protection liquid spray service to a wood-framed or mass timber building during construction at a job site, using a plurality of mobile computing systems deployed over a wireless communication network associated with a system network.

Another object of the present invention is to provide an Internet-based fire-prevention and carbon-quantization certification network for wood-framed and mass-timber buildings, supported by mobile computing devices, as an Internet of Things (IOT) solution, and serving both (i) the wood-building and mass timber building construction industries which needs to protect wood, a renewable and sustainable resource, from fire and smoke, and also (ii) the fire, construction and home insurance industries which ultimately assumes the risk of fire under insurance contracts if and when such fire events actually occur, and to do so by certifying and documenting that each instance of fire prevention claimed by builders and building owners, with respect to a wood-framed or mass-timber building, has actually been undertaken and provided, before insurance underwriters provide fire insurance premium reductions as a reward or incentive for taking such fire prevention measures in such insured wood-framed or mass timber buildings, in which the quantity of fire-protected carbon is quantized and certified by the network.

Another object of the present invention is to provide a system network and a novel method of delivering a fire-protection liquid spray service to a wood-framed or mass timber building during the construction phase at a job site, while video-recording the actual spraying of a specific wood-framed building section using head-mounted or body-mounted digital video-recording equipment, and transmitting the recording to a specific project datastore maintained on a network database, via a wireless communication network associated with the system network, as part of a process of certifying that the specific wood-framed building or mass timber building section has been provided with specified fire protection services.

These and other benefits and advantages to be gained by using the features of the present invention will become more apparent hereinafter and in the appended Claims to Invention.

BRIEF DESCRIPTION OF THE DRAWINGS

The following Objects of the Present Invention will become more fully understood when read in conjunction of the Detailed Description of the Illustrative Embodiments, and the appended Drawings, wherein:

FIG. 9 is a flow chart describing the steps carried out in the method of estimating and recording (i.e. quantizing) the quantities of fire-protected carbon stored in Class-A fire-protected wood-framed and mass-timber building components, assemblies and buildings on construction job-sites, and in prefabrication factory environments;

FIG. 21 is a schematic table representation illustrating the flame spread and smoke development indices obtained through testing of Class-A fire-protected carbon-quantized lumber produced using the method of the illustrative embodiment described in FIGS. 20A and 20B, and tested in accordance with test standards ASTM E84 and UL 723;

FIGS. 24A and 24B, taken together, set forth a flow chart describing the high level steps carried out when practicing the method of producing Class-A fire-protected carbon-quantized cross-laminated timber (CLT) products in the automated fire-treated lumber factory illustrated in FIGS. 23 and 23A;

FIG. 25 is a schematic table representation illustrating the flame spread and smoke development indices obtained through testing of Class-A fire-protected carbon-quantized cross-laminated timber (CLT) product produced using the method of the illustrative embodiment described in FIGS. 24A and 24B, and tested in accordance with the test standards ASTM E84 and UL 723;

FIGS. 28A, 28B and 28C, taken together, set forth a flow chart describing the high level steps carried out when practicing the method of producing Class-A fire-protected carbon-quantized laminated veneer lumber (LVL) along the production line of the automated lumber factory shown in FIGS. 27, 27A and 27B;

FIG. 29 is a table setting for flame spread and smoke development characteristics of Class-A fire-protected carbon-quantized laminated veneer lumber (LVL) products (e.g. studs, beams, panels, etc.) produced using the method of the illustrative described in FIGS. 28A, 28B and 28C, and tested testing in accordance with the test standards ASTM E84 and UL 723;

FIG. 39 show a schematic table representation illustrating the flame spread and smoke development indices obtained through testing of Class-A fire-protected carbon-quantized floor truss structure produced using the method of the illustrative embodiment described in FIGS. 36, 37 and 38, and tested in accordance with standards ASTM E84 and UL 723;

FIG. 44 shows a schematic table representation illustrating the flame spread and smoke development indices obtained through testing of Class-A fire-protected roof truss structure produced using the method described in FIGS. 41, 42, 43A and 43B, in accordance with ASTM E84 and UL 723;

FIG. 48 shows a schematic table representation illustrating the flame spread and smoke development indices obtained through testing of Class-A fire-protected carbon-quantized floor joist structure produced using the method of the illustrative embodiment described in FIGS. 46 and 47, tested in accordance with standards ASTM E84 and UL 723;

FIGS. 52A and 52B, taken together, set forth a high-level flow chart describing the steps carried out when practicing the method of producing Class-A fire-protected carbon-quantized multi-story wood-framed buildings having improved resistance against total fire destruction, comprising the steps of (a) a fire-protection spray coating technician receives a request from a builder to apply clean fire inhibiting chemical (CFIC) liquid coating on all interior surfaces of the untreated and/or treated wood lumber and sheathing to be used to construct a wood-framed multi-story building at a particular site location, (b) the fire-protection spray coating technician receives building construction specifications, analyze same to determine the square footage of clean fire inhibiting chemical (CFIC) coating to be spray applied to the interior surfaces of the wood-framed building, compute the quantity of CFIC liquid required to do the spray job satisfactorily, and generate a job price quote for the spray job and send to the builder for review and approval, (c) after the builder accepts the job price quote, the builder orders the fire-protection spray coating team to begin performing the on-site wood coating spray job, in accordance with the building construction schedule, so that after the builder completes each predetermined section of the building, where wood framing has been constructed and sheathing installed, but before any wallboard has been installed, clean fire-inhibiting chemical (CFIC) liquid is supplied to an airless liquid spraying system, for spray coating all interior wood surfaces with a CFIC coating, (d) when the section of the building is spray coated with clean fire-protection chemical coating, the section is certified and marked as certified for visual inspection, (e) as each section of the wood-framed building is constructed according to the construction schedule, the spray coating team continues to spray coat the completed section, and certify and mark as certified each such completed spray coated section of the building under construction, (f) when all sections of the building under construction have been completely spray coated with clean fire-inhibiting chemical (CFIC) liquid materials, and certified as such, the spray technicians remove the spray equipment from the building, and the builder proceeds to the next stages of construction and completes the building construction according to architectural and building specifications and plans, and (g) the spray technician then issues a certificate of completion with respect to the application of clean fire inhibiting chemical (CFIC) liquid to all exposed wood surfaces on the interior of the wood-framed building during its construction phase, thereby protecting the building from risk of total destruction by fire;

FIGS. 60A and 60B, set forth a flow chart describing the primary steps involved in carrying out the method of verifying and documenting on-site spray-applied Class-A fire-protection over wood-framed buildings during construction;

FIG. 63 is a flow chart describing the primary steps of the method of qualifying real property for reduced property insurance, based on verified on-site spraying of the exposed interior surfaces of wood-frame buildings with clean fire inhibiting chemical (CFIC) liquid during the construction stage of the building, using the system network of the present invention;

FIG. 66A is a schematic representation of a database record within the network database supported on the system network, for each purchase order for a quantity of CFIC totes to be shipped to a particular destination;

FIG. 66B is a schematic representation of a database record within the network database supported on the system network, for each CFIC tote shipment shipped to a particular destination and either rejected or accepted into inventory;

Figure 7:
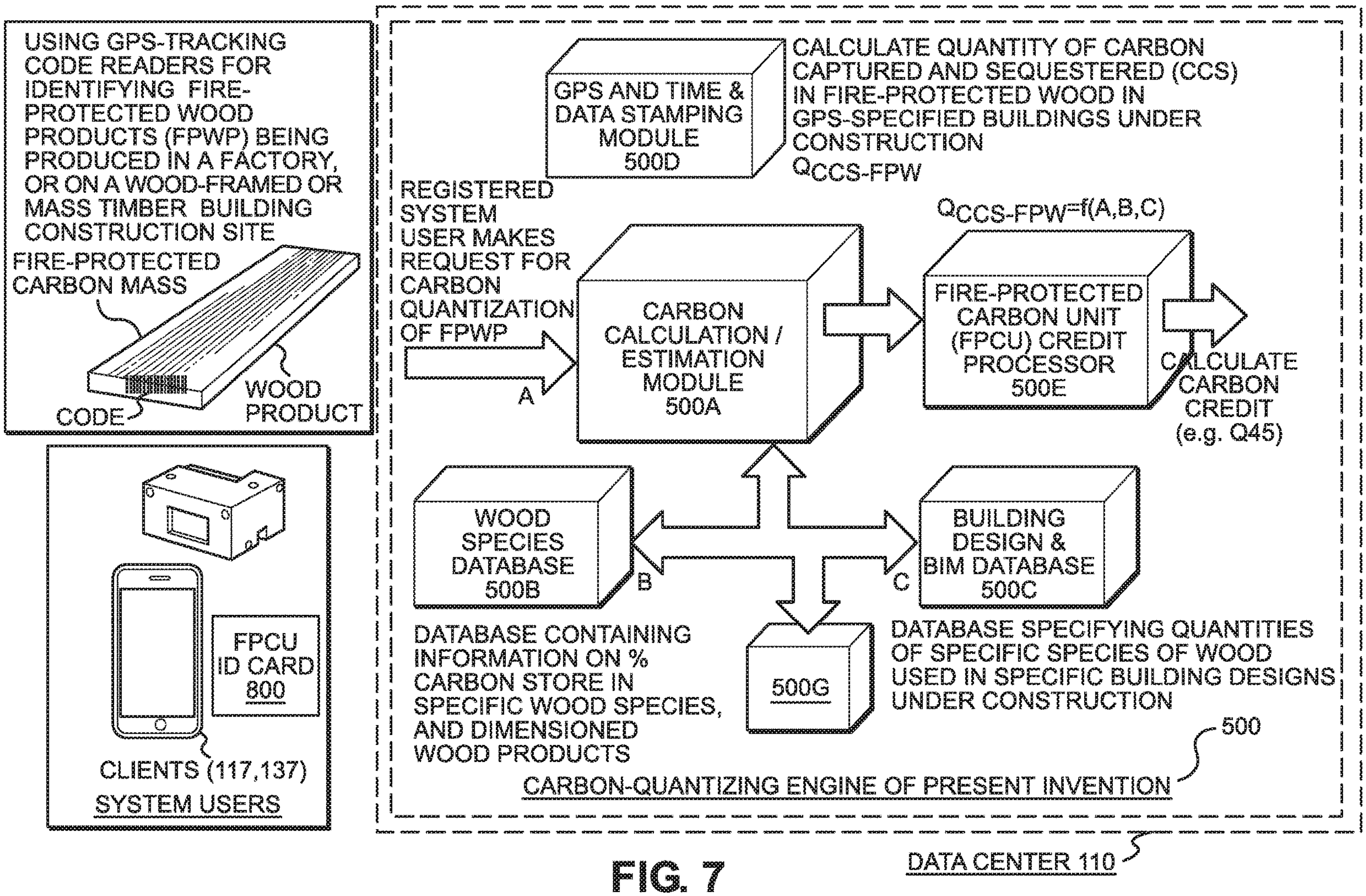
FIG. 7 is cloud-based process supported by the system and network of FIG. 6 for estimating (i.e. quantizing) and recording quantities of carbon securely stored in Class-A fire-protected wood-framed and mass-timber building components, assemblies and buildings on construction job-sites, and in prefabrication factory environments, using computational and information resources supported within the data center of the network and well as the mobile or remote computing systems placing carbon quantization requests over the network.
Figure 8A:
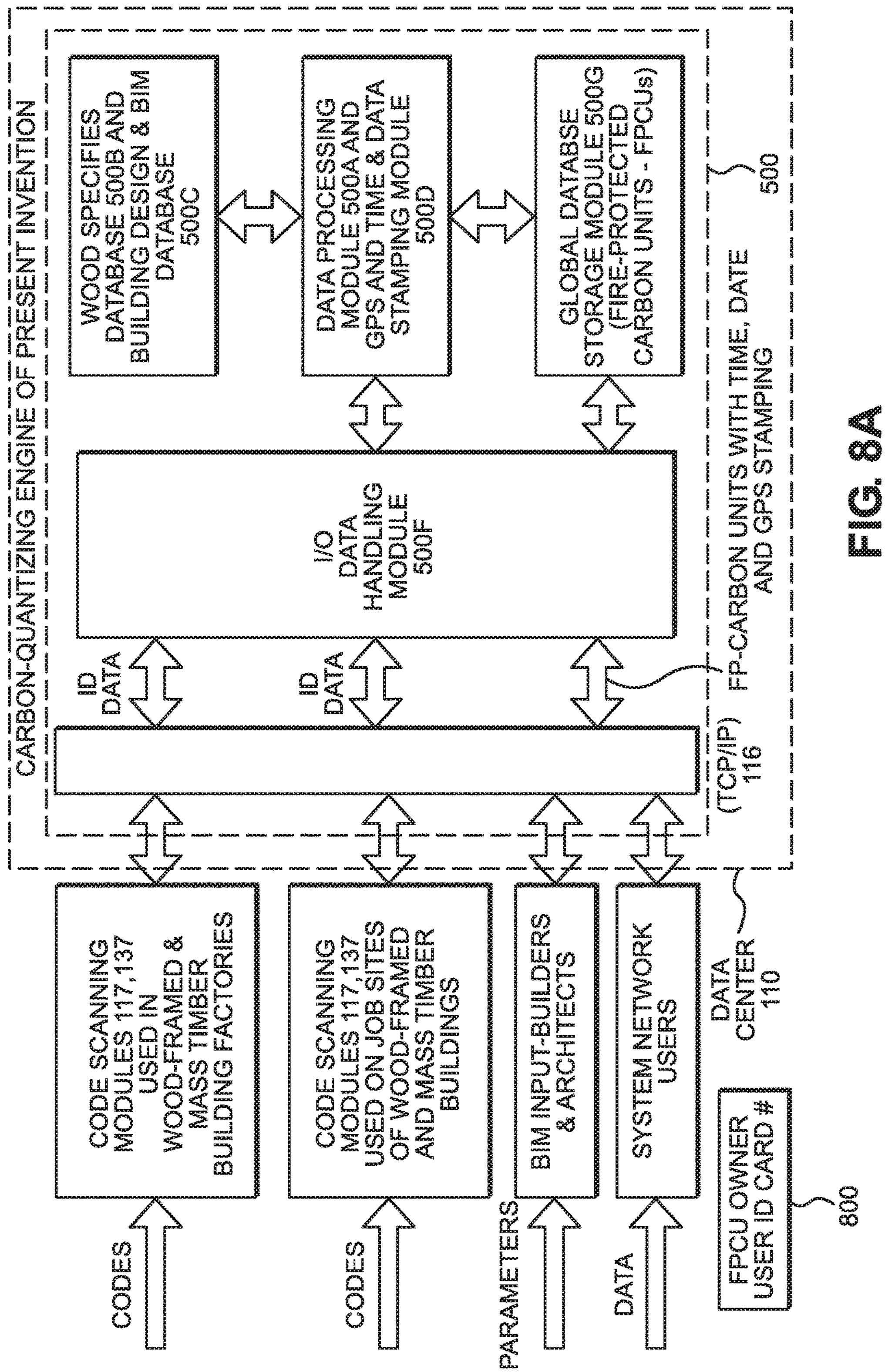
FIG. 8A is a schematic representation of the carbon quantization engine (e.g. system) supported by and over the network of FIG. 1, adapted and configured for estimating and recording (i.e. quantizing) the quantity of carbon mass naturally stored in wood products used in wood-framed and mass timber building components, assemblies and buildings, after being treated and fire-protected with clean fire-protection chemicals on construction job sites as well as in prefabricated factory environments.
Figure 8B:
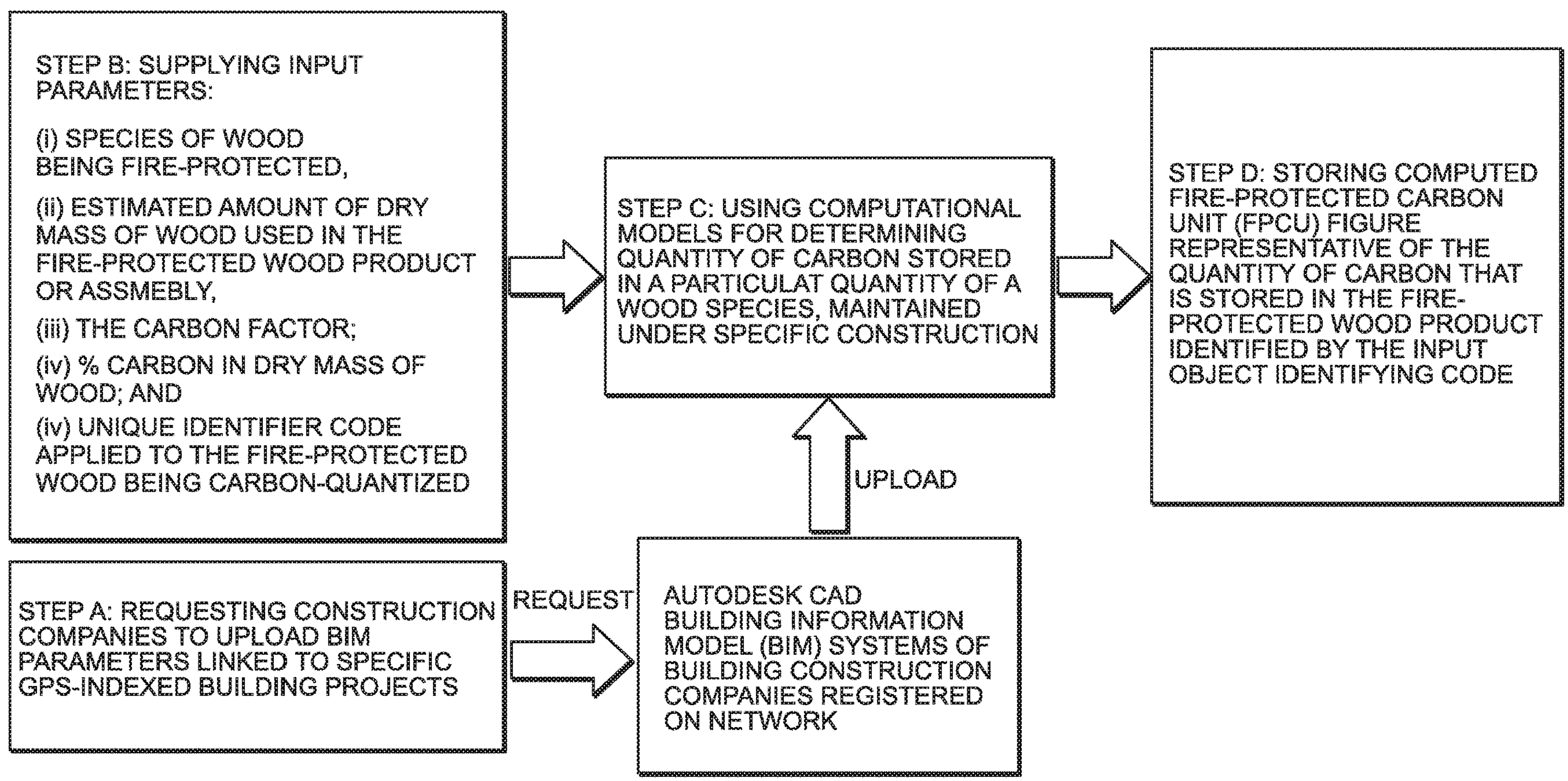
FIG. 8B is a schematic representation of the automated process supporting the real-time measuring (i.e. quantizing) and recording the quantity of fire-protected carbon stored in wood products used in wood-framed and mass timber building components, assemblies and buildings after being treated and fire-protected with clean fire-protection chemicals on construction job sites as well as in prefabricated factory environments.
Figure 55:
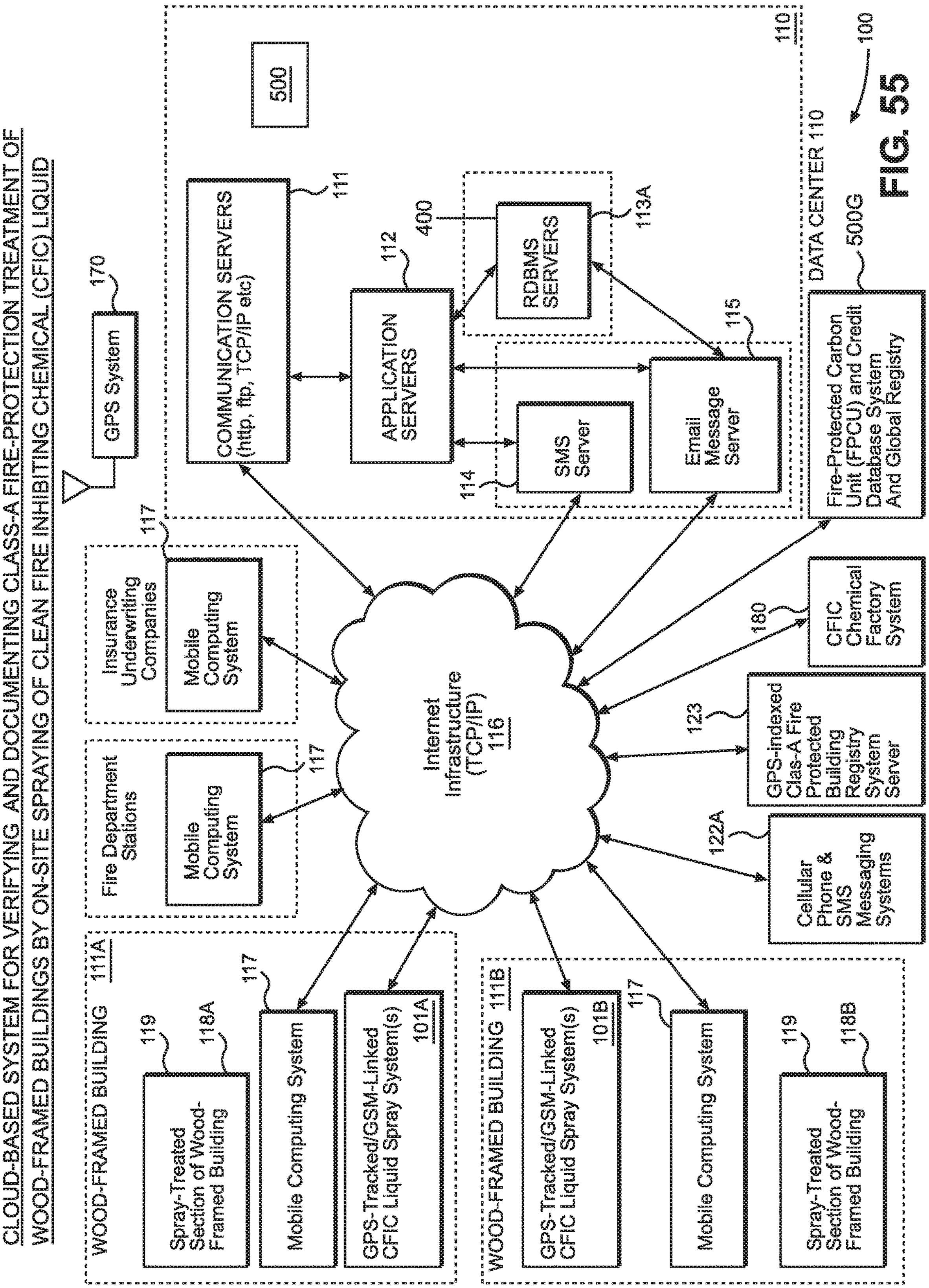
FIG. 55 is a schematic system diagram showing the Internet-based (i.e. cloud-based) system of the present invention, previously depicted in FIG. 6, for verifying and documenting Class-A fire-protection spray-treatment of a carbon-quantized wood-framed building using on-site spraying of a clean fire inhibiting chemical (CFIC) liquid, comprising (i) a data center with web, application and database servers for supporting a web-based site for hosting images of certificates stamped on spray-treated wood surfaces, and other certification documents, and (ii) mobile smart-phones used to capture digital photographs and video recording of spray-treated wood-framed building sections during the on-site fire-protection spray process supported using mobile GPS-tracked/GSM-linked CFIC-liquid spray systems, and uploading the captured digital images to the data center, for each spray treatment project, so that insurance companies, builders, and other stakeholders can review such on-site spray completion certifications, and other information relating to the execution and management of such fire-protection spray-treatment projects during the building construction phase of wood-framed buildings.
Figure 69:
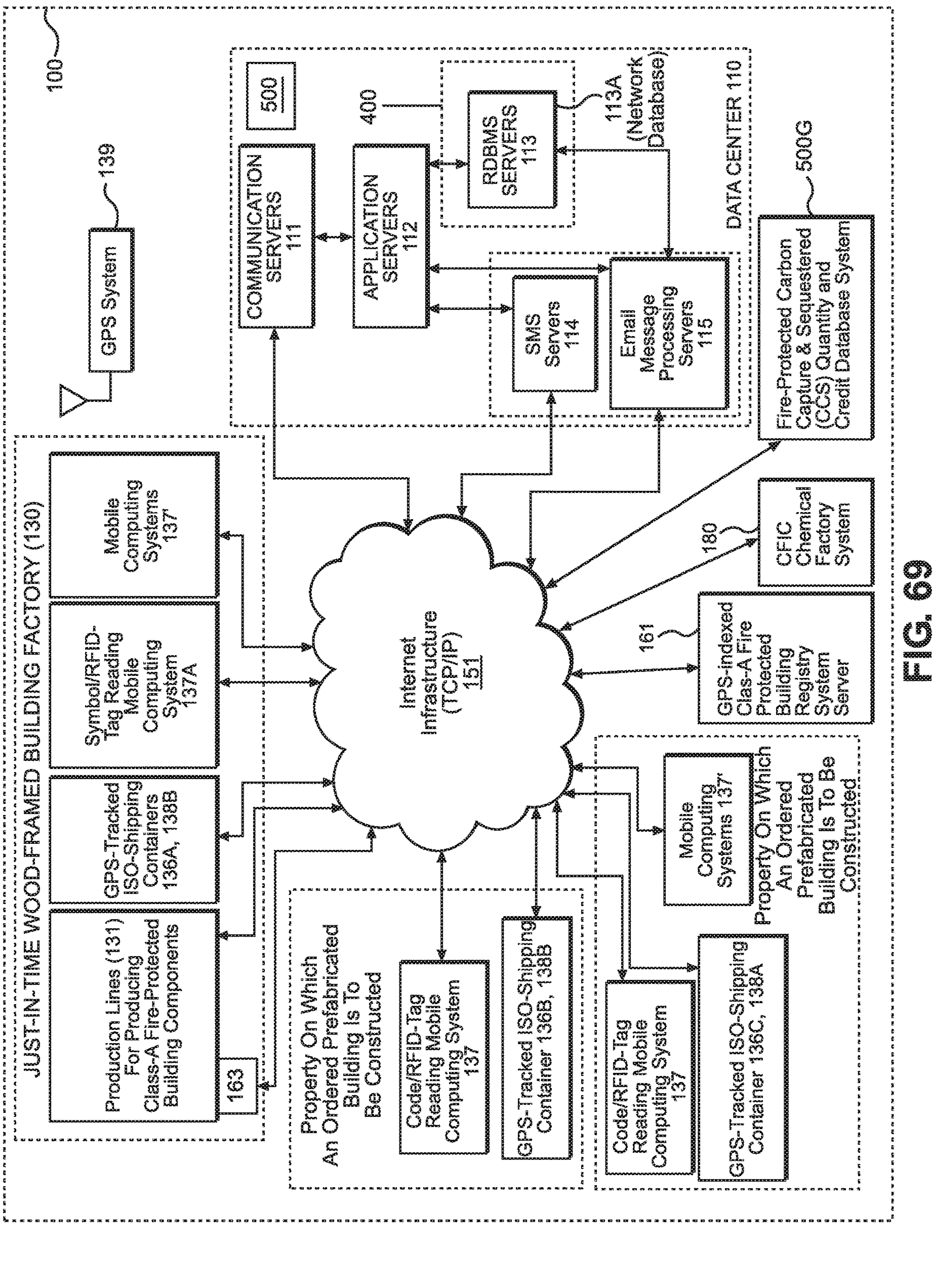
FIG. 69 is a schematic system network representation of the just-in-time factory system shown in FIGS. 68A and 68B, shown comprising (i) a just-in-time wood-framed building factory with multiple production lines for producing Class-A fire-protected building components, (ii) GPS-tracked ISO-shipping containers and code symbol/RFID tag reading mobile computing system, and (iii) a data center for factory system and supporting a network of mobile computing devices running a mobile application adapted to help track and manage orders, projects and supplies for prefabricating Class-A fire-protected wood-framed buildings, and Class-A fire-protected carbon-quantized wood-framed building components for use in constructing the same.
Figure 72:
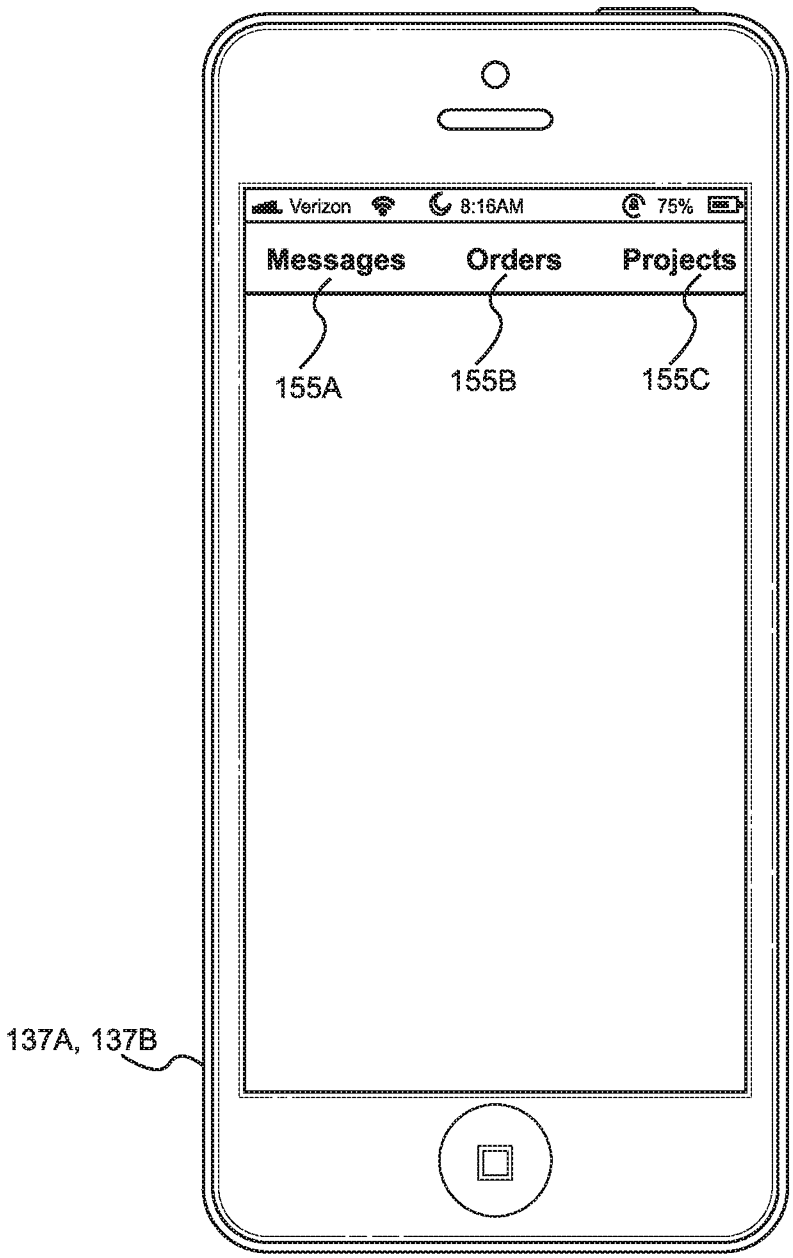
FIG. 72 is an exemplary wire frame model of a graphical user interface of a mobile application of the present invention configured used by customers who place orders for prefabricated Class-A fire-protected carbon-quantized wood-framed buildings, supported by the system of the present invention.
Figure 72A:
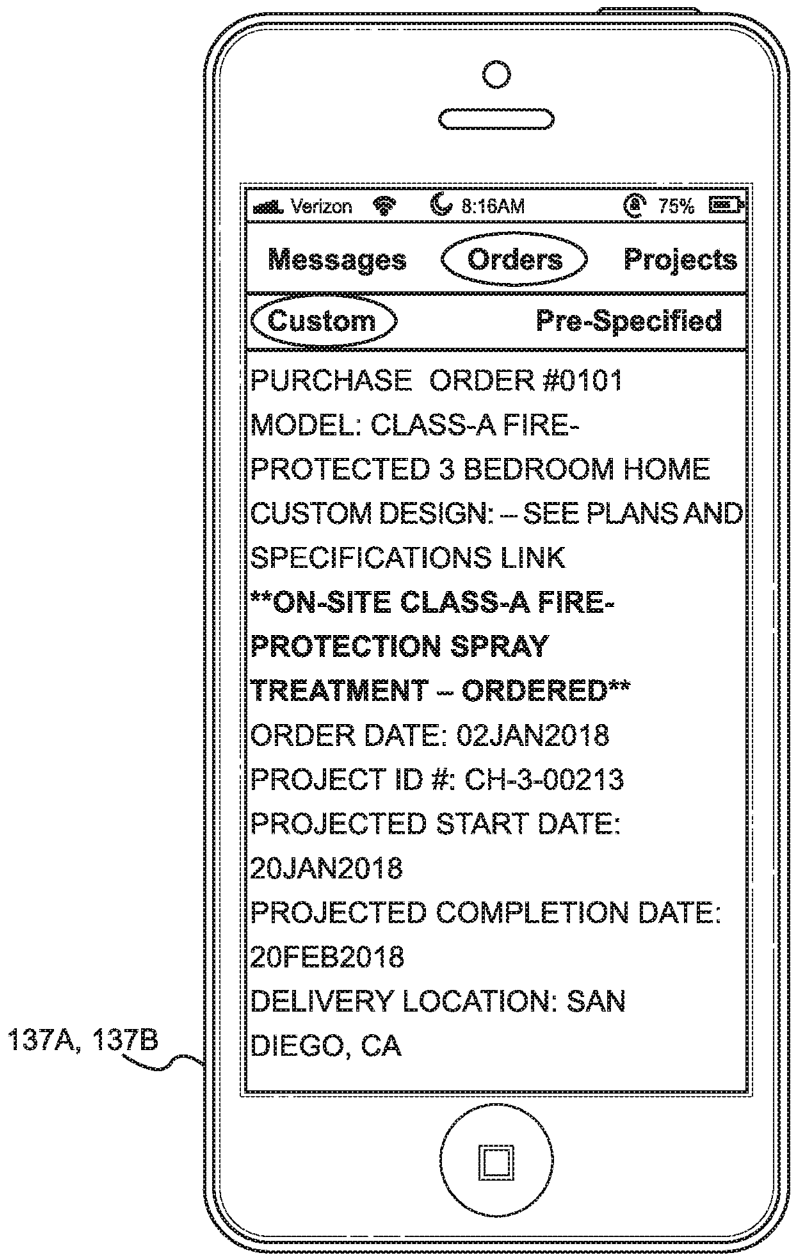
FIG. 72A is an exemplary wire frame model for a graphical user interface of the mobile application configured for use by customers showing details for an order for a custom prefabricated fire-protected carbon-quantized wood-framed building, or fire-protected carbon-quantized wood-framed building component, using services supported by the system network of the present invention.
Figure 72B:
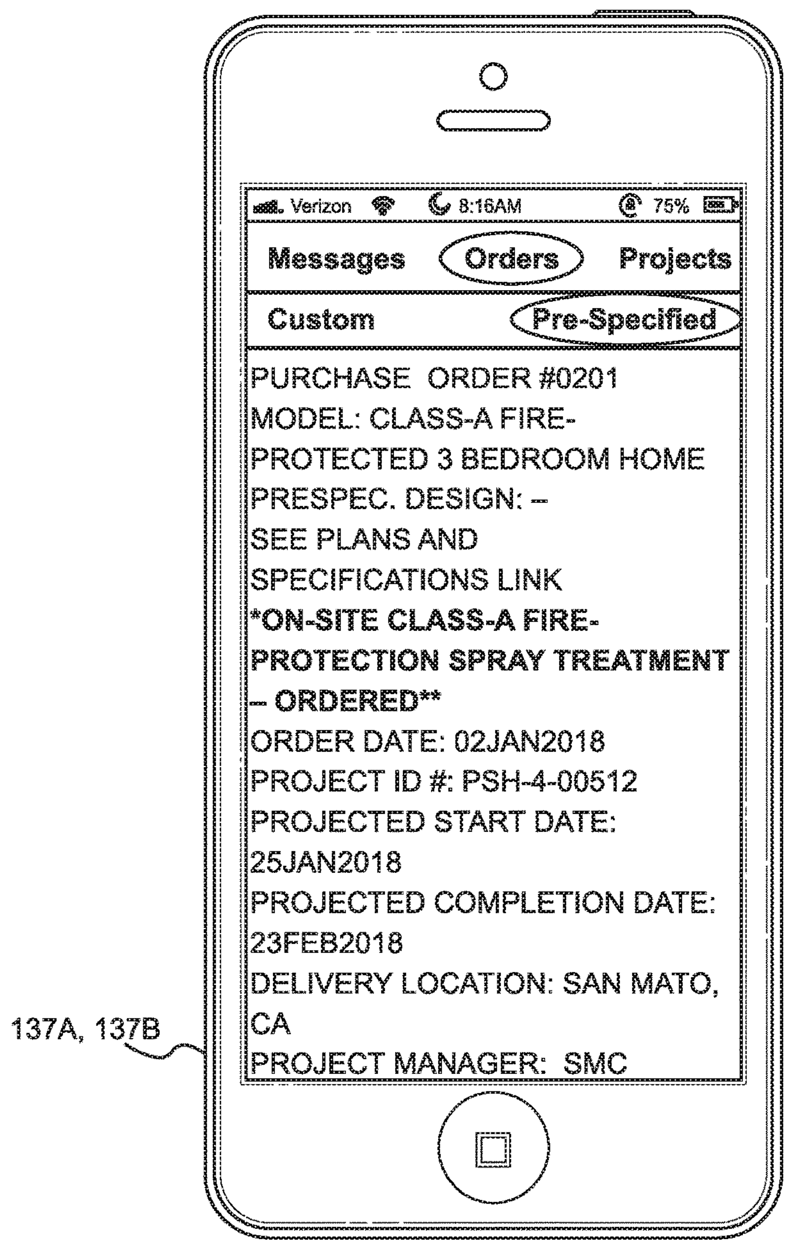
FIG. 72B is an exemplary wire frame model for a graphical user interface of the mobile application configured for use by project administrator showing details for an order for a pre-specified prefabricated fire-protected carbon-quantized wood-framed building, or fire-protected carbon-quantized wood-framed building component, using services supported by the system network of the present invention.
Figure 72C:
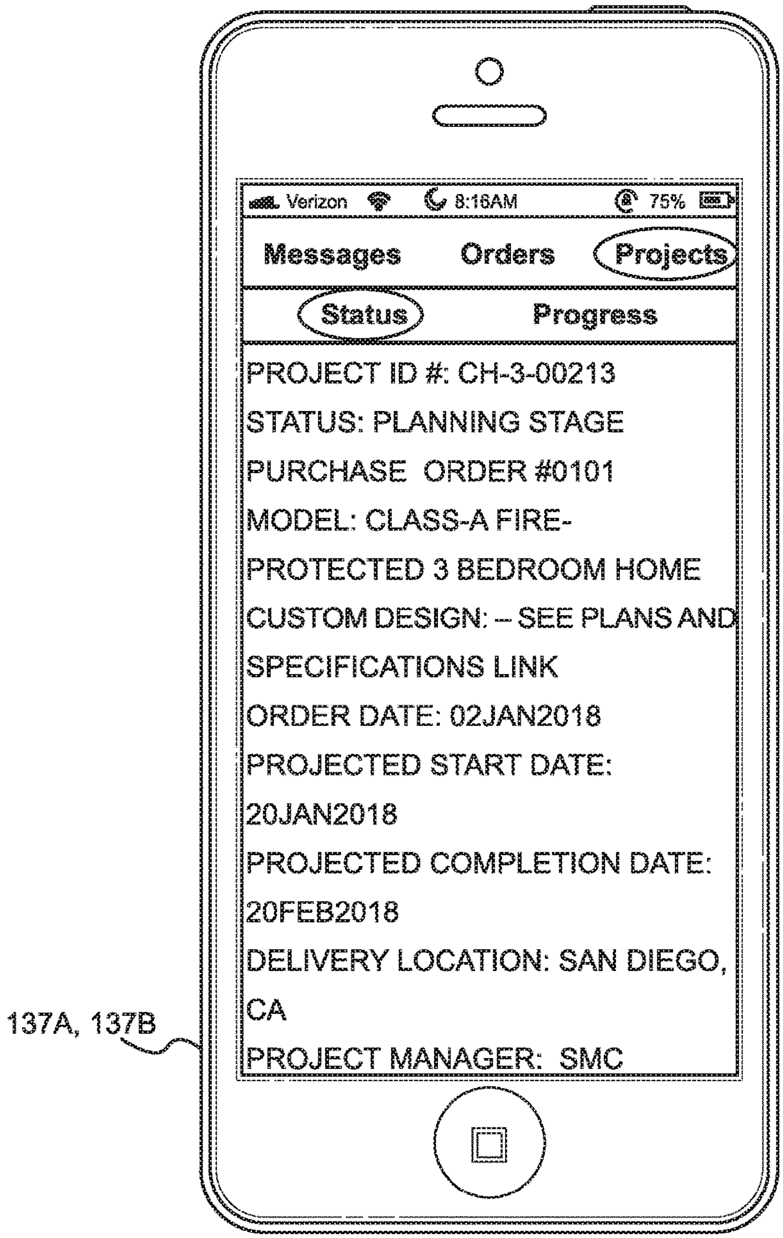
FIG. 72C is an exemplary wire frame model for a graphical user interface of the mobile application configured for use by project administrator showing status details for a project for a custom prefabricated fire-protected carbon-quantized wood-framed building, or fire-protected carbon-quantized wood-framed building component, using services supported by the system network of the present invention.
Figure 72D:
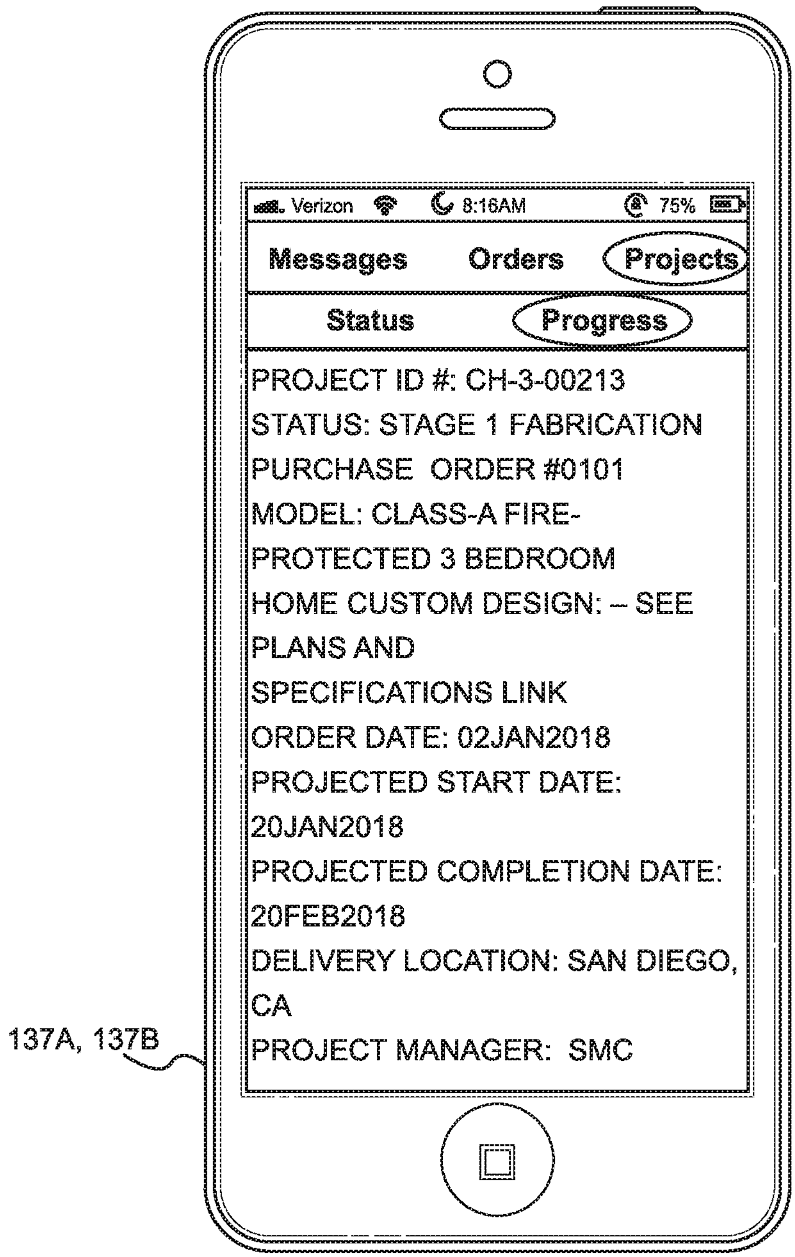
Figure 72E:
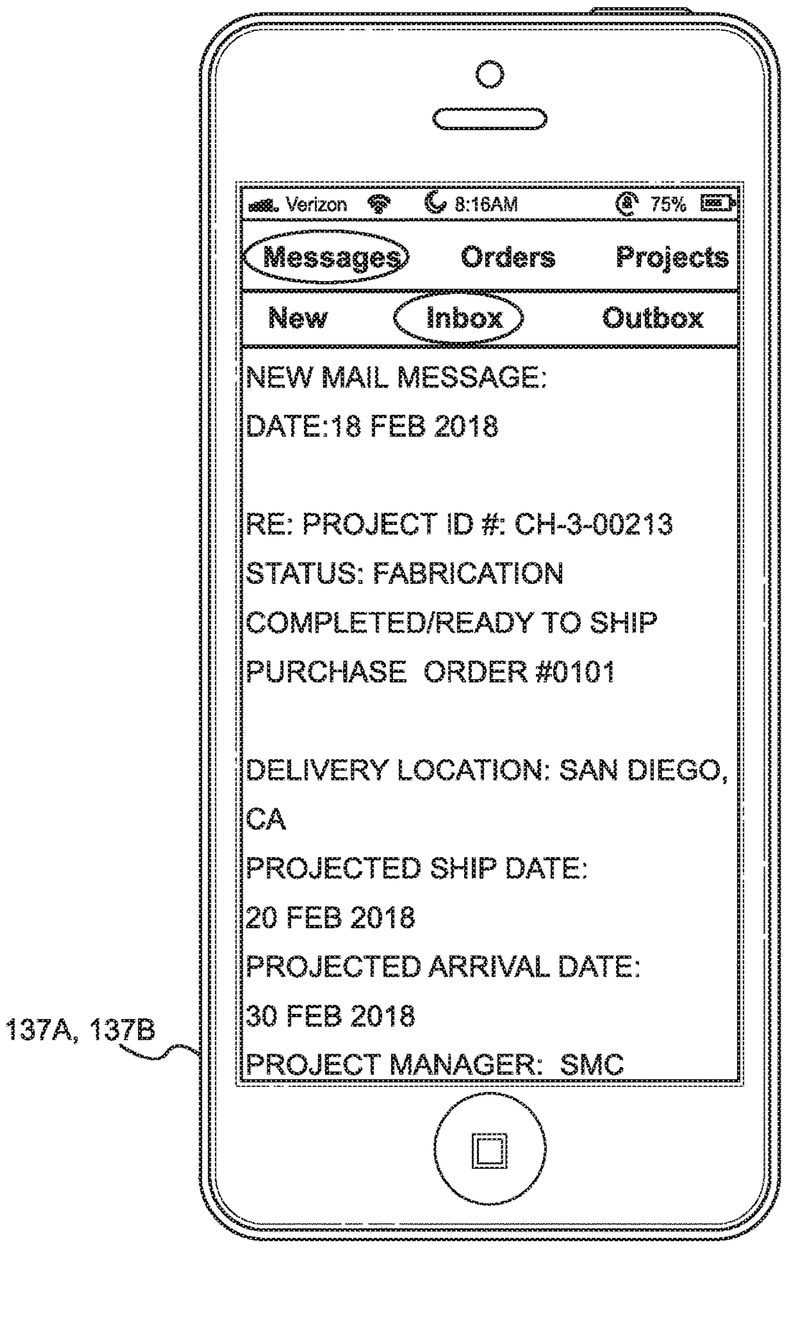
Figure 73:
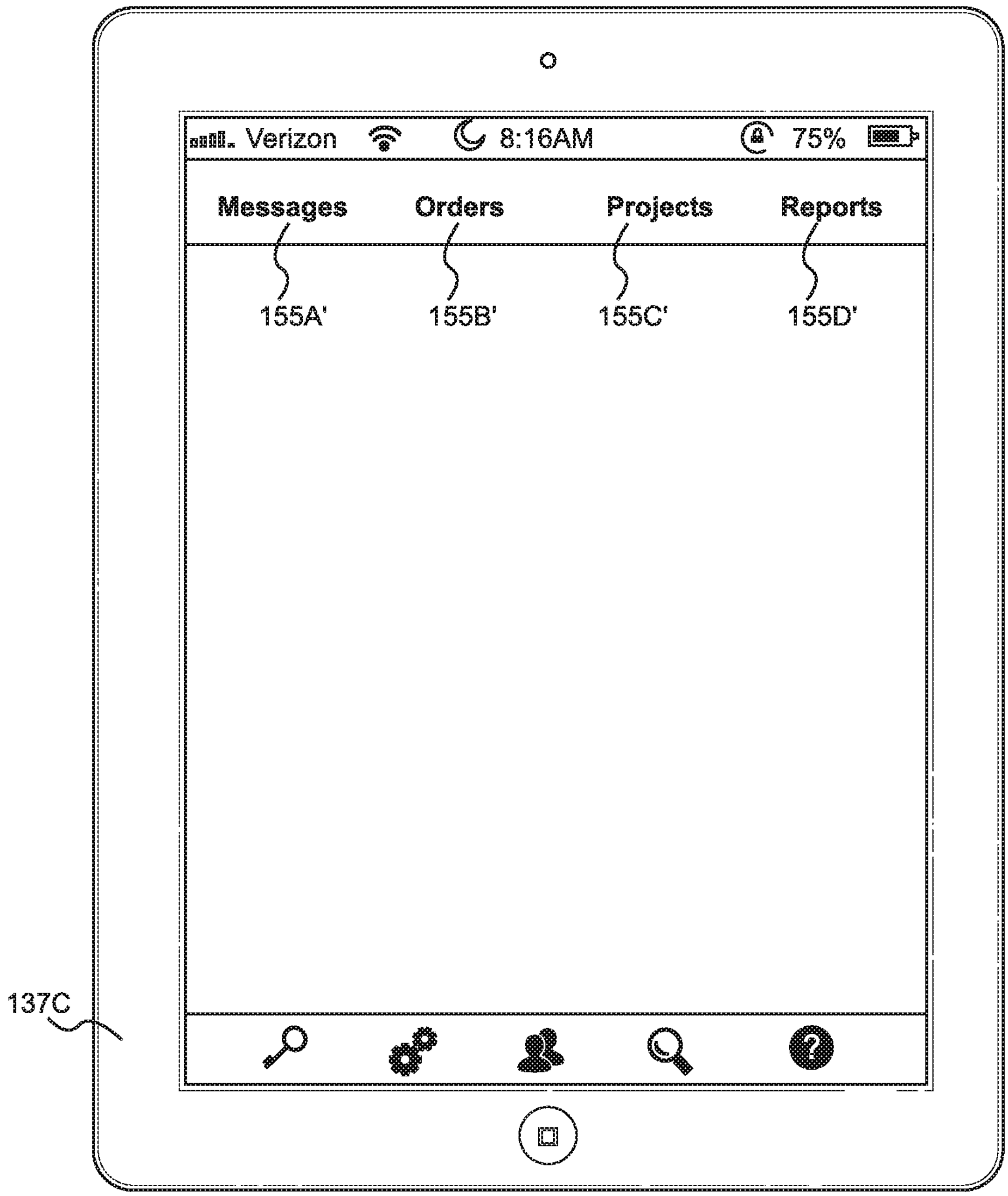
Figure 73A:
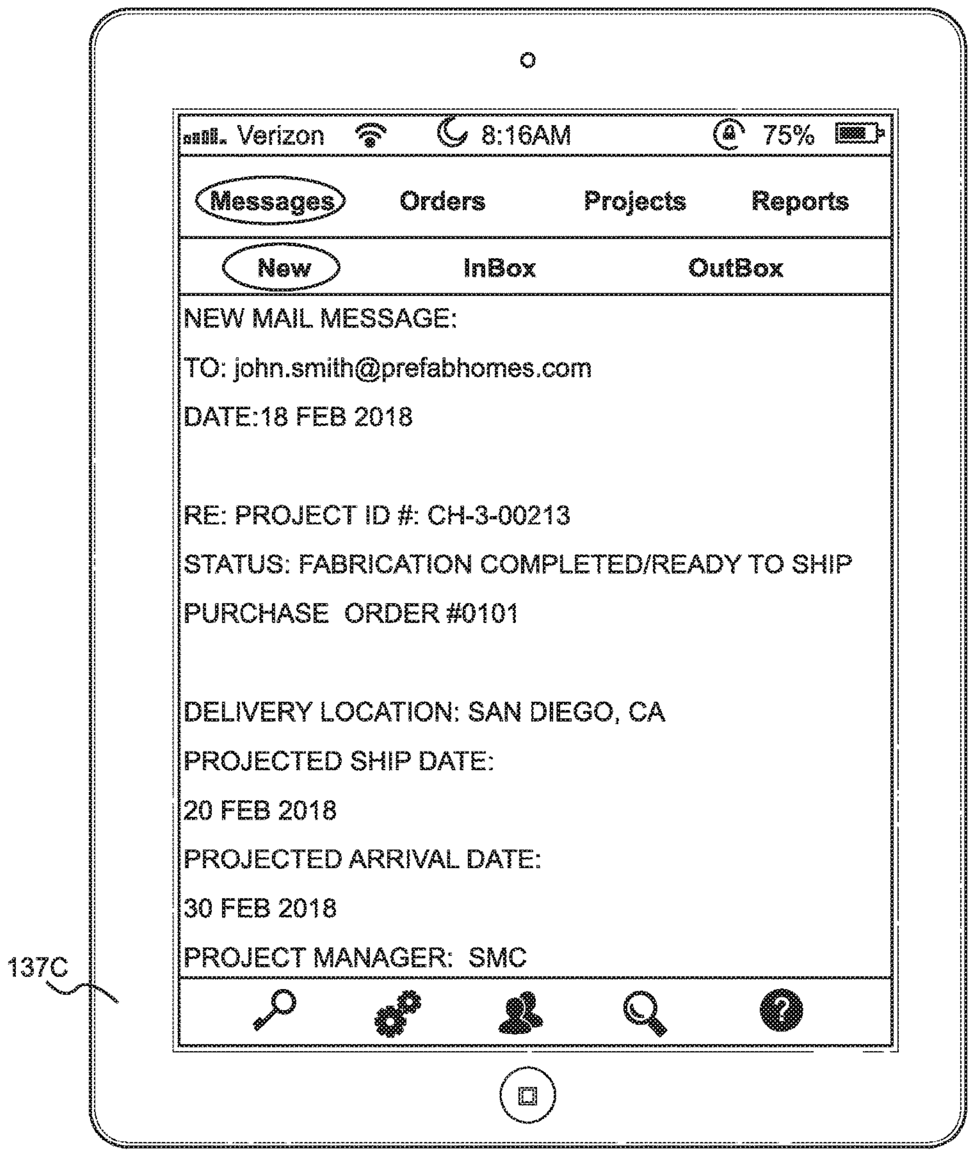
Figure 73B:
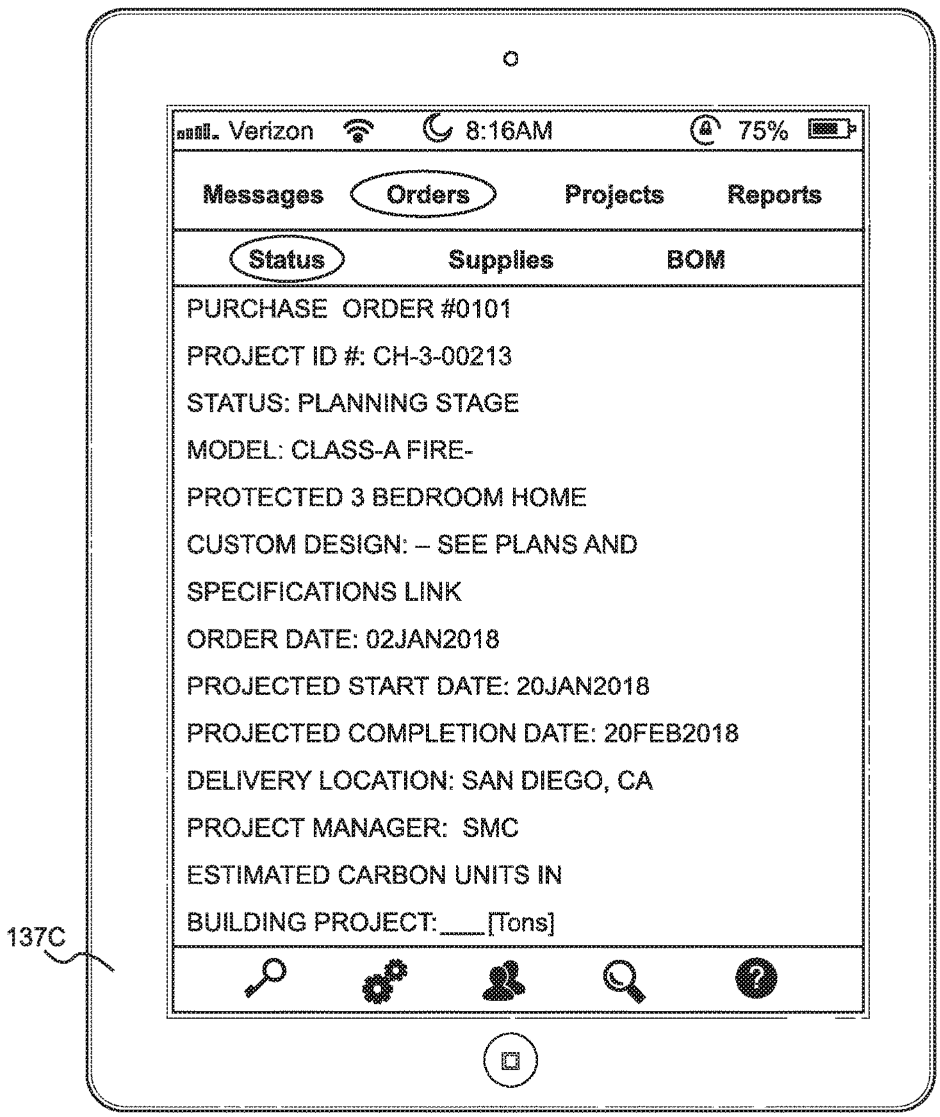
Figure 73C:
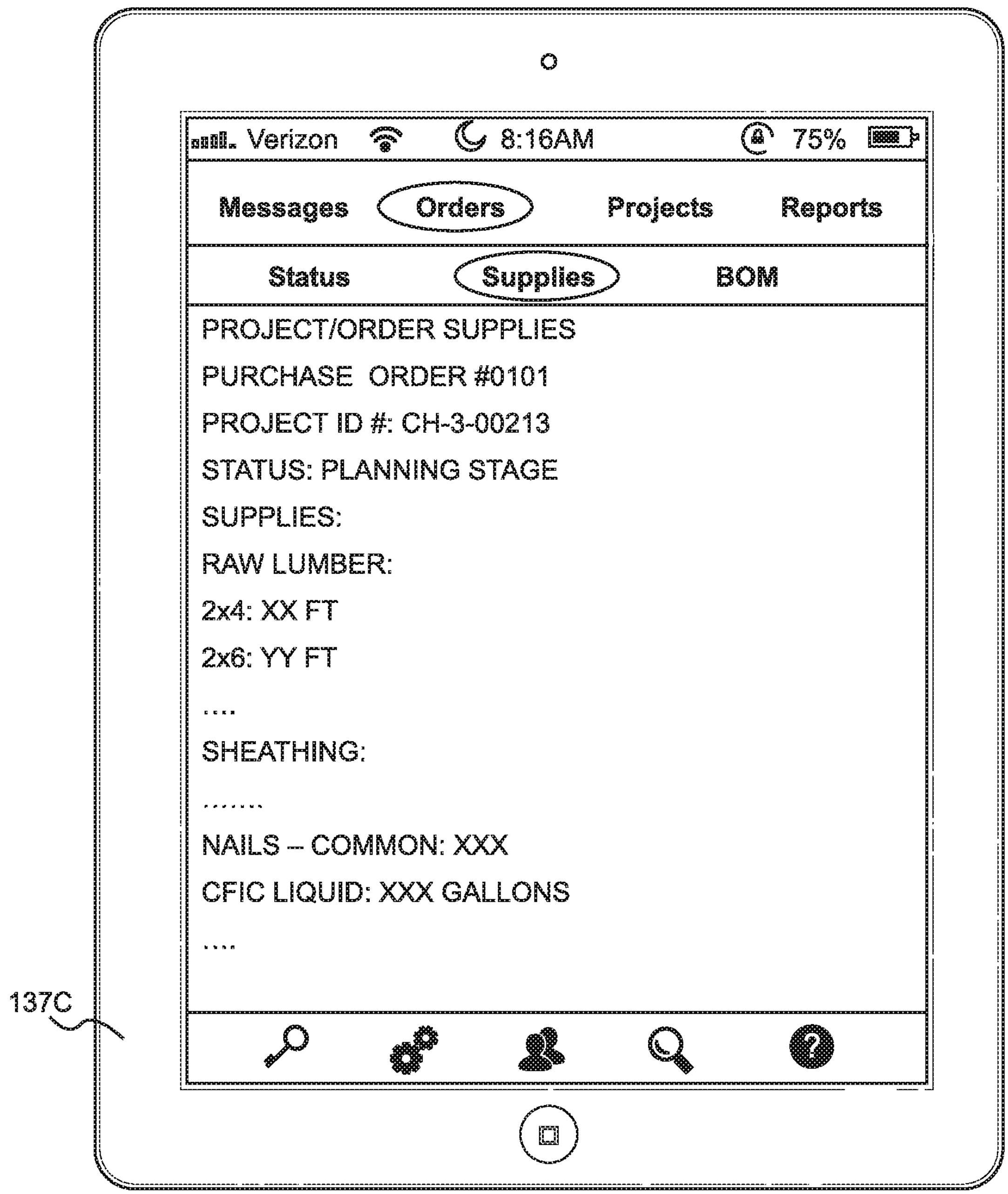
Figure 73D:
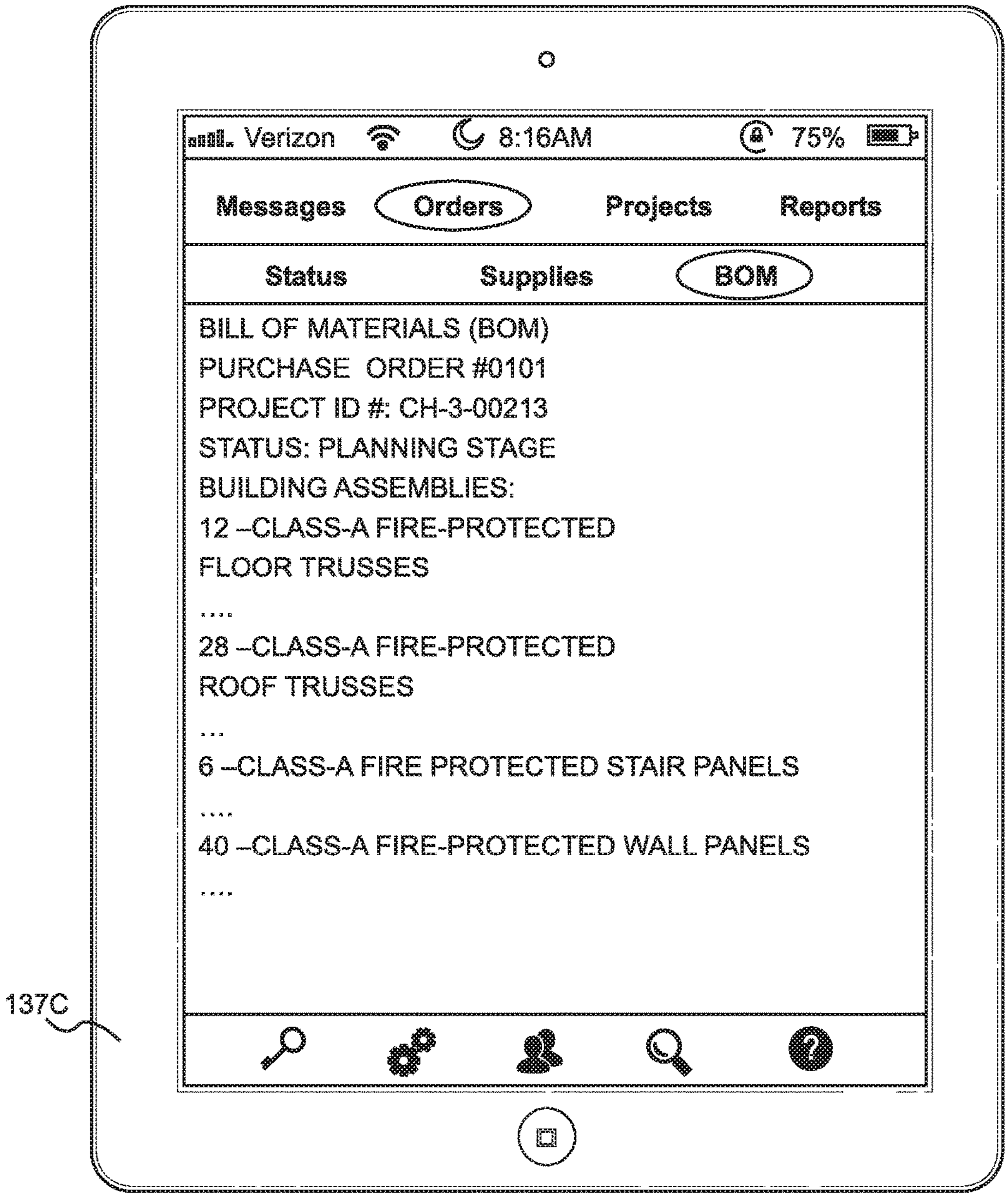
Figure 73E:
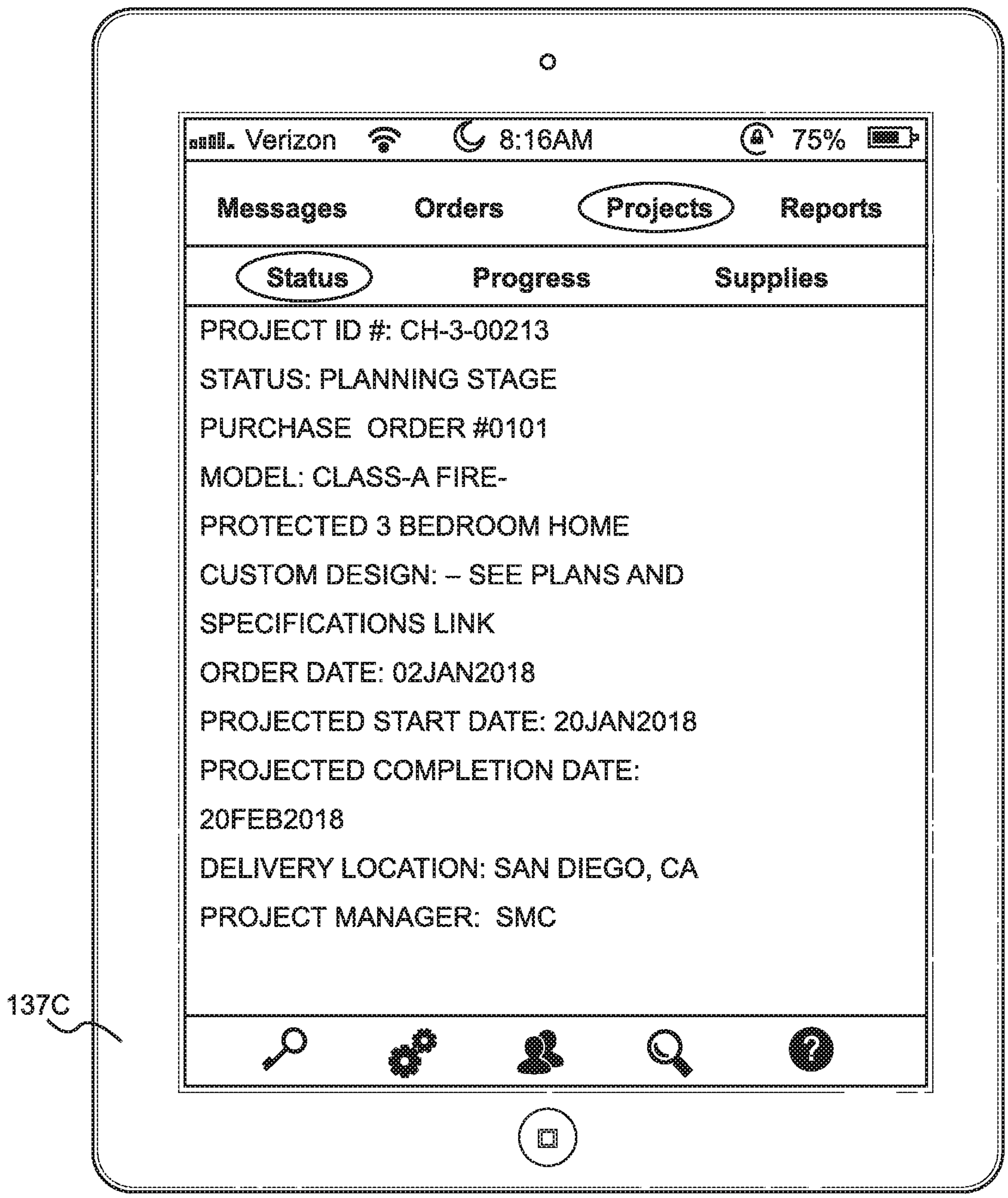
Figure 73F:
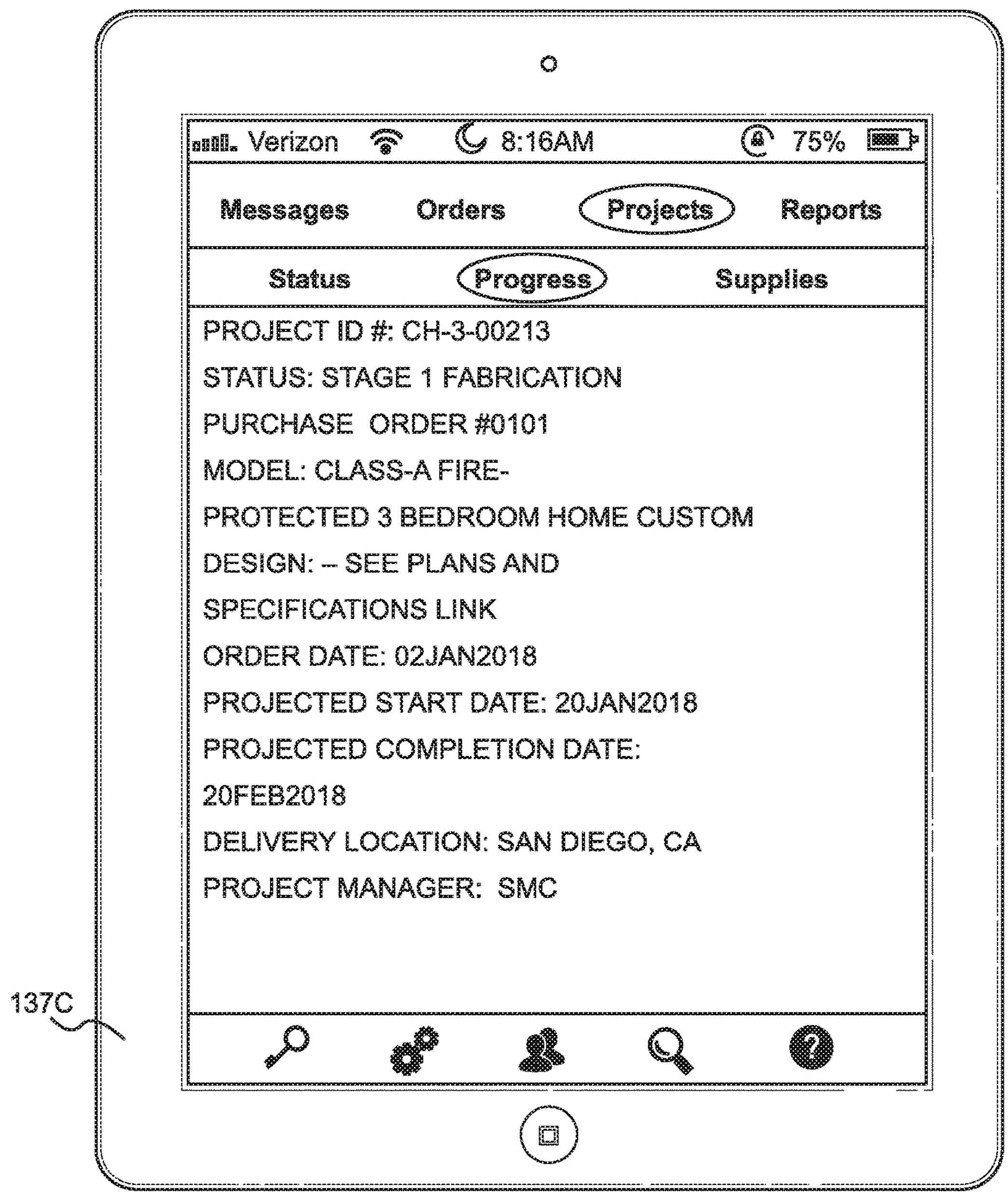
Figure 73G:
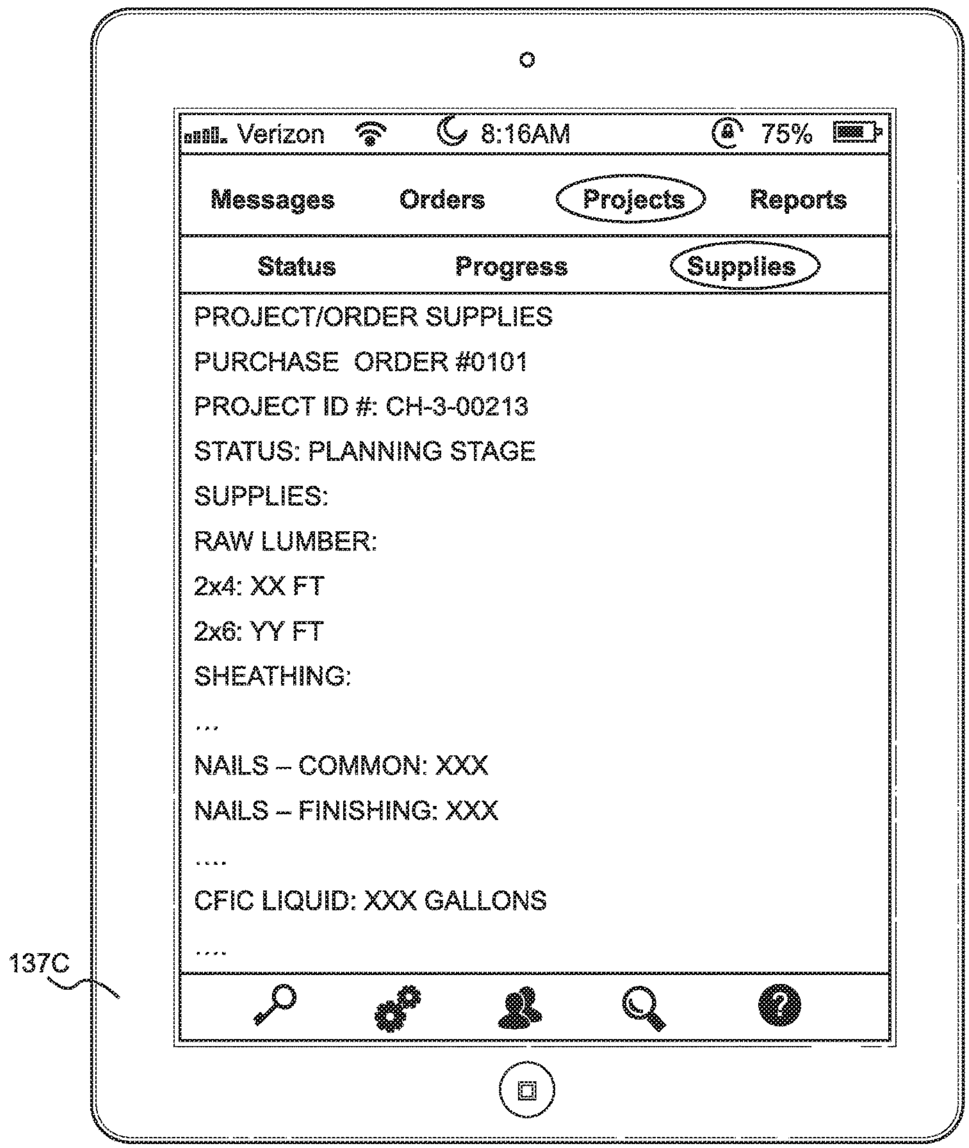
Figure 73H:
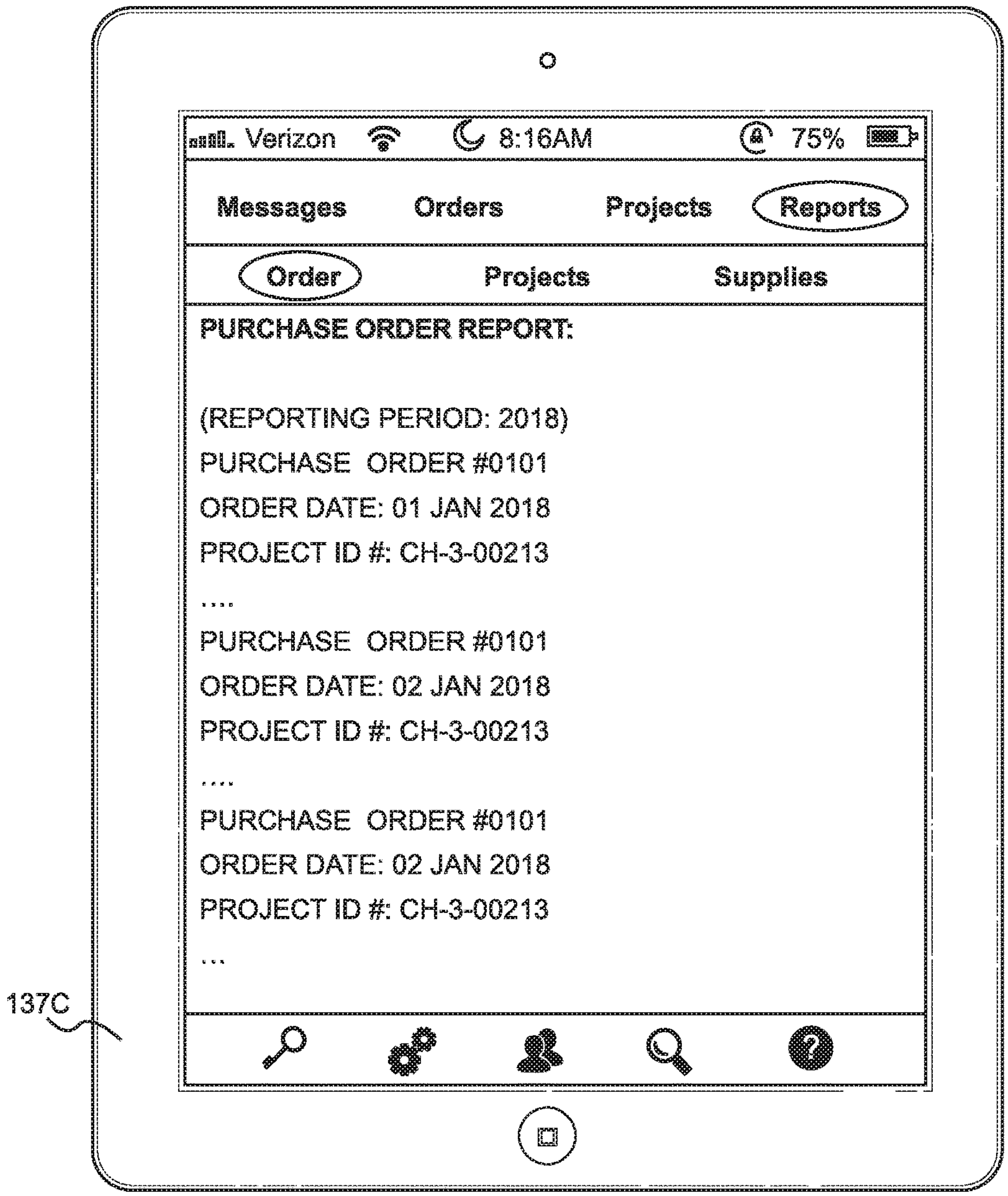
Figure 73I:
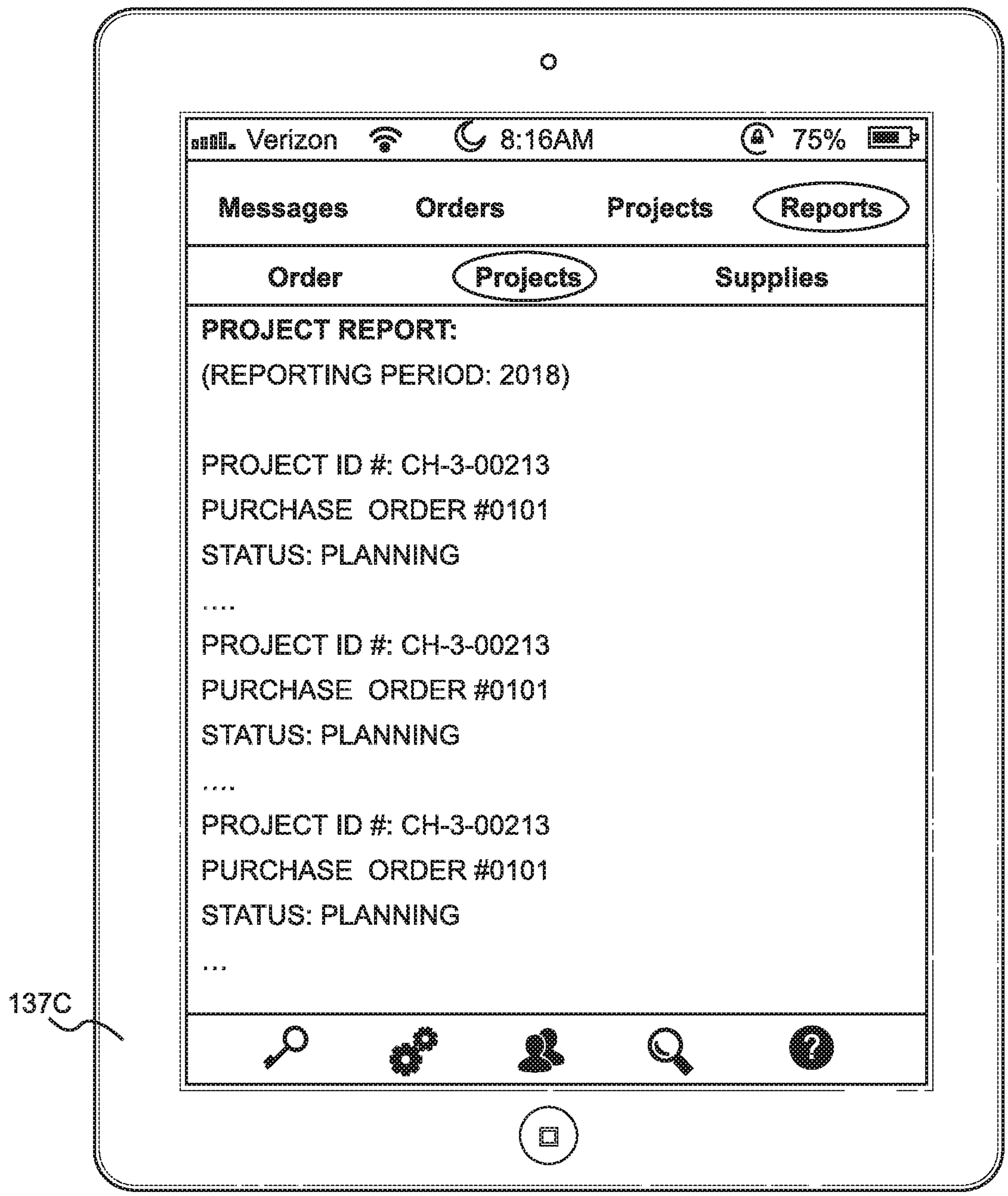
Figure 73J:
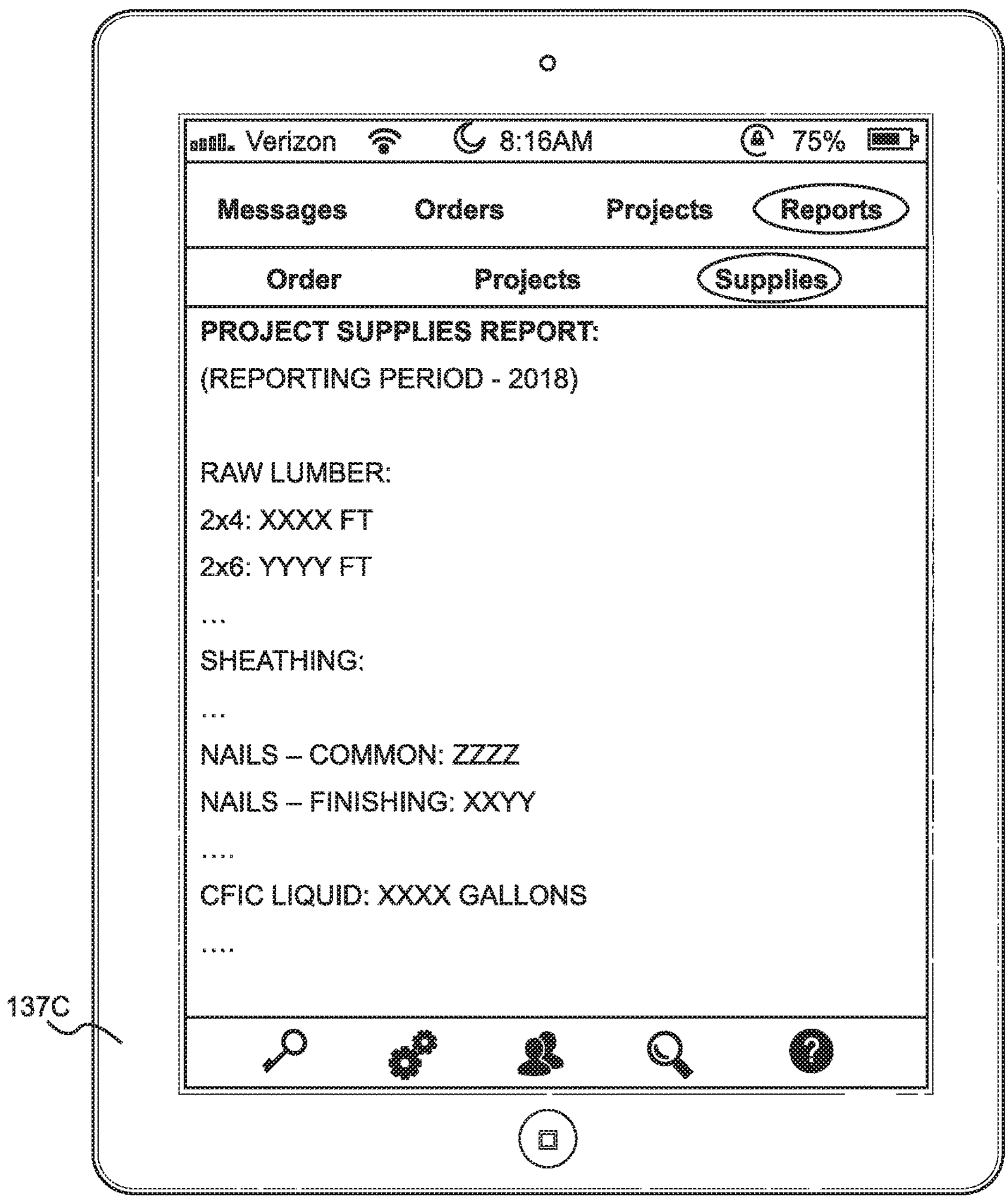
Figure 74:
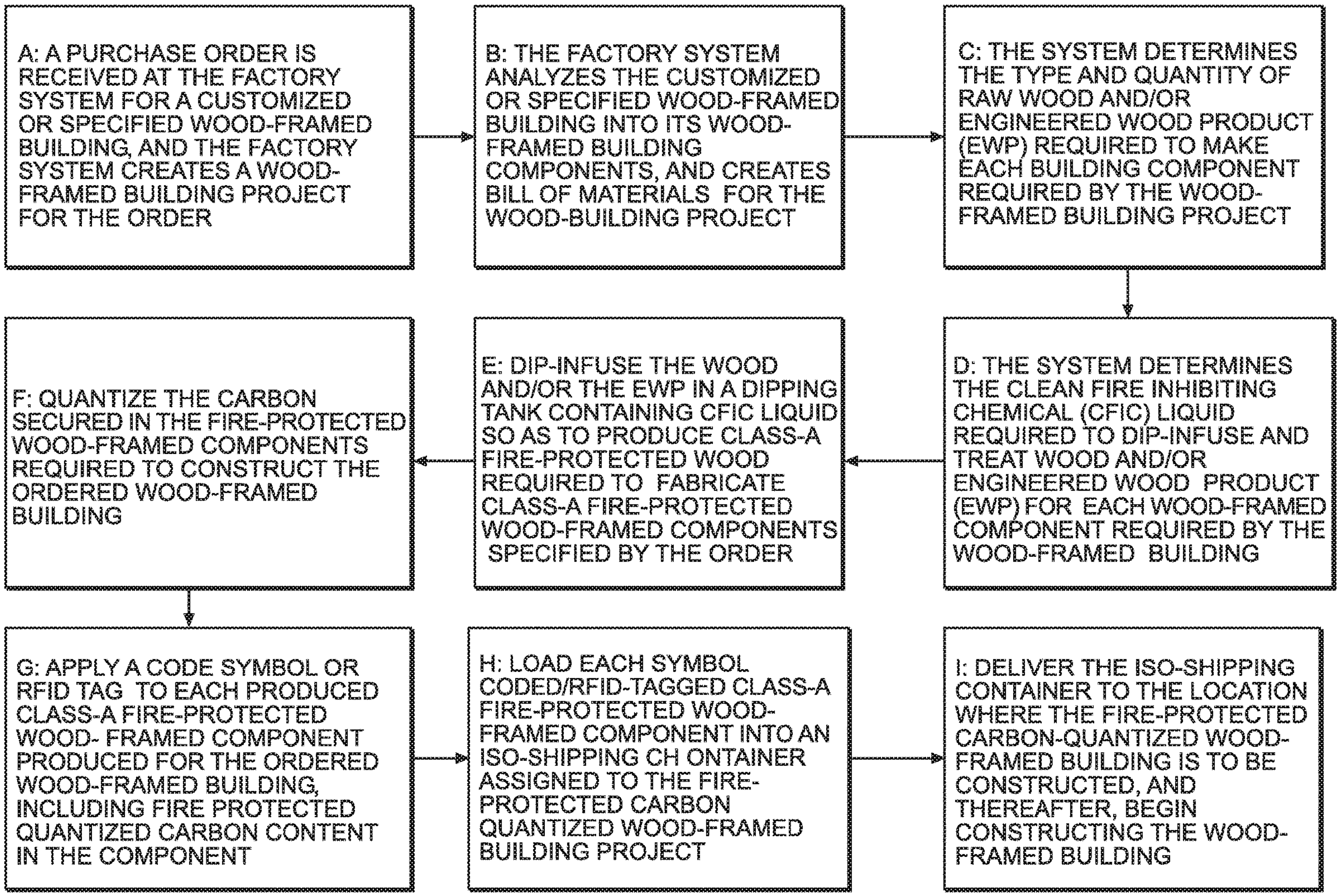
Figure 76:
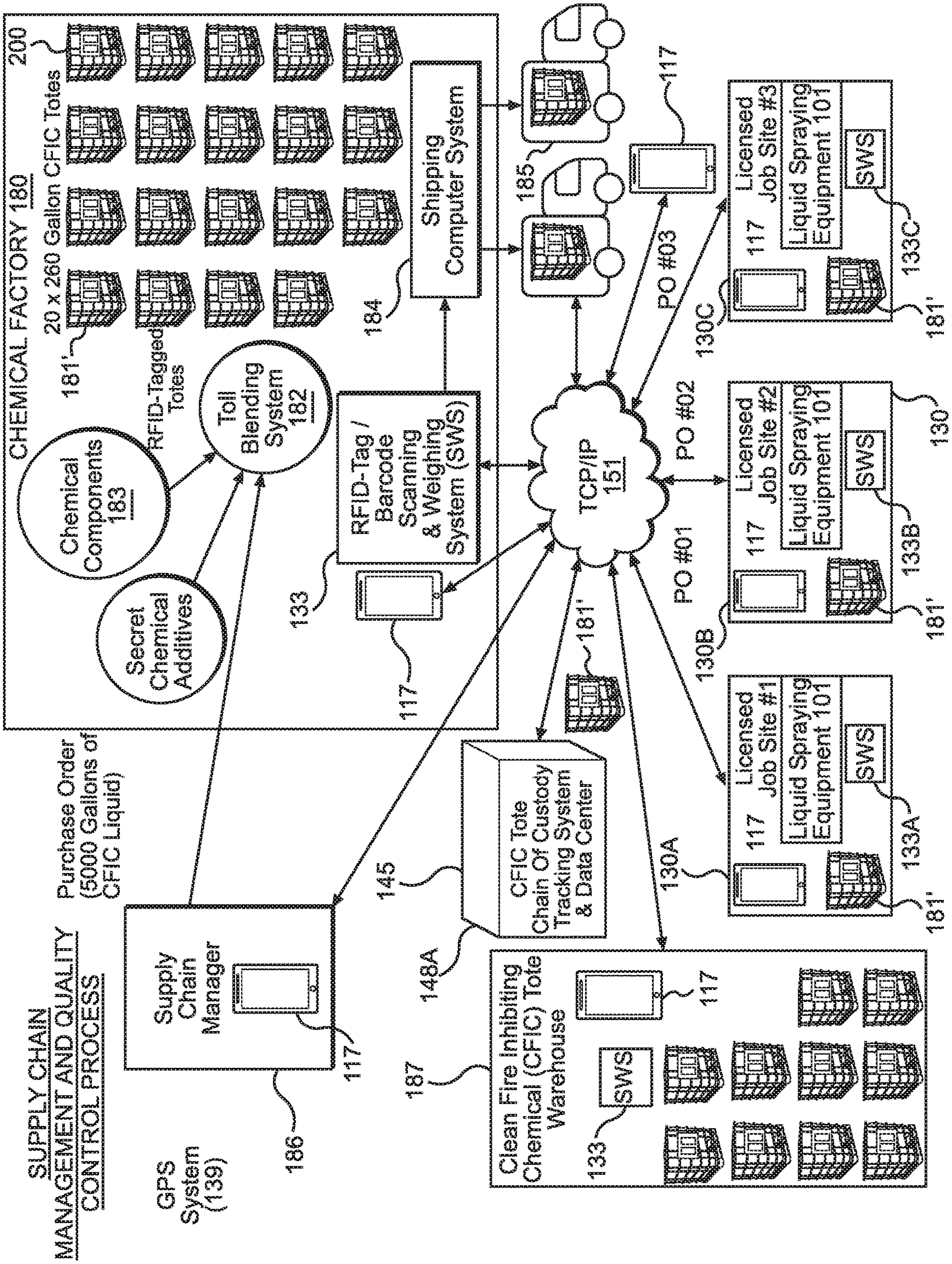
Figure 76A:
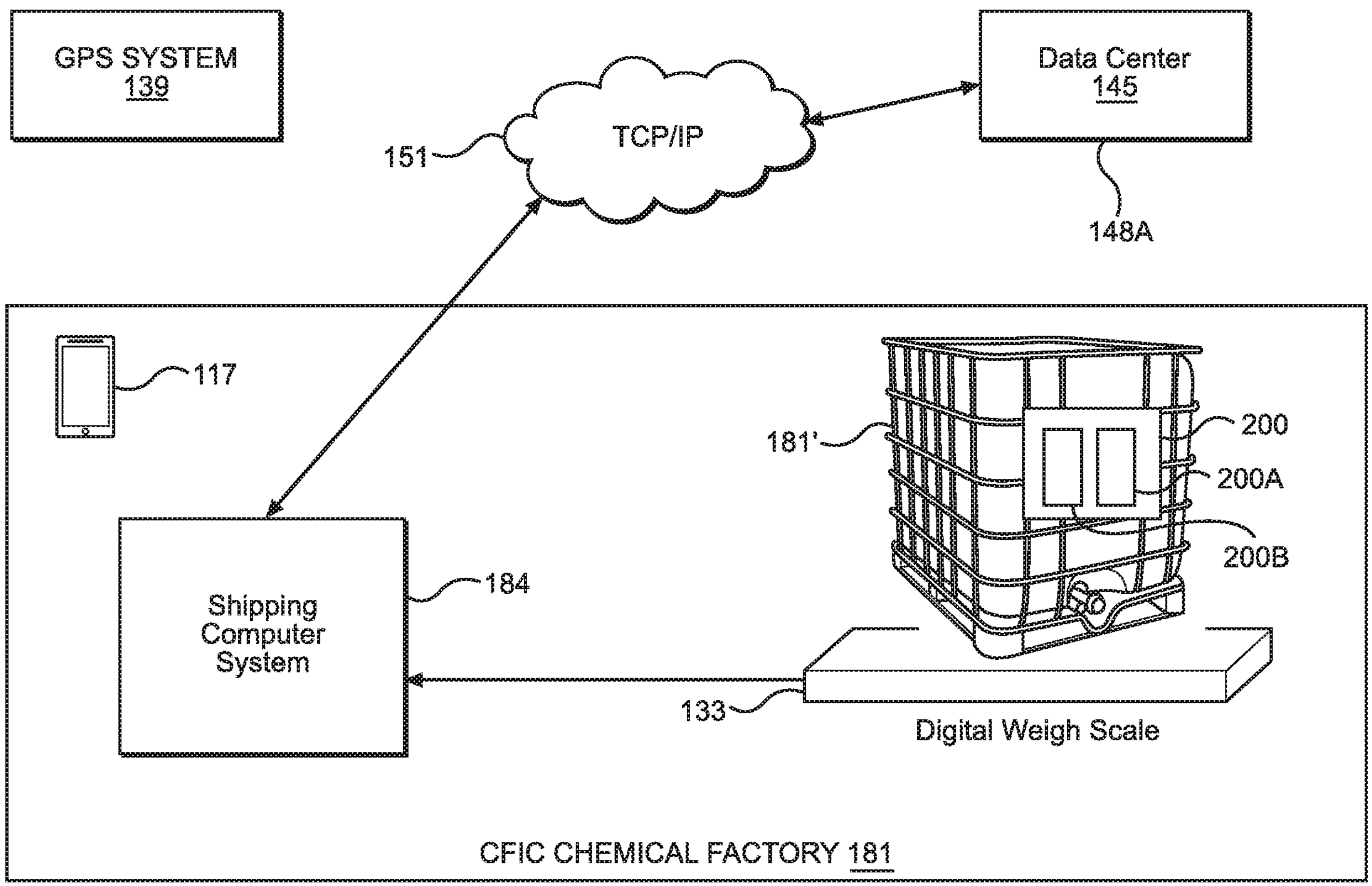
Figure 76B:
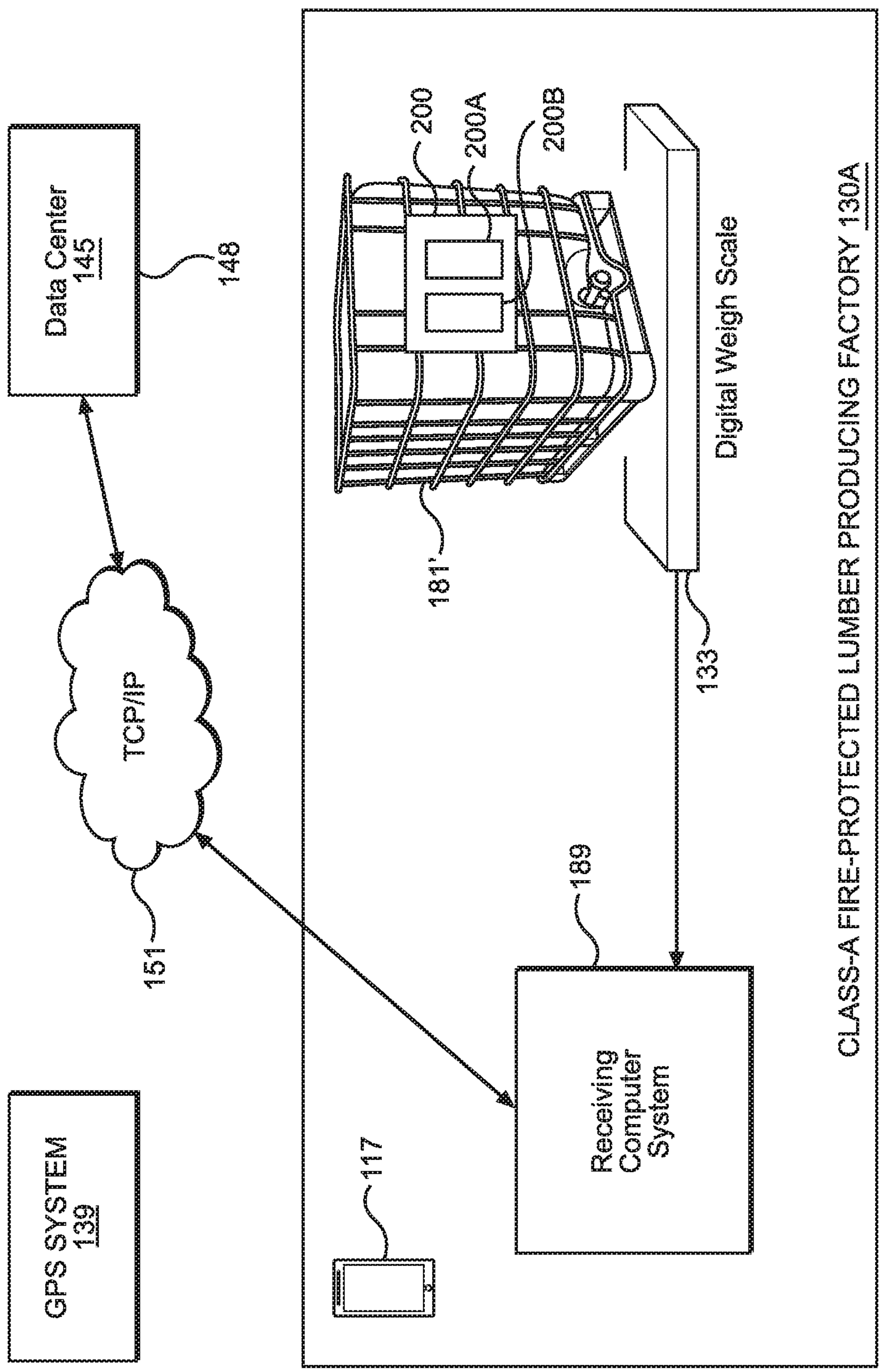
Figure 79:
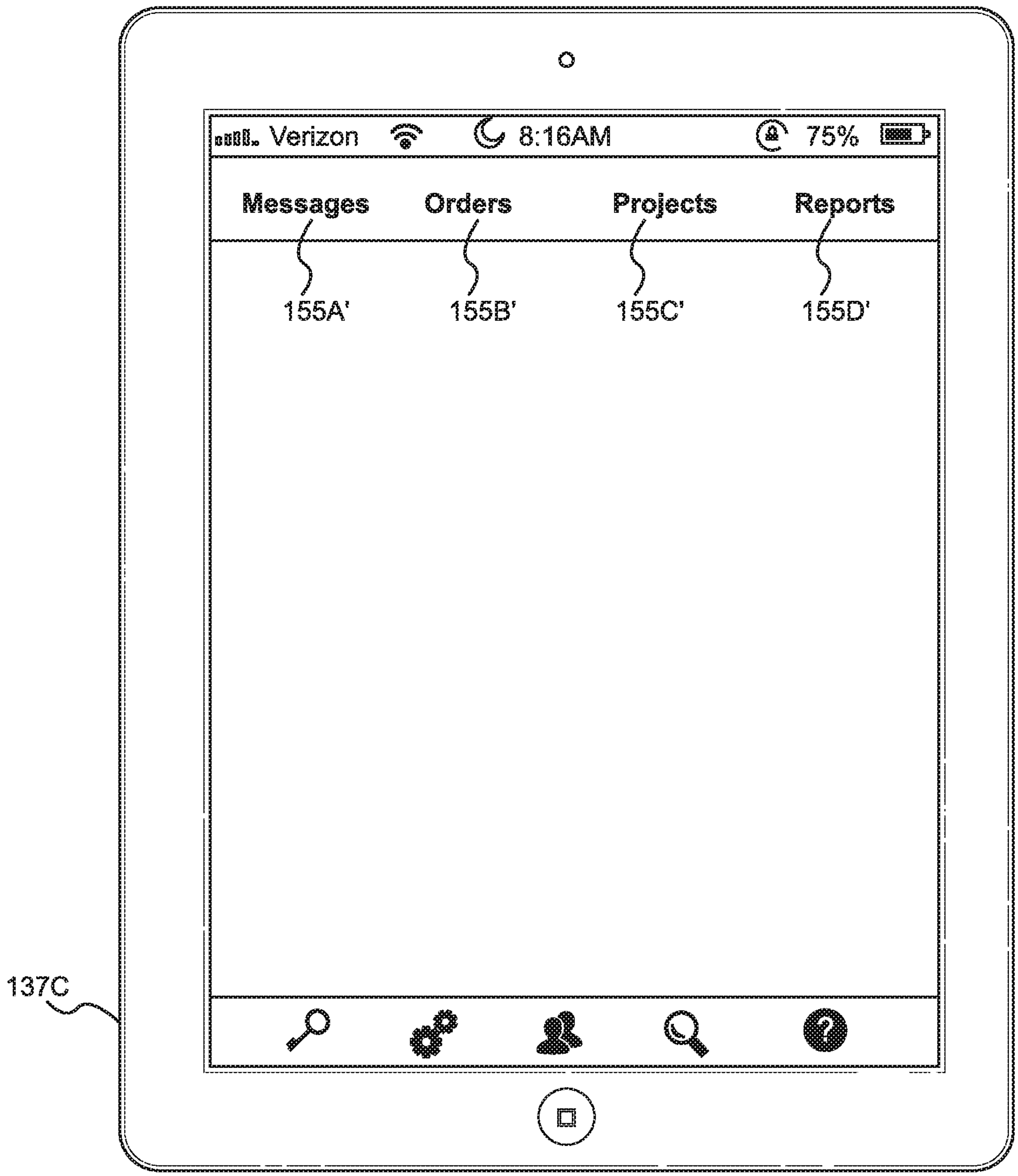
Figure 82A:
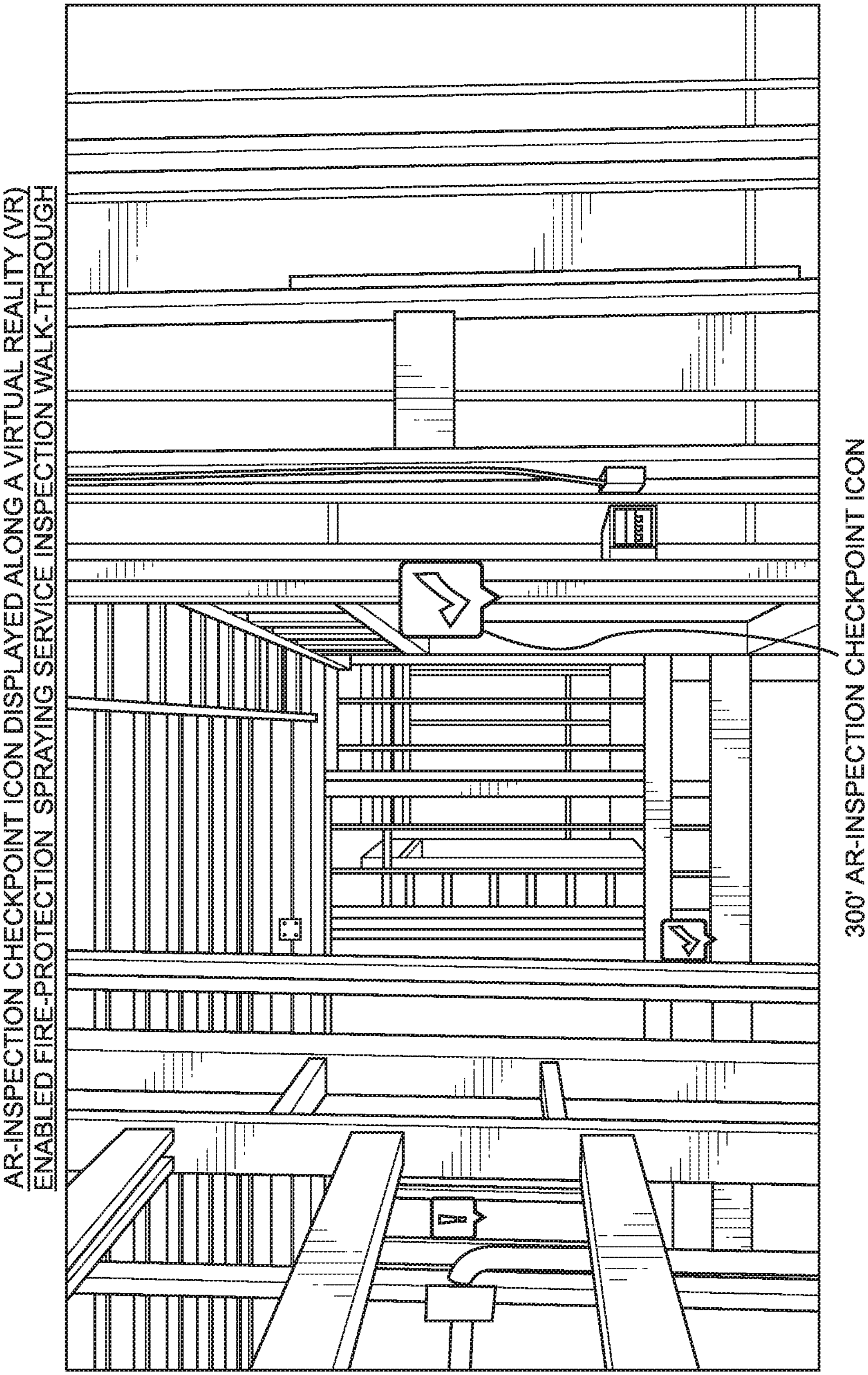
Figure 82B:
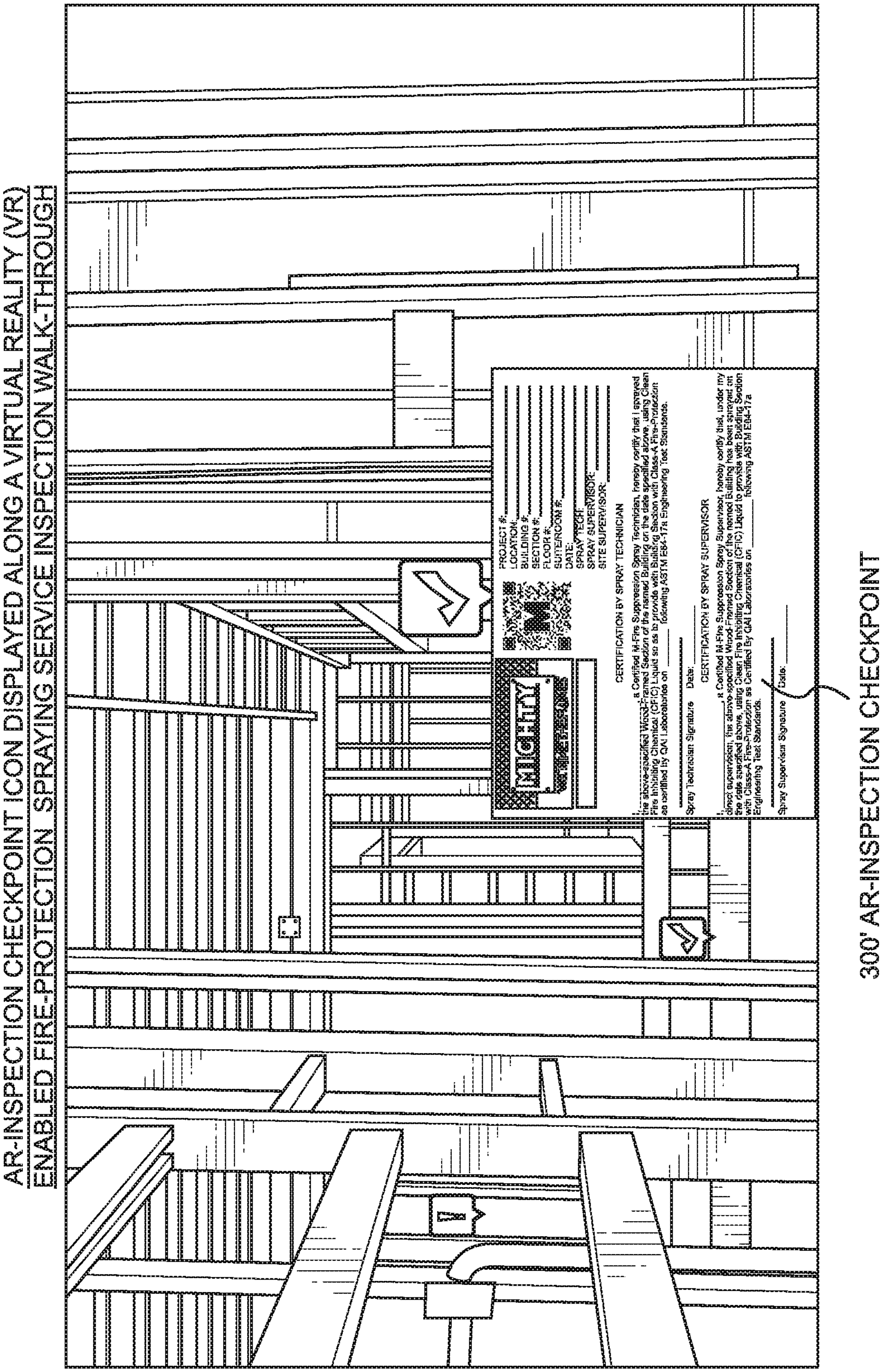
Figure 82C:
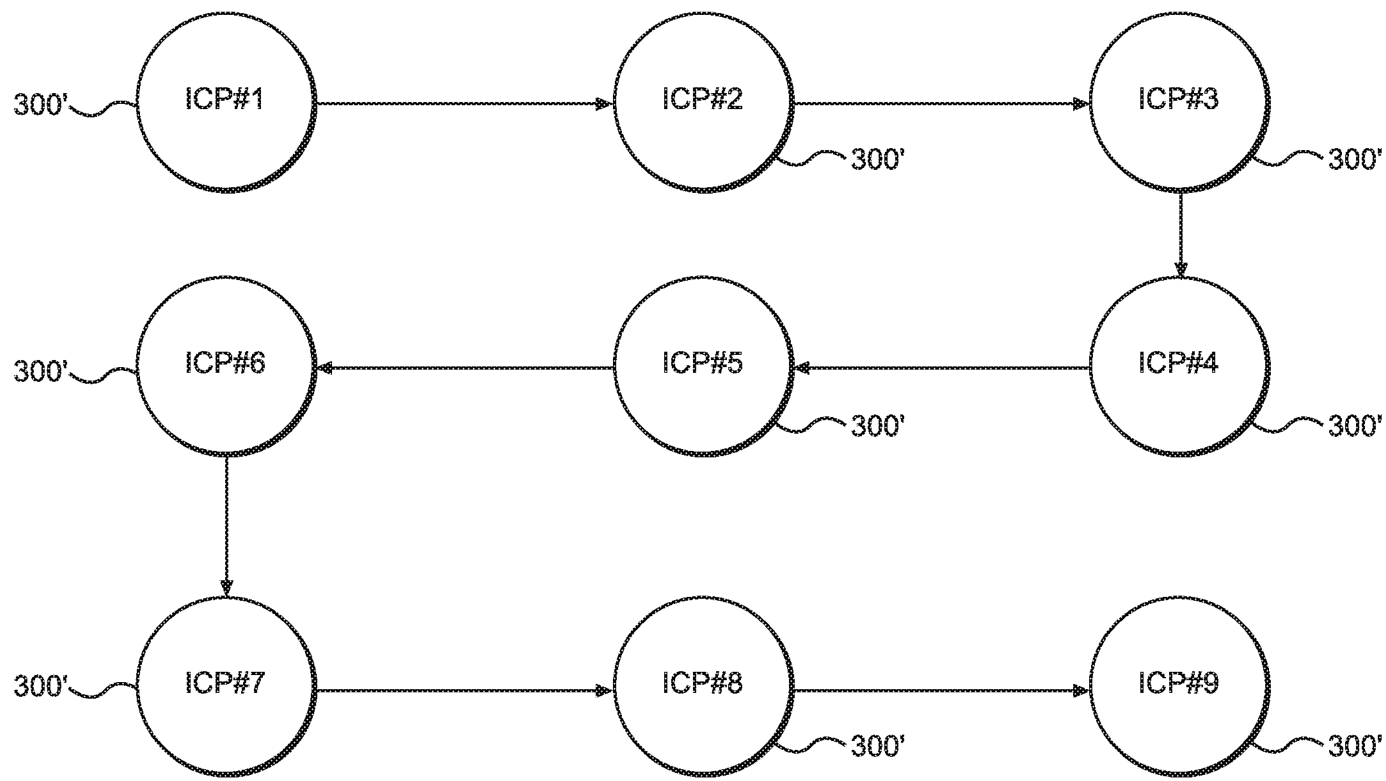
Figure 83A:
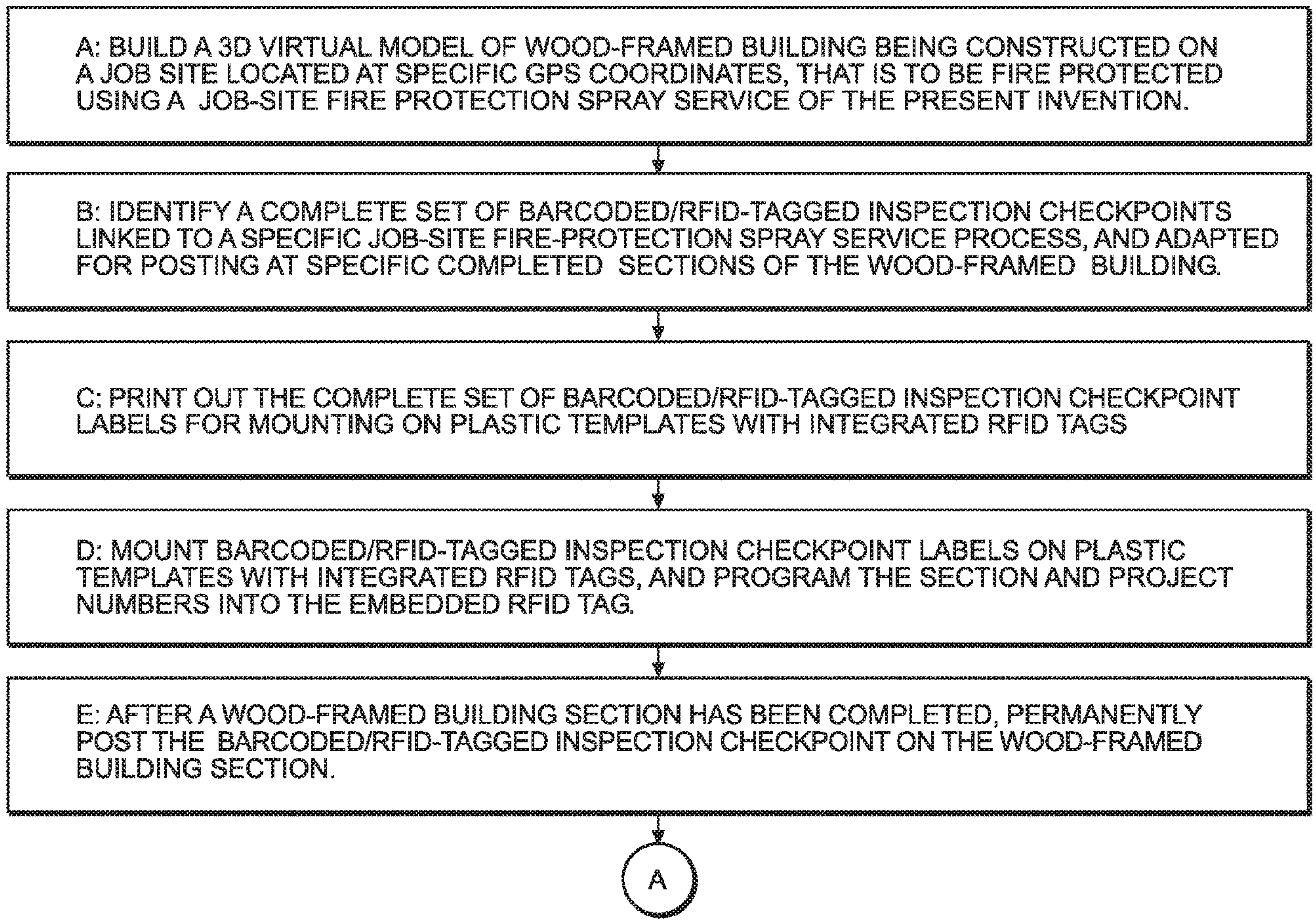
Figure 83B:
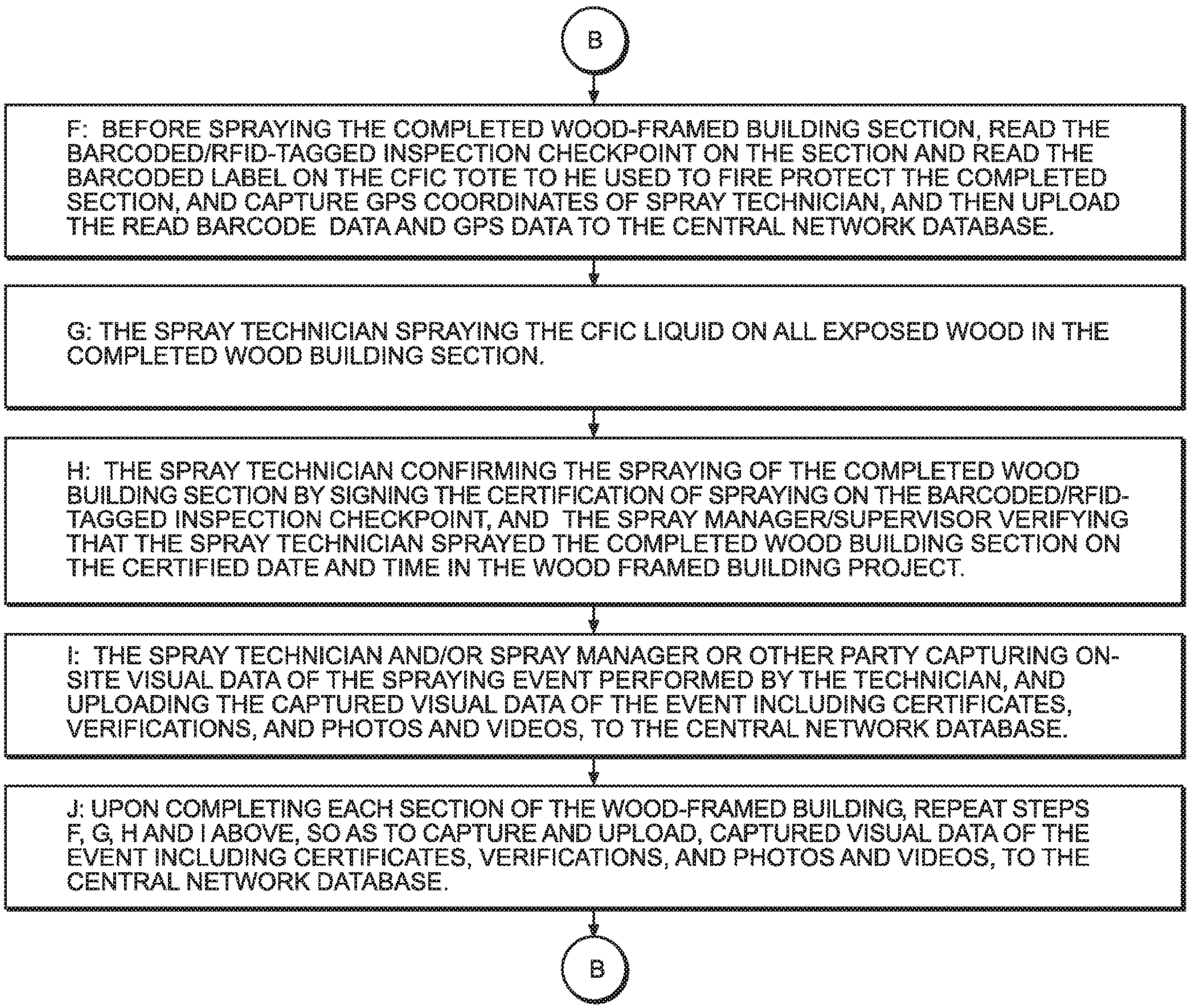
Figure 83C:
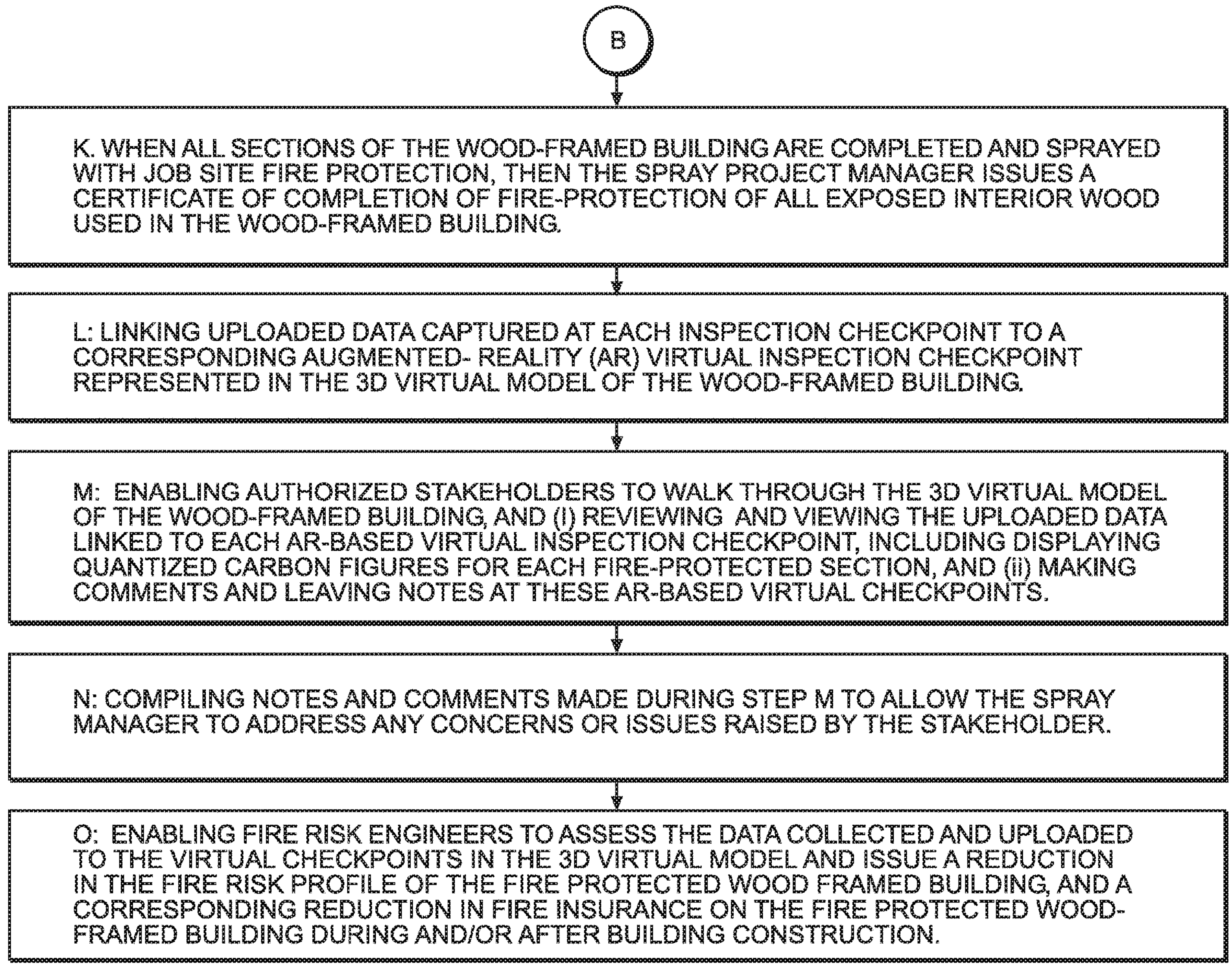
Figure 84A:
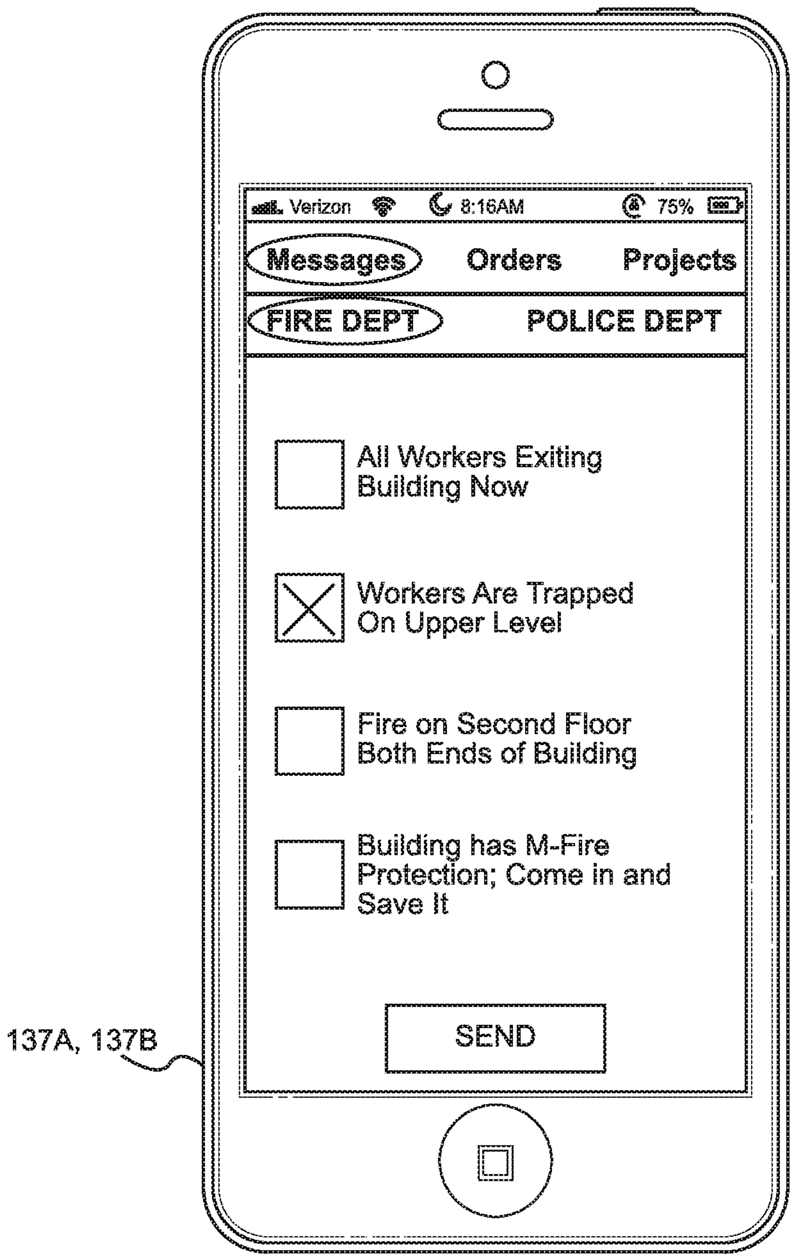
Figure 84B:
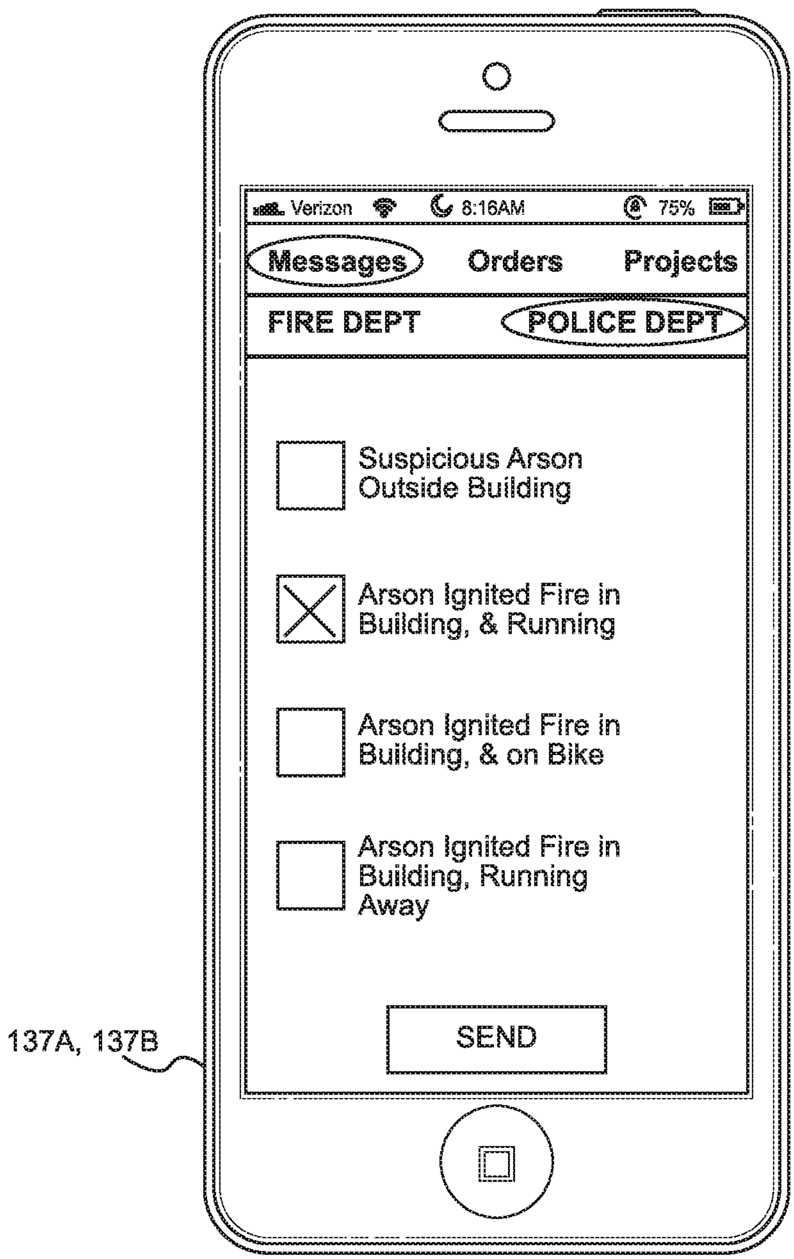
Figure 85:
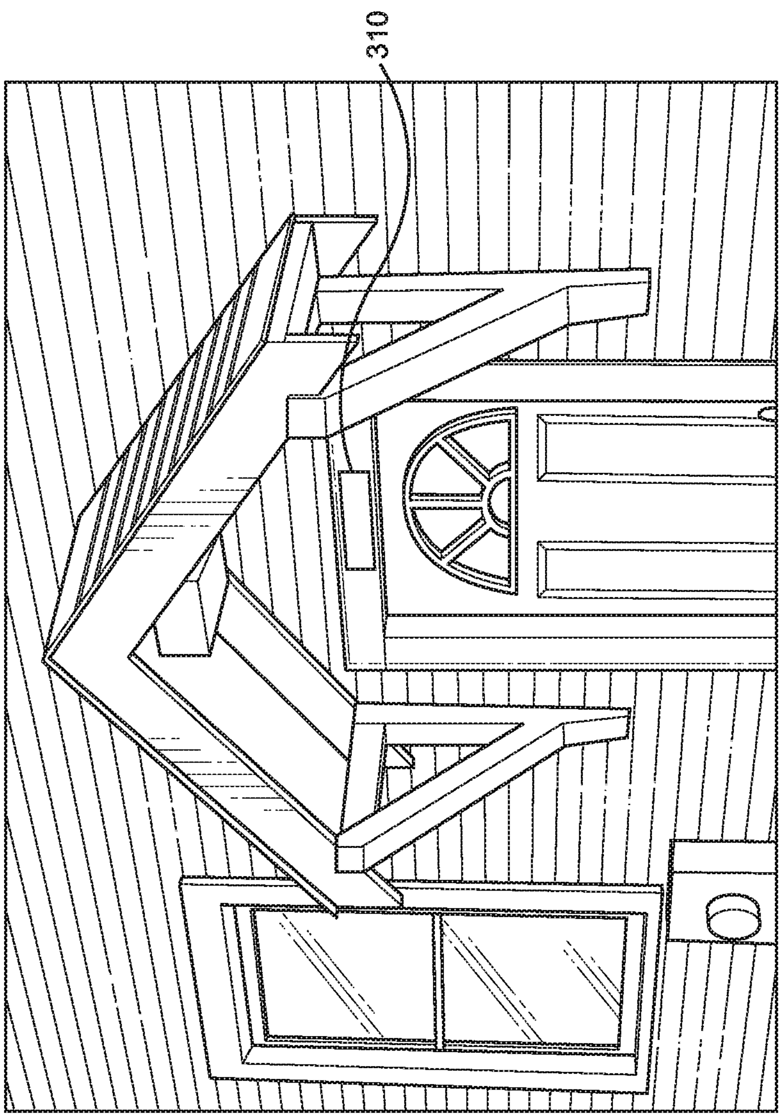
Figure 86:
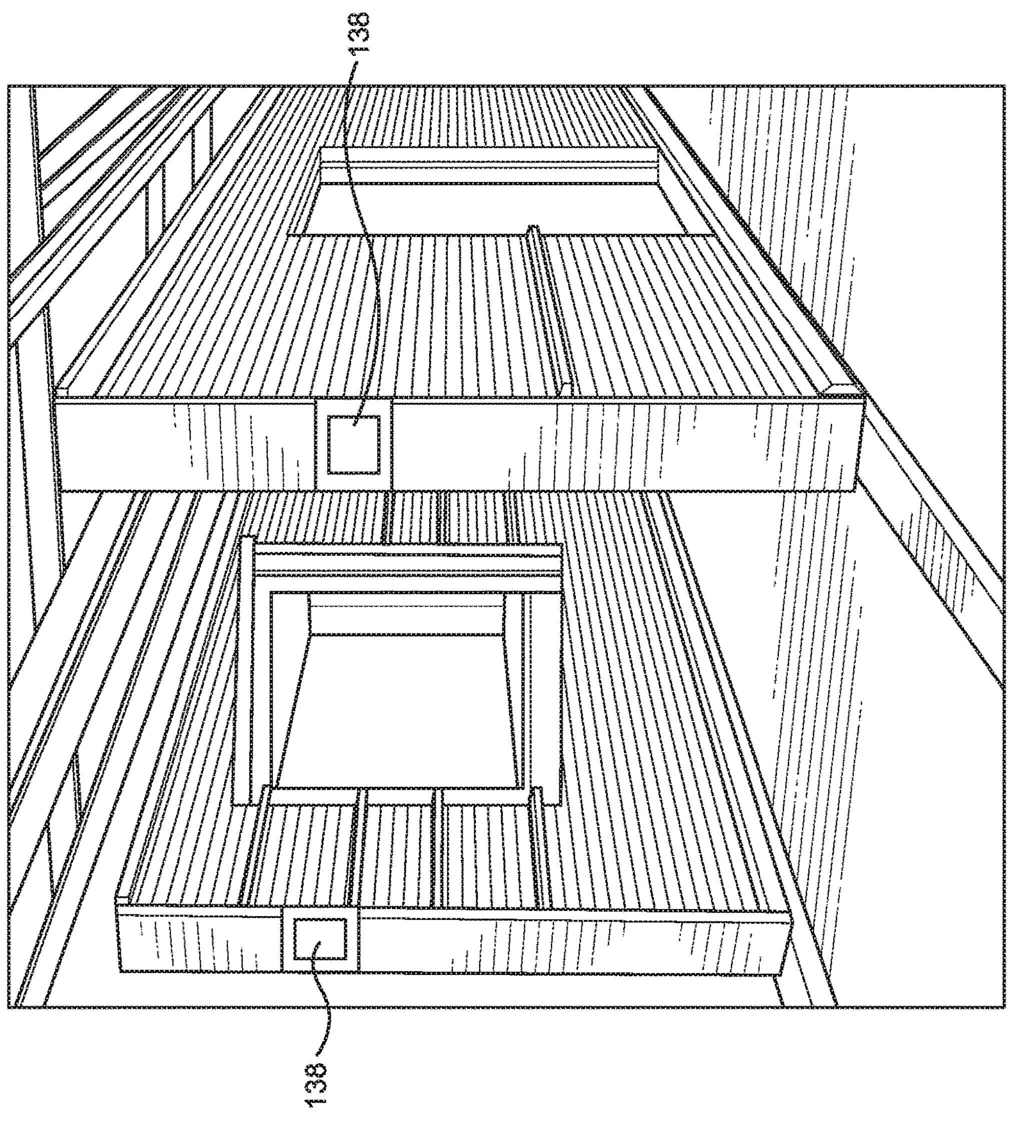
Figure 87:
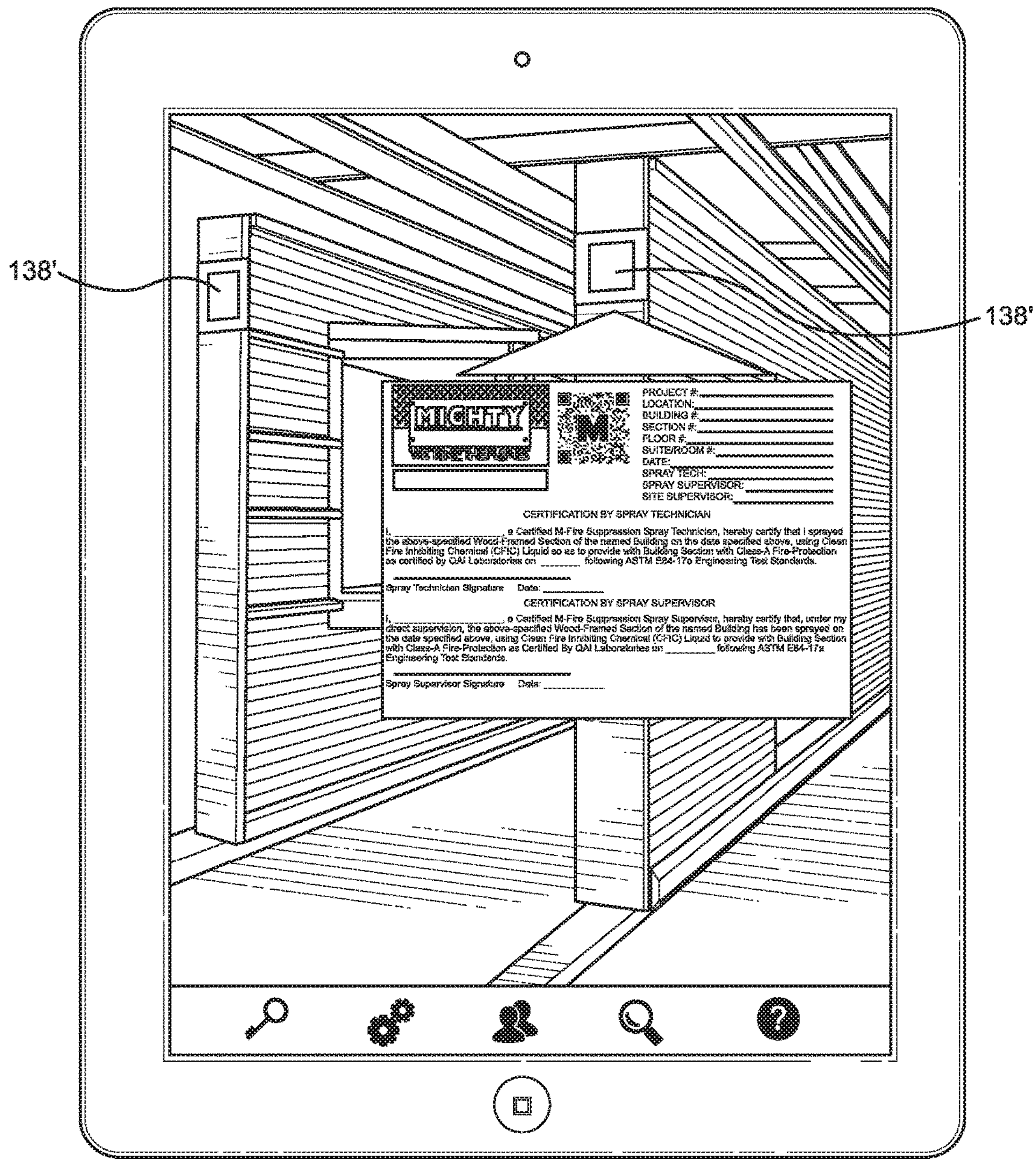
Figure 88:
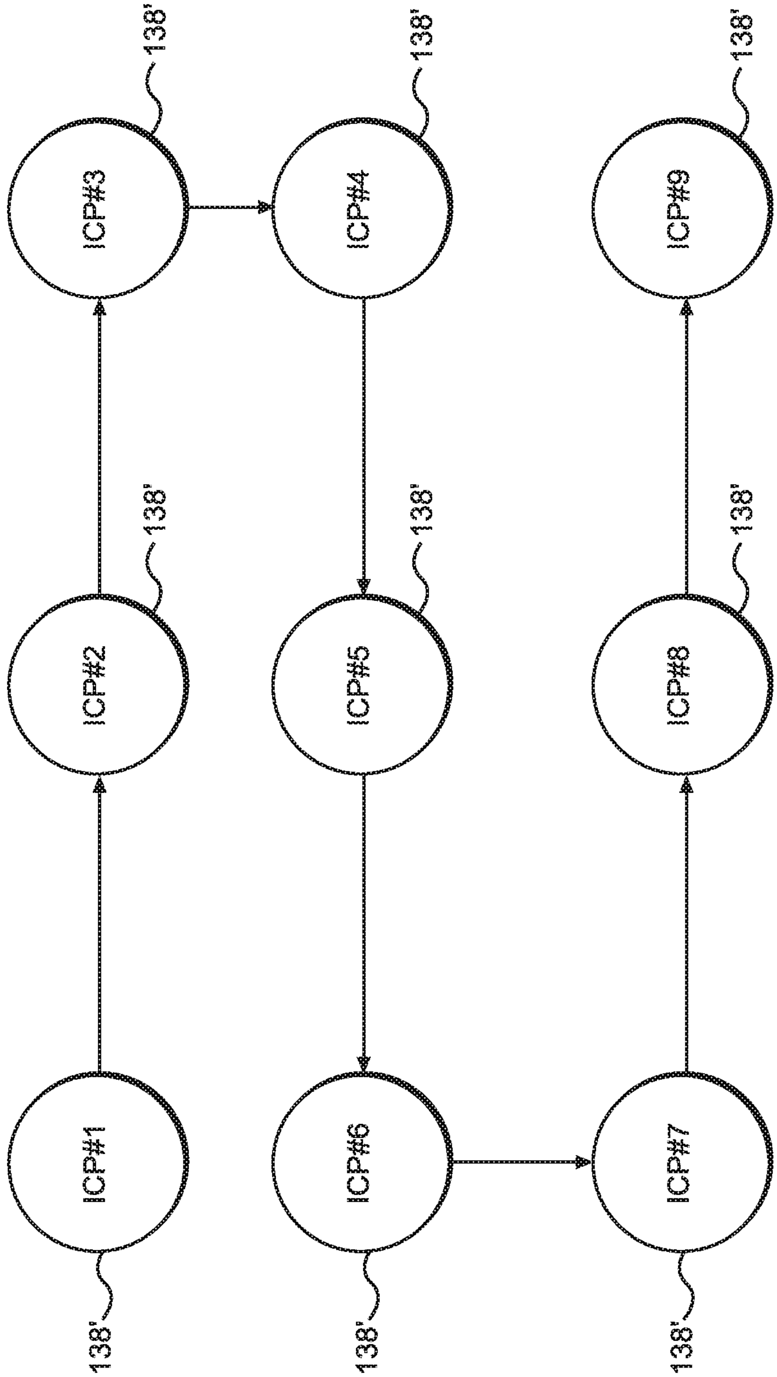
Figure 89B:
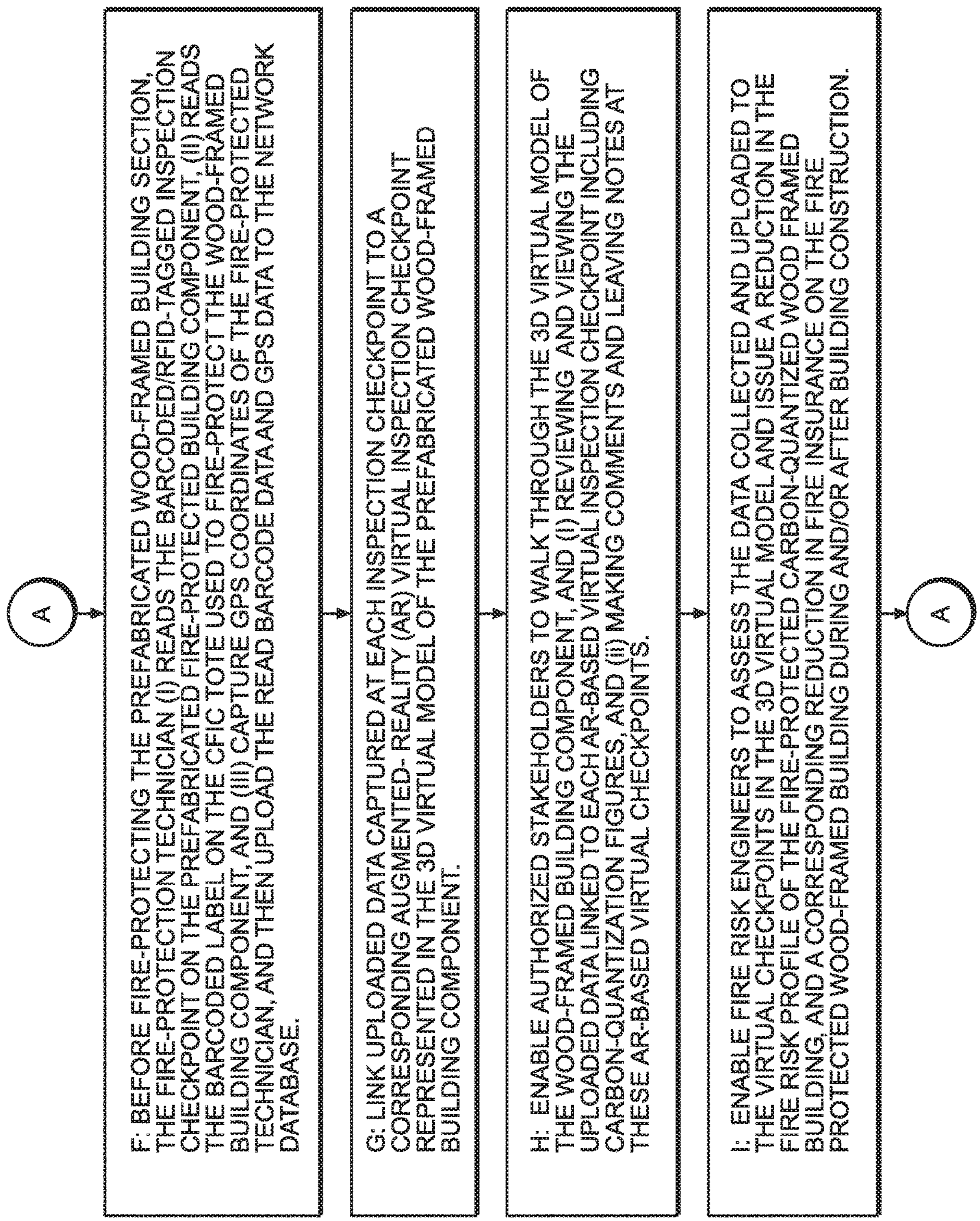

FIG. 72D is an exemplary wire frame model for a graphical user interface of the mobile application configured for use by project administrator showing progress details for a project relating to the factory-fabrication of a prefabricated fire-protected carbon-quantized wood-framed building, or prefabricated fire-protected carbon-quantized wood-framed building component, using services supported by the system network of the present invention;

FIG. 72E is an exemplary wire frame model for a graphical user interface of the mobile application configured for use by project administrator showing a message (via email, SMS messaging and/or push-notifications) received indicating that the project relating to a prefabricated fire-protected carbon-quantized wood-framed building is completed and ready for shipment to destination shipping location, using services supported by the system network of the present invention;

FIG. 73 is an exemplary wire frame model for a graphical user interface of a mobile application configured for use by project administrators, managers, fabricators and technicians showing a high-level menu of services supported by the system network of the present invention;

FIG. 73A is an exemplary wire frame model for a graphical user interface of the mobile application configured for use by project administrators and managers showing the creation of a new message about a specific project, using message services supported on the system network of the present invention;

FIG. 73B is an exemplary wire frame model for a graphical user interface of the mobile application configured for use by project administrator showing the status of a purchase order for a prefabricated fire-protected carbon-quantized wood-framed building, or fire-protected carbon-quantized wood-framed building component, using services supported by the system network of the present invention;

FIG. 73C is an exemplary wire frame model for a graphical user interface of the mobile application configured for use by project administrator showing the supplies required to fulfill a purchase order for a Class-A fire-protected carbon-quantized prefabricated wood-framed building, or Class-A fire-protected carbon-quantized prefabricated wood-framed building component, using services supported by the system network of the present invention;

FIG. 73D is an exemplary wire frame model for a graphical user interface of the mobile application for use by project administrator showing the bill of materials (BOM) required to fulfill a purchase order for a prefabricated Class-A fire-protected carbon-quantized wood-framed building, or Class-A fire-protected carbon-quantized wood-framed building component, using services supported by the system network of the present invention;

FIG. 73E is an exemplary wire frame model for a graphical user interface of the mobile application configured for use by project administrator showing the status of a factory project involving the prefabrication of a Class-A fire-protected carbon-quantized wood-framed building, or Class-A fire-protected carbon-quantized wood-framed building component, using services supported by the system network of the present invention;

FIG. 73F is an exemplary wire frame model for a graphical user interface of the mobile application configured for use by project administrator showing the progress of a factory project involving the prefabrication of a Class-A fire-protected carbon-quantized wood-framed building, or Class-A fire-protected carbon-quantized wood-framed building component, using services supported by the system network of the present invention;

FIG. 73G is an exemplary wire frame model for a graphical user interface of the mobile application configured for use by project administrator showing the supplies required by a factory project involving the prefabrication of a Class-A fire-protected wood-framed building, or Class-A fire-protected carbon-quantized wood-framed building component, using services supported by the system network of the present invention;

FIG. 73H is an exemplary wire frame model for a graphical user interface of the mobile application configured for use by project administrator showing a report on purchase orders placed for the prefabrication of a Class-A fire-protected wood-framed building, or Class-A fire-protected carbon-quantized wood-framed building component, using services supported by the system network of the present invention;

FIG. 73I is an exemplary wire frame model for a graphical user interface of the mobile application configured for use by project administrator showing a report on projects involving the prefabrication of a Class-A fire-protected wood-framed building, or Class-A fire-protected carbon-quantized wood-framed building component, using services supported by the system network of the present invention;

FIG. 73J is an exemplary wire frame model for a graphical user interface of the mobile application configured for use by project administrator showing a report on supplies required for the prefabrication of a Class-A fire-protected wood-framed building, or Class-A fire-protected carbon-quantized wood-framed building component, using services supported by the system network of the present invention;

FIG. 74 is a flow chart describing the primary steps involved in carrying out the method of operating a just-in-time (JIT) prefabricated Class-A fire-protected wood-framed building factory system supporting multiple production lines for producing Class-A fire-protected carbon-quantized wood-framed components, as needed to construct purchase orders (POs) received for prefabricated Class-A fire-protected wood-framed buildings;

FIG. 75 is a flow chart describing the high-level steps involved in carrying out the method of qualifying a prefabricated wood-framed building for reduced property insurance premiums, based on verified and documented dip-infusion of wood pieces in a dipping tank containing clean fire inhibiting chemical (CFIC) liquid during fabrication of Class-A fire-protected carbon-quantized wood building components for prefabricated wood-framed buildings;

FIG. 76 is schematic diagram of the supply chain management and quality control (QC) process supported by the system network of the present invention, shown in FIG. 69, wherein the CFIC tote chain-of-custody, GPS tracking and inventory management system application is deployed to manage and control the weight and quality of the contents in each CFIC tote from the time of shipment from the chemical blending factory up to the time of arrival at the customer factory site where the CFIC tote is received from the chemical factory or warehouse, then either accepted or rejected depending on the comparative weight measurements of the shipped CFIC totes made at the receiving factory site using a digital code scanning and weighing (scale) system (SWS), so as to add each scanned and weighed CFIC tote into the inventory of the licensed concern;

FIG. 76A is a schematic diagram illustrating the weighing of CFIC liquid totes at chemical factory before shipment and recording tote weight in supply chain management database;

FIG. 76B is a schematic diagram illustrating the weighing CFIC liquid totes at building construction job site, and recording tote weight in supply chain management database before acceptance;

FIGS. 77A, 77B, 7C and 7D, taken together, is flow chart describing the high level steps carried out in a method of maintaining the chain of custody and quality control when producing and supplying clean fire inhibiting chemical (CFIC) material (e.g. liquid or dry powder) in locked totes shipped from chemical factory to a network of building construction job sites;

FIG. 78A is a schematic representation of a database record within the network database supported on the system network, for each purchase order for a quantity of CFIC totes to be shipped to a particular destination;

FIG. 78B is a schematic representation of a database record within the network database supported on the system network, for each CFIC tote shipment shipped to a particular destination and either rejected or accepted into inventory;

FIG. 79 is an exemplary wire frame model for graphical user interface of the mobile application for use by project administrators, managers, fabricators and technicians, showing the high-level menu of services supported by the system network;

FIGS. 79A, 79B, 79C, 79D, 79E, 79F, 79G, 79H, 79I, 79J, 79K and 79L is an exemplary wire frame model for a graphical user interface of the mobile application for use by project administrator receiving chemical supplies to fulfill a purchase order for CFIC material to be delivered to a lumber producing factory, delivering CFIC material to a particular Class-A fire-protected carbon-quantizing lumber producing factory system, and scanning and weighing delivered CFIC totes and either rejecting or accepting the totes into the recipient's inventory, using services supported by the system network;

FIG. 80A shows a table describing the various stakeholders provided services by the enterprise-level system of the present invention, using mobile computing systems deployed on wireless communication networks, wherein the stakeholders include property owners, financial institutions, building construction managers, job site construction managers, general contractors, building architects, job site construction workers, sales representative, logistics coordinator, supply chain manager, job site spray manager, job site spray technicians, local fire department, local police department, local building inspectors, local neighbors, construction insurance underwriter, property/building insurance underwriter, and risk engineering managers;

FIGS. 81A, 81B, 81C, 81D, 81E and 81F, taken together, show a flow chart describing the primary steps carried out when practicing a method of ordering, delivering, inspecting, documenting and managing professional fire-protection spray services performed on wood-framed or mass timber building construction job-sites, while supporting diverse stakeholders and their interests using mobile computing systems deployed over wireless communication networks;

FIGS. 82A and 82B show a sequence of screenshots of graphical user interfaces (GUIs) displayed during a virtual reality (VR) and augmented reality (AR) supported virtual inspection process of a fire-protected job-site supported by the enterprise-level system of the present invention, illustrated in FIGS. 55 and 69, wherein the virtual process of inspecting the fire-protected job site is based on a 3D virtual model of the fire-protected wood-framed building under construction, and wherein at each virtual inspection checkpoint in the 3D virtual model collected and uploaded certifications, verifications and documents, including fire-protected carbon units (FPCUs) automatically computed using the apparatus disclosed in FIGS. 7 through 8B, are reviewable during the inspection walkthrough, and allowing the reviewer to take and post notes to other stakeholders represented in the system;

FIG. 82C is a schematic representation of a virtual reality (VR) enabled walk-through inspection of the fire-protection spray process of the present invention applied to a wood-framed building, with AR-Inspection Checkpoint Icons (ICP #1 through ICP #9) displayed along the VR-enabled walk-through, containing signed certification and verification documents and data collected from the construction job site, and computed fire-protected carbon units (FPCUs), for display, review and downloading during the inspection walk-through;

FIGS. 83A, 83B and 83C, taken together, set forth a flow chart describing the primary steps performed during the virtual fire-protection job-site inspection process of the present invention, using virtual reality (VR) and augmented reality (AR) technologies to support virtual inspection of a fire-protected job-site based on a 3D virtual model of the fire-protected wood-framed building under construction;

FIG. 84A is an exemplary wire frame model for a graphical user interface of the mobile application for use by job site construction workers enabling them to instantly select and send specific-kinds of emergency messages to the local fire department with a single screen click, using services supported by the system network of the present invention;

FIG. 84B is an exemplary wire frame model for a graphical user interface of the mobile application for use by job site construction workers enabling them to instantly select and send specific emergency messages to the local police department with a single screen click, using services supported by the system network of the present invention;

FIG. 85 is a schematic illustration of the front door of a wood-framed house that has been fire-protected using the fire-protection spray process (i.e. services) of the present invention, and also carbon-quantized, and where a barcoded/RFID-tagged fire-protection indication badge has been mounted above the exterior door frame for easy reading by firemen and other first responders using their human vision, or electro-optical and/or electromagnetic scanners and readers to instantly ascertain that the house is fire-protected, with an extended fire rating, as documented in an accessible central network database, and/or Internet-based registry, and/or encoded within the barcoded/RFID-tagged fire-protection indication badge;

FIG. 86 is perspective view of a set of prefabricated fire-protected wood-framed building panels manufactured in a prefabricated building panel factory;

FIG. 87 is a virtual reality (VR) enabled walkthrough inspection of prefabricated fire-protected wood-framed building components (e.g. panels) supported on a client computing system deployed in the enterprise system of the present invention, showing augmented reality (AR) Inspection Checkpoint Icons therein, with one being expanded to the show the actual signed inspection checkpoint captured and uploaded to the network database, during the confirmation and verification process;

FIG. 88 is a schematic representation of a virtual reality (VR) enabled walk-through inspection of the factory-applied fire-protection process of the present invention applied to a prefabricated wood-framed building manufactured in a factory, with AR-Inspection Checkpoint Icons (ICP #1 through ICP #9) displayed along the VR-enabled walk-through, containing signed certification and verification documents and data collected from the factory, as well as fire-protected carbon units (FPCUs) quantized by the system, for display, review and downloading during the inspection walk-through; and FIGS. 89A and 89B, taken together, set forth a flow chart describing the primary steps performed during the virtual fire-protection factory inspection process of the present invention, using virtual reality (VR) and augmented reality (AR) technologies to support virtual inspection of a factory-applied fire-protected wood-building components, based on a 3D virtual model of the fire-protected wood-framed building components manufactured in the factory.

DETAILED DESCRIPTION OF THE ILLUSTRATIVE EMBODIMENTS OF THE PRESENT INVENTION

Referring to the accompanying Drawings, like structures and elements shown throughout the figures thereof shall be indicated with like reference numerals.

Figure 6:
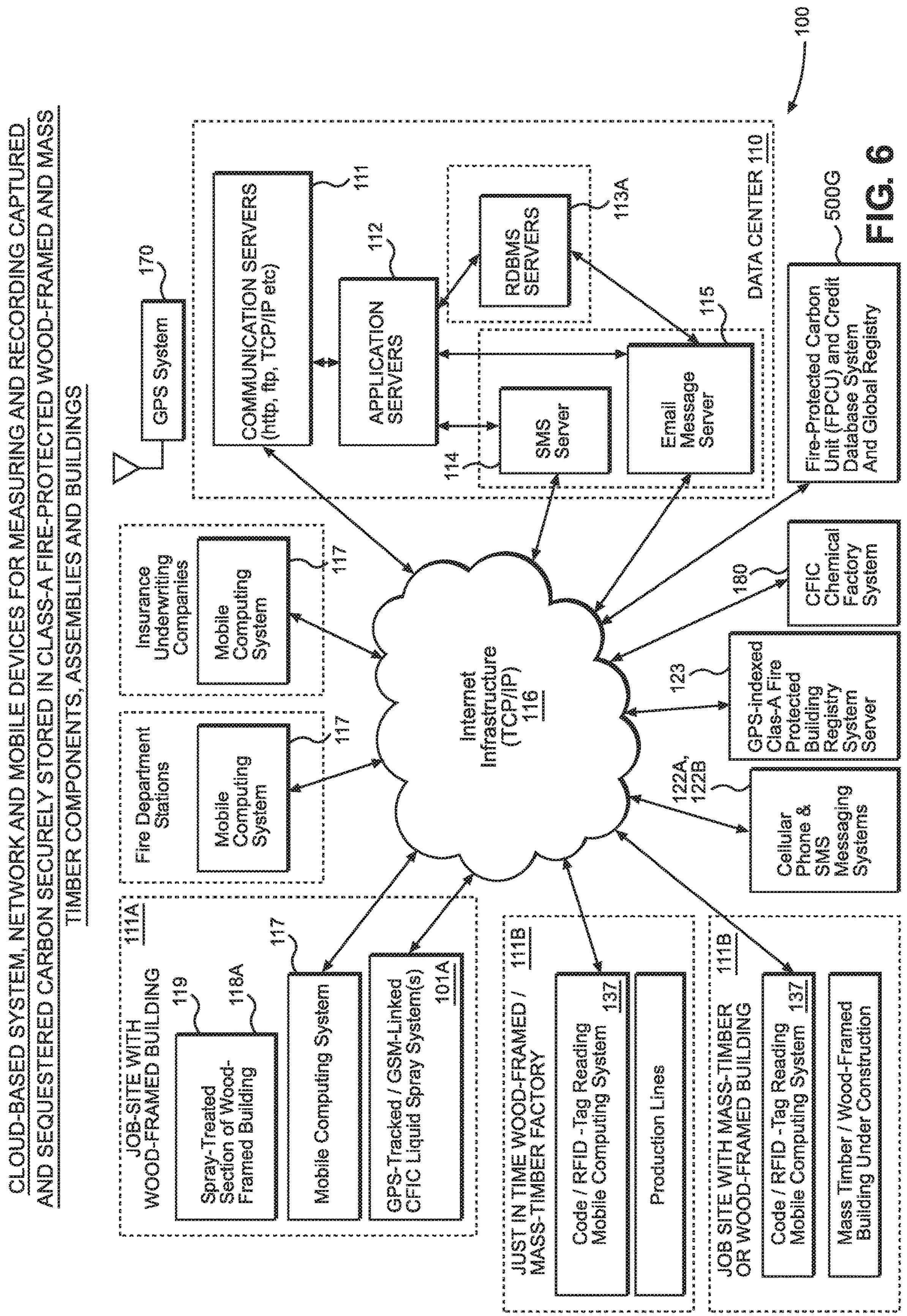
FIG. 6 is a schematic representation of the cloud-based system and network o the present invention supporting mobile devices on the network for measuring and recording captured and sequestered carbon securely stored in Class-A fire-protected wood-framed and mass-timber components, assemblies and buildings on construction job-sites, and prefabrication factory environments.

Specification of Cloud-Based System, Network and Mobile Devices for Measuring and Recording Captured and Sequestered Carbon Securely Stored in Class-A Fire-Protected Wood-Framed and Mass-Timber Components, Assemblies and Buildings on Construction Job-Sites, and Prefabrication Factory Environments FIG. 6 show the cloud-based system and network 100 of the present invention supporting mobile devices 117, 137 on the network for measuring and recording (i.e. quantizing) captured and sequestered carbon securely stored in Class-A fire-protected wood-framed and mass-timber components, assemblies and buildings on construction job-sites, and prefabrication factory environments, as well as support the many other function such mobile devices have been adapted to provide the various stakeholders served by the system.

As shown in FIG. 6, the Internet-based (i.e. cloud-based) system network 100 is adapted and configured for verifying and documenting Class-A fire-protection treatment of a wood-framed building using on-site spraying of a clean fire inhibiting chemical (CFIC) liquid, as described through the Specification and Drawings, and also estimating and recording (i.e. quantizing) the fire-protected carbon units (FPCUs) stored in Class-A fire-protected wood-framed and mass timber buildings and building components used to constructed the same. As shown, the network 100, comprises: (i) a data center 110 with web servers 111, application servers 112 and database servers 113, with SMS servers 114 and email message servers 115, each operably connected to the TCP/IP infrastructure 114 of the Internet 116 for supporting a web-based site for hosting images/videos of certificates of completion 119 stamped or printed on spray-treated wood surfaces, at registered inspection checkpoints, often with other certification documents; (ii) mobile computing systems 117 (117A, 117B, 117C) and 137 (137A, 137B, 137C) (e.g. smart-phones such as the Apple iPhone and Samsung Android phone with or without head/body mounting apparatus) with either a mobile application 120 installed, and a web-browser application, as discussed further hereinafter; (iii) Clean Fire Inhibiting Chemical (CFIC) Factory (i.e. Manufacturing) Systems 180 deployed around the planet, and connected to the infrastructure of the Internet and various product shipment and transportation systems (e.g. FEDEX, etc.); and (iv) Fire-Protected Carbon Unit (FPCUs) and Credit Database System and Global Registry 500G for recording and registering all Fire-Protected Carbon Mass) Units (FPCUs) quantized using the carbon quantization engine 500 running over the network 100 of the present invention, and assigned and linked to specifically code-identified wood products (e.g. fire-protected lumber pieces, fire-protected wood-framed building components, fire-protected mass timber building components, fire-protected wood-framed buildings, fire-protected mass timber buildings, and other fire-protected wood structures), owned by a specific registered system users, each of whom is issued a FPCU user identification card 800 shown in FIG. 8A realizable on a plastic card provided with unique ID number registered in the database 500G maintained on the system network 100, and which is used whenever a system user desires to make a request for carbon quantization of specific fire-protected wood products (FPWP) over the system network 100 of the present invention, as illustrated and described in FIGS. 7, 8A, 8B and 9, in great technical detail.

In the illustrative embodiment of the present invention, the Fire-Protected Carbon Unit (FPCUs) and Credit Database System and Global Registry 500G illustrated in FIGS. 6, 7 and 8A, is realized as a robust database management system (RDBMS) having robust data file storage, and distributed redundantly around the globe, in a manner well known in the data storage arts. The database tables supported by the RDBMS-based FPCU Database System and Global Registry 500G will manage data items corresponding to numerous enterprise level objects such as: (i) fire-protected wood products (FPWPs); (ii) last GPS location and specifications relating to such FPWPs; (iii) identification of the owner (e.g. registered system user) making requests for carbon quantization of a fire-protected wood product using the quantization and registration services supported by the system network; (iv) time, date and GPS stampings on such requests and issued FPCU figures produced by the carbon quantization engine 500; (v) FPCU ownership requests and transfers; (vi) FPCU credits associated with issued FPCUs; (vii) various other information items relating to when, where and by whom Class-A fire protection service was provided to specific registered fire-protected wood products storing carbon mass, using the various fire-protection and related management services supported by the system network of the present invention.

In the preferred embodiment, each mobile computing system 117 is configured for: (i) capturing digital photographs and video recordings of completed spray-treated wood-framed sections with barcoded/RFID-tagged certificates of inspection 300 shown in FIG. 62B and posted on completed building sections during the construction phase 300, as illustrated in FIG. 62B, upon completion of the on-site fire-protection spray process at specific building sections; (ii) recording notes and averments by the spray technicians who applied the CFIC liquid spray and supervisors who supervised the same; and (iii) uploading such time-date-stamped digital audio-video (AV) recordings and 121 to the servers 111, 112, 113 in the data center 110, providing documented evidence of barcoded/RFID-tagged certificates of inspection (at inspection checkpoints) 300 stamped/printed or otherwise posted on the surfaces of sprayed wood surfaces, for each fire-protection spray-treatment project, so that insurance companies, builders, and other stakeholders (who are registered users of the system) can access and review such on-site spray completion certifications during and after the construction phase of a wood-framed building, for various purposes.

Figure 68A:
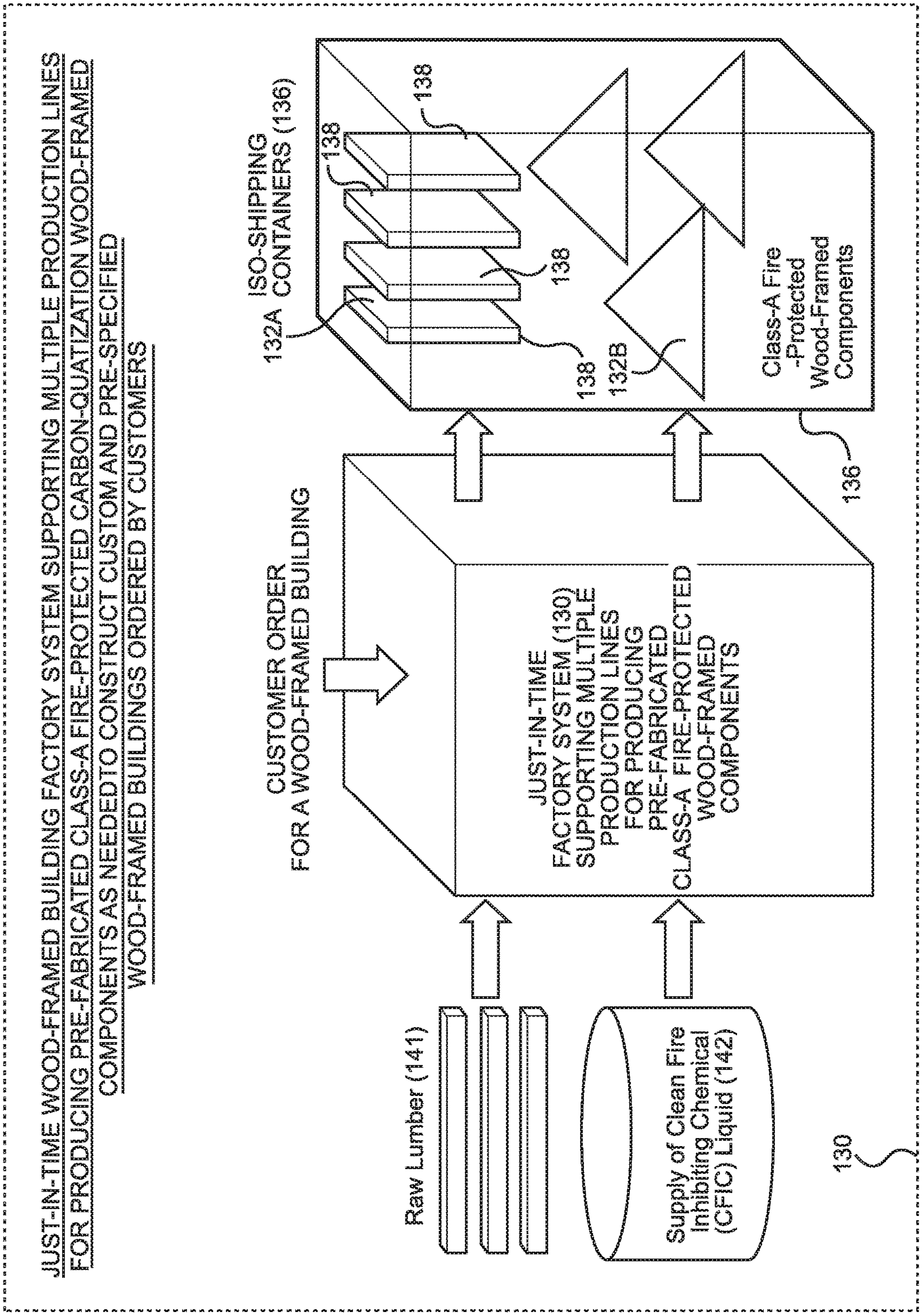
FIG. 68A is a schematic representation of a just-in-time wood-framed building factory system supporting multiple production lines for producing pre-fabricated Class-A fire-protected wood-framed components as needed to construct custom and pre-specified wood-framed buildings ordered by customers.
Figure 68B:
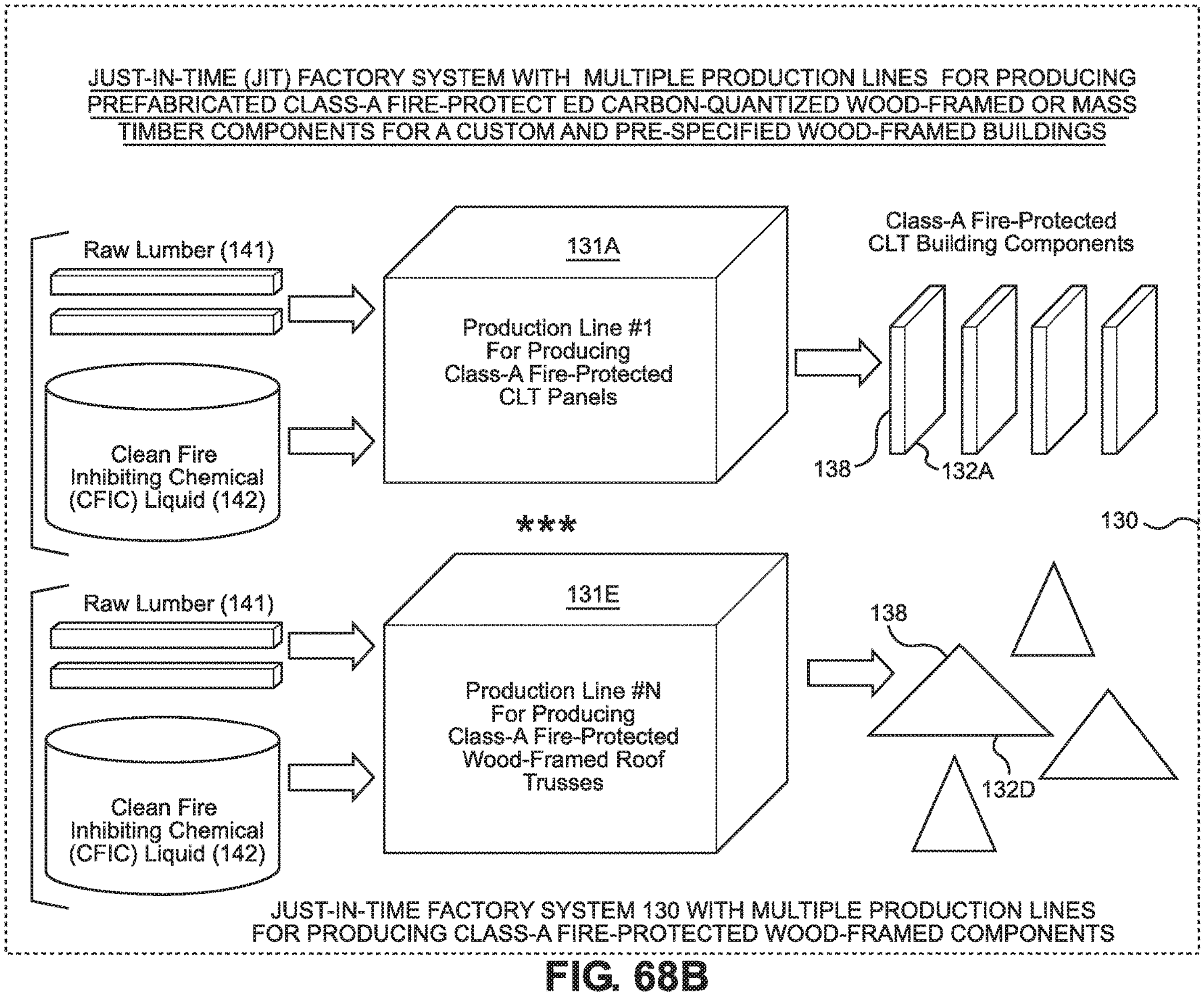
FIG. 68B is a schematic representation of a just-in-time (JIT) factory system with multiple production lines for producing prefabricated Class-A fire-protected wood-framed components (e.g. wood-framed walls, staircases, roof trusses, floor trusses, etc.) for use in constructing custom and pre-specified wood-framed buildings ordered by customers for production and delivery to specific destination locations.

In the preferred embodiment, each mobile computing system 137 is configured for: (i) capturing digital photographs and video recordings of completed fire-protected wood-framed building components 132 and mass-timber building components 132 with barcoded/RFID-tagged certificates of inspection 138 shown in FIG. 63C and posted on each building component 132 being prefabricated in a factory environment, as illustrated in FIGS. 68A and 68B, upon completion of the fire-protection treatment process (e.g. applied via spray and/or dip-infusion methods) on specific building component sections in a factory environment; (ii) recording notes and averments by the spray technicians who applied the CFIC liquid spray and supervisors who supervised the same; and (iii) uploading such time-date-stamped digital audio-video (AV) recordings and 121 to the servers 111, 112, 113 in the data center 110, providing documented evidence of barcoded/RFID-tagged certificates of inspection (at inspection checkpoints) 138 stamped/printed or otherwise posted on the surfaces of sprayed wood surfaces, for each fire-protection treatment project, so that insurance companies, builders, and other stakeholders (who are registered users of the system) can access and review such factory-applied fire-protection services and corresponding completion certifications during and after the prefabricated phase of a wood-framed or mass timber building, for various purposes.

The job-site fire-protection liquid spray process of the present invention supported by the system network 100 at each registered wood-framed and mass timber building 111A is described in FIGS. 49 through 67L, and hereinafter in the Patent Specification.

The just-in-time wood-framed and mass timber factory system 130 with production lines 131 for producing Class-A fire-protected carbon-quantized pre-fabricated building components, is described in FIGS. 68A through 81F.

FIG. 7 represents the cloud-based carbon-quantization engine, system and process 500 of the present invention is supported by the system network 100 of the present invention shown in FIG. 6 for estimating and recording (i.e. quantizing) quantities of carbon mass (measured in kg or tons) securely stored in Class-A fire-protected wood-framed and mass-timber building components, assemblies and buildings on construction job-sites, and in prefabrication factory environments. As will be described in greater detail hereinafter, the carbon quantization engine 500 uses computational and information resources supported within the data center 110 of the network, well as the mobile or remote computing systems 117, 137, creating and sending carbon quantization requests to the data center 110 over the network, and generating and display fire protect carbon unit (FPCU) reports and product labels for application to fire-protected carbon-quantized wood-frame and mass timber building components, and composite building systems constructed therefrom, to provide a specific carbon footprint for the constructed wood framed and/or mass timber building.

As shown in FIG. 7, the carbon quantization engine 500 estimates the quantity of carbon mass (e.g. measured in kg or tons) that is stored in fire-protected wood products used in GPS-specified wood framed and mass timber buildings under construction, or during prefabrication.

As shown in FIG. 7, the carbon-quantization engine 500 of the present invention comprises: a carbon calculation/estimation module 500A for receiving requests to estimate/calculate the amount of carbon mass (measured in kilograms or kg, or Tons) stored in a specific piece and species of dimensioned wood/lumber, or wood-framed panel or mass timber building component 132, typically used in a adequately dried state with a particular low moisture content within the fiber of the wood; a GPS and time and data stamping module 500D for applying GPS, time and data stamping to each request for fire-protected carbon unit (FPCU) quantization on the network 100; a wood species database 500B containing information on (i) the amount of carbon in kg stored in (or recoverable from) specific species of wood of a specific mass at a particular moisture content percentage, (ii) the wood species' "rate of carbon recovery" (expressed as a percentage weight, e.g. 0.85), and (iii) the amount of mass in a board foot length of a particular species of dimensioned wood product, at a specific moisture content; a building design and BIM (building information modeling) database 500C containing information models and information elements (e.g. lumber tables of specific wood species, dimensions, and board footage for each kind of lumber material to be used to construct each structural element specified in the building design) and specifying the quantities of wood (in terms of dimensions and board feet measurements and parameters) used in the construction of a specific building located at given address and set of GPS coordinates; and a fire protected carbon unit (FPCU) credit processor 500E for calculating any one or more different credits (e.g. tax credits or industry credits) based on a specific amount of fire-protected carbon units (FPCUs) quantized by the system network 100, and including a credit table with formulas for converting each FPCU figure measured in [kg] or [Ton] into a FPCU-based credit measured in terms of a specific economic value within another system of value (e.g. US Dollars $) or based on another and different economic system, token system, or other value system that may be devised and adopted by a particular group of people.

As shown, each piece of fire-protected wood or lumber or building component, or completed building section within a wood-framed building that has been sprayed with CFIC liquid, is identified by a mobile or stationary computing system 117, 137. This identification step is typically achieved by reading a unique code symbol or code symbol/RFID tag (132) applied to the wood product, or barcoded/RFID-tag 300 applied to a completed wood-framed building section. The identified item of fire-protected wood is registered with the system network, under a specific carbon quantization project. Once the fire-protected wood component is identified and provided to the carbon estimation/calculation module 500A of the carbon quantization engine 500, the wood species database 500B and building design and BIM database 500C are accessed as required to compute the amount of carbon mass stored in the identified piece of fire-protected wood, or wood-framed or mass timber building component, or completed fire-protected wood-framed building section, using very simple formulas well known in the art and described in detail in the WoodWorks™ Carbon Calculator: References & Notes (2018), incorporated herein by reference in its entirety. The WoodWorks™ The WoodWorks Carbon Calculator tool estimates the total wood mass in a building and the associated carbon impacts. In the Woodworks™ Carbon Calculator, "carbon impacts" refer to both (i) the amount of carbon stored in the wood building materials, and (ii) the amount of greenhouse gas emissions (GHGs) avoided by choosing wood instead of another more GHG-intensive, non-wood material.

In the illustrative embodiment, carbon-quantization engine 500 represented in FIGS. 7, 8A, 8B and 9 is implemented using an object-oriented software engineering environment supported by the web, application and database servers of the data center 110, the mobile and stationary computing systems 137, 138, data acquisition engines 600 installed in factory environments 130, and the global TCP/IP infrastructure of the Internet supporting the basic functions described below. The real-time fire-protected carbon-quantization engine 500 of the present invention is adapted and configured for estimating (i.e. quantizing) and recording the mass quantity of fire-protected carbon naturally captured and sequestered in wood products used in wood-framed and mass timber building components, assemblies and buildings, after being treated and fire-protected with clean fire-protection chemicals on construction job sites, as well as in prefabricated factory environments, as described and specified here.

Figure 1A:
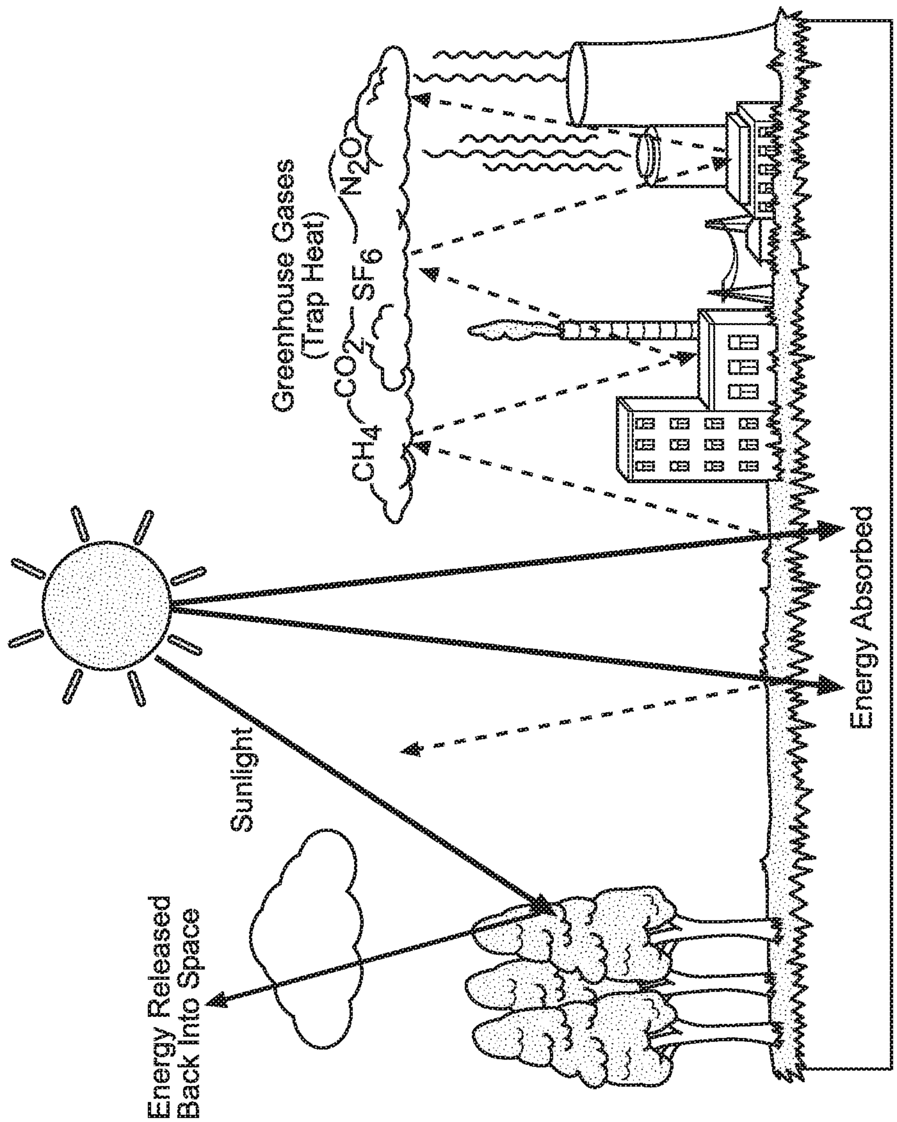
FIG. 1A is a first schematic illustration of the Greenhouse Effect on Earth illustrating how a portion of the electromagnetic-based solar radiation called Sunlight from the Sun is absorbed by the Earth, a portion is trapped by Greenhouse gases (CH4, CO2, SF6, N20) produced by both natural and man-made sources, while a portion of the solar radiation is released back into outer-space.
Figure 1B:
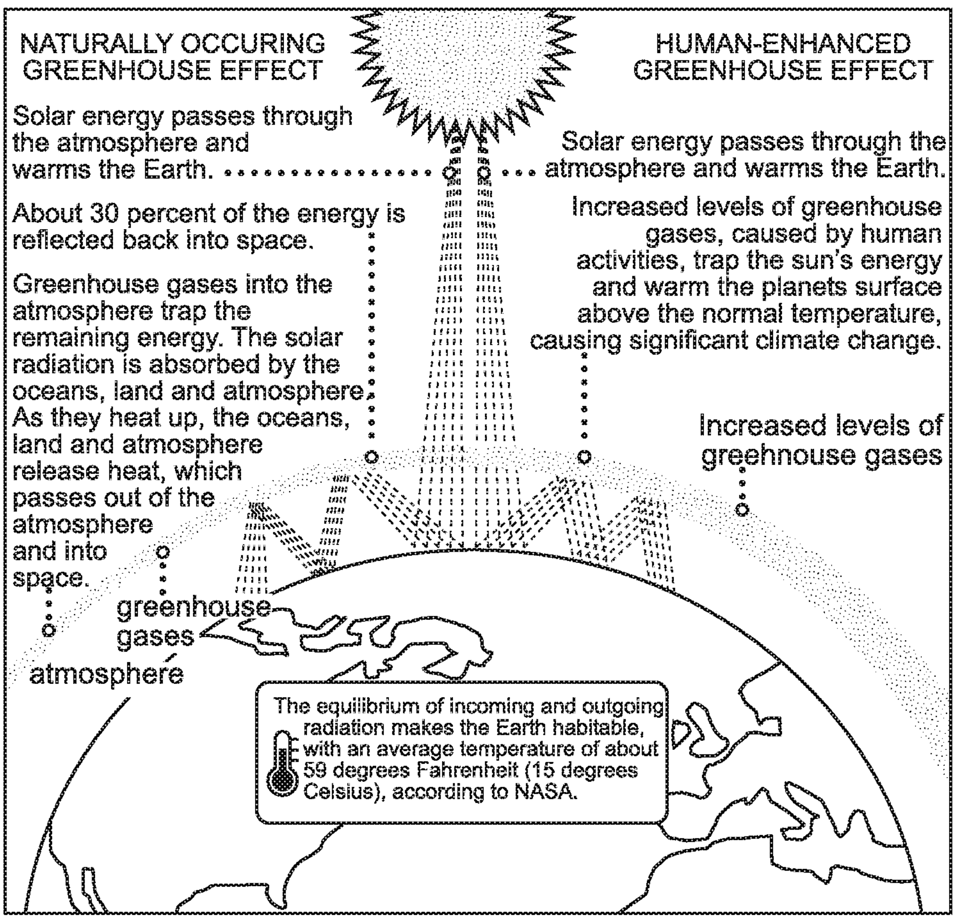
FIG. 1B is a second schematic illustration of the Greenhouse Effect on Earth illustrating both (i) the naturally occurring Greenhouse Effect where solar energy pass through the atmosphere and warms the Earth, where about 30 percent of the energy is reflected back into outer-space, and where the Greenhouses gases in the atmosphere trap the remaining energy, and the solar radiation is absorbed by the oceans, land and atmosphere, and as these bodies heat up, the oceans, land and atmosphere release heat which passes out the atmosphere and into outer space, and (ii) solar energy passes through the atmosphere and warms the Earth, and increased levels of Greenhouse gases caused by human artifacts, trap the sun's energy and warm the planet's surface above the "normal" temperature causing significant climate change.

FIG. 8A shows the system architecture of the carbon-quantization engine (i.e. system) of the present invention 500 supported by the network 100 shown in FIG. 1, and preferably implemented in the distributed computing and communication environment of the data center 110 and mobile computing systems 117, 137 and TCP/IP infrastructure. As shown, the an I/O data handling module 500F receives requests for carbon quantization and accompanying object identifying codes (132, 300, etc.) from scanning devices 117, 137 and other data acquisition systems 600 supplied through the TCP/IP 116 and processed by data processing modules 500A and 500D, with the support of databases 500B and/or 500C. The estimated fire-protected carbon units (FPCUs) are stored in the database storage module 500G shown in FIG. 8 which may be stored in the data center 110 and/or on other servers around the world.

Requests to compute FPCU quantities in identified wood-framed and mass timber building components may be made from any location where Class-A fire protection may be delivered using the system and network of the present invention. Once made using the mobile system 117, 137 and other networked computing systems, these requests will be automatically and transparently processed by processing modules 500A and 500D so as to compute FPCU figures that are GPS, time and date stamped and indexed to the code and GPS-specified wood-based building component, or prefabricated building system or constructed building. Ultimately, these indexed FPCU figures will be stored in the database storage module 500G and made accessible to the mobile applications supported by the system network 100 of the present invention, as reflected in the GUIs screens shown in the Drawings.

FIG. 8B shows the automated process supporting the real-time estimating and recording (i.e. quantization) of the quantity of fire-protected carbon (mass) units (FPCUs) naturally stored in wood products used in wood-framed and mass timber building components, assemblies and buildings. Typically, a carbon quantization request is initiated after a specific piece of wood, or wood assembly, has been treated and Class-A fire-protected with clean fire-protection chemical (CFIC) liquid on construction job sites, as well as in a prefabricated wood-framed or mass timber factory environment. However, it is understood that carbon quantization engine 500 can be requested over the network and used at any time before, during or after the application of Class-A fire-protection to wood building material, so as to quantize the amount of carbon mass stored in a specific wood-framed building, mass timber building, or any particular building component used to construct the same. Expectedly, the timing of such carbon quantization requests will differ and vary from application to application, and will be timed to meet the demand for knowing how much carbon mass has been protected by Class-A fire protection, and when and where this Class-A fire protection occurred, and by whom, using what methods and standards, otherwise required to certify the quality of protective encapsulation about the quantized carbon mass stored in a specific article of wood.

As indicated in FIG. 8B, the carbon quantization process of the present invention comprises a number of steps, namely: (a) requesting building construction companies, registered on the network, to upload their BIM models and wood/lumber construction parameters for GPS-indexed wood-framed and mass timber building projects to the network database in the data center 110, typically supplied from industry leading CAD and CIM software systems, such as AUTODESK® and building construction products such as RIVET and others; (b) supplying input parameters to the computational model being maintained—namely: (i) species of wood being fire-protected, (ii) estimated amount of dry mass of wood used in the fire-protected wood product or assembly, (iii) percentage moisture removed from the wood species, (iv) carbon recovery rate % in dry mass of wood, and (v) the unique identifier code applied to the fire-protected wood being carbon-quantized; (c) using computational models for determining quantity of carbon stored in a particular quantity of a wood species, maintained under specific conditions; and (d) storing in the network database, computed fire-protected carbon unit (FPCU) figures representative of the quantity of carbon that is stored in the fire-protected wood product(s) identified by the input object identifying code. Typically, the computational model will seek to estimate through calculation, the total mass (in Tons) of dry wood mass of specific species of wood being used to construction a specific building specified in a given BIM computer model. Typically, a given building construction project can be decomposed into the quantity of board feet or square fee of specific species of wood having specific dimensions, and from such board footage and square feet measurement parameters, the system can calculate the dry mass of the quantity of wood to be used on the construction project. Such dry mass measures can be used to estimate how much carbon material is contained in the quantity of dry mass of a specific wood species. Totally the total carbon mass quantities for the pieces of wood used to construction a specified/identified building component, the amount of fire-protected carbon units (in Tons) can be calculated in a straightforward manner.

An example computation model for quantizing the FPCU in construction timber used in a wood-framed building is: C stored in construction timber [kg]=air dry mass of timber (kg)×88% (oven dry mass)×50% (carbon %)×recovery rate (%), When working with specific quantity of board feet of a particular species of lumber of specified dimensions, the same mass-based carbon-quantizing formula for construction timber recited above can be readily modified and adapted for dimensioned lumber beams, EWPs, mass timber panels, and wood-framed panels using appropriate volumetric conversion formulas that will convert a specific length of dimensioned lumber into a mass equivalent mount of dry mass of such species of lumber. After such conversions, the necessary calculations can be run to calculate the amount of carbon mass (in kg or Tons) in the specific board length of species of wood, and such carbon mass amounts.

FIG. 9 describes the steps carried out when practicing the method of estimating and recording (i.e. quantizing) the quantities of fire-protected carbon stored in Class-A fire-protected wood-framed and mass-timber building components, assemblies and buildings on construction job-sites, and in prefabrication factory environments.

As shown in FIG. 9, the method comprises: (a) deploying barcode/RFID-tag (i.e. code) scanners/readers 117, 137 for identifying Class-A fire-protected wood products and assemblies used in a wood-framed or mass timber building on a construction site, or in a factory environment; (b) maintaining a first database 500B for storing parameters characterizing the a particular species of wood including the percentage of carbon stored in a specific quantity of the species of wood under certain circumstances used in various construction projects, or produced in a lumber factory or prefabricated-building factory environment; (c) maintaining a second database 500C for storing parameters characterizing the quantity and quality of specific species of dimensioned wood and engineered wood products (EWPs) used in building specific wood-framed or mass timber building designs under construction using BIM computer systems; (d) using a barcode/RFID-tag scanner/reader 117, 137 or data acquisition engine 600 for identifying fire-protected wood products and assemblies used in a wood-framed or mass timber building, either built on a wood-framed building or mass timber construction job site, or being prefabricated in a factory environment for delivery and installation on a destination construction site; and (e) using scanned identifiers of Class-A fire-protected wood products and/or assemblies, and the data maintained in the first and/or second databases (500B and 500C) on the network to calculate the quantity of carbon mass stored in the Class-A fire-protected wood used in the GPS-specified buildings and/or building components under construction on construction sites or factory environment. The output of this carbon-quantization process is to produce the amount of carbon mass stored in Class-A fire-protected wood using the system and network of the present invention. Such mass quantities for carbon can be converted to equivalent amounts of carbon dioxide $CO_2$ sequestered by growing trees to produce this equivalent amount of fire-protected carbon units (FPCUs) measured in kg or tons, or other suitable units of mass measurement.

Estimating and Recording (I.E. Quantizing) the Quantity of Fire-Protected Carbon Stored in a Specified Fire-Protected Piece of Solid Lumber Produced Along the Production Line of a Fire-Protected Lumber Factory, and Marking Each Fire-Protected Lumber Piece Provided with a Label or Marking Indicating the Recorded Quantized Fire-Protected Carbon Units and the Time, Data and GPS Coordinates of the Location of Applied Fire-Protection FIG. 10 illustrates the process supported on the network of the present invention, shown in FIG. 1, involving estimating and recording (i.e. quantizing) the estimated quantity of fire-protected carbon (FPC) stored in a specified fire-protected piece of solid lumber produced along the production line of a fire-protected lumber factory, as represented in FIGS. 18-21, including the marking each fire-protected lumber piece provided with a label or marking indicating the recorded quantized fire-protected carbon units (FPCUs) including the time, data and GPS coordinates of the location of applied fire-protection.

Figure 10:
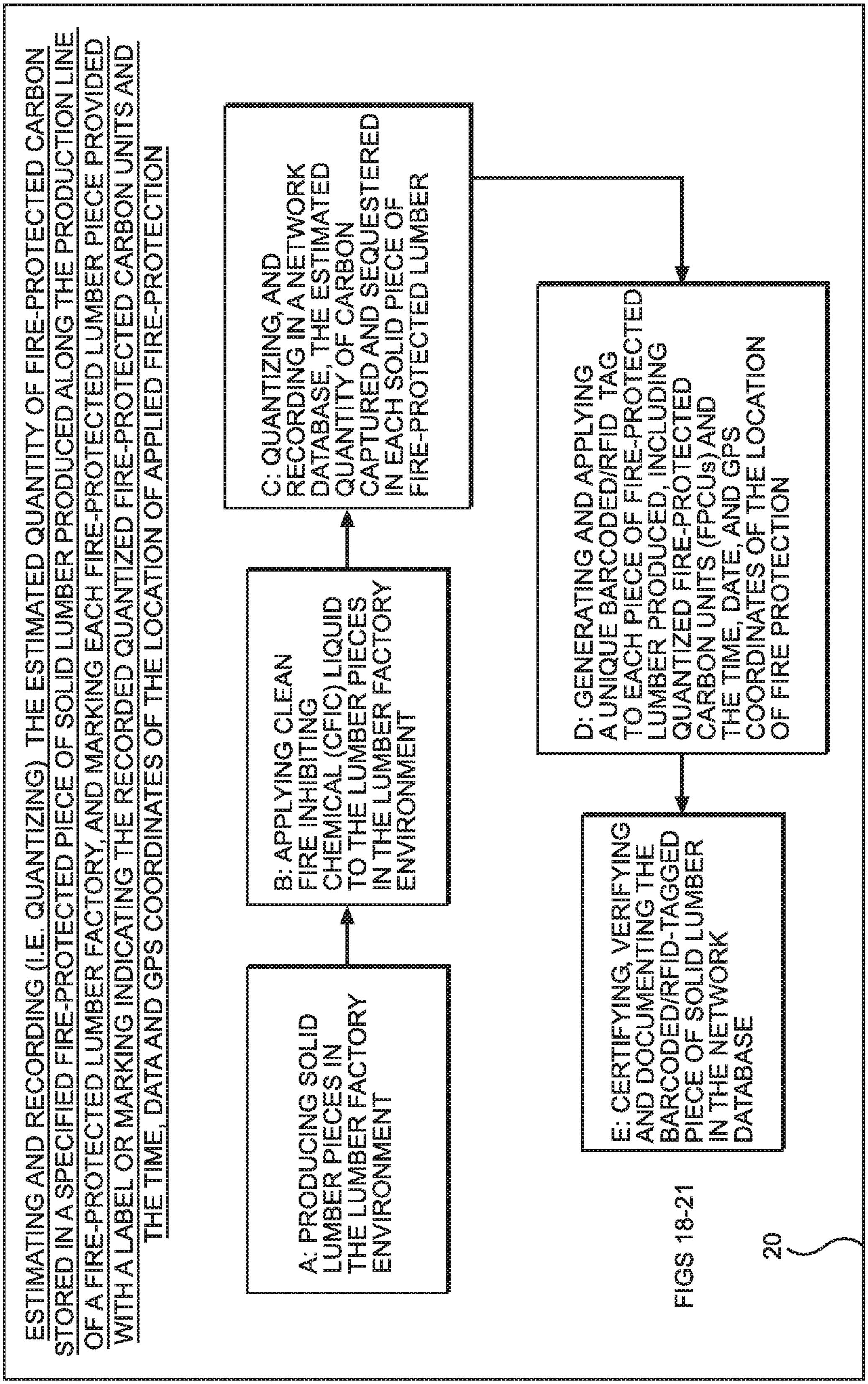
FIG. 10 is a schematic representation illustrating the process supported on the network of the present invention, shown in FIG. 1, involving estimating and recording (i.e. quantizing) the estimated quantity of fire-protected carbon (FPC) stored in a specified fire-protected piece of solid lumber produced along the production line of a fire-protected lumber factory, as represented in FIGS. 18-21, including the marking each fire-protected lumber piece provided with a label or marking indicating the recorded quantized fire-protected carbon units (FPCUs) including the time, data and GPS coordinates of the location of applied fire-protection.

As shown in FIG. 10, the system and network 100 of the present invention is shown supporting a first illustrative embodiment of the fire-protected carbon quantization process of the present invention, involving the application of Class-A fire-protection services to solid dimensioned lumber being produced in volume along the production lines of an automated lumber factory system shown and described in FIGS. 18 through 21.

As indicated at Block A of the process depicted in FIG. 10, the solid lumber pieces are produced in the lumber factory environment 20.

As indicated at Block B in FIG. 10, clean fire inhibiting chemical (CFIC) liquid is applied to the lumber pieces in the lumber factory environment to produce Class-A fire-protected lumber pieces of particular dimensions.

As indicated at Block C in FIG. 10, the quantity of carbon stored in each solid piece of fire-protected lumber is estimated and recorded (i.e. quantized) in a network database supported by the data center 110.

As indicated at Block D in FIG. 10, a unique barcoded/RFID tag is generated and applied to each piece of fire-protected lumber produced, including quantized fire-protected carbon units (FPCUs) and the time, date, and GPS coordinates of the location of fire protection.

As indicated at Block E in FIG. 10, the certifying, verifying and documenting the barcoded/RFID-tagged piece of solid lumber in the network database.

Using this process on the network of the present invention 100, stakeholders can now know and use the reliably estimated fire-protected carbon units (FPCUs) stored in each and every piece of wood-based material registered on the network of the present invention, including carbon tax credits and other forms of economic value attributed to FPCUs quantized and registered on the system network, world-wide.

Estimating and Recording (I. E. Quantizing) the Estimated Quantity of Fire-Protected Carbon Stored in Specified Fire-Protected Finger-Jointed Lumber Products Produced Along the Production Line of a Fire-Protected Finger-Jointed Lumber Factory, and Marking Each Fire-Protected Lumber Product with a Label or Marking Indicating the Recorded Quantized Fire-Protected Carbon Units and the Time, Data and GPS Coordinates of the Location of Applied Fire-Protection FIG. 11 illustrates the process supported on the network of the present invention, shown in FIG. 1, estimating and recording (i. e. quantizing) the estimated quantity of fire-protected carbon stored in specified fire-protected finger-jointed lumber products produced along the production line of a fire-protected finger-jointed lumber factory, as represented in FIGS. 18-21, and marking each fire-protected lumber product with a label or marking indicating the recorded quantized fire-protected carbon units (FPCUs) and the time, data and GPS coordinates of the location of applied fire-protection.

Figure 11:
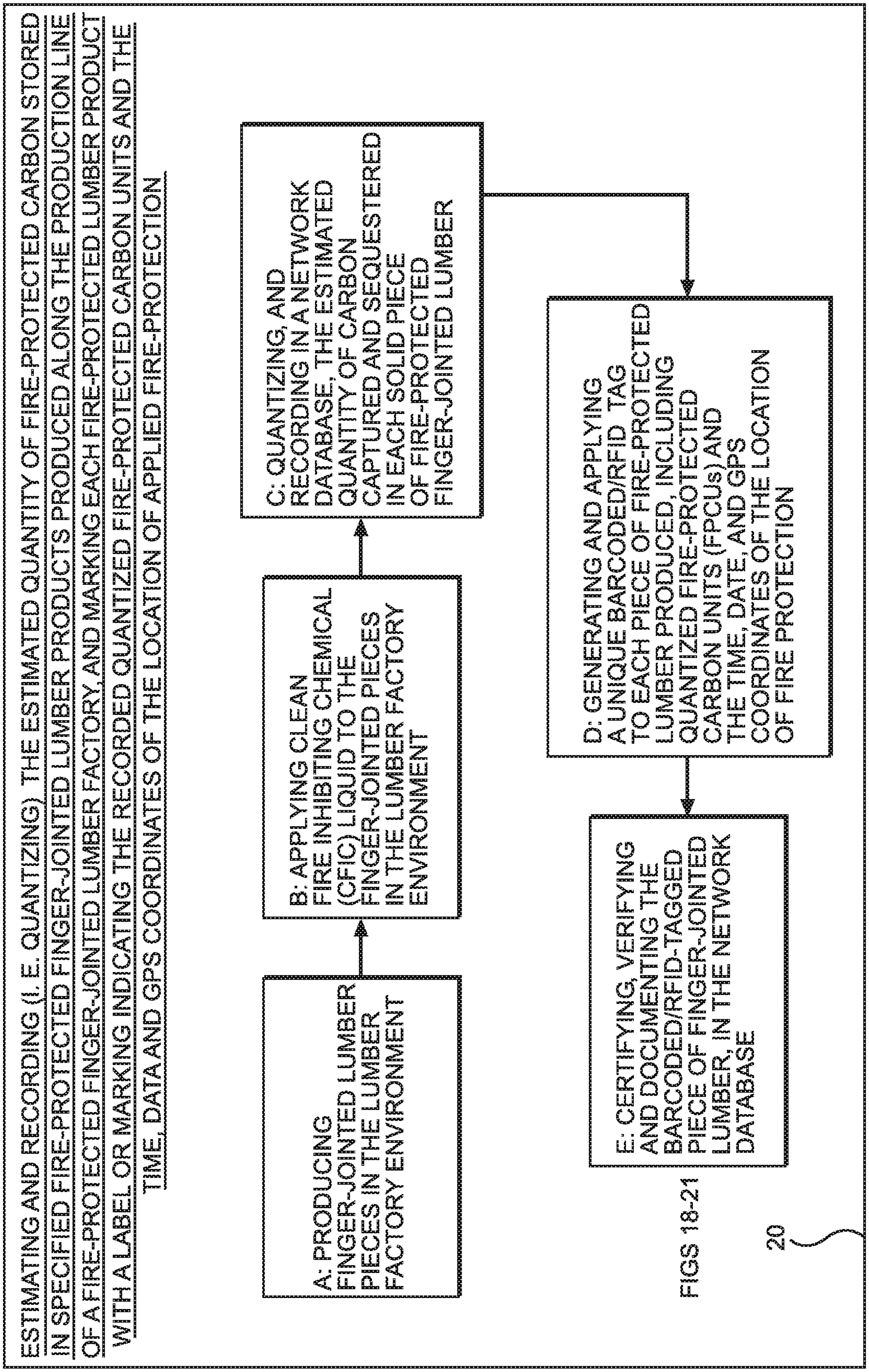
FIG. 11 is a schematic representation illustrating the process supported on the network of the present invention, shown in FIG. 1, estimating and recording (i. e. quantizing) the estimated quantity of fire-protected carbon stored in specified fire-protected finger-jointed lumber products produced along the production line of a fire-protected finger-jointed lumber factory, as represented in FIGS. 18-21, and marking each fire-protected lumber product with a label or marking indicating the recorded quantized fire-protected carbon units (FPCUs) and the time, data and GPS coordinates of the location of applied fire-protection.

As shown in FIG. 11, the system and network 100 of the present invention is shown supporting a second illustrative embodiment of the fire-protected carbon quantization process of the present invention, involving the application of Class-A fire-protection services to finger-jointed lumber pieces being produced in volume along the production lines of an automated finger-jointed lumber factory system shown and described in FIGS. 18-21.

As indicated at Block A of the process depicted in FIG. 11, the finger-jointed lumber pieces are produced in the lumber factory environment 20.

As indicated at Block B in FIG. 11, clean fire inhibiting chemical (CFIC) liquid is applied to the finger-jointed lumber pieces in the lumber factory environment to produce Class-A fire-protected finger-jointed lumber pieces of particular dimensions.

As indicated at Block C in FIG. 11, the quantity of carbon stored in each solid piece of fire-protected finger-jointed lumber is estimated and recorded (i.e. quantized) in a network database supported by the data center 110.

As indicated at Block D in FIG. 11, a unique barcoded/RFID tag is generated and applied to each finger-jointed piece of fire-protected lumber produced, including quantized fire-protected carbon units (FPCUs) and the time, date, and GPS coordinates of the location of fire protection.

As indicated at Block E in FIG. 11, the certifying, verifying and documenting the barcoded/RFID-tagged piece of finger-joined lumber in the network database.

Using this process on the network of the present invention 100, stakeholders can now know and use the reliably estimated fire-protected carbon units (FPCUs) stored in each and every piece of finger-jointed wood-based material registered on the network of the present invention, including carbon tax credits and other forms of economic value attributed to FPCUs quantized and registered on the system network, world-wide.

Estimating and Recording (I. E. Quantizing) Quantity of Fire-Protected Carbon Stored in a Specified Fire-Protected Cross-Laminated Timber (CLT) Produced Along the Production Line of a Fire-Protected CLT Factory, and Each Fire-Protected CLT Panel Provided with a Label or Marking Indicating the Recorded Quantized Fire-Protected Carbon Units and the Time, Data and GPS Coordinates of the Location of Applied Fire-Protection FIG. 12 illustrates the process supported on the network of the present invention, shown in FIG. 1, estimating and recording (i.e. quantizing) the quantity of fire-protected carbon stored in a specified fire-protected cross-laminated timber (CLT) produced along the production line of a fire-protected CLT factory, as represented in FIGS. 22-25, and each fire-protected CLT panel provided with a label or marking indicating the recorded quantized fire-protected carbon units (FPCUs) and the time, data and GPS coordinates of the location of applied fire-protection.

Figure 12:
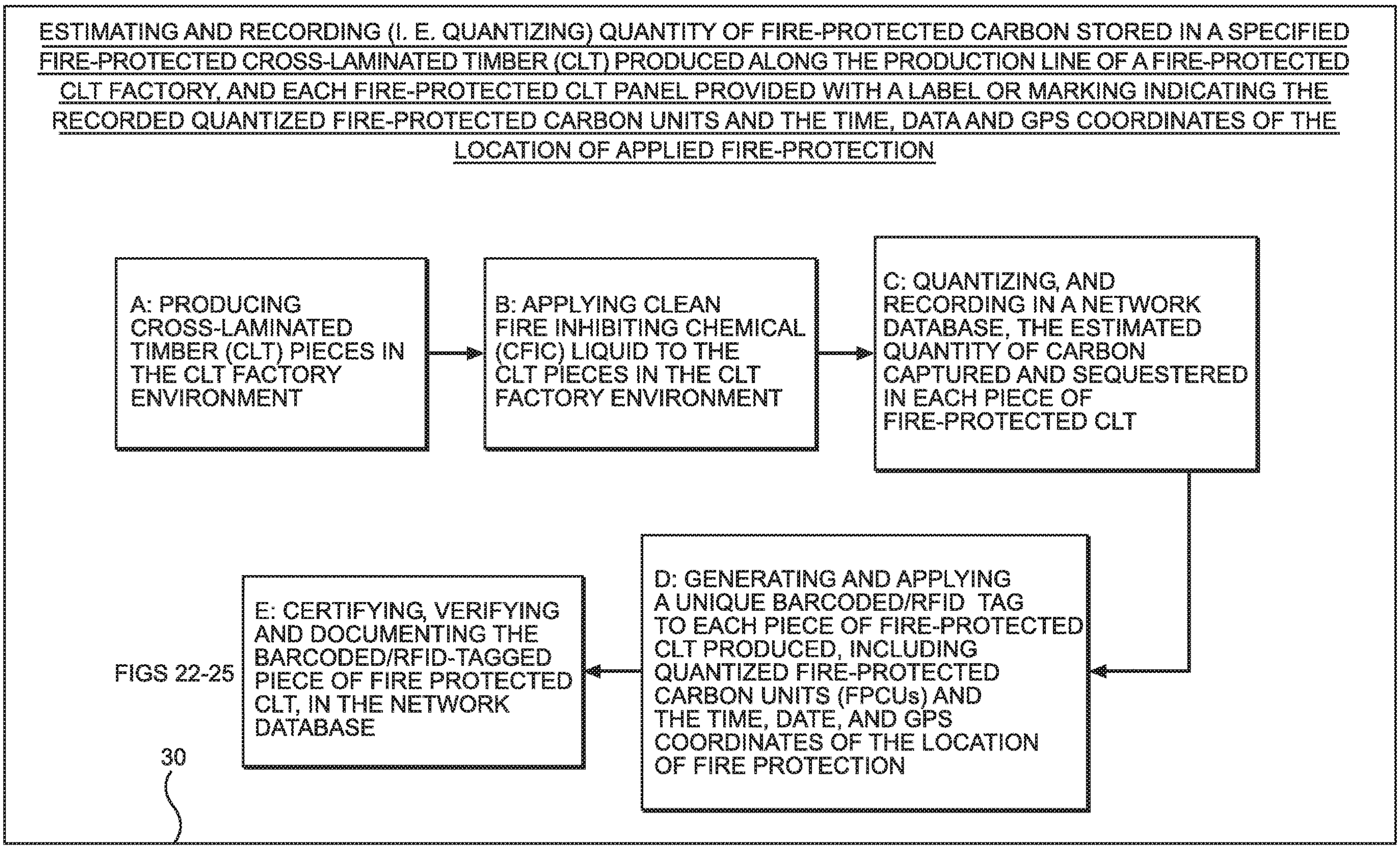
FIG. 12 is a schematic representation illustrating the process supported on the network of the present invention, shown in FIG. 1, estimating and recording (i.e. quantizing) the quantity of fire-protected carbon stored in a specified fire-protected cross-laminated timber (CLT) produced along the production line of a fire-protected CLT factory, as represented in FIGS. 22-25, and each fire-protected CLT panel provided with a label or marking indicating the recorded quantized fire-protected carbon units (FPCUs) and the time, data and GPS coordinates of the location of applied fire-protection.

As shown in FIG. 12, the system and network 100 of the present invention is shown supporting a third illustrative embodiment of the fire-protected carbon quantization process of the present invention, involving the application of Class-A fire-protection services to Class-A fire-protected CLT products being produced in volume along the production lines of an automated CLT factory system shown and described in FIGS. 22-25.

As indicated at Block A of the process depicted in FIG. 12, cross-laminated timber (CLT) products and pieces are produced in the cross-laminated timber (CLT) factory environment 30.

As indicated at Block B in FIG. 12, clean fire inhibiting chemical (CFIC) liquid is applied to the CLT panels in the CLT factory environment to produce Class fire protected CLT panels.

As indicated at Block C in FIG. 12, the quantity of carbon stored in each fire-protected CLT panel is estimated and recorded (i.e. quantized) in a network database supported by the data center 110.

As indicated at Block D in FIG. 12, a unique barcoded/RFID tag is generated and applied to each fire-protected CLT panel produced, including quantized fire-protected carbon units (FPCUs) and the time, date, and GPS coordinates of the location of fire protection.

As indicated at Block E in FIG. 12, the certifying, verifying and documenting the barcoded/RFID-tagged CLT panel in the network database.

Using this process on the network of the present invention 100, stakeholders can now know and use the reliably estimated fire-protected carbon units (FPCUs) stored in each and every fire-protected CLT panel and piece registered on the network of the present invention, including carbon tax credits and other forms of economic value attributed to FPCUs quantized and registered on the system network, world-wide.

Estimating and Recording (I. E. Quantizing) the Estimated Quantity of Carbon Captured and Sequestered (Ccs) in a Specified Fire-Protected Laminated Veneer Lumber (LVL) Produced Along the Production Line of a Fire-Protected LVL Factory, and Marking Each Fire-Protected LVL Piece with a Label or Marking Indicating the Recorded Quantized Fire-Protected Carbon Units and the Time, Data and GPS Coordinates of the Location of Applied Fire-Protection FIG. 13 illustrates the process supported on the network of the present invention, shown in FIG. 1, estimating and recording (i.e. quantizing) the estimated quantity of carbon stored in a specified fire-protected laminated veneer lumber (LVL) produced along the production line of a fire-protected LVL factory, as represented in FIGS. 26-29, and marking each fire-protected LVL piece with a label or marking indicating the recorded quantized fire-protected carbon units (FPCUs) and the time, data and GPS coordinates of the location of applied fire-protection.

Figure 13:
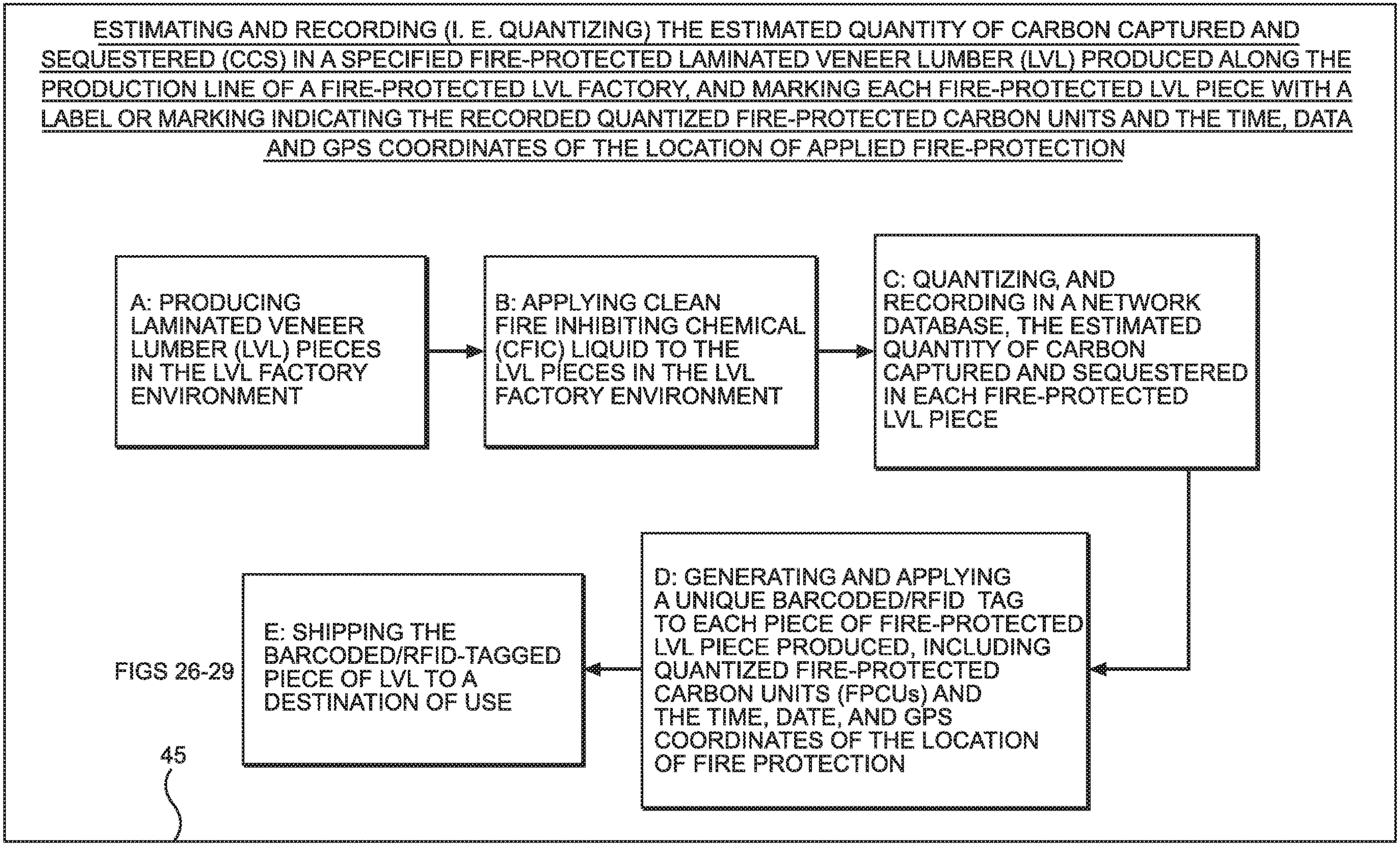
FIG. 13 is a schematic representation illustrating the process supported on the network of the present invention, shown in FIG. 1, estimating and recording (i.e. quantizing) the estimated quantity of carbon stored in a specified fire-protected laminated veneer lumber (LVL) produced along the production line of a fire-protected LVL factory, as represented in FIGS. 26-29, and marking each fire-protected LVL piece with a label or marking indicating the recorded quantized fire-protected carbon units (FPCUs) and the time, data and GPS coordinates of the location of applied fire-protection.

As shown in FIG. 13, the system and network 100 of the present invention is shown supporting a fourth illustrative embodiment of the fire-protected carbon quantization process of the present invention, involving the application of Class-A fire-protection services to LVL products being produced in volume along the production lines of an automated fire-protected LVL product factory system shown and described in FIGS. 26-29.

As indicated at Block A of the process depicted in FIG. 13, the laminated veneer lumber (LVL) pieces are produced in the LVL factory environment.

As indicated at Block B in FIG. 13, clean fire inhibiting chemical (CFIC) liquid is applied to the LVL pieces in the LVL factory environment 45.

As indicated at Block C in FIG. 13, the quantity of carbon stored in each solid piece of fire-protected LVL is estimated and recorded (i.e. quantized) in a network database supported by the data center 110.

As indicated at Block D in FIG. 13, a unique barcoded/RFID tag is generated and applied to each piece of fire-protected LVL produced, including quantized fire-protected carbon units (FPCUs) and the time, date, and GPS coordinates of the location of fire protection.

As indicated at Block E in FIG. 13, the certifying, verifying and documenting the barcoded/RFID-tagged piece of fire-protected LVL in the network database.

Using this process on the network of the present invention 100, stakeholders can now know and use the reliably estimated fire-protected carbon units (FPCUs) stored in each and every fire-protected LVL piece registered on the network of the present invention, including carbon tax credits and other forms of economic value attributed to FPCUs quantized and registered on the system network, worldwide.

Figure 14:
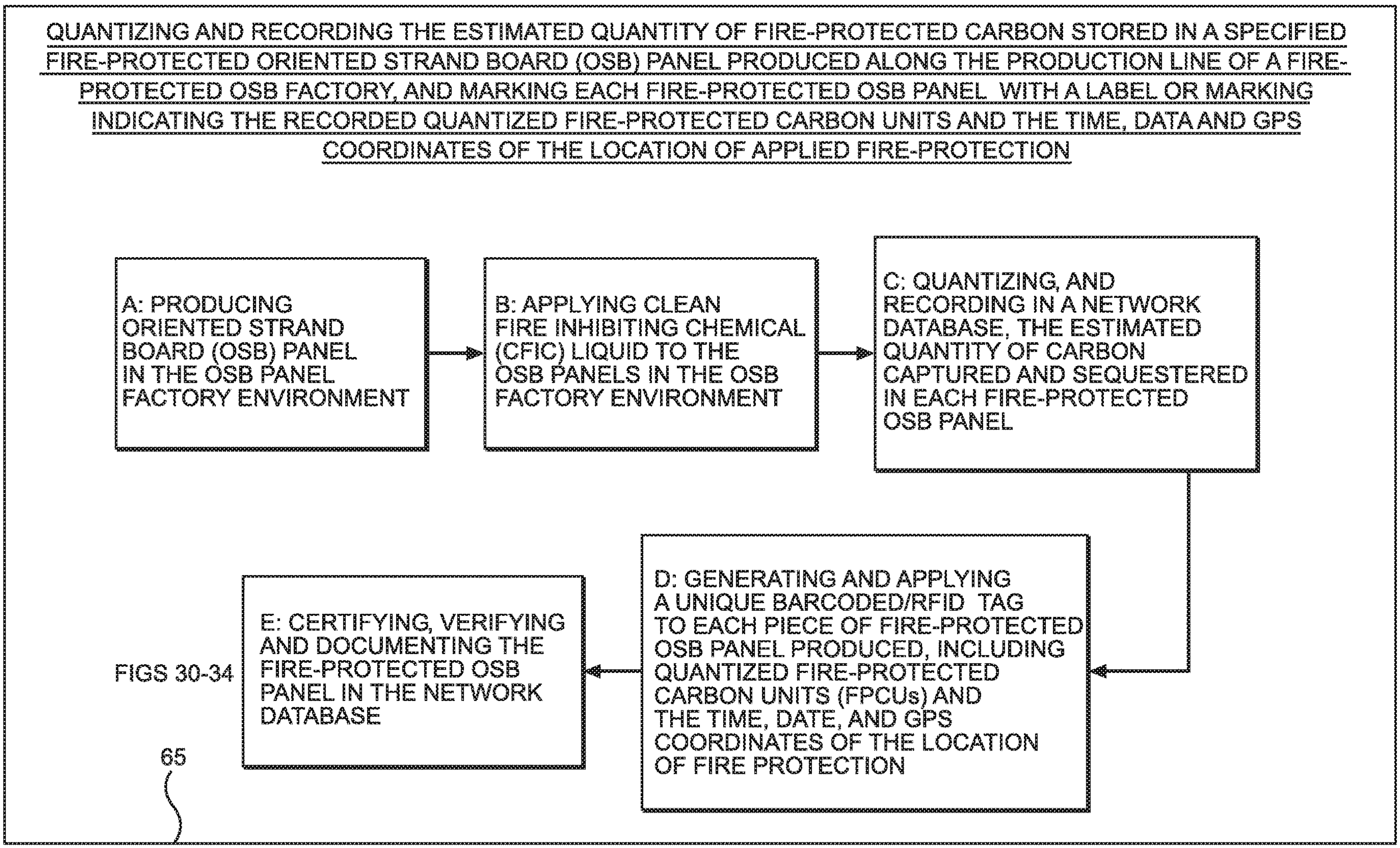
FIG. 14 is a schematic representation illustrating the process supported on the network of the present invention, shown in FIG. 1, quantizing and recording the estimated quantity of fire-protected carbon stored in a specified fire-protected oriented strand board (OSB) panel produced along the production line of a fire-protected OSB factory, as represented in FIGS. 30-34, and marking each fire-protected OSB panel with a label or marking indicating the recorded quantized fire-protected carbon units (FPCUs) and the time, data and GPS coordinates of the location of applied fire-protection.

Quantizing and Recording the Estimated Quantity of Fire-Protected Carbon Stored in a Specified Fire-Protected Oriented Strand Board (OSB) Panel Produced Along the Production Line of a Fire-Protected OSB Factory, and Marking Each Fire-Protected OSB Panel with a Label or Marking Indicating the Recorded Quantized Fire-Protected Carbon Units and the Time, Data and GPS Coordinates of the Location of Applied Fire-Protection FIG. 14 illustrates the process supported on the network of the present invention, shown in FIG. 1, quantizing and recording the estimated quantity of fire-protected carbon stored in a specified fire-protected oriented strand board (OSB) panel produced along the production line of a fire-protected OSB factory, as represented in FIGS. 30-34, and marking each fire-protected OSB panel with a label or marking indicating the recorded quantized fire-protected carbon units (FPCUs) and the time, data and GPS coordinates of the location of applied fire-protection.

As shown in FIG. 14, the system and network 100 of the present invention is shown supporting a fifth illustrative embodiment of the fire-protected carbon quantization process of the present invention, involving the application of Class-A fire-protection services to OSB panels being produced in volume along the production lines of an automated Class-A fire-protected OSB factory system shown and described in FIGS. 30-34.

As indicated at Block A of the process depicted in FIG. 14, oriented strand board (OSB) panels are produced in an OSB factory environment 65.

As indicated at Block B in FIG. 14, the clean fire inhibiting chemical (CFIC) liquid is applied to the lumber pieces in the OSB factory environment to produce Class-A fire-protected OSB panels on a high volume basis.

As indicated at Block C in FIG. 14, the quantity of carbon stored in each solid piece of fire-protected OSB is estimated and recorded (i.e. quantized) in a network database supported by the data center 110.

As indicated at Block D in FIG. 14, the a unique barcoded/RFID tag is generated and applied to each piece of fire-protected OSB produced, including quantized fire-protected carbon units (FPCUs) and the time, date, and GPS coordinates of the location of fire protection.

As indicated at Block E in FIG. 14, the certifying, verifying and documenting the barcoded/RFID-tagged piece of fire-protected OSB in the network database.

Using this process on the network of the present invention 100, stakeholders can now know and use the reliably estimated fire-protected carbon units (FPCUs) stored in each and every fire-protected OSB panel registered on the network of the present invention, including carbon tax credits and other forms of economic value attributed to FPCUs quantized and registered on the system network, worldwide.

Estimating and Recording (I. E. Quantizing) the Estimated Quantity of Fire-Protected Carbon Stored in a Specified Quantity of Lumber Fire-Protected During the Application of a Fire Protection Spray Over Substantially all of the Wood in a Completed Section of a Wood-Framed or Mass Timber Building Under Construction, and Labeled or Marked Indicating the Recorded Quantized Fire-Protected Carbon Units and the Time, Data and GPS Coordinates of the Location of Applied Fire-Protection FIG. 15 illustrates the process supported on the network of the present invention, shown in FIG. 1, estimating and recording (i.e. quantizing) the estimated quantity of fire-protected carbon stored in a specified quantity of lumber fire-protected during the application of a fire protection spray over substantially all of the wood in a completed section of a wood-framed or mass timber building under construction, as represented in FIGS. 49-54, and labeled or marked indicating the recorded quantized fire-protected carbon units (FPCUs) and the time, data and GPS coordinates of the location of applied fire-protection.

Figure 15:
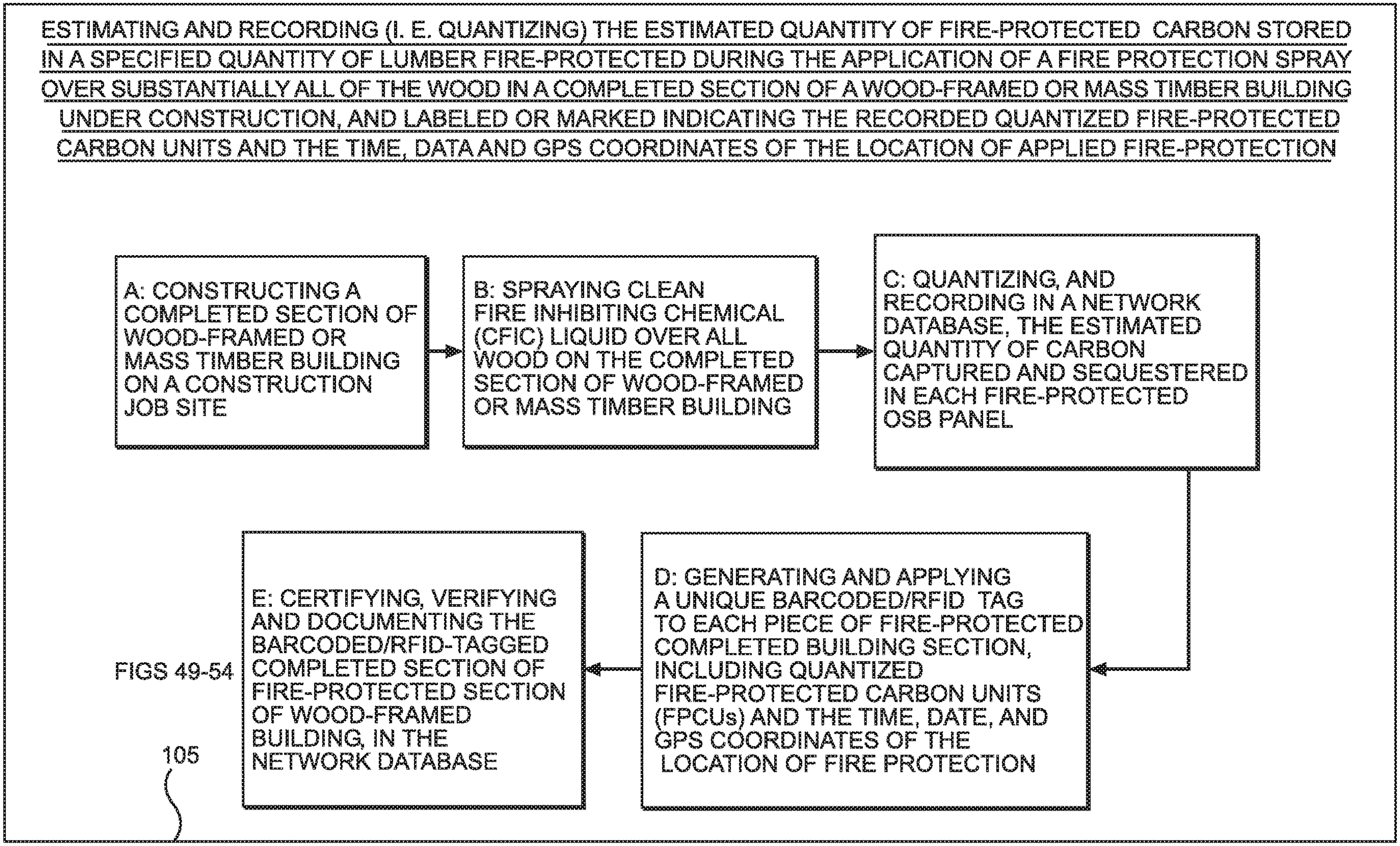
FIG. 15 is a schematic representation illustrating the process supported on the network of the present invention, shown in FIG. 1, estimating and recording (i.e. quantizing) the estimated quantity of fire-protected carbon stored in a specified quantity of lumber fire-protected during the application of a fire protection spray over substantially all of the wood in a completed section of a wood-framed or mass timber building under construction, as represented in FIGS. 49-54, and labeled or marked indicating the recorded quantized fire-protected carbon units (FPCUs) and the time, data and GPS coordinates of the location of applied fire-protection.

As shown in FIG. 15, the system and network 100 of the present invention is shown supporting a sixth illustrative embodiment of the fire-protected carbon quantization process of the present invention, involving the application of Class-A fire-protection services to wood-framed and/or mass timber buildings being constructed on job sites, as shown and described in FIGS. 49-54.

As indicated at Block A of the process depicted in FIG. 15, a completed section of wood-framed building, or mass timber building, is constructed on a construction job site 105.

As indicated at Block B in FIG. 15, the clean fire inhibiting chemical (CFIC) liquid is applied by spraying over all exposed wood on the completed section of the wood-framed building, or mass timber building.

As indicated at Block C in FIG. 15, the quantity of carbon stored in each fire-protected section of the wood-framed building, or mass timber building is estimated and recorded (i.e. quantized) in a network database supported by the data center 110.

As indicated at Block D in FIG. 15, a unique barcoded/RFID tag is generated and applied to each completed section of Class fire-protected wood-framed or mass timber building on a construction site, including quantized fire-protected carbon units (FPCUs) and the time, date, and GPS coordinates of the location of fire protection.

As indicated at Block E in FIG. 15, the certifying, verifying and documenting the barcoded/RFID-tagged completed section of Class-A fire-protected section of wood-framed or mass timber building, in the network database.

Using this process on the network of the present invention 100, stakeholders can now know and use the reliably estimated fire-protected carbon units (FPCUs) stored in each and every piece of exposed wood in a completed building section that has been Class-A fire-protected, registered on the network of the present invention, including carbon tax credits and other forms of economic value attributed to FPCUs quantized and registered on the system network, world-wide.

Estimating and Recording (I. E. Quantizing) the Estimated Quantity of Fire-Protected Carbon Stored in a Specified Quantity of Lumber Fire-Protected During the Application of Fire Protection Liquid or Spray Over all of the Wood in a Completed Section of a Prefabricated Wood-Framed Building Component Produced Along a Production Line within a Prefabricated Wood-Framed Building Component Factory, and Labeled to Indicate the Recorded Quantized Fire-Protected Carbon Units and the Time, Data and GPS Coordinates of the Location of Applied Fire-Protection FIG. 16 illustrates the process supported on the network of the present invention, shown in FIG. 1, estimating and recording (i.e. quantizing) the estimated quantity of fire-protected carbon stored in a specified quantity of lumber fire-protected during the application of fire protection liquid or spray over all of the wood in a completed section of a prefabricated wood-framed building component produced along a production line within a prefabricated wood-framed building component factory, as represented in FIGS. 69-75, and labeled to indicate the recorded quantized fire-protected carbon units (FPCUs) and the time, data and GPS coordinates of the location of applied fire-protection.

Figure 16:
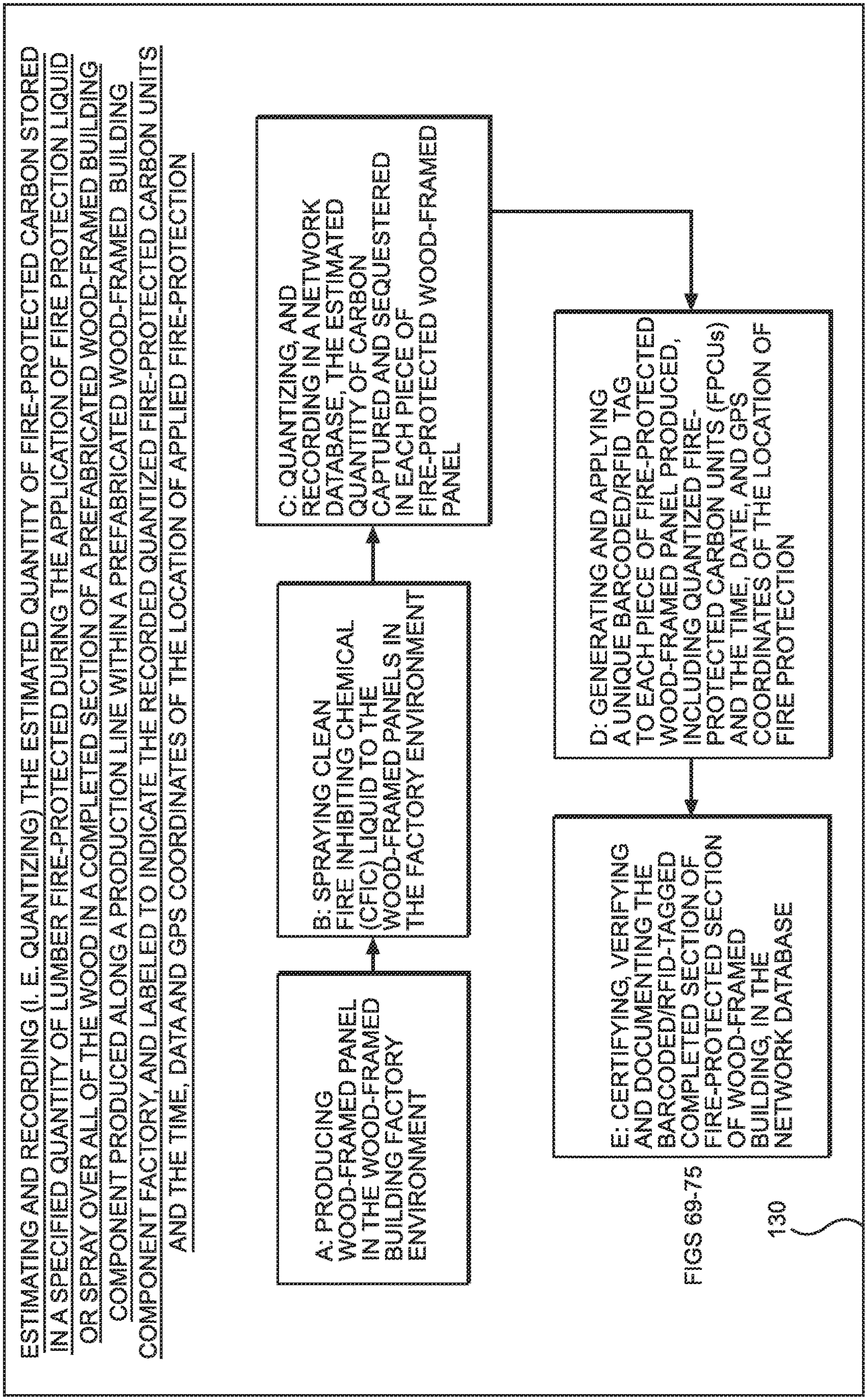
FIG. 16 is a schematic representation illustrating the process supported on the network of the present invention, shown in FIG. 1, estimating and recording (i.e. quantizing) the estimated quantity of fire-protected carbon stored in a specified quantity of lumber fire-protected during the application of fire protection liquid or spray over all of the wood in a completed section of a prefabricated wood-framed building component produced along a production line within a prefabricated wood-framed building component factory, as represented in FIGS. 69-75, and labeled to indicate the recorded quantized fire-protected carbon units (FPCUs) and the time, data and GPS coordinates of the location of applied fire-protection.

As shown in FIG. 16, the system and network 100 of the present invention is shown supporting a seventh illustrative embodiment of the fire-protected carbon quantization process of the present invention, involving the application of Class-A fire-protection services to wood-framed building components and prefabricated wood-framed buildings being produced in volume along the production lines of an automated factory system shown and described in FIGS. 69-75.

As indicated at Block A of the process depicted in FIG. 16, wood-framed panels are produced in the wood-framed panel factory environment 130.

As indicated at Block B in FIG. 16, the clean fire inhibiting chemical (CFIC) liquid is applied to the wood-framed panels in the factory environment 130 so as to produce Class-A fire-protected prefabricated wood-frame panels for custom and/or standard prefabricated wood-framed buildings.

As indicated at Block C in FIG. 16, the quantity of carbon stored in each fire-protected wood-framed panel is estimated and recorded (i.e. quantized) in a network database supported by the data center 110.

As indicated at Block D in FIG. 16, the a unique barcoded/RFID tag is generated and applied to each fire-protected wood-framed panel produced, including quantized fire-protected carbon units (FPCUs) and the time, date, and GPS coordinates of the location of fire protection.

As indicated at Block E in FIG. 16, the certifying, verifying and documenting the barcoded/RFID-tagged fire-protected wood-framed panel in the network database.

Using this process on the network of the present invention 100, stakeholders can now know and use the reliably estimated fire-protected carbon units (FPCUs) stored in each and every fire-protected wood-framed panel registered on the network of the present invention, including carbon tax credits and other forms of economic value attributed to FPCUs quantized and registered on the system network, world-wide.

Estimating and Recording (I. E. Quantizing) the Estimated Quantity of Fire-Protected Carbon Stored in a Specified Quantity of Lumber Fire-Protected During the Application of Fire Protection Liquid or Spray Over all of the Wood in a Completed Section of a Prefabricated Mass Timber Building Component, Produced Along a Production Line within a Prefabricated Mass Timber Building Component Factory, and Labeled or Marked to Indicate the Recorded Quantized Fire-Protected Carbon Units and the Time, Data and GPS Coordinates of the Location of Applied Fire-Protection FIG. 17 is a schematic representation illustrating the process supported on the network of the present invention, shown in FIG. 1, estimating and recording (i.e. quantizing) the estimated quantity of fire-protected carbon stored in a specified quantity of lumber fire-protected during the application of fire protection liquid or spray over all of the wood in a completed section of a prefabricated mass timber building component, produced along a production line within a prefabricated mass timber building component factory, as represented in FIGS. 69-75, and labeled or marked to indicate the recorded quantized fire-protected carbon units (FPCUs) and the time, data and GPS coordinates of the location of applied fire-protection.

Figure 17:
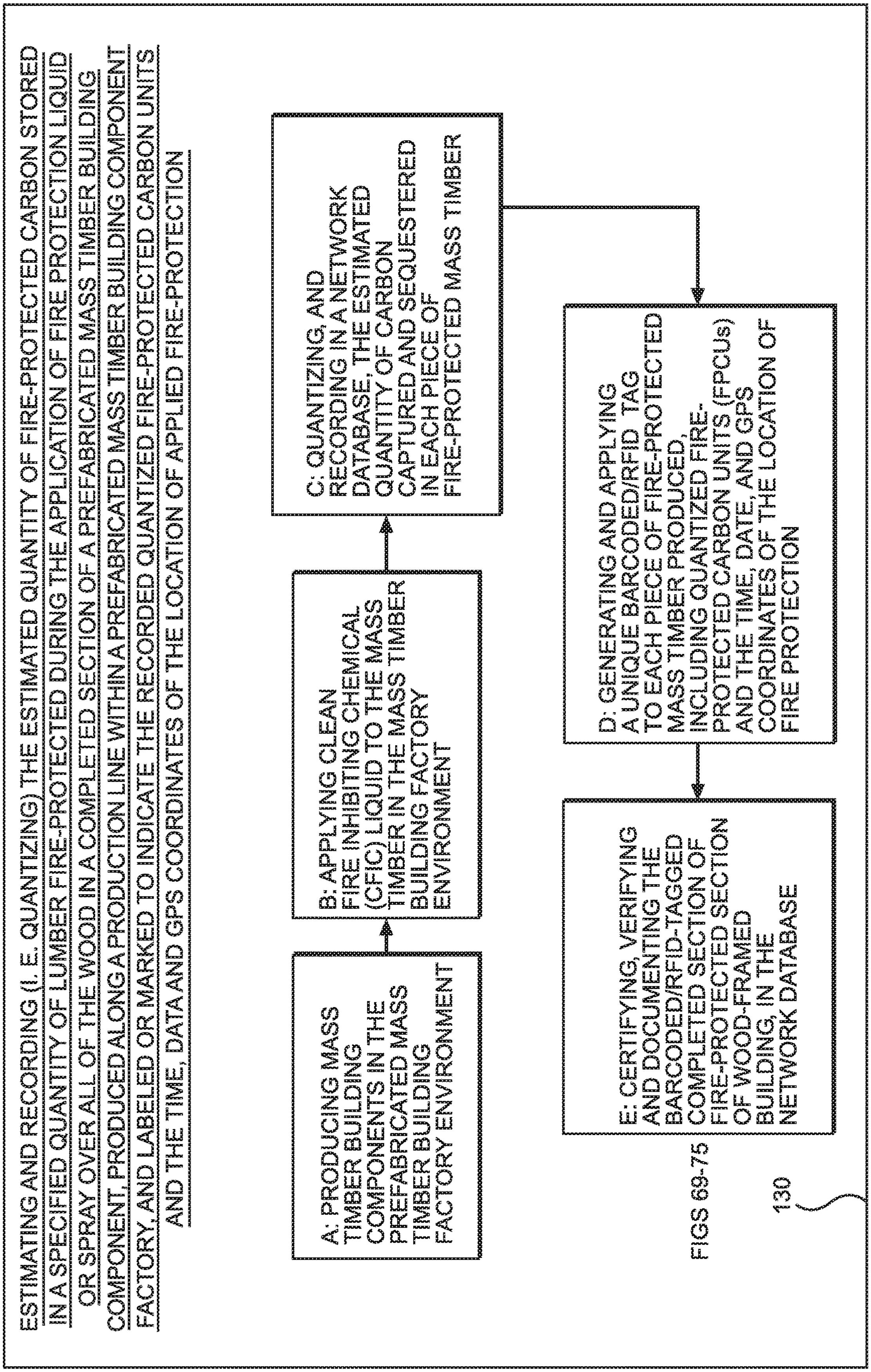
FIG. 17 is a schematic representation illustrating the process supported on the network of the present invention, shown in FIG. 1, estimating and recording (i.e. quantizing) the estimated quantity of fire-protected carbon stored in a specified quantity of lumber fire-protected during the application of fire protection liquid or spray over all of the wood in a completed section of a prefabricated mass timber building component, produced along a production line within a prefabricated mass timber building component factory, as represented in FIGS. 69-75, and labeled or marked to indicate the recorded quantized fire-protected carbon units (FPCUs) and the time, data and GPS coordinates of the location of applied fire-protection.

As shown in FIG. 17, the system and network 100 of the present invention is shown supporting an eighth illustrative embodiment of the fire-protected carbon quantization process of the present invention, involving the application of Class-A fire-protection services to mass timber building components and prefabricated buildings being produced in volume along the production lines of an automated factory system shown and described in FIGS. 69-75.

As indicated at Block A of the process depicted in FIG. 16, mass timber (e.g. CLT, NLT, GLT, etc.) panels are produced in the mass timber panel factory environment 130.

As indicated at Block B in FIG. 17, the clean fire inhibiting chemical (CFIC) liquid is applied to the mass timber panels in the factory environment 130 so as to produce Class-A fire-protected prefabricated mass timber panels for prefabricated mass timber buildings.

As indicated at Block C in FIG. 17, the quantity of carbon stored in each fire-protected mass timber panel is estimated and recorded (i.e. quantized) in a network database supported by the data center 110.

As indicated at Block D in FIG. 17, the a unique barcoded/RFID tag 132 is generated and applied to each fire-protected mass timber produced, including quantized fire-protected carbon units (FPCUs) and the time, date, and GPS coordinates of the location of fire protection.

As indicated at Block E in FIG. 17, the certifying, verifying and documenting the barcoded/RFID-tagged fire-protected mass timber panel in the network database.

Using this process on the network of the present invention 100, stakeholders can now know and use the reliably estimated fire-protected carbon units (FPCUs) stored in each and every fire-protected mass timber panel registered on the network of the present invention, including carbon tax credits and other forms of economic value attributed to FPCUs quantized and registered on the system network, world-wide.

Figure 18:
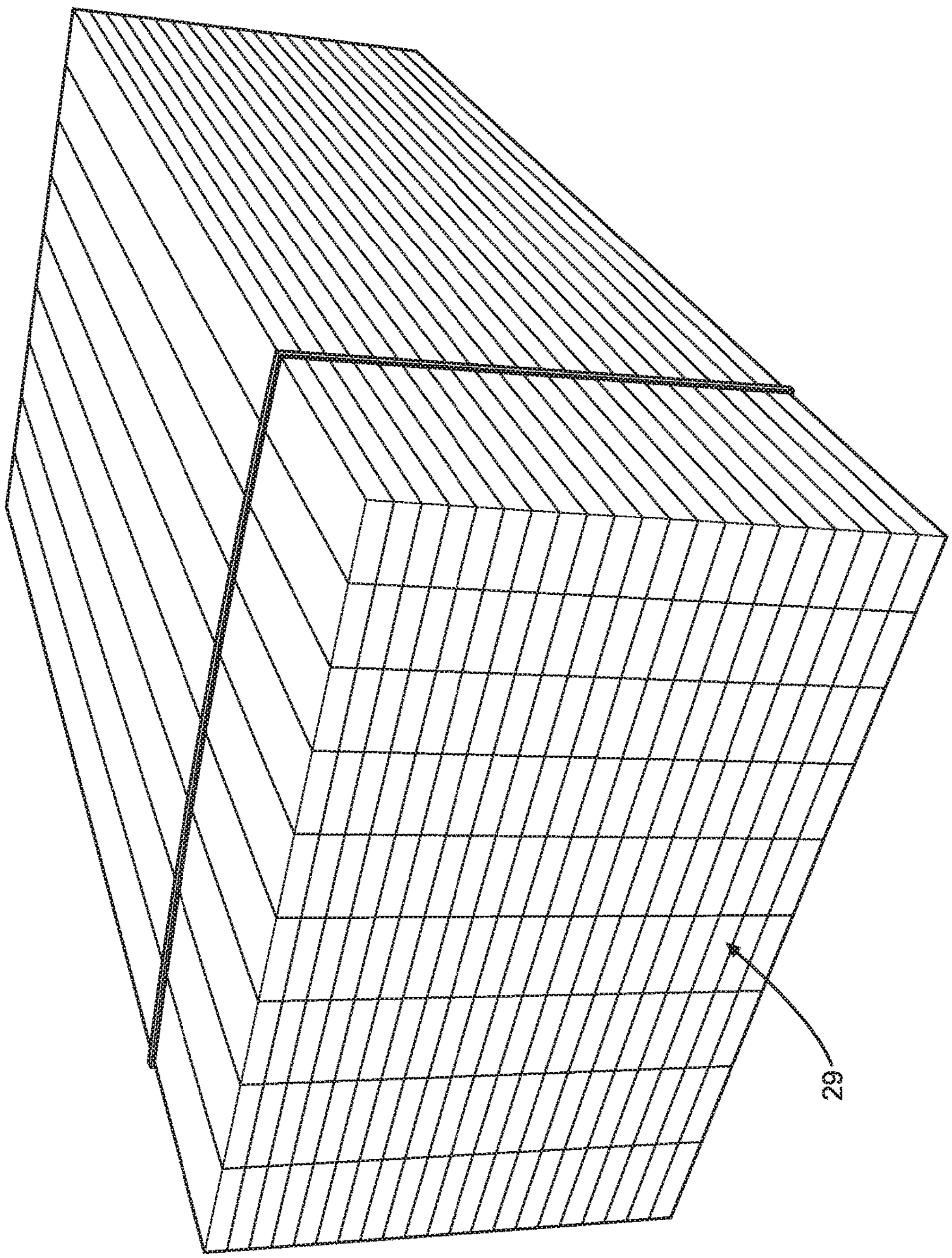
FIG. 18 is a perspective view of a bundle of Class-A fire-protected carbon-quantized finger-jointed lumber produced along the production line in the automated fire-treated lumber factory illustrated in FIG. 19.

Specification of the Method of and Apparatus for Producing a Bundle of Class-A Fire-Protected Lumber Produced in Accordance with the Principles of the Present Invention While most fires start small, they often spread rapidly onto surrounding flammable surfaces. Before long, the phenomenon of flash over occurs, where superheated gases cause a whole room to erupt into flame within minutes. Class-A fire-protected lumber of the present invention, as shown in FIG. 18, bears a clear or transparent surface impregnation formed by dip-infusion of lumber pieces in clean fire inhibiting chemical (CFIC) liquid, preferably Hartindo AF21 Total Fire Inhibitor, developed by Hartindo Chemicatama Industri of Jakarta, Indonesia, and commercially-available from Newstar Chemicals (M) SDN. BHD of Selangor Darul Ehsan, Malaysia http://newstarchemicals-.com/products.html. When so treated, Class-A fire-protected lumber products will prevent flames from spreading, and confine fire to the ignition source which can be readily extinguished, or go out by itself.

The primary chemical constituents of Hartindo AF21 include: monoammonium phosphate (MAP) ($NH_4H_2PO_4$); diammonium phosphate (DAP) $(NH_4)_2HPO_4$; ammonium sulphate $(NH_4)_2SO_4$; urea ($CH_4N_2O$); ammonium bromide (NH4Br); and tripotassium citrate $C_6H_5K_3O_7$. These chemicals are mixed together with water to form a clear aqueous solution that is environmentally-friendly (i.e. clean) non-toxic, but performs extremely well as a total fire inhibitor. In the presence of a flame, the chemical molecules in the CFIC-infusion formed with Hartindo AF21 liquid into the surface of the fire-protected lumber, interferes with the free radicals (H+, OH—, O) involved in the free-radical chemical reactions within the combustion phase of a fire, and breaks these free-radical chemical reactions and extinguishes the fire's flames.

Figure 19:
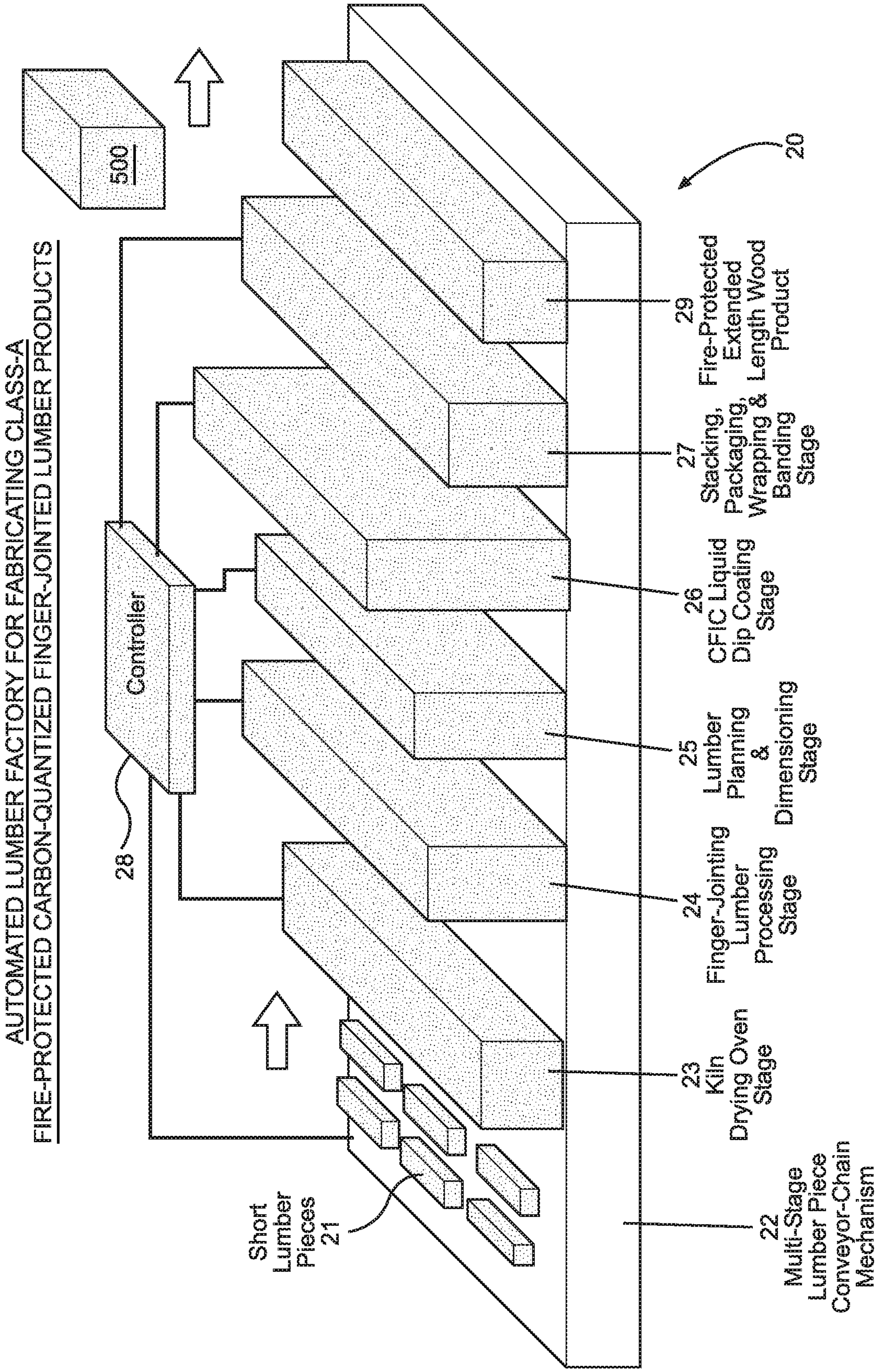
FIG. 19 is a perspective view of an automated lumber factory supporting an automated process for continuously fabricating Class-A fire-protected carbon-quantized finger-jointed lumber products which, after the planning and dimensioning stage, are automatically dip-coated in a bath or reservoir of clean fire inhibiting chemical (CFIC) liquid, and then automatically packaged, stack-dried and wrapped in a high-speed and economical manner.

FIG. 18 shows a bundle of Class-A fire-protected carbon-quantized finger-jointed lumber 29 produced using the method of and apparatus of the present invention. FIG. 19 shows an automated lumber factory system 20 for continuously fabricating wrapped and packaged bundles of Class-A fire-protected finger-jointed lumber product 29 in a high-speed manner, in accordance with the principles of the present invention. However, it is understood that this automated factory and production methods can be used to treat and protect solid wood and timber products, as well, so as to produce Class-A fire-protected solid wood products (e.g. studs, beams, boards, etc.), as well as engineered wood products.

Figure 19A:
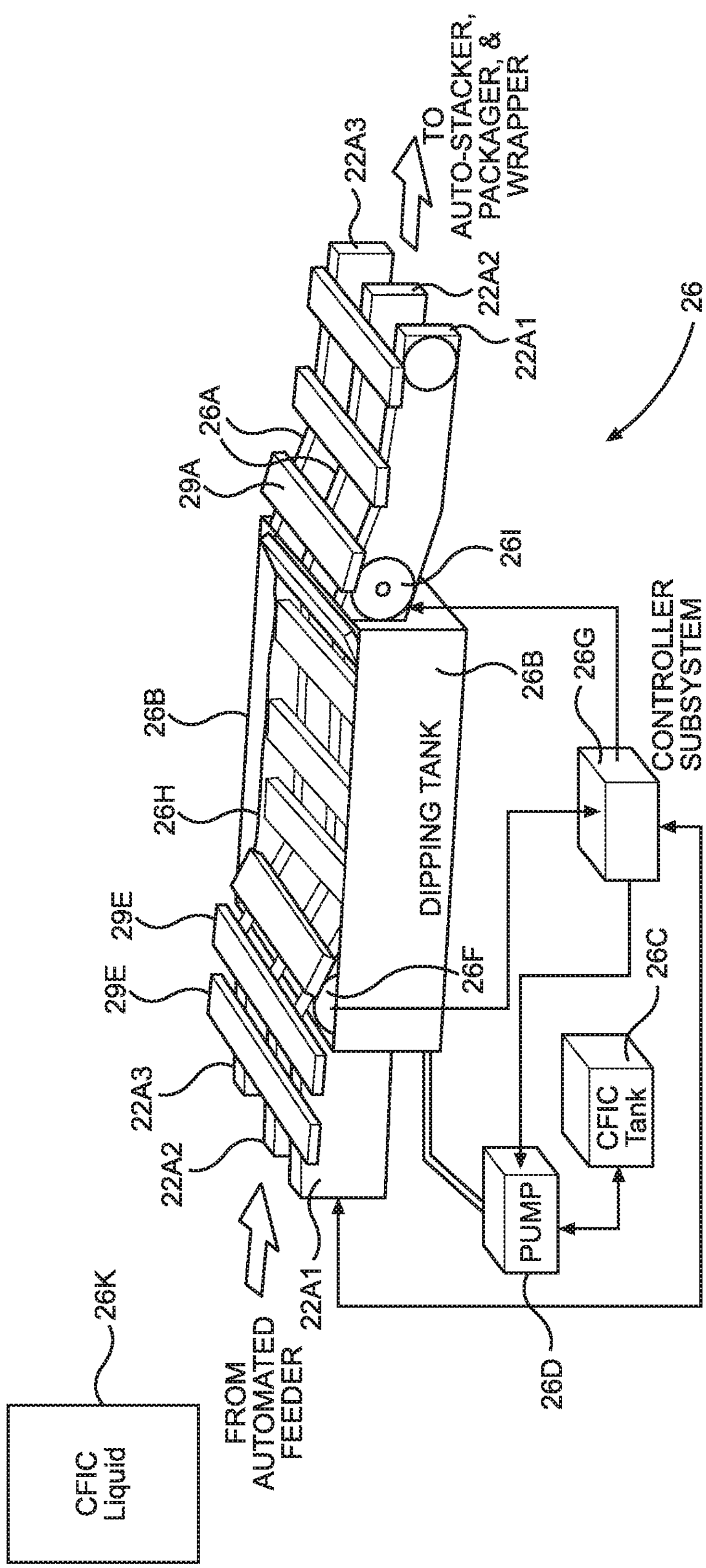
FIG. 19A is a perspective view of the high-speed CFIC dip-infusion stage depicted in FIG. 19, showing the various components used to implement this subsystem along the production line of the automated lumber factory.

As shown in FIG. 19, the factory 20 comprises a number of automated industrial stages integrated together under automation and control of controller 28, namely: a high-speed multi-stage lumber piece conveyor-chain mechanism 22 having 6 primary stages in the illustrative embodiment shown in FIGS. 19 and 19A; a kiln-drying stage 23 receiving short pieces of lumber 21 from a supply warehouse maintained in or around the factory; a finger-jointing lumber processing stage 24, for processing short-length pieces of kiln-dried lumber and automatically fabricating extended-length finger-jointed pieces of lumber 29, as output from this stage; a lumber planing and dimensioning stage 25 for planing and dimensioning elongated pieces of finger-jointed lumber into lumber pieces having lengths and dimensions for the product application at hand (e.g. studs); an in-line high-speed continuous CFIC liquid dip-infusion stage 26, as further detailed in FIG. 19A; and an automated stacking, packaging, wrapping and banding/strapping stage 27, from which bundles of packaged, wrapped and strapped Class-A fire-protected lumber product are produced in a high-speed automated manner.

During this last stage of the production process, each piece of Class-A fire-protected lumber is carbon-quantized using the carbon-quantization engine 500 over the network 100, and labeled or marked with the estimated quantity of fire-protected carbon units (FPCUs) in mass units (e.g. kg or tons) and recorded in the network database. This carbon quantization process may involve making a mass measurement of a sample piece of CFIC liquid dipped lumber, and also an electronically-measured moisture content measurement, and based on the dimensions and species of wood involved, the carbon quantization engine 500 takes this carbon quantization request and computes FPCU figure to this requests, records and registers the fire-protected lumber piece(s) or bundle, depending on how packaging is achieved, and the Class-A fire-protected carbon-quantized lumber piece (or bundle thereof) is labeled with the FPCU amount, by printing, stamping, laser etching or other marking means.

In general, the kiln-drying stage 23 can be implemented in different ways. One way is providing a drying room with heaters that can be driven by electricity, natural or propane gas, and/or other combustible fuels which release heat energy required to dry short-length lumber pieces prior to the finger-joint wood processing stage. Batches of wood to be treated are loaded into the drying room and treated with heat energy over time to reduce the moisture content of the wood to a predetermined level (e.g. 19% moisture). In alternative embodiments, the kiln-drying stage 23 might be installed an elongated tunnel on the front end of the production line, having input and output ports, with one stage of the conveyor-chain mechanism 22 passing through the heating chamber, from its input port to output port, allowing short-length lumber to be kiln-dried as it passes through the chamber along its conveyor mechanism, in a speed-controlled and temperature-controlled manner. Other methods and apparatus can be used to realize this stage along the lumber production line, provided that the desired degree of moisture within the wood is removed at this stage of the process.

As illustrated in FIG. 19, the finger-jointing lumber processing stage 24 can be configured as generally disclosed in US Patent Application Publication Nos. US20070220825A1 and US20170138049A1, incorporated herein by reference. In general, this stage involves robotic wood-working machinery, automation and programmable controls, well known in the finger-jointing wood art, and transforms multiple smaller-pieces of kiln-dried lumber into an extended-length piece of finger-jointed lumber, which is then planed and dimensioned during the next planning/dimensioning stage of the production line. An example of commercial equipment that may be adapted for the finger-jointing processing stage 24 of the present invention may be the CRP 2500, CRP 2750 or CRP 3000 Finger Jointing System from Conception R.P., Inc., Quebec, Canada http://www.conceptionrp.com/finger-jointing-systems.

As illustrated in FIG. 19, the lumber planing and dimensioning stage 25 includes wood planing equipment, such industrial band or rotary saws designed to cut and dimension finger-jointed lumber pieces produced from the finger-jointing lumber processing stage 24, into lumber boards of a specified dimension and thickness, in an highly programmed and automated manner.

As shown in FIG. 19A, the dip-infusion stage 26 of the factory system 20 comprises a number of components integrated together on the production line with suitable automation and controls, namely: a multi-stage chain-driven conveyor subsystem 22, supporting several parallel sets of chain-driven transport rails 22A1, 22A2 and 22A3, as shown, extending from the planing and dimensioning stage 25 towards the dipping tank 26B, and then running inside and along the bottom of the dipping tank 26B, and then running out thereof towards the stacking, packing, wrapping and banding/strapping stage 27, as shown, and having the capacity of transporting extend-length finger-jointed lumber pieces (i.e. boards) having a length as long as 30 or so feet; a dipping reservoir 26B having a width dimension to accommodate the width of the chain-driven conveyor rails 22A1, 22A2 and 22A3 mounted and running outside of and also within the dipping tank 26B, as shown, to transport up planed and dimensioned finger-jointed lumber pieces 29A supported upon the chain-driven rails 22A1, 22A2 and 22A3, while the boards are fully immersed and submerged at least 6 inches deep in CFIC liquid 26H contained in the dipping tank 26B, while moving at high speed, such as 300 feet/minute through the dipping tank 26B during the CFIC dip-infusion process of the present invention; electrically-powered driven motors 261 for driving the chain-driven conveyors 22A1, 22A2 and 22A3 under computer control to transport finger-jointed pieces of lumber from stage to stage along the lumber production line; a level sensor 26F for sensing the level of CFIC liquid 26B in the dipping tank at any moment in time during production line operation; a reservoir tank 26C for containing a large volume or supply of CFIC liquid solution 26K; a computer controller 26G for controlling the conveyor subsystem 22, and an electric pump 26D for pumping CFIC liquid into the dipping tank 26B to maintain a constant supply level during system operation in response to the liquid level measured by the level sensor 26F.

The high-speed CFIC liquid dip-infusion subsystem 26 shown in FIG. 19A may also include additional apparatus including, for example, liquid heaters, circulation pumps and controls for (i) maintaining the temperature of CFIC liquid solution in the dipping tank 26B, and (ii) controlling the circulation of CFIC liquid around submerged pieces of finger-jointed lumber 29A being transported through the dipping tank 26B in a submerged manner during a CFIC infusion process. Controlling such dip-infusion parameters may be used to control the amount and degree of absorption of CFIC liquid within the surface fibers of the finger-jointed lumber 29A as it is rapidly transported through the dipping tank 26B between the lumber planing and dimensioning stage 25 and the lumber stacking, packaging, wrapping and banding/strapping stage 27 of the lumber production line. Notably, the dip infusion process of the present invention allows for the rapid formation a surface infusion, or surface barrier, in and on the surface of each piece of dipped lumber, and in the presence of the surfactant in the CFIC liquid in the dipping tank, shallow impregnation of CFIC liquid 26H to occur into the surface fibers of each piece of lumber 29A near atmospheric pressure (i.e. below 6 inches of liquid CFIC in the dipping tank) during the dip-coated process according to the principles of the present invention. It is understood that drip pans may also be provided beyond the dipping tank 26B, installed beneath the chain-driven conveyor subsystem arranged between the dripping tank 26B and the stacking, packaging, wrapping and banding/strapping stage 27, to recover excess CFIC liquid dripping from the dip-coated lumber pieces 29A and returning this recovered CFIC liquid to the dipping tank 26B after appropriate filtering of the CFIC liquid if and as necessary.

As illustrated in FIG. 19, the stacking, packaging, wrapping and banding stage 27 includes equipment designed to automatically receive CFIC-coated finger-jointed lumber pieces 29A while still dripping and wet from CFIC liquid 26H, and wet stacking a predetermined number of lumber pieces into a package, and then wrapping the package of lumber with a sheet of wrapping material (e.g. TVEK or like material) that covers the top portion and at least half way down each side of the lumber package, and then banding or strapping the wrapped package with fiberglass or steel banding, well known in the art. The wrapping will typically be preprinted with trademarks and logos of the lumber manufacturer's brand. Finally, the ends of the lumber pieces in the strapped, wrapped lumber package are painted with a fire-protective paint also containing CFIC liquid (e.g. Hartindo AF21 Total Fire Inhibitor) in amounts to be effective in Class-A fire suppression.

Figure 20A:
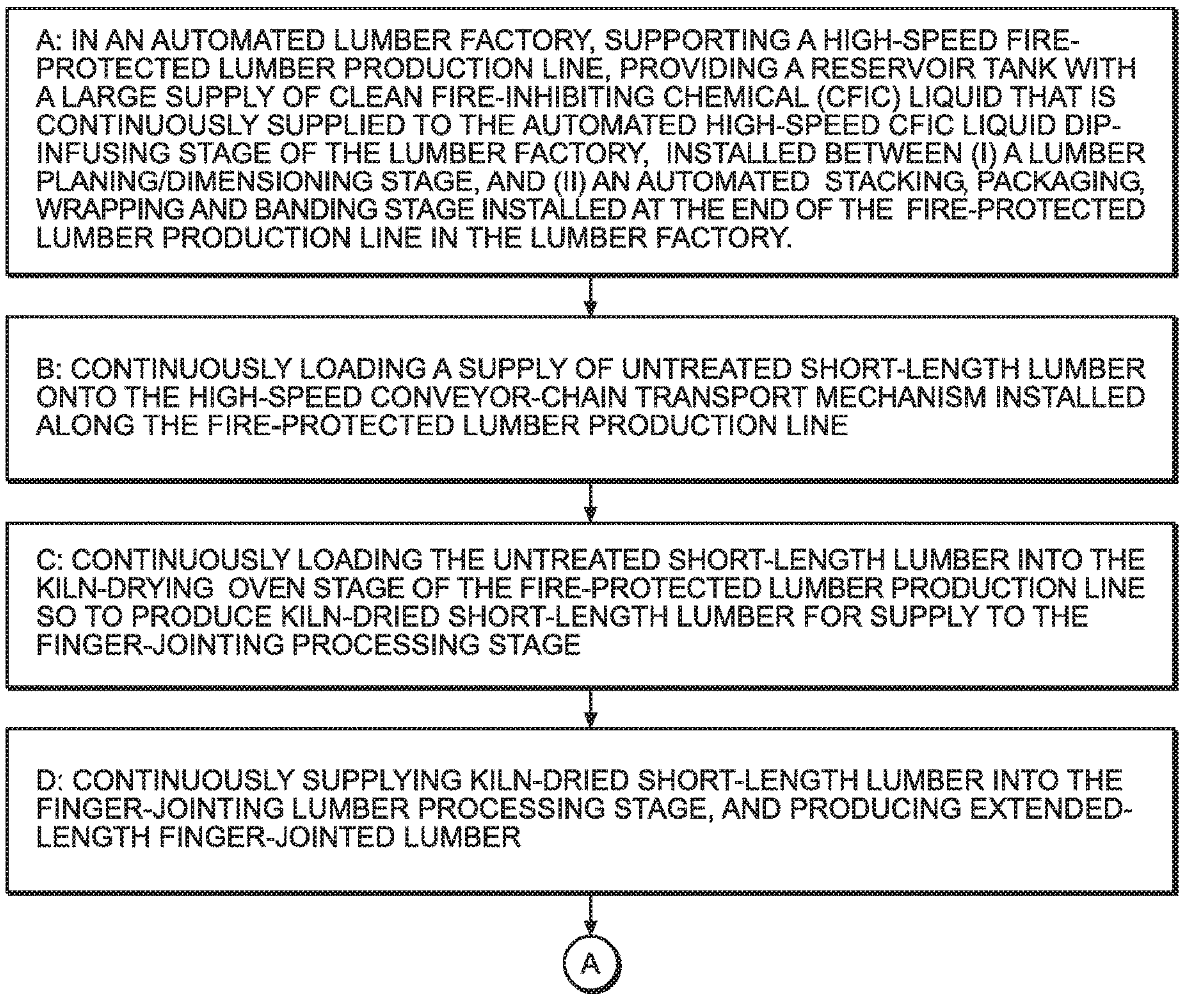
FIGS. 20A and 20B, taken together, set forth a flow chart describing the high level steps carried out when practicing the method of producing Class-A fire-protected carbon-quantized finger-jointed lumber pieces (e.g. studs or beams) in the automated fire-treated lumber factory shown in FIGS. 19 and 19A.
Figure 20B:
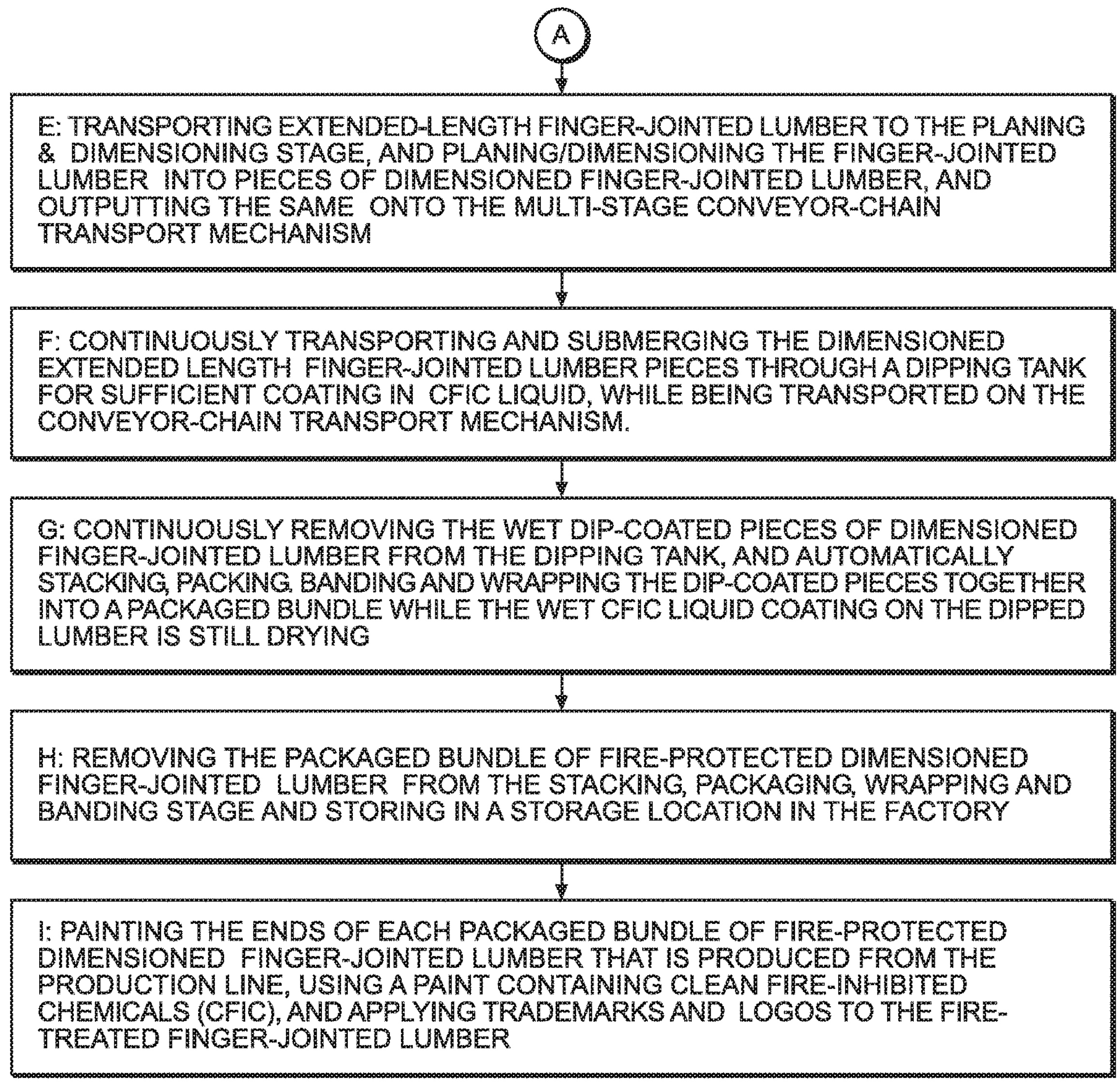

FIGS. 20A and 20B describe the high level steps carried out when practicing the method of producing bundles of Class-A fire-protected finger-jointed lumber 29 for use in fire-protected building construction.

As indicated at Block A in FIG. 20A, in an automated lumber factory, a high-speed Class-A fire-protected lumber production line is installed and operated, with a reservoir tank 26C containing a large supply of clean fire inhibiting chemical (CFIC) liquid 26K (e.g. Hartindo AF21 Total Fire Inhibitor) that is supplied to the automated CFIC liquid dip-infusion stage 26 of the lumber factory 20, installed between (i) the lumber planing/dimensioning stage 25, and (ii) an automated stacking, packaging, wrapping and banding stage 27 in the lumber factory 20.

As indicated at Block B in FIG. 20A, a supply of untreated short-length lumber is loaded onto the high-speed conveyor-chain transport mechanism 22 and auto-feeder installed along and between the stages of the lumber production line.

As indicated at Block C in FIG. 20A, the untreated short-length lumber is loaded into the controlled-drying stage 23 of the fire-protected lumber production line so to produce suitably dried short-pieces of lumber for supply to the finger-jointing processing stage 24. This stage can be performed by loading batches of short length lumber into the drying room or oven, whose temperature and humidity are strictly controlled using electric heaters and other equipment under computer control. Alternatively, short-length lumber pieces can be controllably dried by moving batches of short-length lumber through a tunnel-like drying room or chamber, through which chain-driven conveyor mechanism 22 passes, like other stages along the lumber production line, while the temperature and humidity of the environment is controlled using electric-driven or gas-combusting heaters under computer control in a manner well known in the art.

As indicated at Block D in FIG. 20A, the controllably-dried short-length lumber is continuously supplied into the finger-jointing lumber processing stage 24, for producing pieces of extended-length finger-jointed lumber in a highly automated manner.

As indicated at Block E in FIG. 20B, produced pieces of extended-length finger-jointed lumber are automatically transported to the planing/dimensioning stage 25 so that the finger-jointed lumber can be planed/dimensioned into pieces of dimensioned finger-jointed lumber 29A, and outputted onto the multi-stage conveyor-chain transport mechanism 22.

As indicated at Block F in FIG. 20B, the dimensioned finger-jointed lumber pieces 29A are continuously transported and submerged through an automated dipping tank 26B for sufficient infusion of CFIC liquid (e.g. Hartindo AF21 liquid) into the lumber while being transported on the conveyor-chain transport mechanism 22.

As indicated at Block G in FIG. 20B, the wet dip-coated pieces of dimensioned finger-jointed lumber are continuously removed from the dipping tank 26B, and automatically wet-stacking, packing, wrapping and banding the wet dip-coated pieces into a packaged bundle of Class-A fire-protected finger-jointed lumber.

As indicated at Block H in FIG. 20B, the packaged bundle of Class-A fire-protected finger-jointed lumber is removed from the stacking, packaging, wrapping and banding stage 27 and stored in a storage location in the factory 20. The strapping the bundle material used may be made of high-strength fiberglass plastic or metal banding material.

As indicated at Block I in FIG. 20B, the ends of each packaged bundle of fire-protected dimensioned finger-jointed lumber 29, produced from the production line, are painted using a Class-A fire-protected paint containing clean fire-inhibited chemicals (CFIC) (e.g. 25% Hartindo AF21 liquid, 75% liquid polymer binder, and black liquid pigment) and applying trademarks and logos to the wrapped package of Class-A fire-protected finger-jointed lumber.

In the illustrative embodiment, Hartindo AF21 Total Fire Inhibitor liquid is used as the CFIC liquid 26H that is deposited as a CFIC surface infusion during the dip-infusion of wood/lumber products on the production line of the present invention described above. The surfactants in Hartindo AF21 liquid formulation break the surface tension and allow its chemical molecules to impregnate ever so slightly the surface of the treated wood. This way, in the presence of a flame, the chemical molecules in the CFIC-coating on the surface of the fire-protected lumber, interferes with the free radicals (H+, OH—, O—) produced during the combustion phase of a fire, and breaks the fire's chemical reaction and extinguishes its flame. This is a primary fire suppression mechanism implemented by the CFIC-coatings deposited on wood surfaces in accordance with the various principles of invention disclosed and taught herein.

The table in FIG. 21 illustrates the flame spread and smoke development indices of fire-protected carbon-quantized lumber 29 produced using the method of the illustrative embodiment, using Hartindo AF21 as a CFIC liquid dip coating material, described in FIGS. 20A and 20B. As shown in the table, the flame spread index for Spruce Pine Fir (SPF) was measured to be 15, whereas the smoke development index measured to be 95. The flame-spread index for Douglas Fir was measured to be 0, whereas the smoke development index measured to be 40.

Figure 22:
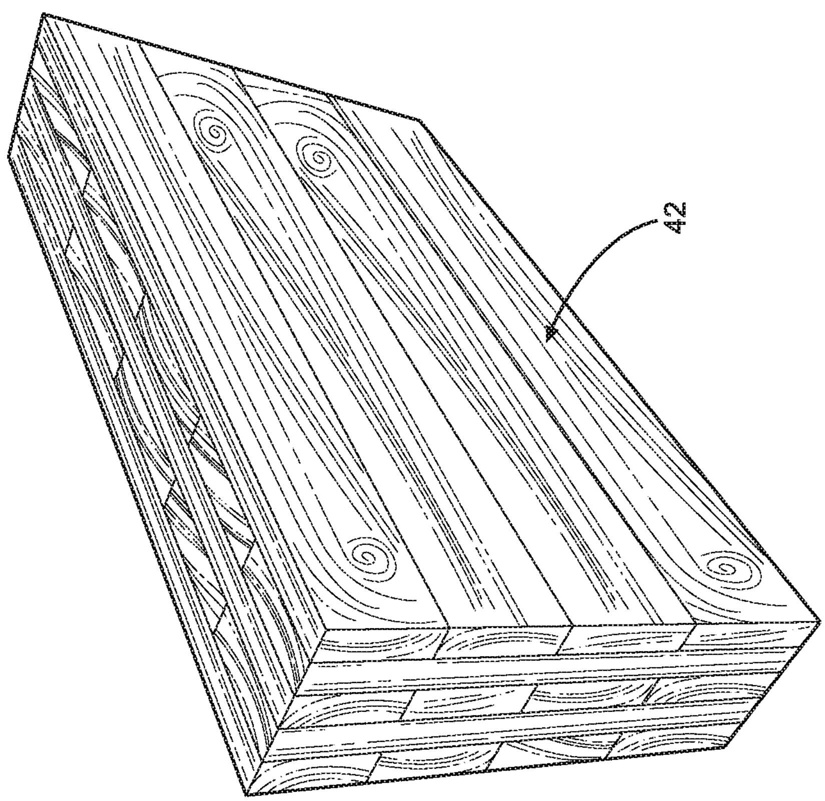
FIG. 22 is a perspective view of a Class-A fire-protected carbon-quantized cross-laminated-timber (CLT) product (e.g. panel, stud, beam, etc.) fabricated along the production line of the automated lumber fabrication factory shown in FIGS. 23 and 23A.

Specification of the Method of and Apparatus for Producing Class-A Fire-Protected Cross-Laminated Timber (CLT) Panels in Accordance with the Principles of the Present Invention FIG. 22 shows a bundle of fire-protected carbon-quantized cross-laminated timber (CLT) products (e.g. panels 42) produced using the method and apparatus of the present invention. The Class-A fire-protected cross-laminated timber (CLT) of the present invention 42 bears a surface infusion of clean fire inhibiting chemical (CFIC) liquid (e.g. Hartindo AF21 Total Fire Inhibitor). This CFIC infusion prevents flames from spreading by breaking the free radical chemical reaction within the combustion phase of fire, and confining the fire to the ignition source which can be readily extinguished, or go out by itself. When practicing the present invention, it is important that other fungicides, biocides, wood preservatives, and/or mildew agents are not added to the CFIC solution 39H (i.e. Hartindo AF21) in the CFIC dip infusion tank 32B because it has been discovered that such agents will chemically interfere with and adversely effect the fire-inhibiting properties and characteristics of the Hartindo AF21 fire-inhibiting chemicals, proven by E84 flame spread test results.

Figure 23:
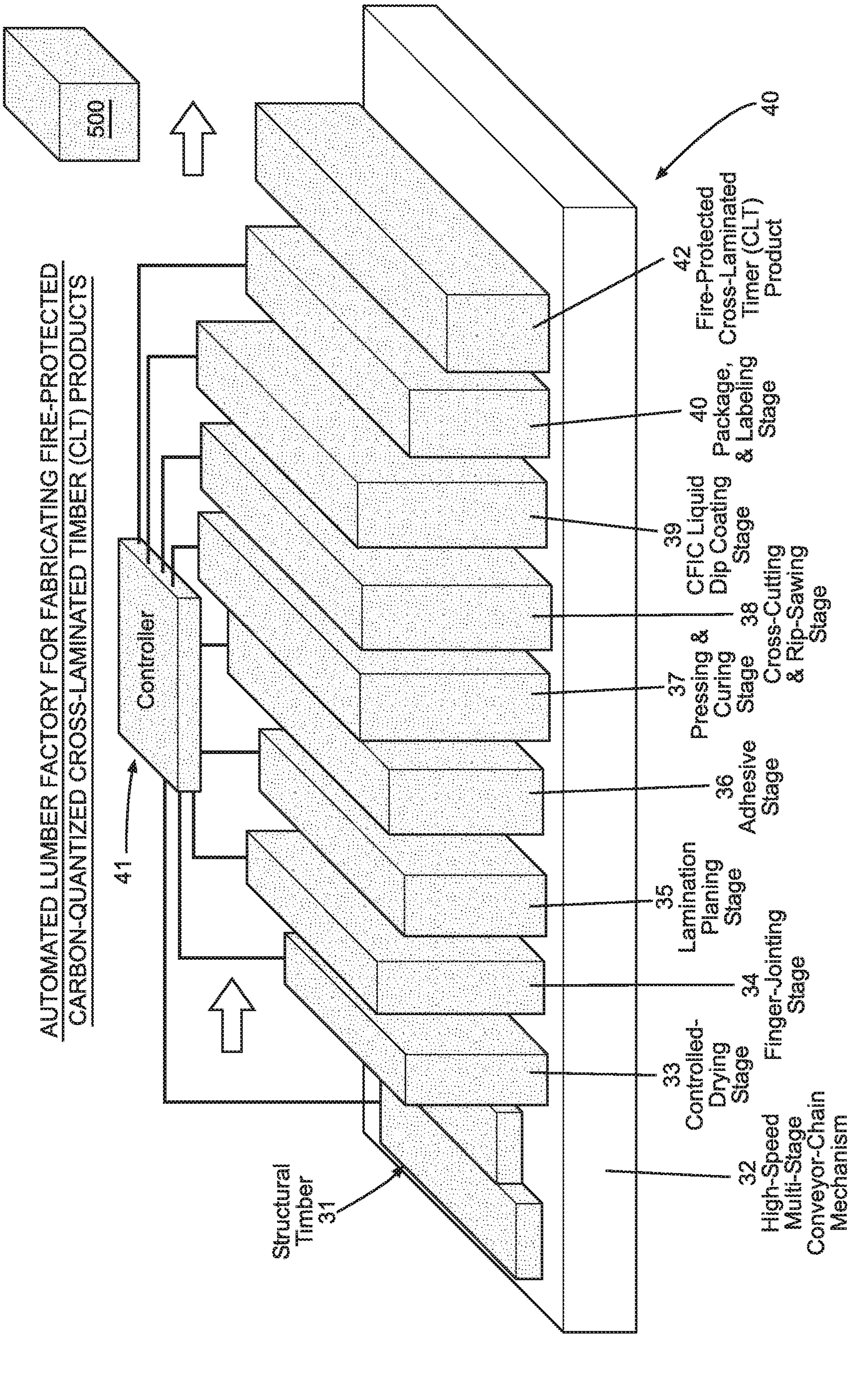
FIG. 23 is a perspective view of an automated lumber fabrication factory supporting an automated process for continuously fabricating cross-laminated timber (CLT) products which, after the planning and dimensioning stage, are automatically dip-coated in a bath of clean fire inhibiting chemical (CFIC) liquid, and then stacked, packaged and wrapped in a high-speed manner to produce Class-A fire-protected carbon-quantized CLT products.

FIG. 23 shows an automated factory system 30 for producing Class-A fire-protected cross-laminated timber (CLT) panels, beams, and other products 42 in a high volume manner. As shown in FIG. 23, the factory 30 comprises a number of automated stages integrated together under automation and control, namely: a multi-stage conveyor-chain mechanism 32 having numerous primary stages in the illustrative embodiment shown in FIGS. 23 and 23A; a controlled-drying stage 33 receiving short pieces of lumber from a supply warehouse maintained in or around the factory and drying them in a controlled manner well known in the art; a finger-jointing stage 34, for processing short-length pieces of dried timber (i.e. lumber) and automatically fabricating extended-length finger-jointed pieces of timber, as output from this stage; a lamination planing stage 35 for planing finger-jointed pieces of timber to produce finger-jointed timber laminations; an automated adhesive stage 36 for applying adhesive to the finger-jointed timer laminations; a pressing and curing stage 37 where the finger-jointed laminations with adhesive are stacked in a cross-directional manner and then placed in pressing machine where the adhesive is cured under pressure to produce a cross-laminated timber (CLT) panel, beam or other product; cross-cutting and rip-sawing stage 38 for cutting and ripping cross-laminated timber (CLT) panels into CLT products 42A; a chain-driven conveyor 32 for conveying the CLT product 42A along the next few stages of the production line; an in-line CFIC liquid dip-infusion stage 39, as further detailed in FIG. 23A, supporting an elongated dipping tank 39B through which the chain-driven conveyor 32 transports CLT product into the dipping tank 39H and along its length while submerged under CFIC liquid (e.g. Hartindo AF21 Total Fire Inhibitor) 39H during dip-infusion operations, to form a CFIC infusion in and through the surfaces of the CLT product, and removing the CFIC-infused CLT product from the dipping tank and transport it to the next stage along the production line; a packaging and wrapping/labeling stage 40 for packaging and wrapping/labeling CLT product 42A either after it has dried, or while the CFIC-coated CLT product is still wet and allowed to dry in its wrapping.

During this last stage of the production process, each piece of Class-A fire-protected CLT is carbon-quantized using the carbon-quantization engine 500 over the network 100, and labeled or marked with the estimated quantity of fire-protected carbon units (FPCUs) in mass units (e.g. kg or tons) and recorded in the network database. This carbon quantization process may involve making a mass measurement of a sample piece of CFIC-dipped CLT, and also an electronically-measured moisture content measurement, and based on the dimensions and species of wood involved, the carbon quantization engine 500 takes this carbon quantization request and computes FPCU figure to this requests, records and registers the fire-protected carbon-quantized lumber piece(s) or bundle thereof, depending on how packaging is achieved, and the fire-protected carbon-quantized lumber piece (or bundle thereof) is labeled with the FPCU amount, by printing, stamping, laser etching or other marking means.

In general, the controlled-drying stage 33 will include drying room with heaters that can be driven by electricity, natural or propane gas, or other combustible fuels which produce heat energy required to dry short-length lumber prior to the finger-joint wood processing stage. Some alternative embodiments, the controlled-drying stage 33 might be installed on the front end of the production line as shown in FIG. 23, and having input and output ports, with one stage of the conveyor-chain mechanism 32 passing through the heating chamber, from its input port to output port, allowing short-length lumber to be kiln-dried as it passes through the chamber along its conveyor mechanism. Other methods and apparatus can be used to realize this stage of the lumber production line of the present invention, provided that the desired degree of moisture within the wood is removed with heat or radiant energy at this stage of the process.

As illustrated in FIG. 23, the finger-jointing lumber processing stage 34 can be configured as generally disclosed in US Patent Application Publication Nos. US20070220825A1 and US20170138049A1, incorporated herein by reference. In general, this stage involves robotic wood-working machinery, automation and programmable controls, well known in the finger-jointing wood art, and transforms multiple smaller-pieces of kiln-dried lumber into an extended-length piece of finger-jointed lumber, which is then planed and dimensioned during the next planning/dimensioning stage of the production line. An example of commercial equipment that may be adapted for the finger-jointing processing stage 34 of the present invention may be the CRP 2500, CRP 2750 or CRP 3000 Finger Jointing System from Conception R.P., Inc., Quebec, Canada http://www.conceptionrp.com/fingerjointing-systems.

As illustrated in FIG. 23, the laminating planing stage 35 includes wood lamination planing equipment, such industrial band or rotary saws designed to cut, plane and dimension finger-jointed lumber pieces produced from the finger-jointing stage 34, into finger-jointed timber laminations of a specified dimension and thickness.

As illustrated in FIG. 23, the lamination planing stage 35 can be realized using a band or radial saw as may be required to produce finger-jointed laminations.

As illustrated in FIG. 23, the adhesive application stage 36 can be realized using automated adhesive applicators well known in the art to apply a predetermined controlled amount of adhesive to each finger-jointed timber lamination during the automated finger-jointing process.

As illustrated in FIG. 23, the pressing and curing stage 37 can be realized using an automated pressing and curing machine well known in the art to apply a predetermined controlled amount of pressure to the timber laminations after they have been cross-configured, and placed into the machine for pressing and subsequent curing operations.

Figure 23A:
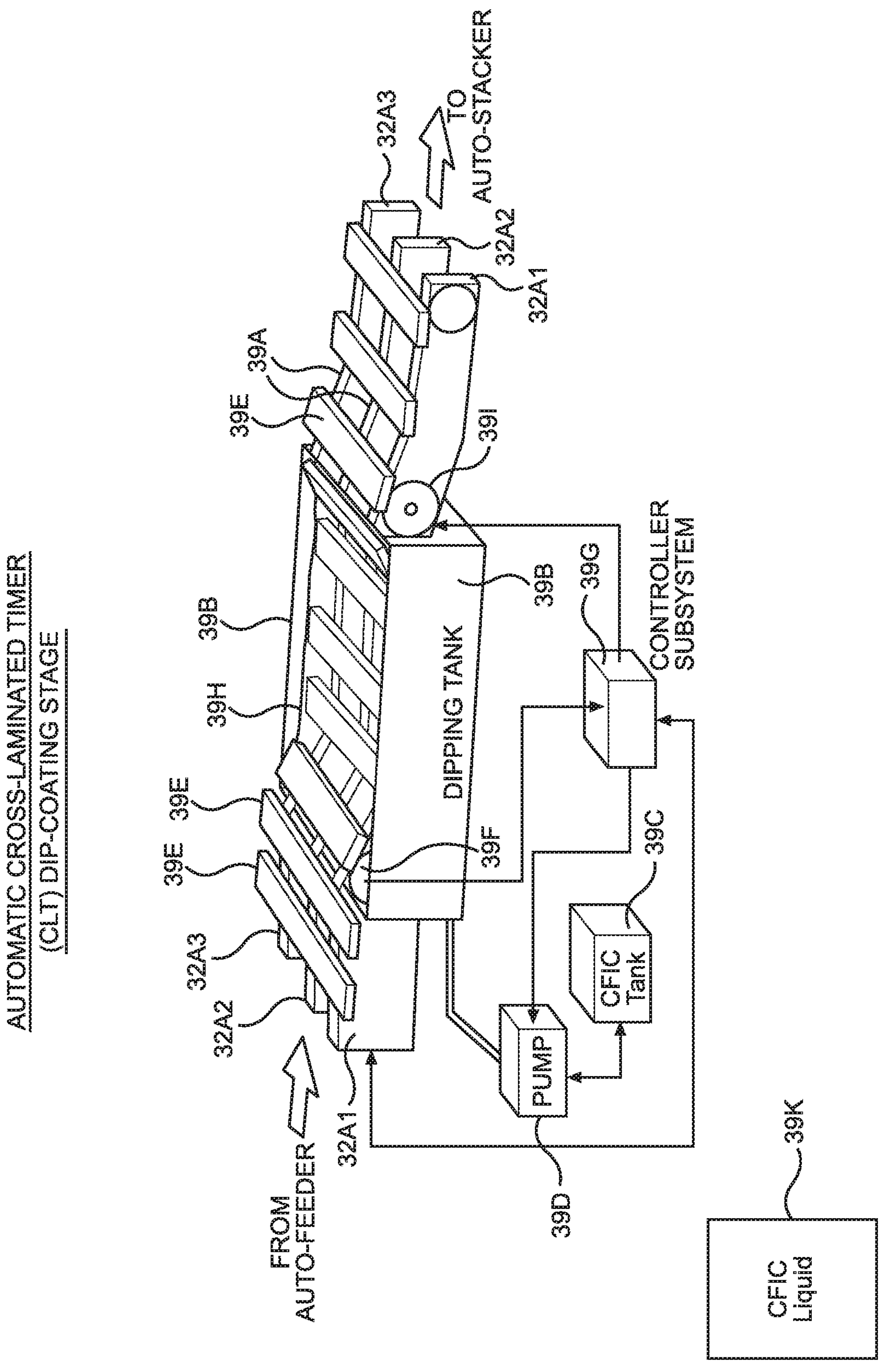
FIG. 23A is a perspective view of the automatic cross-laminated timber (CLT) dip-infusion stage deployed along the production line of the automated lumber fabrication factory shown in FIG. 23.

LEDINEK Engineering, do.o.o, of Hoce, Slovenia, offers complete turnkey CLT production lines for high-volume automated production of cross-laminated timber (CLT) panels. Such systems comprise: lamination planers; finger jointing machines; presses & curing machines; and automation and controllers. Such technologies and machines can be used to implement many of the stages described above in the CLT panel production line of the present invention. https://www.ledinek.com/engineered-timber As shown in FIG. 23A, the in-line high-speed continuous CFIC liquid dip-infusion stage 39 of the production line comprises a number of components integrated together, with suitable automation and controls, namely: a multi-stage lumber board chain-driven conveyor subsystem 32, supporting several parallel sets of chain-driven transport rails 32A1, 32A2 and 32A3, as shown, extending from the pressing and curing stage 39 towards a dipping tank 39B, and then running inside and along the bottom of the dipping tank 39B, and then running out thereof, towards the packing and wrapping stage 40, as shown, and having the capacity of transporting CLT panels and boards having a length up to 30 or so feet.

In the illustrative embodiment, the dipping tank 39B has a width dimension of 32 or so feet to accommodate the width of the CLT product being transported on chain-driven conveyor rails 32A1, 32A2 and 32A3 mounted and running outside of and also within the dipping tank 39B, as shown. As shown, the CLT products 42A are supported upon the chain driven rails 32A1, 32A2 and 32A3 while the CLT products are transported through the dipping tank 39B while fully immersed and submerged at least 6 inches deep in CFIC liquid 39H contained in the dipping tank 39B, moving lumber in and out of the dipping tank 39B in just a few seconds during the CFIC dip-infusion process of the present invention. Electrically powered driven motors 391 are provided for the purpose of driving the chain-driven conveyors 32A1, 32A2 and 32A3 under computer control to transport CLT products 39E from stage to stage along the production line. A level sensor 39F is used for real-time sensing and control of the liquid level of CFIC liquid 39H in the dipping tank 39B at any moment in time during production line operation. A reservoir tank 39C is provided for containing a large volume or supply of made up CFIC liquid solution (e.g. Hartindo AF21 Total Fire Inhibitor). Also, a computer controller 39G is used for controlling the conveyor subsystem 32, and an electric pump 39D for pumping CFIC liquid into the dipping tank 39B to maintain a constant supply level during system operation in response to the liquid level measured by the level sensor 39F and supplied to the control computer 39G.

The high-speed dip-infusion subsystem 39 may also include additional apparatus including, for example, liquid heaters, circulation pumps and controls for (i) maintaining the temperature of CFIC liquid solution in the dipping tank 39B, and (ii) controlling the circulation of CFIC liquid around submerged CLT product 39E being transported through the dipping tank in a submerged manner during a CFIC infusion process. Controlling such dip infusion parameters may be used to control the amount and degree of absorption of CFIC liquid within the surface fibers of the CLT product, as it is rapidly transported through the dipping tank 39B. Notably, the dip infusion process allows for the rapid formation a surface infusion, or surface barrier, in and through the surface of each piece of dipped CLT product 39E, and in the presence of a surfactant in the CFIC liquid in the dipping tank 39B, shallow impregnation of CFIC liquid 39H (e.g. Hartindo AF21) can occur into the surface fibers of each CLT piece 42A near atmospheric pressure (i.e. below 6 inches of liquid CFIC in the dipping tank). It is understood that drip pans may also be provided beyond the dipping tank 39B, installed beneath the chain-driven conveyor subsystem 32 arranged between the dripping tank 39B and the packaging and wrapping stage 40, so as to recover excess CFIC liquid dripping from the dip-coated lumber pieces and returning this recovered CFIC liquid to the dipping tank 39B after appropriate filtering of the CFIC liquid if and as necessary.

As illustrated in FIG. 23, the packaging and wrapping stage 40 includes equipment designed to receive CFIC-coated CLT product while still dripping and wet from CFIC liquid, and wrapping the CLT product 42A with a sheet of wrapping material (e.g. TVEK or like material) that covers the top portion and at least half way down each side of the CLT product, and then banding or strapping the wrapped package 42 with fiberglass or steel banding, well known in the art. The wrapping will typically be preprinted with trademarks and logos of the lumber manufacturer's brand. Finally, the ends of the lumber pieces in the strapped, wrapped lumber package 42 are painted with a fire-protective paint also containing CFIC liquid material, in amounts to be effective in fire suppression.

Figure 24B:
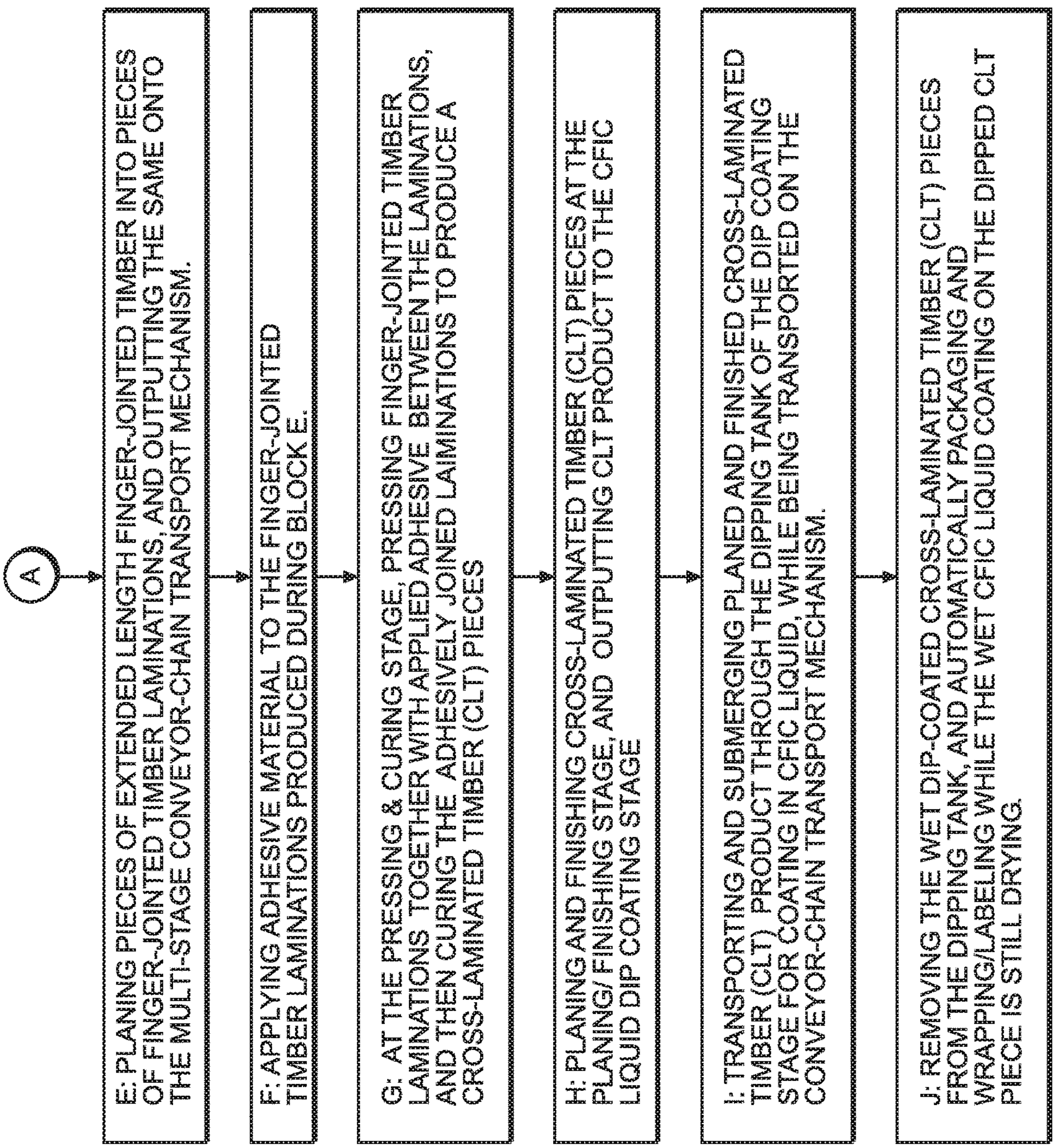

FIGS. 24A and 24B describe the high level steps carried out when practicing the method of producing bundles of Class-A fire-protected cross-laminated timber (CLT) 42 for use in fire-protected building construction.

As indicated at Block A in FIG. 24A, in an automated lumber factory, a high-speed Class-A fire-protected lumber production line is installed and operated, with a reservoir tank 39B containing a large supply of clean fire inhibiting chemical (CFIC) liquid 39H that is continuously supplied to the automated high-speed CFIC liquid dip-infusion stage 39 of the lumber factory, installed between (i) a cross-cutting and rip-sawing stage 38, and (ii) an automated stacking, packaging, wrapping and banding/strapping stage 40 installed at the end of the production line in the factory.

As indicated at Block B in FIG. 24A, a supply of untreated short-length lumber is loaded onto the conveyor-chain transport mechanism 32 installed along and between the stages of the production line.

As indicated at Block C in FIG. 24A, the untreated short-length lumber is loaded into the controlled-drying stage of the production line so to produce suitably dried short-length lumber for supply to the finger-jointing processing stage 34. This stage can be performed by loading batches of short length lumber into the drying room or oven, whose temperature and humidity are strictly controlled using electric heaters and other equipment under computer control. Alternatively, short-length lumber pieces can be controllably dried by moving batches of short-length lumber through a tunnel-like drying room or chamber, through which chain-driven conveyor mechanism 32 passes, like other stages along the lumber production line of the present invention, while the temperature and humidity of the environment is controlled using electric-driven or gas-combusting space heaters under computer control in a manner well known in the art.

As indicated at Block D in FIG. 24A, the controllably-dried short-length lumber is continuously supplied into the finger-jointing stage 34, for producing pieces of extended-length finger-jointed timber (lumber) in a highly automated manner.

As indicated at Block E in FIG. 24B, pieces of extended length finger-jointed timber are planed and dimensioned into pieces of finger-jointed timber laminations, and outputting the same onto the conveyor-chain transport mechanism 32.

As indicated at Block F in FIG. 24B, adhesive material is applied to the finger-jointed timber laminations produced during Block E.

As indicated at Block G in FIG. 24B, at the pressing & curing stage 37, pressing a plurality of finger-jointed timber laminations together with applied adhesive between the laminations, and then curing the adhesively joined laminations to produce a cross-laminated timber (CLT) pieces.

As indicated at Block H in FIG. 24B, cross-laminated timber (CLT) pieces are planed and finished at the cross-cutting and rip-sawing stage 38, and outputting finished CLT product to the CFIC liquid dip infusion stage 39.

As indicated at Block I in FIG. 24B, the finished CLT products are continuously transported and submerged through the dipping tank 39B of the dip stage 39 for sufficient coating or infusion of CFIC liquid (e.g. Hartindo AF21 Total Fire Inhibitor) 39H into the CLT products, while being transported on the conveyor-chain transport mechanism 32.

As indicated at Block I in FIG. 24B, continuously removing the wet dip-coated cross-laminated timber (CLT) pieces are continuously removed from the dipping tank 39B, and automatically stacked, packaged and wrapped/labeled while wet with CFIC liquid, and allowed to dry within the package wrapping.

In the illustrative embodiment, Hartindo AF21 Total Fire Inhibitor is used as the CFIC liquid solution 34H to form the CFIC surface infusion onto treated wood/lumber products produced on the production line of the factory described above. The clinging agent in the Hartindo AF21 CFIC liquid enables its chemical molecules to cling to the surface of the CFIC-coated wood, while its surfactants help to break the surface tension and allow chemical molecules to impregnate ever so slightly the surface of the treated wood. This way, in the presence of a flame, the chemical molecules in the CFIC-infusion through the surface of the fire-protected lumber, interferes with the free radicals (H+, OH—, O—) of the chemical reaction produced within the combustion phase of a fire, and breaks the fire's chemical reaction and extinguishes its flame. This is a primary fire suppression mechanism deployed or rather implemented by the CFIC-coatings deposited on wood surfaces in accordance with the various principles of invention, disclosed and taught herein.

The table in FIG. 25 illustrates the flame spread and smoke development indices of fire-protected lumber produced using the method of the illustrative embodiment described in FIGS. 20A and 20B. As shown in the table, the flame spread index for Spruce Pine Fir (SPF) was measured to be 15, whereas the smoke development index measured to be 95. The flame-spread index for Douglas fir was measured to be 0, whereas the smoke development index measured to be 40.

Specification of the Method of and Apparatus for Producing Class-A Fire-Protected Laminated Veneer Lumber (LVL) Products (i.e. Studs and Boards) in Accordance with the Principles of the Present Invention In many ways, LVL (Laminated Veneer Lumber) beams, headers, columns and studs provide a better alternative than traditional solid sawn lumber pieces, as such engineered wood products (EWPs) are a stronger, stiffer, more consistent and more predictable building material. Also, when compared to similar sized sections, fire-protected LVL products can support heavier loads and allow greater spans than conventional lumber. Every LVL product is made from sheets of veneer. When these sheets are combined into a continuous billet or piece of LVL, the effects of flaws in individual sheets are negated because they are spread throughout the cross-section of the billet, rather than being concentrated in specific locations, such as is the case with sawn lumber. For example, a flaw in a single sheet of veneer laid up into a 15-ply mat or billet of LVL will effectively be 1/15. The challenge facing LVL producers is how to make the strongest possible LVL from their available raw material using smart grading techniques to sort their veneers. LVL is produced and used in a variety of different lengths, thicknesses and widths. In general, the LVL process is based on a combination of continuous lay-up and cycle-type hot pressing that is suitable for the production of LVL products in all lengths.

Figure 26:
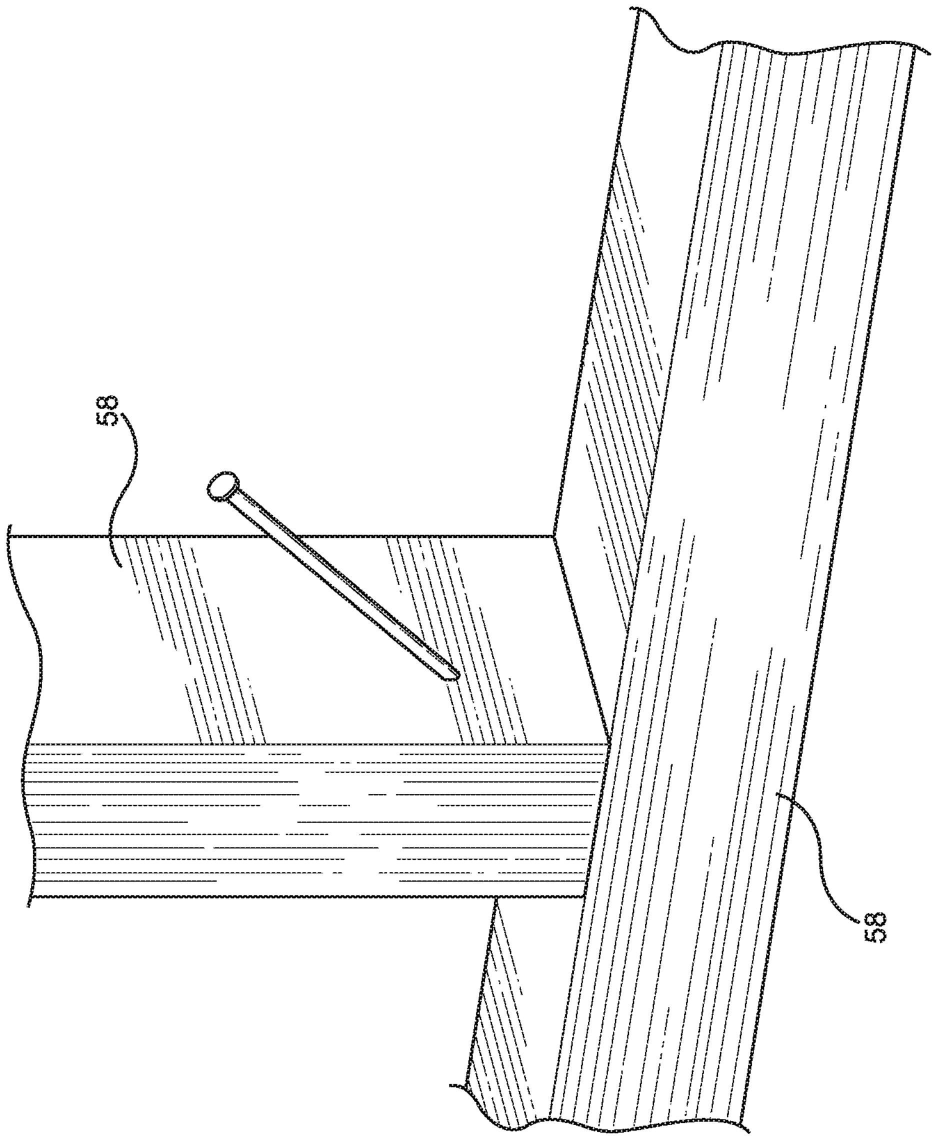
FIG. 26 is a perspective view of Class-A fire-protected carbon-quantized laminated veneer lumber (LVL) products, such as studs in load-bearing and non load-bearing walls as well as in long-span roof and floor beams.
Figure 27:
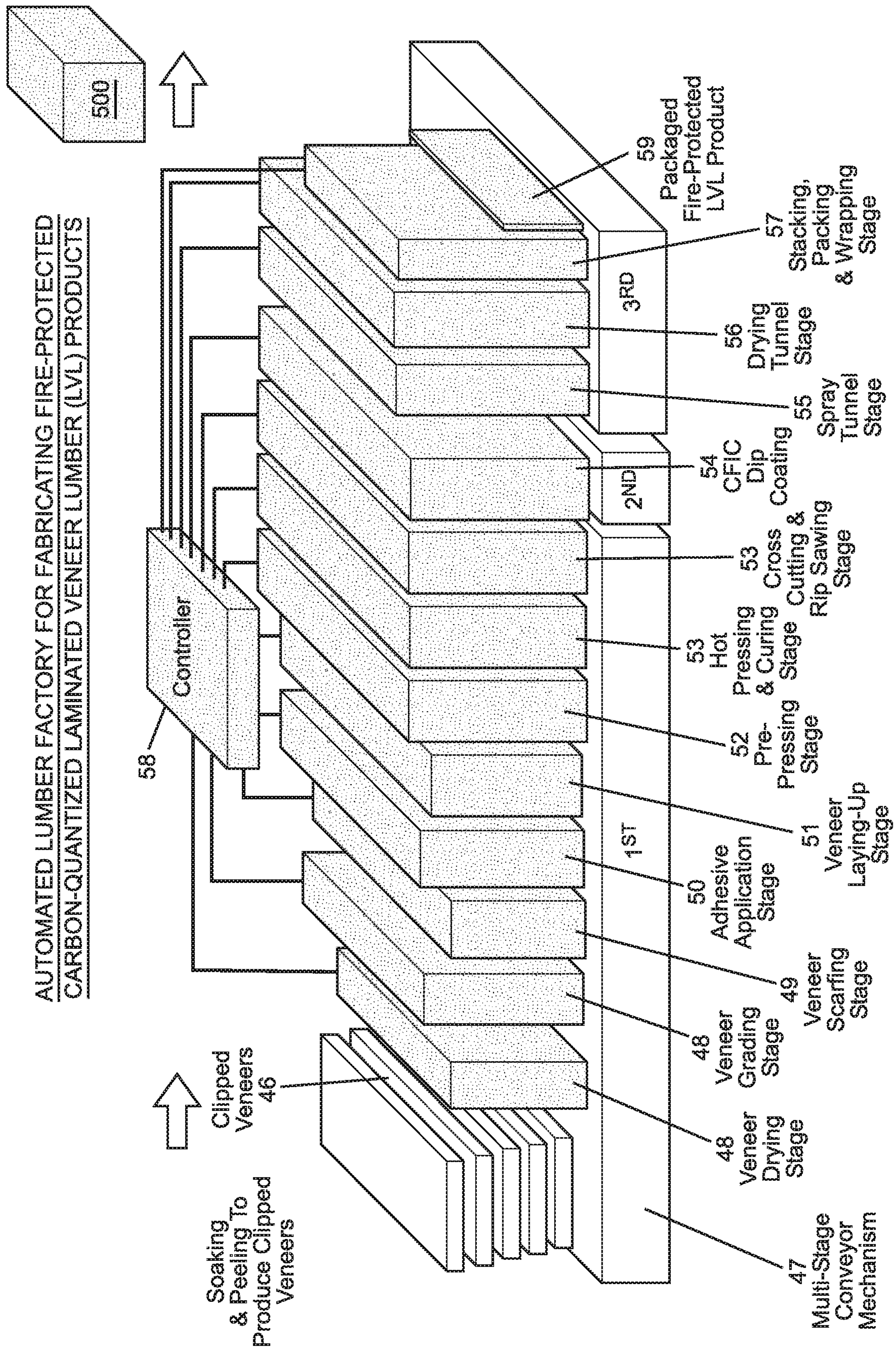
FIG. 27 is schematic representation of an automated lumber factory for fabricating Class-A fire-protected carbon-quantized laminated veneer lumber (LVL) products along a multi-stage production line.
Figure 27A:
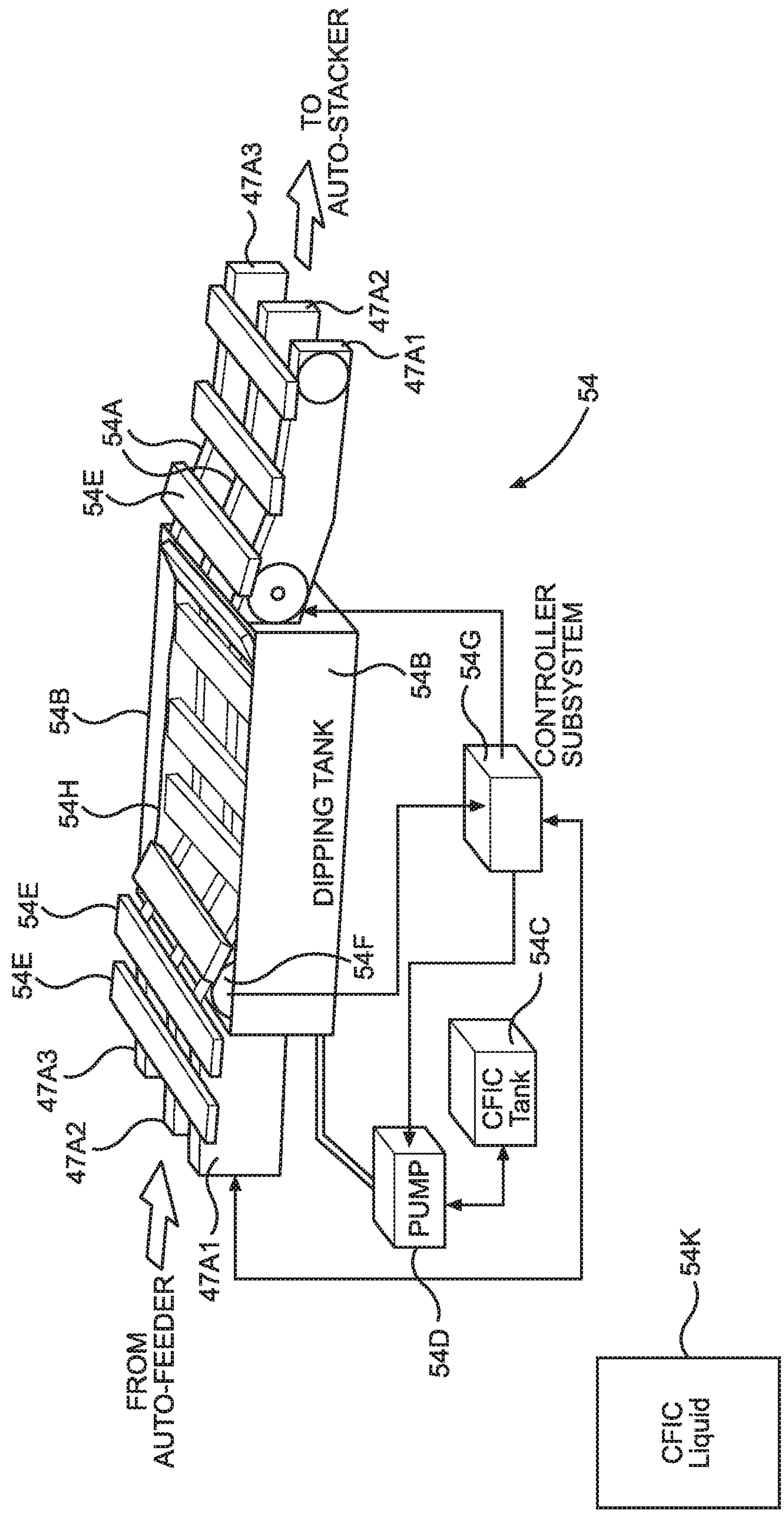
FIG. 27A is a perspective view of the automatic laminated veneer lumber (LVL) dip-infusion stage deployed along the production line of the automated lumber fabrication factory shown in FIG. 27.

FIG. 26 shows a stack of Class-A fire-protected laminated veneer lumber (LVL) products (i.e. beams, headers, columns, studs and rim boards) 57A produced using the method and automated factory system 45 shown in FIGS. 27 and 27A. The Class-A fire-protected laminated veneer lumber (LVL) products 57A bear two coatings: (i) an under-layer surface-coating of Class-A fire-protection provided by a dip-infusion of CFIC fire-inhibiting chemical (e.g. Hartindo AF21 Total Fire Inhibitor) which is allowed to stack-dry (e.g. for 24 hours or so); and (ii) a top-layer moisture, fire and UV protective coating that is spray-coated over the CFIC dip-coated, using a spraying tunnel 55, to deposit a moisture, fire and UV protection coating over the Class-A fire-protection coating over the LVL product.

In the illustrative embodiment, the top protective coating is formulated as follows: 75% by volume of Dectan chemical by Hartindo Chemicatama Industri; 25% by volume of Hartindo AF21 Total Fire Inhibitor; and 1.0-0.75 [cups/gallon] ceramic microsphere dust mixed in as an additive, where 1 cup=8.0 US fluid ounces. This rugged top protective coating, which Applicant will trademark under Gator Skin™, protects the CFIC infusion (e.g. Hartindo AF21 fire inhibitor) from being washed out under outdoor weather conditions expected during building construction when roof, wall and floor sheeting is exposed to and impacted by the natural environment until the building is "dried in."

FIG. 27 shows an automated factory system 45 for producing Class-A fire-protected laminated veneer lumber (LVL) products in a high volume manner in accordance with the principles of the present invention. As shown in FIG. 27, the factory 45 comprises a number of automated stages integrated together under automation and control, namely: a conveyor-chain mechanism 47 having numerous stages in the illustrative embodiment shown in FIGS. 27 and 27A, and a stage for delivering clipped veneer to the front of the LVL production line. The stage that delivers the continuous supply of clipped veneer is supported by five preceding stages, starting in the log yard, where veneer logs are delivered to the log yard for the LVL process. There, the logs, graded A and J and suitable for peeling, are debarked at a log debarking stage, and then bathed in a hot bath at the hot log bath stage, to increase the core temperature of the logs up to about 65 degrees Celsius. Such hot log bath equipment can be obtained from the Southern Cross Engineering Co. Then, at a lathe peeling stage, the wood lathe scans the log profile using multiple lasers, then centers the log for the most efficient recovery of material and peels the logs to a core diameter (e.g. 78 mm for the Raute Wood Lathe) to produce peeled veneers. Raute Corporation of Nastola, Finland supplies lathe peeling equipment for this stage. At the clipping stage, the peeled veneers are clipped to a wet width of approximately 1.4 meters and then stacked according to their moisture content. Equipment for supporting this stage is supplied by Babcock & Wilcox.

As shown in FIG. 27, the LVL production line comprises, beyond its veneer delivery stage, an arrangement of stages, namely: a veneer drying stage 47 for receiving veneers from the supply and drying them in a controlled manner using, for example, a Babcock BSH, 22 bar, steam heated, six deck, roller veneer drier, supporting three stages of drying to reach a target moisture content of between 8 and 10%; a chain-driven conveyor 47 for conveying the components and LVL products along subsequent stages of the production line; an automated veneer grading stage 48 for automatically structurally and visually grading veneers using a Babcock NovaScan 4000 camera for surface appearance, a Metriguard 2650 DFX for ultrasonic propagation time, and an Elliot Bay Cypress 2000 moisture detection system; a veneer scarfing stage 49 for scarfing veneer edges to a uniform thickness at the joints between veneers, during the subsequent laying-up stage and process; adhesive application stage 50 for curtain coating veneers with phenol formaldehyde, an exterior grade adhesive, using a Koch (1400 mm curtain coater, with adhesive resin supplied by Dynea NZ Ltd.; a lay-up stage (i.e. station) 51 for vacuum lifting veneers (core sheets, face sheets and make-up sheets) onto the processing line according to the press recipe, and stacking and skew aligning the veneers with adhesive coating until they are laid up into a veneer mat; a pre-pressing stage 52 for pressing the veneer mat together; a hot-pressing and curing stage 53 for continuous hot pressing (over an extending length (e.g. 40 meters) using a Dieffenbacher hot press with hot oil platens to complete cure of the adhesive resin applied to the pressed veneers, and produce an LVL mat having a length up to 18 m long in size, a width of up to 1.2 m, and a thickness between 12 and 120 mm; a cross-cutting and rip sawing stage 53 for cross-cutting and rip sawing the produced LVL mat into LVL products such as studs, beams, rim boards and other dimensioned LVL products; an optional sanding stage, employing orbital sanders; an inkjet print-marking and paint spraying system for marking each piece of LVL product (e.g. LVL stud, board etc.) an with a branded logo and grade for clear visual identification; a CFIC liquid dip-infusion stage 54, as shown in FIG. 27A, having a dipping tank 54B through which the chain-driven conveyor 47 transports LVL product into the dipping tank 54B and along its length while submerged under CFIC liquid 54H (e.g. Hartindo AFF21 Total Fire Inhibitor from Newstar Chemicals, of Malaysia, or Hartindo Chemicatama Industri) during dip-infusion operations, so as to form a CFIC infusion in and through the surfaces of the LVL product, and removing the CFIC-coated LVL product from the dipping tank, and wet-stacking the LVL product and setting aside to dry for 24 hours or so to produce Class-A fire-protective LVL product 54E; a spray tunnel 55 for spray-coating Class-A fire-protective LVL product 54E (feed with an auto-feeder) with a moisture, fire and UV protective coating while the LVL product is being passed through a spraying tunnel 55 in a high-speed manner, and then quick-dried in a drying tunnel 56 and then passed onto the final stage 57; a stacking, packaging and wrapping/labeling stage 57 using Dieffenbacher, Signode equipment, for packaging and wrapping/labeling the Class-A fire-protected LVL product in its wrapping, ready for forklift handling. Notably, a liquid dye can be added to the CFIC dip-infusion liquid 54H without adversely effecting its chemical properties.

KALLESOE MACHINERY A/S of Bredgade, Denmark, offers complete turnkey LVL production lines for high-volume automated production of LVL products. Such systems comprise: presses & curing machines; automation and controllers. Such technologies and machines can be used to implement many of the stages described above in the LVL product production line of the present invention.

As shown in FIG. 27A, the dip-infusion stage 54 comprises a chain-driven conveyor subsystem 47, supporting several parallel sets of chain-driven transport rails 47A1, 47A2 and 47A3 as shown, extending from the pressing and curing stage 53 towards a dipping tank 54B, and then running inside and along the bottom of the dipping tank 54B, and then running out thereof towards the stacking, packing and wrapping stage 57, as shown, having the capacity of handling studs and boards having a length up to 18 feet (6 m) or so, as the production application may require.

In the illustrative embodiment, the dipping tank 55B has a width dimension of up to 32 feet to accommodate the width of the LVL product 54E being transported on chain-driven conveyor rails 47A1, 47A2 and 47A3 mounted and running outside of and also within the dipping tank 54B, as shown, and allowing sufficient dwell time in the CFIC liquid 54H during the dip-infusion process. As shown, the LVL products 54E are supported upon the chain driven rails 47A1, 47A2 and 47A3 while the LVL products 54E are transported through the dipping tank 54B while fully immersed and submerged at least 6 inches deep in CFIC liquid 54H contained in the dipping tank 54B, moving at the linear rate of 300 feet/minute through the dipping tank 54B during the CFIC dip-infusion process of the present invention. Electrically-powered driven motors are provided for the purpose of driving the chain-driven conveyors 47A1, 47A2, and 47A3 under computer control to transport LVL products along the production line. A level sensor 54F is used for real-time sensing the level of CFIC liquid 54H in the dipping tank 54B during production line operation. A reservoir tank 54K is provided for containing a large volume or supply of made up CFIC liquid 54H. Also, a computer controller 54G is used for controlling the conveyor subsystem 47, and an electric pump 54D is provided for pumping CFIC liquid 54H into the dipping tank 54B to maintain a constant supply level during system operation in response to the liquid level measured by the level sensor 54F and controlled by the controller 54G.

The high-speed dip-infusion stage 54 may also include additional apparatus including, for example, liquid heaters, circulation pumps and controls for (i) maintaining the temperature of CFIC liquid solution 54H in the dipping tank 54B, and (ii) controlling the circulation of CFIC liquid around submerged LVL product 54E being transported through the dipping tank in a submerged manner during the CFIC dip-infusion process. Controlling such dip infusion parameters may be used to control the amount and degree of absorption of CFIC liquid within the surface fibers of the LVL product as it is rapidly transported through the dipping tank 54B between the cross-cutting and rip-sawing stage 53 and the lumber packaging and wrapping stage 57 of the production line.

Notably, the dip infusion process of the present invention allows for the rapid formation a surface infusion, or surface barrier, in and through the surface of each piece of dipped LVL product, or in the presence of a surfactant added to the CFIC liquid in the dipping tank 54B, shallow impregnation of CFIC liquid 54H to occur into the surface fibers of each LVL piece 57A near atmospheric pressure (i.e. below 6 inches of liquid CFIC in the dipping tank) during the dip-coated process. It is understood that drip pans may also be provided beyond the dipping tank 54B, installed beneath the chain-driven conveyor subsystem 47 arranged between the dripping tank 54B and the packaging and wrapping stage 57 so as to recover excess CFIC liquid dripping from the dip-coated lumber pieces and returning this recovered CFIC liquid to the dipping tank after appropriate filtering of the CFIC liquid if and as necessary.

Figure 27B:
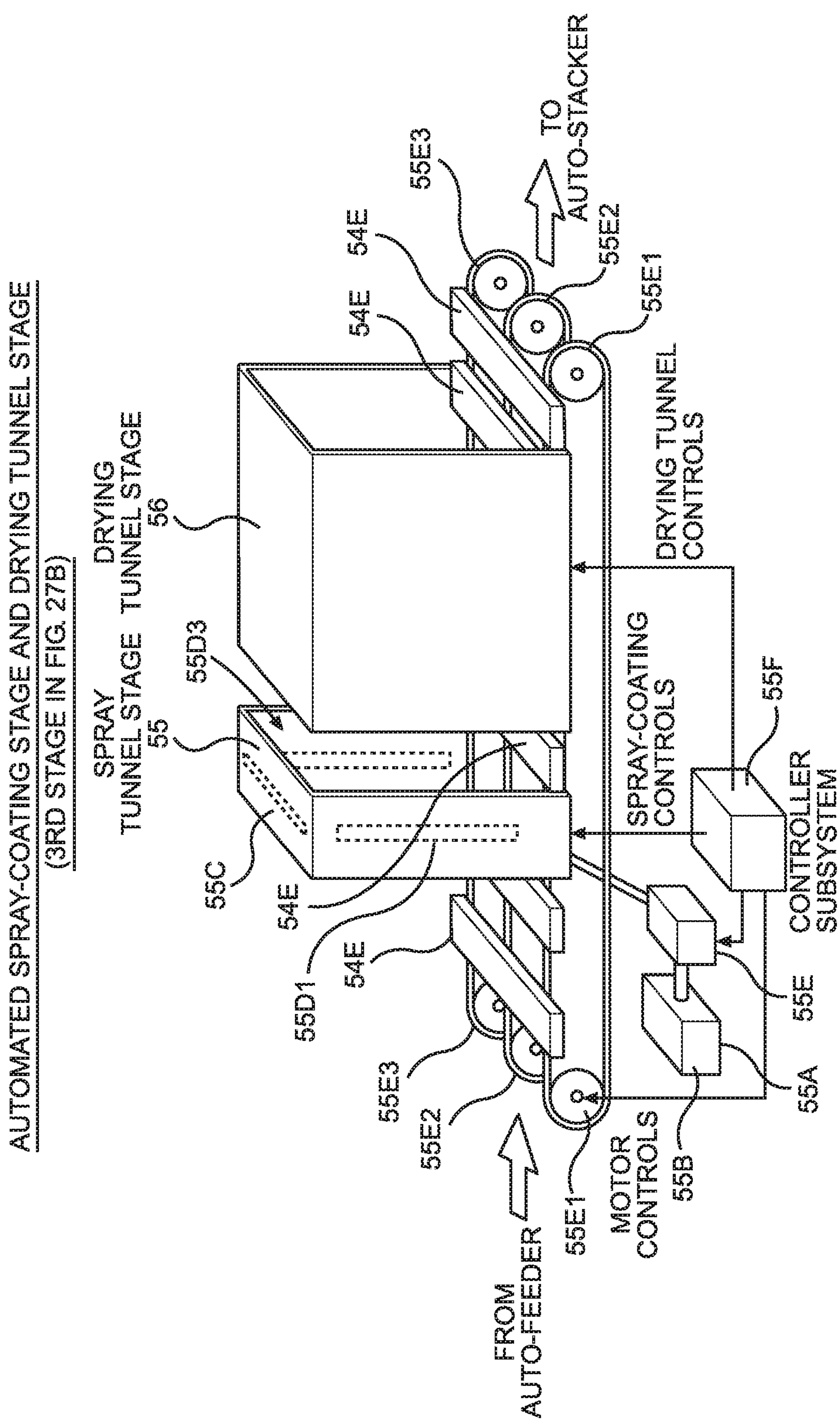
FIG. 27B is a perspective view of the automatic laminated veneer lumber (LVL) spray-coating tunnel stage and drying tunnel stage deployed along the production line of the automated lumber fabrication factory shown in FIG. 27.

As shown in FIG. 27B, the moisture, fire and UV protection is provided using the spray tunnel stage 55 deployed immediately after the CFIC-liquid dip-infusion stage 54. As shown, the spray tunnel stage 55 comprises: a storage tank 55A for storing a large supply of moisture/fire/UV-protective liquid chemical 55B; a spray tunnel 55C for supporting an array of spray nozzles 55D arranged about the conveyor rails 55E1, 55E2 and 55E3, operably connected to a liquid pump 55E connected to the storage tank 55A under controller 55F, to provide a 360 degrees of spray coverage in the tunnel 55C, for spray-coating dip-infused LVL products within a controlled plane of moisture/fire/UV-protection liquid sprayed to cover 100% of surfaces of such LVL products 54E as they are being transported through the spray tunnel 55 at high-speed; and a drying tunnel stage 56 installed after the spray tunnel stage 55, for quick drying of spray-coated Class-A fire-protected LVL products, as they move through the drying tunnel 56 towards the automated stacking, packaging and wrapping stage 57 under the control of the subsystem controller 58. In the preferred embodiment, the moisture/fire/UV protection liquid 55B sprayed in the spray tunnel 55 is formulated as follows: 25% by volume Hartindo AF21 liquid; 75% by volume Dectan Chemical from Hartindo Chemicatama Industri of Indonesia, or its distributed Newstar Chemicals of Malaysia; and 1.0-0.75 [cups/gallon] of Hy-Tech ceramic microsphere dust, as an additive.

As illustrated in FIG. 27, the automated stacking, packaging and wrapping stage 57 includes equipment designed to receive Class-A fire-protected LVL product 54E, automatically stack the fire-protected LVL product, package and wrap the product within a sheet of wrapping material (e.g. plastic, TVEK or other wrapping material) covering the top portion and at least half way down each side of the LVL product package 59, and then banding or strapping the wrapped package 59 with fiberglass or steel banding, well known in the art. The wrapping will typically be preprinted with trademarks and logos of the lumber manufacturer's brand. Finally, the ends of the lumber pieces in the strapped, wrapped lumber package 59 are painted with a Class-A fire-protective paint, also containing CFIC liquid material (e.g. 25% by volume Hartindo AF21) to be effective in achieving Class-A fire-protection.

During this last stage of the production process, each piece of Class-A fire-protected LVL is carbon-quantized using the carbon-quantization engine 500 over the network 100, and labeled or marked with the estimated quantity of fire-protected carbon units (FPCUs) in mass units (e.g. kg or tons) and recorded in the network database. This carbon quantization process may involve making a mass measurement of a sample piece of CFIC liquid dipped LVL, and also an electronically-measured moisture content measurement, and based on the dimensions and species of wood involved, the carbon quantization engine 500 takes this carbon quantization request and computes FPCU figure to this requests, records and registers the fire-protected LVL piece(s) or bundle, depending on how packaging is achieved, and the fire-protected carbon-quantized piece (or bundle of) lumber is labeled with the FPCU amount, by printing, stamping, laser etching or other marking means.

Figure 28B:
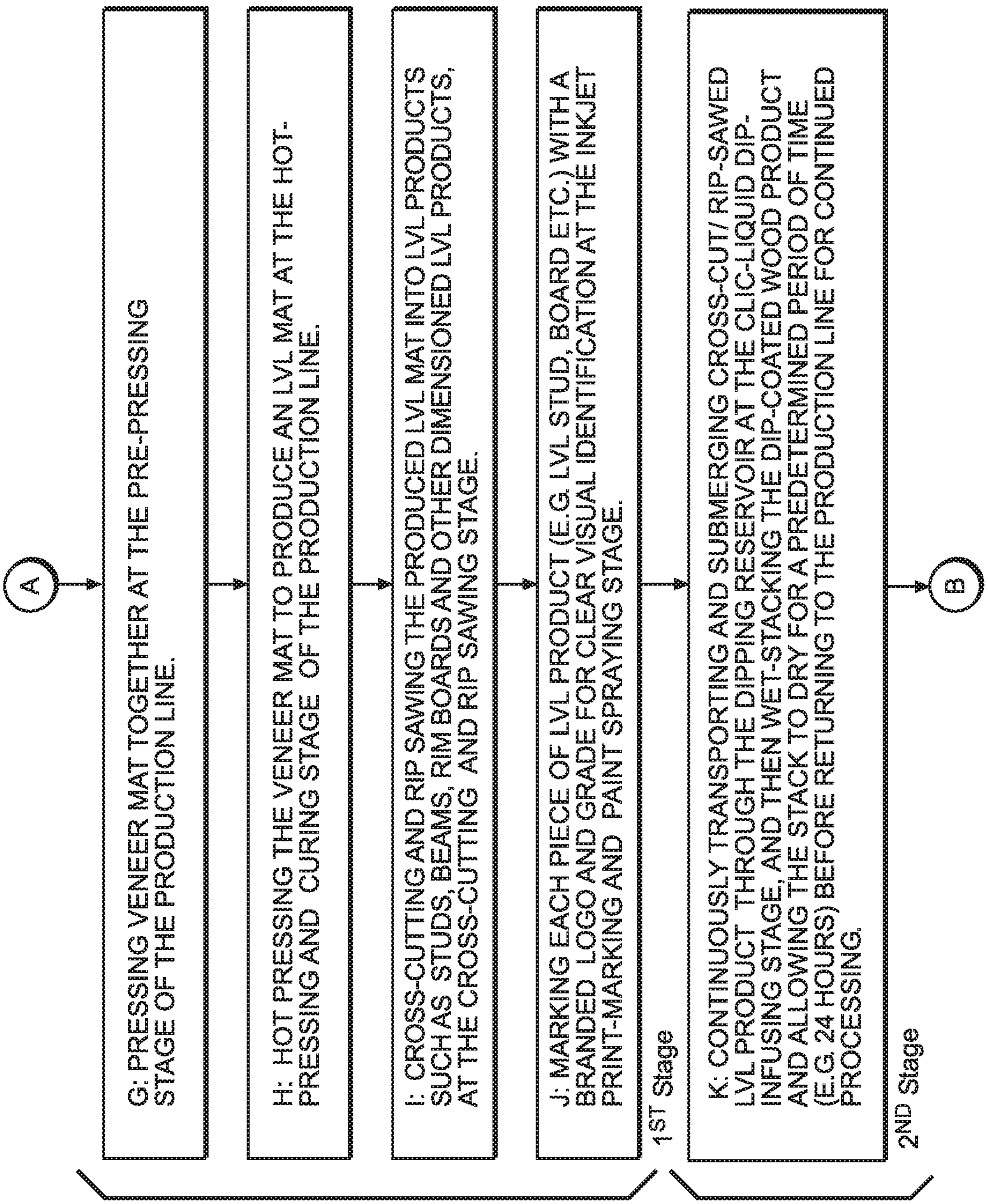

FIGS. 28A and 28B describe the high level steps carried out when practicing the method of producing bundles of Class-A fire-protected carbon-quantized laminated veneer lumber (LVL) product for use in fire-protected building construction.

As indicated at Block A in FIG. 28A, a high-speed fire-protected lumber production line is installed and operated in an automated lumber factory 45, provided with an automated high-speed dip-infusion stage 54 and spray-coating stage 55 installed between (i) the cross-cutting and rip-sawing stage 53 of the production line, and (ii) an automated stacking, packaging and wrapping stage 57 installed at the end of the production line in the lumber factory 45.

As indicated at Block B in FIG. 28A, a supply clipped veneers 46 is continuously loaded onto the conveyor/transport mechanism 47 installed along the LVL production line.

As indicated at Block C in FIG. 28A, the veneers are continuously provided to the controlled drying stage 47 of the production line so to produce suitably dried veneers for supply to the veneer grading stage 49 and subsequent stages.

As indicated at Block D in FIG. 28A, dried veneers are scarfed at the veneer scarfing stage 49 to prepare for the veneer laying-up stage 51 where the leading and trailing edges of each sheet of veneer are scarfed (i.e. lapped-jointed) in order to provide a flush joint when the veneer sheets are joined together at the laying-up stage of the LVL process.

As indicated at Block E in FIG. 28B, adhesive material is applied by curtain coating at the adhesive application stage 50, to the surfaces of scarfed veneers prior to the veneer laying-up stage.

As indicated at Block F in FIG. 28B, the veneers are vacuum lifted onto the processing line and stacked and skew aligned with adhesive coating until the veneers are laid up, at the veneer laying-up line 51, into a veneer mat of a predetermined number of veneer layers (i.e. ply).

As indicated at Block G in FIG. 28B, the veneer mat is pressed together at the pre-pressing stage 52 of the production line.

As indicated at Block H in FIG. 28B, the veneer mat is hot pressed in a hot-pressing/curing machine to produce an LVL mat at the hot-pressing and curing stage 53 of the production line.

As indicated at Block I in FIG. 28B, the produced LVL mat is cross-cut and rip-sawed into LVL products (such as studs, beams, rim boards and other dimensioned LVL products) 54E at the cross-cutting and rip sawing stage 53.

As indicated at Block J in FIG. 28B, each piece of LVL product (e.g. LVL studs, boards, etc.) 54E is marked with a branded logo and grade for clear visual identification at the inkjet print-marking and paint spraying stage installed after the cross-cutting and rip-sawing stage 53.

As indicated at Block K in FIG. 28B, the cross-cut/rip-sawed LVL product 54E is continuously transported and submerged through the dipping reservoir 54B at the CFIC-liquid dip-infusion stage 54 so as to apply CFIC liquid 54H to the surface of the dipped LVL product 54E at a coating coverage density of about 300 square feet per gallon of CFIC liquid 54H (i.e. Hartindo AF21). The dip-coated LVL product 54E is then wet-stacked in an automated manner using auto-stacking machinery, and then set aside and allowed to dry for a predetermined period of time (e.g. 24 hours) before the stack of dip-coated LVL wood is returned to the production line for continued processing. In the illustrative embodiment, Hartindo AAF21 total fire-inhibitor is used as the CFIC liquid solution 54H, for depositing the CFIC surface-coating onto treated LVL products produced on the production line described above. The surfactants contained in the CFIC liquid helps to break the surface tension and allow chemical molecules to impregnate ever so slightly the surface of the treated LVL products, and produce a Class-A fire-protective LVL product 54E.

Figure 28C:
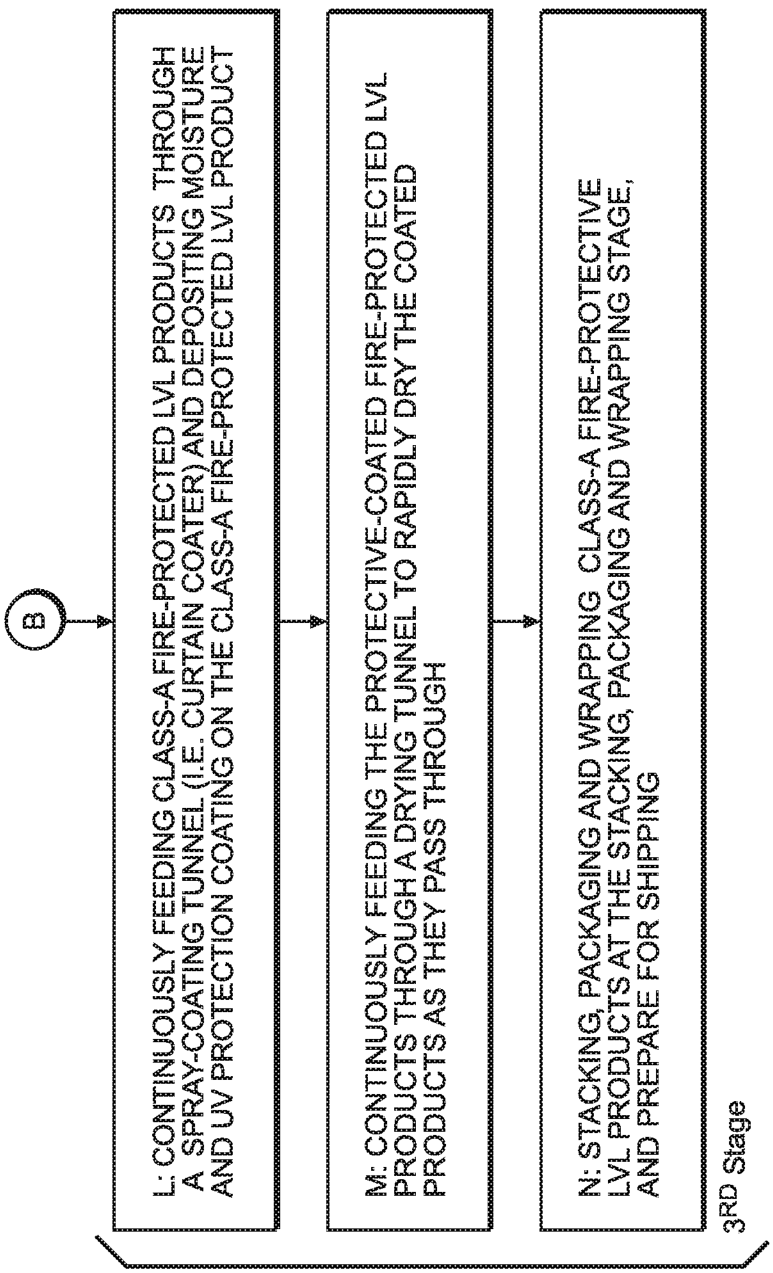

As indicated at Block L in FIG. 28C, the Class-A fire-protective LVL products 54E are continuously feed through the spray tunnel stage 55 for spray coating a moisture/fire/UV-protective liquid coating 55B over the entire surface as each dip-coated Class-A fire-protected LVL product (e.g. stud) 54E is feed through the spray tunnel 55.

As indicated at Block M in FIG. 28C, the Class-A fire-protected LVL product is quick-dried while being passed through the drying tunnel 56 disposed immediately after the curtain-coating tunnel 55. This produces a Class-A fire-protective LVL product with a moisture/fire/UV protective coating as it exits the production line, improving the durability of the Class-A fire-protective LVL product when exposed to outdoor weather conditions during the construction phase.

As indicated at Block N in FIG. 28B, Class-A fire-protective LVL product 59 is automatically stacked, packaged and wrapped at the automated stacking, packaging and wrapping stage 57, with trademarked wrapping, logos and the like.

In the presence of a flame, the chemical molecules in the CFIC-infusion along the surface of the Class-A fire-protected LVL lumber 54E interferes with the free radicals (H+, OH—, O—) produced during the combustion phase of a fire, and breaks the fire's free-radical chemical reactions and extinguishes its flame. This is a primary fire suppression mechanism implemented by the CFIC-coatings deposited on wood surfaces in accordance with the principles of invention, disclosed and taught herein.

The table in FIG. 29 illustrates the flame spread and smoke development indices of Class-A fire-protected lumber produced using the method described in FIGS. 28A and 28B. As shown in the table, for Spruce Pine Fire (SPF), the flame-spread index was measured to be 15, whereas the smoke development index was measured to be 95, meeting the test criteria for Class-A fire-protection rating. For Douglas Fir, the flame-spread index was measured to be 0, whereas smoke development index was measured to be 40, also meeting the test criteria for Class-A fire-protection rating.

Figure 30:
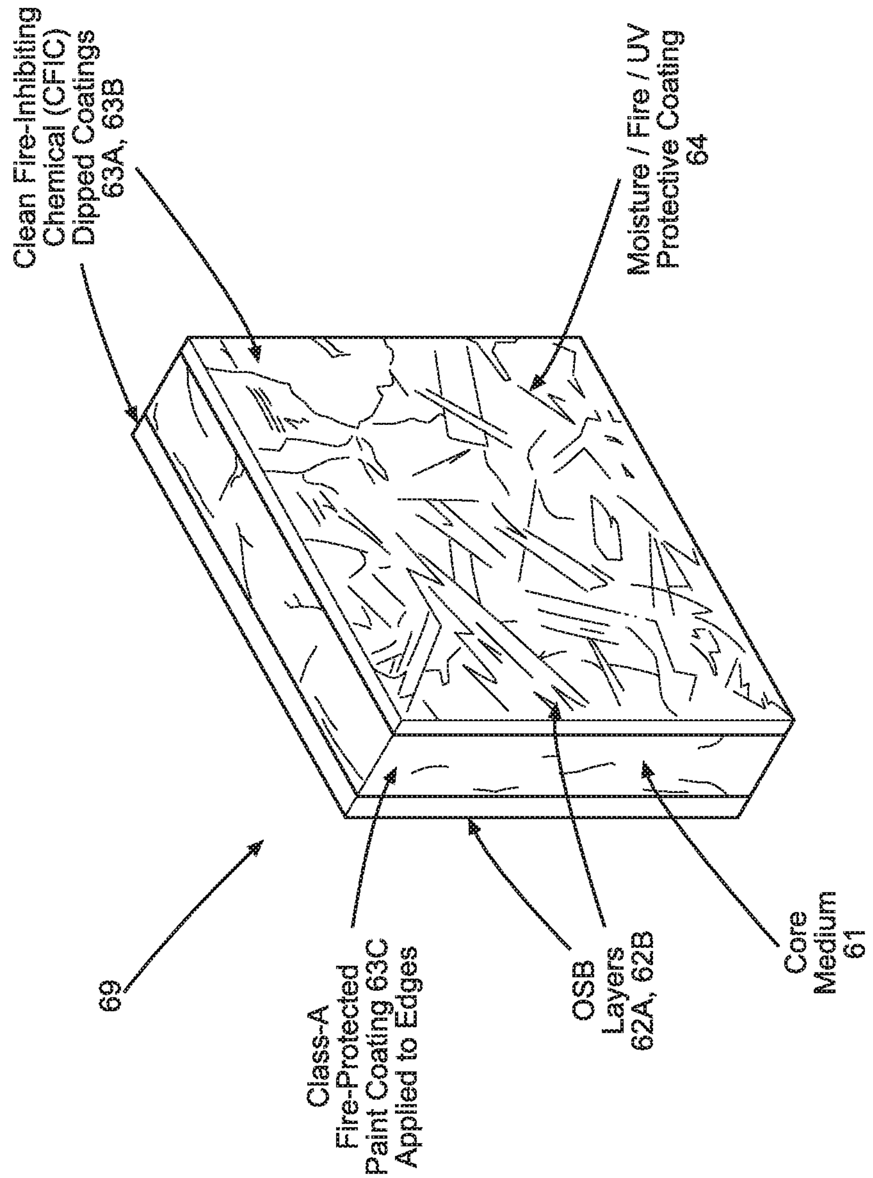
FIG. 30 is a perspective of a cut-away portion of a piece of Class-A fire-protected carbon-quantized oriented strand board (OSB) sheathing produced using the method described in FIGS. 32A, 32B and 32C in the automated factory shown in FIG. 33.
Figure 31:
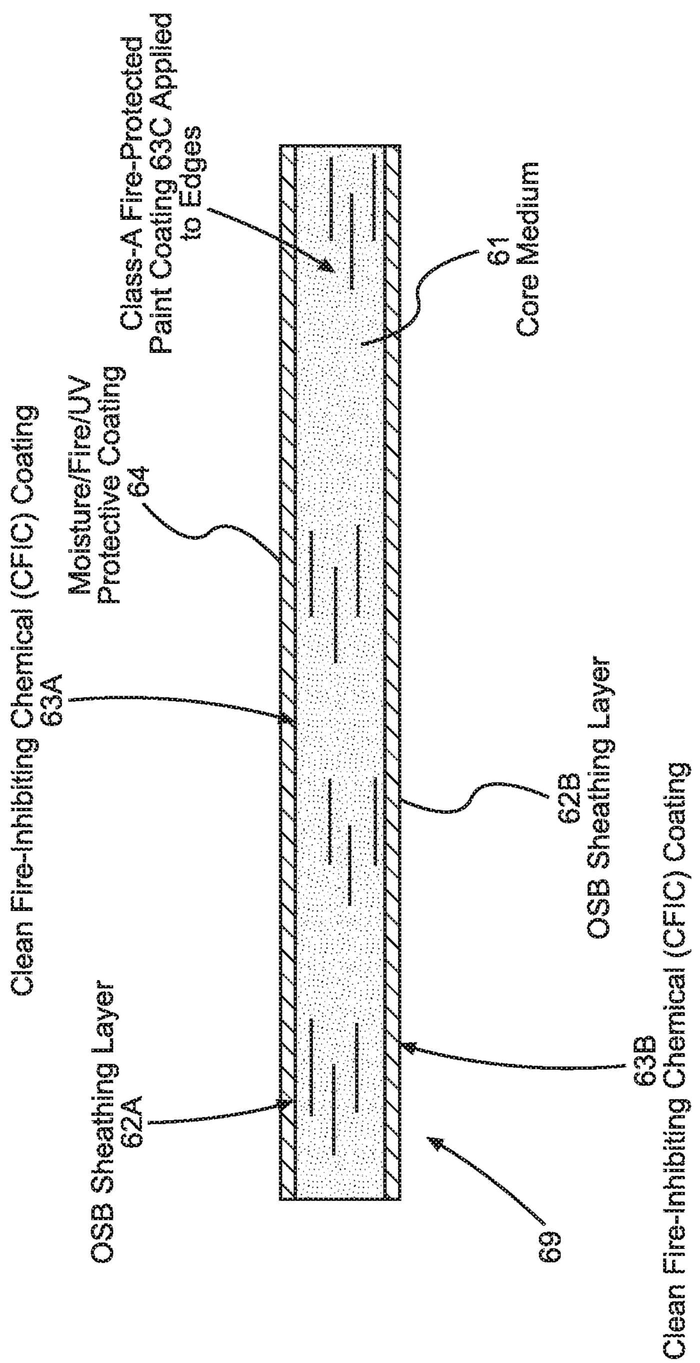
FIG. 31 is a cross-sectional schematic diagram of a section of the Class-A fire-protected carbon-quantized OSB sheathing shown in FIG. 30, produced in accordance with the present invention described in FIGS. 32 and 33.

Specification of Method of Producing Clean Fire-Protected Oriented Strand Board (OSB) Sheathing Constructed in Accordance with the Principles of the Present Invention FIGS. 30 and 31 show a piece of Class-A fire-protected carbon-quantized oriented strand board (OSB) sheathing 60 constructed in accordance with the principles of the present invention. This Class-A fire-protected OSB sheathing 69 is provided with a moisture, fire and UV protection coating 64 that supports weather during building construction when roof, wall and floor sheeting gets hammered by the natural environment until the building is "dried in." The coating 64 also protects the CFIC (e.g. Hartindo AF21 fire inhibitor) dip-infusions 63A and 63B and paint coating 63C from getting washed out by the weather during the construction phase, as otherwise occurs with most conventional pressure-treated lumber products.

As shown, the Class-A fire-protective OSB sheathing 60 comprises: a core medium layer 61 made of wood pump, binder and/or adhesive materials; OSB sheathing layers 62A and 62B bonded to the core medium layer 61; a clean fire inhibiting chemical (CFIC) coating 63C painted onto the edge surfaces of the core medium layer 61, using a Class-A fire-protective paint containing a CFIC liquid; CFIC coatings 63A and 63B applied to the surface of OSB sheathing layers 62A and 62B respectively, by dipping the OSB sheathing 66 into a CFIC liquid 66H contained in a dipping tank 66B, and allowing shallow surface absorption or impregnation into the OSB sheathing layers 62A and 62B at atmospheric pressure; and a moisture/fire/UV protective coating 64 spray-coated over the CFIC coatings 63A, 63B and 63C applied to protect these underlying CFIC coatings from outdoor weather conditions such as rain, snow and UV radiation from Sunlight.

In the illustrative embodiment, Hartindo AAF21 Total Fire Inhibitor is used as the CFIC liquid 66H to form the CFIC surface coatings 63A, 63B and 63C over the surfaces of the OSB product (e.g. sheet) 66. The clinging agent in the CFIC liquid 66H enables its chemical molecules to cling to the surface of the CFIC-coated OSB product, while its surfactants help to break the surface tension and allow chemical molecules to impregnate ever so slightly the surface of the treated wood. The CFIC paint coating 63A can be formulated by adding Hartindo AF21, 25-30% by volume, to a water-base paint containing liquid polymer binder.

In the illustrative embodiment, the moisture/fire/UV protection liquid 68A comprises a formulation comprising: 75% by volume, DECTAN chemical liquid from Hartindo Chemicatama Industri of Jakarta, Indonesia, a complex vinyl acrylic copolymer and tannic acid; 25% by volume, AF21 anti-fire liquid chemical from Hartindo Chemicatama Industri; and ceramic microsphere dust, 1.0-0.75 [cups/gallon] (e.g. ThermaCels™ insulating ceramic microsphere dust by Hy-Tech Thermal Solutions, LLC, of Melbourne, FL).

Figure 33:
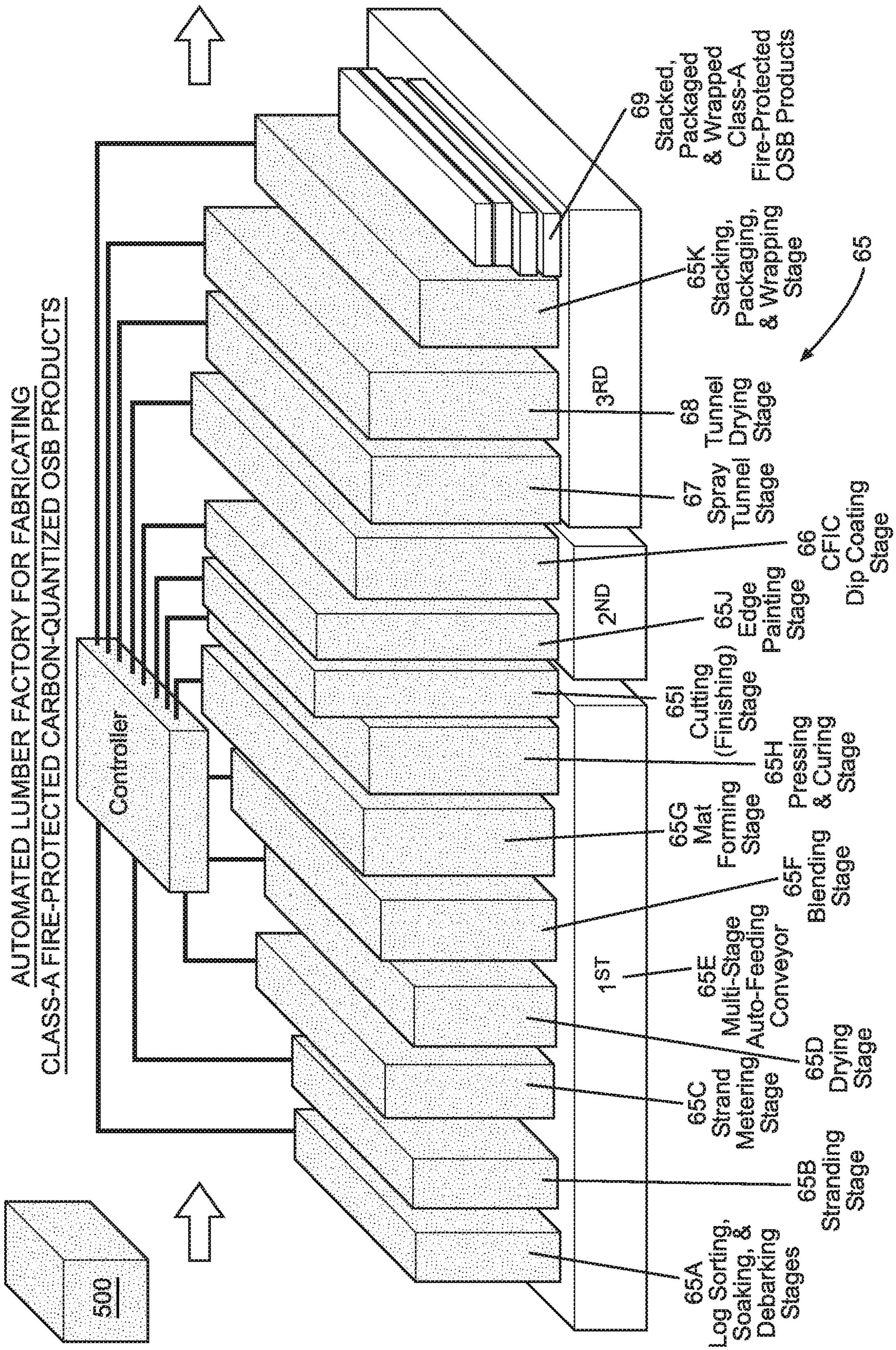
FIG. 33 is a schematic representation of the automated factory configured for producing Class-A fire-protected OSB sheathing in accordance with the principles of the present invention described in FIGS. 32A, 32B and 32C.

FIG. 33 shows an automated factory system 65 for producing Class-A fire-protected laminated OSB products in a high volume manner in accordance with the principles of the present invention. As shown in FIG. 33, the factory 65 comprises a number of automated stages integrated together under automation and control, namely: a conveyor-chain mechanism 65E having numerous primary stages in the illustrative embodiment shown in FIGS. 33, 33A and 33B.

As shown in FIG. 33, the OSB production line comprises an arrangement of stages for high-volume automated production of OSB products. Such systems comprise: presses & curing machines; automation and controllers. Such technologies and machines can be used to implement many of the stages described above in the OSB product production line of the present invention. Suzhou CMT Engineering Company Limited offers complete turnkey OSB production lines.

Figure 33A:
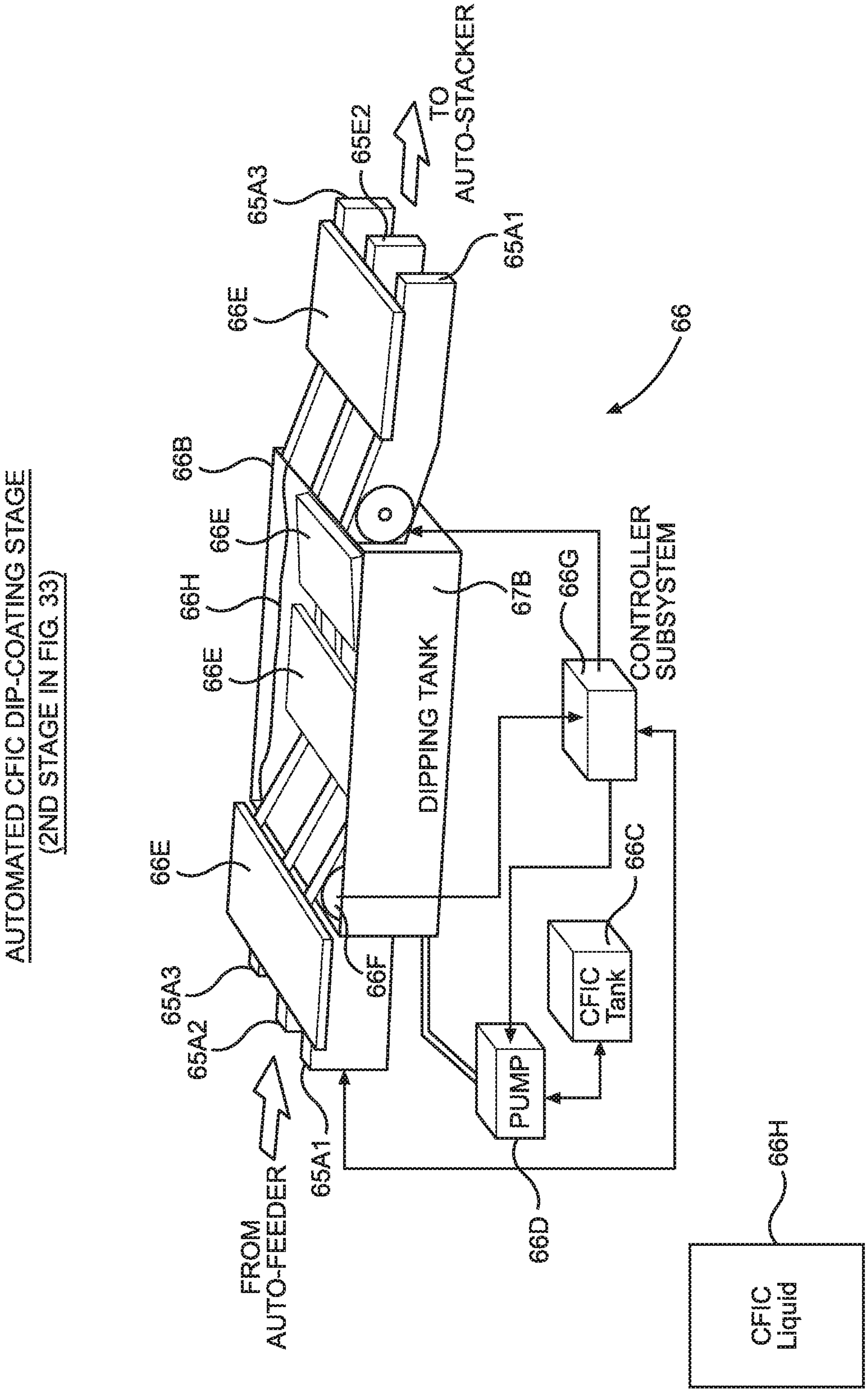
FIG. 33A is a perspective view of the automatic OSB sheathing dip-infusion stage deployed along the production line of the automated lumber fabrication factory shown in FIG. 33.

As shown in FIG. 33A, the dip-infusion stage 66 comprises a chain-driven conveyor subsystem 65E, supporting several parallel sets of chain-driven transport rails 65E1, 65E2 and 65E3 as shown, extending from the pressing and curing stage 65H towards a dipping tank 54B, and then running inside and along the bottom of the dipping tank 66B, and then running out thereof towards the stacking, packing and wrapping stage 65K, as shown.

In the illustrative embodiment, the dipping tank 66B has a width dimension to accommodate the width of the OSB product 66E being transported on chain-driven conveyor rails 65E1, 65E2 and 65E3 mounted and running outside of and also within the dipping tank 66B, as shown, and allowing sufficient dwell time in the CFIC liquid 66H during the dip-infusion process. As shown, the OSB products are supported upon the chain driven rails 65E1, 65E2 and 65E3 while the OSB products 66E are transported through the dipping tank 66B while fully immersed and submerged at least 6 inches deep in CFIC liquid 66H contained in the dipping tank 66B, moving at the linear rate of 300 feet/minute through the dipping tank 66B during the CFIC dip-infusion process of the present invention. Electrically powered driven motors are provided for the purpose of driving the chain-driven conveyors under computer control to transport OSB products 66E from stage to stage along the production line. A level sensor 66F is used for sensing the level of CFIC liquid 66H in the dipping tank at any moment in time during production line operation. A reservoir tank 66C is provided for containing a large volume or supply of CFIC liquid 66H. Also, a computer controller 66G is used for controlling the conveyor subsystem, and an electric pump 66D is provided for pumping CFIC liquid 66H into the dipping tank 66B to maintain a constant supply level during system operation in response to the liquid level measured by the level sensor 66F and controlled by the controller 66G.

The high-speed dip-infusion stage 66 may also include additional apparatus including, for example, liquid heaters, circulation pumps and controls for (i) maintaining the temperature of CFIC liquid solution in the dipping tank 66B, and (ii) controlling the circulation of CFIC liquid around submerged OSB product 66E being transported through the dipping tank in a submerged manner during the CFIC dip-infusion process. Controlling such dip infusion parameters may be used to control the amount and degree of absorption of CFIC liquid within the surface fibers of the OSB product 66E as it is rapidly transported through the dipping tank 66B between the cross-cutting and rip-sawing stage 65I and the lumber packaging and wrapping stage 65K of the production line. Notably, the dip infusion process allows for the rapid formation a surface infusion, or surface barrier, in, through and about the surface of each piece of dipped OSB product, or in the presence of a surfactant added to the CFIC liquid in the dipping tank 66B, shallow infusion of CFIC liquid 66H to occur into the surface fibers of each OSB sheet 66E near atmospheric pressure (i.e. below 6 inches of liquid CFIC in the dipping tank) during the dip-infusion process. It is understood that drip pans may also be provided beyond the dipping tank 66B, installed beneath the chain-driven conveyor subsystem arranged between the dripping tank 66B and the packaging and wrapping stage 65K so as to recover excess CFIC liquid dripping from the dip-infused lumber pieces and returning this recovered CFIC liquid to the dipping tank after appropriate filtering of the CFIC liquid if and as necessary.

Figure 33B:
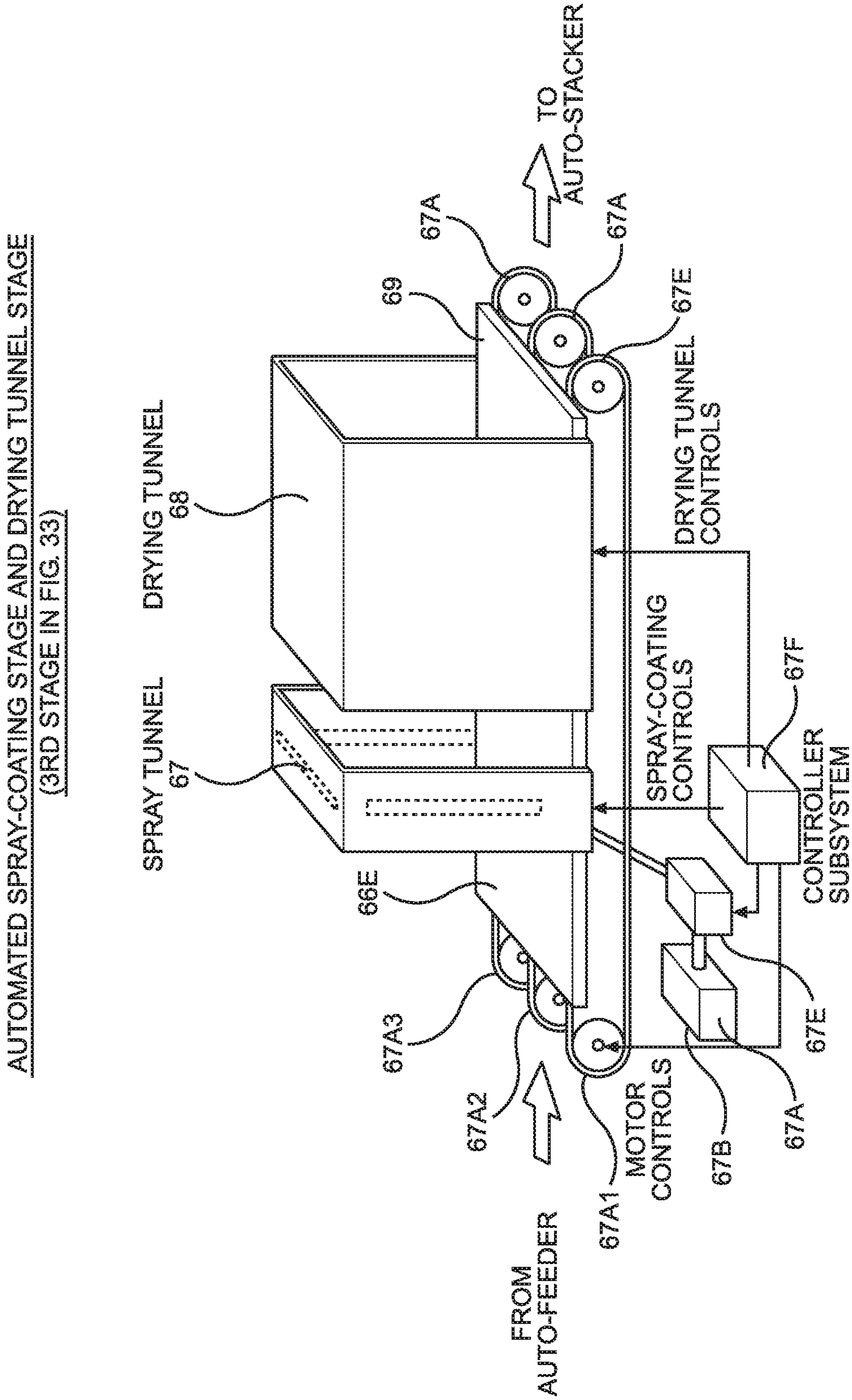
FIG. 33B is a perspective view of the automatic OSB sheathing spray-coating tunnel stage and drying tunnel stage deployed along the production line of the automated lumber fabrication factory shown in FIG. 33.

As shown in FIG. 33B, the moisture, fire and UV protection is provided using the spray tunnel stage 67 deployed immediately after the CFIC-liquid dip-infusion stage 66. As shown, the spray tunnel stage 67 comprises: a storage tank 67A for storing a large supply of moisture/fire/UV-protective liquid chemical 67B; a spray tunnel 67C for supporting an array of spray nozzles 67D arranged about the conveyor rails 67A1, 67A2 and 67A3, operably connected to a liquid pump 67E connected to the storage tank 67A under controller 67F, to provide a 360 degrees of spray coverage in the tunnel 67, for spray-coating dip-infusion OSB sheets 66E within a controlled plane of moisture/fire/UV-protection liquid 67B sprayed to cover 100% of surfaces of such OSB sheets 66E as they are being transported through the spray tunnel 67 at high-speed; and a drying tunnel stage 56 installed after the spray tunnel stage 67, for quick drying of spray-coated Class-A fire-protected OSB sheet 66E, as they move through the drying tunnel 68 towards the automated stacking, packaging and wrapping stage 65K, under the control of the subsystem controller 58. In the preferred embodiment, the moisture/fire/UV protection liquid 67B sprayed in the spray tunnel 67 is formulated as follows: 25% by volume Hartindo AF21 liquid; 75% by volume Dectan Chemical from Hartindo Chemicatama Industri, or its distributed Newstar Chemicals of Malaysia; and 0.75 [cups/gallon] of Hy-Tech ceramic microsphere dust, as an additive.

As illustrated in FIG. 33, the automated stacking, packaging and wrapping stage 65K includes equipment designed to receive Class-A fire-protected OSB sheets 66E, automatically stacking the fire-protected OSB sheets, packaging and wrapping the sheets with wrapping material (e.g. plastic, TVEK or other wrapping material) that covers the top portion and at least half way down each side of the stacked OSB sheets, and then banding or strapping the wrapped package with fiberglass or steel banding, well known in the art. The wrapping will typically be preprinted with trademarks and logos of the lumber manufacturer's brand. Finally, the ends of the OSB lumber sheets 69 in the strapped, wrapped lumber package 69 are painted with a fire-protective paint also containing CFIC liquid material (e.g. 25% by volume, Hartindo AF21 liquid) to be effective in achieving Class-A fire-protection.

Figure 32A:
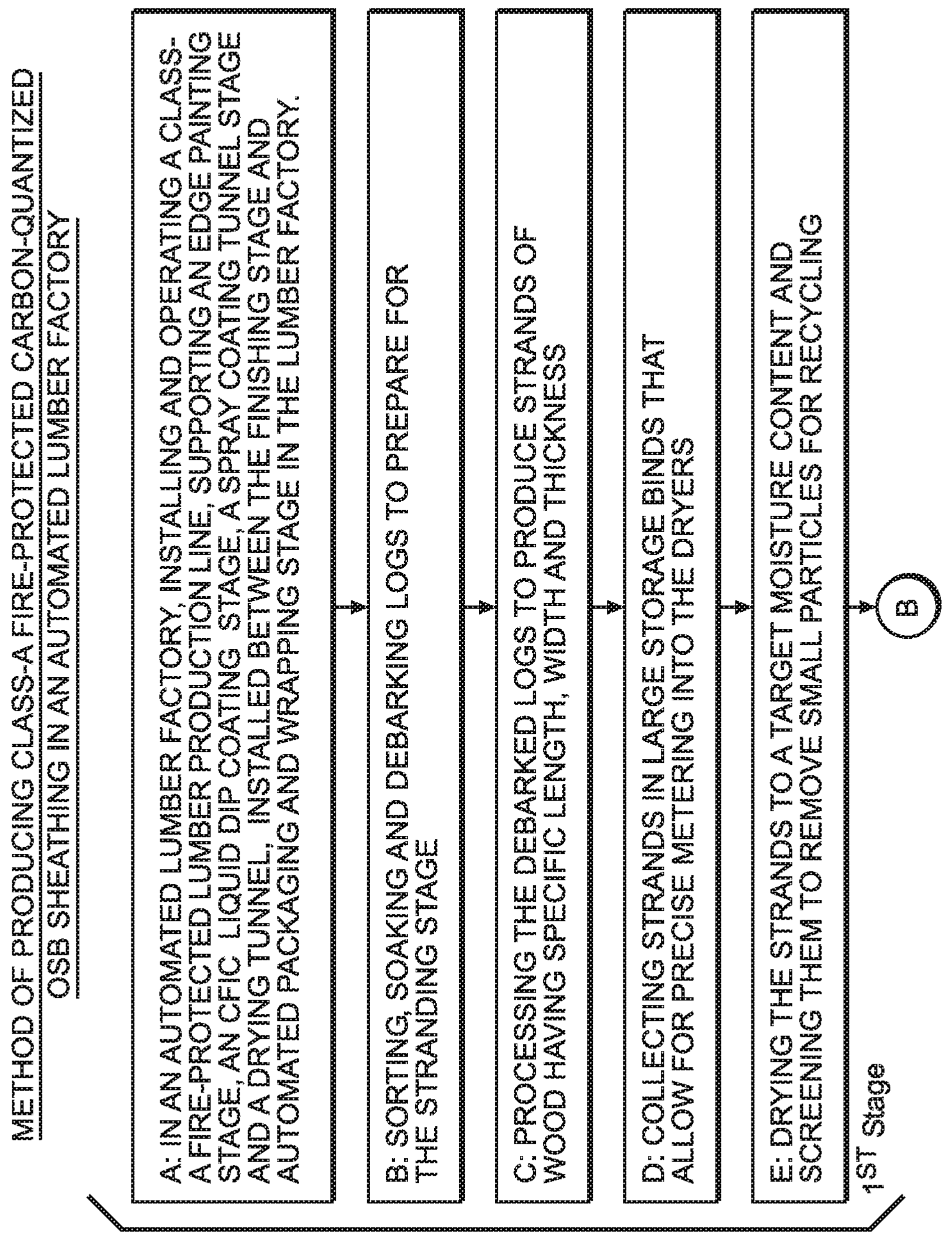
FIGS. 32A, 32B and 32C, taken together, set forth a flow chart describing the high level steps carried out when practicing the method of producing clean Class-A fire-protected carbon-quantized OSB sheathing in accordance with the present invention, comprising the steps of (a) in an automated lumber factory, installing and operating a Class-A fire-protected lumber production line, supporting an edge painting stage, an CFIC liquid dip coating stage, a spray coating tunnel stage and a drying tunnel, installed between the finishing stage and automated packaging and wrapping stage in the lumber factory, (b) sorting, soaking and debarking logs to prepare for the stranding stage, (c) processing the debarked logs to produce strands of wood having specific length, width and thickness, (d) collecting strands in large storage binds that allow for precise metering into the dryers, (e) drying the strands to a target moisture content and screening them to remove small particles for recycling, (f) coating the strands with resin and wax to enhance the finished panel's resistance to moisture and water absorption, (g) forming cross-directional layers of strands into strand-based mats, (h) heating and pressing the mats to consolidate the strands and cure the resins to form a rigid dense structural oriented strand board (OSB) panel, (i) trimming and cutting the structural OSB panel to size, and machining flooring and groove joints and applying edge sealants for moisture resistance, (j) applying Class-A fire-protective paint to the edges of the trimmed and cut OSB panels, (k) transporting and submerging OSB panels through the dipping tank of the dip-infusion stage for sufficient infusion of CFIC liquid into the wood surface, while being transported on the conveyor-chain transport mechanism, (l) removing the wet dip-infused OSB panels from the dipping tank, and wet stacking the OSB panels in inventory for about 24 hours or so, to allow the wet CFIC liquid infusion into the dipped OSB panels to penetrate into the panels and dry and produce Class-A fire-protected OSB panels, (m) loading a stack of dip-coated OSB panels to the second stage of the production line, (n) spray-coating the dip-infused OSB panels with a moisture, fire and UV protection coating that supports weather during building construction while protecting the Class-A fire protection properties of the OSB panels, (o) transporting spray-coated dipped OSB sheets through a drying tunnel, and (p) stacking, packaging and wrapping dried spray-coated/dipped OSB panels into a bundle of Class-A fire-protected OSB panels or sheets (i.e. sheathing)
Figure 32B:
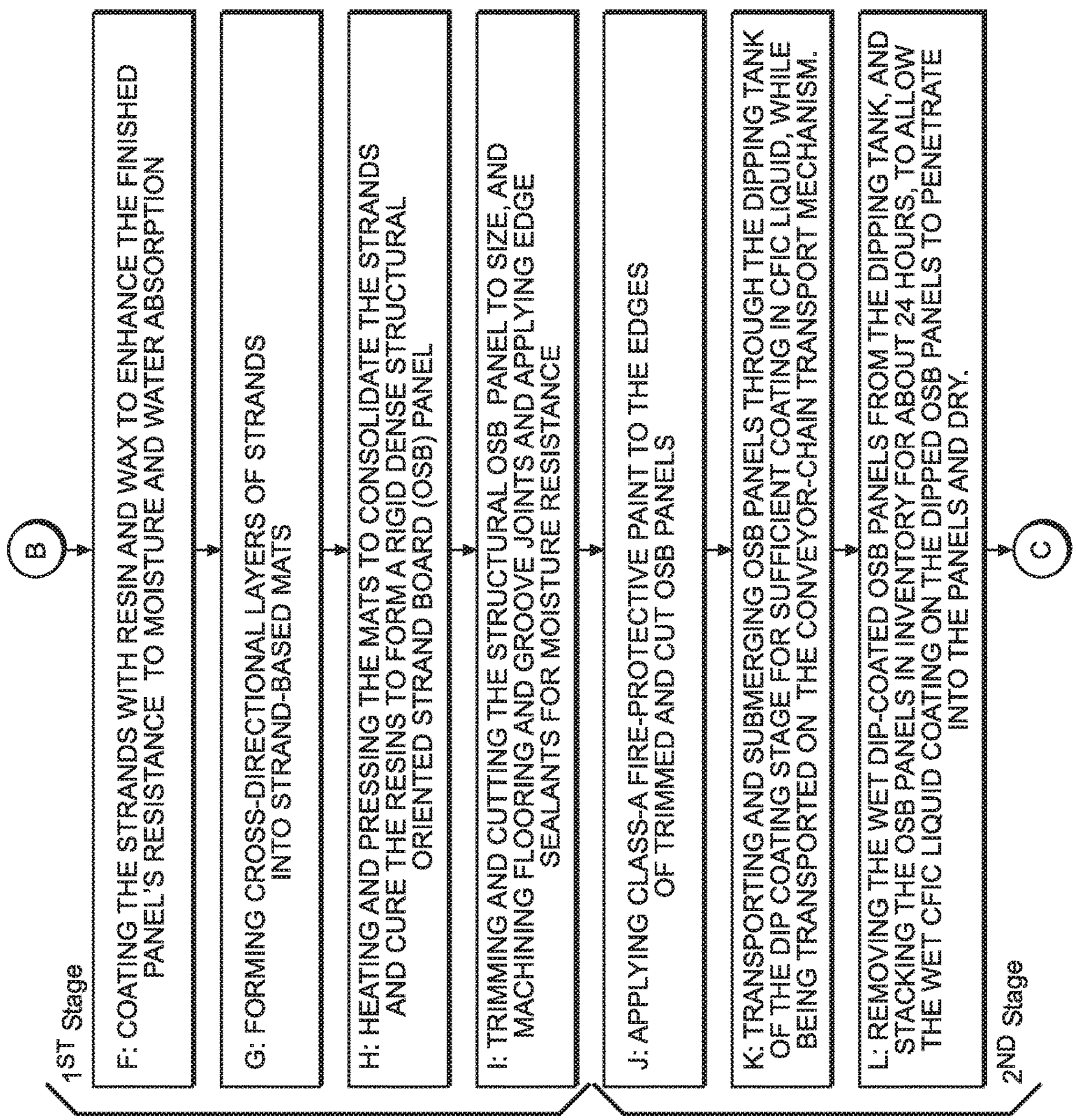
Figure 32C:
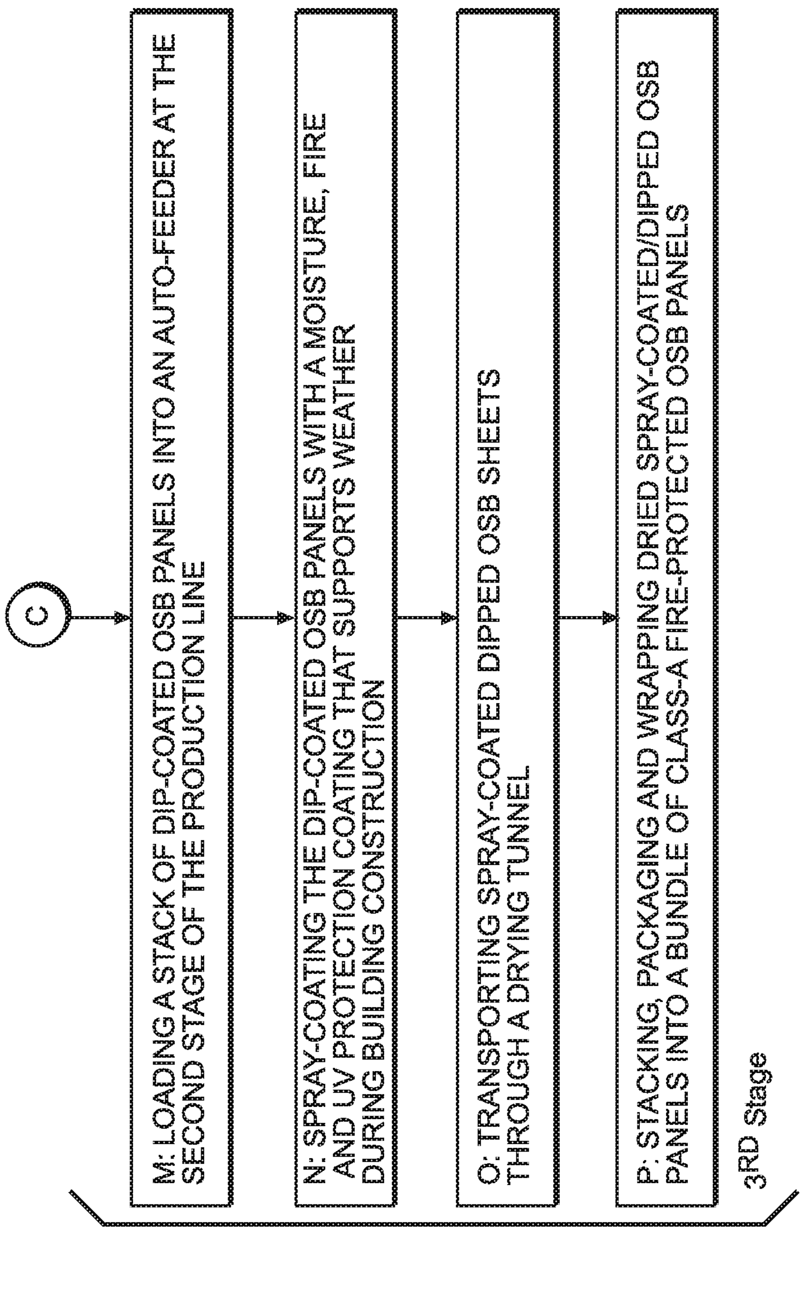

FIGS. 32A, 32B and 32C describe the high-level steps carried out when producing Class-A fire-protected OSB sheathing 69 in the automated factory shown in FIGS. 33, 33A and 33B, in accordance with the method and principles of the present invention.

Provided with this innovative two-coating system of UV/moisture/fire-protection, in the presence of a flame, the chemical molecules in both the moisture/fire/UV-protective coating 64 and CFIC-coatings 63A, 63B capture the free radicals (H+, OH—, O) produced during a fire, and break the fire's chemical reaction and extinguish its flame. This is a primary fire suppression mechanism deployed or rather implemented by the CFIC-coatings deposited on wood surfaces in accordance with the various principles of invention, disclosed and taught herein.

As indicated at Block A in FIG. 32A, in an automated factory configured for automated production of Class-A fire-protected OSB sheeting, an edge painting stage 65J, an CFIC liquid dipping stage 67, a spray tunnel stage 67, and a drying tunnel stage 68 are installed between the finishing stage 65I and automated packaging and wrapping stage 65K along the lumber production line.

As indicated at Block B in FIG. 32A, logs are sorted, soaked and debarked at stage 65A to prepare for the logs for the stranding stage 65B.

As indicated at Block C in FIG. 32A, the debarked logs are processed at the stranding stage 65B to produce strands of wood having specific length, width and thickness.

As indicated at Block D in FIG. 32A, at the strand metering stage 65C, the strands are collected in large storage binds that allow for precise metering into the dryers.

As indicated at Block E in FIG. 32A, the strands are dried at the drying stage 65D to a target moisture content and screening them to remove small particles for recycling.

As indicated at Block F in FIG. 32B, the strands are coated with resin and wax at the blending 65F to enhance the finished panel's resistance to moisture and water absorption.

As indicated at Block G in FIG. 32B, cross-directional layers of strands are formed into strand-based mats at the mat forming stage 65G.

As indicated at Block H in FIG. 32B, the mats are heated and pressed at the pressing and curing stage 65H to consolidate the strands and cure the resins and form a rigid dense structural oriented strand board (OSB) panel.

As indicated at Block I in FIG. 32B, at the finishing stage 65I, the structural OSB panel is trimmed and cut to size, and groove joints machined and edge sealants applied for moisture resistance.

As indicated at Block J in FIG. 32B, Class-A fire-protective paint (containing CFIC liquid, 25% by volume, Hartindo AF21 liquid) is applied to the edges of the trimmed and cut OSB panels, at the edge painting stage 65J.

As indicated at Block K in FIG. 32B, OSB panels are transported and submerged through the dipping tank 66B of the dipping stage 66 for sufficient infusion of CFIC liquid 66H, while being transported on the conveyor-chain transport mechanism 65E.

As indicated at Block L in FIG. 32B, the wet dip-coated OSB panels are removed from the dipping tank 66B, and wet stacked and set aside for about 24 hours or so, to allow the wet CFIC liquid to infuse into all of the surfaces of the dipped OSB panels 66E to penetrate into the panels 69 as the infusion dries.

As indicated at Block M in FIG. 32C, a stack of air-dried dip-infused OSB panels 66E is loaded to the auto-feeder of the second stage of the production line, shown in FIG. 33B.

As indicated at Block N in FIG. 32C, the dip-coated OSB panels 66E are spray-coated with a moisture, fire and UV protection coating 64 that supports weather during building construction, to produce Class-A fire-protected OSB panels 69.

As indicated at Block O in FIG. 32C, spray-coated dipped OSB sheets 69 are transported through a drying tunnel at stage 68.

As indicated at Block P in FIG. 32C, dried spray-coated/dipped OSB panels 69 are stacked, packaged and wrapped into a bundle of Class-A fire-protected OSB panels at the stacking, packaging and wrapping stage 65K.

During this last stage of the production process, each Class-A fire-protected OSB panel is carbon-quantized using the carbon-quantization engine 500 over the network 100, and labeled or marked with the estimated quantity of fire-protected carbon units (FPCUs) in mass units (e.g. kg or tons) and recorded in the network database. This carbon quantization process may involve making a mass measurement of a sample piece of Class-A fire-protected OSB panel, and also an electronically-measured moisture content measurement, and based on the species of wood components and resins and binders involved, the carbon quantization engine 500 takes this carbon quantization request and computes FPCU figure to this requests, records and registers the fire-protected OSB panel or bundle, depending on how packaging is achieved, and the fire-protected carbon-quantized OSB panel is labeled with the FPCU amount, by printing, stamping, laser etching or other marking means.

As shown and described above, the lumber factory 65 is configured for producing Class-A fire-protected OSB sheathing 69 fabricated in accordance with the principles of the present invention.

Figure 34:
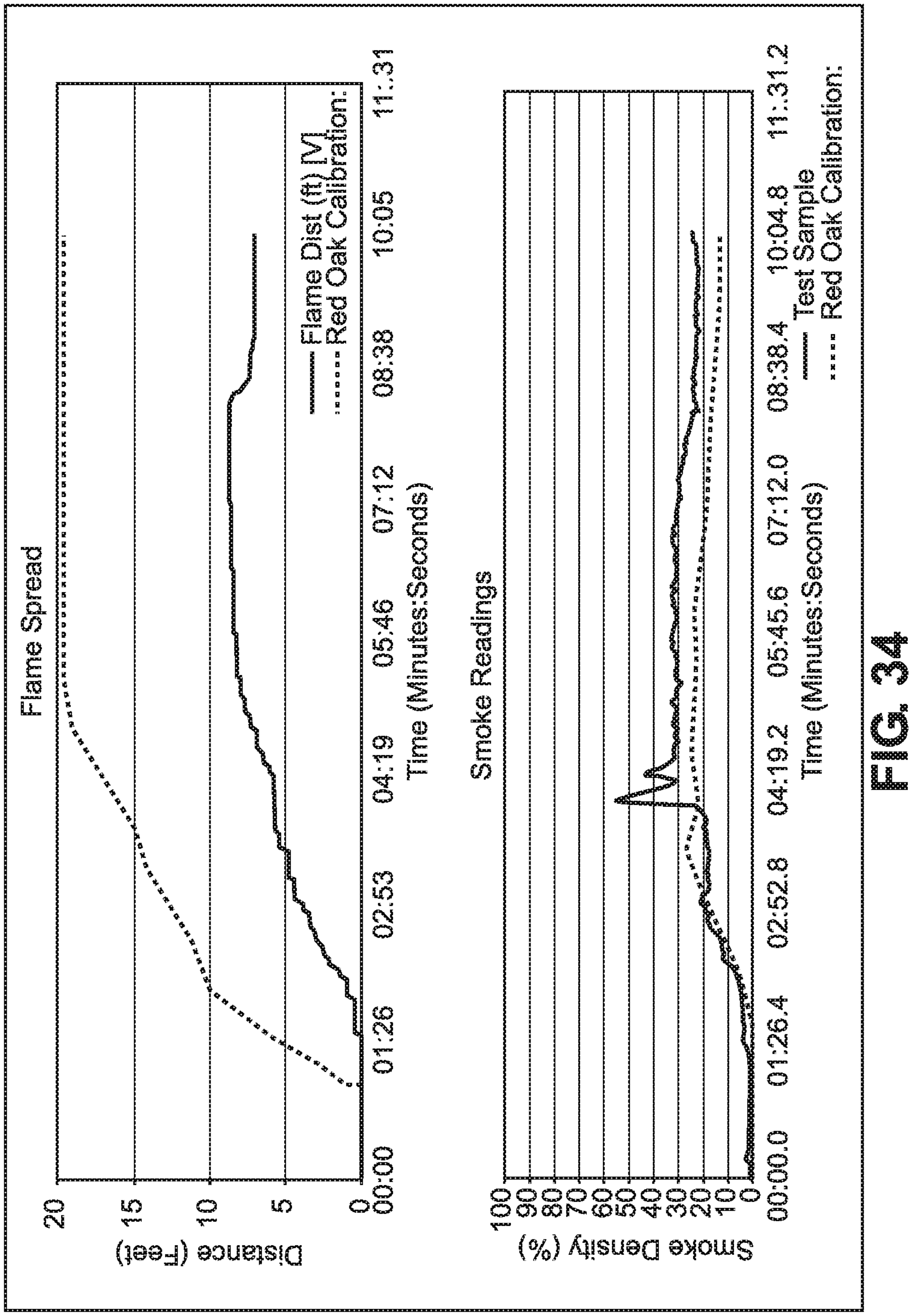
FIG. 34 are flame-spread rate and smoke-development indices associated with the Class-A fire-protected carbon-quantized OSB sheathing of the present invention produced using the method of the illustrative embodiment described in FIGS. 32A, 32B and 32C, and tested in accordance with the test standard ASTM E2768-11.

FIG. 34 shows the flame-spread and smoke-reading (development) characteristics associated with the Class-A fire-protected OSB sheathing 69 shown in FIGS. 30 and 31 and manufactured according to the method of the illustrative embodiment described in FIGS. 32A and 32B, and using the factory production line shown in FIGS. 33, 33A and 33B.

Figure 35:
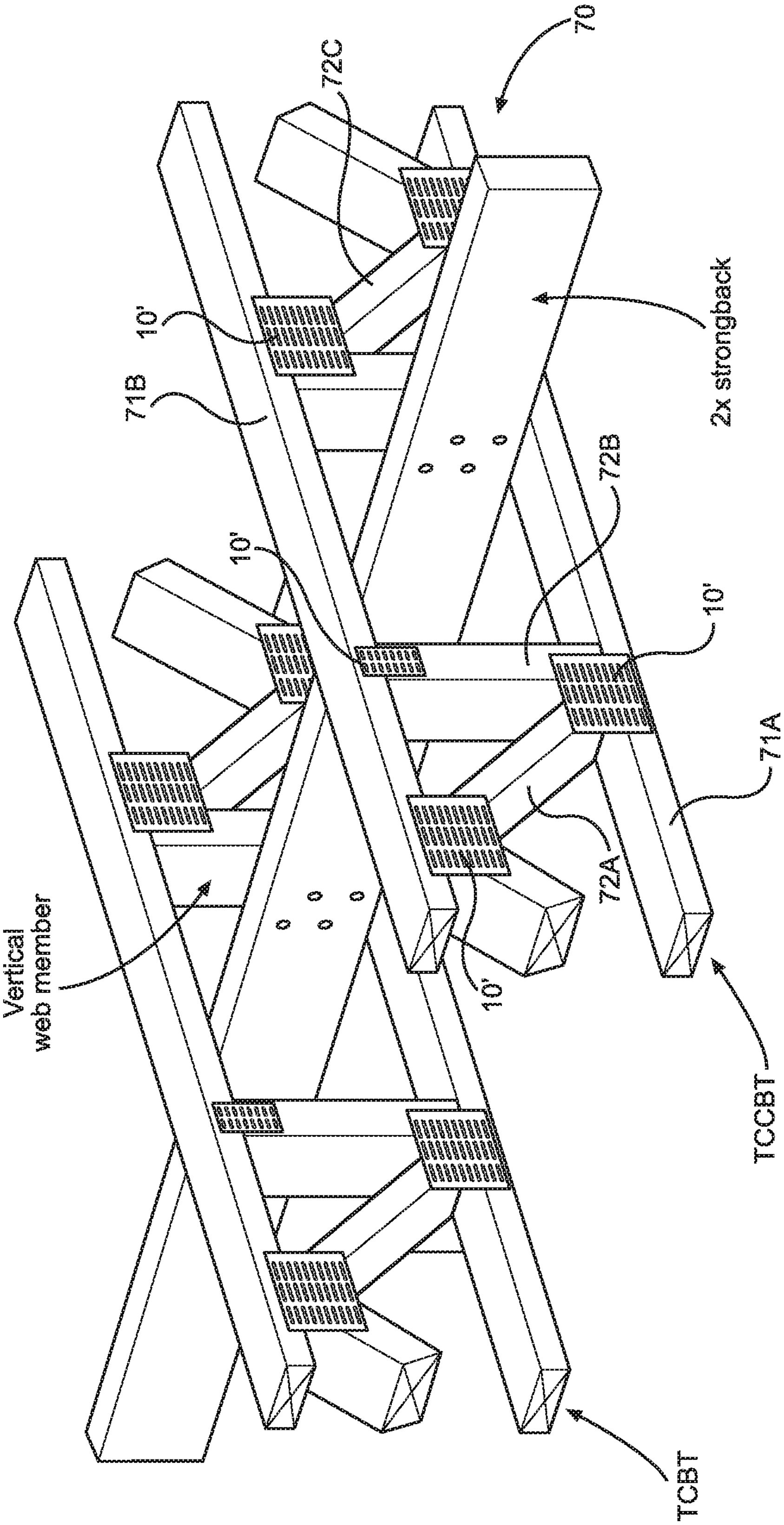
FIG. 35 is a perspective view of a Class-A fire-protected carbon-quantized top chord bearing (floor) truss (TCBT) constructed in accordance with the method described in FIG. 36 in the automated factory illustrated in FIG. 37, using Class-A fire-protected lumber sections connected together using heat-resistant coated metal truss connector plates, indicating a 50% reduction in heat transfer during ASTM E119 Testing, which reduces wood charring behind the connector plates and prevented truss failure in the presence of fire.

Specification of Method of Making Fire-Protected Top Chord Bearing (Floor) Truss (TCBT) Structure Constructed in Accordance with the Principles of the Present Invention FIG. 35 shows a Class-A fire-protected carbon-quantized top chord bearing (floor) truss (TCBT) structure 70 constructed in accordance with the present invention. As will be described in greater detail herein, the method of production involves (i) producing Class-A fire-protected lumber sections, and (ii) producing heat-resistant metal truss connector plates 10' coated with Dectan-chemical (i.e. indicating a 50% reduction in E119 Testing which reduces charring in the wood behind plate), and (iii) using these heat-resistant metal truss connector plates 10' to secure connect together the Class-A fire-protected pieces of lumber to form a Class-A fire-protected floor truss structure 70.

The Class-A fire-protected floor truss structure 70 performs better than conventional I-joists, does not require doubling as do conventional I-joists, does not require drilling on site top pass and install plumbing pipes and electrical wiring, as do I-joists, and does not require expensive LVL rim joists, while being easier to install in wood-framed buildings. The fire-protected floor truss structure 70 of the present invention provides an innovative solution to conventional wooden floor trusses using metal nail connector plates to connect together small lumber sections which ignite easily and burn quickly in a building fire. During a building fire, conventional metal nail connector plates 10, shown in FIGS. 8A and 8B, bend in the heat of a fire and release from its lumber section, causing the truss to loose all strength in a fire, as shown in FIG. 15. This places occupants at great risk trying to escape a burning wood-framed building, as well as firemen trying to extinguish a fire in a burning building before the fire reaches its critical stage.

Figure 36:
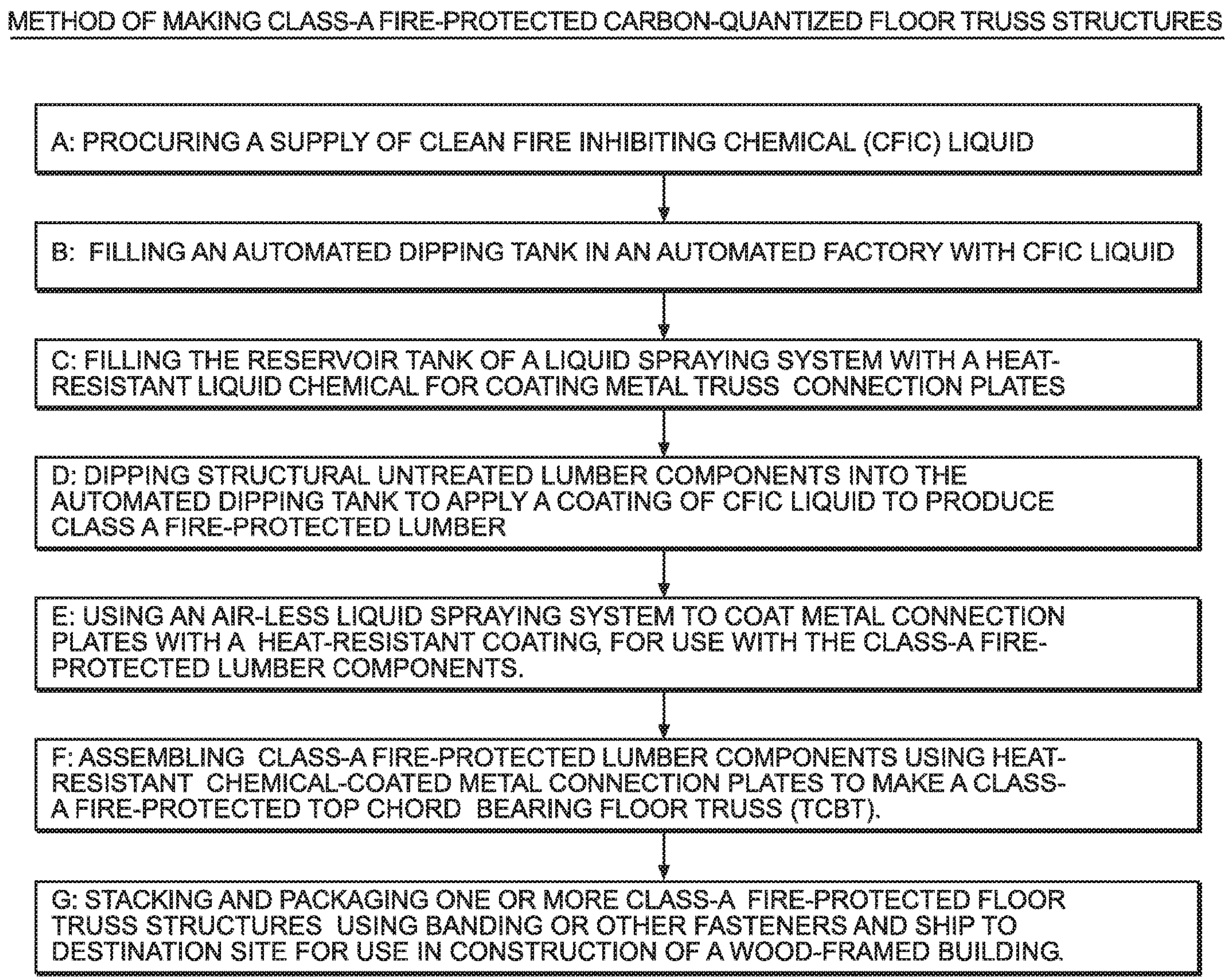
FIG. 36 is a flow chart describing the high level steps carried out when practicing the method of producing Class-A fire-protected carbon-quantized top chord bearing floor trusses (TCBT) in accordance with the present invention, comprising the steps of (i) procuring a water-based clean fire inhibiting chemical (CFIC) liquid, (b) filling a dipping tank with the water-based CFPC liquid, (c) filling the reservoir tank of an air-less liquid spraying system with heat-resistant chemical liquid, (e) dipping structural untreated lumber components into the dipping tank to infuse or impregnate clean fire inhibiting chemical (CFIC) over all its surfaces, and allow to dry to produce Class-A fire-protective lumber, and then use air-less liquid spraying system to coat metal connector plates for use with the fire-treated lumber components, (f) assembling the fire-treated lumber components using heat-resistant coated metal connector plates to make a fire-protected top chord bearing floor truss (TCBT) structure, and (g) stacking and packaging one or more Class-A fire-protected floor truss structures using banding or other fasteners and ship to destination site for use in the construction of a wood-framed building.

FIG. 36 describes practicing the method of producing Class-A fire-protected carbon-quantized top chord bearing floor trusses (TCBT) 70 in accordance with the present invention. As shown, the method comprises the steps: (a) procuring clean fire inhibiting chemical (CFIC) liquid 77A (e.g. Hartindo AF21 Total Fire Inhibitor from Newstar Chemicals); (b) filling the dipping tank 77 with water-based CFIC solution 77A; (c) filling the reservoir tank 78 of a liquid spraying system with a heat-resistant chemical liquid 78A for coating metal truss connector plates (e.g. Dectan Chemical from Hartindo Chemicatama Industri, or its distributor Newstar Chemicals of Malaysia); (d) dipping structural untreated lumber components into dipping tank 77 in a high-speed manner so as to infuse clean fire inhibiting chemical (CFIC) 77A into all its surfaces, wet-stacking the treated lumber, and allowing to air-dry to produce Class-A fire-protected lumber sections 71A, 71B, 71C; (e) using an air-less liquid spraying system, or other applicator, to coat metal connector plates 10 with a heat-resistant chemical liquid (i.e. Dectan Chemical from Hartindo Chemicatama Industri) 78A and thereafter drying in air or in drying tunnel, to produce heat-resistant metal connector plates 10' for use in connecting together the Class-A fire-protected lumber components 71A, 71B, 71C; (f) assembling the Class-A fire-protected lumber components 71A, 71B, 71C using heat-resistant metal connector plates 10' spray-coated with Dectan chemical to make a Class-A fire-protected top chord bearing floor truss (TCBT) structure 70; and (g) stacking and packaging one or more Class-A fire-protected floor truss structures 7 using banding, strapping or other fasteners and ship to a destination site for use in constructing wood-framed buildings.

During the last stage of the production process, each Class-A fire-protected floor trusses is carbon-quantized using the carbon-quantization engine 500 over the network 100, and labeled or marked with the estimated quantity of fire-protected carbon units (FPCUs) in mass units (e.g. kg or tons) and recorded in the network database. This carbon quantization process may involve making a mass measurement of a sample fire-protected floor truss, and also an electronically-measured moisture content measurement, and based on the species of wood involved, the carbon quantization engine 500 takes this carbon quantization request and computes FPCU figure to this requests, records and registers the fire-protected floor truss, depending on how packaging is achieved, and the fire-protected floor truss is labeled with the FPCU amount, by printing, stamping, laser etching or other marking means.

Liquid DecTan chemical is a complex mixture of a vinyl acrylic copolymer and tannic acid. Liquid DecTan chemical from Hartindo Chemicatama Industri has the ability to resist high heat, as it contains Hartindo's AF21 total fire inhibitor, and has proven to be an excellent heat-resistant coating for purposes of the present invention. It can be applied using spray-coating, curtain-coating, and brush-coating methods.

Figure 37:
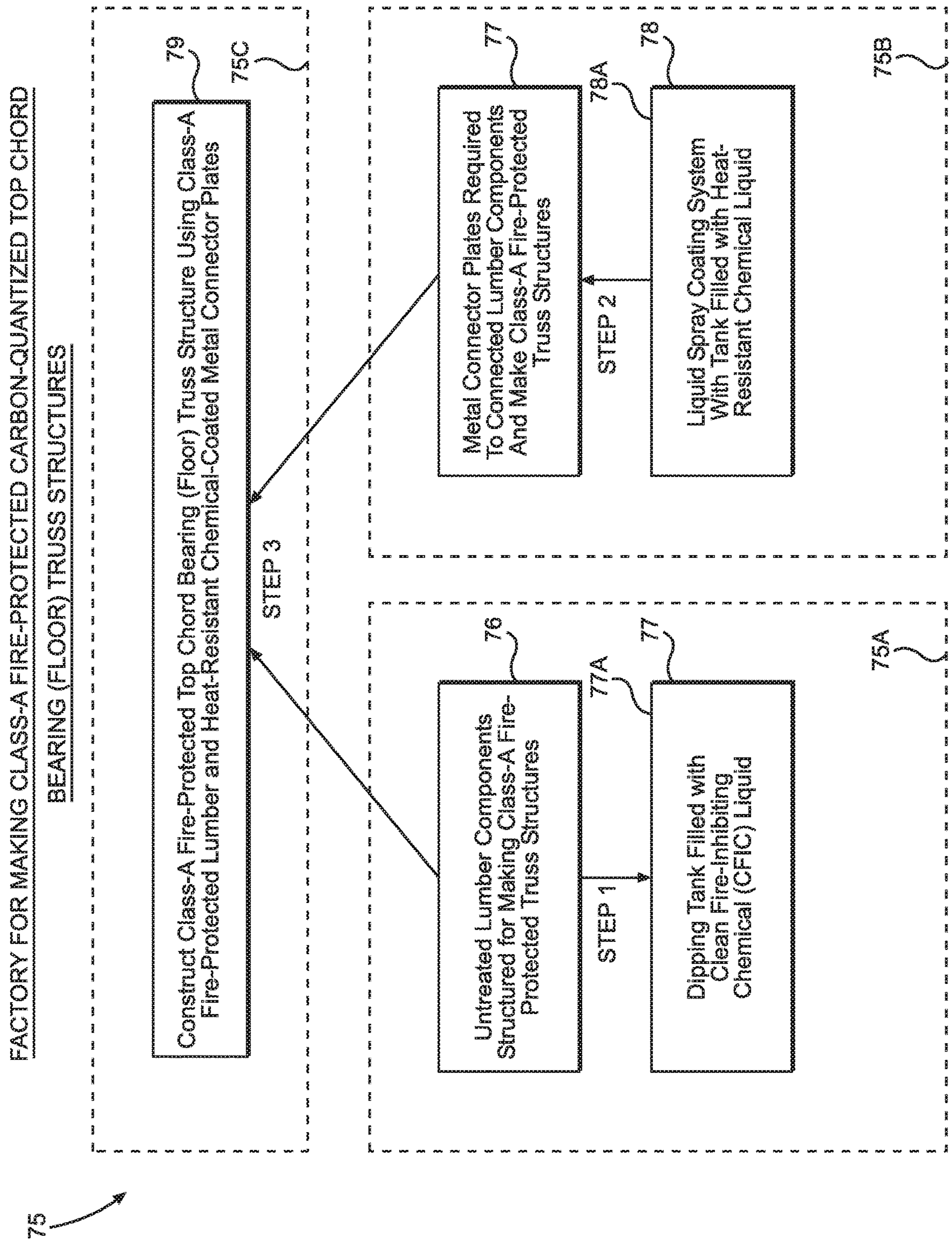
FIG. 37 is a schematic representation of an automated factory for making Class-A fire-protected carbon-quantized floor trusses shown in FIG. 36 according to the method described in FIG. 36, wherein the automated factory comprises the components, including (a) a first stage for dipping untreated lumber components in a tank filled with liquid clean fire inhibiting chemicals, (b) a second stage for spraying metal connector plates with a coating of heat-resistant chemical liquid to produce heat-resistant metal connector plates, and (c) third stage for assembling the Class-A fire-treated lumber components with the heat-resistant metal connector plates to form Class-A fire-protected floor trusses.

FIG. 37 depicts a factory 75 for making Class-A fire-protected floor trusses 70 in accordance with the principles of the present invention. As shown, the factory 75 comprises the components, including: (a) a first stage 75A for automated dipping of untreated lumber components in a dipping tank 77 filled with clean fire inhibiting chemical (CFIC) liquid 77A (e.g. Hartindo AF21 Total Fire Inhibitor from Newstar Chemicals of Malaysia) using automated dip-infusion technology described hereinabove in FIG. 19A; (b) a second stage 75B for automated spraying metal connector plates 10 with DecTan chemical 78A from Hartindo Chemicatama Industri using automated spray-coating technology described hereinabove in FIG. 27B; and (c) a third stage 75C for automated or semi-automated assembly of the Class-A fire-protected lumber components 71A and 71B with the DecTan-coated heat-resistant metal connector plates 10' using automation and controls, to form Class-A fire-protected floor trusses 70 in a high-speed, high-volume manner.

Figure 38:
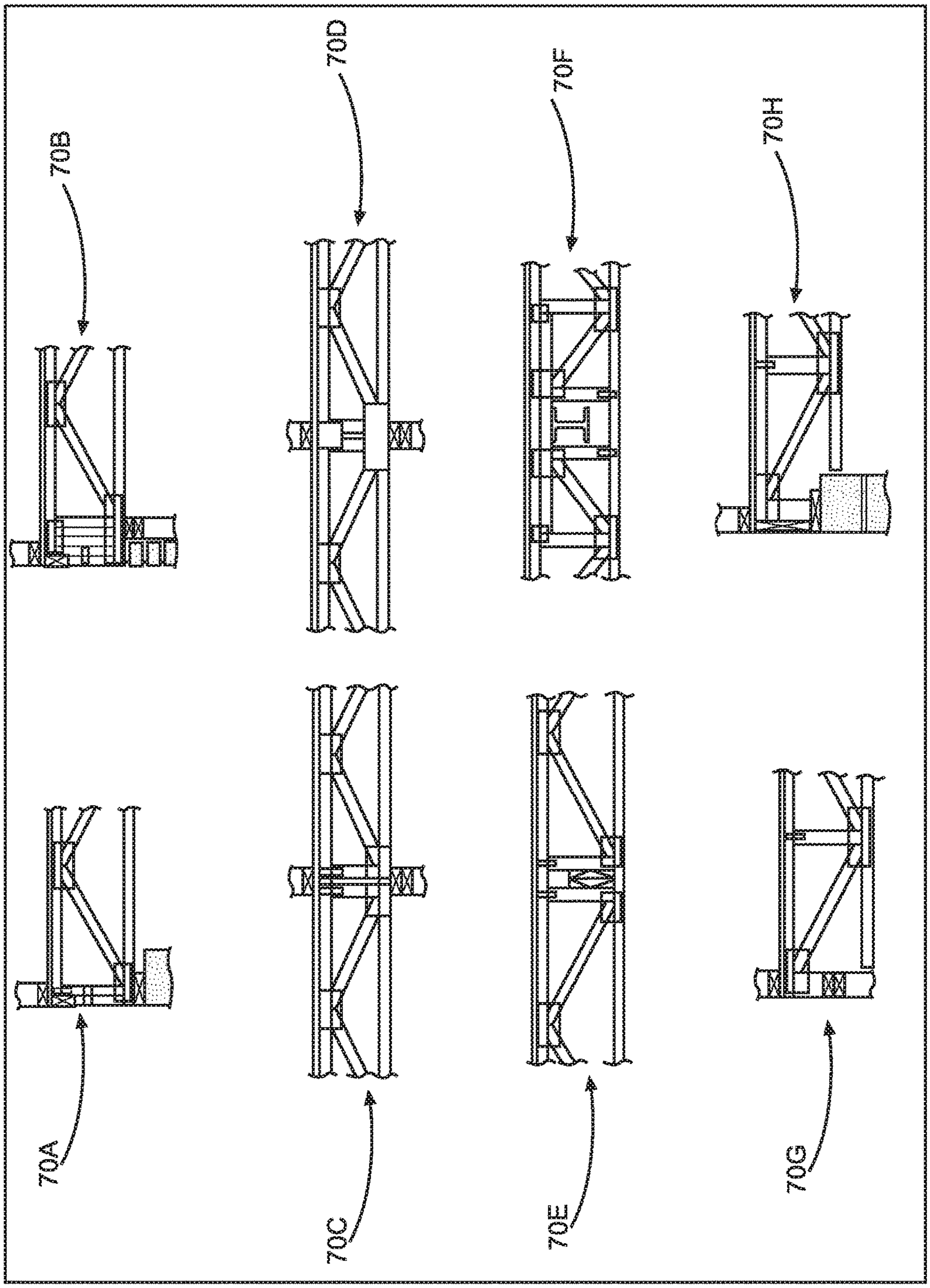
FIG. 38 shows a family of Class-A fire-protected carbon-quantized top chord bearing floor structures constructed in accordance with the principles of the present invention, described in FIGS. 36 and 37.

FIG. 38 shows a family of fire-protected top chord bearing floor structures 70A through 70H constructed in accordance with the present invention described above. Such examples include, for example: a bottom chord bearing on exterior frame or masonry wall 70A; a bottom chord bearing on exterior frame wall with masonry fascia wall 70B; an intermediate bearing—simple span trusses 70C; an intermediate bearing—continuous floor truss 70D; a header beam pocket—floor truss supporting header beam 70E; an intermediate bearing—floor truss supported by steel or wooden beam 70F; a top chord bearing on frame wall 70G; and a top chord bearing on masonry wall 70H. Notably, in each of these alternative top chord bearing floor truss designs, heat-resistant metal truss connector plates 10' are used to connect sections of fire-protected CFIC-coated lumber 71 in a secure manner, and enjoy the many benefits that such Class-A fire-protective building assemblies provide over the prior art.

FIG. 39 shows a schematic table illustrating the flame spread and smoke development indices obtained through testing of AAF21-treated Class-A fire-protected floor truss structures 70A through 70H produced using the method of the illustrative embodiment described in FIGS. 35, 36 and 37, and tested in accordance with standards ASTM E84 and UL 723.

Figure 40:
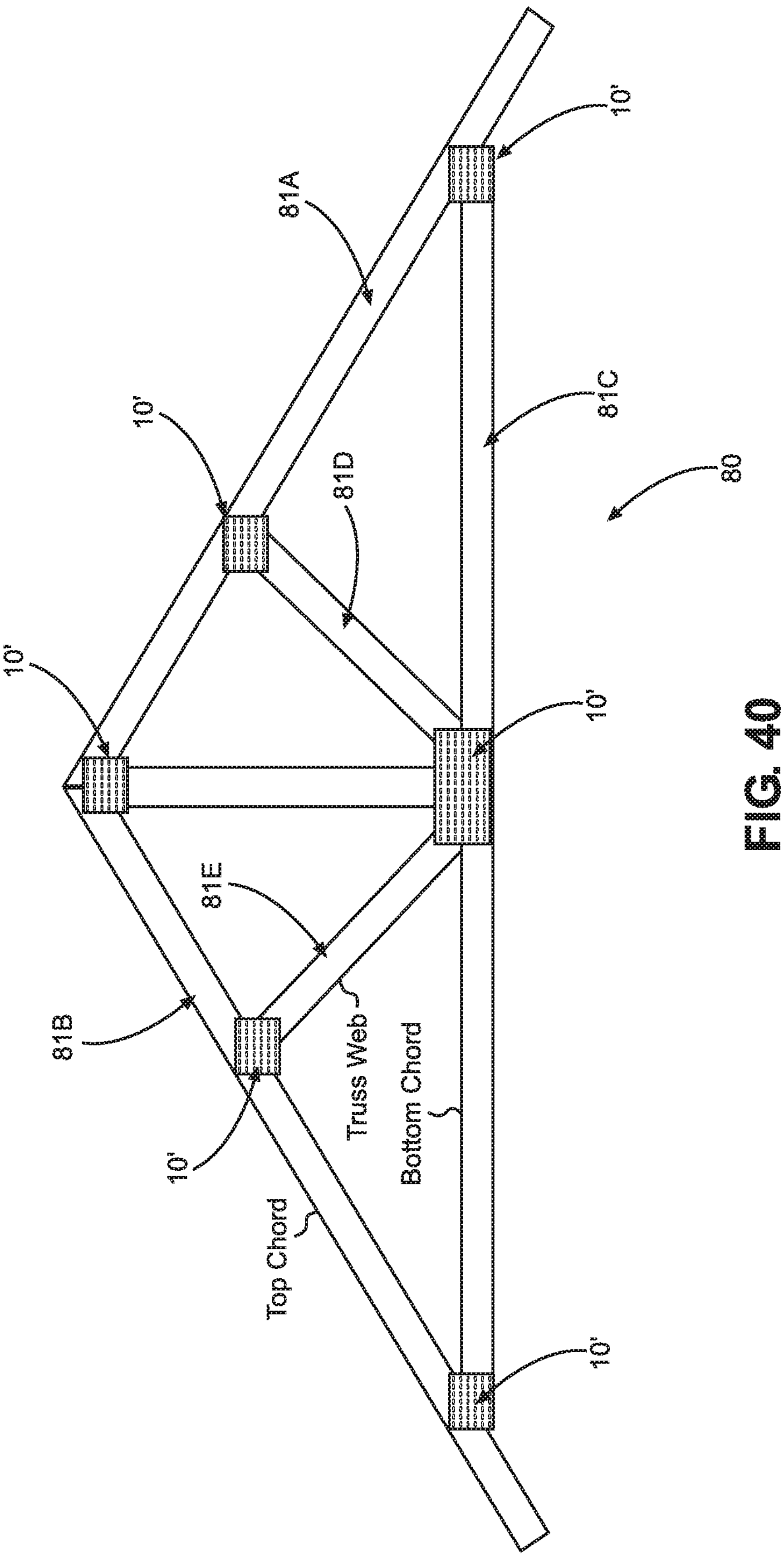
FIG. 40 is a schematic representation of Class-A fire-protected carbon-quantized top chord bearing roof truss structure of the present invention, constructed in accordance with the method described in FIG. 41 in the automated factory illustrated in FIG. 42, using Class-A fire-protected carbon-quantized lumber sections connected together using heat-resistant coated metal truss connector plates, indicating a 50% reduction in heat transfer during ASTM E119 Testing, which reduces charring in the wood behind the connector plates and prevented truss failure in the presence of fire.

Specification of the Method of a Fire-Protected Top Chord Bearing (Roof) Truss Structure of the Present Invention FIG. 40 shows a Class-A fire-protected carbon-quantized top chord bearing (roof) truss structure of the present invention 80, formed using clean fire inhibiting chemical (CFIC) coated lumber pieces 81A through 81E connected together using Dectan-coated heat-resistant metal truss connector plates 10'. This novel building construction provides an innovative solution to conventional wooden roof trusses employing conventional metal nail connector plates to connect together untreated lumber sections used to construct the truss structure which are plagued with numerous problems: (i) lumber truss sections easily igniting and quickly burning in a building fire; and (ii) conventional metal nail connector plates bending in the heat of a fire and releasing from its lumber sections, causing the truss structure to loose all strength in a fire. Such problems put occupants at great risk trying to escape a burning building, and also firemen trying to extinguish the fire before the fire reaches its critical stage.

Figure 41:
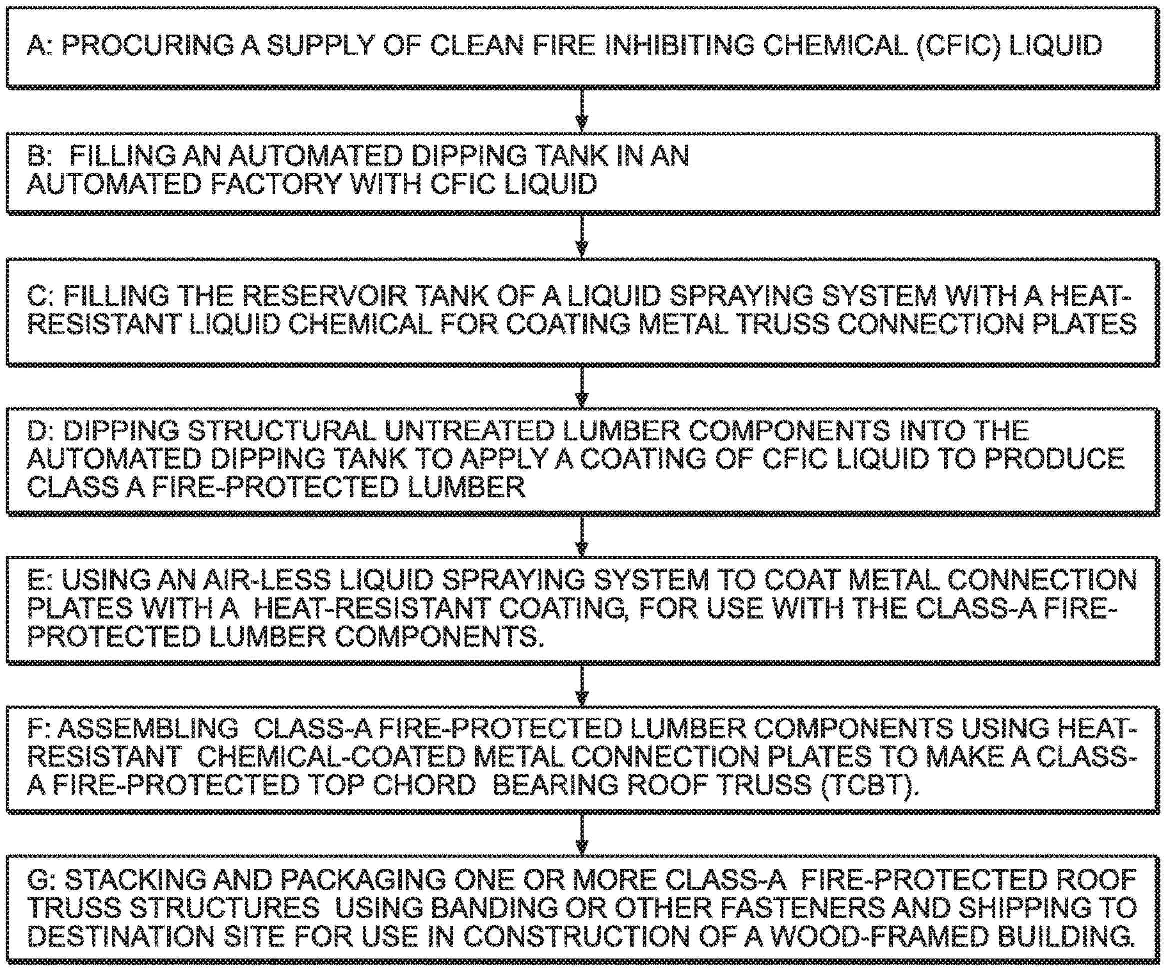
FIG. 41 is a flow chart describing the high level steps carried out when practicing the method of producing Class-A fire-protected carbon-quantized top chord bearing roof trusses (TCBT) shown in FIG. 40, comprising the steps of (a) procuring clean fire inhibiting chemical (CFIC) liquid for treating wood pieces, (b) filling water-based CFPC liquid into a dipping tank, (c) filling a reservoir tank of an air-less liquid spraying system with heat-resistant chemical liquid, (d) dipping structural untreated lumber components into the dipping tank to apply an infusion of clean fire inhibiting chemicals (CFIC) over and into all its surfaces, and allow to dry to produce Class-A fire-protected lumber, (e) using the air-less liquid spraying system to coat the metal connector plates with heat-resistant chemical liquid, to produce heat-resistant metal connector plates for use with the Class-A fire-protected lumber components, (f) assembling the fire-treated lumber components using heat-resistant Dectan chemical coated metal connector plates to make a fire-protected top chord bearing roof truss (TCBT) structure, and (g) stacking and packaging one or more Class-A fire-protected roof truss structures using banding or other fasteners and ship to destination site for use in construction wood-framed buildings.

FIG. 41 describes practicing the method of producing Class-A fire-protected top chord bearing roof trusses (TCBT) 80 in accordance with the present invention. As shown, the method comprises the steps: (a) procuring clean fire inhibiting chemical (CFIC) liquid 85A (e.g. Hartindo AF21 Total Fire Inhibitor from Newstar Chemicals); (b) filling the dipping tank 85 with water-based CFIC solution 86A; (c) filling the reservoir tank 86 of a liquid spraying system with a heat-resistant chemical liquid 86A for coating metal truss connector plates (e.g. Dectan Chemical from Hartindo Chemicatama Industri, or its distributor Newstar Chemicals of Malaysia); (d) dipping structural untreated lumber components into dipping tank 85 in a high-speed manner so as to infuse clean fire inhibiting chemical (CFIC) 85A over all its surfaces, wet-stacking the treated lumber, and allowing to air-dry to produce Class-A fire-protected lumber sections 81A, 81B, 81C, 81D, and 81E; (e) using an air-less liquid spraying system, or other applicator, to coat metal connector plates 10 with a heat-resistant chemical liquid (i.e. Dectan Chemical) 8A and thereafter drying in air or in drying tunnel, to produce heat-resistant metal connector plates 10' for use in connecting together the Class-A fire-protected lumber components 81A, 81B, 81C, 81D, and 81E; (f) assembling the Class-A fire-protected lumber components 81A, 81B, 81C, 81D, and 81E using heat-resistant metal connector plates 10' spray-coated with Dectan chemical to make a Class-A fire-protected top chord bearing roof truss (TCBT) structure 80; and (g) stacking and packaging one or more Class-A fire-protected roof truss structures 80 using banding, strapping or other fasteners and ship to a destination site for use in constructing wood-framed buildings.

During the last stage of the production process, each Class-A fire-protected roof trusses is carbon-quantized using the carbon-quantization engine 500 over the network 100, and labeled or marked with the estimated quantity of fire-protected carbon units (FPCUs) in mass units (e.g. kg or tons) and recorded in the network database. This carbon quantization process may involve making a mass measurement of a sample fire-protected roof truss, and also an electronically-measured moisture content measurement, and based on the species of wood involved, the carbon quantization engine 500 takes this carbon quantization request and computes FPCU figure to this requests, records and registers the fire-protected floor truss, depending on how packaging is achieved, and the fire-protected carbon-quantized floor truss is labeled with the FPCU amount, by printing, stamping, laser etching or other marking means.

Figure 42:
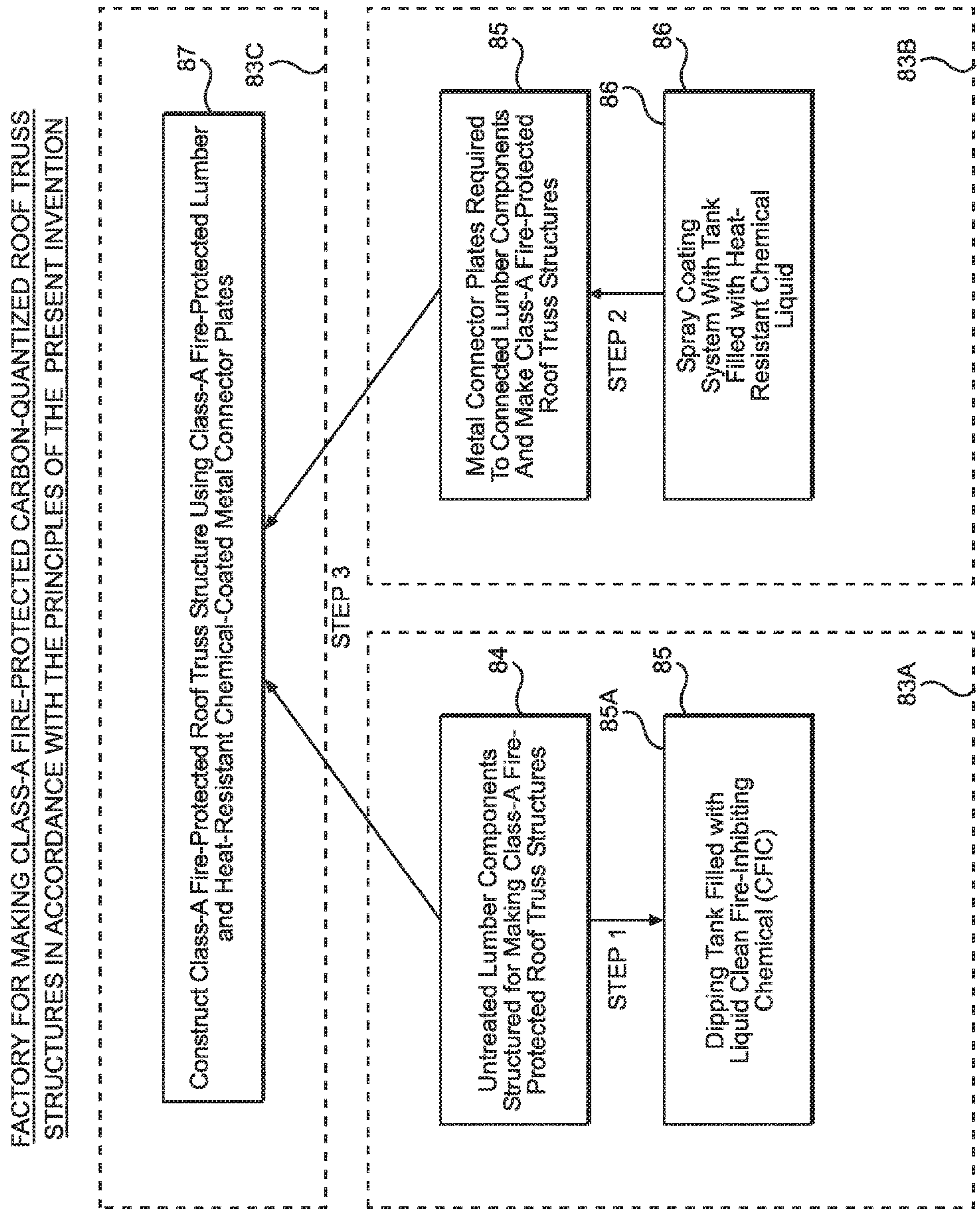
FIG. 42 is a schematic representation of an automated factory for making Class-A fire-protected carbon-quantized roof trusses in accordance with the method described in FIG. 41, wherein the factory comprises the components, including (a) a first stage for dipping untreated lumber components in a dipping tank filled with liquid clean fire inhibiting chemicals (CFIC), (b) a second stage for spraying metal connector plates with a heat-resistant chemical to produce heat-resistant metal connector plates, and (c) a third stage for assembling the Class-A fire-protected lumber components with the heat-resistant metal connector plates to form Class-A fire-protected carbon-quantized roof trusses.

FIG. 42 depicted a factory 83 for making fire-protected carbon-quantized top chord bearing roof trusses 80 in accordance with the principles of the present invention. As shown, the factory 83 comprises the components, including: (a) a first stage 83A for dipping untreated lumber components in a dipping tank 85 filled with clean fire inhibiting chemical (CFIC) liquid 85B (e.g. Hartindo AF21 Total Fire Inhibitor from Newstar Chemicals of Malaysia) using automated dip-infusion technology described hereinabove in FIG. 19A; (b) a second stage 83B for automated spraying metal connector plates 10 with Dectan chemical 86A from Hartindo Chemicatama Industri, of Malaysia using automated spray-coating technology described hereinabove in FIG. 27B, to produce heat-resistant metal connector plates 10'; and (c) a third stage 83C for assembling the Class-A fire-protected lumber components 81A through 81E with the heat-resistant Dectan-coated metal connector plates 10' using automation and controls, to form fire-protected top chord bearing roof trusses 80 in a high-speed, high-volume manner.

Figure 43A:
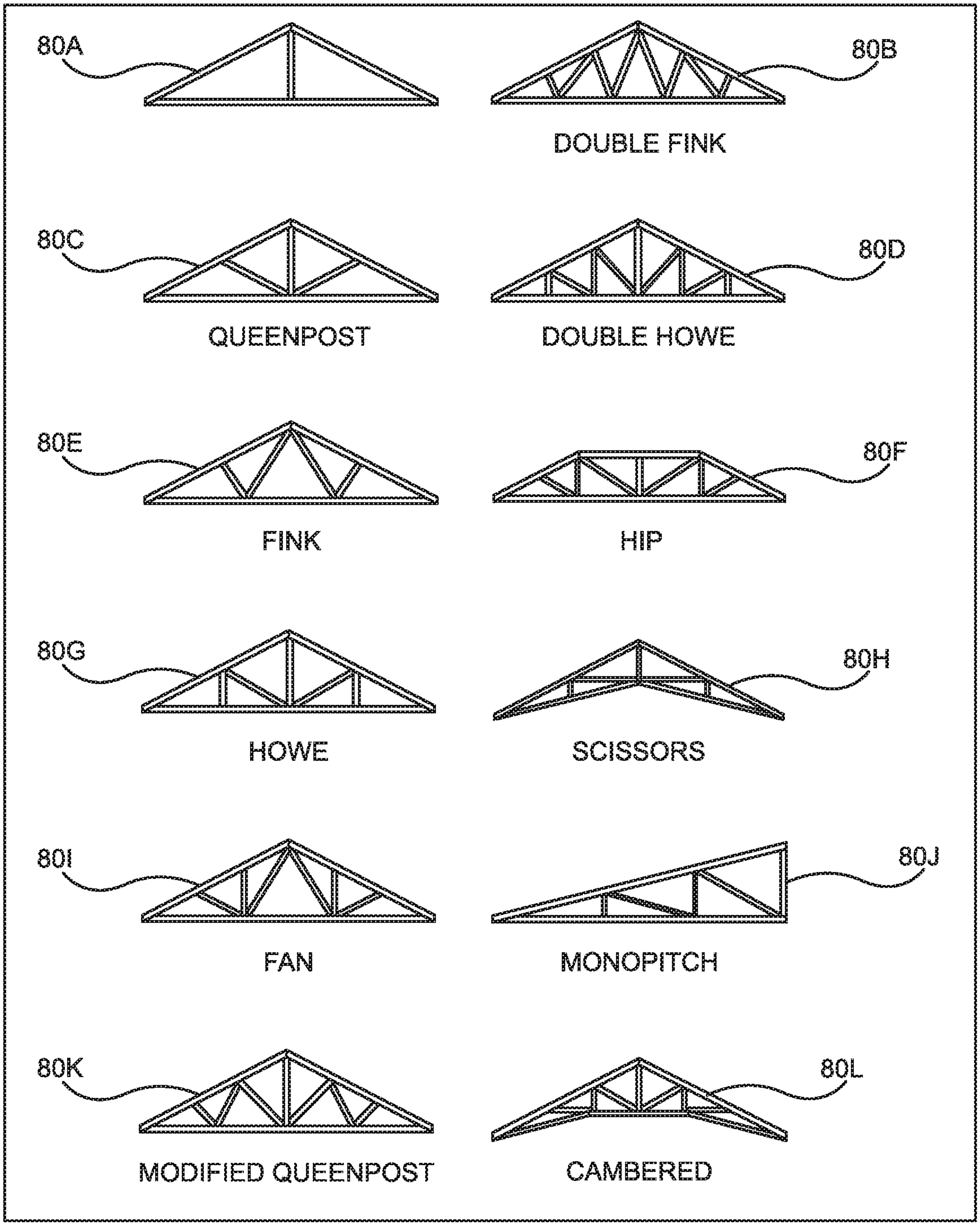
FIGS. 43A and 43B show a family of Class-A fire-protected carbon-quantized top chord bearing roof structures constructed in accordance with the present invention, described in FIGS. 40, 41 and 42.
Figure 43B:
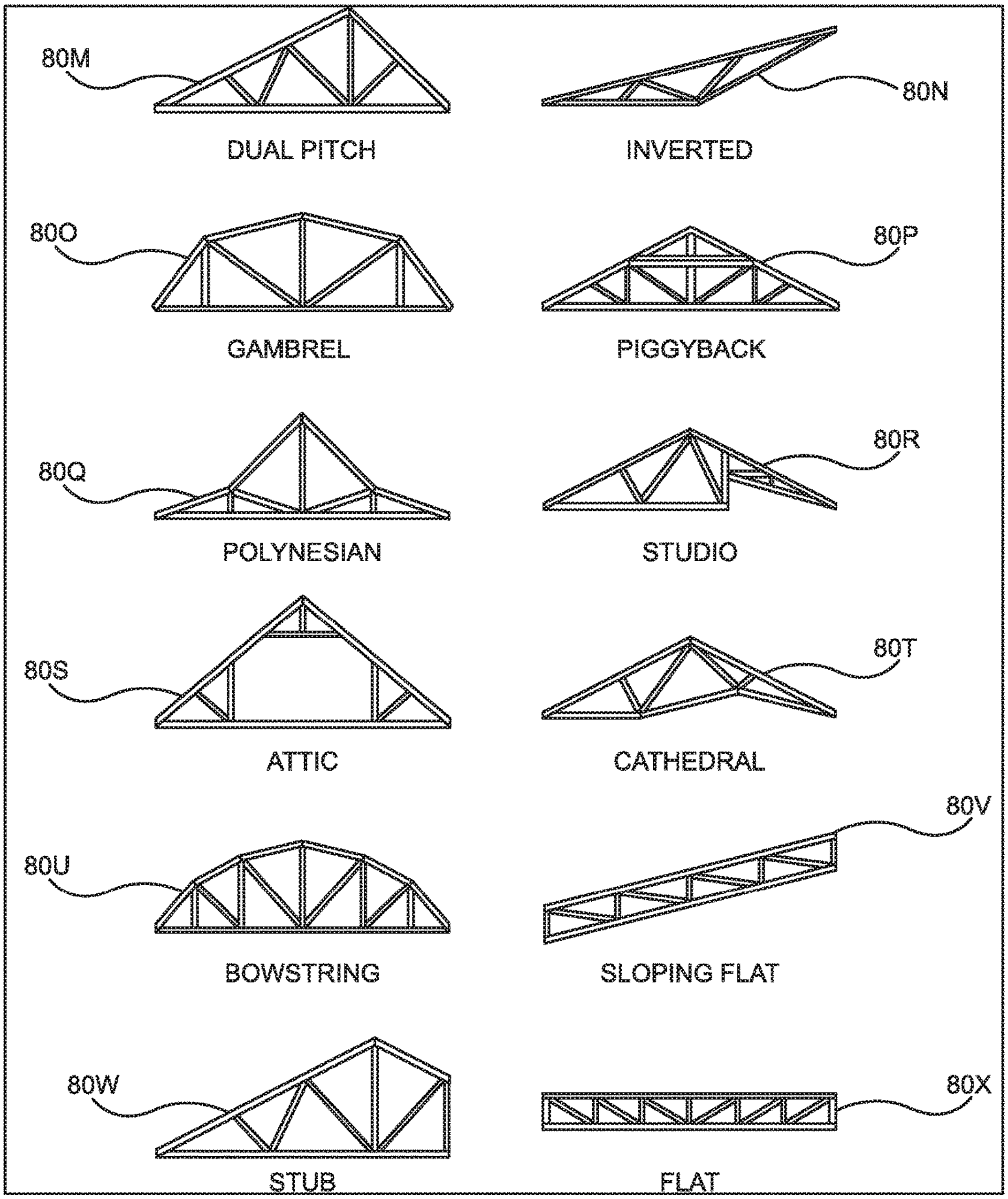

FIGS. 43A and 43B show a family of fire-protected top chord bearing (roof) structures 80 constructed in accordance with the present invention and identified, for example, by roof top truss design names, including: kingpost 80A; double fink 80B; queen post 80C; double Howe 80D; fink 80E; hip 80F; Howe 80G; scissors 80H; fan 801; monopitch 80J; modified queenpost 80K; cambered 80L; dual pitch 80M; inverted 80N; gambrel 800; piggyback 80P; polyensian 80Q; studio 80R; attic 80S; cathedral 80T; bowstring 80U; sloping flat 80V; stub 80W; and flat 80X. Notably, in each of these alternative top chord bearing roof truss designs, heat-resistant metal truss connector plates 10' are used to connect together sections of fire-protected CFIC-coated lumber sections in a secure manner, in accordance with the principles of the present invention, and enjoy the many benefits that such improved assembly constructions provide over the prior art.

FIG. 44 shows a schematic table illustrating the flame spread and smoke development indices obtained through testing of AAF21-treated Class-A fire-protected roof truss structure 80A through 80X produced using the method of the illustrative embodiment described in FIGS. 41 and 42, and tested in accordance with standards ASTM E84 and UL 723.

Figure 45:
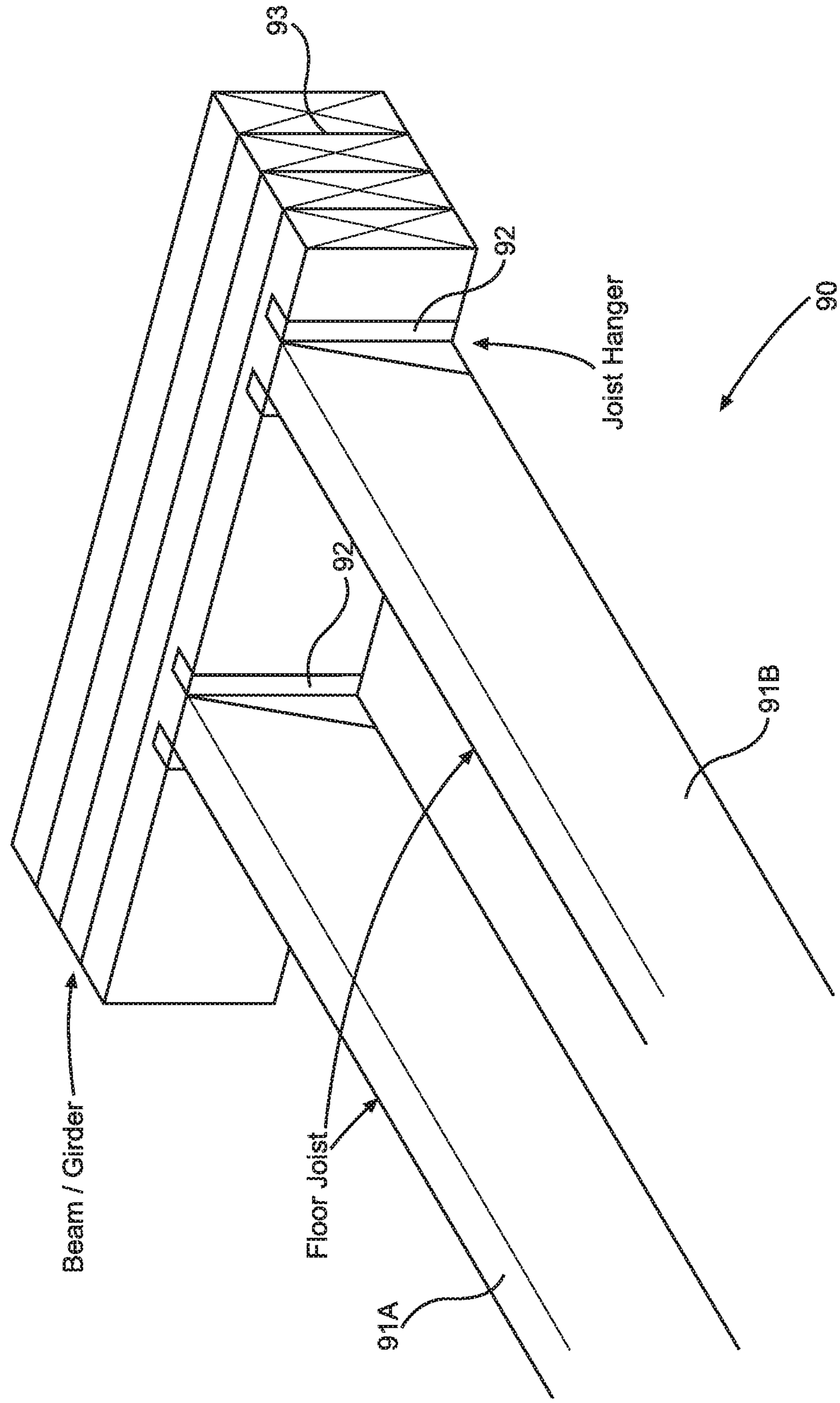
FIG. 45 is a schematic representation of a Class-A fire-protected carbon-quantized floor joist structure of the present invention, formed using Class-A fire-protected lumber pieces connected together using heat-resistant metal joist hanger plates, for use in construction a Class-A fire-protected floor joist system enabling the construction of one-hour floor assemblies, using one layer of drywall, in long lengths (e.g. up to 40 feet), for spanning straight floor sections, and as a rim joist as well.

Specification of a Method of Producing a Class-A Fire-Protected Floor Joist Structure of the Principles of the Present Invention FIG. 45 shows a Class-A fire-protected carbon-quantized floor joist structure of the present invention 90, formed using clean fire inhibiting chemical (CFIC) coated lumber pieces 91A, 91B, and 93 connected together using heat-resistant Dectan-coated metal joist hanger plates 92, and providing a solution to every firefighter's worse fear (i.e. sudden floor collapses due conventional I-joists and floor trusses which can fail in fire in as little as 6 minutes). The present invention provides a novel solution to this dreaded problem by providing a Class-A fire-protected floor joist system that enables the construction of one-hour floor assemblies using one layer of drywall, available in long lengths (e.g. up to 40 feet), for spanning straight floor sections, and as providing a rim joist as well.

Figure 46:
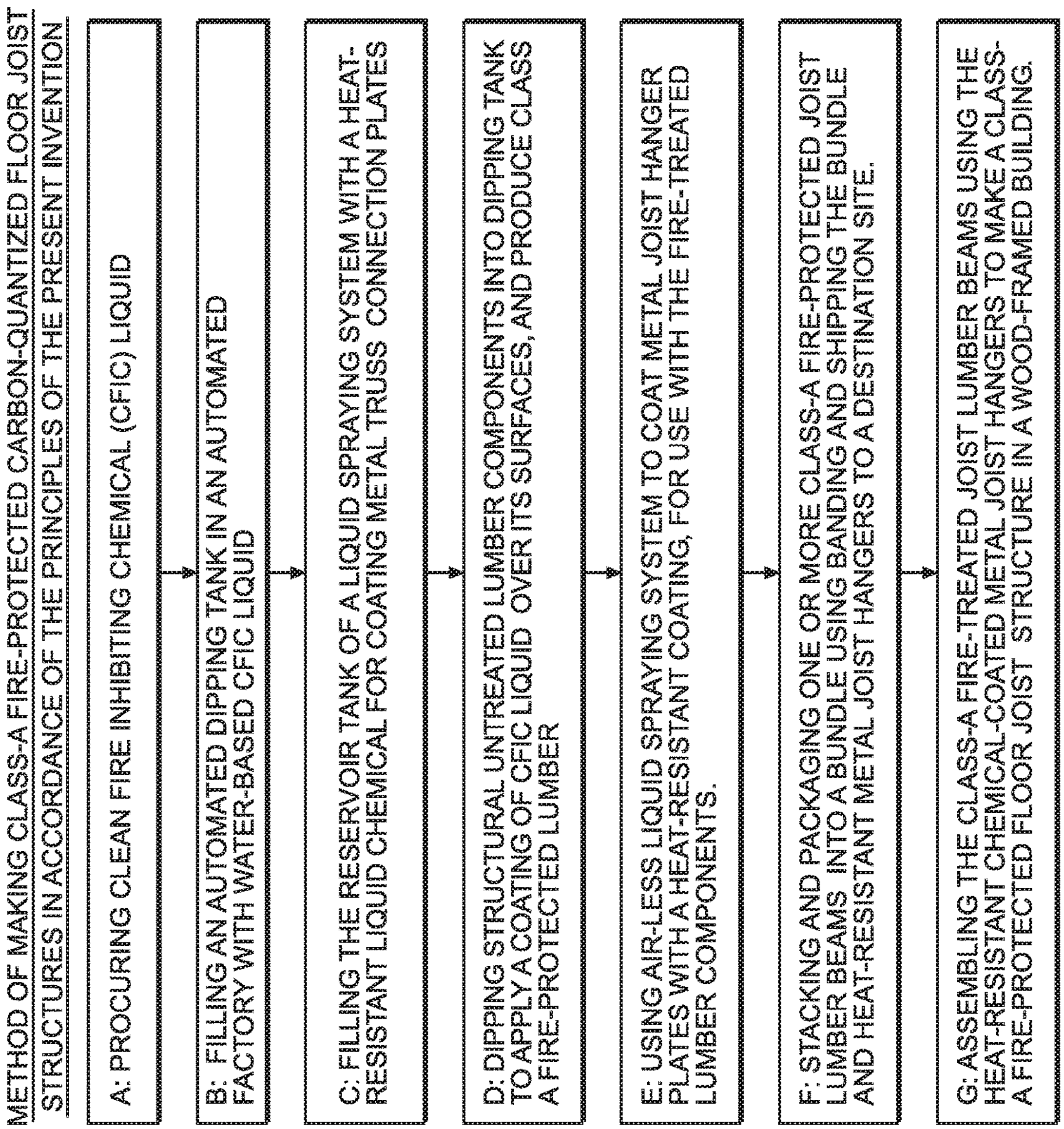
FIG. 46 is a flow chart describing the high level steps carried out when practicing the method of producing Class-A fire-protected carbon-quantized joist structure in accordance with the present invention, comprising the steps of (i) procuring clean fire inhibiting chemical (CFIC) liquid for fire-protecting wood and lumber, (b) filling water-based CFPC liquid into a dipping tank, (c) filling the air-less liquid spraying system with heat-resistant chemical liquid, (d) dipping structural untreated lumber components into dipping tank to apply a uniform infusion of clean fire inhibiting chemicals (CFIC) over and into all its surfaces, and allow to dry to produce Class-A fire-protected lumber, (e) using an air-less liquid spraying system to coat metal joist hangers with the heat-resistant chemical liquid, for use with the Class-A fire-protected lumber components, (f) assembling the Class-A fire-protected lumber components using heat-resistant coated metal joist hangers to make a Class-A fire-protected joist structure, and (g) stacking and packaging one or more Class-A fire-protected joist structures using banding or other fasteners and ship the package to destination site for use in construction of a wood-framed building.

FIG. 46 describes the high level steps carried out when practicing the method of producing Class-A fire-protected joist structure 90 in accordance with the present invention. As shown, the method of comprises the steps: (a) procuring clean fire inhibiting chemical (CFIC) liquid 96A (e.g. Hartindo AF21 Total Fire Inhibitor from Newstar Chemicals); (b) filling the dipping tank 96 with water-based CFIC solution 96A; (c) filling the reservoir tank 98 of a liquid spraying system with a heat-resistant chemical liquid 98A (e.g. Dectan Chemical from Hartindo Chemicatama Industri, or its distributor Newstar Chemicals of Malaysia) for coating metal truss connector plates; (d) dipping structural untreated lumber components 91A, 91B, 93 into dipping tank 96 in a high-speed manner so as to infuse (i.e. apply) clean fire inhibiting chemical (CFIC) 96A in all of its surfaces, wet-stacking the treated lumber, and allowing to air-dry to produce Class-A fire-protected lumber sections 91A', 91B', 93'; (e) dipping untreated structural joist lumber beams 91A', 91B', 93' into the dipping tank 96 so as to uniformly infuse clean fire inhibiting chemical (CFIC) liquid 96A into all its surfaces to form a CFIC-infusion or membrane through all of the lumber surfaces, and allowing the CFIC-infused joist lumber beams to dry to produce Class-A fire-protected lumber sections 91A, 91B, 93; and then using the air-less liquid spraying system to coat metal joist hangers with liquid Dectan chemical 98A in the reservoir tank 98, so as to produce heat-resistant Dectan-chemical coated metal joist hangers 92, for use with the Class-A fire-protected lumber components 91A, 91B and 93; (f) stacking and packaging one or more fire-protected joist lumber beams 91A, 91B, and 93 together into a bundle, using banding or other fasteners, and with the heat-resistant metal joist hangers 92, and shipping the lumber bundle and heat-resistant metal joist hangers to destination site for use in construction wood-framed buildings; and (g) assembling the Class-A fire-protected joist lumber beams 91A, 91B and 93 using the heat-resistant Dectan-chemical coated metal joist hangers 92 to make a Class-A fire-protected joist structure 47 according to the principles of the present invention.

During the last stage of the production process, each Class-A fire-protected floor joist structure is carbon-quantized using the carbon-quantization engine 500 over the network 100, and labeled or marked with the estimated quantity of fire-protected carbon units (FPCUs) in mass units (e.g. kg or tons) and recorded in the network database. This carbon quantization process may involve making a mass measurement of a sample fire-protected floor joist structure, and also an electronically-measured moisture content measurement, and based on the species of wood involved, the carbon quantization engine 500 takes this carbon quantization request and computes FPCU figure to this requests, records and registers the fire-protected floor truss, depending on how packaging is achieved, and the fire-protected carbon-quantized floor joist structure is labeled with the FPCU amount, by printing, stamping, laser etching or other marking means.

Figure 47:
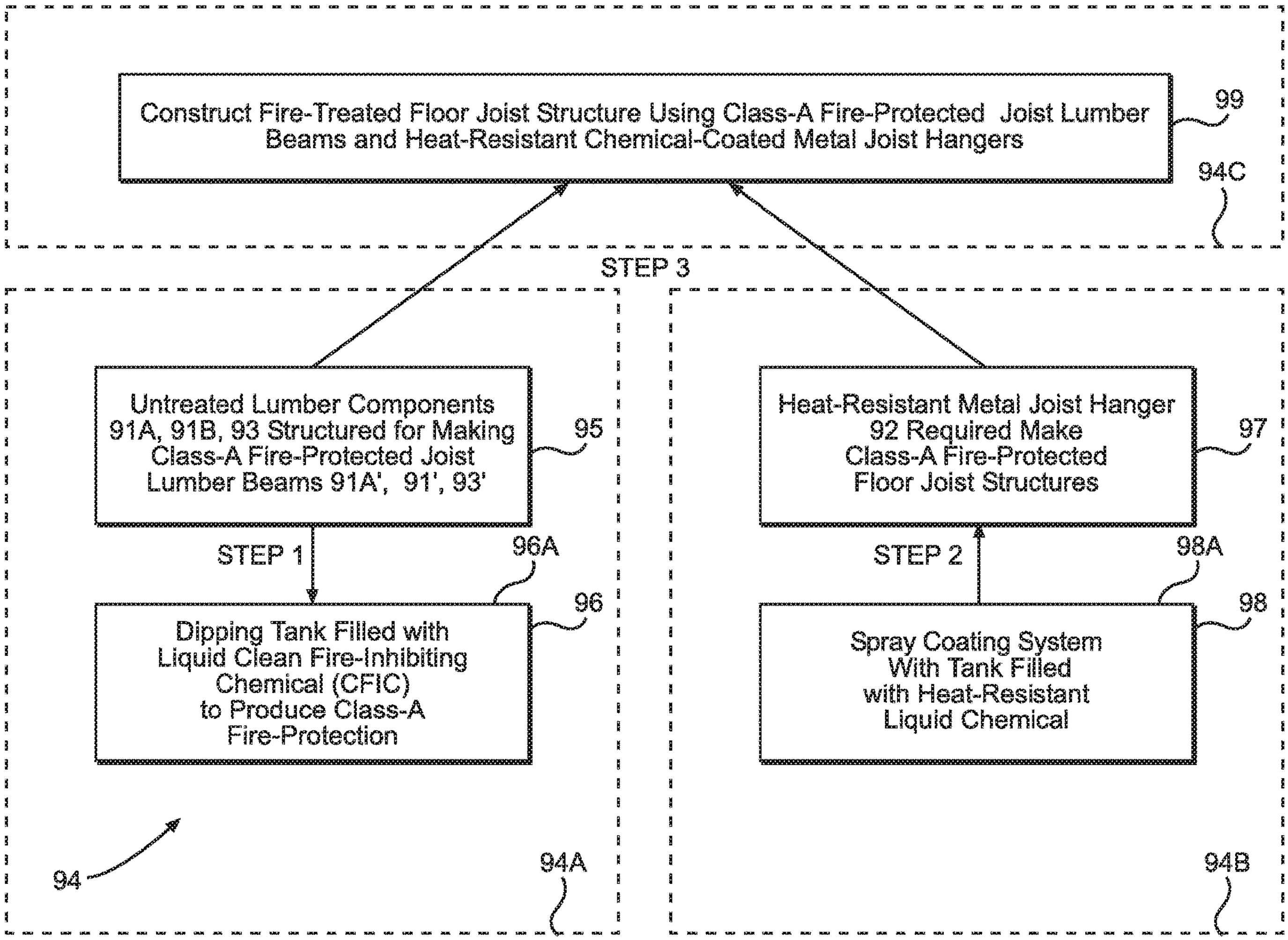
FIG. 47 is a schematic representation of a factory for making Class-A fire-protected carbon-quantized joist structures in accordance with the principles of the present invention, comprising the components, including (a) a first stage for dipping untreated lumber components in a tank filled with liquid clean fire inhibiting chemicals (CFIC), (b) a second stage for spraying metal joist hangers with heat-resistant chemical to as to produce heat-resistant metal joist hangers, and (c) a third stage for assembling the Class-A fire-protected lumber components with the heat-resistant metal joist plates to form Class-A fire-protected joist structures.

FIG. 47 depicts a factory 94 for making Class-A fire-protected joist structures 90 in accordance with the principles of the present invention. As shown, the factory 94 comprises the components, including: (a) a first stage 94A for dipping untreated lumber components in a dipping tank 96 filled with liquid clean fire inhibiting chemicals (CFIC) 96A (e.g. Hartindo AF21 Total Fire Inhibitor from Newstar Chemicals) using automated dip-infusion technology described hereinabove in FIG. 19A; (b) a second stage 94B for automated spraying metal joist hangers 92 with heat-resistant liquid Dectan chemical 98A from Hartindo Chemicatama Industri using automated spray-coating technology described hereinabove in FIG. 27B to produce heat-resistant Dectan-coated metal hanger joists 92; and (c) a third stage 94C for automated or semi-automated assembly of the Class-A fire-protected lumber components 91A, 91B together using the Dectan-coated metal joist plates 92' using automation and controls, to form Class-A fire-protected joist structures 90 according to the present invention.

FIG. 48 shows a table illustrating the flame spread and smoke development indices obtained through testing of AAF21-treated Class-A fire-protected floor joist structure 90 produced using the method of the illustrative embodiment described in FIGS. 46 and 47, and tested in accordance with standards ASTM E84 and UL 723.

Figure 49:
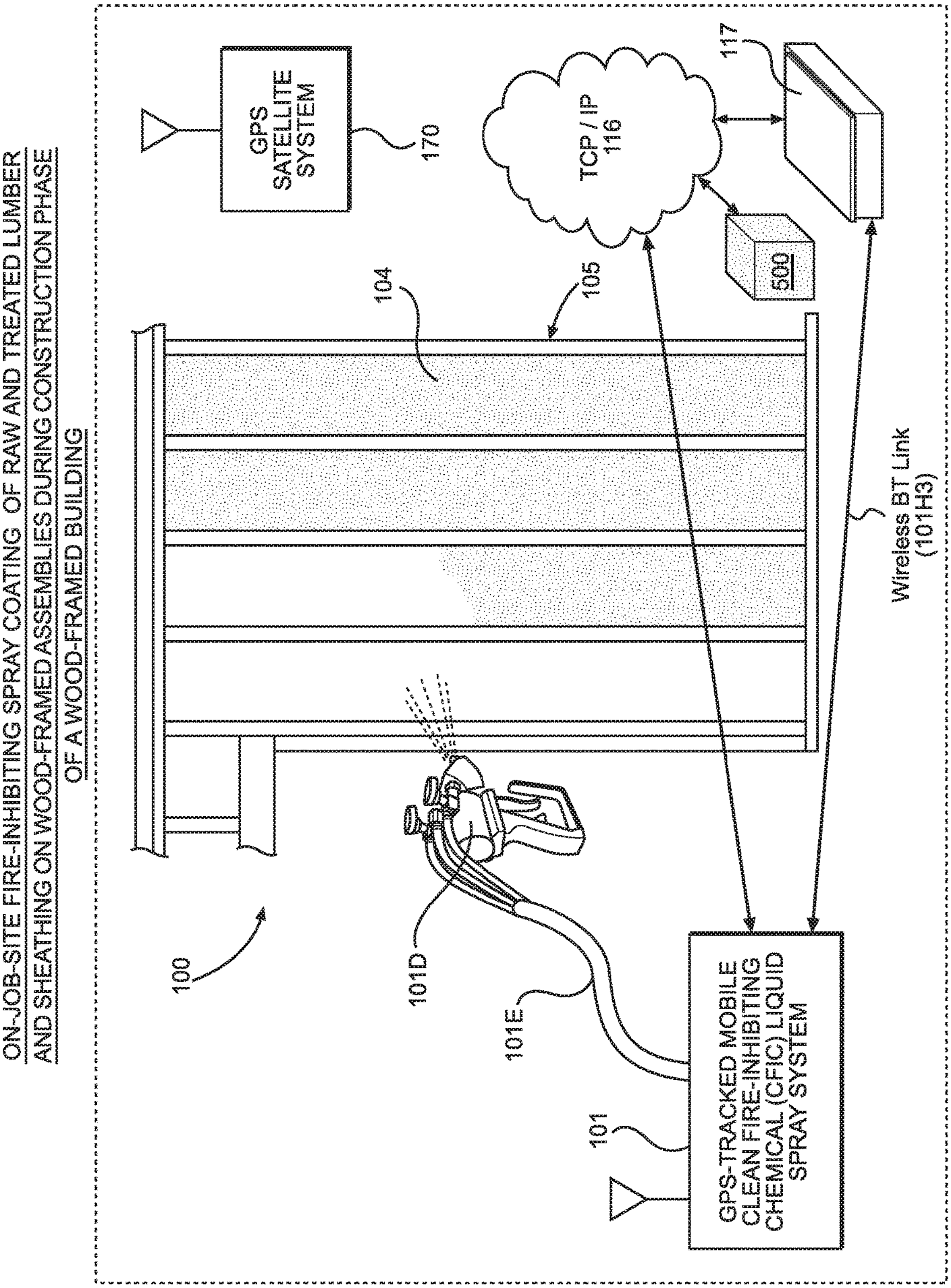
FIG. 49 is a schematic representation illustrating the method of and system for the present invention for on-job-site spray-coating clean fire inhibiting liquid chemical (CFIC) liquid over all exposed interior surfaces of raw as well as fire-treated lumber and sheathing used in a completed section of a wood-framed building during its construction phase, wherein a GPS-tracked mobile clean fire-inhibiting chemical (CFIC) liquid spraying system, and the system network illustrated in FIG. 55, are used to apply and document the spraying of a thin CFIC film or coating over all exposed interior wood surfaces, and thereby provide Class-A fire-protection over all lumber and sheathing used in the wood-framed building construction, along with a complete chain of evidence and documentation to qualify the owner of the Class-A fire-protected wood-framed building for lower causality insurance premiums, and provide local fire departments with valuable building information when fighting fires that may break out in such Class-A fire-protected wood-framed buildings.

Specification of the On-Job-Site Spray-Coating Based Method, System and Network for Class-A Fire-Protection of all Exposed Interior Surfaces of Lumber and Sheathing Used in Wood-Framed Buildings During the Construction Phase FIG. 49 illustrates an on-job-site spray coating of clean fire inhibiting chemical (CFIC) liquid all over the exposed interior surfaces of raw and treated lumber and sheathing used in a completed section of a wood-framed assemblies in a wood-framed building during its construction phase.

Figure 50:
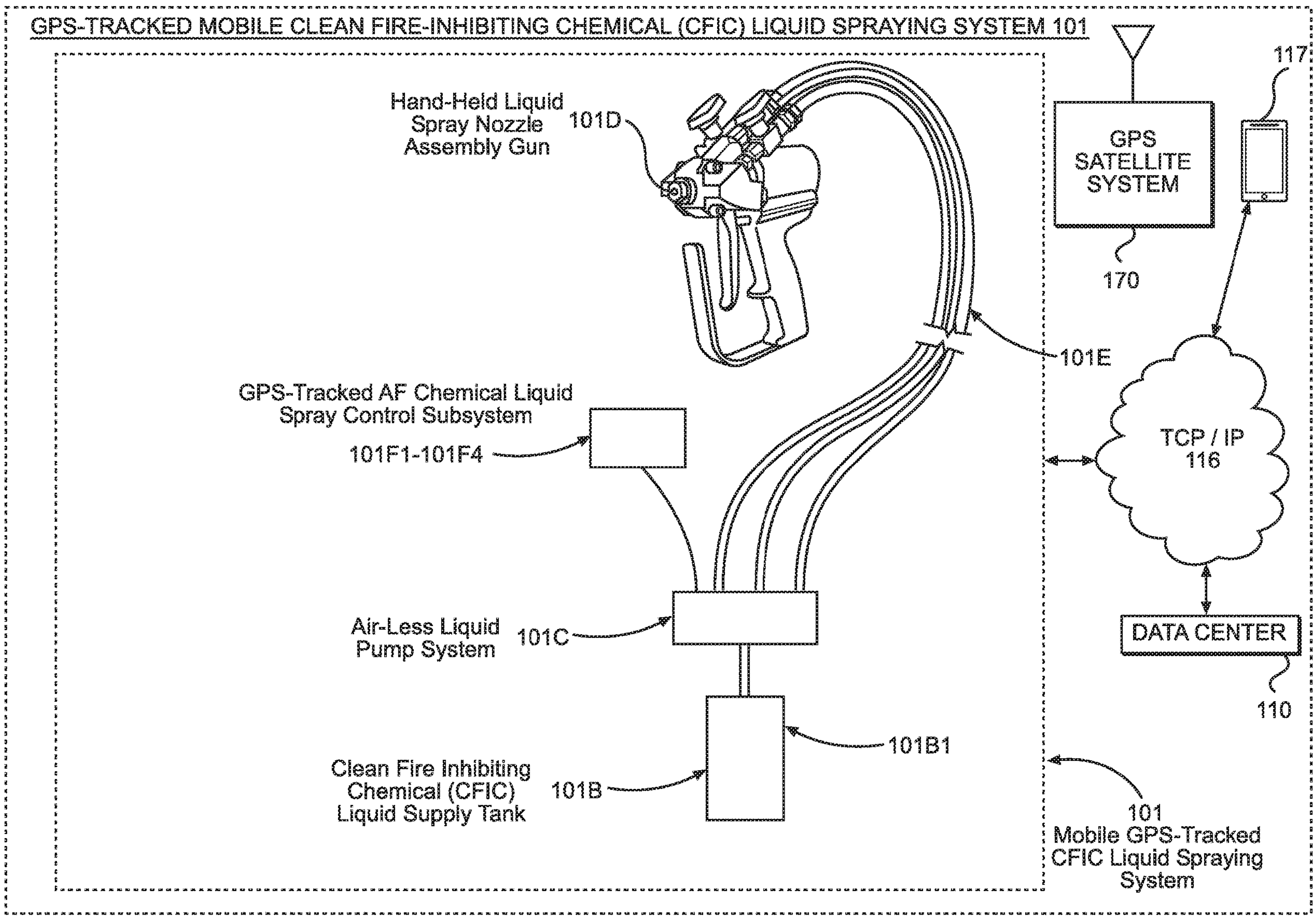
FIG. 50 is a schematic representation showing the primary components of the air-less liquid spraying system for spraying environmentally-clean Class-A fire-protective liquid coatings, comprising (i) an air-less type liquid spray pumping subsystem having a reservoir tank for containing a volume of clean fire inhibiting chemical (CFIC) liquid, (ii) a hand-held liquid spray nozzle gun for holding in the hand of a spray-coating technician, and (iii) a sufficient length of flexible tubing, preferably supported on a carry-reel assembly, if necessary, for carrying the CFIC liquid from the reservoir tank of the liquid spray pumping subsystem, to the hand-held liquid spray gun during spraying operations carried out inside the wood-framed building during the construction phase of the building project.

As shown in FIGS. 49 and 50, the primary components of the mobile GPS-tracked clean fire inhibiting chemical (CFIC) air-less liquid spraying system 100 comprises: (i) an air-less liquid spray pumping subsystem 101 including a reservoir tank 101B for containing a supply of CFIC liquid 101C (i.e. AF31 from Hartindo Chemicatama Industri), (ii) a hand-held liquid spray nozzle gun 101D for holding in the hand of a spray coating technician, and (iii) a sufficient length of flexible tubing 101E, on a carry-reel assembly, if necessary, for carrying liquid CFIC solution from the reservoir tank 101B of the air-less liquid pumping system 101C to the hand-held liquid spray nozzle gun 101D during spraying operations carried out in the wood-framed building construction.

Figure 49A:
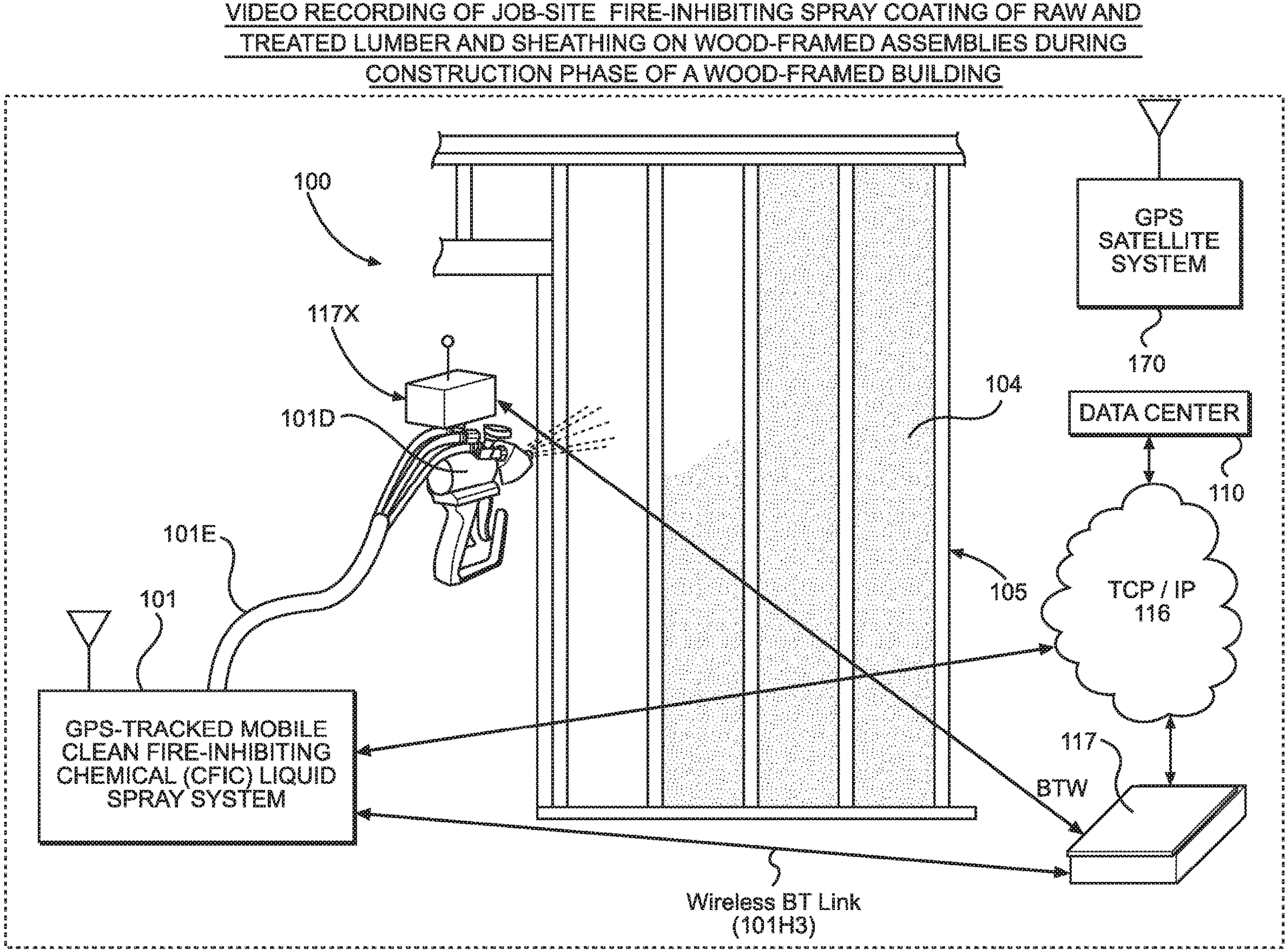
FIG. 49A is a schematic representation showing the video recording of fire-inhibiting liquid spraying raw and treated lumber, and sheathing on wood-framed assemblies, during construction phase of a wood-framed building at a job site, and uploading the video recording, via a mobile computing system, to a job-specific project folder maintained on the network database as part of certifying that fire protection spray services have been actually delivered to the wood-framed building.

FIG. 49A shows the video recording of fire-inhibiting liquid spraying raw and treated lumber, and sheathing on wood-framed assemblies, during construction phase of a wood-framed building at a job site, using a small digital video camera module 117X mounted on the spray gun 101D (or head or body of the spray technician). The digital video camera module 117X might be a suitably adapted GOPRO® Hero™ camera system, or any commercially available digital video camera module 117X interfaced with the mobile computing system 117 carried by the spray technician. The video recording will be uploaded from module 117X to a job-specific project folder maintained on the network database as part of certifying that fire protection spray services have been actually delivered to the wood-framed building. The fire protection certification process of the present invention will be described in great detail hereinafter with respect to the processes and technology illustrated and described in FIGS. 64 through 67L.

Figure 50A:
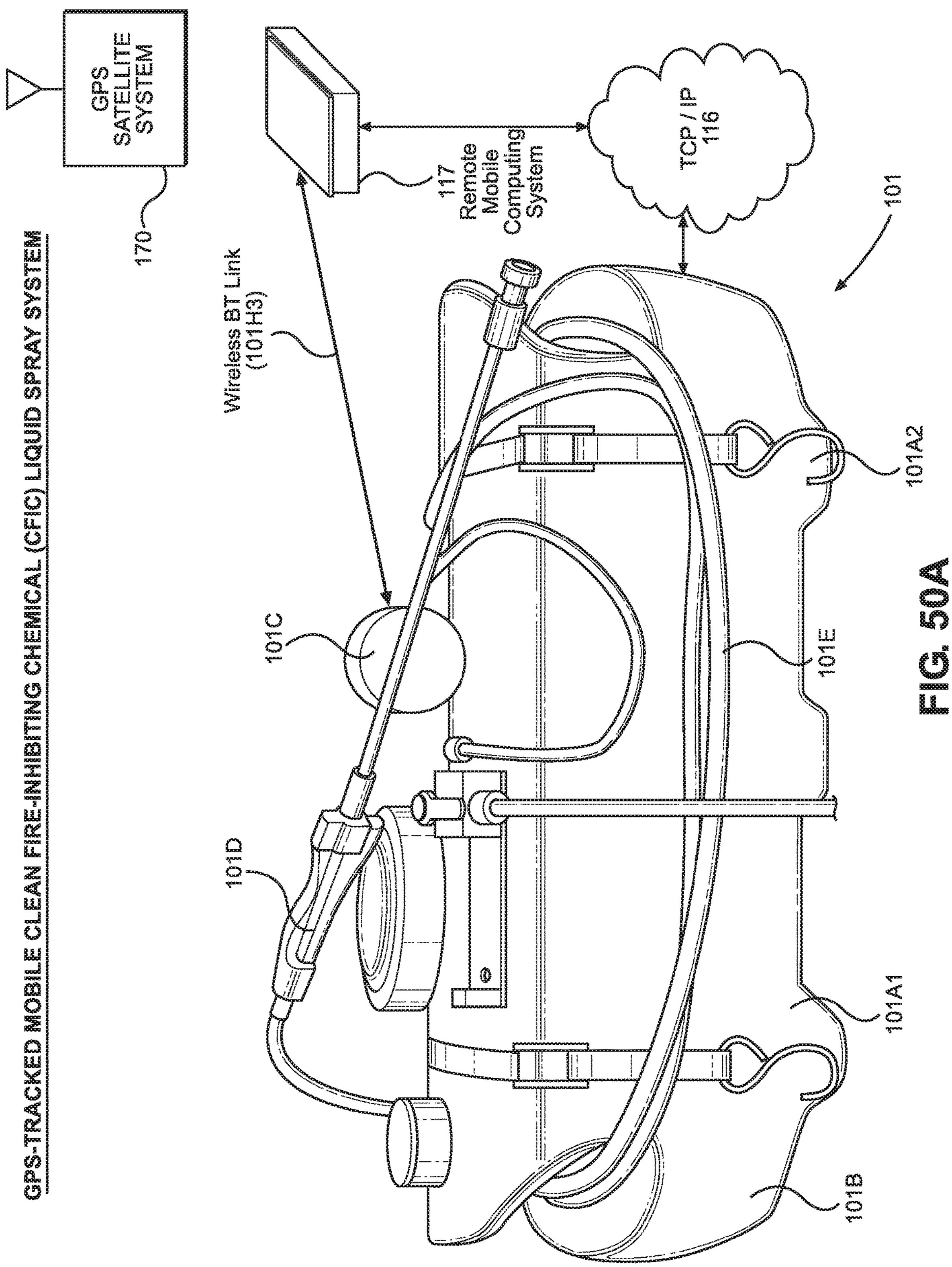
FIG. 50A is a perspective view of a mobile GPS-tracked CFIC liquid spraying system supported on a set of wheels, with integrated supply tank and rechargeable-battery operated electric spray pump, for deployment at private and public properties having building structures, for spraying the same with CFIC liquid in accordance with the principles of the present invention.

Specification of the Mobile GPS-Tracked CFIC Spraying System of the Present Invention FIG. 50A shows a mobile GPS-tracked CFIC liquid spraying system 101 supported on a set of wheels 101A, having an integrated supply tank 101B and rechargeable-battery operated electric spray pump 101C, for deployment at private and public properties having building structures, for spraying the same with environmentally-clean fire inhibiting chemical (CFIC) liquid using a spray nozzle assembly 101D connected to the spray pump 101C by way of a flexible 101E.

Figure 50B:
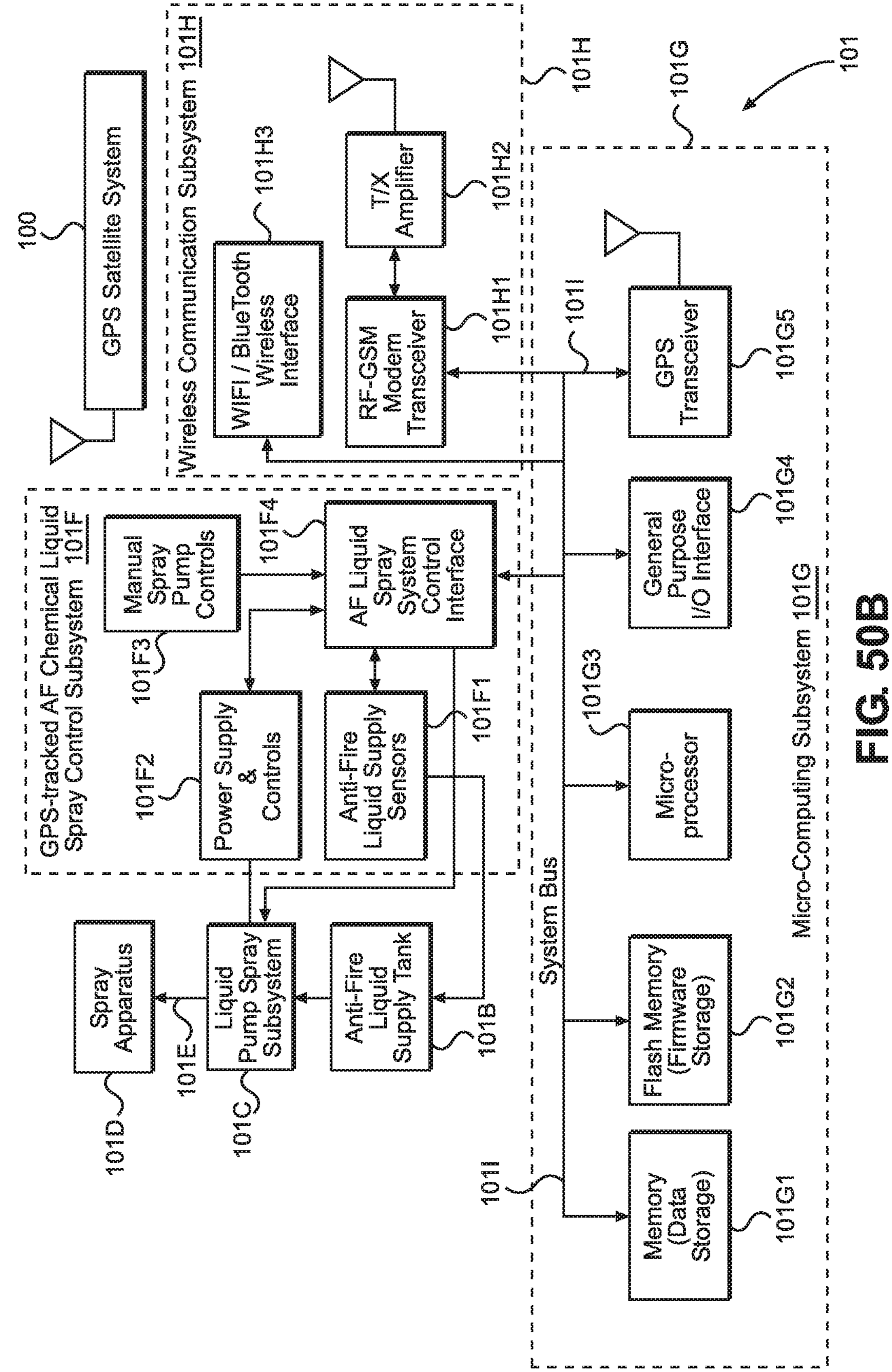
FIG. 50B is a schematic representation of the GPS-tracked mobile CFIC liquid spraying system shown in FIG. 50A, comprising a GPS-tracked and remotely-monitored CFIC liquid spray control subsystem interfaced with a micro-computing platform for monitoring the spraying of CFIC liquid from the system when located at specific GPS-indexed location coordinates, and automatically logging and recording such CFIC liquid spray application operations within the network database system.

FIG. 50B shows the GPS-tracked mobile anti-fire liquid spraying system 101 of FIG. 50A as comprising a number of subcomponents, namely: a GPS-tracked and remotely-monitored AF chemical liquid spray control subsystem 101F; a micro-computing platform or subsystem 101G interfaced with the GPS-tracked and remotely-monitored AF chemical liquid spray control subsystem 101F by way of a system bus 1011; and a wireless communication subsystem 101H interfaced to the micro-computing platform 101G via the system bus 201. As configured, the GPS-tracked mobile CFIC liquid spraying system 2101 enables and supports (i) the remote monitoring of the spraying of CFIC liquid from the system 101 when located at specific GPS-indexed location coordinates, and (ii) the logging of all such GPS-indexed spray application operations, and recording the data transactions thereof within a local database maintained within the micro-computing platform 101G, as well as in the remote network database 9C1 maintained at the data center 110 of the system network 109.

As shown in FIG. 50B, the micro-computing platform 101G comprises: data storage memory 2101G1; flash memory (firmware storage) 2101G2; a programmable microprocessor 2101G3; a general purpose I/O (GPIO) interface 101G4; a GPS transceiver circuit/chip with matched antenna structure 2101G5; and the system bus 1011 which interfaces these components together and provides the necessary addressing, data and control signal pathways supported within the system 101.

As shown in FIG. 50B, the wireless communication subsystem 101H comprises: an RF-GSM modem transceiver 101H1; a T/X amplifier 101H2 interfaced with the RF-GSM modem transceiver 101H1; and a WIFI and Bluetooth wireless interfaces 101H3.

As shown in FIG. 50B, the GPS-tracked and remotely-controllable CFIC liquid spray control subsystem 101F comprises: anti-fire chemical liquid supply sensor(s) 101F1 installed in or on the anti-fire chemical liquid supply tank 101B to produce an electrical signal indicative of the volume or percentage of the CFIC liquid supply tank containing CFIC liquid at any instant in time, and providing such signals to the CFIC liquid spray system control interface 101F4; a power supply and controls 101F2 interfaced with the liquid pump spray subsystem 101C, and also the CFIC liquid spray system control interface 101F4; manually-operated spray pump controls interface 101F3, interfaced with the CFIC liquid spray system control interface 101F4; and the CFIC liquid spray system control interface 101F4 interfaced with the micro-computing subsystem 101G, via the system bus 1011. The flash memory storage 101G2 contains microcode that represents a control program that runs on the microprocessor 101G3 and realizes the various GPS-specified CFIC chemical liquid spray control, monitoring, data logging and management functions supported by the system 101.

In the preferred embodiment, the CFIC liquid is preferably Hartindo AF31 Total Fire Inhibitor, developed by Hartindo Chemicatama Industri of Jakarta, Indonesia, and commercially-available from Newstar Chemicals (M) SDN. BHD of Selangor Darul Ehsan, Malaysia, http://newstarchemicals.com/products.html. When so treated, combustible products will prevent flames from spreading, and confine fire to the ignition source which can be readily extinguished, or go out by itself. In the presence of a flame, the chemical molecules in both dry and wet coatings, formed with Hartindo AF31 liquid, interferes with the free radicals (H+, OH—, O) involved in the free-radical chemical reactions within the combustion phase of a fire, and breaks these free-radical chemical reactions and extinguishes the fire's flames.

Figure 51A:
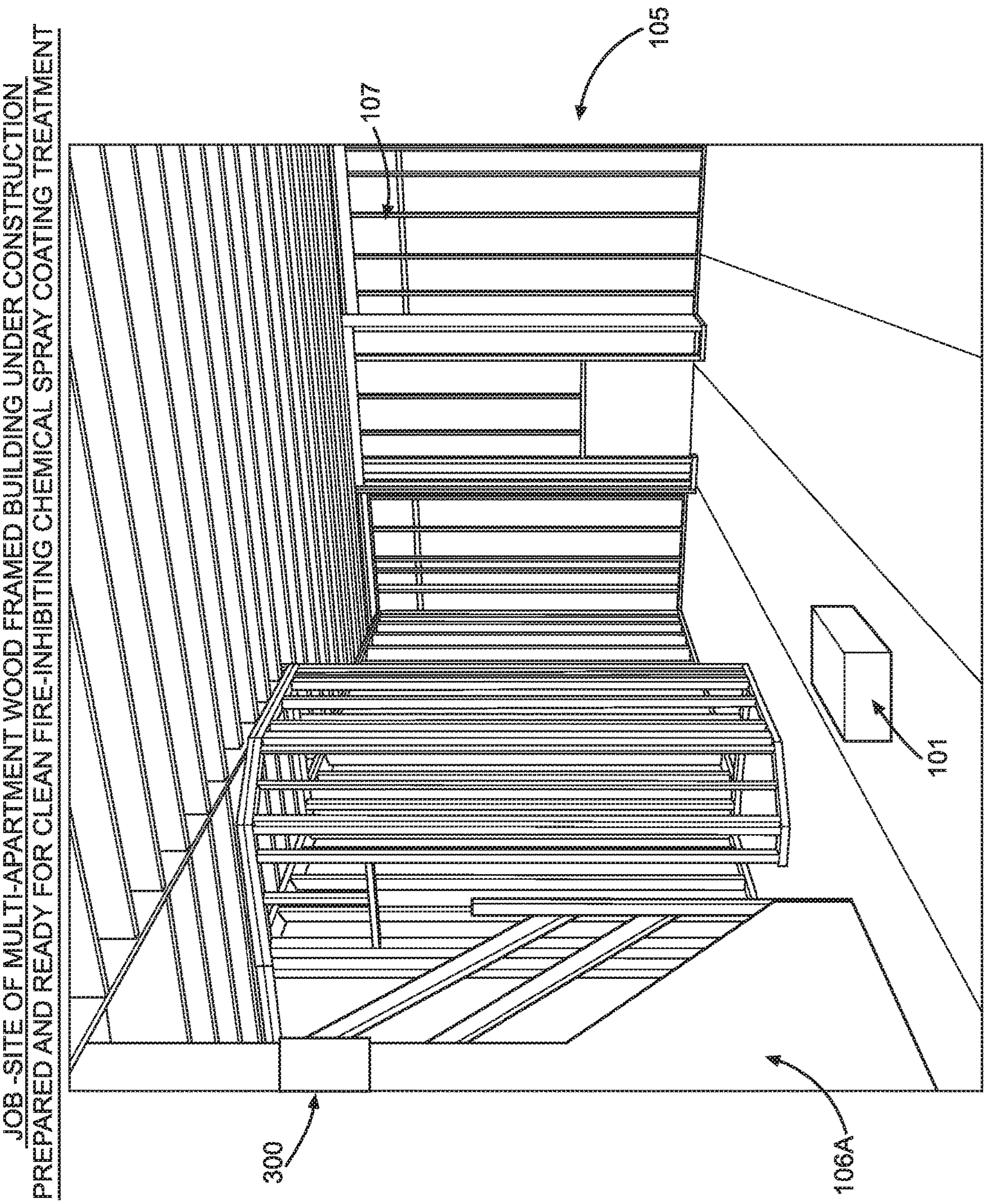
FIG. 51A is a perspective view of a first job-site of multi-apartment wood-framed building under construction prepared and ready for clean fire inhibiting chemical (CFIC) liquid spray coating treatment applied in accordance with the principles of the present invention.
Figure 51B:
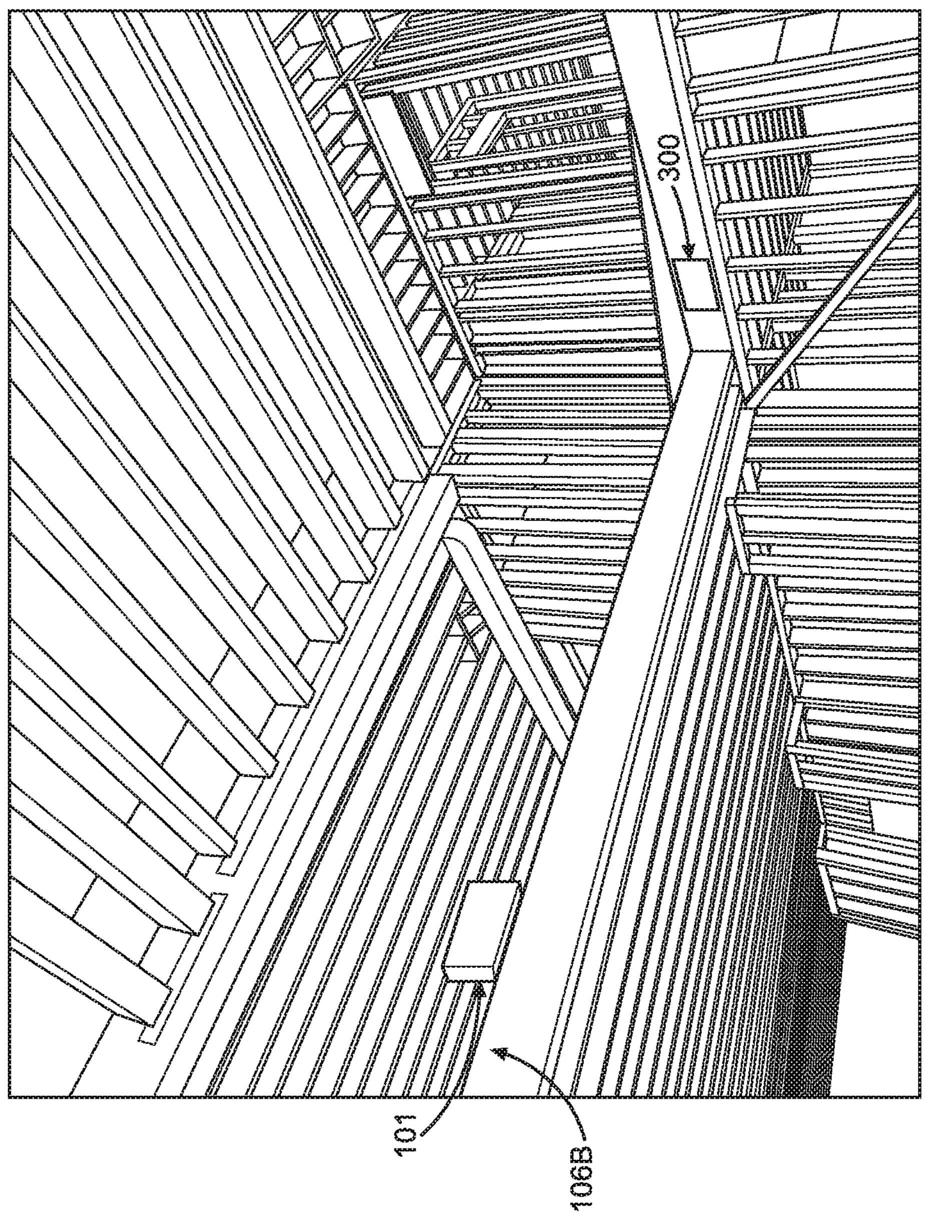
FIG. 51B is a perspective view of a second job-site of multi-apartment wood-framed building under construction prepared and ready for clean fire inhibiting chemical (CFIC) liquid spray coating treatment applied in accordance with the principles of the present invention.

In general, any commercially-grade airless liquid spraying system may be used and adapted to construct the GPS-tracked mobile system 101 for spraying Class-A fire-protective liquid coatings on wood-framed building construction sites, and practice the method and system of the present invention, with excellent results. Many different kinds of commercial spray coating systems may be used to practice the present invention, and each may employ an electric motor or air-compressor to drive its liquid pump. For purposes of illustration only, the following commercial spray systems are identified as follows: the Xtreme XL™ Electric Airless Spray System available from Graco, Inc. of Minneapolis, MN; and the Binks MX412 Air-Assisted/Compressor-Driven Airless Spray System from Carlisle Fluid Technologies, of Scottsdale, AZ Countless on-site locations will exist having various sizes and configurations requiring the on-job-site spray-based fire-protection method of the present invention. FIG. 51A illustrates a first job-site of multi-apartment wood-framed building under construction prepared and ready for clean fire inhibiting chemical spray coating treatment in accordance with the principles of the present invention. FIG. 51B illustrates a second job-site of multi-apartment wood-framed building under construction prepared and ready for clean fire inhibiting chemical spray coating treatment in accordance with the principles of the present invention.

The on-job-site spray method and system involves spraying a clean fire inhibiting chemical (CFIC) liquid on all new construction lumber and sheathing to prevent fire ignition and flame spread. The method also recommends spraying exterior walls or the exterior face of the roof, wall and floor sheathing with CFIC liquid. The method further recommends that factory-applied fire-protective lumber be used on exterior walls, and fire-protected sheathing be used on the exterior face of the roof, wall and floor sheathing, as it offers extra UV and moisture protection. As disclosed herein, there are many different options available to architects and builders to meet such requirements within the scope and spirit of the present invention disclosed herein.

In the illustrative embodiment, Hartindo AF31 Total Fire Inhibitor (from Hartindo Chemicatama Industri of Jakarta, Indonesia http://hartindo.co.id, or its distributor Newstar Chemicals of Malaysia) is used as the CFIC liquid 101C to spray-deposit the CFIC surface coating onto treated wood/lumber and sheathing products inside the wood-framed building under construction. A liquid dye of a preferred color from Sun Chemical Corporation http://www.sunchemical-.com can be added to Hartindo AF31 liquid to help the spray technicians visually track where CFIC liquid has been sprayed on wood surfaces during the method of treatment. The clinging agent in this CFIC liquid formulation (i.e. Hartindo AF31 liquid) enables its chemical molecules to cling to the surface of the CFIC-coated wood so that it is quick to defend and break the combustion phase of fires (i.e. interfere with the free radicals driving combustion) during construction and before drywall and sprinklers can offer any defense against fire. However, a polymer liquid binder, available from many manufacturers (e.g. BASF, Polycarb, Inc.) can be added as additional cling agent to Hartindo AF31 liquid, in a proportion of 1-10% by volume to 99-90% Hartindo AF31 liquid, so as to improve the cling factor of the CFIC liquid when being sprayed in high humidity job-site environments. Alternatively, liquid DecTan Chemical from Hartindo Chemicatama Industri, which contains a mixture of vinyl acrylic copolymer and tannic acid, can be used a cling agent as well when mixed the same proportions, as well as an additional UV and moisture defense on exterior applications. These proportions can be adjusted as required to achieve the cling factor required in any given building environment where the spray coating method of the present invention is being practiced. This way, in the presence of a flame, the chemical molecules in the CFIC-coating on the surface of the fire-protected lumber, interfere with the chemical reactions involving the free radicals (H+, OH—, O—) produced during the combustion phase of a fire, and break the fire's chemical reaction and extinguish its flame. This is a primary fire suppression mechanism deployed or rather implemented by the CFIC-coatings deposited on wood surfaces in accordance with the various principles of invention, disclosed and taught herein.

Specification of Method of Producing Multi-Story Wood-Framed Buildings Having Class-A Fire-Protection and Improved Resistance Against Total Fire Destruction FIGS. 52A and 52B, taken together, set forth a high-level for chart describing the steps carried out when practicing the method of producing multi-story wood-framed buildings having improved fire resistance rating and protection against total fire destruction. The method comprises a series of steps described below which effectively results in the coating of substantially all exposed interior wood surfaces of the raw untreated as well as fire-treated lumber and sheathing used during the construction phase of the wood-framed building, to protect and defend its wood, lumber and sheathing from ravage of fire and prevent total destruction by fire. The method recommends use of (i) the fire-protected OSB sheathing shown in FIGS. 30 through 32 and described herein for the exterior face of the roof, wall and floor sheathing, and (ii) the fire-protected lumber products shown in FIGS. 18-21, 22-25, and 26-29, and described herein for interior and exterior wall studs, trusses, sills, and other wood-frame related building structures.

The spray-coating fire-treatment process of the present invention may be carried out as follows. Spray-coating technicians (i) appear on the new construction job-site after each floor (i.e. wood-framed building section) has been constructed with wood framing and sheathing; (ii) spray liquid CFIC solution over substantially all of the exposed interior surfaces of the wood, lumber and sheathing used in the completed wood-framed building section; then (iii) certify that each such wood-framed building section has been properly spray-coat protected with CFIC liquid chemicals in accordance with the principles of the present invention, and (iv) use the carbon-quantization engine 500 to compute the fire-protected carbon units (FPCUs) for each completed and Class-fire-protected wood-framed building section, or mass timber building section, in a wood-framed or mass timber building under construction. Details of this method will be described in greater detail below in a step-by-step manner.

As indicated at Block A in FIG. 52A, the first step of the method involves fire-protection spray-coating technician to receives a request from a builder to spray a clean fire inhibiting chemical (CFIC) liquid coating over substantially all exposed interior surfaces of the untreated and/or treated wood lumber and sheathing used to construct a completed wood-framed section of a building under construction at a particular site location. This order could come in the form of a written work order, and email message, or other form of communication, with appropriate documentation.

As indicated at Block B in FIG. 52A, the second step of the method involves the fire-protection spray-coating technician (i) receiving building construction specifications from the builder, architect and/or building owner, (ii) analyzing same to determine the square footage of clean fire inhibiting chemical (CFIC) liquid coating to be spray applied to the interior surfaces of the wood-frame building, (iii) computing the quantity of clean fire inhibiting chemical material required to do the spray job satisfactorily, and (iv) generating a price quote for the spray job and sending the quote to the builder for review and approval.

As indicated at Block C in FIG. 52A, the third step of the method involves, after the builder accepts the price quote, the builder orders the clean fire-protection spray team to begin performing the on-site wood coating spray job in accordance with the building construction schedule.

As indicated at Block D in FIG. 52A, the fourth step of the method involves, after the builder completes each completed section of wood framing with wood sheathing installed, but before any wallboard has been installed, the spray technician (i) procures a supply of clean fire-protection chemicals (CFIC) liquid solution, (ii) fills the reservoir tank of an airless liquid spraying system with the supply of CFIC liquid, and (iii) then uses a spray gun to spray CFIC liquid in the reservoir tank, over all exposed interior wood surfaces of the completed section of the wood-framed building under construction. FIGS. 49 and 50 show an air-less liquid spraying system 101 for spraying CFIC liquid over all exposed interior surfaces of lumber and wood sheathing used in a completed section of the wood-framed building under construction, so as to form a Class-A fire-protective coating over such treated surfaces.

Figure 53:
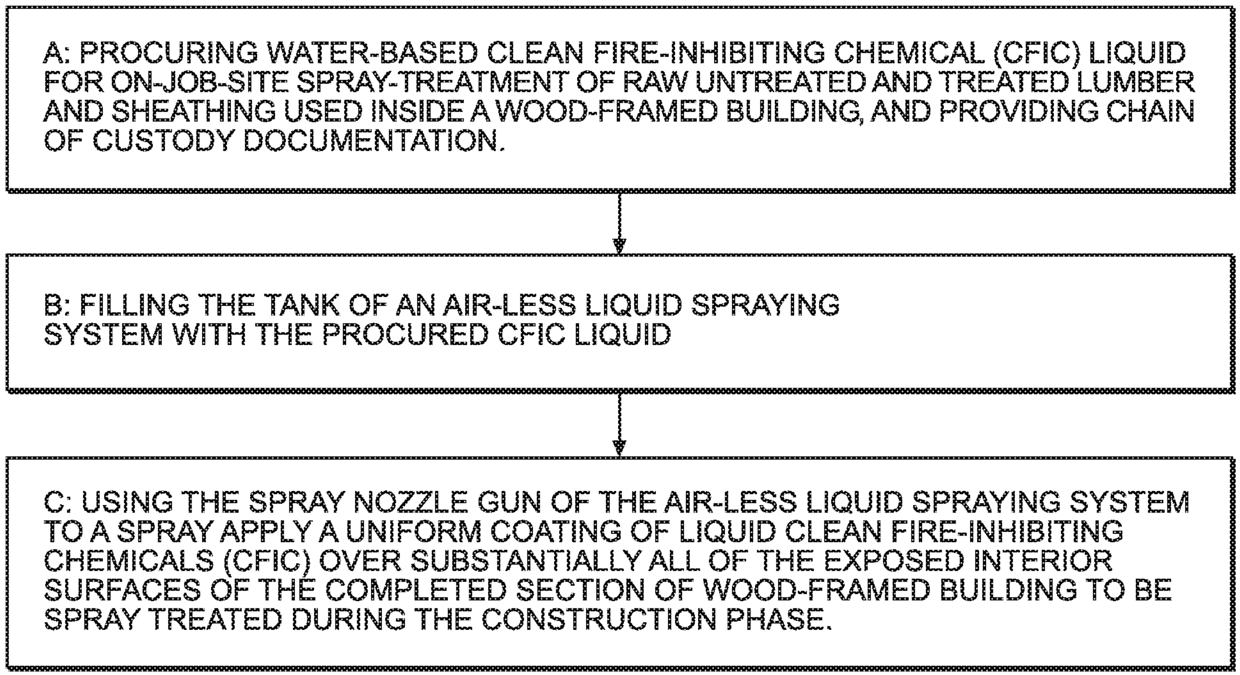
FIG. 53 is a method of operating an air-less liquid spraying system, shown in FIGS. 49 and 50, so that clean fire inhibiting chemical (CFIC) liquid is sprayed as a fire-protective liquid coating over all exposed interior surfaces of lumber and sheathing used in a completed section of the wood-framed building under construction, wherein the method comprises the steps of (a) procuring clean fire inhibiting chemical (CFIC) liquid, (b) shipping the CFIC liquid to its destination on a specified job site location, (c) loading the water-based CFIC liquid into the reservoir tank of an air-less liquid spraying system, and (d) using a spray nozzle operably connected to the air-less liquid spraying system to a spray apply a coating of CFIC liquid over all of the interior surfaces of the section of wood-framed building to be spray treated at any given phase of building construction.

As indicated at Block A in FIG. 53, the first stage of this step involves procuring water-based CFIC liquid for on-job-site spray-treatment of raw untreated and treated lumber and sheathing used inside a wood-framed building. In the preferred embodiment, Hartindo AF31 from Hartindo Chemicatama Industri (and available from its distributor Newstar Chemical of Malaysia) is used as the CFIC liquid employed by the method of the present invention. Hartindo AF31 CFIC is an environmentally-friendly water-based, biodegradable and non-toxic solution that is non-ozone depleting and does not require cleanup procedures after usage. Hartindo AF31 CFIC is also effective for all classes of fires: involving solid, carbonaceous materials; flammable fuels, thinners, etc.; gas, electricity fires, and energy fires; and metal fire and oxidizing fires.

As indicated at Block B in FIG. 53, the second stage of this step involves filling the tank of the air-less liquid spraying system 101 with the procured supply of CFIC liquid.

As indicated at Block C in FIG. 53, the third stage of this step involves using the spray nozzle gun 103 of the air-less liquid spraying system 101 as shown in FIGS. 49 and 50, to a spray apply a uniform coating of liquid clean fire inhibiting chemical (CFIC) liquid over all of the interior surfaces of the completed section of wood-framed building being spray treated during the construction phase of the building, in accordance with the principles of the present invention. In the illustrative embodiment, the liquid CIFC (i.e. Hartindo AF31) is applied at a rate (i.e. coating coverage density) of about 590 square feet per gallon, although it is understood that this rate may vary from illustrative embodiment, to illustrative embodiment.

The CFIC liquid used in the present invention clings to the wood on which it is sprayed, and its molecules combine with the (H+, OH—, O—) free radicals in the presence of fire, during combustion, to eliminate this leg of the fire triangle so that fire cannot exist in the presence of such a CFIC based coating.

FIGS. 51A and 51B shows a few illustrative examples of building construction job site locations where the spray-based fire protective method of the present invention might be practiced with excellent results. It is understood that such examples are merely illustrative, and no way limiting with regard to the present invention.

As indicated at Block E in FIG. 52B, during the fifth step of the method, when the completed section of the building has been spray coated with clean fire inhibiting chemical (CFIC) liquid, the completed building section is certified and marked as certified for visual inspection and insurance documentation purposes, as well as fire-protected carbon unit (FPCU) quantization and labeling using the carbon quantization engine 500 over the network 100. Such marking can involving stamping a CFIC spray-coated sheath, or lumber board, with a seal or certificate using an indelible ink, with date, job ID #, sprayer #, and other information related to specific spray-coat fire-protection job that have been certified as a completed at that wood-framed building section. Preferably, the architectural plans for the building, as well as building schematics used on the job site, will have building section identification numbers or codes, which will be used on the certificate of completion stamped onto the spray-coated fire-protected sheathing and lumber on the job site.

As part of the certification process, an on-job-site spray project information sheet is maintained in an electronic database system, connected to a wireless portable data entry and record maintenance system. The on-job-site spray project information sheet would contain numerous basic information items, including, for example: Date; Customer Name; Weather Description and Temperature; Building Address; Customer Address: Customer Supervisor; Units of Part of the Building Sprayed; Sprayer Used; Spray Technician Supervisor; and Notes. Photographic and video recordings can also be made and stored in a database as part of the certification program, as will be described in greater detail below.

As indicated at Block F in FIG. 52B, during sixth step of the method, as each section of the wood-framed building is constructed according to the construction schedule, the spray coating team continues to spray coat the completed section, and certify and mark as certified each such completed spray coated section of the building under construction.

As indicated at Block G in FIG. 52B, during the seventh step of the method, when all sections of the building under construction have been completely spray coated with clean fire inhibiting chemical (CFIC) materials, suppressing fire ignition and suppression by capturing free radicals (H+, OH—, O—) during the combustion phase, and certified as such, the spray technicians remove the spray equipment from the building, and the builder proceeds to the next stages of construction and completes the building construction according to architectural and building plans and specifications.

As indicated at Block H in FIG. 52B, during the eighth step of the method, the spray technician then issues a certificate of completion with respect to the application of clean fire-protection chemicals to all exposed wood surfaces on the interior of the wood-framed building during its construction phase, thereby protecting the building from risk of total destruction by fire. Preferably, the certificate of completion should bear the seal and signature of a professional engineer (PE) and the building architect who have been overseeing and inspecting the building construction project.

As indicated at Block I in FIG. 52B, during the ninth step of the method, before applying gypsum board and/or other wall board covering over the fire-protected spray-coated wood-framed building section 105, digital photographs and/or videos are captured and collected to visually show certificates of completion stamped or otherwise posted on spray-coated fire-protected sheeting and/or lumber used in the wood framing of each completed building section. Such photographs and videos will provide valuable visual evidence and job-site completion documentation, required or desired by insurance companies and/or government building departments and/or safety agencies.

As indicated at Block J in FIG. 52B, during the tenth step of the method, uploading captured digital photographs and videos collected during Block I, to a centralized web-based information server (111, 113) maintained by the fire-protection spray coating technician company, or its agent, as a valued-added service provided for the benefit of the builder, property owner and insurance companies involved in the building construction project.

As indicated at Block K in FIG. 52B, during the eleventh step of the method, all photographic and video records collected during Block I, and uploaded to the centralized web-based information server (111, 113) at Block J are automatically archived indefinitely for best practice and legal compliance purposes.

Figure 54:
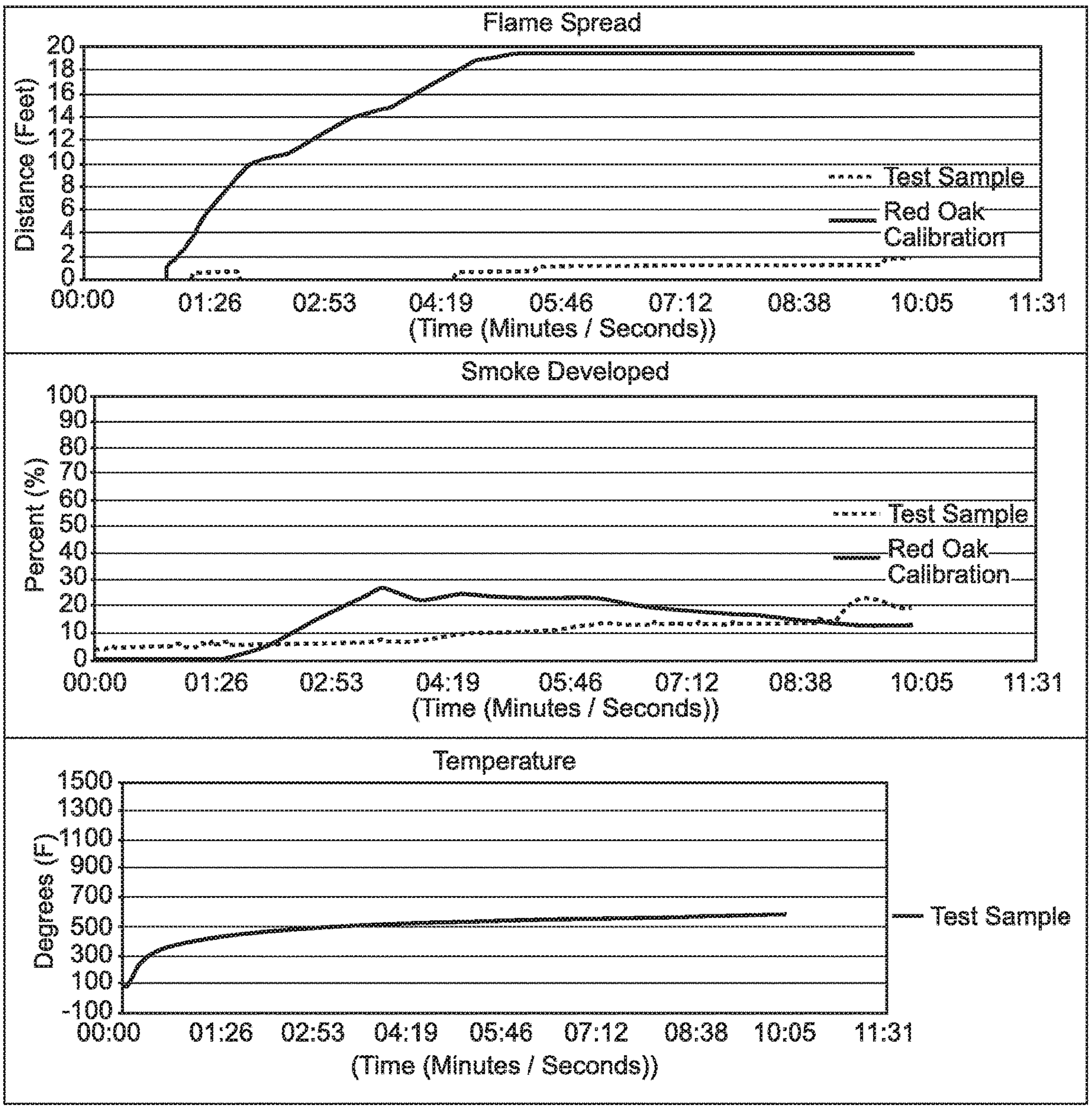
FIG. 54 shows a schematic table representation illustrating the flame spread and smoke development indices obtained through testing of on-job-site CFIC spray-treated Class-A fire-protected carbon-quantized lumber and sheathing produced using the method of the illustrative embodiment described in FIGS. 45 through 49, and tested in accordance with standard ASTM E2768-1.

FIG. 54 shows a schematic table representation illustrating the flame spread and smoke development indices obtained through testing of on-job-site Hartindo AF31 spray-treated lumber and sheathing produced using the method of the illustrative embodiment described in FIGS. 49 through 53, in accordance with ASTM E2768-1.

Advantages and Benefits of the On-Job-Site Method of Wood-Treatment and Fire-Protection by Way of Spray Coating of CFIC Liquid Over the Surface of Exposed Interior and Exterior Wood Used in Wood-Framed Buildings The on-site spray coating method of the present invention described above involves the use of CFIC liquid having the property of clinging onto the surface of the wood to which it is applied during on-job-site spray-coating operations, and then inhibiting the ignition of a fire and its progression by interfering with the free-radicals (H+, OH—, O—) involved in the combustion phase of any fire. Hartindo AF31 liquid fire inhibitor meets these design requirements.

In general, CFIC liquids that may be used to practice the on-site fire-protection method of the present invention suppresses fire by breaking free radical (H+, OH—, O—) chemical reactions occurring within the combustion phase of fire, quickly and effectively suppressing fire in a most effective manner, while satisfying strict design requirements during the construction phase of a wood-framed building construction project. At the same time, the spray-based method of wood treatment and fire-protection will not degrade the strength of the wood materials (i.e. Modulus of Elasticity (MOE) and the Modulus of Rupture (MOR)) when treated with the CFIC-based liquid spray chemicals applied during the method of treatment.

The on-site wood lumber/sheathing spraying method of the present invention overcomes the many problems associated with pressure-treated fire retardant treated (FRT) lumber, namely: "acid hydrolysis" also known as "acid catalyzed dehydration" caused by FRT chemicals; significant losses in the Modulus of Elasticity (MOE), the Modulus of Rupture (MOR) and impact resistance of pressure-treated wood.

Internet-Based Cloud-Based System for Verifying and Documenting Class-A Fire-Protection Treatment of a Wood-Framed Building Using On-Site Spraying of a Clean Fire Inhibiting Chemical (CFIC) Liquid To provide added-value to all customers and stakeholders, an enterprise-level software system is supported by the system network 100 and provided for use in ordering, delivering, managing and documenting the job site fire-protection spray service of the present invention on wood-framed and mass-timber building construction sites, all around the world. This enterprise-level mobile software system will support the deployment of thousands of mobile computing systems across any commercial enterprise. Each mobile computing system 120 will run the mobile application ("mobile app") 117 (of the configured for the particular roles to be supported by each registered system user. In general, the stakeholders in the m-fire system will include: Property Owners; Financial Institutions; Building Construction Managers; Job Site Construction Managers; General Contractors (optional); Building; Architects; Building Tenants; Sales Representatives; Logistics Coordinators; Supply Chain Managers; Job Site Spray Managers; Job Site Spray Technicians; Construction Insurance Underwriters; Property/Building Insurance Underwriters; Risk Engineering Managers; Fire Departments; Police Departments; and Building Inspectors The enterprise-level software system comprises an integration of software modules: a financial accounting modules supporting a general ledger system (GLS), an accounts receivables system (ARS) and an accounts payable system (APS). The system will also have an enterprise resource planning (ERP) module supporting manufacturing and service operations and a customer relationship management (CRM) system supporting the development of new customer relationships and maintaining existing ones.

FIG. 55 shows the Internet-based (i.e. cloud-based) system 100 depicted in FIG. 6 for verifying and documenting Class-A fire-protection treatment and carbon-quantization of a wood-framed or mass timber building using on-site spraying of a clean fire inhibiting chemical (CFIC) liquid, as described in FIGS. 49 through 54. As shown in FIG. 54, the system 100 comprises: (i) data center 110 with web servers 111, application servers 112 and database servers 113, with SMS servers 114 and email message servers 115, each operably connected to the TCP/IP infrastructure 114 of the Internet 116 for supporting a web-based site for hosting images/videos of certificates of completion 119 stamped or printed on spray-treated wood surfaces, at registered inspection checkpoints, often with other certification documents; (ii) mobile computing systems 117 (117A, 117B, 117C) and 137 (137A, 137B, 137C) including smart-phones such as the Apple iPhone and Samsung Android phone with or without head/body mounting apparatus, with either a mobile application 120 installed, and a web-browser application, as discussed further hereinafter; (iii) job sites 111A, 111B with wood-framed building under construction and/or mass timber buildings under construction; and (iv) Clean Fire Inhibiting Chemical (CFIC) Factory (i.e. Manufacturing) Systems 140 deployed around the planet, and connected to the infrastructure of the Internet and various product shipment and transportation systems (e.g. FEDEX, etc). In other applications, GOPRO® Hero™ Mobile Camera System, and other wireless networking apparatus, can be used to practice the method of the present invention.

In the preferred embodiment, each mobile computing system 117 is configured for: (i) capturing digital photographs and video recordings of completed spray-treated wood-framed sections with barcoded/RFID-tagged certificates of inspection 300 posted in buildings under construction 118 (118A, 118B, 118C), as illustrated in FIGS. 51A and 51B, upon completion of the on-site fire-protection spray process at specific building sections; (ii) recording notes and averments by the spray technicians who applied the CFIC liquid spray and supervisors who supervised the same; and (iii) uploading such time-date-stamped digital audio-video (AV) recordings and 121 to the servers 111, 112, 113 in the data center 110, providing documented evidence of barcoded/RFID-tagged certificates of inspection (at inspection checkpoints) 300 stamped/printed or otherwise posted on the surfaces of sprayed wood surfaces, for each fire-protection spray-treatment project, so that insurance companies, builders, and other stakeholders (who are registered users of the system) can access and review such on-site spray completion certifications during and after the construction phase of a wood-framed building, for various purposes.

In general, each barcoded/RFID certificate of inspection 300 comprises a barcode symbol structure 300A, an RFID-tag (e.g. UHF class) 300B, a plastic substrate 300C on which the barcode symbol 300A and RFID-tag 300B are mounted, spray certifications and spray verifications 300D, and a spray project identification profile 300E. The plastic substrate 300C can be realized as a molded plastic plate, or flexible extruded sheet. The barcode symbol 300A and UHF RFID tag 300B may be integrated into a single structure, or realized separately, as the case may be. The barcode/RFID-tag structure 300A/300B can be mounted to the substrate 300C using an adhesive or other mounting means.

In general, various kinds of barcode symbol and RFID-tag technologies can be used to realize the barcoded/RFID-tagged certificates of inspection 300 posted in buildings under construction 118 (118A, 118B, 118C). Various RFID-labels and RFID-tags 300B, and barcode labels 300A are available from Zebra Technologies, Inc., Holtsville, NY Also, Zebra Technologies provides hand-held mobile computers 117, wearable computers 117, vehicle-mounted computers 117, tablets and hand-held RFID readers (i.e. mobile computing devices 117), and barcode symbol, RFID-label and RFID-tag printers 117A, and RFID-tag readers (i.e. scanners) 117A shown in FIGS. 64 and 76, for use in practicing the principles of the present invention disclosed herein.

As shown in FIG. 55, the system network 100 also includes a GPS satellite system 170 for transmitting GPS reference signals transmitted from a constellation of GPS satellites deployed in orbit around the Earth, to GPS transceivers installed aboard each GPS-tracking mobile image capturing and computing system 117, as part of the illustrative embodiments. From the GPS signals it receives, each GPS transceiver is capable of computing in real-time the GPS location of its host system, in terms of longitude and latitude. In the case of the Empire State Building in NYC, NY, its GPS location is specified as: N40° 44.9064', W073° 59.0735'; and in number only format, as: 40.748440, −73.984559, with the first number indicating latitude, and the second number representing longitude (the minus sign indicates "west").

Figure 56A:
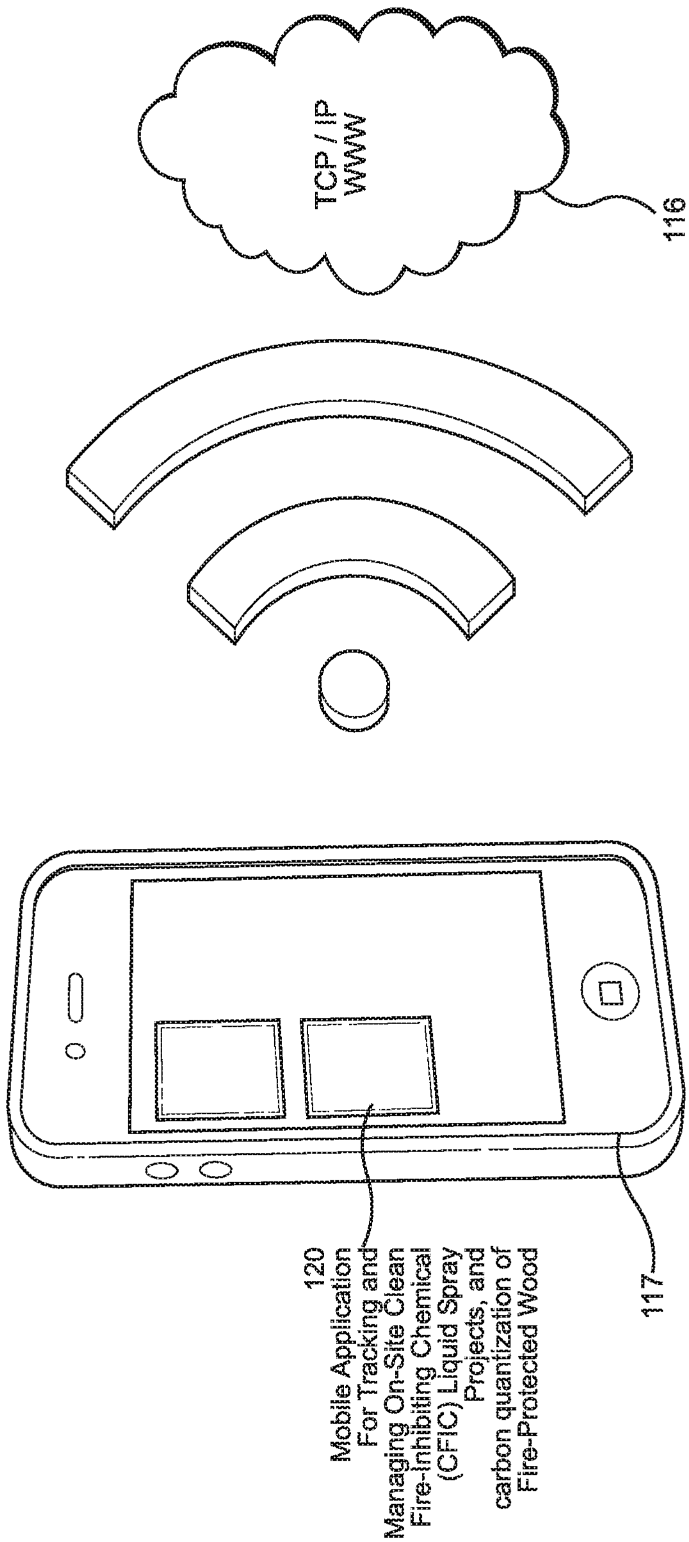
FIG. 56A is perspective view of a mobile client computing system used in the system shown in FIG. 55, supporting a mobile application installed on the mobile computing system for the purpose of tracking and managing projects involving on-site clean fire inhibiting chemical (CFIC) liquid spray treatment of carbon-quantized wood-framed buildings during the construction phase so as to ensure Class-A fire-protection of the wood employed therein.

FIG. 56A shows the mobile client computing system 117 (117A, 117B, 117C) deployed on the system network 100 shown in FIG. 55, supporting the mobile application 120 installed on each mobile computing system 117. The purpose of the mobile application 120 is to provide the mobile computing system 117 with a convenient tool for tracking and managing projects involving on-site clean fire inhibiting chemical (CFIC) liquid spray treatment of wood-framed buildings during the construction phase, and the logistics associated therewith, to ensure the provision of Class-A fire-protection of all exposed interior wood surfaces in the wood-framed building. All stakeholders (e.g. building owners, architects, builders, property insurance underwriters, local fire departments and firemen, and others such as project coordinators, spray technicians, site superintendents, site spray managers and others who are involved in the logistics, management and application of CFIC liquid spray onto and over all exposed interior surfaces of the building) will benefit from the system network 100 and its deployed mobile application 120, and the services it supports across the enterprise.

Using the custom-designed mobile application 120, property/building owners, architects, builders, insurance companies and other stakeholders can (i) track the progress being made while a wood-framed building is being spray-treated with CFIC liquid during the construction project schedule, and (ii) review all collected pdf documents, digital images and audio-video recordings collected as visual evidence of "certificates of completion" by trained personnel, at predetermined inspection checkpoints in the wood-framed building, during the course of the construction project.

The purpose of such digital evidence, collected on-site at each inspection checkpoint and remotely stored in the network database 113A, is to verify and document proper application of CFIC liquid spray to each indexed inspection checkpoint designated at the commencement of the Project, and located throughout the interior of the wood-framed building to ensure that 100% of all exposed interior surfaces within the wood-framed building have been provided with Class-A fire-protection.

Preferably, each inspection checkpoint will be identified by Project ID # with a unique coding to identify the Building #, Floor #, Section #, and optionally Panel # at which the inspection checkpoint is located, and where certificates of completion (for the specified section) will be stamped, signed and AV-recorded, and actual wood samples sprayed with CFIC liquid at the time of the certified spray application are AV-recorded and collected and archived for verification and documentation purposes. The AV-recording of certifications made at each registered inspection checkpoint in the wood-framed building should help to ensure that Class-A fire-protected wood-samples will be available in the future in the event there might be a need to investigate the Class-A fire-protection spray treatment process.

Specification of the Network Architecture of the System Network of the Present Invention FIG. 55 illustrates the network architecture of the system network of the present invention 100 for the case where the system of the present invention is implemented as a stand-alone platform deployed on the Internet.

As shown in FIG. 55, the Internet-based system network comprises: cellular phone and SMS messaging systems 122A; email servers 122B; a network of mobile computing systems 117 (117A, 117B) running enterprise-level mobile application software; and one or more industrial-strength data center(s) 110, preferably mirrored with each other and running Border Gateway Protocol (BGP) between its router gateways.

As shown in FIG. 55, each data center 110 comprises: a cluster of communication servers 111 for supporting http and other TCP/IP based communication protocols on the Internet (and hosting Web sites); a cluster of application servers 112; a cluster of RDBMS servers 113 configured within a distributed file storage and retrieval ecosystem/system, and interfaced around the TCP/IP infrastructure of the Internet well known in the art; an SMS gateway server 114 supporting integrated email and SMS messaging, handling and processing services that enable flexible messaging across the system network, supporting push notifications; and a cluster of email processing servers 115.

Referring to FIG. 55, the cluster of communication servers 111 is accessed by web-enabled clients (e.g. smart phones, wireless tablet computers, desktop computers, computer workstations, etc.) 117 (117A, 117B) used by stakeholders accessing services supported by the system network. The cluster of application servers 112 implement many core and compositional object-oriented software modules supporting the system network 100. The cluster of RDBMS servers 113 use SQL to query and manage datasets residing in its distributed data storage environment.

Figure 58:
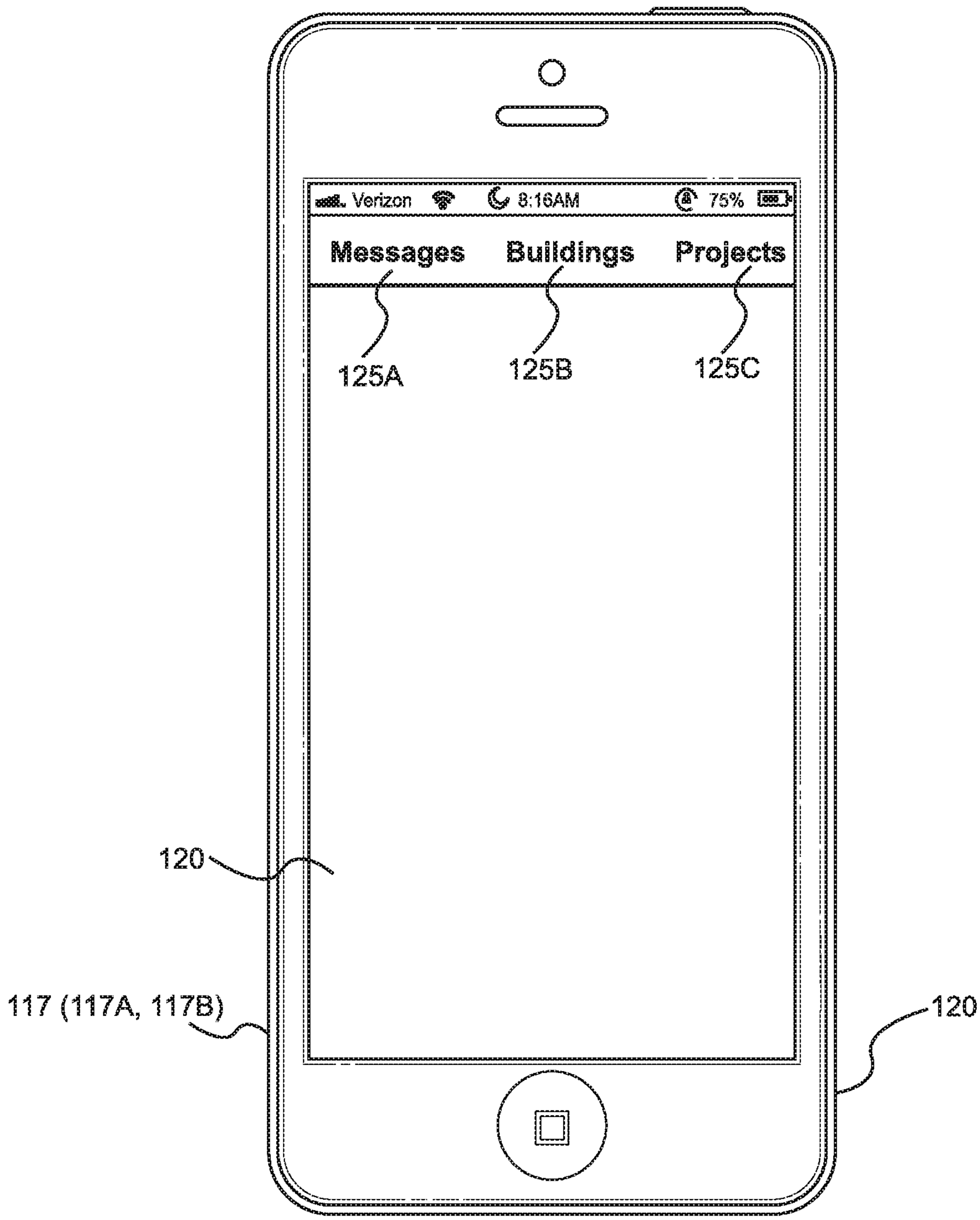
FIG. 58 is an exemplary wire frame model of a graphical user interface of a mobile application configured for use by building/property owners, insurance companies, and other stakeholders, showing a menu of high-level services supported by the system network of the present invention.
Figure 59:
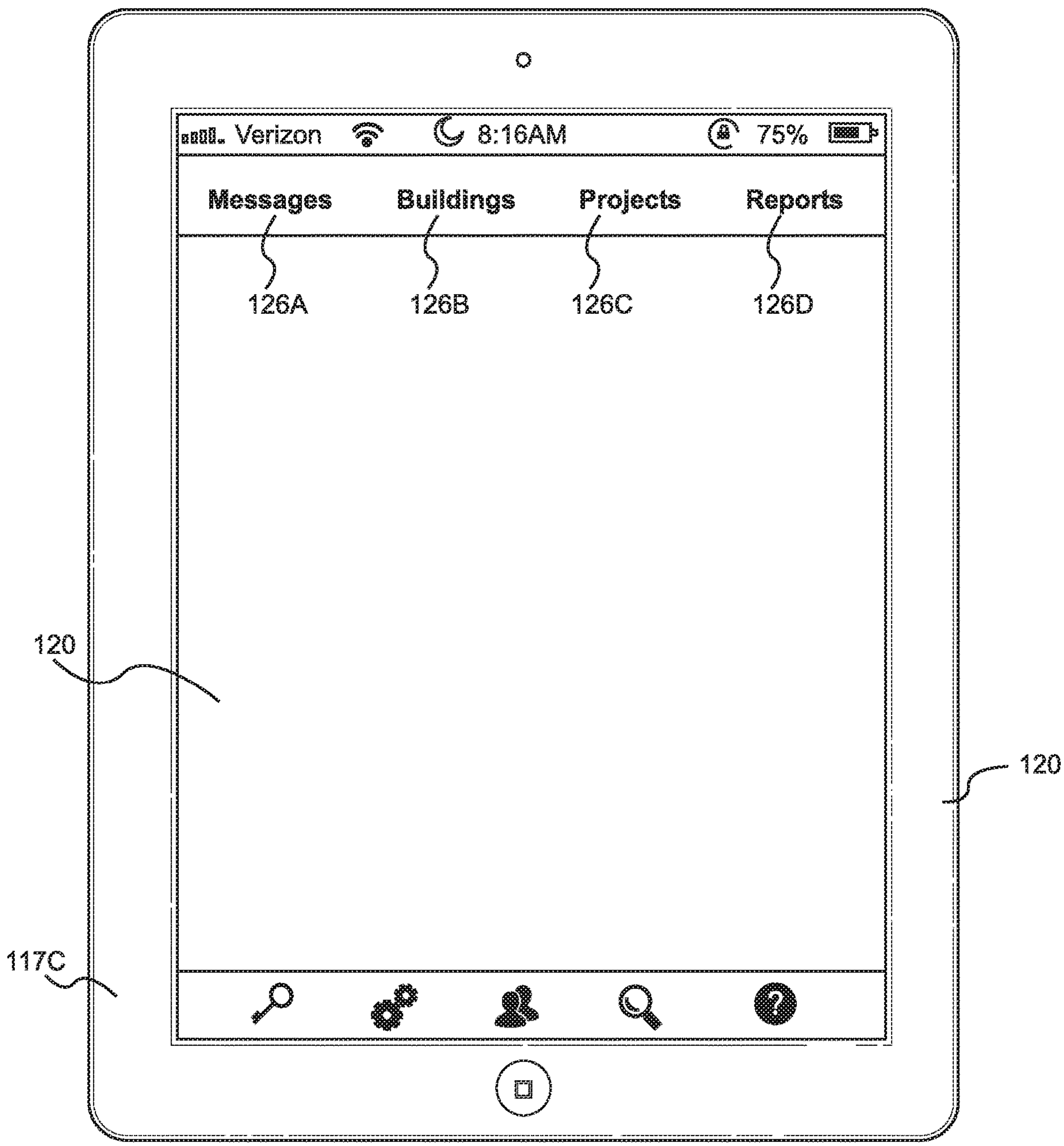
FIG. 59 is an exemplary wire frame model of a graphical user interface of the mobile application showing a high-level menu of services configured for use by on-site fire-protection spray administrators and technicians supported by the system network of the present invention.
Figure 59A:
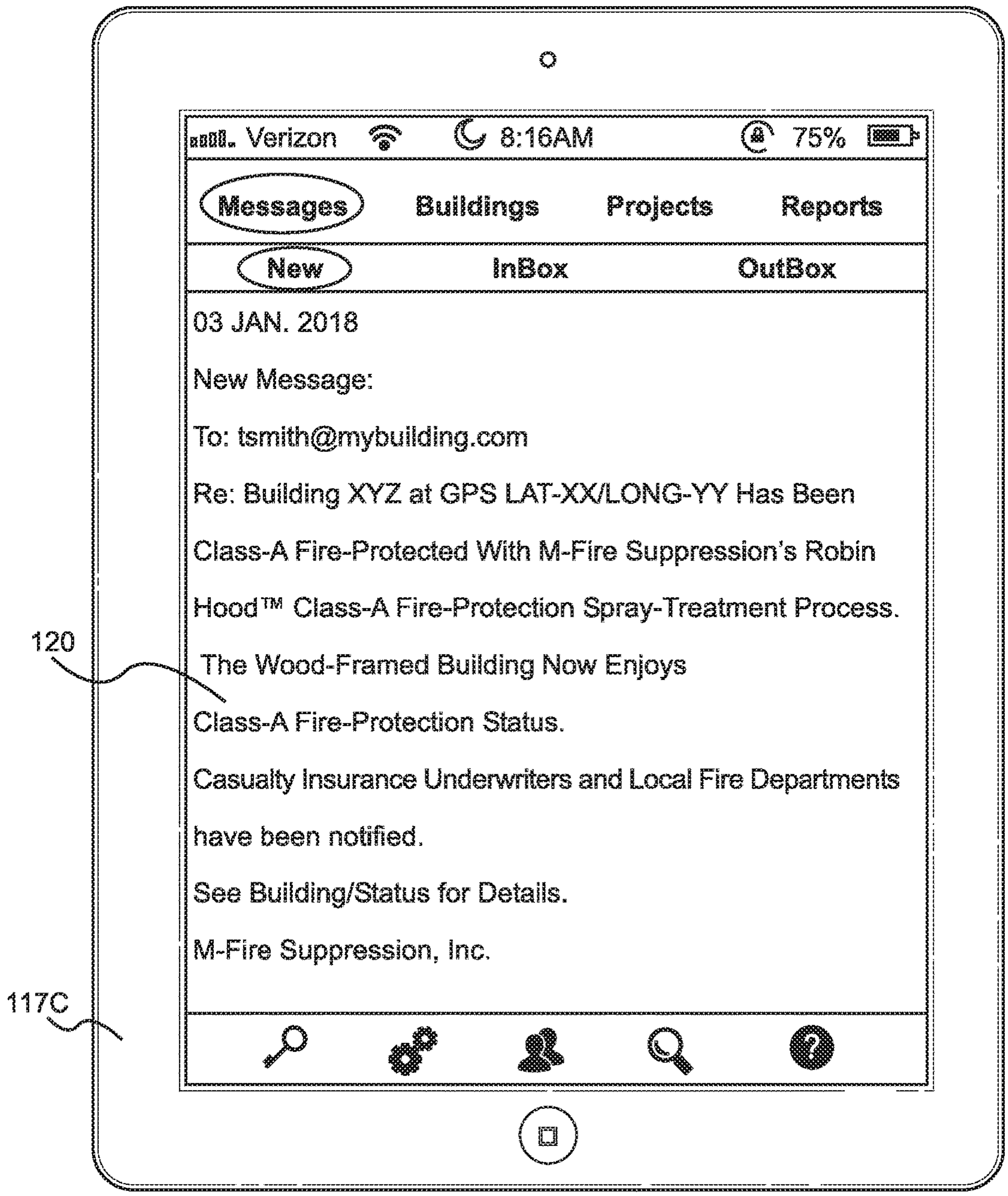
FIG. 59A is an exemplary wire frame model of a graphical user interface of the mobile application configured for use by on-site fire-protection spray administrators and technicians to send and receive messages (via email, SMS messaging and/or push-notifications) with registered users, using messaging services supported by the system network of the present invention.
Figure 59B:
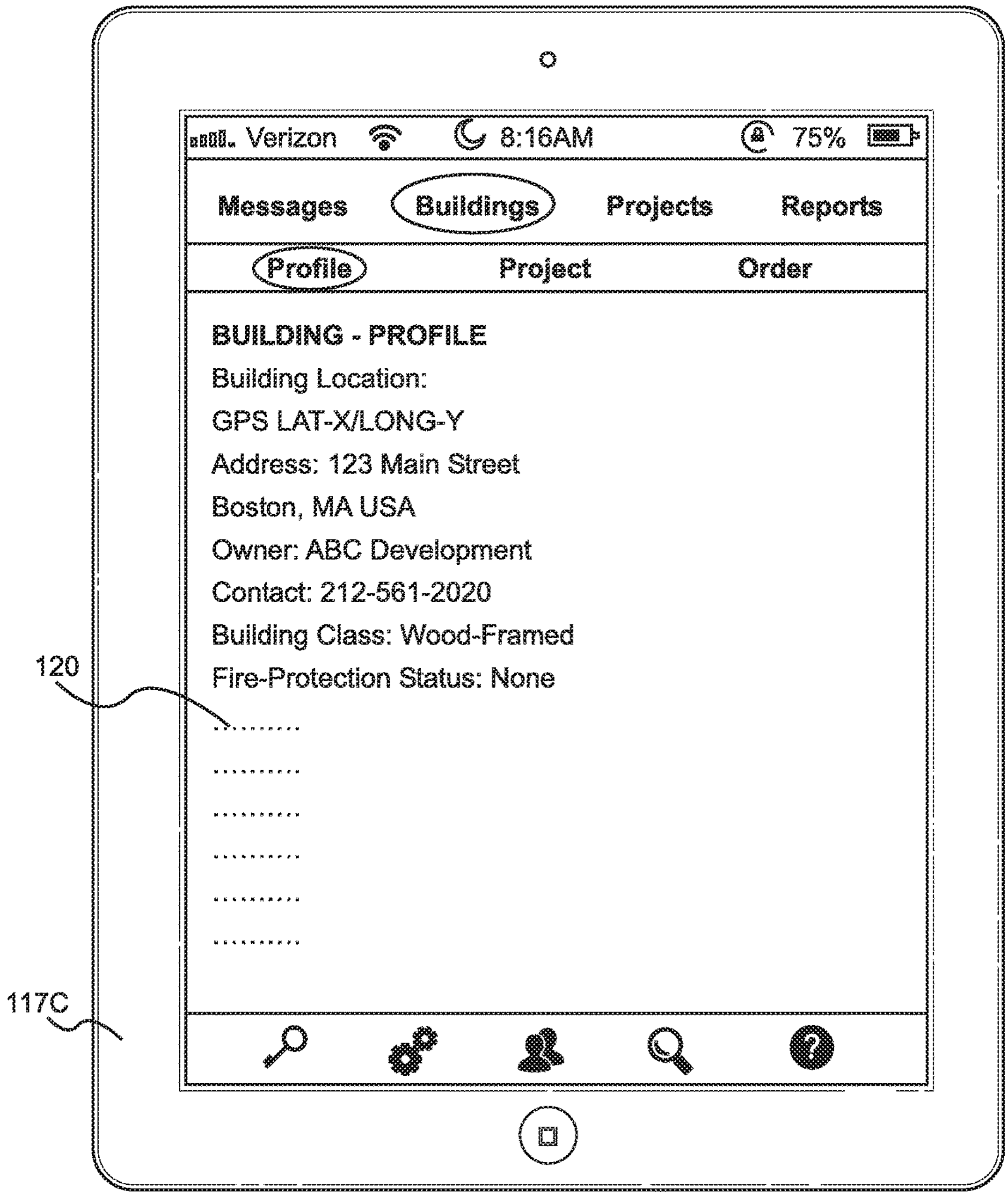
FIG. 59B is an exemplary wire frame model of a graphical user interface of the mobile application configured for use by on-site fire-protection spray administrators and technicians to update a building information profile using the building profile services supported by the system network of the present invention.
Figure 59C:
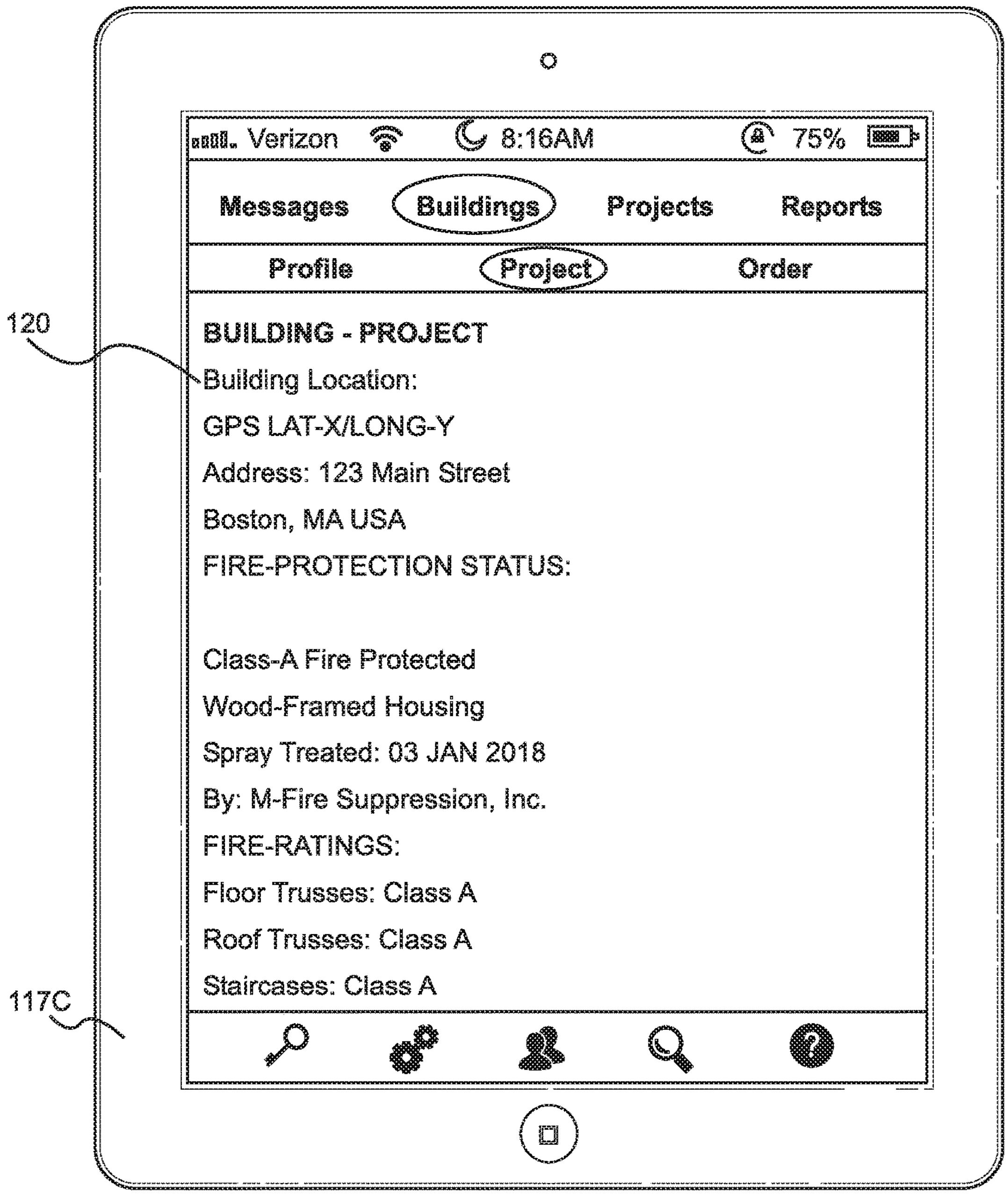
FIG. 59C is an exemplary wire frame model of a graphical user interface of the mobile application configured for use by on-site fire-protection spray administrators and technicians to review a building spray-based fire-protection project using services supported by the system network of the present invention.
Figure 59D:
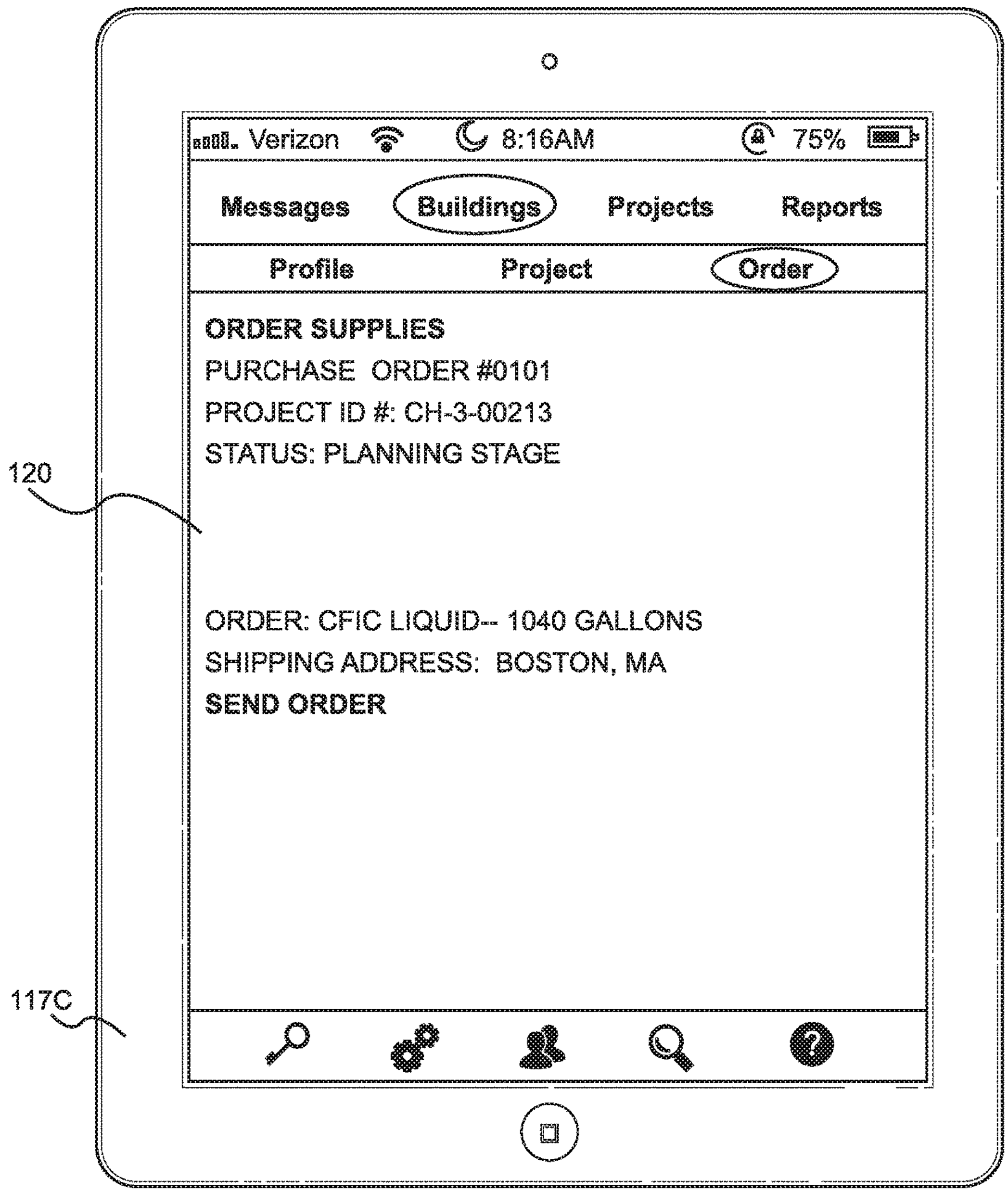
FIG. 59D is an exemplary wire frame model of a graphical user interface of the mobile application configured for use by on-site fire-protection spray administrators and technicians to review the status of any building registered with the system network using services supported by the system network of the present invention.
Figure 59E:
FIG. 59E is an exemplary wire frame model of a graphical user interface of the mobile application configured for use by on-site fire-protection spray administrators and technicians to create a new project for spray-based class-A fire-protection treatment of a wood-framed building, using services supported by the system network of the present invention.
Figure 59F:
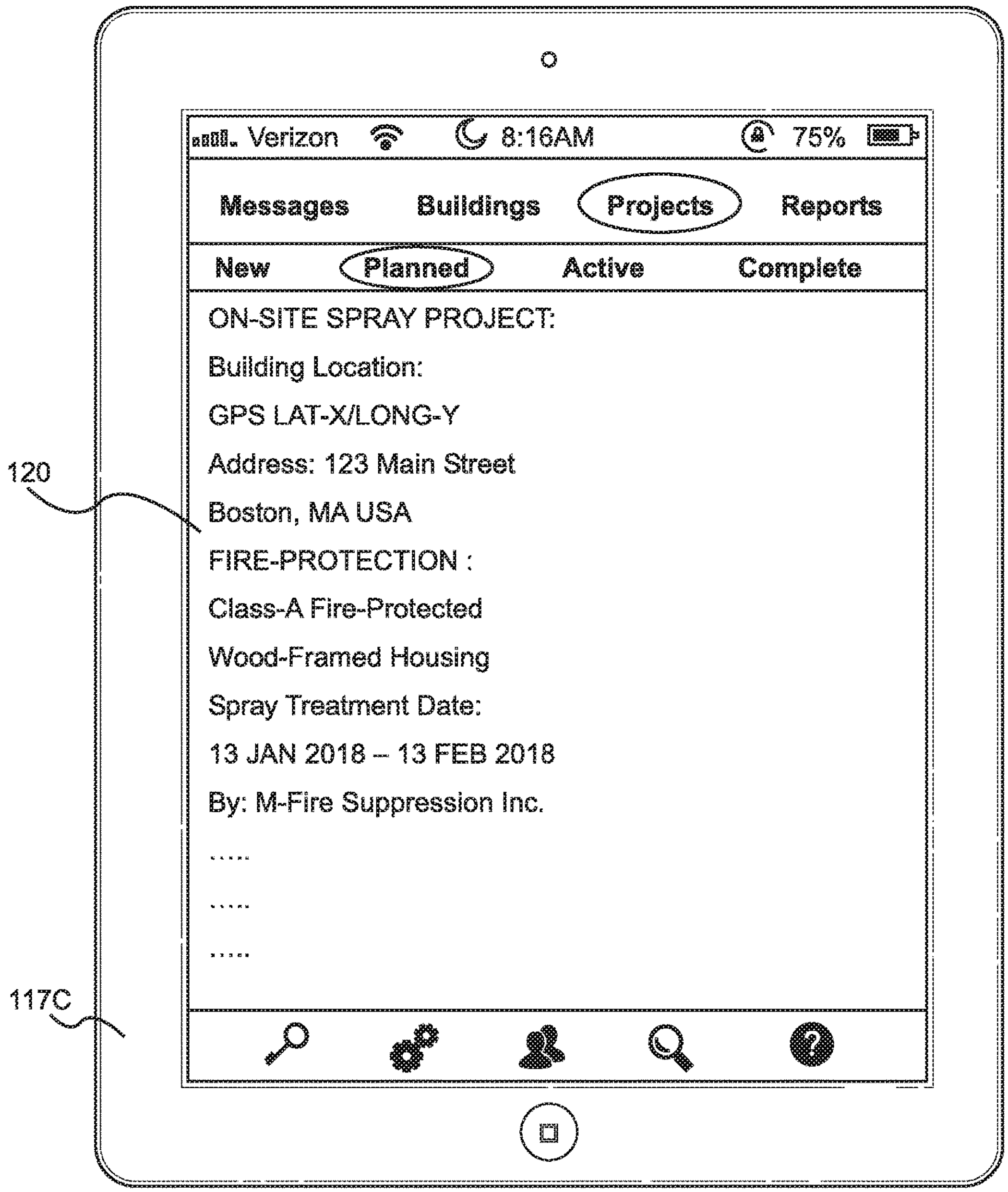
FIG. 59F is an exemplary wire frame model of a graphical user interface of the mobile application configured for use by on-site fire-protection spray administrators and technicians to review the status of a planned building fire-protection spray project, using services supported by the system network of the present invention.
Figure 59G:
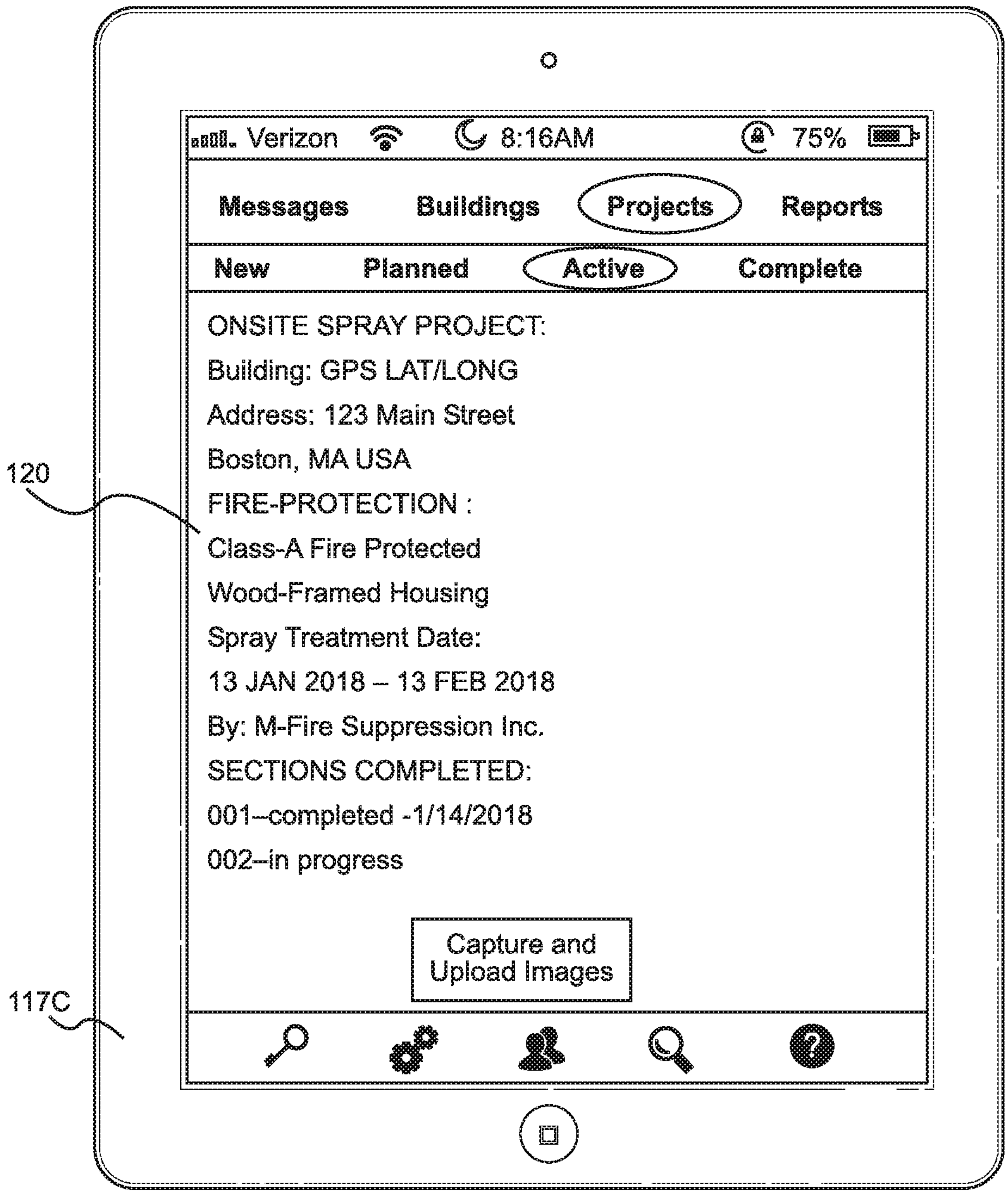
FIG. 59G is an exemplary wire frame model of a graphical user interface of the mobile application configured for use by on-site fire-protection spray administrators and technicians to review the status of an active in-progress building fire-protection spray project, using services supported by the system network of the present invention.
Figure 59H:
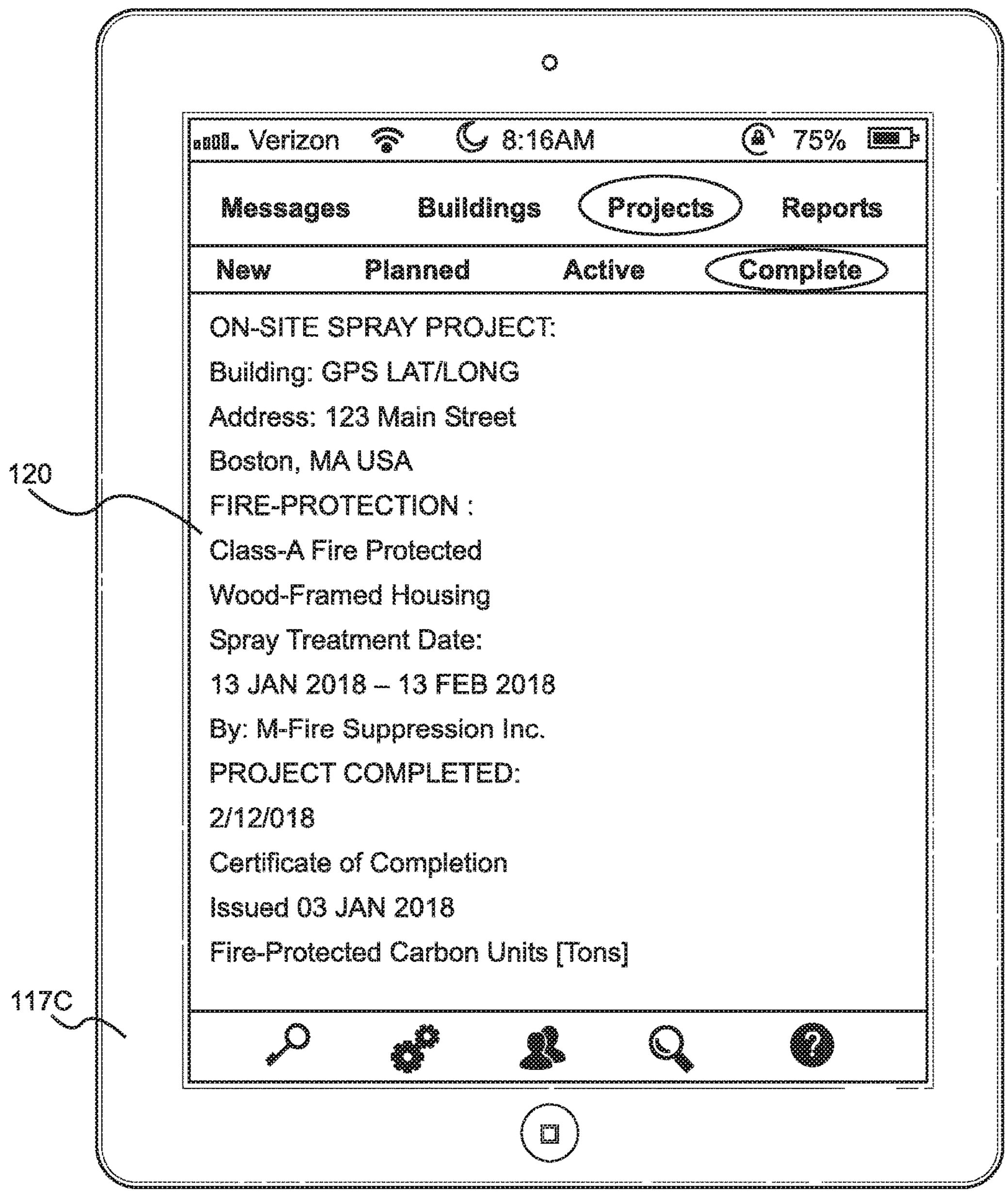
FIG. 59H is an exemplary wire frame model of a graphical user interface of the mobile application configured for use by on-site fire-protection spray administrators and technicians to review a completed building fire-protection spray project, and all documents collected therewhile and quantized fire-protected carbon units (FPCUs), using the various services supported by the system network of the present invention.
Figure 59I:
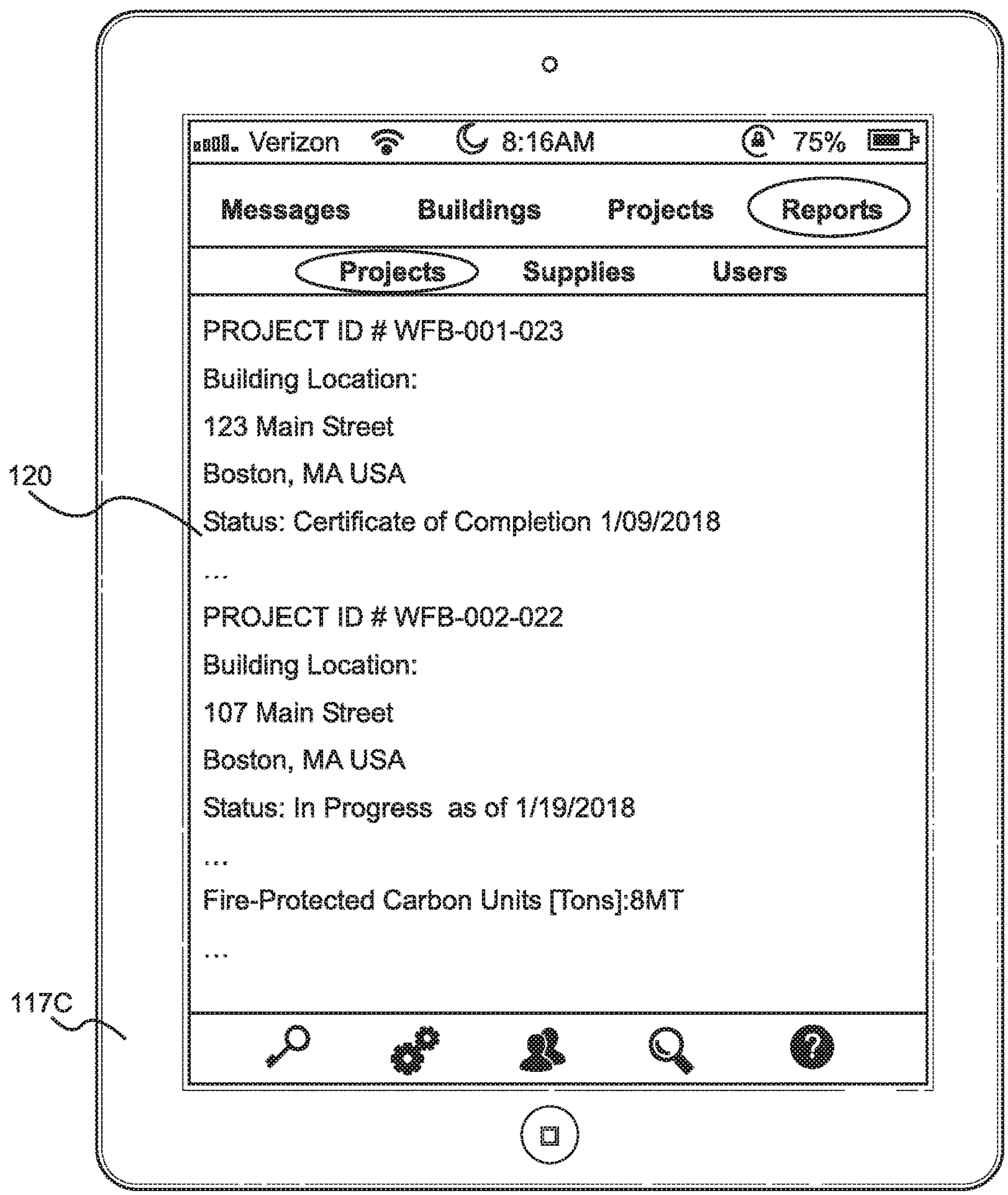
FIG. 59I is an exemplary wire frame model of a graphical user interface of the mobile application configured for use by on-site fire-protection spray administrators and technicians to generate and review reports (including Fire-Protected Carbon Units) on projects which have been scheduled for execution during a particular time frame, which have been already completed, or which are currently in progress, using the services of the system network of the present invention.
Figure 59J:
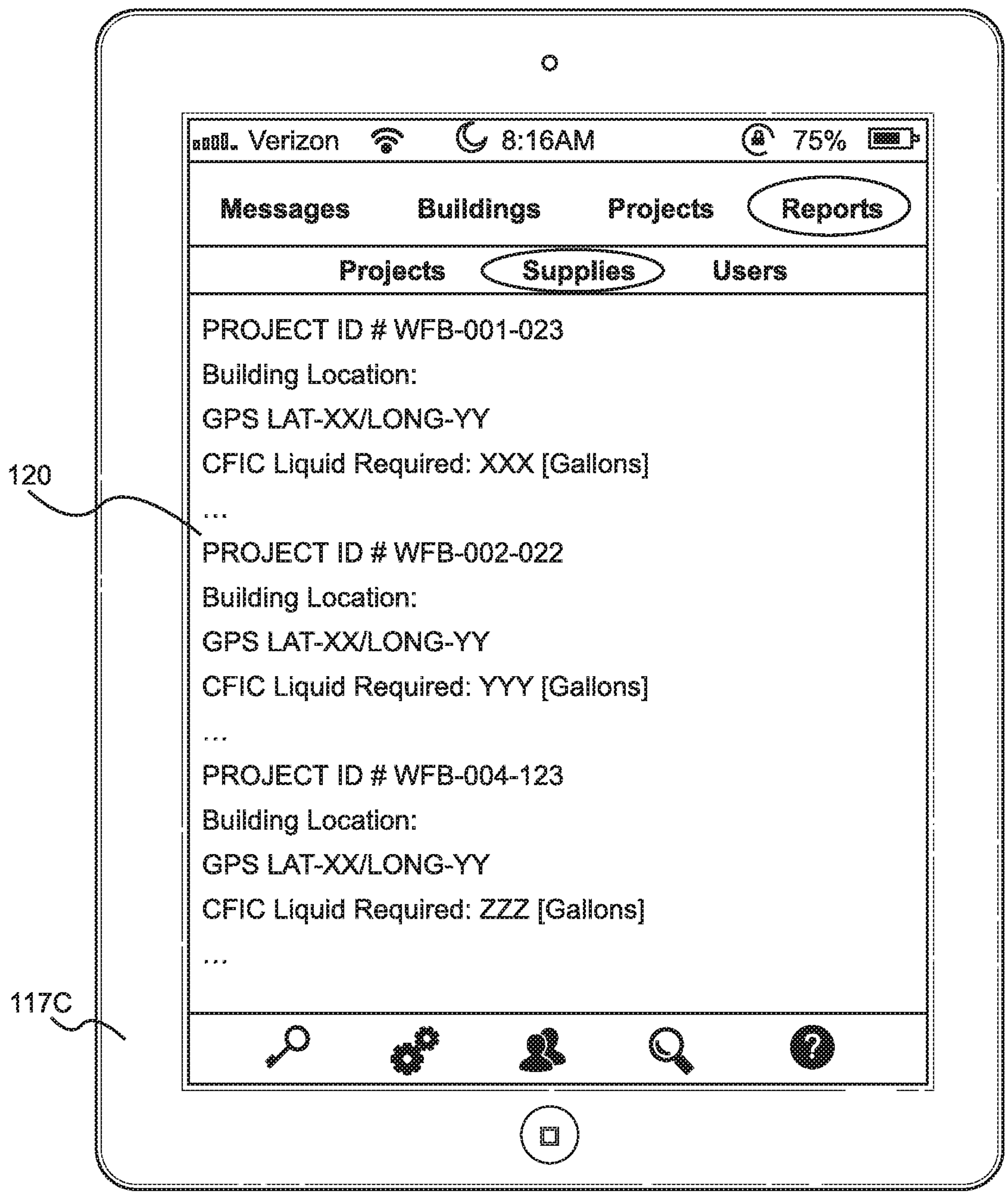
FIG. 59J is an exemplary wire frame model of a graphical user interface of the mobile application configured for use by on-site fire-protection spray administrators and technicians to generate and review reports on supplies used in fulfilling on-site class-A fire-protection building spray projects managed using the services of the system network of the present invention.
Figure 59K:
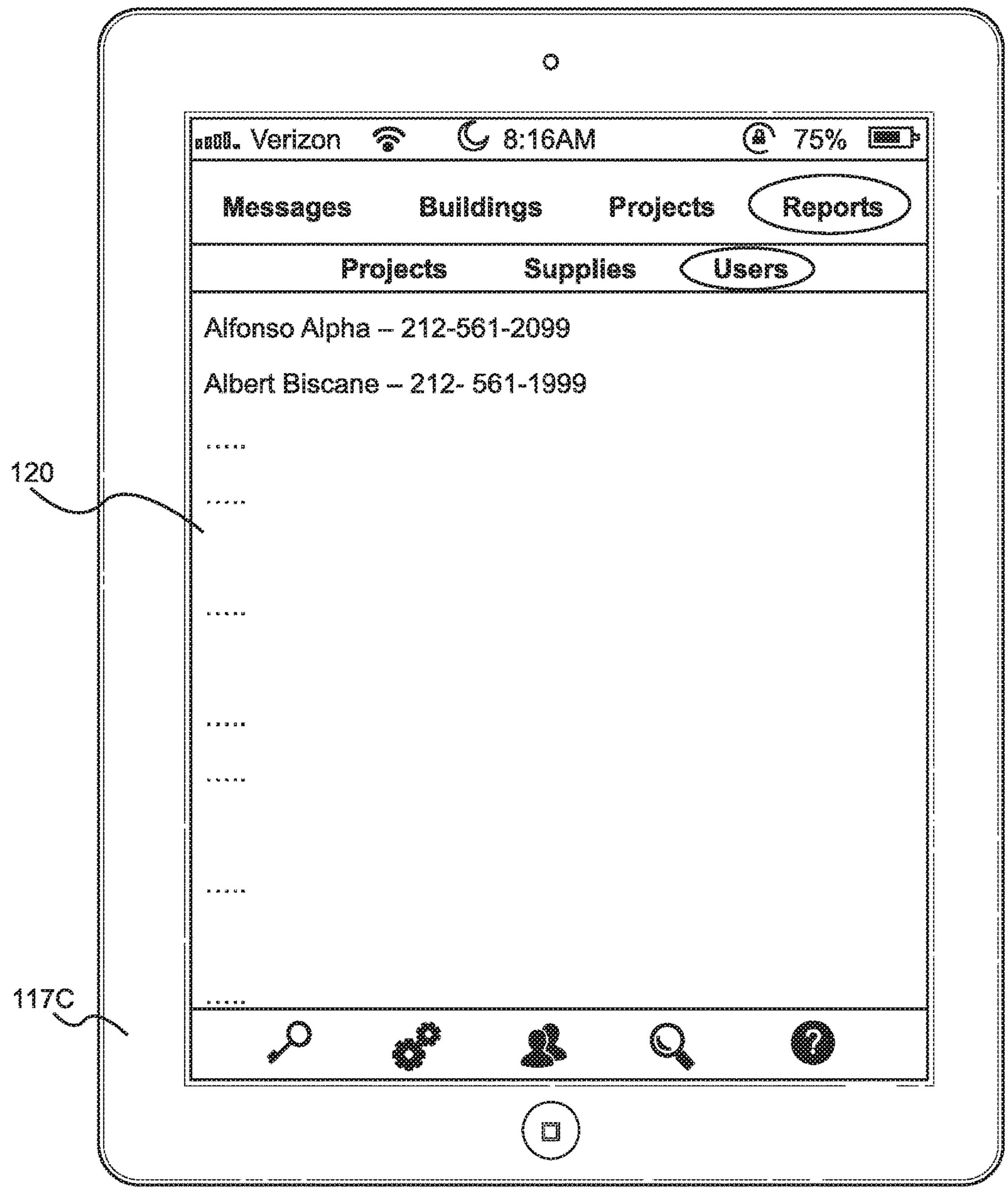
FIG. 59K is an exemplary wire frame model of a graphical user interface of the mobile application configured for use by on-site fire-protection spray administrators and technicians to generate and review reports on registered users associated with particular on-site class-A fire-protection building spray projects managed using the services of the system network of the present invention.

As shown in FIG. 55, the system network architecture further comprises many different kinds of users supported by mobile computing devices 117 running the mobile application 120 of the present invention, namely: a plurality of mobile computing devices 137 running the mobile application 120, and used by s to access services supported by the system network 100; a plurality of mobile computing systems 117 running mobile application 1'20 and used by insurance underwriters to access services on the system network 145; a plurality of mobile computing systems 137 running mobile application 120 and used by architects and their firms to access the services supported by the system network 100 of the present invention; a plurality of mobile client machines 117 (e.g. mobile computers such as iPad, and other Internet-enabled computing devices with graphics display capabilities, etc) for use by spray-project technicians and administrators, and running a native mobile application 117 supported by server-side modules, and the various illustrative GUIs shown in FIGS. 58 through 59K, supporting client-side and server-side processes on the system network of the present invention; and a plurality of mobile GPS-tracked/GSM-linked CFIC Liquid Spraying Systems 101 deployed in one or more wood-framed buildings which are being Class-A fire-protected using the CFIC liquid spray treatment method of the present invention described in FIGS. 52A through 53.

In general, the system network 100 will be realized as an industrial-strength, carrier-class Internet-based network of object-oriented system design, deployed over a global data packet-switched communication network comprising numerous computing systems and networking components, as shown. As such, the information network of the present invention is often referred to herein as the "system" or "system network". The Internet-based system network 100 can be implemented using any object-oriented integrated development environment (IDE) such as for example: the Java Platform, Enterprise Edition, or Java EE (formerly J2EE); Websphere IDE by IBM; Weblogic IDE by BEA; a non-Java IDE such as Microsoft's .NET IDE; or other suitably configured development and deployment environment well known in the art. Preferably, although not necessary, the entire system of the present invention would be designed according to object-oriented systems engineering (DOSE) methods using UML-based modeling tools such as ROSE by Rational Software, Inc. using an industry-standard Rational Unified Process (RUP) or Enterprise Unified Process (EUP), both well known in the art. Implementation programming languages can include C, Objective C, C, Java, PHP, Python, Google's GO, and other computer programming languages known in the art. Preferably, the system network 100 is deployed as a three-tier server architecture with a double-firewall, and appropriate network switching and routing technologies well known in the art. In some deployments, private/public/hybrid cloud service providers, such Amazon Web Services (AWS), may be used to deploy Kubernetes, an open-source software container/cluster management/orchestration system, for automating deployment, scaling, and management of containerized software applications, such as the mobile enterprise-level application 120, described above.

It is understood that, in many embodiments, the above-described enterprise-level system 100, supporting fire-protection spraying of wood framed and mass-timber building around the globe, will also include a core integrated financial accounting system 400. This core integrated financial accounting system 400 will be supported by a general ledger system (GLS), an accounts payable system (APS) and an accounts receivable system (ARS). The financial accounting system can be hosted in the data center 110 or elsewhere on the Internet, in a manner well known in the art. Integrated financial accounting software system solutions are available from numerous vendors including, but not limited to, for example, Oracle's NetSuite® Financial Management Software System, SAP's Business Financial One Software System, etc.

Specification of System Architecture of an Exemplary Mobile Smartphone System Deployed on the System Network of the Present Invention FIG. 56A shows the mobile computing system 117 (117A, 117B, 117C) used in the system network 100 shown in FIG. 55, supporting the mobile application 120 installed on each registered mobile computing system 117. The purpose of the mobile application 120 is to provide a convenient tool for tracking and managing projects involving on-site clean fire inhibiting chemical (CFIC) liquid spray treatment of wood-framed buildings during the construction phase, to ensure Class-A fire-protection of the interior exposed wood surfaces of the building. Using the custom-designed mobile application 120, property/building owners, builders, architects, insurance companies, and financial institutions can (i) track the progress being made while a wood-framed building is being spray-treated with CFIC liquid during the construction project schedule, so that the spray-treatment process ensures that Class-A fire-protection is provided to all (100%) exposed interior surfaces within the wood-framed building, and (ii) review all collected digital audio and visual evidence of certificates of completion signed by trained personnel during the course of the construction and fire-protection treatment project.

Figure 56B:
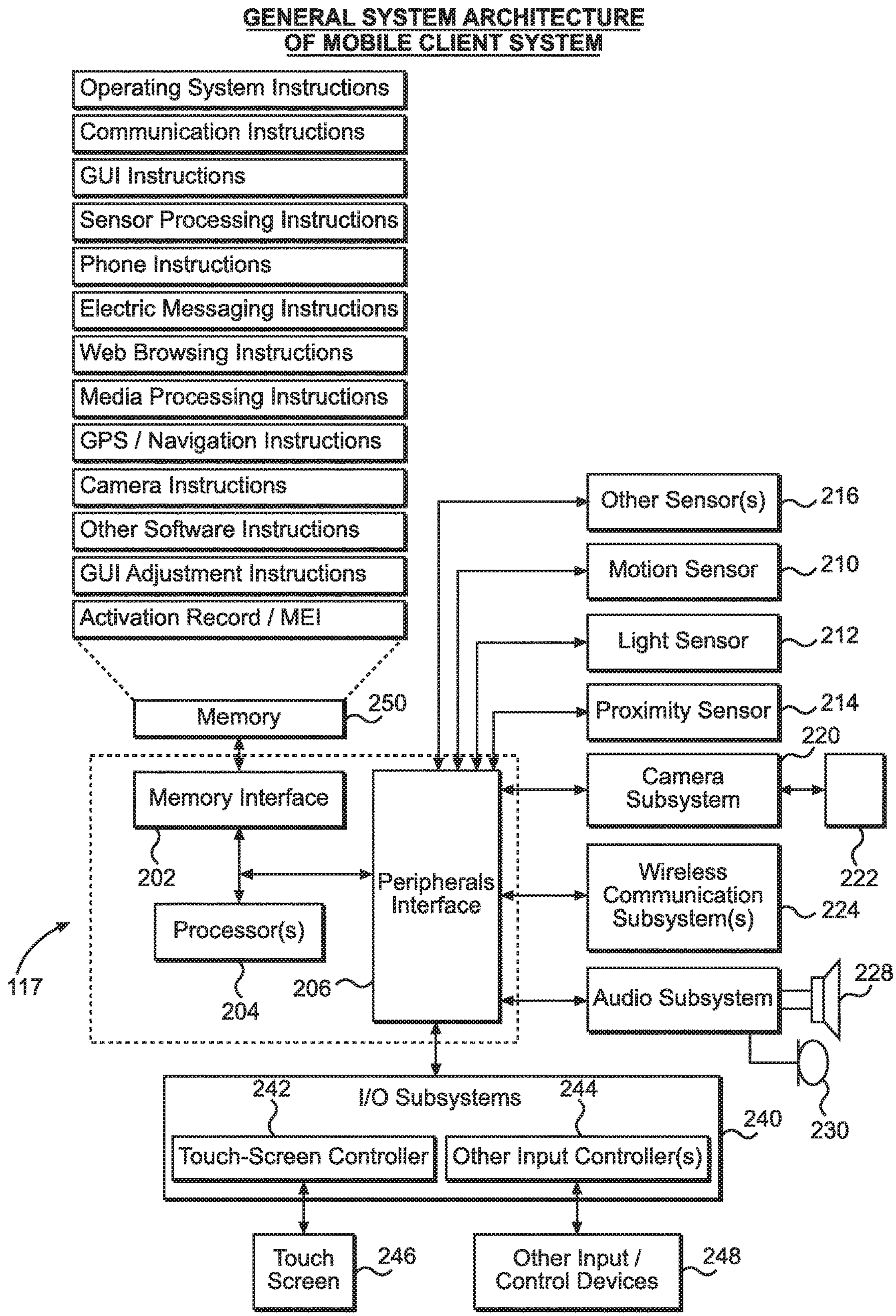
FIG. 56B is a system diagram for the mobile client computing system shown in FIG. 56A, showing the components supported by each client computing system.

FIG. 56B shows the system architecture of an exemplary mobile computing system 117 that is deployed on the system network 100 and supporting the many services offered by system network servers 112. As shown, the mobile smartphone device 117 (117A, 117B, 117C) can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device can be coupled by one or more communication buses or signal lines. Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions. Other sensors 216 can also be connected to the peripherals interface 206, such as a positioning system (e.g. GPS receiver), a temperature sensor, a biometric sensor, a gyroscope, or other sensing device, to facilitate related functionalities. A camera subsystem 220 and an optical sensor 222, e.g. a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 224, which can include radio frequency receivers and transmitters and/or optical (e.g. infrared) receivers and transmitters. The specific design and implementation of the communication subsystem 224 can depend on the communication network(s) over which the mobile device is intended to operate. For example, the mobile device 117 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 117 may be configured as a base station for other wireless devices. An audio subsystem 226 can be coupled to a speaker 228 and a microphone 230 to facilitate voice-enabled functions, such as voice recognition, voice replication, digital recording, and telephony functions. The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230. Such buttons and controls can be implemented as a hardware objects, or touch-screen graphical interface objects, touched and controlled by the system user. Additional features of mobile smartphone device 117 can be found in U.S. Pat. No. 8,631,358 incorporated herein by reference in its entirety.

Figure 57A:
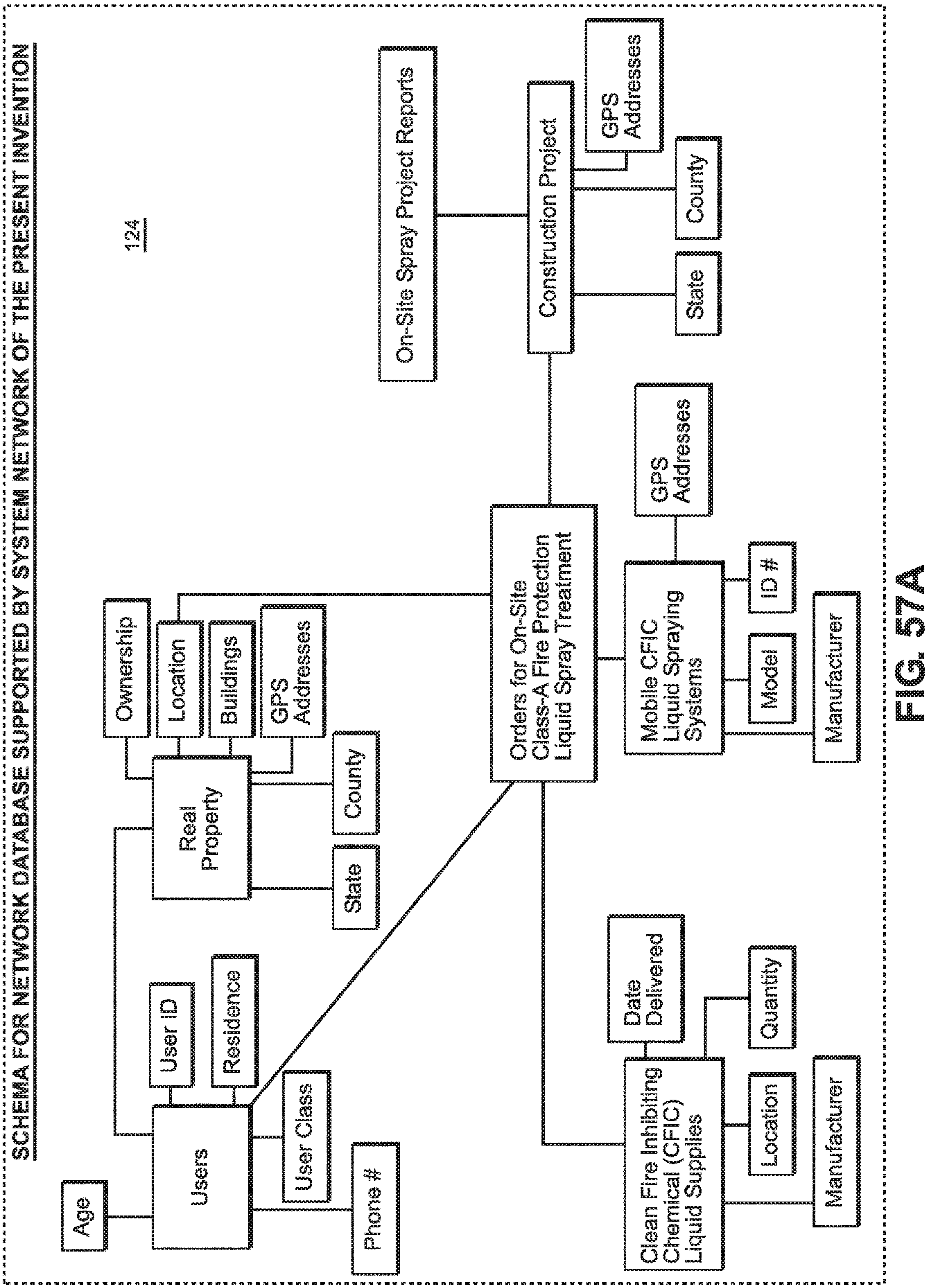
FIG. 57A is a schematic representation of an exemplary schema for the network database supported by the system network the present invention shown in FIG. 55, wherein each primary enterprise object is schematically represented as an object in the schema and represented in the data records created and maintained in the network database.

Specification of Network Database Supported on the System Network of the Present Invention FIG. 57A shows an exemplary schema 124 for the network database 113A supported by the system network 109 shown in FIG. 55. Each primary enterprise object is schematically represented as an object in the schema and represented in the data records created and maintained in the network database. As shown, the schema 124 includes objects such as, for example: Users of the system (e.g. property owners, builders, spray technicians, insurance companies, etc.); Real Property; Orders For On-Site Class-A Fire-Protection Liquid Spray Treatment; Clean Fire Inhibiting Chemical (CFIC) Liquid Supplies; Construction Project; and Mobile CFIC Liquid Spraying Systems. Each of these objects have further attributes specified by other sub-objects indicated in FIG. 57

Figure 57B:
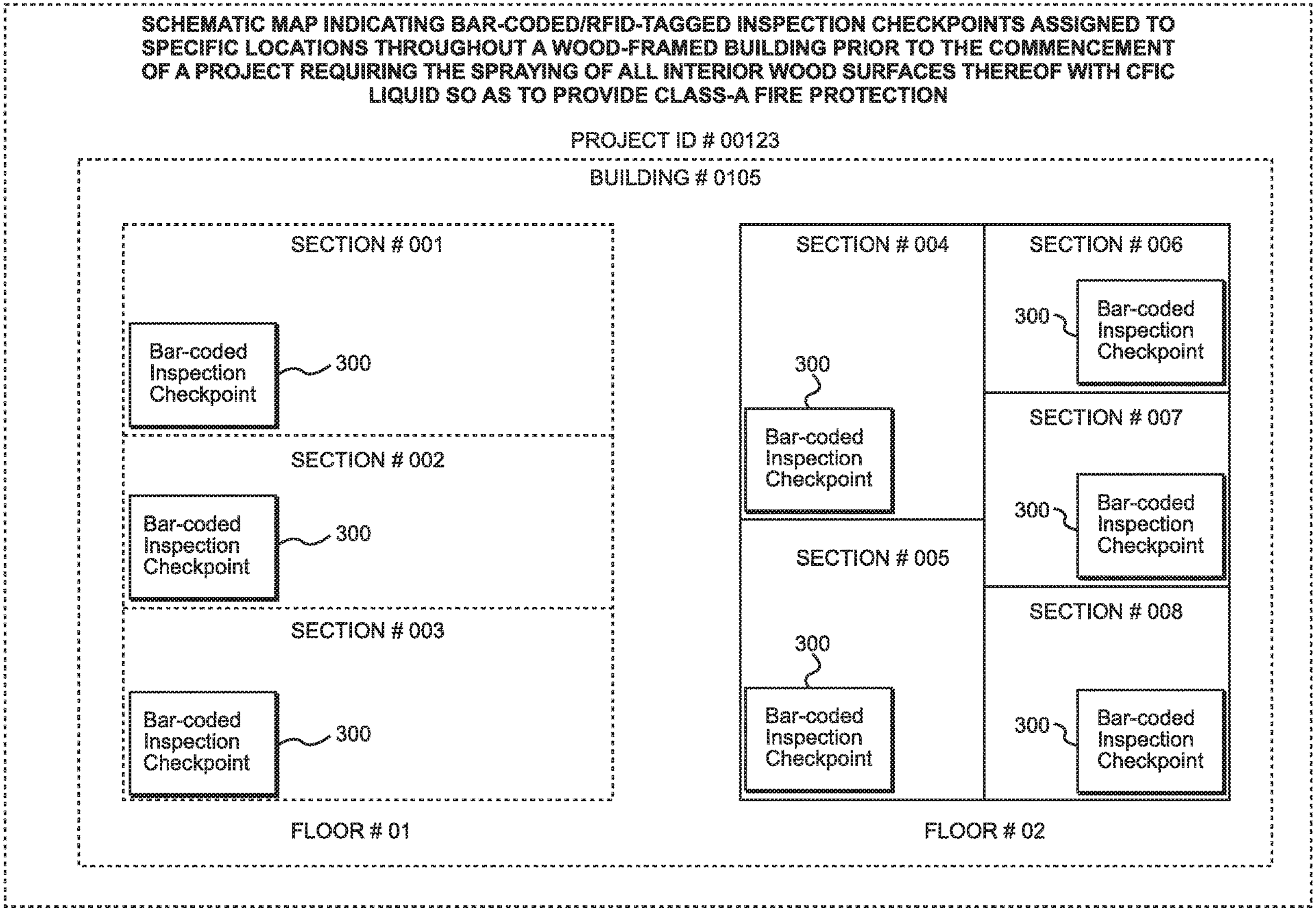
FIG. 57B is a schematic map indicating bar-coded/RFID-tagged inspection checkpoints assigned to specific locations throughout a wood-framed building prior to the commencement of a project requiring the spraying of all interior wood surfaces thereof with CFIC liquid so as to provide Class-A fire protection.

Using Mobile Computing Devices Deployed on the System Network to Verify and Document CFIC Liquid Spray Certifications Made at Each Barcoded/RFID-Tagged Inspection Checkpoint Specified Throughout the Wood-Framed Building being Spray-Treated to Provide Class-A Fire Protection and Requesting Carbon-Quantization Using the Carbon-Quantization Engine FIG. 57B shows a schematic map indicating the barcoded/RFID-tagged inspection checkpoints assigned to specific locations throughout a wood-framed building, by a spray project administrator, prior to the commencement of a project requiring the spraying of all interior wood surfaces thereof with CFIC liquid so as to provide Class-A fire-protection thereto. In this example, the building has two floors, and each floor has several sections requiring spray-treatment with CFIC liquid, to provide Class-A fire-protection, in accordance with the principles of the present invention.

In general, this map will be created at the commencement of each project for a specified wood-framed building under construction, and its data structure will be stored in the network database 113A for the created project, to enable the organized capture of barcoded/RFID-tagged certifications, verifications and related documentation after spraying each completed wood-framed section.

Each section of the wood-framed building will be provided with at least one GPS-specified barcoded/RFID-tagged inspection checkpoint 300 (e.g. bearing certificates of spraying and inspection by spray technicians and site supervisors printed on a thin flexible plastic sheet, on which a barcode symbol/RFID-tag are mounted) indicated at 300 on the map. The map of FIG. 57B should clearly show the building/floor/section-specific locations of the barcoded/RFID-tagged inspection checkpoints 300, shown in FIGS. 63 and 64, on the floor plan of the wood-framed building, where the bar-coded/RFID-tagged inspection checkpoints 3000 will be mounted on spray-treated wood surfaces, at the completion of spray-treating each section of the wood-framed building, and subsequently signed by the spray technician and spray supervisor, and possibly the building site superintendent, and thereafter digitally photographed and video-recorded with the individuals involved in each such event being verified and documented using the system network of the present invention 100 and its deployed mobile applications 120.

At each barcoded/RFID-tagged inspection checkpoint 300, the spray technician and/or site supervisor uses his mobile computing device 117 to read the bar code symbol and/or RFID tag at the inspection checkpoint, to automatically (or semi-automatically) open the project storage location on the network database 113A, and then capture and record digital images and AV-recordings of signed spray certifications and verifications by the spray technicians and/or site supervisor, and upload them to the network database 113A using the mobile computing device 117 and mobile application 120, in the case where native mobile applications have been deployed. The mobile application 120 will also capture the GPS coordinates of the mobile computing device 117, and enter these coordinates into the project file/folder in the network database 113A, for verification purposes. The mobile application 120 can also capture the IP address of the user's mobile computing device (e.g. Apple iPhone) and record such address information as well. Preferably, at each barcoded inspection checkpoint 300, a set of four bar-coded Class-A fire-protect test boards 301, and a pair of bar-coded UV-protected storage sleeve 302A and 302B, each adapted to store two test boards 301 after CFIC liquid has been spray thereupon to impart Class-A fire protection. One set of sprayed test sample boards will be provided to the building owner, or its professional engineer, to be held in custody for evidentiary purposes. The other set will go to spray contracting firm, typically its laboratory, for post-spray testing purposes, and also to hold for custodial reasons. Digital images of these spray-treated test boards 301 should also be captured and uploaded to the network database 113A in the project folder under the specific inspection checkpoint at which the sprayed test samples where made, at a specific time and date, and GPS-location. Thereafter, these sprayed test boards 301 can be stored in their respective bar-coded storage sleeves 302A, 302B and provided to their respective parties. After such sprayed test samples have been made, and documented, it may desired for the spray contracting firm to send its sprayed test boards 301 to a scientific and engineering laboratory and conduct some tests to ensure that the highest possible scientific and engineering standards have been attained during the on-site spray treatment process, associated with each and every on-site wood-framed building fire-protection spray process. Laboratory technicians may also use the mobile application 120 and system network 100 to add any information they might have regarding the their testing of sprayed test boards 301 produced at each barcoded inspection checkpoint in the project.

Once all certifications and verifications have been made by the spray technician and his site supervisor, and digital photographic and AV-recording documentation (i.e. evidence) has been captured and uploaded to the network database 113A under the building-specific project, at a GPS-specified/barcoded inspection checkpoint 300, the spray technician will resume spraying other sections of the wood-framed building requiring spray treatment with CFIC liquid.

When using the system network of the present invention 100, each certification and verification made by the spray technician and site supervisor at the barcoded inspection checkpoint, and captured and recorded in the network database 113A using the user's mobile computing device 117 (e.g. Apple iPad), should include a legal declaration that a specific CFIC liquid formulation (e.g. Hartindo AF31 anti-fire liquid) has been applied to the sprayed wood surfaces of the completed section of this specific wood-framed building at a particular time and date, and in an active concentration sprayed onto the wood surfaces so as to provide the sprayed wood surfaces with Class-A fire-protected characteristics, as independently tested by a particular licensed engineering testing organization, which should be identified and incorporated therein by reference.

Once Class-A fire-protection has been delivered to substantially all of the exposed wood surfaces in a specific completed wood-framed or mass timber building section, the mobile computing system 117 can use its application 120 to make a request for carbon quantization of the completed fire-protected wood section by reading the identifying—code symbol on the barcoded/RFID-tag inspection checkpoint 300 posted on the door header of the completed building section. In response to this request, carbon quantization engine 500 will automatically service the request as illustrated in FIGS. 7 and 8A, and the process described in FIGS. 8B and 9 will be performed automatically and transparently, and the computed fire-protected carbon unit (FPCU) figure for the completed section will be displayed, and labels printed to be added to the inspection checkpoint 300, for subsequent certification and verification, if and as required for the application at hand. All FPCU figures and requests are indexed to the identifier associated with the barcoded/RFID-tagged inspection checkpoint 300, along with parameters and BIM models uploaded by the builder and its construction engineers and managers, with appropriate prompts and timing to support the carbon quantization process of the present invention.

Specification of Services Supported by the Graphical User Interfaces Supported on System Network of the Present Invention for Use by Property/Building Owners, Architects, Builders, Insurance Companies and Other Stakeholders Supported by the System Network FIG. 58 illustrates an exemplary graphical user interface (GUI) 125 of the mobile application 120 used by property/building owners, architects, insurance companies, builders, and other stakeholders supported by the system network 100. As shown in this exemplary GUI screen 125, supports a number of pull-down menus under the titles: Messages 125A, where the user can view messages sent via messaging services supported by the application; Buildings 125B, where projects have been scheduled, have been completed, or are in progress; and Projects 125C, which have been have been scheduled, have been completed, or are in progress, and where uploaded authenticated certifications of completion can be reviewed, downloaded and forwarded as needed by authorized stakeholders.

Figure 58A:
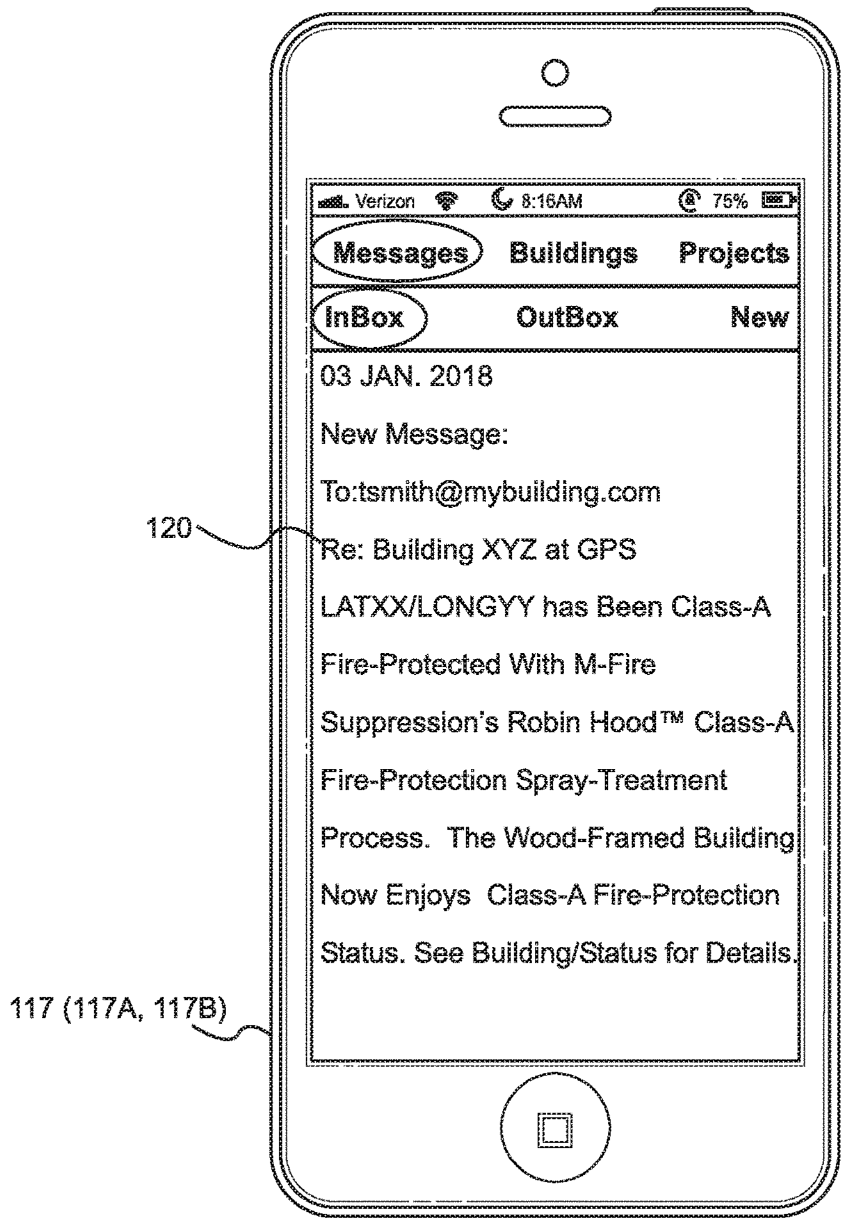
FIG. 58A is an exemplary wire frame model of a graphical user interface of the mobile application configured for use by building/property owners, insurance companies, and other stakeholders showing receipt of new message (via email, SMS messaging and/or push-notifications) relating to building status from messaging services supported by the system network of the present invention.

FIG. 58A shows a graphical user interface of the mobile application 120 configured for use by building/property owners, builders, architects, insurance companies, and other stakeholders showing receipt of new message (via email, SMS messaging and/or push-notifications) on building status from messaging services supported by the system network 100.

Figure 58B:
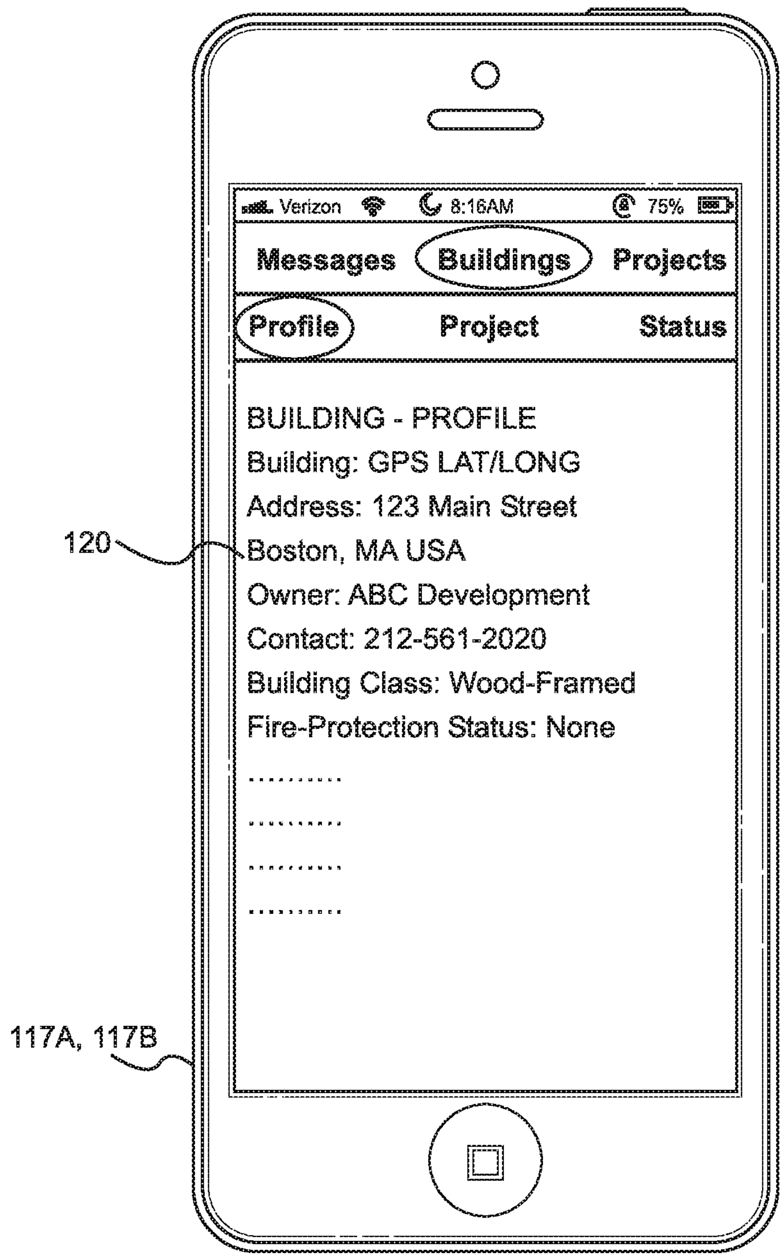
FIG. 58B is an exemplary wire frame model of a graphical user interface of the mobile application configured for use by building/property owners, insurance companies, and other stakeholders to update building profile using profile services supported by the system network of the present invention.

FIG. 58B shows a graphical user interface of the mobile application 120 configured for use by building/property owners, insurance companies, and other stakeholders to update building profile using profile services supported by the system network 100.

Figure 58C:
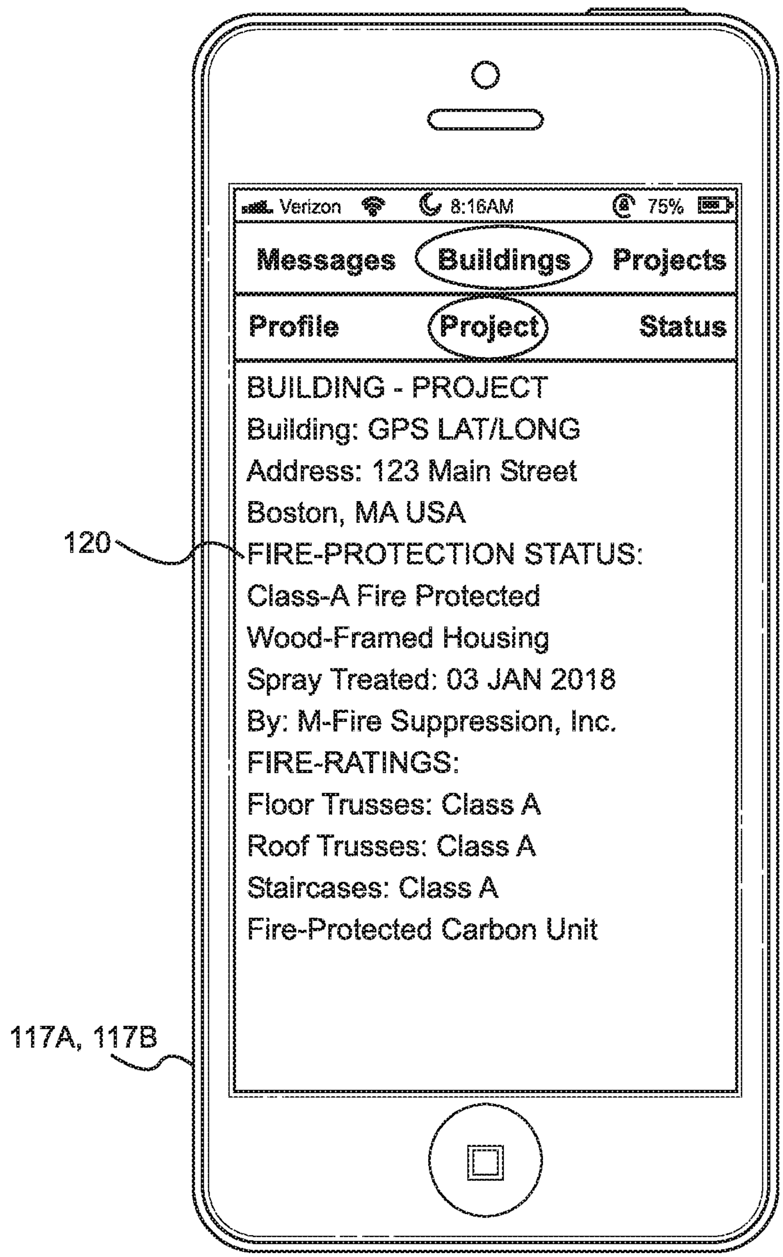
FIG. 58C is an exemplary wire frame model of a graphical user interface of the mobile application configured for use by building/property owners, insurance companies, and other stakeholders to review and monitor the Class-A fire-protection spray treatment project at a particular wood-framed building supported by the system network of the present invention.

FIG. 58C shows a graphical user interface of the mobile application 120 configured for use by building/property owners, builders, architects, insurance companies, and other stakeholders to review and monitor the Class-A fire-protection spray treatment project at a particular wood-framed building supported by the system network 100.

Figure 58D:
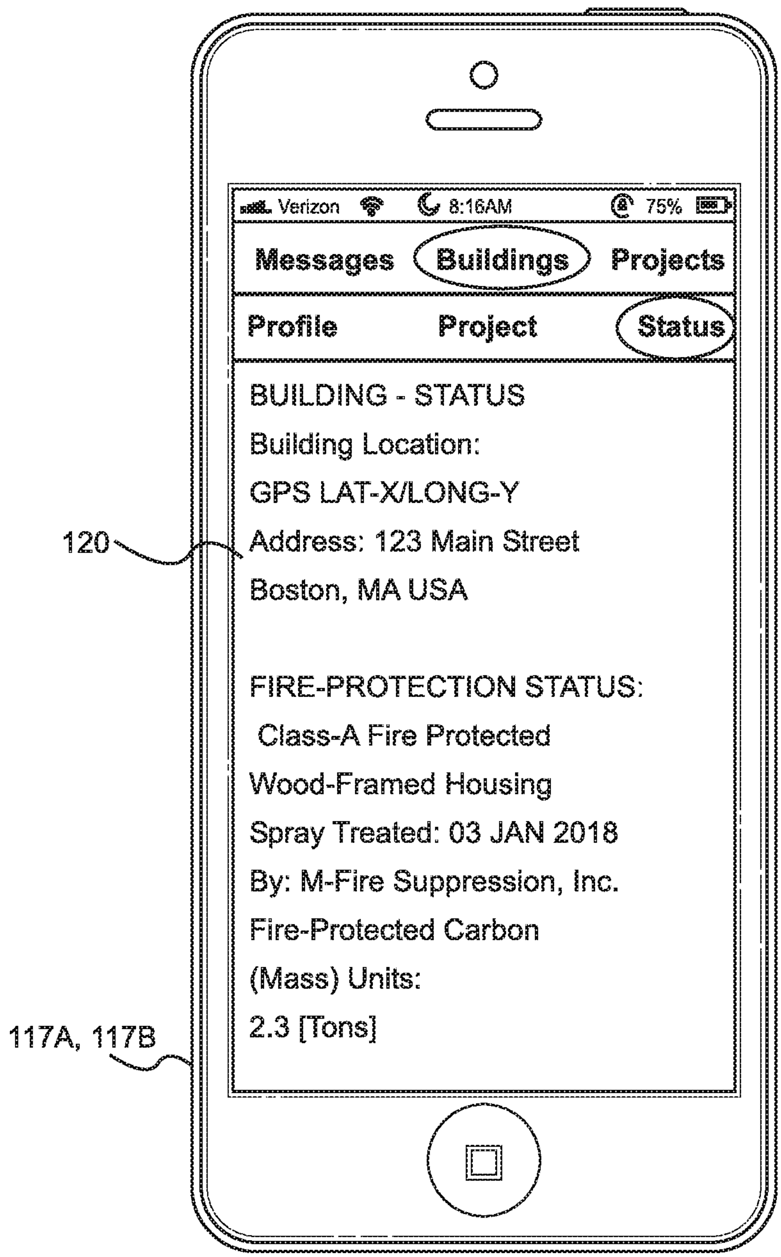
FIG. 58D is an exemplary wire frame model of a graphical user interface of the mobile application configured for use by building/property owners, insurance companies, and other stakeholders to review the fire-protection status, and carbon-quantization status, of a particular Class-A fire-protected wood-framed building registered on the system network of the present invention.

FIG. 58D shows a graphical user interface of the mobile application 120 configured for use by building/property owners, insurance companies, and other stakeholders to review the fire-protection and carbon-quantization status of a wood-framed building registered on the system network 100. As shown, 2.3 [Tons] of Fire-Protected Carbon (Mass) Units (FPCUs) have been fire-protected and stored in wood of this specific wood-framed building.

Figure 58E:
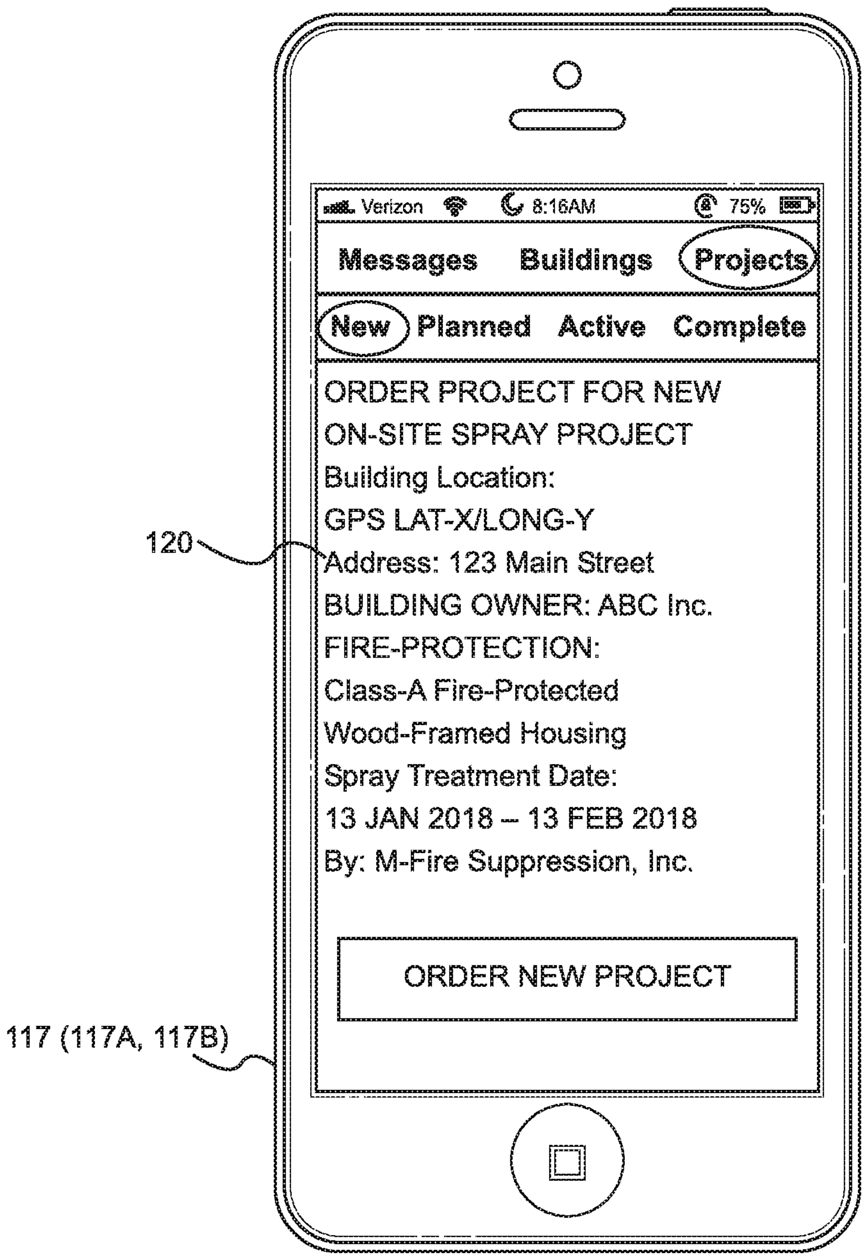
FIG. 58E is an exemplary wire frame model of a graphical user interface of a mobile application configured for use by building/property owners, insurance companies, and other stakeholders to place an order for a new on-site wood-building Class-A fire-protection spray treatment project, using the various services supported by the system network of the present invention.

FIG. 58E shows a graphical user interface of the mobile application 120 configured for use by building/property owners, builders, architects, insurance companies, and other stakeholders to place an order for a new on-site wood-building Class-A fire-protection spray treatment project, using the various services supported by the system network 100. Once the order is received by the system, the system automatically generates a new project in the system network database 113A for the on-site fire-protection spray treatment of the specified wood-framed building. Also, the system automatically assigns a project manager the project. Thereafter, the project and workflow commences under the management of the system using the deployed mobile application 120 running on mobile computing systems 117 (e.g. Apple iPhones) and tablet computers (e.g. Apple iPads), for use by (i) building/property owners, builders, architects, insurance companies/agents as shown in FIGS. 58 through 58H, and also (ii) fire-protection building spray technicians and administrators as shown in FIGS. 59 through 59K.

Figure 58F:
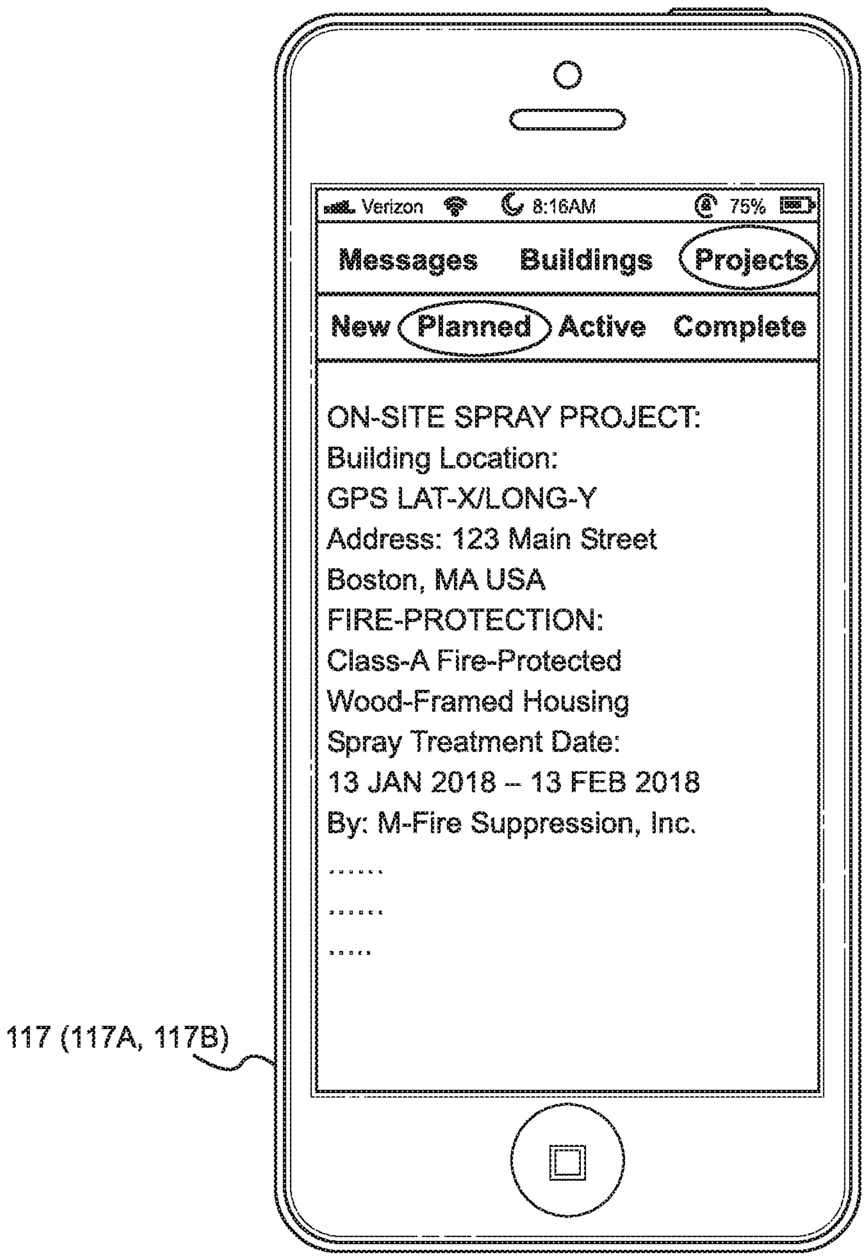
FIG. 58F is an exemplary wire frame model of a graphical user interface of the mobile application configured for use by building/property owners, insurance companies, and other stakeholders to review when a planned on-site wood-building Class-A fire-protection spray treatment project is planned, using the monitoring services supported by the system network of the present invention.

FIG. 58F shows a graphical user interface of the mobile application 120 configured for use by building/property owners, insurance companies, and other stakeholders to review when a planned on-site wood-building Class-A fire-protection spray treatment project associated with the user is planned, using the monitoring services and carbon quantization services supported by the system network 100.

Figure 58G:
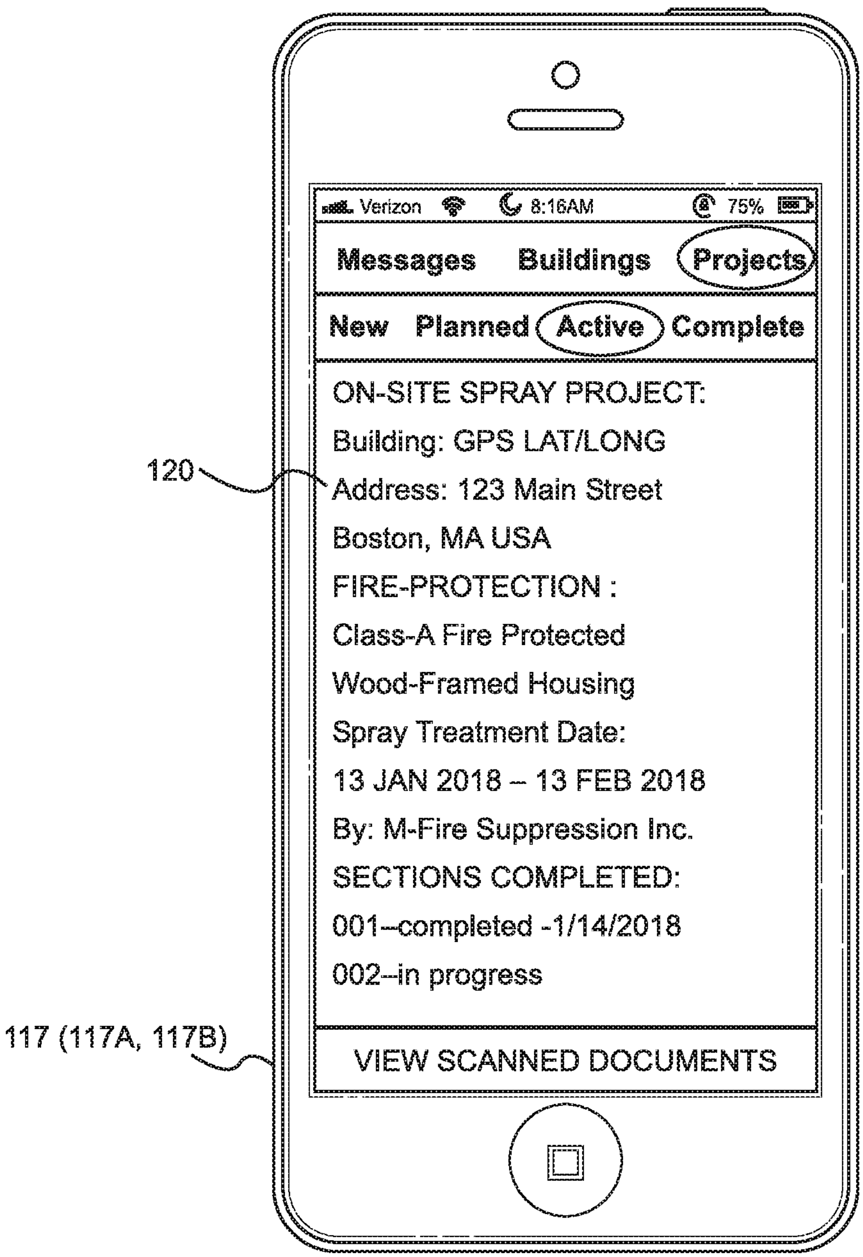
FIG. 58G is an exemplary wire frame model of a graphical user interface of the mobile application configured for use by building/property owners, insurance companies, and other stakeholders to review an active on-site wood-building Class-A fire-protection spray treatment project, including its currently fire-protected carbon-quantized units, using the monitoring services supported by the system network of the present invention.

FIG. 58G shows a graphical user interface of the mobile application 120 configured for use by building/property owners, insurance companies, and other stakeholders to review any active on-site wood-building Class-A fire-protection spray treatment project associated with the user, using the monitoring services and carbon-quantization services supported by the system network 100.

Figure 58H:
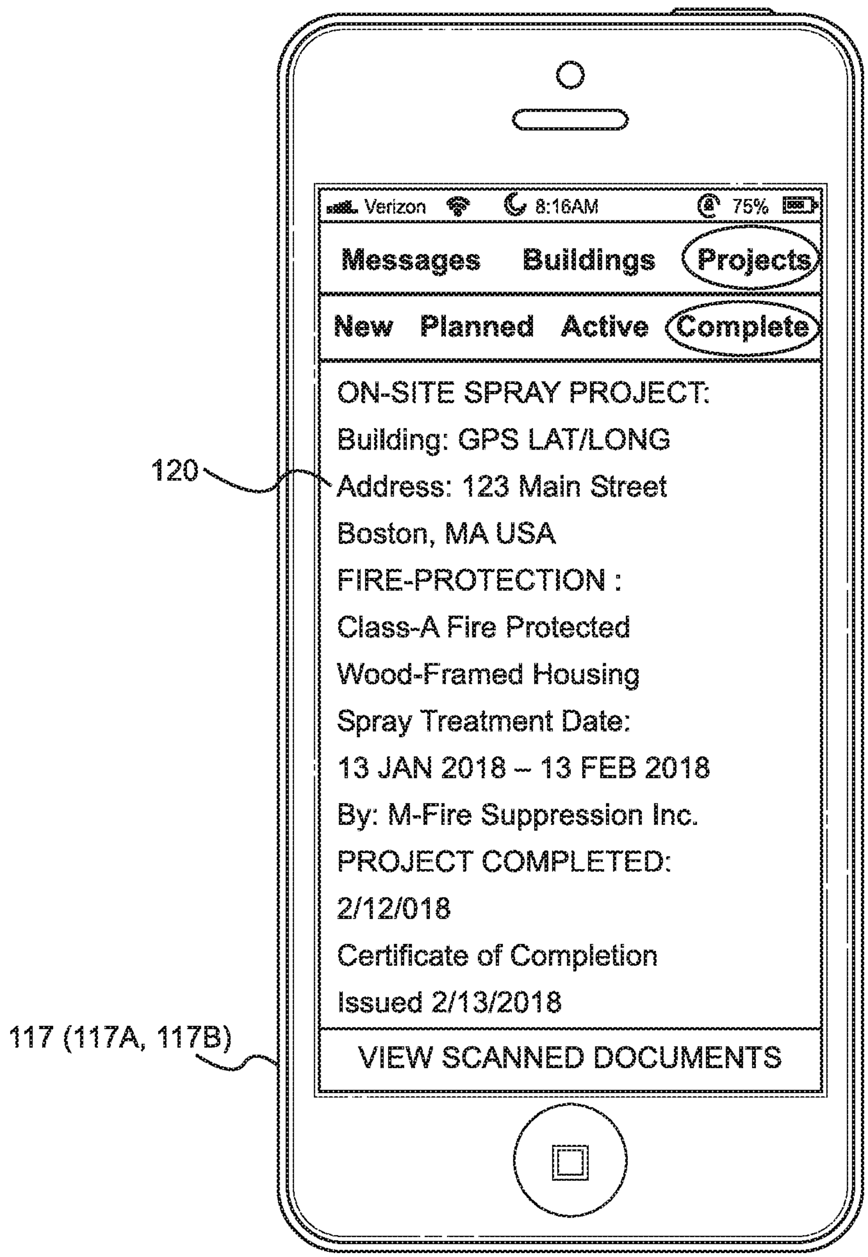
FIG. 58H is an exemplary wire frame model of a graphical user interface of the mobile application configured for use by building/property owners, insurance companies, and other stakeholders to review an completed on-site wood-building Class-A fire-protection spray treatment project, including its quantized Fire-Protected Carbon Units (FPCU), using the monitoring services supported by the system network of the present invention.

FIG. 58H shows a graphical user interface of the mobile application configured for use by building/property owners, insurance companies, and other stakeholders to review any completed on-site wood-building Class-A fire-protection spray treatment project associated with the user, using the monitoring and carbon-quantization services supported by the system network 100.

Specification of Services Supported by the Graphical User Interfaces Supported on System Network of the Present Invention for Use by On-Site Fire-Protection Spray Administrators and Technicians Supported by the System Network FIG. 59 shows an exemplary graphical user interface (GUI) 126 configured for the mobile application 120 used by on-site fire-protection spray administrators and technicians supported by the system network 100.

As shown in FIG. 59, this exemplary GUI screen 126 supports a number of pull-down menus under the titles: Messages 126A, where project administrator and spray technicians can view messages sent via messaging services supported by the mobile application 120; Buildings 126B, where projects have been scheduled, have been completed, or are in progress, with status notes, terms, conditions and other considerations made of record; Projects 126C, which have been have been scheduled, have been completed, or are in progress, and where uploaded authenticated certification of completions can be reviewed, downloaded and forwarded as needed; and Reports 126D, on on-site spray-applied fire-protection projects and buildings being managed by the mobile application 120 running on client computing systems 117 in operable communication with the web, application and database servers 111, 112 and 113 at the data center 110 shown in FIG. 55.

FIG. 59A shows a graphical user interface of the mobile application 120 configured for use by on-site fire-protection spray administrators and technicians to send and receive (via email, SMS messaging and/or push-notifications) with registered users, using messaging services supported by the system network 100.

FIG. 59B shows a graphical user interface of the mobile application 120 configured for use by on-site fire-protection spray administrators and technicians to update a building information profile associated with the user, using the building profile services supported by the system network 100.

FIG. 59C shows a graphical user interface of the mobile application 120 configured for use by on-site fire-protection spray administrators and technicians to review a building spray-based fire-protection project associated with the user, using services supported by the system network 100.

FIG. 59D shows a graphical user interface of the mobile application 120 configured for use by on-site fire-protection spray administrators and technicians to review the status of any building registered with the system network and associated with the user, using services supported by the system network 100.

FIG. 59E shows a graphical user interface of the mobile application 120 configured for use by on-site fire-protection spray administrators and technicians to create a new project for spray-based Class-A fire-protection treatment of a wood-framed building, using services supported by the system network 100.

FIG. 59F shows a graphical user interface of the mobile application 120 configured for use by on-site fire-protection spray administrators and technicians to review the status of any planned building fire-protection spray project associated with the user, using services supported by the system network 100.

FIG. 59G shows a graphical user interface of the mobile application 120 configured for use by on-site fire-protection spray administrators and technicians to review the status of an active in progress building fire-protection spray project associated with the user, using services supported by the system network 100.

FIG. 59H shows a graphical user interface of the mobile application 120 configured for use by on-site fire-protection spray administrators and technicians to review any completed building fire-protection spray project associated with the user, and all documents collected therewhile, using services supported by the system network 100. As shown, this wood-framed building stores an particular quantity of fire-protect carbon (mass) units (FPCUs) as estimated, recorded and reported using the carbon quantization services supported by the system network 100 of the present invention.

FIG. 59I shows a graphical user interface of the mobile application 120 configured for use by on-site fire-protection spray administrators and technicians to generate and review reports on projects which have been scheduled for execution during a particular time frame, which have been already completed, or which are currently in progress, using the services of the system network 100. As shown, this wood-framed building stores an particular quantity of fire-protect carbon (mass) units (FPCUs) as estimated, recorded and reported using the carbon quantization services supported by the system network 100 of the present invention.

FIG. 59J shows a graphical user interface of the mobile application 120 configured for use by on-site fire-protection spray administrators and technicians to generate and review reports on supplies used in fulfilling on-site class-A fire-protection building spray projects managed using the services of the system network 100.

FIG. 59K shows a graphical user interface of the mobile application 120 configured for use by on-site fire-protection spray administrators and technicians to generate and review reports on registered users associated with particular on-site class-A fire-protection building spray projects managed using the services of the system network 100.

Figure 60B:
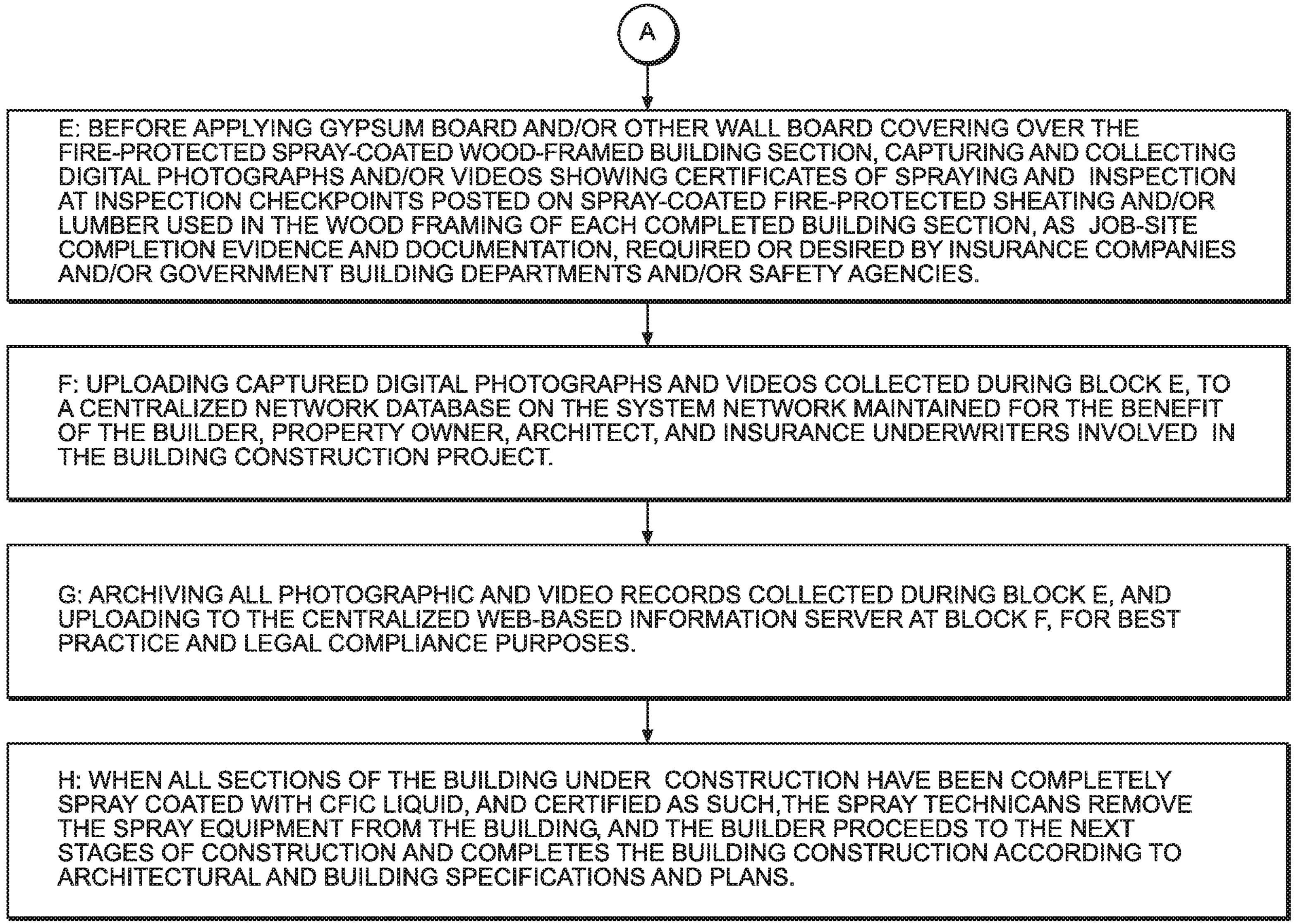

Specification of Method of Verifying and Documenting On-Site Spray-Applied Class-A Fire-Protection Over Wood- Framed Buildings During Construction Using the On-Site Wood-Frame CFIC Liquid Spraying System FIGS. 60A and 60B describe a method of verifying and documenting on-site spray-applied Class-A fire-protection over wood-framed buildings during construction using the on-site wood-frame CFIC liquid spraying system 100 shown in FIGS. 49 through 53. A description of this method is appropriate at this juncture.

As indicated at Block A in FIG. 60A, after a builder completes each predetermined section of a wood-framed building where wood-framing has been constructed and (plywood or OSB) sheathing installed, but before any wallboard has been installed, the spray technician uses an airless liquid spraying system 101 filled with clean fire inhibiting chemical (CFIC) liquid to spray the CFIC liquid over all exposed interior wood surfaces in the completed section of the wood-framed building.

As indicated at Block B in FIG. 60A, when the completed section of the wood-framed building is spray coated with CFIC liquid, the completed wood-framed building section is certified and marked as certified, with a barcoded/RFID-tagged inspection checkpoint 300 (with certificates of spraying and inspection) mounted at checkpoint locations in the completed section of the building, then certified and verified with signatures by the spray applicator and on-site spray supervisor manager (and optionally building site superintendent), and digitally documented by scanning and data capturing photos and/or audio-video recordings of the signed inspection checkpoint event, as shown in FIGS. 51A and 51B and FIGS. 63 and 64, and using the mobile application 120 for uploading the captured documents to the barcoded-project folder in the network database 113A on the system network 100, for subsequent visual inspection and insurance documentation purposes, as shown FIG. 61. Fire-protected carbon units (FPCUs) are estimated and recorded in the network database 113A using the carbon quantization engine 500 over the network 100 of the present invention. At this stage, the mobile application 120 running on a mobile computer 117, 137 can be used to make a request for carbon quantization of the wood used in the completed wood-framed or mass timber building section. By making such a request, the fire-protected carbon (mass) units that are stored in the fire-protected wood will be automatically estimated, recorded and reported using the carbon quantization engine 500 running over the network 100 of the present invention.

As indicated at Block C in FIG. 60A, as each section of the wood-framed building is constructed according to the construction schedule, the spray coating team continues to spray coat the completed section with CFIC liquid (e.g. Hartindo AF31), and certify and mark, using barcoded/RFID-tagged certificates of inspection (at inspection checkpoints) 300, each such completed spray coated section 118 (118A, 118B, 118C) of the building under construction.

As indicated at Block D in FIG. 60B, when the spray project is completed, the spray technician and supervisor then issue a time/date stamped "certificate of completion" certifying that clean fire inhibiting chemical (CFIC) liquid spray has been applied to all exposed interior wood surfaces on the interior of the wood-framed building during its construction phase, thereby providing the sprayed wood-framed building with Class-A fire-protection and defense against risk of total destruction by fire.

As indicated at Block E in FIG. 60B, before applying gypsum board and/or other wall board covering over the fire-protected spray-coated wood-framed building section 118, the mobile application 120 on mobile computing device 117 is used to capture and collect digital photographs and/or videos showing certificates of inspection at inspection checkpoints 300 posted on spray-coated fire-protected sheathing and/or lumber used in the wood framing of each completed building section, as visual evidence and job-site completion documentation, required or desired by insurance companies and/or government building departments and/or safety agencies. Preferably, each completed section of the wood-framed building should be assigned a section number by the builder, and if not by the builder, then by the spray application administrator, so that each certificate of completion, stamped on the wood surface of each section of the wood-framed building, and signed and dated by the on-site CFIC liquid spray applicator and on-site manager, will be digitally captured as images and/or AV recordings, and then uploaded to the system network database under the project ID number for project verification and documentation purposes.

As indicated at Block F in FIG. 60B, uploading captured digital photographs and videos collected during Block E to the centralized network database 113A on the system network 100, maintained by the fire-protection spray coating technician company, or its agent, as a valued-added service provided for the benefit of the property/building owner, builder, architect, home-owner and/or insurance companies involved in the building construction project.

As indicated at Block G in FIG. 60B, archiving all photographic and video records collected during Block E and uploading to the centralized web-based information server 111 at Block F for best practice and legal compliance purposes.

As indicated at Block H in FIG. 60A, when all sections of the building under construction have been completely spray coated with CFIC liquid, and certified as such, the spray technicians remove the spray equipment from the building, and the builder proceeds to the next stages of construction and completes the building construction according to architectural and building specifications and plans.

By virtue of the Web-based system network 100 described above, it is now possible for professional fire-protection specialists to (i) visually document the spraying of CFIC liquid over all exposed interior wood-surfaces of a wood-framed building under construction so as to achieve Class-A fire-protection, and (ii) after certifying with signatures, the proper on-site spray application of CFIC liquid, and Class-A fire-protection treatment of the wood-framed building, to capture and upload digital photographs and AV-recordings of certificates and related stamps, markings and signatures to a centralized website (e.g. system network database 113A), at which such uploaded and archived digital documents can be reviewed and downloaded when needed by architects, insurance companies, their inspectors, building owners, governmental officials, fire marshals and others who have a stake or interest in the matter of building fire-protection compliance and authentication. This remotely accessible facility, supported by the system network 100 of the present invention, provides a valuable and useful service to property/building owners, insurance underwriters, financial institutions (e.g. banks), and others who have great stakes in ensuring that particular wood-framed buildings have been properly Class-A fire-protected using the spray-treatment methods of the present invention described in great detail hereinabove.

Specification of an Exemplary Embodiment of the System Network of the Present Invention Used During the Management of the Logistical Operations and Certifications Made and Documented During Class-A Fire-Protection Spray Treatment of Wood-Framed Buildings During the Construction Phase The system network 100 of the present invention has been described in great detail above in connection with ways in which to verify and document the CFIC liquid spray treatment of wood-framed buildings on job sites during the construction phase, so that the various stakeholders will have remote access to a secure database 113A containing photographic and audio-visual recording documentation, relating to certifications, verifications and documentation of each CFIC liquid spray project managed using the system network 100 of the present invention. However, when practicing the present invention, it is understood there will be many different ways to implement the useful concepts embraced by such inventions, when deploying and using a system network 100 to manage such operations across any enterprise of local, national or global scope. To help teach those with ordinary skill in the art to practice the present invention, an illustrative embodiment will be described at this juncture with reference to FIGS. 61A through 64.

Figure 61A:
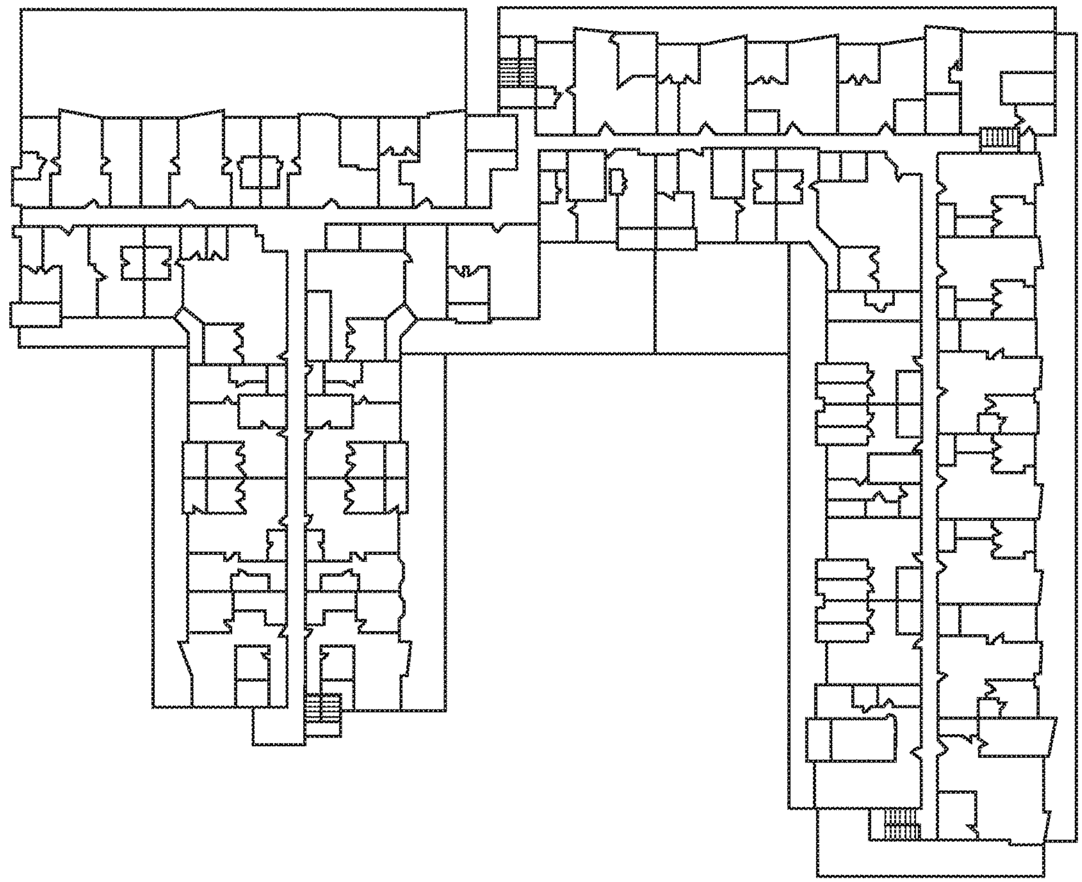
FIG. 61A is a schematic representation of architectural floor plans for a wood-framed building scheduled to be sprayed with CFIC liquid to provide exposed interior surfaces with Class-A fire-protection.
Figure 61B:
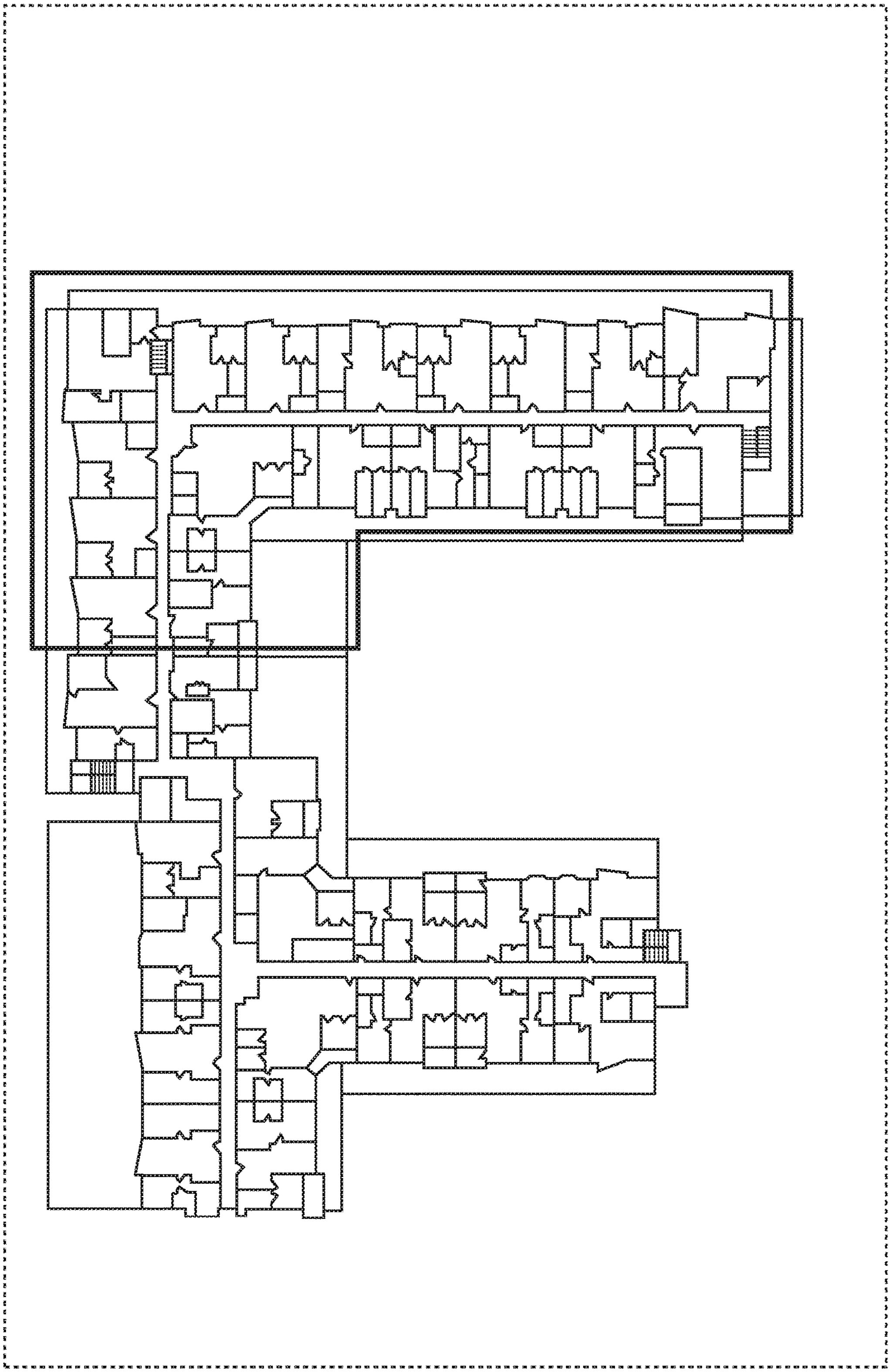
FIG. 61B is a schematic representation of architectural floor plans for a wood-framed building, with a section marked up by the builder, and scheduled to be sprayed with CFIC liquid to provide Class-A fire-protection.
Figure 61C:
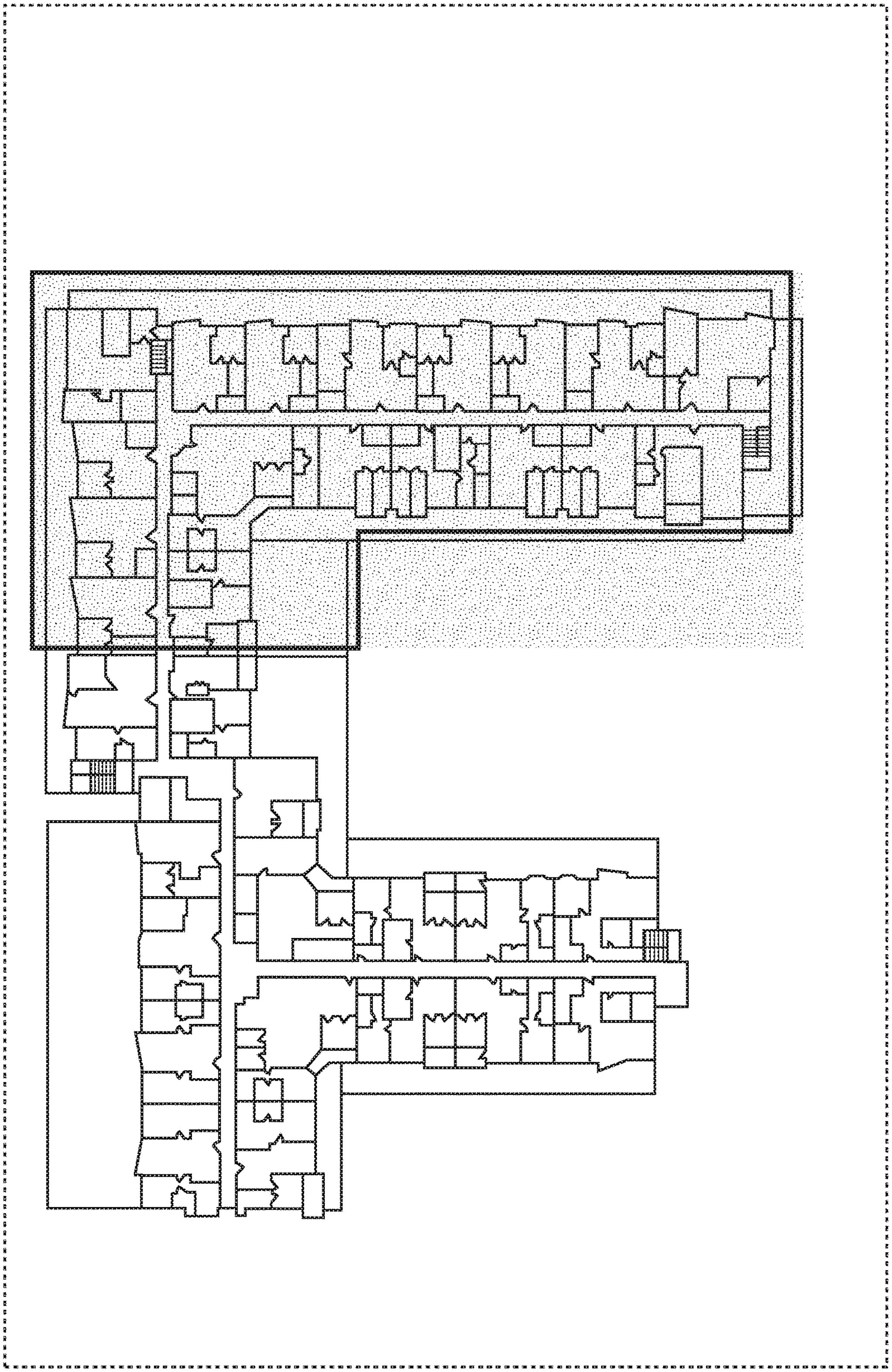
FIG. 61C is a schematic representation of marked-up architectural floor plans indicating a completed section that has been sprayed with CFIC liquid to provide exposed interior surfaces with Class-A fire-protection.

FIG. 61A shows architectural floor plans for a wood-framed building scheduled to be sprayed with CFIC liquid to provide exposed interior surfaces with Class-A fire-protection. These floor plans will be uploaded and stored in the network database 113A in the document folder/directory of the project. FIG. 61B shows architectural floor plans for an exemplary wood-framed building, with a section marked up by the builder (indicated in dark thick lines), and scheduled to be sprayed with CFIC liquid to provide Class-A fire-protection. FIG. 61C shows marked-up architectural floor plans indicating a completed section that has been sprayed with CFIC liquid to provide exposed interior surfaces with Class-A fire-protection. All such marked-up floor plans will also be stored in the network database 113A as part of the project's document package, as will be explained in greater detail herein below.

On the exemplary system network 100, the following stakeholders will be supported and use the mobile application 120 (or web-browser equivalent) during a spray project on a building construction site for the following purposes:

- Sales Representative—who contacts the building owner, construction site manager, building architect and/or property owner and makes a sales pitch for delivering fire protection spray service of the present invention at a specific job site construction site, supported by the enterprise-level software platform of the present invention, wherein all communications are managed using a customer relationship management (CRM) module supported on the platform.
- Project Coordinator—who initiates each "project" (for job site fire protection spray process/service on a specific construction job site) and track the progress of the job site spray service project.
- CFIC Supply Chain Manager (186)—who initiates or begins the chain of custody of the supply of CFIC materials in CFIC shipping totes (i.e. CFIC liquid concentrate in totes for use undiluted, or diluted with water at job sites, or CFIC dry power in totes for mixing with water at job sites), but placing a purchase order (PO) to remove CFIC totes from inventory.
- Job Site Spray Manager—who continues the chain of custody and electronically notify the site spray technician where they need to spray and then review to see if it has been sprayed.
- Job Site Spray Technicians—who continues the chain of custody and perform job site spray over all sprayed areas through out the wood framed building during construction.
- Spray Administrator Management—who reviews progress of the job site fire protection spray project
- Construction Workers—who are working on the construction job site while fire protection job site spray process is being performed.
- Building Owners (i.e. Customers or site superintendent)—To continue the chain of custody and to order the spray contractor to spray parts or sections of their buildings
- Building Construction Manager—who manages one or more construction projects of a particular Builder.
- Job Site Construction Manager—who managers the job site of a specific building under construction.
- Construction Insurance Underwriters—who review real-time progress and/or documentation of a job site spray process during the construction of a wood-framed building to determine how much reduction in fire risk insurance premiums the wood-framed building shall revive after the fire and smoke risk profile of the wood-framed building has been reduced by the application of fire protection spray service.
- Property Insurance Underwriters—who review real-time progress and/or documentation of a completed job site spray process after the construction of a wood framed building to determine how much reduction in fire risk insurance premiums a wood-framed building shall revive after the fire and smoke risk profile of the wood-framed building has been reduced by the application of fire protection spray service.
- Risk Engineering Managers—who work with Construction and Property Insurance Underwriters to determine the construction and fire risk profiles of specific construction sites and buildings, and the insurance premiums to be paid for specific levels of insurance coverage on any particular wood-framed building construction site or project, during and after construction.
- Fire Fighters and Fire Departments—To check if a building fire, to which they are responding, has been defended from fire using CFIC liquid spray treatment disclosed and taught herein.
- Police Departments—to check job site premises for suspicious activity or conditions
- Local Building Inspectors—who inspect local buildings under construction for building code compliance
- Building Architects who provide architectural plans for the wood-framed building and supervisor during construction.
- Financial Institutions (e.g. Banks) who provide construction financing and have an interest in seeing all building materials including lumber being protected from fire during the construction phase of the building.
- Local Neighbors The system network 100 and its distribution of mobile computing devices (running mobile application 120 or web-browser equivalents) will have the capability to list all spray projects linked to the user, wherein each project contains numerous project details and information of different relevance to different stakeholders. In the illustrative embodiment, all projects will be searchable by customer name then project name. The building owners (often referred to as the "customer" with respect to the spray contractor) will only be able to access their projects, not the projects of others which will be maintained confidential on the system network 100. The mobile application 120 will be able to send push-notifications where required, and users will choose what notifications they want to receive. For example, the customer's insurance company will have the option to only be notified when a portion of the building has been sprayed, or when only an entire floor has been sprayed.

Upon creating a new project on the system network 100, the spray project coordinator will use the mobile application 120 to add various information items regarding the project, in the network database 113A, including, for example: Customer Name (e.g. Building Owner Name); Project Name; Site Address; Superintendent's name and title, mobile number, email address; number of buildings associated with the project.

The mobile application 120 will then start with building 1 or building A, and prompt the user for the following information: Identify Building Type—by choosing a type from a drop down menu (i.e. apartment, townhouse, house, etc.). If the Building Type is an apartment, then the user will be asked to describe the building (i.e. 3, 4 or 5 stories, square footage, total number of suites).

Figure 62A:
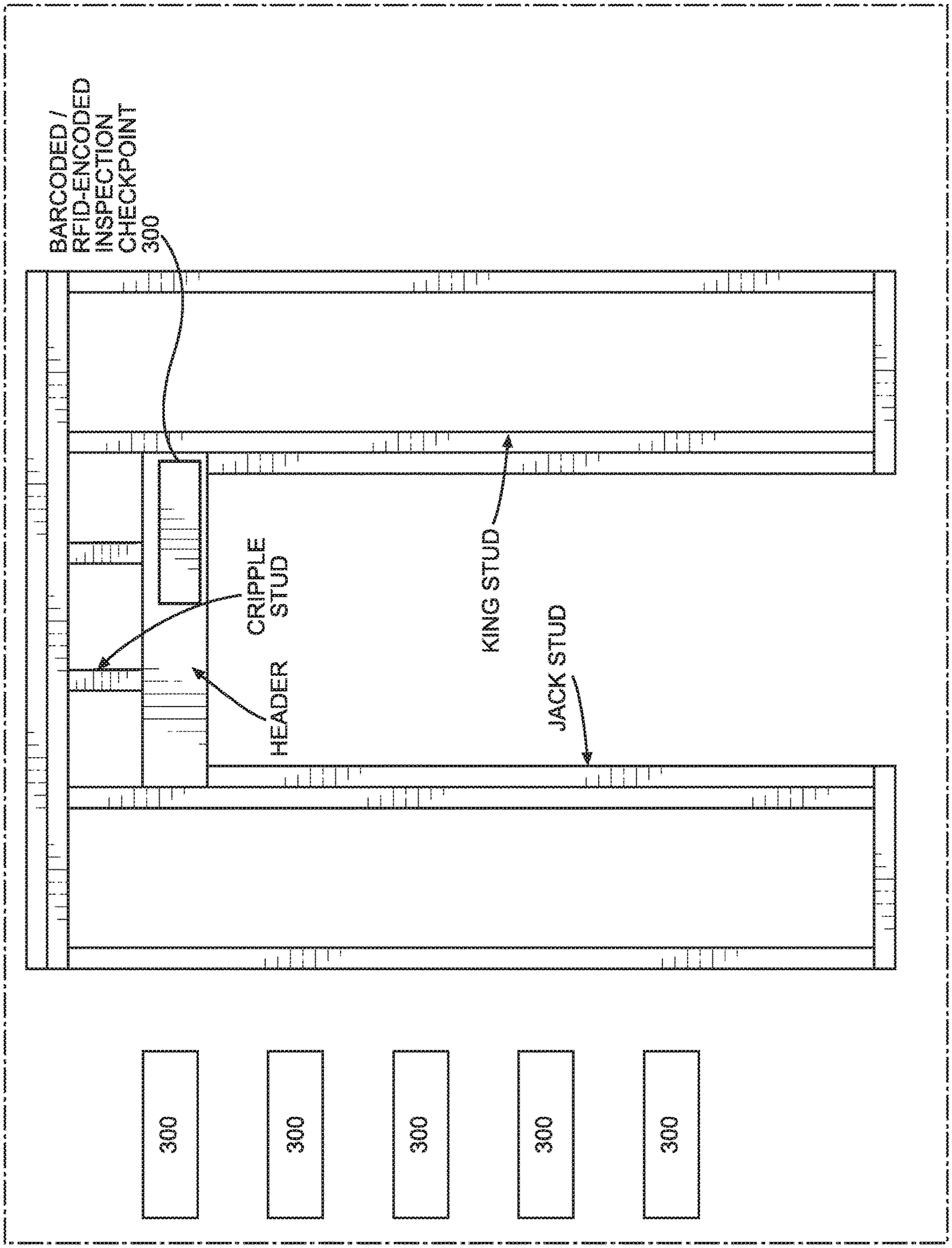
FIG. 62A is a schematic representation of a wood-framed door panel showing the studs and header above a doorway, on which the barcoded/RFID-tag encoded inspection checkpoint, realized on a piece of flexible plastic material and supporting a barcode symbol and RFID tag, certification by a spray technician and spray supervisor and fire-protected carbon units (FPCUs), showing greater detail in FIG. 62B.
Figure 62B:
FIG. 62B is a schematic representation of a barcoded/RFID-tag encoded inspection checkpoint, shown in FIG. 62A, with integrated certifications by spray technician liquid and spray supervisor.
Figure 63:
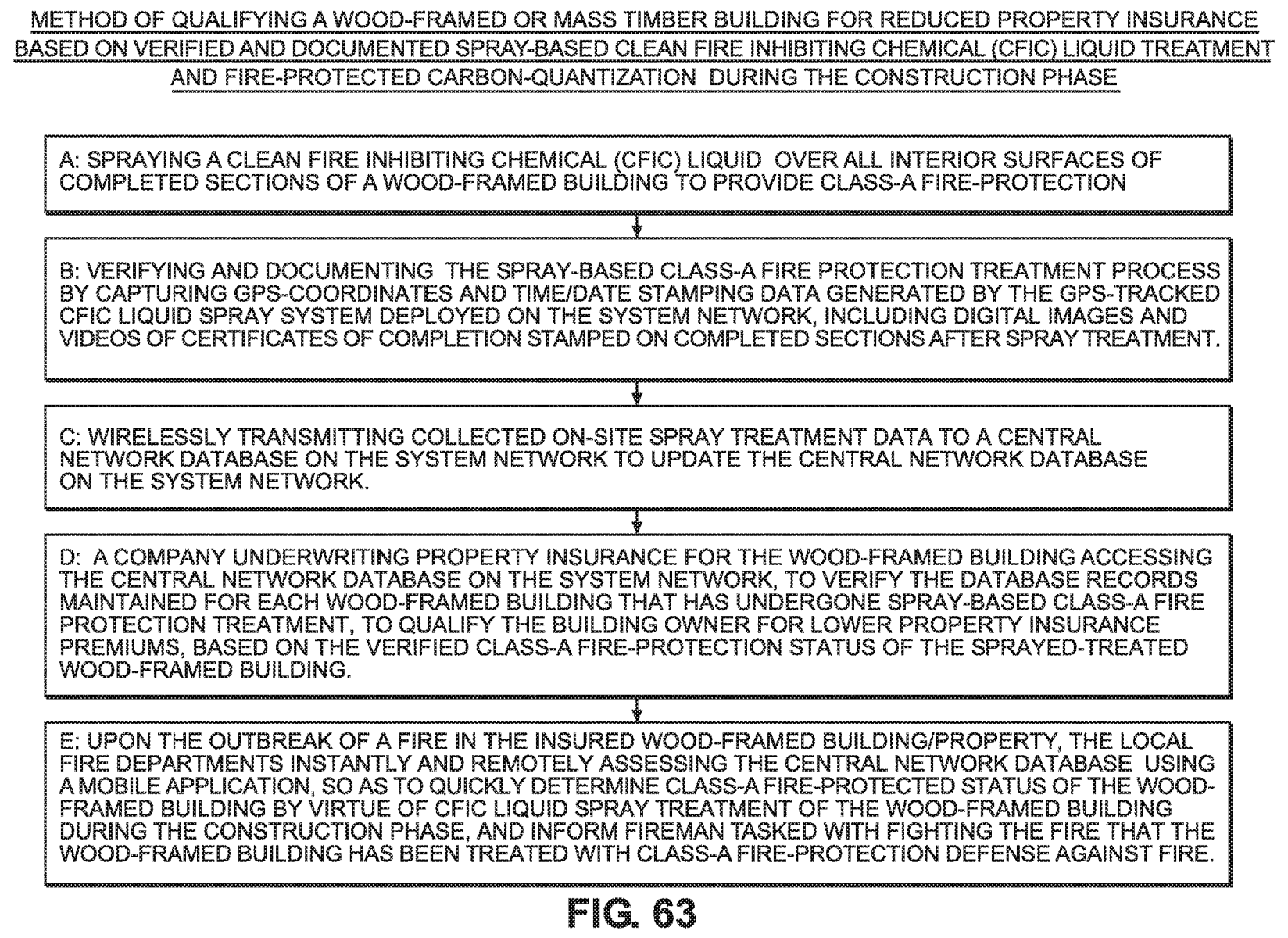

Mobile application 120 has the capability to import one or more pdf documents of each floor plan of the building into the project folder on the network database 113A, as shown in FIG. 62A. At this stage, the mobile application 120 will ask the user to import one or more pdf document(s) of the floor plan of each floor in the building, and will ask to identify the building, floor, and provide other information for subsequent use and marking. In particular, the application servers 112 will support advanced pdf document processing software enabling the users to index imported building floor plans to indicate the precise location where barcoded/RFID-tagged inspection checkpoints 300 (with integrated certificates of spraying, certificates of inspection) shown be posted during the project, as shown in FIGS. 62 and 63, for purposes of illustration.

The mobile application 120 will also request from the spray project coordinator, a Project Start Date when spray technicians should be begin spraying, in coordination with the construction schedule. Once the project has been created, the mobile application 120 will automatically send a push notification to: CFIC supply manager; building site coordinator; and spray administrators. Each user will be invited to project, with certain rights and privileges as determined and set by the spray project administrator (i.e. fire-protection provider administrator).

Figure 64:
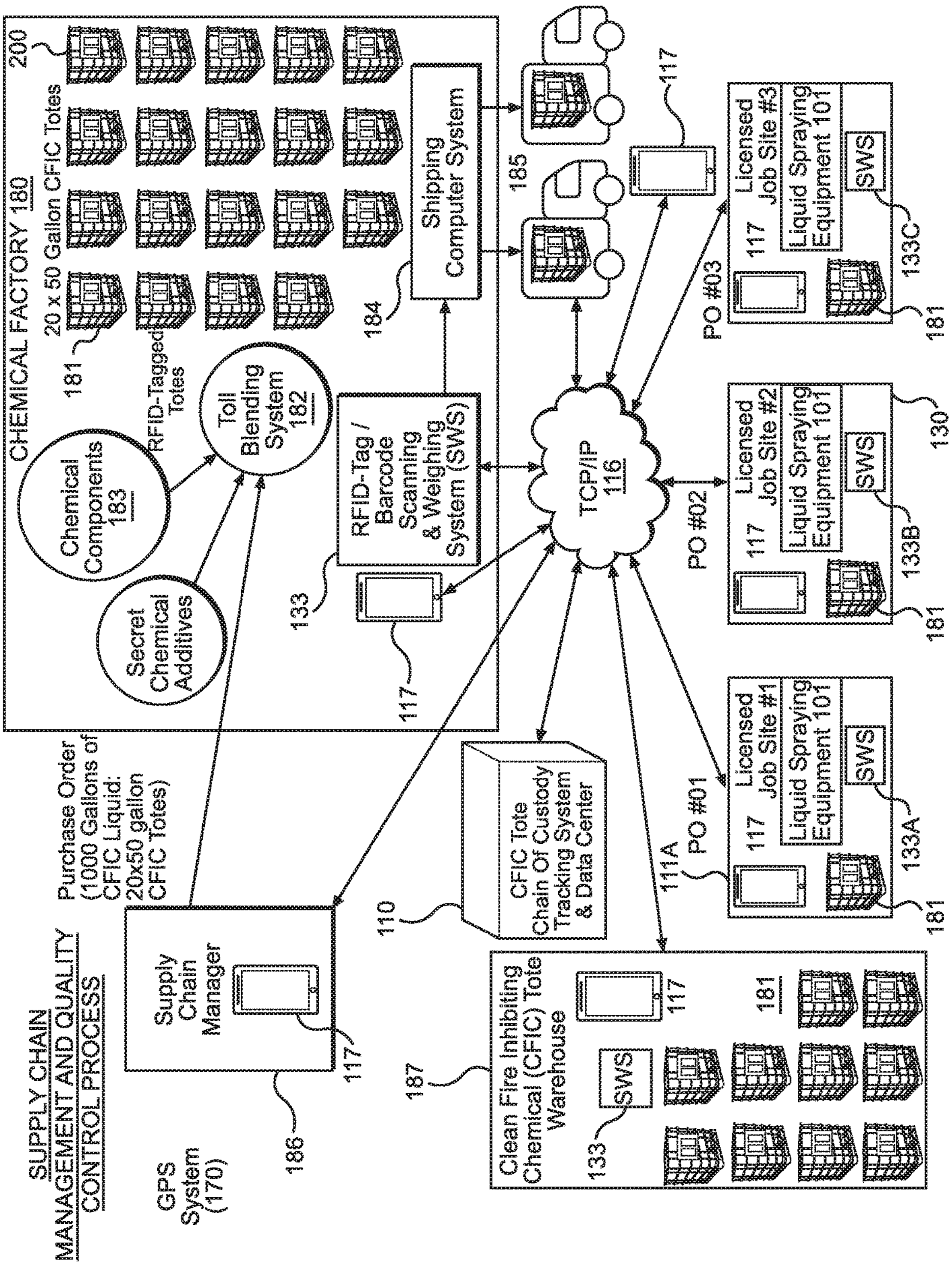
FIG. 64 is schematic diagram of the supply chain management and quality control (QC) process supported by the system network of the present invention, shown in FIG. 55, wherein the CFIC tote chain-of-custody, GPS tracking and inventory management system application is deployed to manage and control the weight and quality of the contents in each CFIC tote from the time of shipment from the chemical blending factory up to the time of arrival at the customer job site where the CFIC tote is received from the chemical factory or warehouse, then either accepted or rejected depending on the comparative weight measurements of the shipped CFIC totes made at the receiving job site using a digital code scanning and weighing (scale) system (SWS), so as to add each scanned and weighed CFIC tote into the inventory of the licensed spraying concern.

When the barcoded/RFID-tagged CFIC totes 181, 181' shown in FIGS. 64 and 76, are ready to be filled or shipped, the mobile application 120 will prompt the CFIC Supply Manager 186 for various items of information relating to CFIC material required on certain building sites, in connection with specific projects. The user will navigate to the project on the mobile application 120, and will store the CFIC tote 18, 181' information that multiple CFIC totes 181 are required per project. For purposes of the present invention, the term "tote" shall mean any device fashioned to contain and hold a predetermined quantity of CFIC material, whether in dry power form, or concentrated liquid form, and may include bags, containers, bottles, or any other type of vessel capable of perform functions of containment and carrying. Each barcoded/RFID-tagged CFIC tote 181, 181' shall have a locking mechanism, preferably a combination-type lock but may be realized using a key-based mechanism, to keep unauthorized individuals from opening the lock and accessing the chemical contents contained with the barcoded/RFID-tagged CFIC tote 181, 181'. Estimates of CFIC material, based on the size of the building spray job, can be calculated using tables and other knowledge possessed by the CFIC supply chain manager, and may be automated using AI-based processes. In an illustrative embodiment, the user will select one of the following buttons; Add a CFIC Tote; Ship A CFIC Tote. If the user selects "add a CFIC tote" then they will be prompted for the following; the date (chosen from a calendar), the CFIC tote number, the size of the CFIC tote, dye (yes or no) mold protection (yes or no). If the user wants to "ship a CFIC tote", then the user navigates to the project and selects the "ship a CFIC tote" button and chooses the CFIC tote the user wants to ship from a drop-down menu. The user will then pick a date from a calendar. The user will have to enter the ship date and the arrival date and name of the shipping carrier.

Once the CFIC tote 181, 181' arrives at building job-site, the building site supervisor will log into the system network via the mobile application 120, and perform the following system network operations. The building site supervisor (i.e. customer) will navigate to the project on the mobile application 120, and sign off that the CFIC tote has arrived at the job site, with its locks intact and that CFIC tote 181, 181' has not been tampered. The site supervisor will use his/her finger to sign this confirmation in the mobile application 120.

When the building owner (i.e. customer) wants to request a completed portion or section of a wood-framed building to be sprayed-treated with CFIC liquid, the building site supervisor will perform the following system network operations. The building site supervisor use the mobile application 120 to navigate to their project and enter the portion of their building they want sprayed with CFIC liquid. The building site supervisor will indicate the date the request was made, building number, the floor and the suites they want sprayed and date they want it sprayed. The mobile application 120 will send a notification via the mobile application 120 to the project coordinator, to let them know the request has been made. The spray project coordinator will use the mobile application 120 to either accept the requested spray date, or propose a new spray date to the building site supervisor. If the spray project coordinator (i.e. fire protection provider) accepts the proposed spray date, then a confirmation will be sent to the building site superintendent via the system network using the mobile application 120.

Once the spray contractors (i.e. fire protection providers) arrive on-site of the building and are ready to spray CFIC liquid as requested, the site spray technician will perform the following operations in the system network 100 using the mobile application 120. The site spray technician will mix a CFIC tote 181, 181' (e.g. by adding water to a tote contain CFIC liquid concentrate, or by adding water to the tote containing AAF31 powder and dye, if the project requires dye). If the project requires mold protection, then that chemical component will be added at the time the CFIC tote is mixed on site), and the spray technicians will sign in to the mobile application 120, navigate to the project page, and click on "on-site CFIC tote preparation". The spray technicians will choose the CFIC tote identification number from the drop-down list (previously updated by the CFIC supply chain manager 186) and then enter the date, by clicking on a calendar date. The spray technicians will indicate if they have added dye, and or mold protection to the CFIC material.

When the spray date arrives, the building site superintendent will do a walk through of the intended spray area (i.e. floor plan) and inspect to make sure the area is ready to spray all exposed interior wood surfaces with CFIC liquid. The building site superintendent will attach an RFID tag and/or bar code symbol label at each inspection checkpoint 300 marked on the floor plans of the wood-framed building to be spray-treated with CFIC liquid spray, indicated in FIG. 61B. Each RFID tag and/or bar code symbol will be encoded with a unique code identifier that is marked on the floor plan, and uniquely associated with the project, and added to the network database 113A on the system network.

Preferably, the spray site superintendent will mount a barcoded/RFID-encoded inspection checkpoint 300 (bearing a certificate of spraying by the spray technician and a certificate of inspection by the spray supervisor and optionally the building site supervisor, printed on a thin flexible plastic sheet, on which a barcode symbol/RFID-tag are mounted) to (i) the entry door header of each room in each unit including the entrance to the unit, as illustrated in FIG. 62, and also (ii) a stud located at every 10' on one side of the hallway. Expectedly, the location of each barcoded/RFID-tagged inspection checkpoint 300 in any given project will vary. However, placement of such inspection checkpoints 300 should be selected to ensure that inspection is sufficient granular in resolution to not overlook significant areas of a sprayed wood-framed building section under inspection.

Each barcoded/RFID-tagged inspection checkpoint 300 will include a bar code symbol and RFID tag that has a unique project/inspection-checkpoint identifier (e.g. an alphanumeric character string) encoded into the zymology used in the barcode symbol and RFID tag identifier, and this project/inspection-checkpoint identifier will be used to identify subfolders or subdirectories where collection data, information and documents are stored in the project folder on the network database 113A, maintained on the system network 100. The project/inspection-checkpoint identifier will be read during each scan/read of the barcoded/RFID-tag inspection checkpoint 300, and used by the mobile application to access the appropriate inspection checkpoint folder in the project folder where all such certifications of spraying, inspection and oversight, and photos, and videos are stored and archived for posterity.

At the beginning of each spray session, the spray technician will log into the system network 100 using the mobile application 120, then navigate to the project page, select his name from a drop down or scrolling list, and indicate when he started spraying by clicking on a date and hour, minutes, seconds. The spray technician may also need to scan his barcoded ID card using the mobile application 120 for proper authentication and/or authorization purposes. He may also choose to record the presence of other members of his spray crew using the mobile application and their barcoded user ID cards and network ID numbers. The spray technician will then proceed to spray each assigned section of the building, and during the spray process, the spray technician and/or supervisor may wear a head-mounted digital color camera 120C wirelessly interfaced to his/her mobile computing system 117, while running the mobile application 120, to capture live digital color video footage of the complete fire-protection spray process. the captured digital video recording of the fire protection spray process on each completed wood-framed section will be subsequently uploaded to and stored within the project folder maintained on the network database 113A in the data center 110. This video recording, and the signed confirmations and verifications captured and recorded as well during the fire protection spray project will also be stored in the network database 113A in the project folder and made available to fire insurance risk engineers and underwriters at a subsequent date, to confirm that the wood-framed building was in fact professional fire-protected on a given date/time.

After spraying each wood-framed building section, the spray technician will approach the barcoded/RFID-tagged inspection checkpoint 300 in the spray area, and read, sign and date the certification of spraying on the checkpoint substrate, mounted on the header surface illustrated in FIGS. 62 and 63. The spray technician should diligently read, sign and date each and every certificate of spraying at the inspection checkpoint 300, and treated as a condition of professionalism, duty, and employment, given the responsibility being entrusted to the individual with such operations.

At the end of the day, the spray technician will log into the system network 100, if already logged out, using the mobile application 120, and indicate the time when he finished spraying and indicate which suites on the floor plan pdf were sprayed with CFIC liquid. This will be done by drawing on his mobile computing device 117 (e.g. Apple iPad or Apple iPhone), by shading the PDF of the floor plan, over the appropriate suites and hallways, as shown in FIG. 61C, which were in fact sprayed with CFIC liquid during his work session that date. This is the same floor plan that was previously loaded on the mobile application 120 by the customer/building owner, as shown in FIG. 61A, but with the spray technicians markings added to the floor plan to indicate sections which have been spray treated with CFIC liquid.

At the end of each day or during the course of the day, the spray site superintendent will review the CFIC liquid spraying work performed on the job site that date, to ensure that the spray work has been completed properly.

The spray supervisor will visit each checkpoint 300, and read, sign and date the certificate of inspection at the inspection checkpoint 300 after performing a diligent inspection at and around the checkpoint where spraying occurred earlier that day. At each barcoded/RFID-tagged inspection checkpoint 300 on the plan, the spray site supervisor will also scan each and every barcoded/RFID-tag inspection checkpoint 300, and confirm with the system network 100 that the spray work at each inspection checkpoint has been completed properly. This process will involve displaying GUI screens on the mobile application 120 and checking off all suites/units and hallways have been completed and sprayed with CFIC liquid, and uploading such information to the project folder on the network database 113A on the system network 100. The process can also include capturing digital photos and AV-recordings of the site in the vicinity of each barcoded/RFID-tagged inspection checkpoint, verifying and documenting the certifications at each inspection checkpoint signed by the spray-technician after CFIC liquid spraying, and then uploading these captured digital photos and AV recordings to the project under the inspection checkpoint ID, within the network database 113A maintained by the system network 100.

Also, it is desired that the building site superintendent visit each checkpoint and read, sign and date the certificate of inspection/oversight by the building superintendent on the job site on that date. The building site superintendent should also use the mobile application 120 to capture digital images and videos of this certificate and competed inspection checkpoint, and surrounding areas treated with CFIC liquid by the spray technician. Images and video recordings of the spray technician and supervisor can be included at each and every barcoded/RFID-tagged inspection checkpoint 300 and uploaded to the project folder, under the barcoded/RFID-tagged inspect checkpoints 300 assigned to the project.

The above steps above will be repeated every time the spray crew arrives at the building site until the project is complete.

Each time a CFIC tote 181, 181' is mixed at the job site by the spray technician, he/she will spray six 1-foot long 2×4's test boards (301A, 301B) covering all sides (e.g. 3 sprayed test boards for spray administrator and 3 sprayed test boards for the customer). The sample test boards 301 will be marked with the tote number. Alternatively, CFIC liquid sprayed test boards 301 can be made at or near barcode/RFID-tagged inspection checkpoints 300 in the building, and marked with the barcode/RFID ID number, and date they were sprayed. The fact that these sample test boards 301 were created will be recorded using the mobile application 120 in either the CFIC tote supply record section of each project, or under a barcode symbol/RFID-tag ID section of the project. Digital images and videos of these sprayed test boards 301 can be captured and uploaded to project folder in the network database 113A maintained on the system network 100.

At the completion of the project, the spray site superintendent will check the box that the project is complete. The spray site superintendent will request the building project superintendent to sign that the project has been completed, and such documentation will be made part of the project files stored in the network database 113A on the system network 100. A physical certificate of completion document can be signed and dated and scanned into pdf format and stored in the project file in the network database 113A, using the mobile application 120 deployed on the system network 100. Once each stage of project has been completed (e.g. certain completed sections of the wood-framed building are completed), the system network 100 will automatically send an email, SMS/text and/or phone notification to the local fire department, local police department, the insurance underwriting company, the building owner (i.e. customer), and the spray project coordinator, and record all such notifications in the network database 113A for archival purposes. Such notifications will also be issued automatically by the system network's servers once the entire project has been completed, along with its certification of project completion. The system network 100 will automatically organize all documents, data and information collected during the course of the project, and compile for presentation to various parties including the building owner, and property insurance underwriters. The notifications provided to the above-mentioned parties, particularly the local fire departments and police departments, will be of great assistance in (i) instantly advising them which sections of any wood-framed building under construction in their jurisdiction has actually received Class-A fire-protection using the method of and apparatus of the present invention, and (ii) providing collected documents certifying such Class-A fire-protection, in the event that a fire should break out on in the wood-framed building during construction, and/or at any time after construction has been completed, and the building has received its certificate of occupancy.

The site spray technician will then collect all the sprayed samples 301A, 301B stored in barcoded storage sleeves 302A, 302B and deliver the first set of test samples 301A to the building site superintendent or the building's architect, while providing the second set of the sprayed test samples 301B to the spray supervisor to transport and archive in storage, as part of the fire protection provider's legal and business records. The spray technician will certify that he has provided the first set of sprayed test samples in storage sleeves to the building site superintendent, and the second set of sprayed test samples to the spray site superintendent. The building site superintendent will sign that he has received the sprayed test samples in their barcoded storage sleeves. The second set of sprayed test samples can be shipped to the fire protection provider's warehouse for archival purposes.

Method of Qualifying a Wood-Framed Building for Reduced Property Insurance Based on Verified and Documented Spray-Based Clean Fire Inhibiting Chemical (CFIC) Liquid Treatment of all Exposed Interior Wood Surfaces of the Wood-Framed Building During the Construction Phase Thereof FIG. 63 shows the high-level steps required to practice the method of qualifying a wood-framed building for reduced property insurance based on verified and documented spray-based clean fire inhibiting chemical (CFIC) liquid treatment of all of the exposed interior surfaces of the wood-framed building, after each completed section.

As indicated at Block A in FIG. 63, a clean fire inhibiting chemical (CFIC) liquid is sprayed all over all interior surfaces of each completed sections of a wood-framed building to provide Class-A fire-protection, as described above in FIGS. 60A and 60B, using the GPS-tracked/GSM-linked mobile clean fire-inhibiting chemical (CFIC) liquid spraying system 101, as shown in FIGS. 49, 50, 50 and 50B.

As indicated at Block B in FIG. 63, the spray-based class-A fire protection treatment process is verified and documented by capturing (i) GPS-coordinates and time/date stamping data generated by the GPS-tracked CFIC liquid spray system 101 deployed on the system network, and (ii) digital images, and audio-video (AV) recordings of certificates of completion 181 stamped on completed sections after spray treatment, as illustrated in FIGS. 51A and 51B, using the mobile application 120 on mobile computing device 117.

As indicated at Block C in FIG. 63, the collected on-site spray treatment verification data is wirelessly transmitted to a central network database 113A on the system network to update the central network database on the system network 109.

As indicated at Block E in FIG. 63, a company underwriting property insurance for the wood-framed building accesses the central network database 113A on the system network 100, to verify the database records maintained for each wood-framed building that has undergone spray-based Class-A fire protection treatment, to qualify the building owner for lower property insurance premiums, based on the verified Class-A fire-protection status of the sprayed-treated wood-framed building.

As indicated at Block E in FIG. 63, upon the outbreak of a fire in the insured wood-framed building/property, the local fire departments instantly and remotely assess the central network database 113A using a mobile application 120, so as to quickly determine Class-A fire-protected status of the wood-framed building by virtue of CFIC liquid spray treatment of the wood-framed building during the construction phase, and inform fireman tasked with fighting the fire that the wood-framed building has been treated with Class-A fire-protection defense against fire.

Method of and Apparatus for Managing the Chain of Custody, Quality Control, Tracking and Inventory of Clean Fire Inhibiting Chemical (CFIC) in CFIC Totes being Shipped from a Chemical Factory or Warehouse to a Network of Building Construction Job Sites FIG. 64 illustrates the supply chain management and quality control process supported by the system network of the present invention, shown in FIG. 55. As shown, the CFIC tote chain of custody and tracking system application is deployed to manage and control the weight of the contents in each CFIC tote from the time of shipment to time of arrival at the customer job site where the CFIC is received from the chemical factory or warehouse, and either accepted or rejected depending on the comparative weight measurements of the shipped CFIC totes made at the receiving job site using a digital code scanning and weighing scale system (SWS).

Figure 64A:
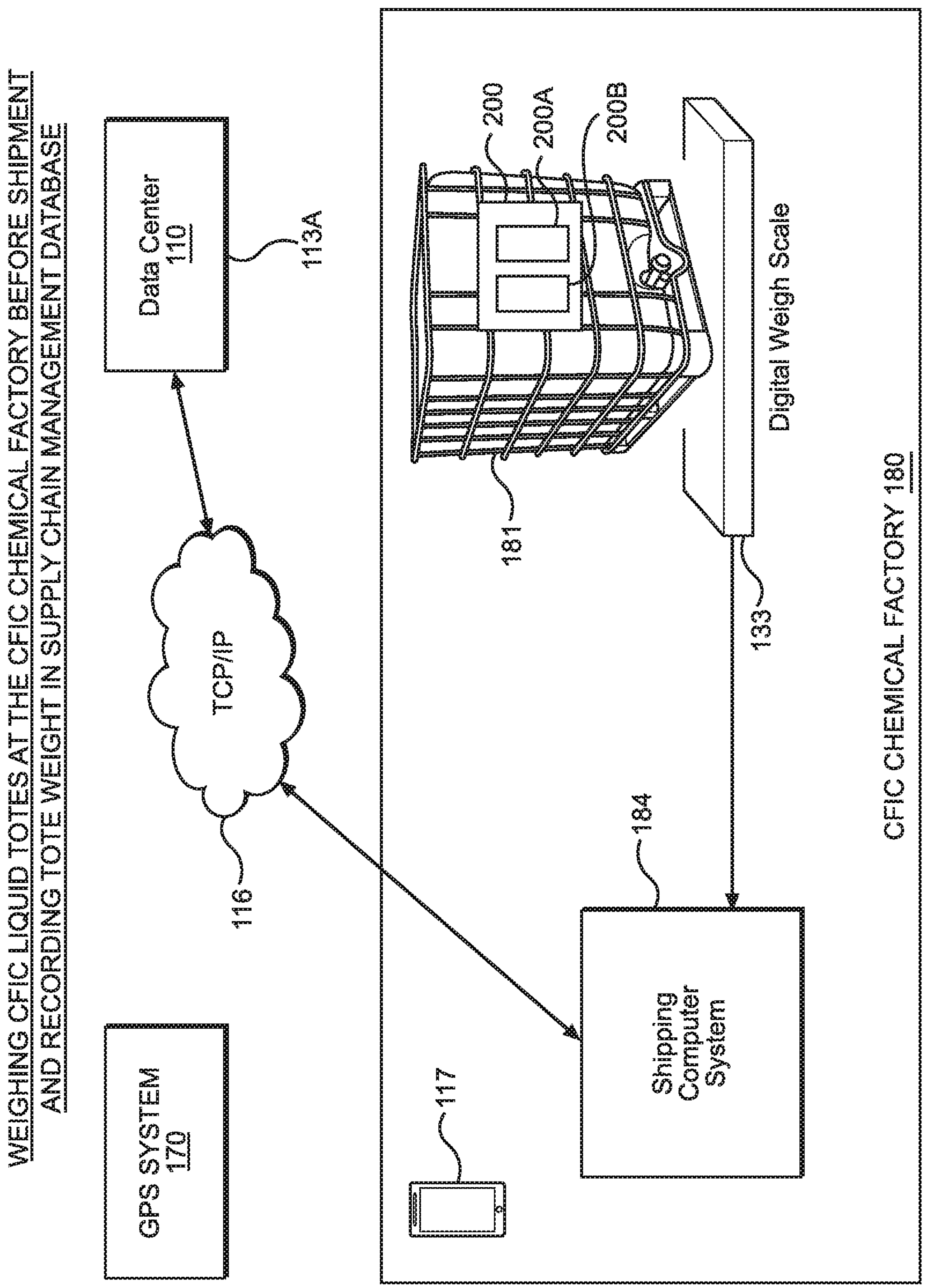
FIG. 64A is a schematic diagram illustrating the weighing of CFIC liquid totes at the CFIC chemical factory before shipment, and recording measured tote weight in a network-enabled supply chain management database.

FIG. 64A is a schematic diagram illustrating the weighing of CFIC liquid totes at chemical factory before shipment and recording tote weight in supply chain management database.

Figure 64B:
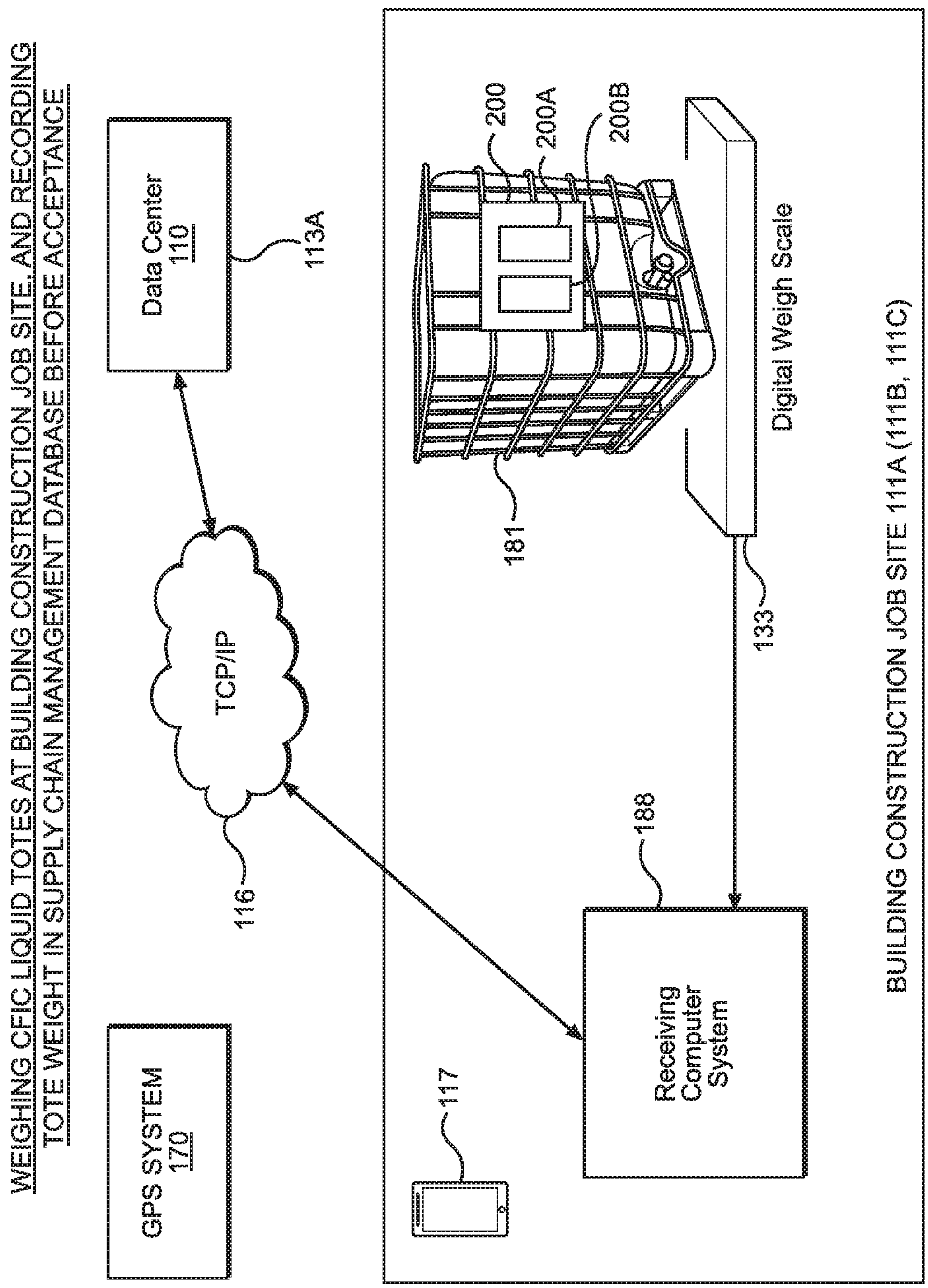
FIG. 64B is a schematic diagram illustrating the weighing of CFIC liquid totes at a destination building construction job site, and recording measured tote weight in the network-enabled supply chain management database before acceptance and entry into the receiver's inventory being managed by the system.

FIG. 64B is a schematic diagram illustrating the weighing CFIC liquid totes at building construction job site 111A (111B, 111C), and recording tote weight in supply chain management database before acceptance.

FIGS. 65A, 65B, 65C and 65D describes the high level steps carried out in a method of maintaining the chain of custody, quality control, tracking and inventory when producing and supplying clean fire inhibiting chemical (CFIC) material (e.g. liquid or dry powder) in locked CFIC totes (e.g. 5 gallons) 181 shipped from chemical factory 180 to a network of building construction job sites 111A (111B, 111C), as illustrated in FIG. 64.

Figure 65A:
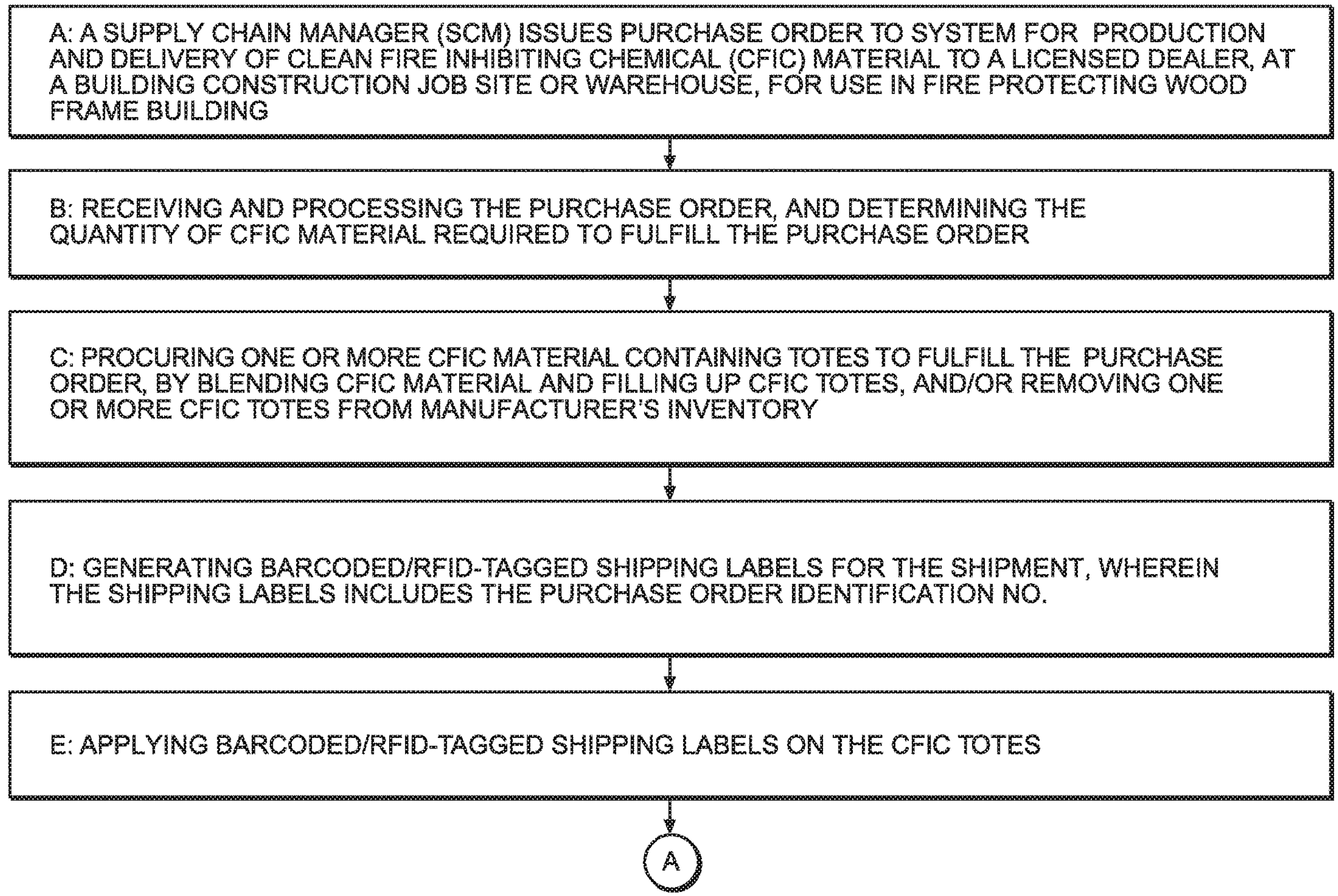
FIGS. 65A, 65B, 65C and 65D, taken together, is a flow chart describing the high level steps carried out in a method of maintaining the chain of custody and quality control when producing and supplying clean fire inhibiting chemical (CFIC) material (e.g. liquid or dry powder) in locked CFIC totes shipped from the CFIC chemical factory to a network of building construction job sites, and then scanned and weighed to ensure chain of custody, quality control and inventory acceptance operations are recorded in the supply chain management database.
Figure 67:
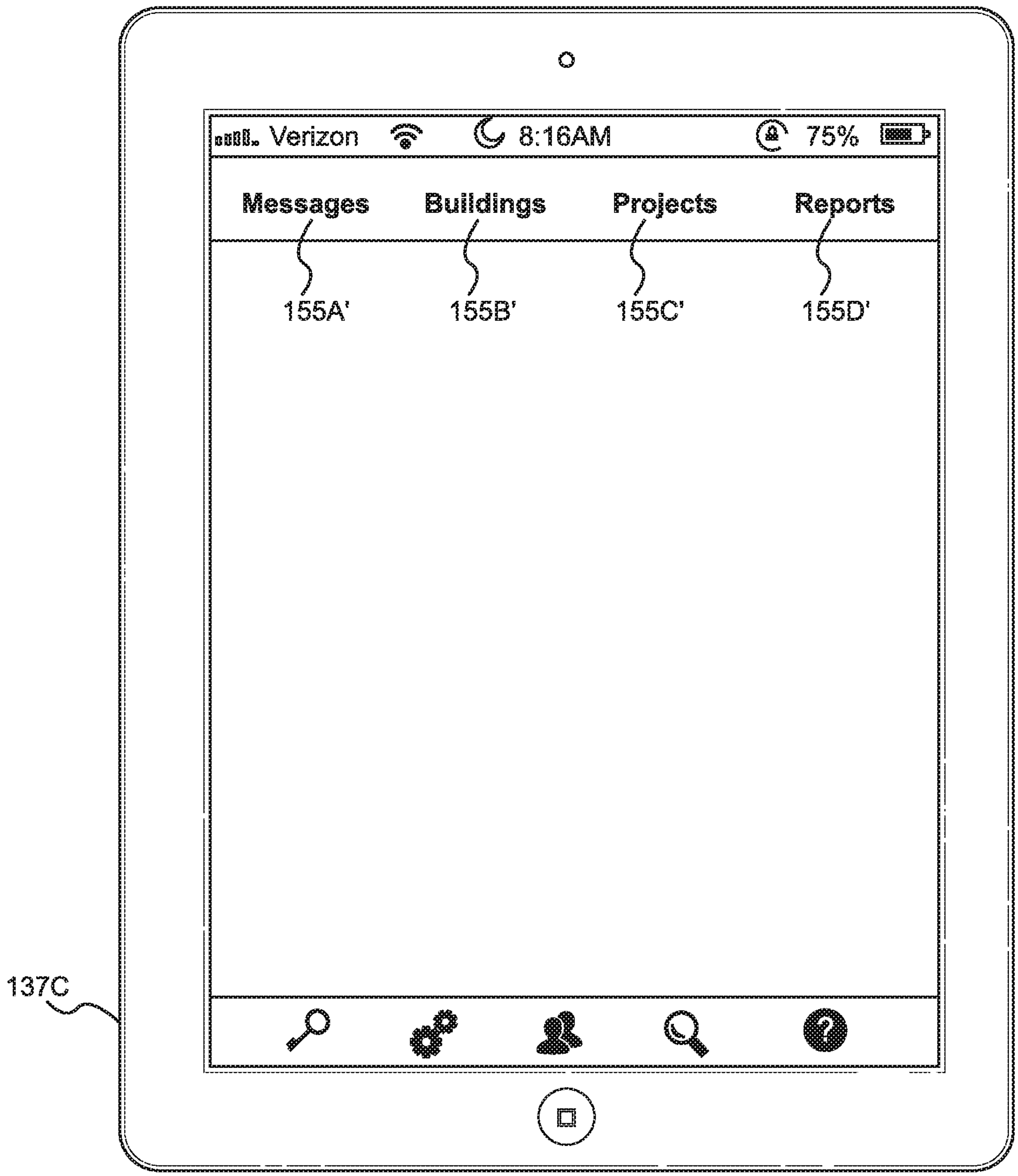
FIG. 67 is an exemplary wire frame model for graphical user interface of the mobile application for use by project administrators, managers, fabricators and technicians, showing the high-level menu of services supported by the system network.
Figure 67A:
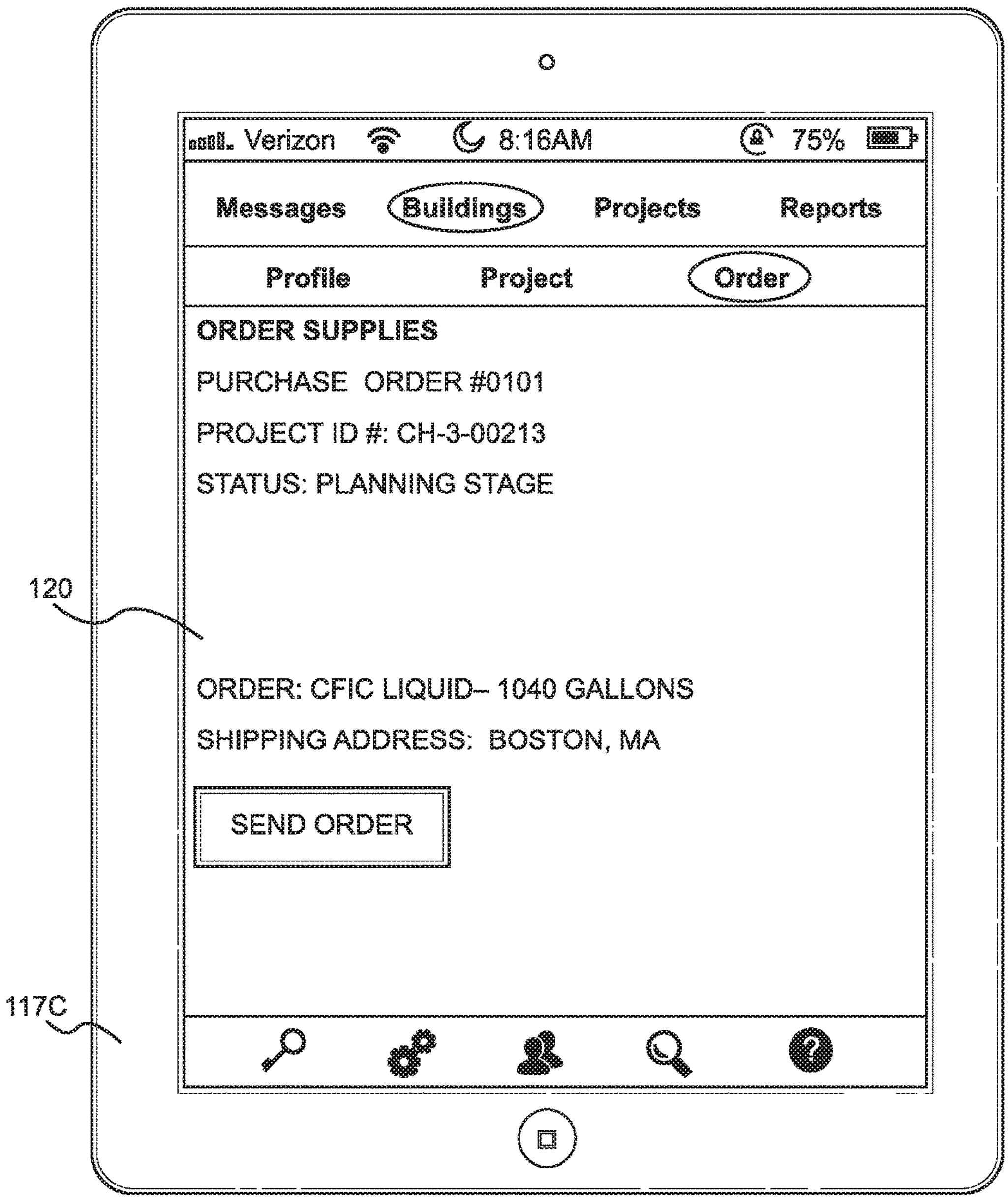
FIGS. 67A, 67B, 67C, 67D, 67E, 67F, 67G, 67H, 67I, 67J, 67K and 67L is an exemplary wire frame model for a graphical user interface of the mobile application for use by project administrator receiving chemical supplies to fulfill a purchase order for applying job site Class-A fire-protection to a wood-framed building, delivering CFIC material to the job site, and scanning and weighing delivered CFIC totes and either rejecting or accepting the totes into the recipient's inventory, using services supported by the system network.

As indicated at Block A in FIG. 65A, a supply chain manager 186 shown in FIG. 64 issues a purchase order (PO) to a chemical factory system 180 for the production and delivery of clean fire inhibiting chemical (CFIC) liquid to a building construction job site 111A (111B, 111C) or warehouse 187, as shown in FIGS. 64B and 67A, for fire protecting a wood frame building through the spray process of the present invention. Notably, the supply chain manager 186 can be a human being, or an automated or artificially-intelligent (AI) computer system programmed to determined the amount of CFIC liquid required to treat all wood on a particular building construction job site 111A (111B, 111C), with an estimated amount of wood surface area requiring Class-A fire protection.

As indicated at Block B in FIG. 65A, the purchase order (PO) is received and processed, and the quantity of CFIC liquid (e.g. measured in gallons/square foot) is determined required to fulfill the purchase order.

As indicated at Block C in FIG. 65A, one or more CFIC powder or liquid containing totes 181 are procured to fulfill the purchase order, either by (i) blending CFIC power and/or liquid and filling up, and CFIC totes 181, and/or (ii) removing one or more CFIC totes from inventory maintained in a warehouse 187 as shown in FIG. 64. In the illustrative embodiment, each CFIC tote 181 has a combination lock mechanism that prevents others without the lock code from accessing the chemical contents of the CFIC tote 181.

As indicated at Block D in FIG. 65A, barcoded/RFID-tagged shipping labels 200 are generated for the shipment. In general, each barcoded/RFID-tagged shipping labels 200 comprises barcode 200A and RFID-tag 200B. In the illustrative embodiment, each shipping label 200 includes the purchase order identification number contained in the purchase order. Preferably, the barcode and RFID-tag code structures will encode the purchase order identification number in one way or other, or be linked to this identification number using suitable techniques.

As indicated at Block E in FIG. 65A, the barcoded/RFID-tagged shipping labels 200 are applied on the CFIC totes 181. In some embodiments, one or more of these identification components 200A, 200B will be used for auto-identification of each CFIC tote 181 used on the system of the present invention.

In general, various kinds of barcode symbol and RFID-tag technologies can be used to realize the barcoded/RFID-tagged shipping labels 200 comprising barcode 200A and RFID-tag 200B. Various RFID-labels, RFID-tags and barcode labels are available from Zebra Technologies, Inc., Holtsville, NY Also, Zebra Technologies provides hand-held mobile computers, wearable computers, vehicle-mounted computers, tablets and hand-held RFID readers (i.e. mobile computing devices 117), and barcode symbol, RFID-label and RFID-tag printers and readers (i.e. scanners) for use in practicing the principles of the present invention disclosed herein.

Figure 65B:
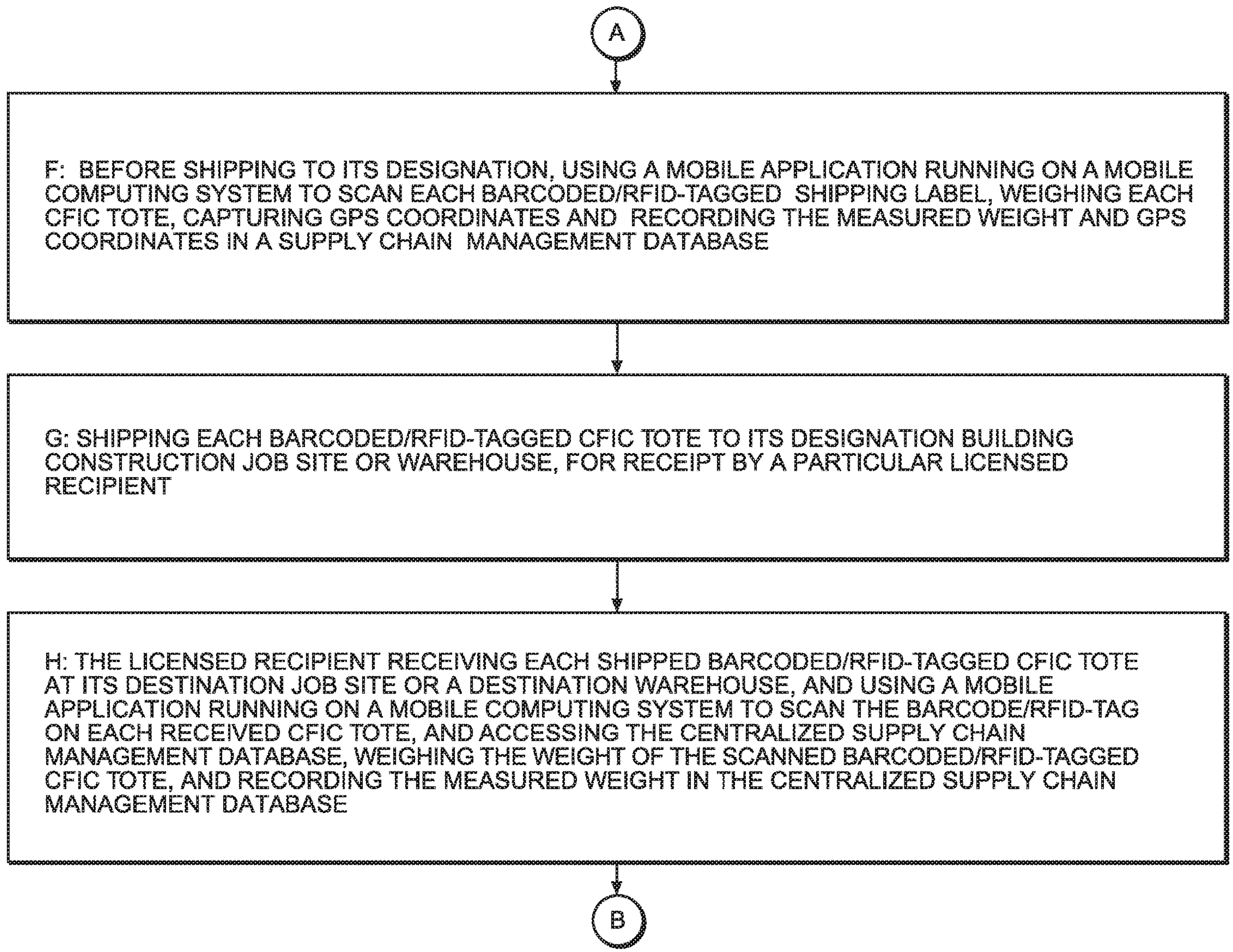
Figure 67B:
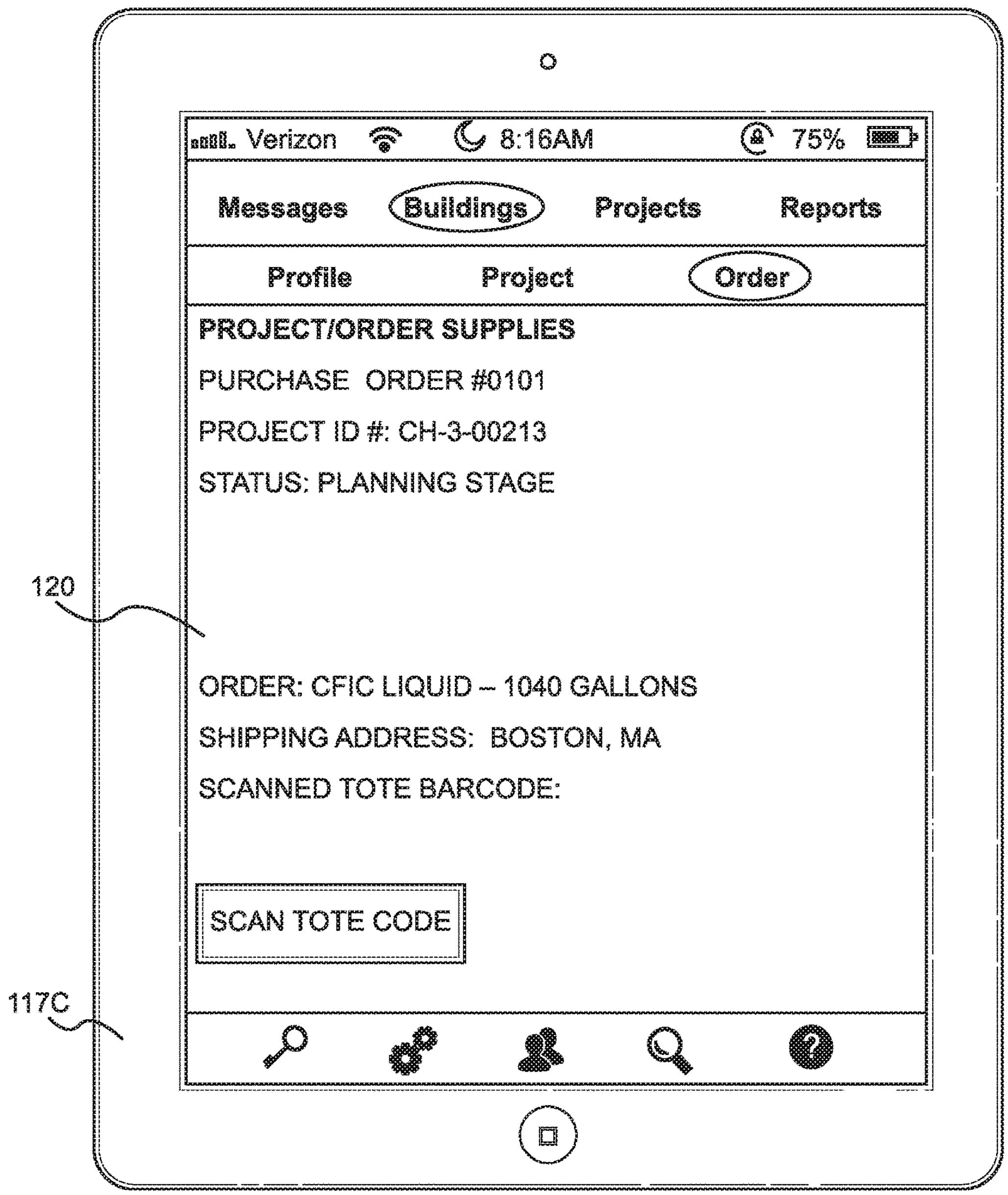
Figure 67C:
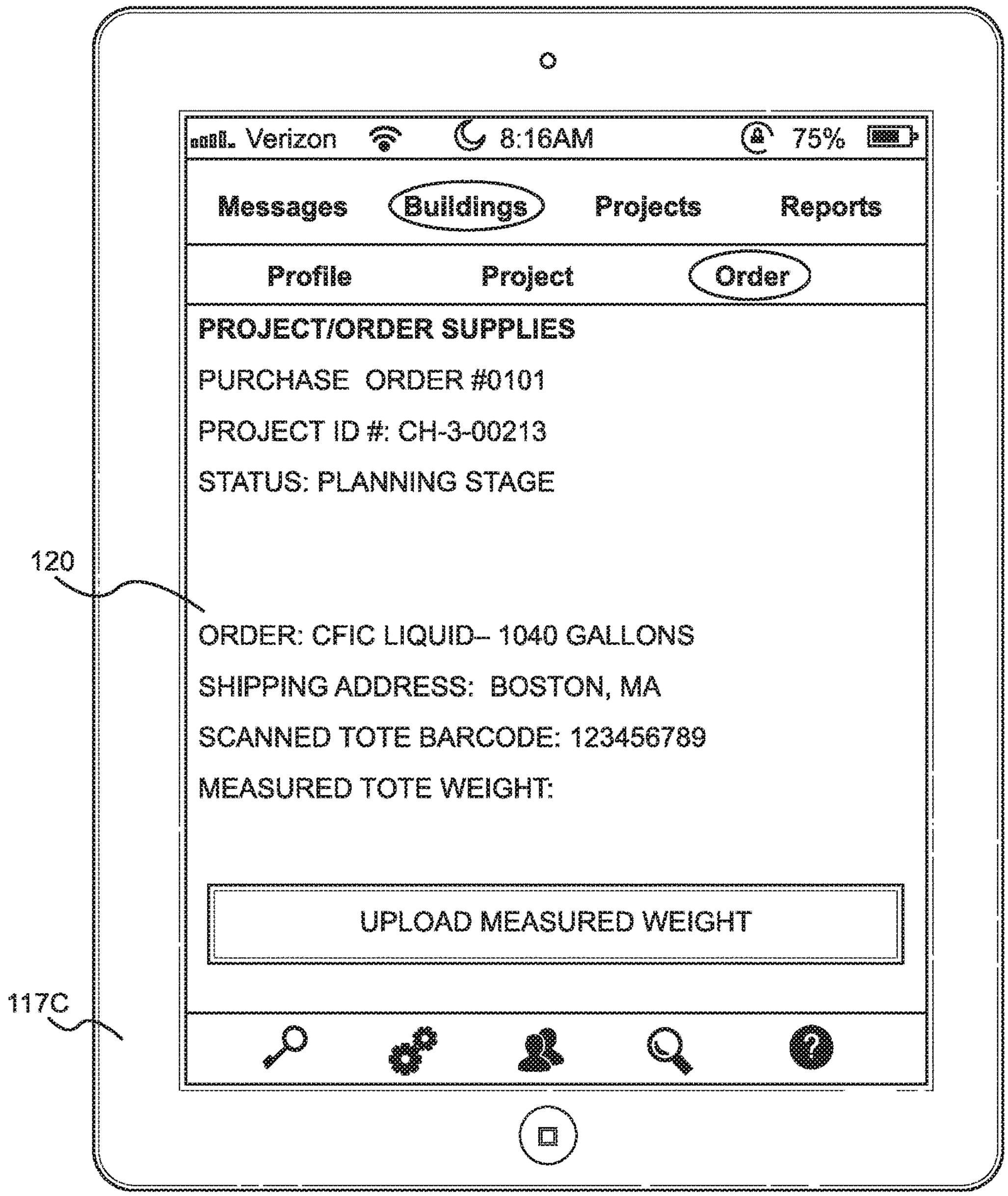

As indicated at Block F in FIG. 65B, before shipping to its designation, each barcoded/RFID-tagged shipping labels 200 is scanned using a code symbol reader/scanner integrated within the mobile computing device 117 as shown in FIG. 67B, then after a database socket connection is established, each barcoded/RFID-tagged CFIC tote 181 is weighed and its GPS coordinates are captured by the mobile computing device 120, and then its measured weight and GPS coordinates are uploaded and recorded in a centralized supply chain management database 113A, supporting fields illustrated in FIG. 66A.

Figure 67D:
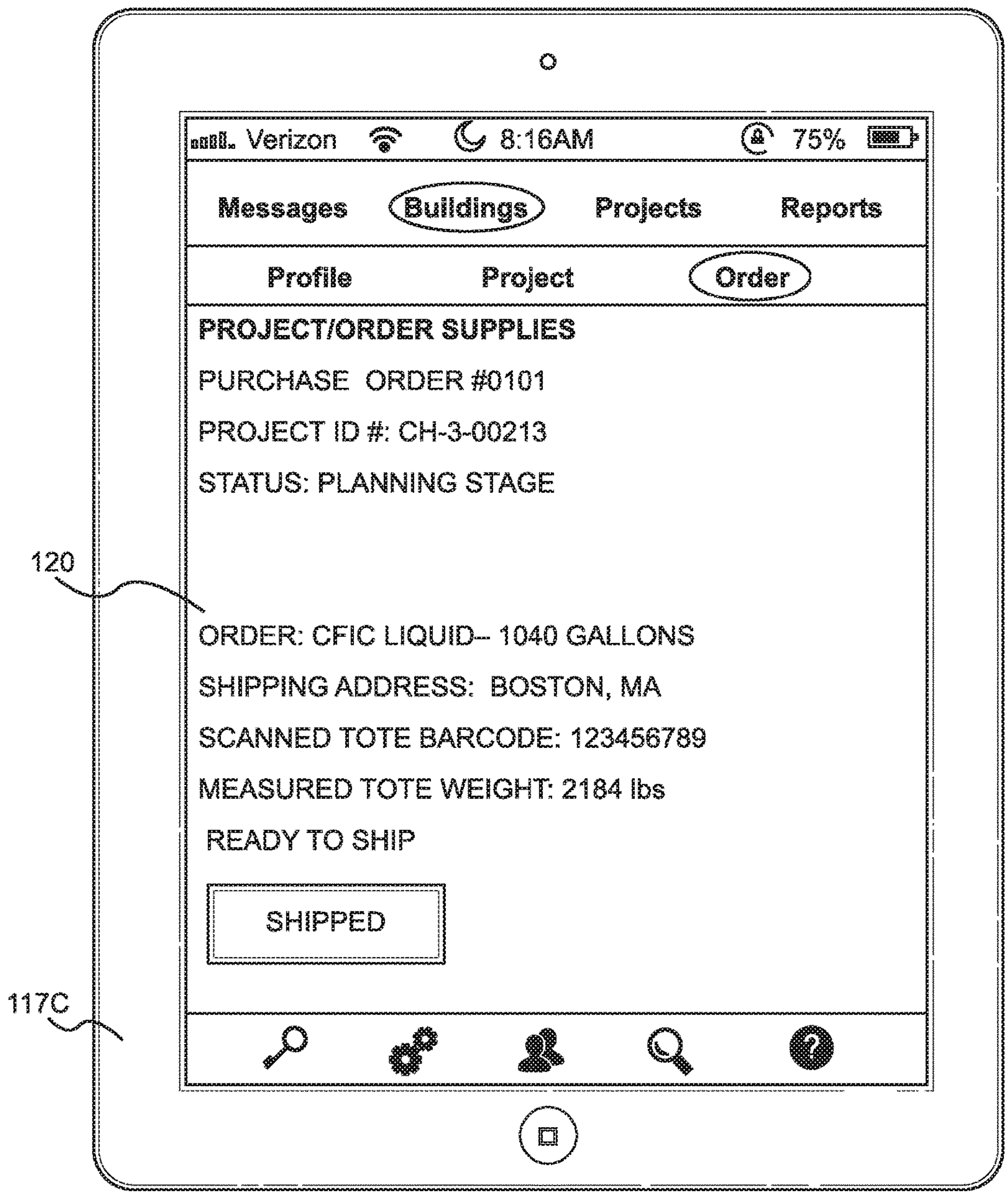
Figure 67E:
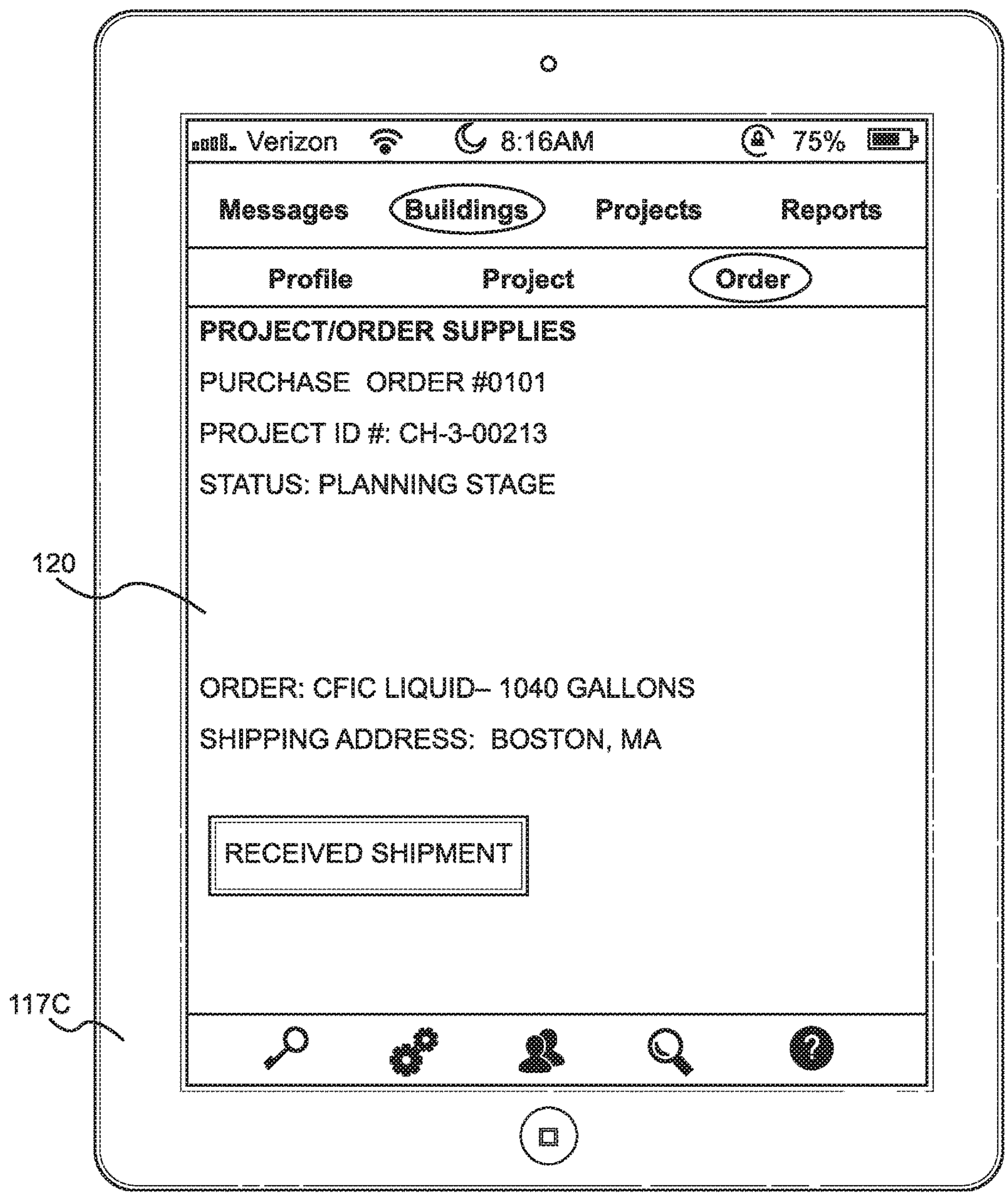
Figure 67F:
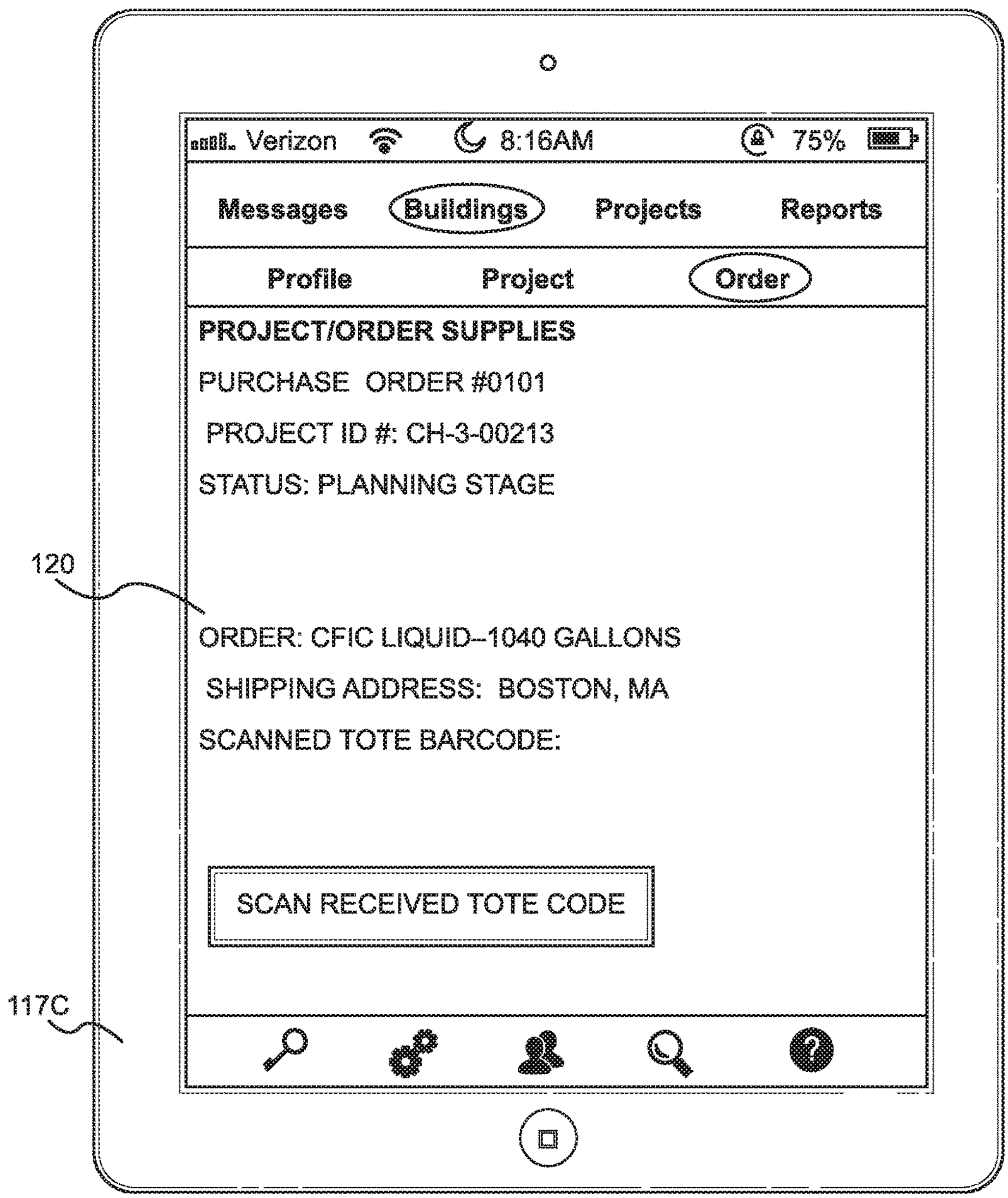
Figure 67G:
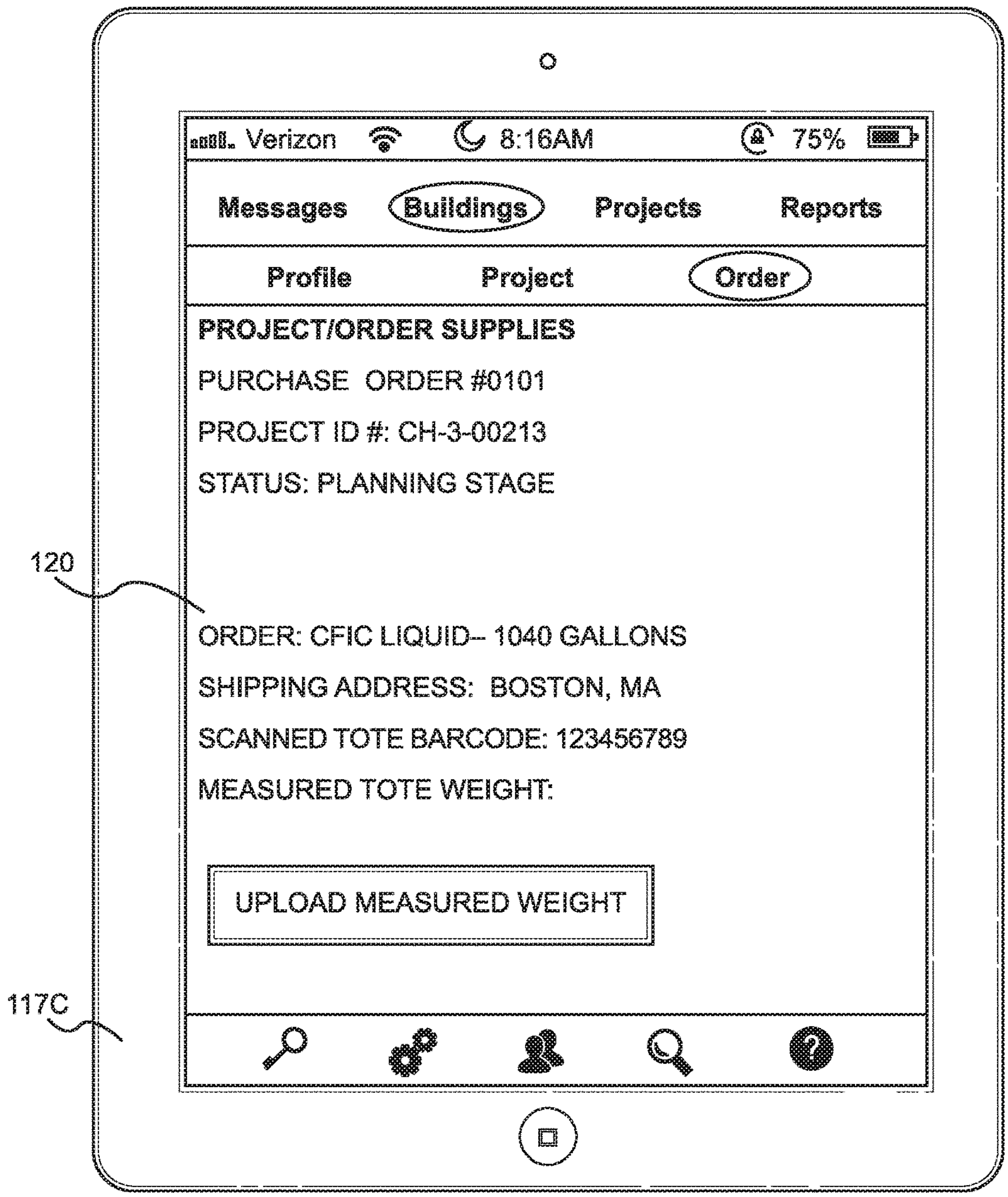

As indicated at Block G in FIG. 65B, each barcoded/RFID-tagged CFIC tote 181 is shipped to its designation building construction job site 111A, or warehouse, for receipt by a particular licensed recipient, as shown in FIGS. 64B and 67D. For purposes of the present invention, the recipient can be any one of various possible entities including, for example, a dealer licensed to apply CFIC liquid on interior wood-framed building surfaces, a builder licensed to apply CFIC liquid on interior wood-framed building surfaces, or other contractor applying As indicated at Block H in FIG. 65B, each shipped barcoded/RFID-tagged CFIC tote 181 is received its destination job site as shown in FIG. 67E, its barcode/RFID-tag 200 is scanned using a code symbol scanner supported by mobile computing system 117 as shown in FIG. 67F, and then the mobile application 120 automatically accesses the centralized supply chain management database 113A in data center 145, the weight of the scanned barcoded/RFID-tagged CFIC tote 181 is weighed, and its measured weight is uploaded recorded in the centralized supply chain management database 113A as illustrated in FIG. 67G.

Figure 65C:
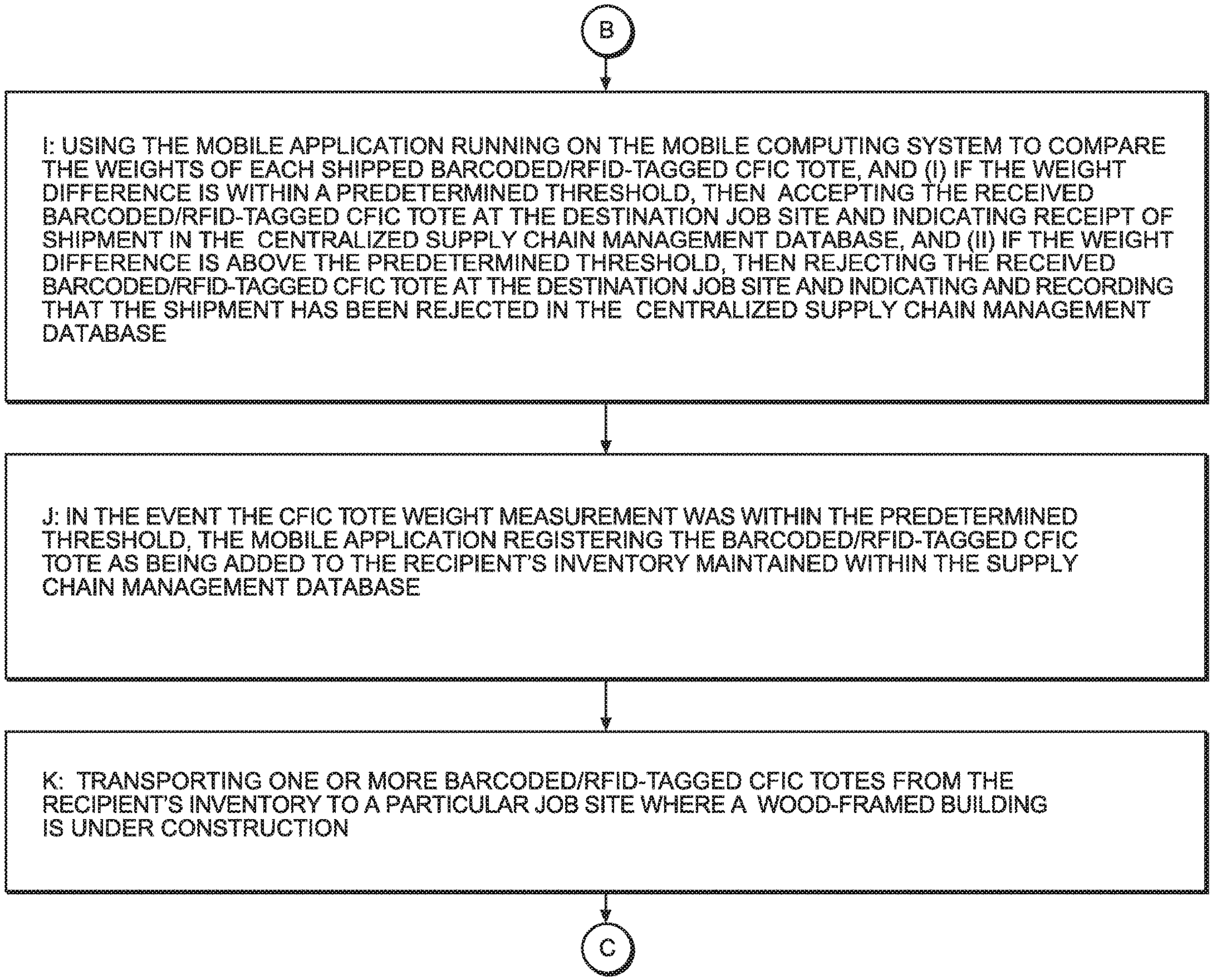
Figure 67H:
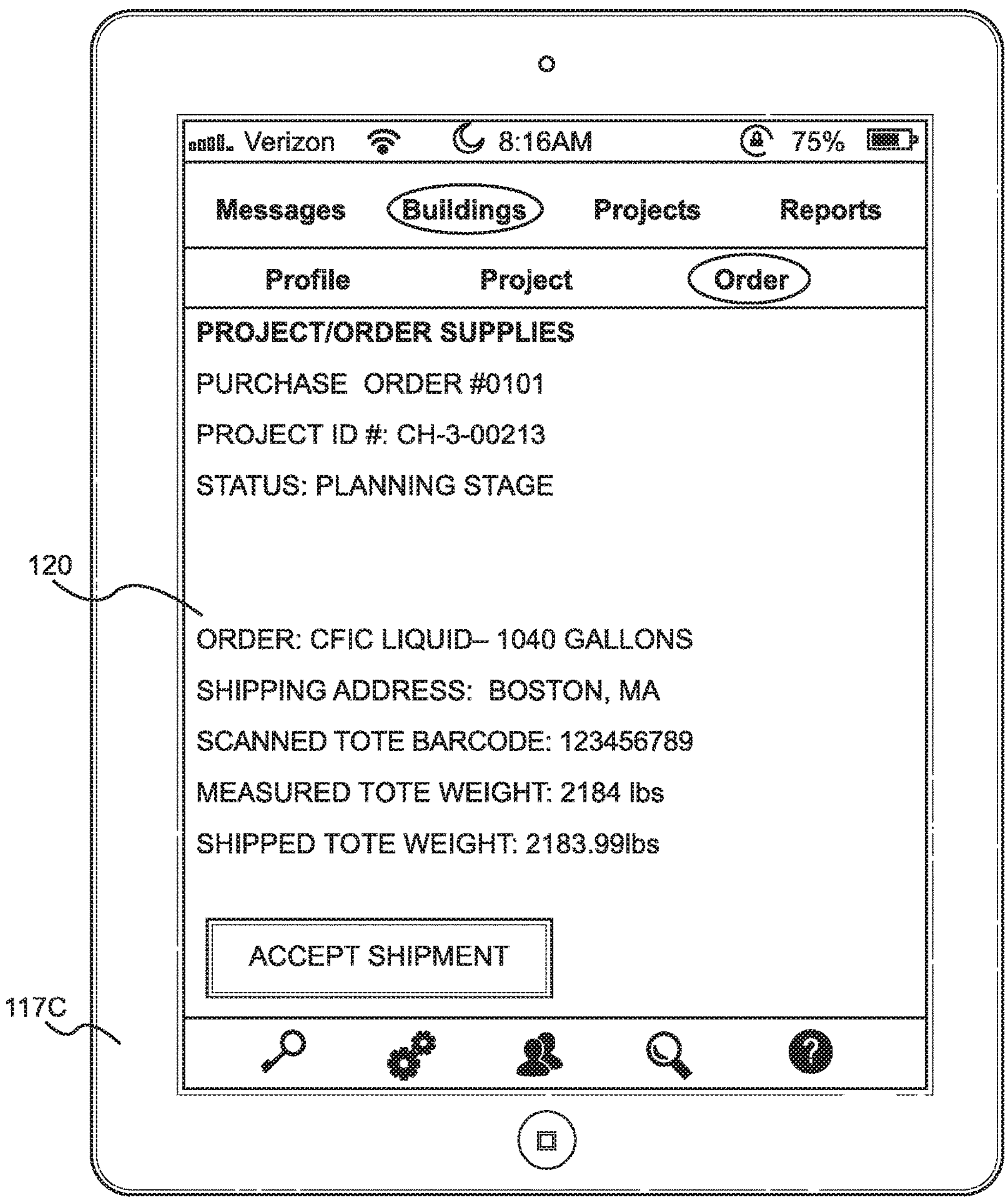
Figure 67I:
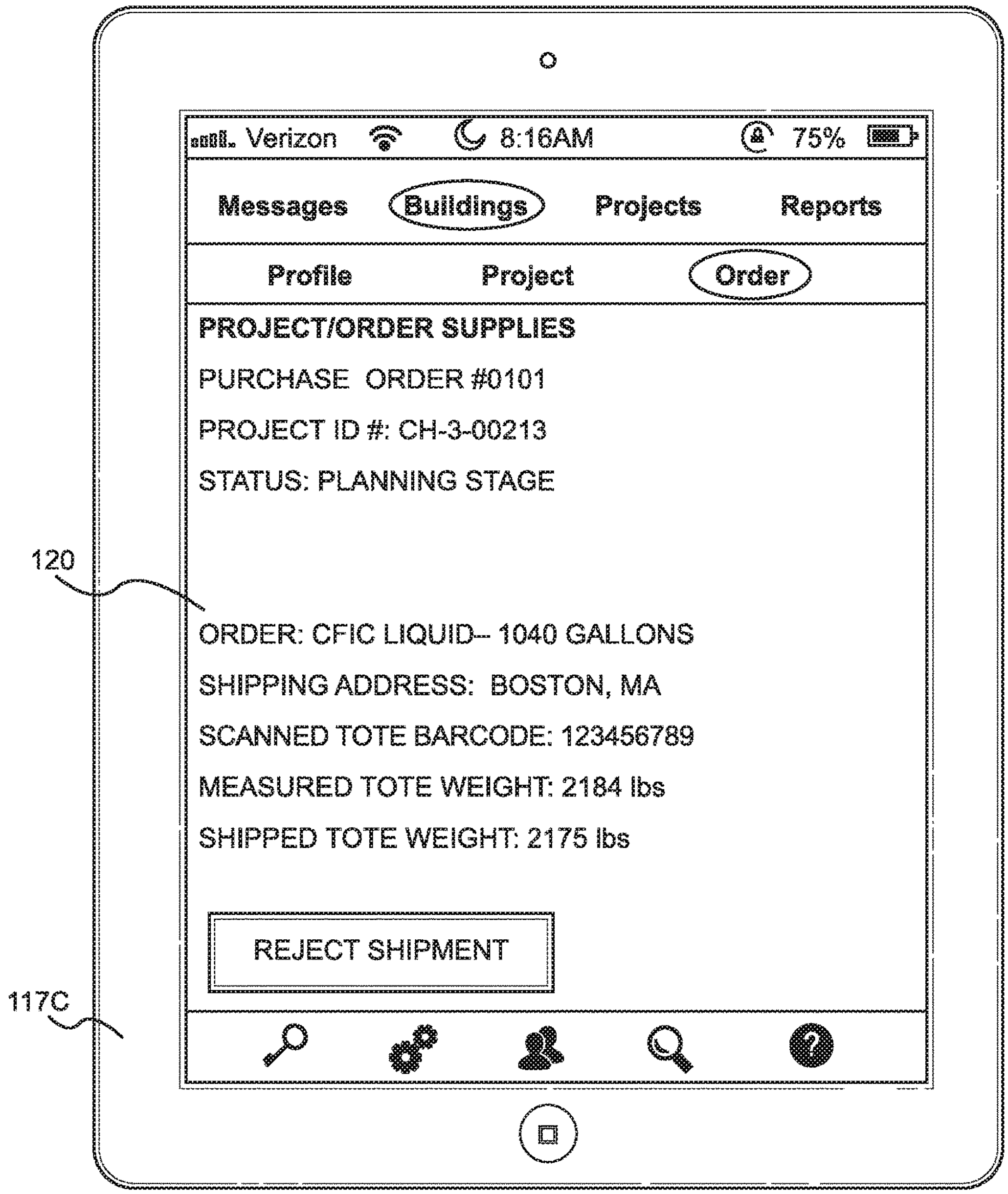
Figure 67J:
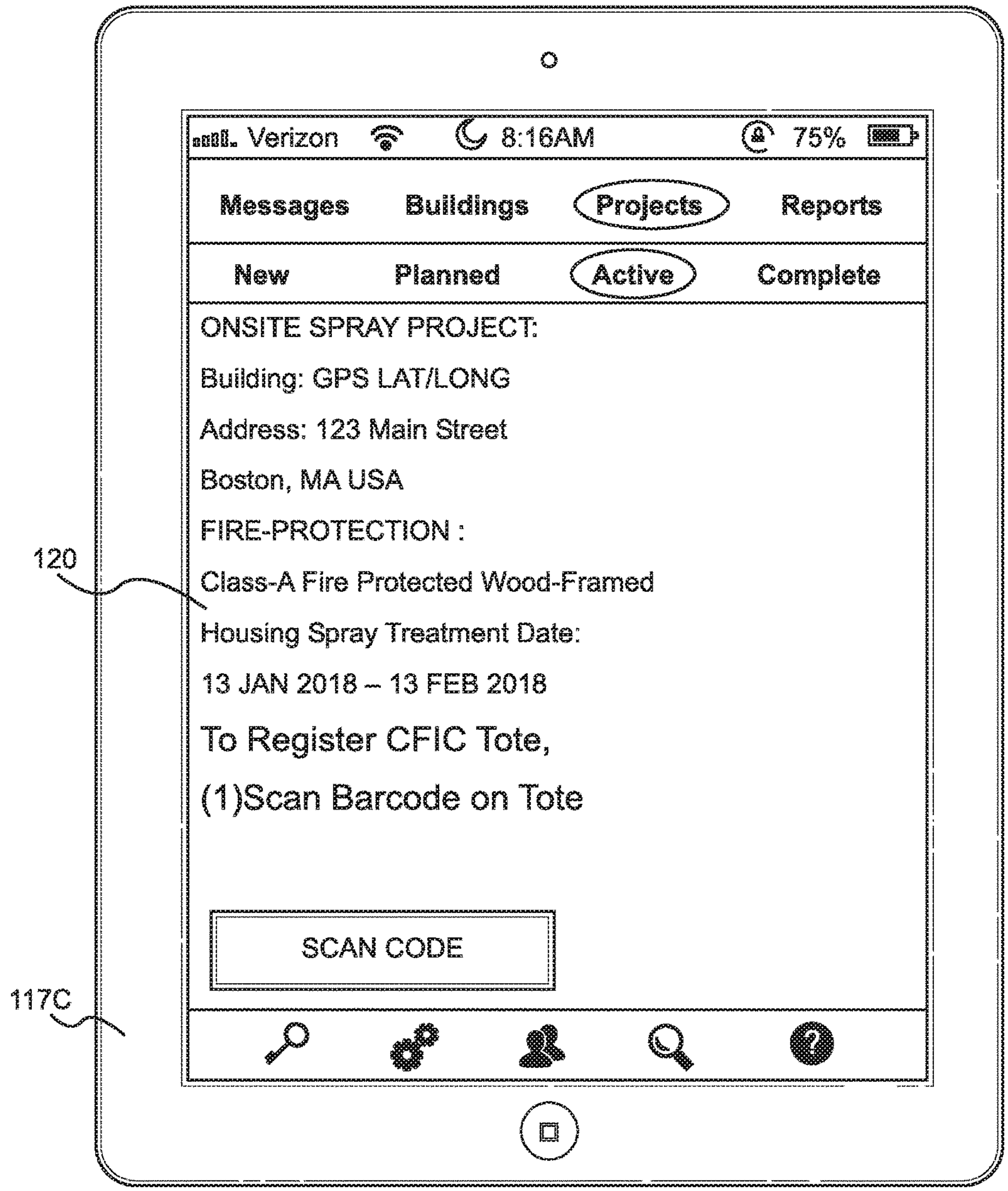

As indicated at Block I in FIG. 65C, the mobile application 120 running on the mobile computing system 117 is used to compare the weights of each shipped barcoded/RFID-tagged CFIC tote 181, and apply the following rules:

(i) if the weight difference is within a predetermined threshold (e.g. 5 oz.), then the received barcoded/RFID-tagged CFIC tote 181 can be accepted at the destination job site and receipt of shipment is indicated in the centralized supply chain management database 113A, as illustrated by the database fields reflected in FIG. 66B, and illustrated in FIG. 67H; and (ii) if the weight difference is above the predetermined threshold, then the received barcoded/RFID-tagged CFIC tote 181 is rejected at the destination job site and that the shipment has been rejected is indicated in the centralized supply chain management database 113A as shown in FIG. 67I.

As indicated at Block J in FIG. 65C, in the event the CFIC tote weight measurement was within the predetermined threshold, using the mobile application 117 running on mobile computing device 117 (e.g. Apple iPhone or iPad tablet computer) the barcoded/RFID-tagged CFIC tote 181 is automatically registered and added to the recipient's inventory maintained within the supply chain management database 113A, as illustrated in FIG. 67H. In the event CFIC powder material is contained in the CFIC tote 181, then the end user will add the required amount of clean water to make the CFIC liquid for spraying on wood surfaces on the wood-framed building at the destination job site 111A (111B, 111C).

As indicated at Block K in FIG. 65C, one or more barcoded/RFID-tagged CFIC totes 181 are transported from the recipient's inventory to a particular job site 11A where a wood-framed building is under construction.

Figure 65D:
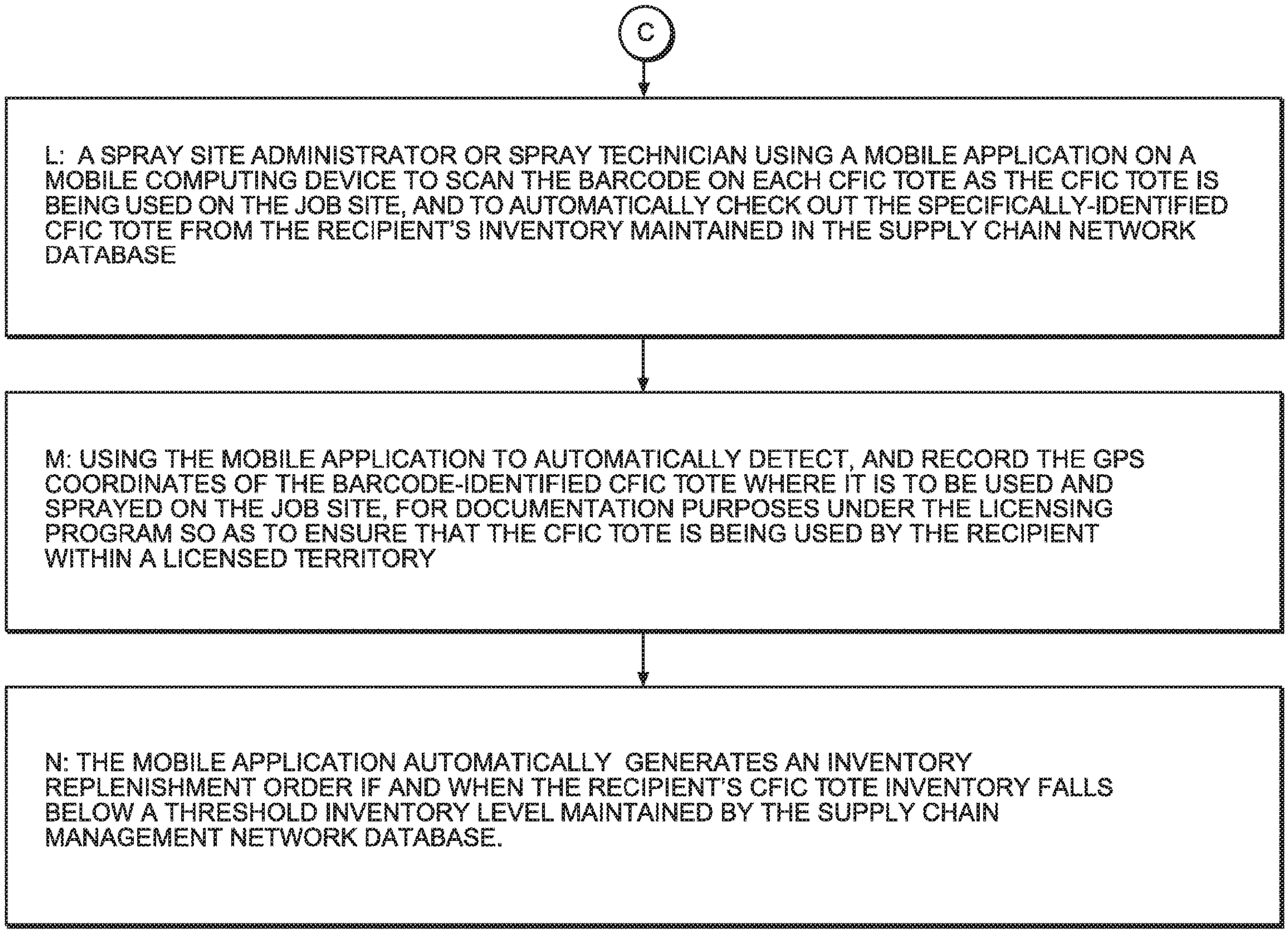

As indicated at Block L in FIG. 65D, a spray site administrator or spray technician uses a mobile application 120 on a mobile computing device 117 to scan the barcode 200A (or read the RFID-tag 200B) on each CFIC tote 181 as the CFIC tote is being used on the job site, and to automatically check out the specifically-identified CFIC 181 tote using scanned code information from the recipient's inventory maintained in the supply chain management database 113A at the data center 145, shown in FIGS. 55, 64 and 64B.

Figure 67K:
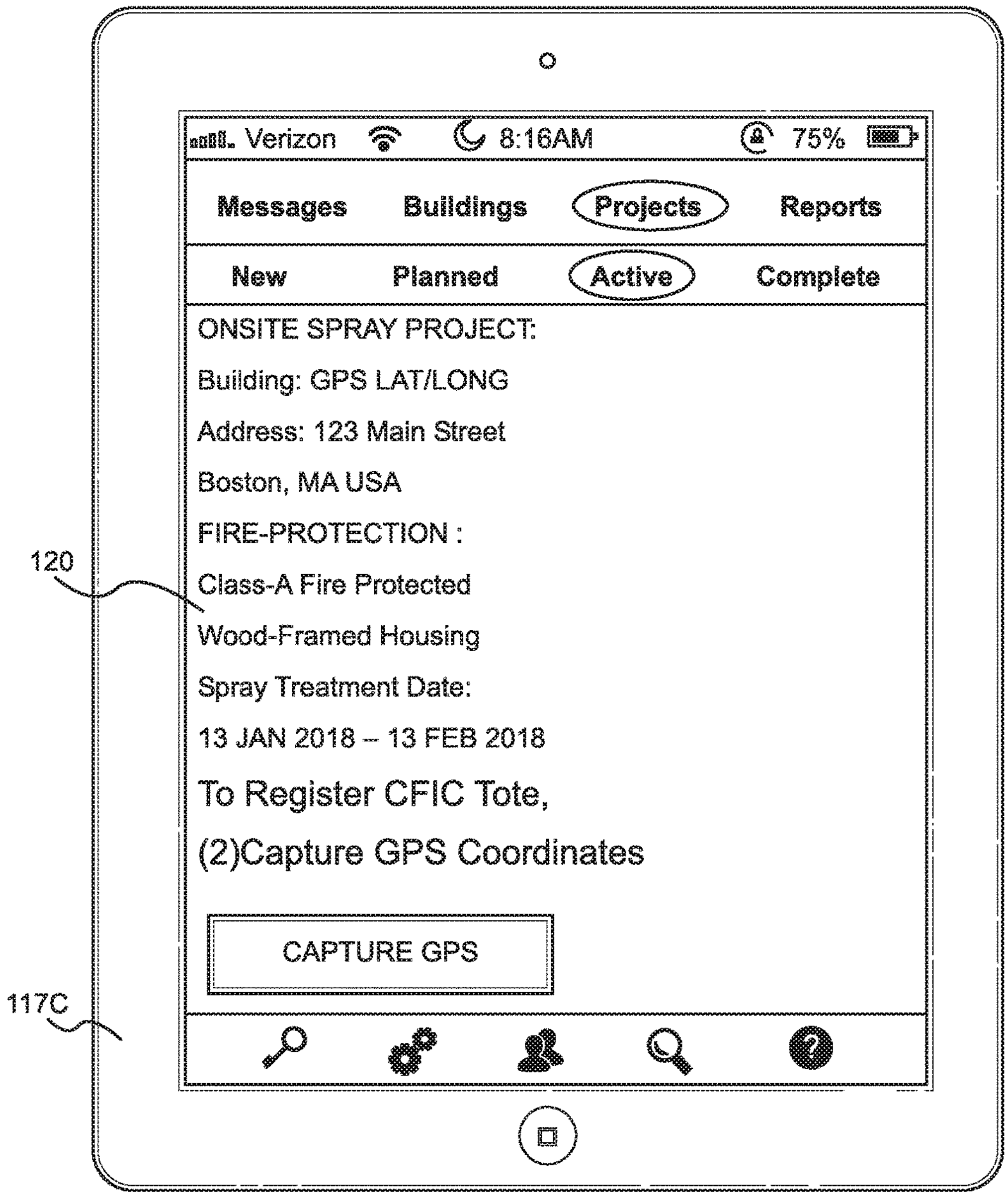

As indicated at Block M in FIG. 65D, the mobile application 120 is used to automatically detect and record the GPS coordinates of the barcode-identified CFIC tote 181 where it is to be used and sprayed on the job site 111A, for documentation purposes under a licensing program so as to ensure that the CFIC tote 181 is being used by the recipient within a licensed territory, as illustrated in FIG. 67K. Documentation of specific CFIC totes 181 used on a specific job site will become part of the chain of documents capture during the lifecycle of the wood-framed building under construction, and being treated so that its wood is rendered Class-A fire-protected under ASTM E84 test standards. Such documentation will be valued and appreciated by the property insurance industry who is involved in underwriting property insurance policies on such kinds of new wood-framed building construction, and granting premium discounts to building owners who have actually lowered the fire risk profile of the building by application of Class-A fire-protection to substantially all wood surfaces used in construction of a particular insured building structure, regardless of size or location, in accordance with the principles of the present invention.

Figure 67L:
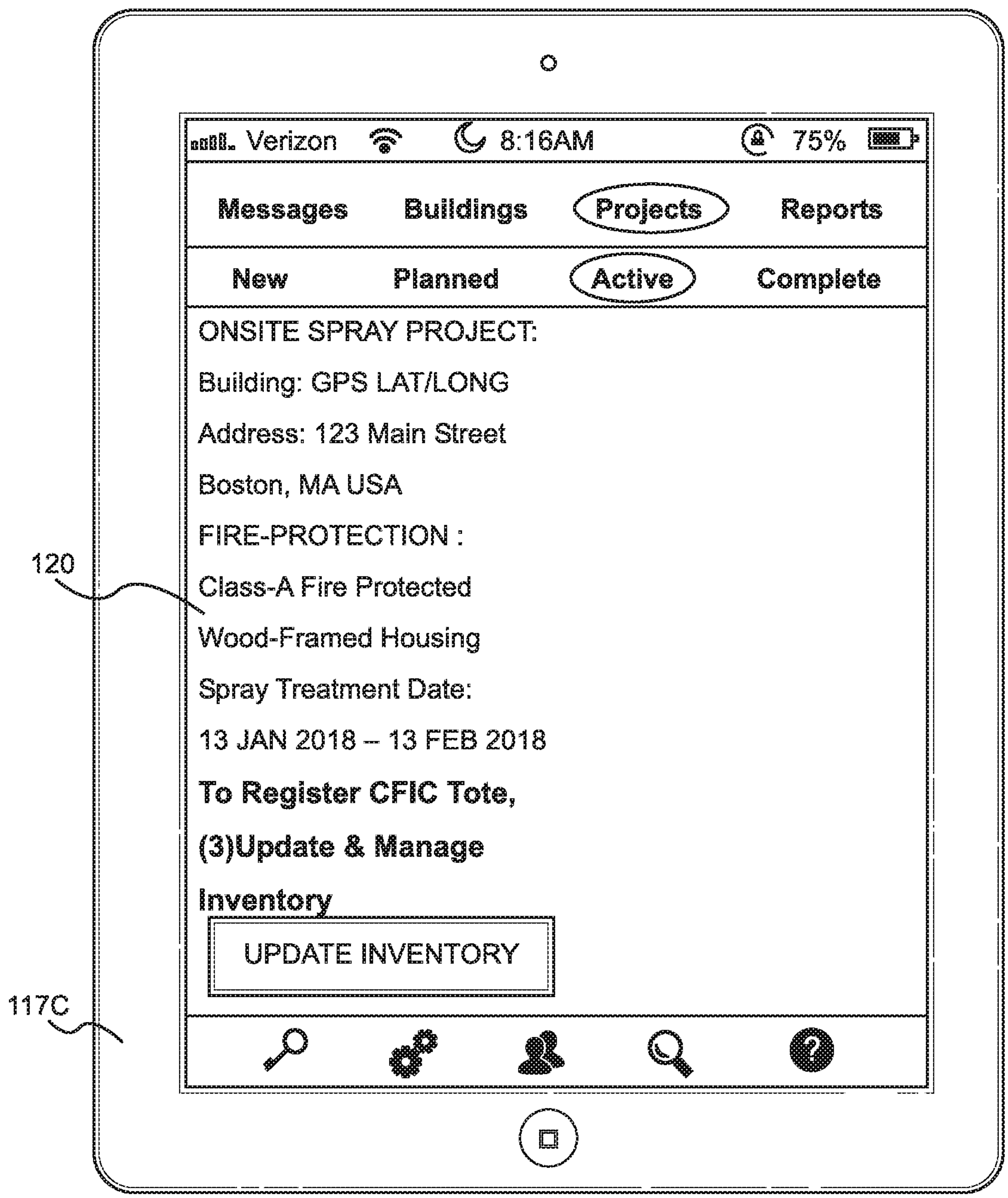

As indicated at Block N in FIG. 65D, the mobile application 120 automatically generates an inventory replenishment order if and when the recipient's CFIC tote inventory is determined to fall below a threshold inventory level (e.g. 50×50 gallon CFIC totes 181) maintained by the supply chain management network database 113A, as illustrated in FIG. 67L. If a replenishment order is generated, then the supply chain manager 186 will automatically generate and send a purchase order to the CFIC factory 180 to fulfill the order for a specified quantity of CFIC totes 181 and ship a requested quantity of CFIC totes 181 to the recipient's job site location, or local warehouse location, for use in Class-A fire protection job site spraying.

Just-in-Time Wood-Framed Building Factory Method, System and Network Supporting Multiple Production Lines for Producing Pre-Fabricated Class-A Fire-Protected Wood-Framed Components as Needed to Construct Custom and Pre-Specified Wood-Framed Buildings Ordered by Customers FIG. 68A shows a just-in-time wood-framed building factory system 130 supporting multiple production lines 131A, 131B, 131C, etc. for producing pre-fabricated Class-A fire-protected wood-framed components as needed to construct custom and pre-specified wood-framed buildings ordered by customers, as the case may be, from anywhere around the globe.

In general, the concept of the just-in-time wood-framed building factory system 130 embraces many different kinds of wood-product factory systems capable of producing diverse kinds of wood and timber products including, for example: (i) prefabricated modular wood-framed homes; (ii) prefabricated modular mass-timber (e.g. cross-laminated timber or CLT) homes; (iii) prefabricated modular wood-framed building modules; (iv) prefabricated modular mass-timber building modules; (v) prefabricated wood-framed panels; (vi) prefabricated cross-laminated timber (CLT) panels; and (vii) prefabricated wood-framed building assemblies and components, including trusses, joists, etc. Regardless of the wood product produced from the factory system 130, the factory system will typically include a number of production lines, each supported by some level of automation and control, well known in the art.

In accordance with the principles of the present invention, each production line typically includes a conveyor for conveying wood components (e.g. raw lumber, finger-jointed lumber, CLT components and/or LVL components) along at least a portion of the production line and through, into and out of a dipping (i.e. infusion) tank, as described herein, filled with clean fire inhibiting chemical (CFIC) liquid (e.g. Hartindo AF21 Anti-Fire Chemical Liquid), and allowed to wet dry and attain Class-A fire-protection properties during the wood-framed component fabrication process. Alternatively, though less preferred, some production lines may include a spray tunnel for spraying clean fire inhibiting chemical (CFIC) liquid (e.g. Hartindo AF31 Anti-Fire Chemical Liquid) onto all wood surfaces and then allowed to dry and attain Class-A fire-protection properties during the wood-framed component fabrication process.

FIG. 68B shows the just-in-time (JIT) factory system 130 of FIG. 61 in greater detail, with production lines shown for producing various kinds of prefabricated Class-A fire-protected wood-framed components (e.g. wood-framed walls, staircases, roof trusses, floor trusses, etc.) 132A, 132B, and 132C which are used in constructing custom and pre-specified wood-framed buildings ordered by customers for production and delivery. As shown, each production line 131 requires inputs such as (i) an order for a customer or pre-specified wood-framed building; (ii) raw lumber 141 of a certain type and in a certain quantity to build the ordered custom or pre-specified wood-framed building; as well as (iii) CFIC liquid 142 in sufficient supply to render the raw lumber Class-A fire-protected in accordance with the principles of the present invention disclosed herein. As shown in FIG. 62, the outputs from the factory system 130 are Class-A fire-protected wood-framed building components such as (i) wall panels 132A, (ii) floor panels 132B, (iii) floor trusses 132C, (iv) roof trusses 132D, and (v) stair panels 132E, manufactured using the dip-infusion methods disclosed herein, for use in constructing custom and specified wood-framed buildings.

FIG. 69 shows the just-in-time factory system network 135 shown in FIGS. 65A and 65B, shown comprising: (i) the just-in-time wood-framed building factory 130, shown in FIGS. 65A and 65B and described above, with multiple production lines 131A through 131D for producing Class-A fire-protected building components as illustrated in FIG. 65B; (ii) RFID-tagged/coded ISO-shipping containers 136 shown in FIG. 65A, and mobile code symbol/RFID tag reading mobile computing systems 137 for reading barcoded/RFID-tagged labels 138 (comprising optical code symbols 138A of a particular symbology (e.g. PDF 417, etc.) and long-range UHF-Class RFID tags 138B) applied to shipping containers 136 in a manner well known in the shipment tracking art; (iii) a data center 145, operably connected to the TCP/IP internet infrastructure 151 for supporting enterprise resource planning (ERP) related operations within the wood-framed building factory system 130 shown in FIGS. 65A and 65B, and supporting a network of mobile computing devices 137 shown in FIG. 64, each running a mobile application 153 adapted to help track and manage (i) orders placed by customers for prefabricated Class-A fire-protected wood-framed buildings, and (ii) projects within the factory system involving the placed customer orders. As shown, the data center 145 comprises: web (http and ftp) communication servers 146; application servers 147; database servers (RDBMS) 148; SMS servers 149; and email message servers 150, well known in the art.

It is understood that, in many embodiments, the above-described enterprise-level system 135, supporting wood framed and mass-timber building factories 130 around the globe, will also include a core integrated financial accounting system 400. This core integrated financial accounting system 400 will be supported by a general ledger system (GLS), an accounts payable system (APS) and an accounts receivable system (ARS). The financial accounting system can be hosted in the data center 145 or elsewhere on the Internet, in a manner well known in the art. Integrated financial accounting software system solutions are available from numerous vendors including, but not limited to, for example, Oracle's NetSuite® Financial Management Software System, SAP's Business Financial One Software System, etc.

As shown in FIG. 66, the system also includes a GPS system 139 for transmitting GPS reference signals transmitted from a constellation of GPS satellites deployed in orbit around the Earth, to GPS transceivers installed aboard each GPS-tracking ISO-shipping containers 136A, 136B, as part of the illustrative embodiments. From the GPS signals it receives, each GPS transceiver is capable of computing in real-time the GPS location of its host system, in terms of longitude and latitude. In the case of the Empire State Building in NYC, NY, its GPS location is specified as: N40° 44.9064', W073° 59.0735'; and in number only format, as: 40.748440, −73.984559, with the first number indicating latitude, and the second number representing longitude (the minus sign indicates "west").

FIG. 67 shows the mobile client computing system(s) 137, 137' used in the system network 135 shown in FIG. 63, supporting mobile application 153 installed on each registered mobile computing system 137, 137'. The purpose of the mobile application 153 is to provide a convenient tool for tracking and managing projects involving factory-applied clean fire inhibiting chemical (CFIC) liquid dip-infusion treatment of wood pieces during the prefabrication of Class-A fire-protected wood-framed buildings. In the event that CFIC liquid solution is mixed on site by adding water to pre-blended dry powder chemicals at a toll blender, the mobile application can be used to track chain of custody from our toll blender to the factory site where the toted power mixture is added to water to produce an aqueous-based CFIC liquid solution, for high-speed dip-infusion 100% of all wood/lumber used to fabricate Class-A fire-protected wood-framed building components along production lines inside the factory 130 shown in FIGS. 65A, 65B and 66.

Using the custom-designed mobile application 153 of the present invention, prefabricated building purchasers, builders and architects alike can track the progress being made while an order for a prefabricated Class-A fire-protected wood-framed building is being executed as a prefabricated wood-framed building project. During the process, all wood pieces used to fabricate each wood-framed building component is automatically dip-coated in a tank of CFIC liquid, as shown in FIGS. 19A, 23A, 27A, and 33A, in a just-in-time manner, during the building fabrication schedule, so as to provide 100% Class-A fire-protected wood-framed building components. These components can then be used in constructing Class-A fire-protected prefabricated wood-framed buildings. The mobile application 153 can be used to review all collected digital images, and audio and visual evidence of certificates, stamps, signatures and verifications during the course of the just-in-time prefabrication building project.

Specification of the Network Architecture of the System Network of the Present Invention As shown in FIG. 69, the Internet-based system network 100 comprises: cellular phone and SMS messaging systems 161; email servers 162; a network of mobile computing systems 136 (136A, 136B) running enterprise-level mobile application software; and one or more industrial-strength data center(s) 110, preferably mirrored with each other and running Border Gateway Protocol (BGP) between its router gateways.

As shown in FIG. 69, each data center 110 comprises: cluster of communication servers 111 for supporting http and other TCP/IP based communication protocols on the Internet (and hosting Web sites); cluster of application servers 112; cluster of RDBMS servers 113 configured within a distributed file storage and retrieval ecosystem/system, and interfaced around the TCP/IP infrastructure of the Internet well known in the art; an SMS gateway server 114 supporting integrated email and SMS messaging, handling and processing services that enable flexible messaging across the system network, supporting push notifications; and a cluster of email processing servers 115.

Referring to FIG. 69, the cluster of communication servers 111 is accessed by web-enabled clients (e.g. smart phones, wireless tablet computers, desktop computers, computer workstations, etc) 137 (137A, 137B) used by stakeholders accessing services supported by the system network. The cluster of application servers 112 implement many core and compositional object-oriented software modules supporting the system network 100. The cluster of RDBMS servers 113 use SQL to query and manage datasets residing in its distributed data storage environment.

Figure 70A:
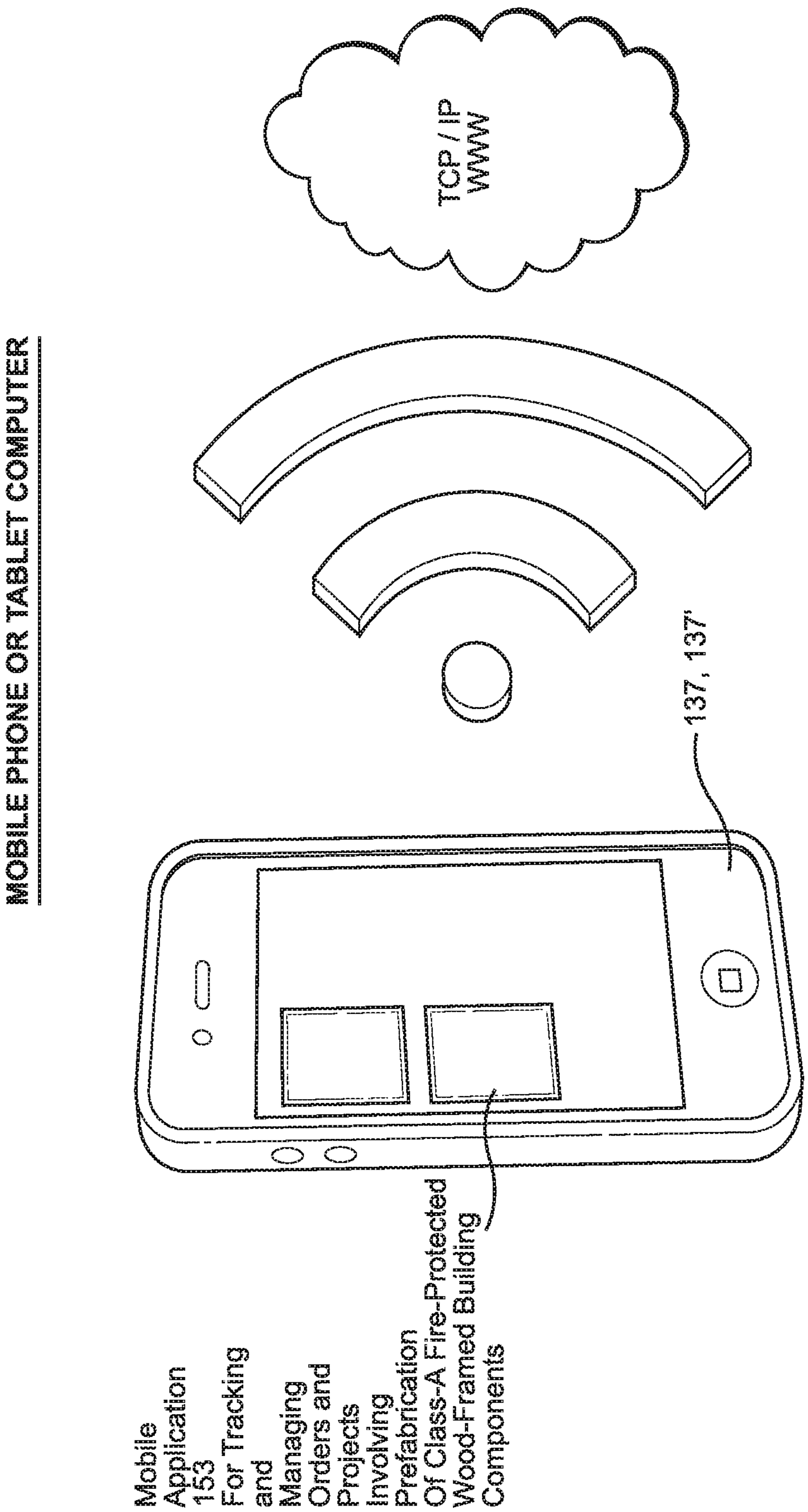
FIG. 70A is a perspective view of a mobile computing system used in the system shown in FIG. 69, supporting a mobile application installed on the mobile computing system for the purpose of tracking and managing projects involving just-in-time fabrication of Class-A fire-protected carbon-quantized wood-framed building components for ordered prefabricated wood-framed buildings in accordance with the principles of the present invention.
Figure 70B:
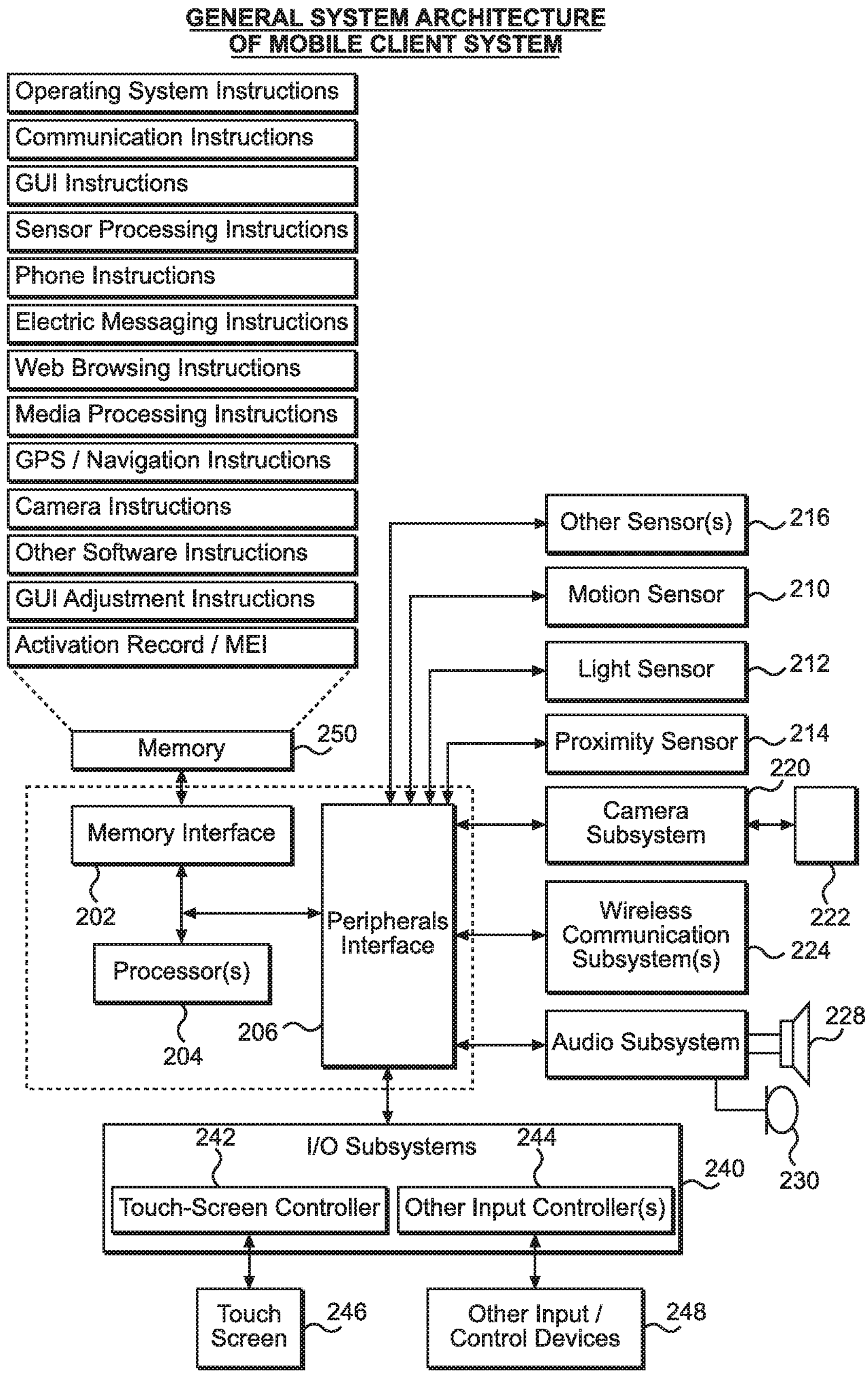
FIG. 70B is a system diagram for the exemplary mobile computing system of FIG. 70A showing the various sub-components and subsystems used to construct the mobile computing system.

As shown in FIG. 69, the system network architecture further comprises many different kinds of users supported by mobile computing devices 137 running the mobile application 153 of the present invention, namely: a plurality of mobile computing devices 137 running the mobile application 153, and used by fire departments to access services supported by the system network 100; a plurality of mobile computing systems 137 running mobile application 153 and used by insurance underwriters to access services on the system network 100; a plurality of mobile computing systems 137 running mobile application 153 and used by architects and their firms to access the services supported by the system network 100 of the present invention; a plurality of mobile client machines 137 (e.g. mobile computers such as iPad, and other Internet-enabled computing devices with graphics display capabilities, etc.) for use by spray-project technicians and administrators, and running a native mobile application 137 supported by server-side modules, and the various illustrative GUIs shown in FIGS. 69 through 70J, supporting client-side and server-side processes on the system network of the present invention; and a GPS-tracked GSM-linked digital camera 163 installed over each CFIC liquid dip-infusion tank, installed along a production line 131, for capturing digital images and video recordings of the CFIC liquid dip-infusion process, along the production line, where wood pieces are dip-coated and Class-A fire-protected prior art to use in fabricating Class-A fire-protected wood-framed building components.

Specification of System Architecture of an Exemplary Mobile Smartphone System Deployed on the System Network of the Present Invention FIG. 70A shows an exemplary mobile the mobile client computing system (e.g. client device) 137 that is deployed on the system network 100 and supporting the many services offered by system network servers of the present invention. As shown in FIG. 67B, the mobile computing device 137 (137') can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device can be coupled by one or more communication buses or signal lines. Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions. Other sensors 216 can also be connected to the peripherals interface 206, such as a positioning system (e.g. GPS receiver), a temperature sensor, a biometric sensor, a gyroscope, or other sensing device, to facilitate related functionalities. A camera subsystem 220 and an optical sensor 222, e.g. a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 224, which can include radio frequency receivers and transmitters and/or optical (e.g. infrared) receivers and transmitters. The specific design and implementation of the communication subsystem 224 can depend on the communication network(s) over which the mobile device is intended to operate. For example, the mobile device 137 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 137 may be configured as a base station for other wireless devices. An audio subsystem 226 can be coupled to a speaker 228 and a microphone 230 to facilitate voice-enabled functions, such as voice recognition, voice replication, digital recording, and telephony functions. The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230. Such buttons and controls can be implemented as a hardware objects, or touch-screen graphical interface objects, touched and controlled by the system user. Additional features of mobile smartphone device 137 can be found in U.S. Pat. No. 8,631,358 incorporated herein by reference in its entirety.

Different Ways of Implementing the Mobile Client Machines and Devices on the System Network of the Present Invention In one illustrative embodiment, the enterprise-level system network 100 is realized as a robust suite of hosted services delivered to Web-based client subsystems 137 using an application service provider (ASP) model. In this embodiment, the Web-enabled mobile application 153 can be realized using a web-browser application running on the operating system (OS) (e.g. Linux, Application IOS, etc.) of a mobile computing device 137 to support online modes of system operation, only. However, it is understood that some or all of the services provided by the system network 100 can be accessed using Java clients, or a native client application, running on the operating system of a client computing device, to support both online and limited off-line modes of system operation. In such embodiments, the native mobile application 153 would have access to local memory (e.g. a local RDBMS) on the client device 137, accessible during off-line modes of operation to enable consumers to use certain or many of the system functions supported by the system network during off-line/off-network modes of operation. It is also possible to store in the local RDBMS of the mobile computing device 137 most if not all relevant data collected by the mobile application for any particular fire-protection spray project, and to automatically synchronize the dataset for user's projects against the master datasets maintained in the system network database 113A, within the data center 110 shown in FIG. 69. This way, when using an native application, during off-line modes of operation, the user will be able to access and review relevant information regarding any building spray project, and make necessary decisions, even while off-line (i.e. not having access to the system network).

As shown and described herein, the system network 100 of the present invention has been designed for several different kinds of user roles including, for example, but not limited to: (i) building purchasers, builders, and architects who might or will have the authority to place or make purchase orders online to commence a Class-A fire-protected wood-framed building project; and (ii) prefabrication building project administrators and technicians registered on the system network. Depending on which role, for which the user requests registration, the system network will request different sets of registration information, including name of user, address, contact information, information about wood-framed buildings, builders, architects, etc. In the case of a web-based responsive application on the mobile computing device 137, once a user has successfully registered with the system network, the system network will automatically serve a native client GUI, or an HTML5 GUI, adapted for the registered user. Thereafter, when the user logs into the system network, using his/her account name and password, the system network will automatically generate and serve GUI screens described below for the role that the user has been registered with the system network.

In the illustrative embodiment, the client-side of the system network 100 can be realized as mobile web-browser application, or as a native application, each having a "responsive-design" and adapted to run on any client computing device (e.g. iPhone, iPad, Android or other Web-enabled computing device) 137 and designed for use by anyone interested in managing, overseeing and/or monitoring on-site CFIC liquid spray projects involving owners of specific wood-framed buildings seeking Class-A fire-protection.

Figure 71:
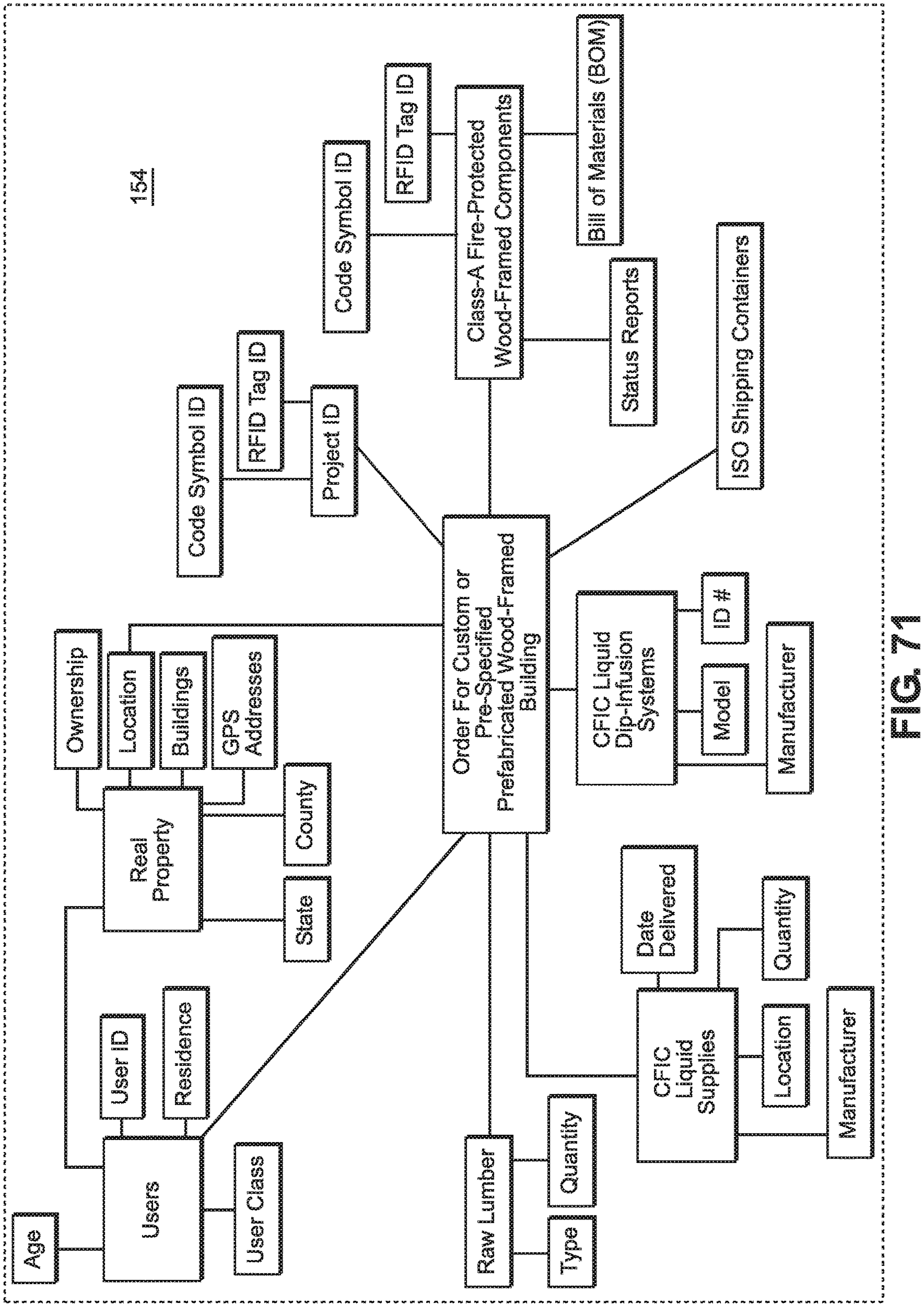
FIG. 71 is a schematic representation of an exemplary schema for the network database supported by the system the present invention shown in FIG. 69, wherein each primary enterprise object is schematically represented as an object in the schema and represented in the data records created and maintained in the network database.

Specification of Database Schema for System Network Database Supported on the System Network of the Present Invention As shown in FIG. 71, the schema 154 includes objects such as, for example: users of the system (e.g. property owners, builders, insurance companies, etc.); real property on which the building will be constructed (if known at the time of ordering); orders for custom or pre-specified prefabricated wood-framed building; and construction project. Each of these objects have further attributes specified by other sub-objects indicated in FIG. 71, including, for example: project ID; raw lumber; CFIC liquid; CFIC liquid dip infusion systems; Class-A fire-protected wood-framed components; and ISO-shipping containers.

Specifications of Services Supported by the Graphical User Interfaces Supported on System Network of the Present Invention for Building Purchasers, Builders, Architects, Property Insurers and Other Stakeholders FIG. 72 illustrates an exemplary graphical user interface (GUI) 155 of the mobile application 153 used by customers who place orders for prefabricated Class-A fire-protected wood-framed buildings, supported by the system of the present invention. As shown in this exemplary GUI screen, a number of pull-down menus are supported under the titles: Messages 155A, where the user can view messages sent via messaging services supported by the application; Orders 155B, where orders for prefabricated buildings have been placed and scheduled, have been completed, or are in progress; and Projects 155C, which have been have been scheduled, have been completed, or are in progress, and where uploaded authenticated certifications can be reviewed, downloaded and forwarded as needed by authorized stakeholders, to the appropriate parties and authorities.

Notably, the GUIs shown in FIGS. 70 through 70J have been designed and configured for use by the prefabricated building administrators and technicians who will be responsible for (i) taking orders for prefabricated Class-A fire-protected wood buildings, and (ii) managing each prefabricated fire-protected building project, from start to finish, so that building owners, builders, architects, property insurance agents and financial institutions (e.g. banks) may rely on the prefabrication company managing each and every step of each project using the system network 100.

FIG. 72A shows a graphical user interface of mobile application configured for use by customers showing details for an order for a custom prefabricated wood-framed building, or wood-framed building component using services supported by the system network 100.

FIG. 72B shows a graphical user interface of mobile application configured for use by project administrator showing details for an order for a pre-specified prefabricated wood-framed building, or wood-framed building component, using services supported by the system network 100.

FIG. 72C shows a graphical user interface of mobile application configured for use by project administrator showing status details for a project for a custom prefabricated wood-framed building, or wood-framed building component, using services supported by the system network 100.

Figures 2, 3:
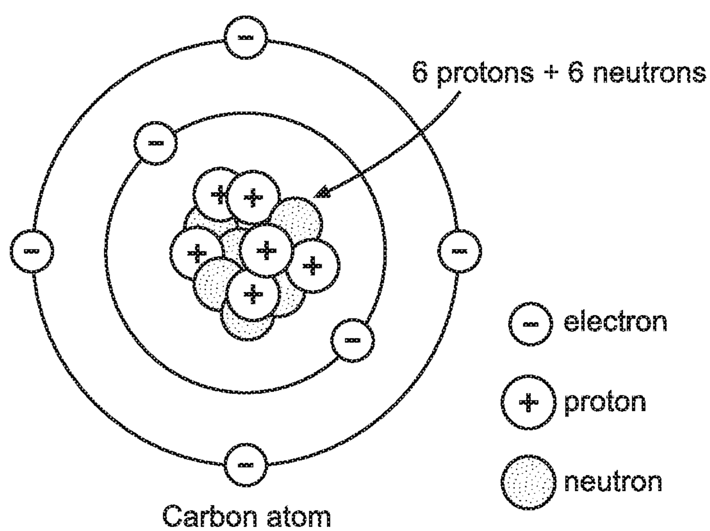
FIG. 2 is a schematic representation of chemical formula for photosynthesis which describes how carbon diode is captured and sequestered during the naturally occurring photosynthesis process within growing trees.
FIG. 3 is a schematic representation of the atomic structure of a single carbon atom, comprising 6 protons and 6 neutrons in its nucleus, with 6 electrons in its outer orbits.
Figure 4:
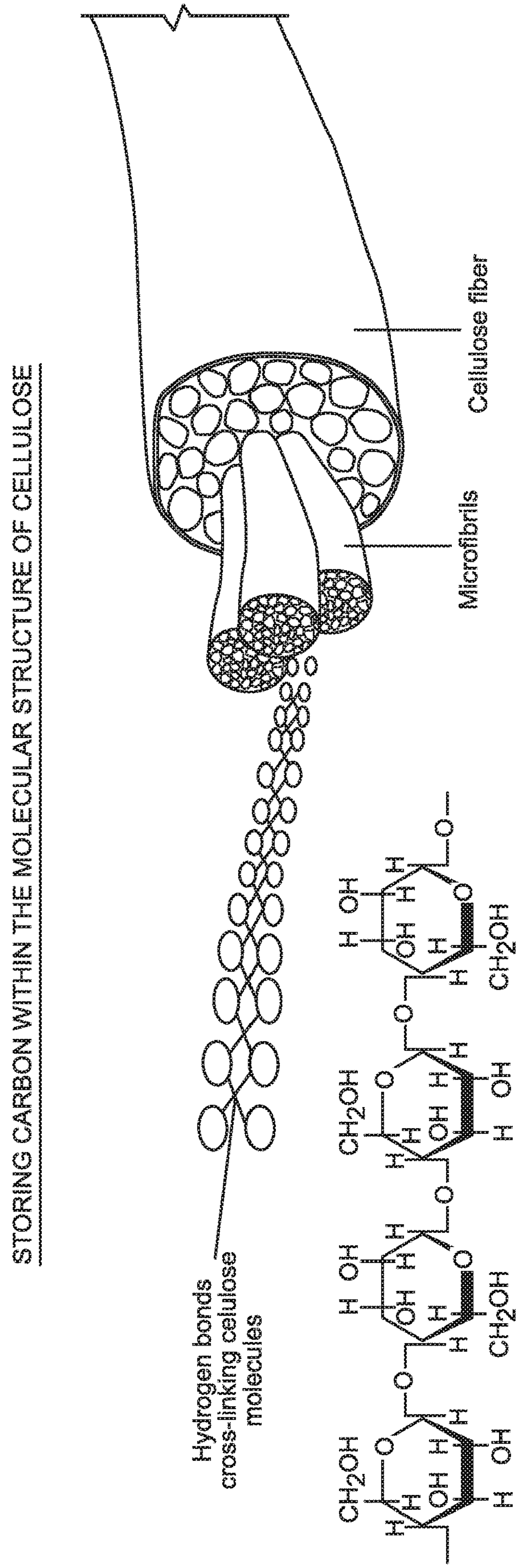
FIG. 4 is a schematic representation of chemical formula for cellulose within trees, showing how carbon is stored within the molecular structure of individual cellulose molecules, wherein hydrogen bonds perform cross-linking of cellulose molecules within a tree, as well as lumber.
Figure 5:
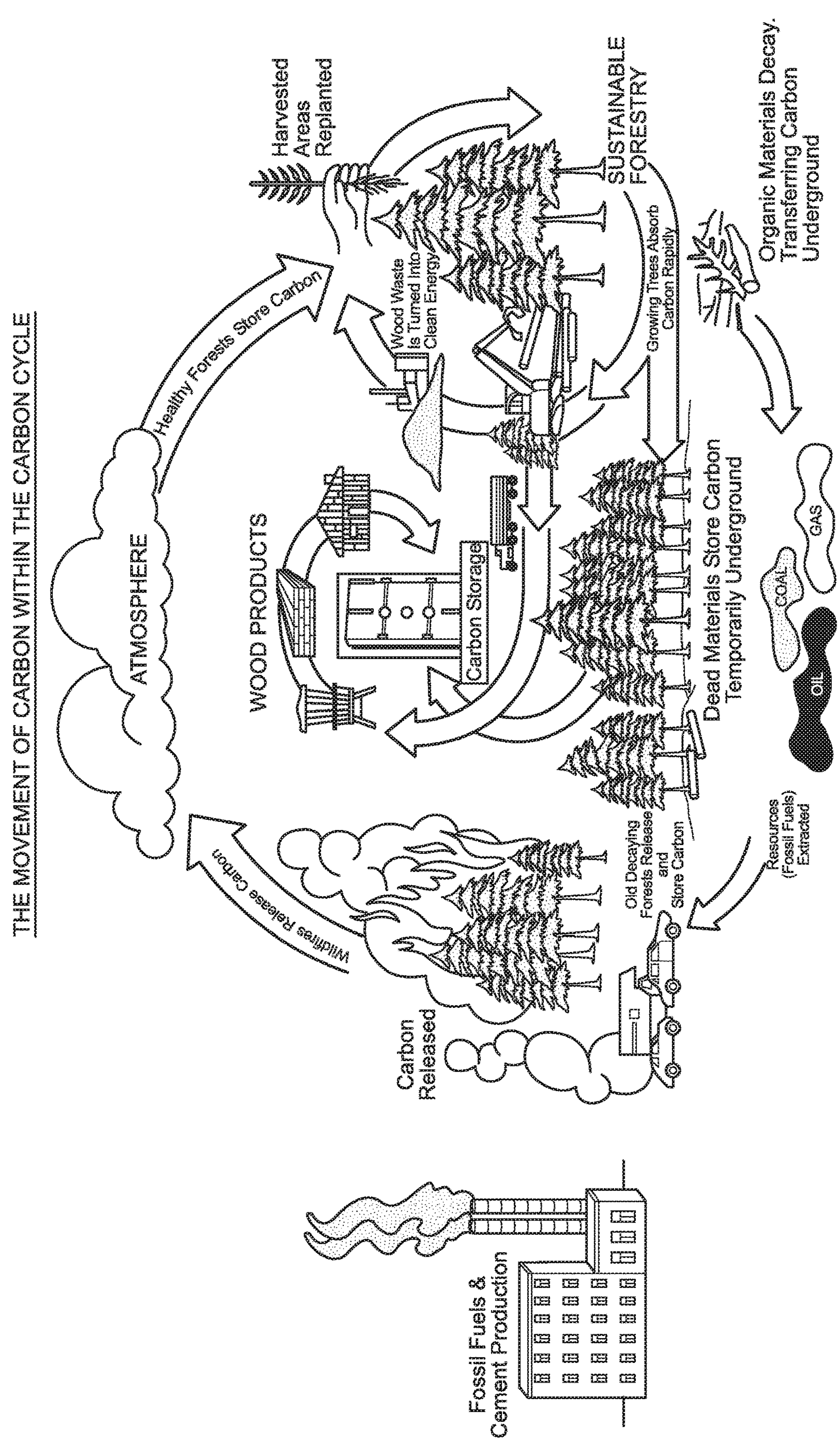
FIG. 5 is a schematic representation of the carbon cycle supported on Earth, illustrating the movement of carbon from various sources on the planet.

FIG. 2D shows a graphical user interface of mobile application configured for use by project administrator showing progress details for a project relating to the factory-fabrication of a prefabricated wood-framed building, or prefabricated wood-framed building component, using services supported by the system network 100.

FIG. 72E shows a graphical user interface of mobile application configured for use by project administrator showing a message (via email, SMS messaging and/or push-notifications) received indicating that the project relating to a prefabricated wood-framed building is completed and ready for shipment to destination shipping location, using services supported by the system network 100.

Specification of Services Supported by the Graphical User Interfaces Supported on System Network of the Present Invention for Use by Fabricators, Administrators and Technicians Involved in the Production of Prefabricated Class-A Fire-Protected Wood-Framed Buildings and Components FIG. 73 shows an exemplary graphical user interface 156 for the mobile application 153 configured for use by wood-framed building administrators and supervisors supported by the system network 100. As shown in this exemplary GUI screen 156, supports a number of pull-down menus under the titles: Messages 156A, where project administrators and supervisors can view messages sent via messaging services supported by the application; Orders 156B, where orders for prefabricated wood-framed buildings have been placed and/or scheduled, have been completed, or are in progress, with status notes, terms, conditions and other considerations made of record; Projects 156C, which have been have been scheduled, have been completed, or are in progress; and Reports 156D, which are generated for Orders, Projects and Supplies, on prefabricated wood-framed building projects are managed by the mobile application 153 running on the mobile client system 137C in operable communication with web, application and database servers 111, 112, 113 at the data center 110.

Notably, the GUIs shown in FIGS. 70 through 70J have been designed and configured for use by the prefabricated building administrators and technicians who will be responsible for (i) taking orders for a prefabricated Class-A fire-protected wood-framed building, (ii) managing the entire prefabricated fire-protected building project, from start to finish, so that building owners, builders, architects, property insurance agents and financial institutions (e.g. banks), as well as local, state and federal authorities, may rely on their services and work product of the prefabrication company managing each and every step of project using the system network 100.

FIG. 73A shows a graphical user interface of the mobile application 153 configured for use by project administrators and managers showing the creation of a new message about a specific project, using message services supported on the system network 135.

FIG. 73B shows a graphical user interface of the mobile application 153 configured for use by project administrators showing the status of a purchase order (PO) for a prefabricated Class-A fire-protected wood-framed building, or Class-A fire-protected wood-framed building component(s), using services supported by the system network 100.

FIG. 73C shows a graphical user interface of the mobile application 153 configured for use by project administrators showing the supplies required to fulfill a purchase order for a Class-A fire-protected prefabricated wood-framed building, or Class-A fire-protected prefabricated wood-framed building component(s), using services supported by the system network 100.

FIG. 73D shows a graphical user interface of the mobile application 153 configured for use by project administrators showing the bill of materials (BOM) required to fulfill a purchase order for a prefabricated Class-A fire-protected wood-framed building, or Class-A fire-protected wood-framed building component, using services supported by the system network 100.

FIG. 73E shows for a graphical user interface of the mobile application 153 configured for use by project administrators showing the status of a factory project involving the prefabrication of a Class-A fire-protected wood-framed building, or Class-A fire-protected wood-framed building component(s) 132, using services supported by the system network 100.

In one illustrative embodiment, the mobile application 153 and/or digital camera systems can be used to review digital images and audio-video (AV) recordings taken of CFIC liquid dipped-coated wood pieces along the production line, relating to prefabricated wood-framed building components 132 being fabricated, and uploaded to the system network database 113A under the project ID # of the prefabricated building project. All captured documents and evidence of CFIC liquid dip-coated wood can be uploaded, logged and time/date-stamped and stored into the project-specific document folder maintained on the system network database 148A of the system network 100 using document capture, time/date-stamping and cataloguing capabilities.

Alternatively, Class-A fire-protected lumber, and/or engineered wood products (EWPs), that are dip-coated in CFIC liquid, will be used to construct prefabricated Class-A fire-protected wood-framed building components 132 (e.g. wall panels, roof trusses, floor trusses, roofing systems, flooring systems, and stair assemblies). Once constructed in the factory on the production line, a barcoded/RFID-tagged inspection label 138 is applied to each and every prefabricated Class-A fire-protected wood-framed building component produced on the production line 131.

Figure 68C:
FIG. 68C is a schematic representation of an exemplary barcoded/RFID-tag encoded inspection checkpoint provided with a code symbol, and an RFID tag and certifications and verifications mounted on a substrate, for permanent mounting to each produced Class-A fire-protected carbon-quantized wood-framed/mass-timber component produced in the factory of the present invention, for the ordered prefabricated wood-framed or mass-timber building or building component.

As shown in FIG. 68C, each barcoded/RFID-tagged inspection label 138 will include a bar code symbol 138A, and a UHF-Class RFID tag 138B, mounted on a label substrate, wherein the bar code symbol and RFID tag has a unique building-component identifier (e.g. an alphanumeric character string) encoded into the symbology used in the barcode symbol and RFID tag identifier, and this building-component identifier will be used to identify subfolders or subdirectories where collection data, information and documents are stored in a building-component subfolder (indexed with the building-component identifier), in the building-project folder on the network database 113A, maintained on the system network 110, shown in FIG. 69. The building-component identifier will be read during each scan/read of the barcoded/RFID-tag label 138B, and used by the mobile application 153 to access the appropriate building-component subfolder in the building project folder where all such certifications 138D of dip-infusion, inspection and oversight, and photos and videos, and signed confirmations and verifications of fire-protection services (e.g. CFIC were applied to specific wood objects by whom on specific dates) are stored and archived for fire risk engineering analysis, review, and other archival and auditing purposes.

As shown in FIGS. 68A, 68B and 68C, each prefabricated modular or panelized wood-framed or mass-timber building component 132 (132A, 132B) manufactured in a just-in-time wood-framed/mass-timber building factory 130 will be uniquely barcoded/RFID-tagged and tracked by the system network 100 of the present invention as described herein. Specifically, a unique barcoded/RFID-tagged label 138 will be permanently affixed to (i) each completed prefabricated wood-framed or mass-timber building module 132A, or (ii) each prefabricated building module 132B associated with a specific prefabricated wood-frame or mass-timber building, as the case may be, and a barcode-index documents folder will be maintained in the network database 113A at the data center 110, for storing collected images, videos, signed certifications and verifications from specific technicians who applied and/or oversaw the application of CFIC liquid to specific wood products to provide Class-A fire protection performance properties thereto during the factory manufacturing process, on specific dates, at specific GPS-indexed locations. The collected documents are stored in an indexed folder on the network database 113A, associated with the manufacture of a prefabricated building within in the factory system.

The system network of the present invention 100, and the services supported thereby, will provide fire and construction insurance underwriters, as well as fire risk engineers, easy remote access to data, documents and documentation to support the fire insurance underwriting process, in unprecedented manner, with regard to any wood-framed or mass-timber building that has received fire-protection in accordance with the principles of the present invention. The project folders supported within the network database 113A will contain signed documents by and photographs and videos of individuals who actually performed the professional services on specific time and dates, at specific GPS locations, confirming and verifying that such specific professional fire-protection services (PFPS) were performed on a specific wood-framed building which is the subject of a fire insurance policy be underwritten. All signed confirmations and verifications by such professional fire protection technicians are captured, uploaded and stored as GPS, data and time stamped documents in a network database system 113A, under a single project associated with a specific fire-protection services contract, upon which fire, construction and property insurance underwriters will have the confidence to grant insurance premium reductions (i.e. discounts or rewards) for confirmed and verified fire-risk reduction services actually rendered on a specific wood-framed or mass-timber building.

The mobile application 153 has access to all services supported in the mobile computing device 137 (e.g. Apple iPhone or iPad) as the case may be. Such services will include the spray technician wearing a head-mounted digital color camera 137C, with a wireless or wired interface to the mobile computing device 137, for capturing live video-footage of each fire-protection process on a specific project, and also verifying and documenting the CFIC liquid spray treatment of each and every completed Class-A fire-protected wood-framed building fabricated in the factory. Such documentation should include capturing and uploading digital images and AV-recordings of certificates of CFIC liquid dip-infusion stamped and verified along the production line involved the fabrication process, as well as spraying CFIC liquid on wood surfaces as well, as the circumstances may require.

FIG. 73F shows a graphical user interface of the mobile application 153 configured for use by project administrator showing the progress of a factory project involving the prefabrication of a Class-A fire-protected wood-framed building, or Class-A fire-protected wood-framed building component, using services supported by the system network 100.

FIG. 73G shows for a graphical user interface of the mobile application 153 configured for use by project administrator showing the supplies required by a factory project involving the prefabrication of a Class-A fire-protected wood-framed building, or Class-A fire-protected wood-framed building component, using services supported by the system network 100.

FIG. 73H shows for a graphical user interface of mobile application configured for use by project administrator showing a report on purchase orders placed for the prefabrication of a Class-A fire-protected wood-framed building, or Class-A fire-protected wood-framed building component, using services supported by the system network 135.

FIG. 73I shows for a graphical user interface of the mobile application 153 configured for use by project administrator showing a report on projects involving the prefabrication of a Class-A fire-protected wood-framed building, or Class-A fire-protected wood-framed building component, using services supported by the system network 100.

FIG. 73J shows for a graphical user interface of the mobile application 153 configured for use by project administrator showing a report on supplies required for the prefabrication of a Class-A fire-protected wood-framed building, or Class-A fire-protected wood-framed building component, using services supported by the system network 100.

Method of Operating a Just-in-Time Prefabricated Class-A Fire-Protected Wood-Framed Building Factory System Supporting Multiple Production Lines for Producing Class-A Fire-Protected Carbon-Quantized Wood-Framed Components for Constructing Prefabricated Class-A Fire-Protected Wood-Framed Buildings FIG. 74 describes the primary steps involved in carrying out the method of operating a just-in-time prefabricated wood-framed building factory system 130, supporting multiple production lines 131, as illustrated in FIGS. 61 and 62, for producing prefabricated Class-A fire-protected wood-framed building components, as needed to construct prefabricated Class-A fire-protected wood-framed buildings ordered online using the mobile application 153 described herein.

As indicated at Block A in FIG. 74, in response to a purchase order (PO) received at the factory system 130 for a customized or specified wood-framed building, the factory system automatically generates a prefabricated wood-framed building project for the order placed by a customer using the mobile application 153 installed and running on mobile computing system 137A, 137B, or through an equivalent website.

As indicated at Block B in FIG. 74, the factory system 130 analyzes the customized or specified wood-framed building into its wood-framed components, and creates bill of materials (BOM) for the wood-building project.

As indicated at Block C in FIG. 74, the system 130 determines the type and quantity of raw wood and/or engineered wood product (EWP) 132 required to make each wood-framed component required by the wood-framed building project.

As indicated at Block D in FIG. 74, the system 130 determines the supply clean fire inhibiting chemical (CFIC) liquid 142 required to dip-coat and treat wood and/or engineered wood product (EWP) for each wood-framed component required by the wood-framed building.

As indicated at Block E in FIG. 74, the system 130 automatically dip-coats the wood and/or the EWPs in a high-speed dipping tank installed along a production line, as shown in the FIGS. 19A, 23A, 27A and 33A, each containing a controlled supply of CFIC liquid for dip-infusion wood pieces at atmospheric pressure, to produce Class-A fire-protected wood required to fabricate Class-A fire-protected wood-framed components for the wood-framed building, specified by the placed purchase order.

As indicated at Block F in FIG. 74, the carbon quantization engine 500 is used to quantize the carbon secured in the fire-protected wood-framed components required to construct the ordered wood-framed building.

As indicated at Block G in FIG. 74, a code symbol 138A and RFID tag 138B with certifications and verifications 300D and fire protected carbon units (FPCUs) are mounted on a substrate 138C, as shown in FIG. 68C, which is permanently applied to each produced Class-A fire-protected wood-framed/mass-timber component 132A, 132B, 132C, 132D, 132E produced in the factory for the ordered prefabricated wood-framed or mass-timber building.

As indicated at Block H in FIG. 71, each symbol coded/RFID-tagged Class-A fire-protected wood-framed component 132A, 132B, 132C, 132D, 132E is loaded into an ISO-shipping container 136 assigned to the fire-protected carbon-quantized wood-framed building project.

As indicated at Block H in FIG. 74, the ISO-shipping container 136 is delivered to the location where the fire-protected carbon-quantized wood-framed building is to be constructed. Thereafter, construction of the Class-A fire-protected prefabricated wood-framed building begins at the construction site.

In the event the purchaser of the prefabricated wood-framed building requested on-site application of Class-A fire-protection spray treatment, using CFIC liquid (i.e. Hartindo AF31), a professional fire-protection spray treatment (provider) team will use the system network 100 shown in FIG. 55 to apply, certify, verify and document the Class-A fire protection liquid spray process as described in detail above, in synchronism with the prefabricated builder's schedule. As each predesignated section of the wood-framed building is constructed by assembling pre-fabricated Class-A fire-protected wood-framed building components (e.g. wall panels, floor and roof truss panels, stair components, etc.), the spray technicians will spray treat all exposed interior surface of the completed section of the wood-framed building, and certify, verify and document the spray treatment using the mobile application 153 using mobile computing devices 137 and services supported by the system network 100. Once completed, the prefabricated Class-A fire-protected wood-framed building will be double-protected with Class-A fire-protection, providing the building owner with many benefits, including potentially lower property insurance premiums, in view of the fact that significant risk of total destruction by fire has been significantly reduced or otherwise minimized.

By virtue of the JIT factory system 130, it is now possible to produce, as needed, a custom or pre-specified wood-framed building made from Class-A fire-protected wood-framed building components, thereby minimizing inventory and cost of manufacture, and improving the quality and precision of prefabricated Class-A fire-protected prefabricated wood-framed buildings.

Method of Qualifying Wood-Framed Building for Reduced Property Insurance Based on Verified and Documented Clean Fire Inhibiting Chemical (CFIC) Liquid Dip-Infusion of Wood Pieces During Fabrication of Class-A Fire-Protected Wood Building Components for Prefabricated Wood-Framed Buildings FIG. 75 shows the high-level steps required to practice the method of qualifying a wood-framed building for reduced property insurance based on verified and documented dip-infusion of all wood pieces in clean fire inhibiting chemical (CFIC) liquid prior to the fabrication of Class-A fire-protected wood building components for used in constructing prefabricated Class-A fire-protected wood-framed buildings.

As indicated at Block A in FIG. 75, dip-infusion all wood in a clean fire inhibiting chemical (CFIC) liquid during the fabrication of Class-A fire-protected wood-framed building components for constructing an ordered prefabricated building within a prefabricated wood-framed building factory 130.

As indicated at Block B in FIG. 75, verifying and documenting the CFIC liquid dip-infusion and Class-A fire protection treatment of all wood pieces used to construct wood-framed building components for the prefabricated Class-A fire-protected wood-framed building, by capturing time/date stamping data, and digital images and videos of certificates of CFIC liquid dip-infusion within the factory 130.

As indicated at Block C in FIG. 75, the factory-collected Class-A fire-protection treatment verification data is wirelessly transmitted to a central network database 113A on the system network 100 to update the central network database 113A.

As indicated at Block E in FIG. 75, a company underwriting property insurance for the wood-framed building accesses the central network database 148A on the system network 100, to verify the database records maintained for each wood-framed building that has undergone spray-based Class-A fire protection treatment, to qualify the building owner for lower property insurance premiums, based on the verified Class-A fire-protection status of the sprayed-treated wood-framed building.

As indicated at Block E in FIG. 75, upon the outbreak of a fire in the insured wood-framed building/property, the local fire departments instantly and remotely assess the central network database 113A using a mobile application 153, so as to quickly determine Class-A fire-protected status of the wood-framed building by virtue of CFIC liquid spray treatment of the wood-framed building during the construction phase, and inform fireman tasked with fighting the fire that the wood-framed building has been treated with Class-A fire-protection defense against fire.

Method of and Apparatus for Managing the Chain of Custody, Quality Control, Tracking and Inventory of Clean Fire Inhibiting Chemical (CFIC) in CFIC Totes being Shipped from a Chemical Factory or Warehouse to a Network of Lumber Factories Producing Class-A Fire-Protected Lumber and Other Engineered Wood Products (EWPs)

FIG. 76 illustrates the supply chain management, quality control, tracking and inventory replenishment process supported by the system network of the present invention, shown in FIG. 69. As shown, the CFIC tote chain of custody and tracking system application 117 is deployed to manage and control the weight of the contents in each CFIC tote from the time of shipment to time of arrival at the customer's Class-A fire-protected lumber factory 130A (130B, 130C) where the CFIC tote 181' is received from the chemical factory 180 or warehouse 187, and either accepted or rejected depending on the comparative weight measurements of the shipped CFIC totes made at the receiving factory 130 using a digital code scanning and weighing (scale) system (SWS) 133 as shown in FIG. 76B. An example of SWS equipment 133 that might be used for this purpose could be the Prime Smart Count Bluetooth/RFID Speedy Counting Scale System, commercially available from Prime Scales, Inc., or many other digital weigh scale systems well known in the art.

FIG. 76A illustrates the weighing of CFIC liquid totes 181' at chemical factory 180 before shipment and recording tote weight in supply chain management database 113A. FIG. 76B illustrates the weighing CFIC liquid totes 181' at the factory 130A (130B, 130C), and recording tote weight in supply chain management database 113A before acceptance. The method of supply chain management and control will be described below.

Figure 77A:
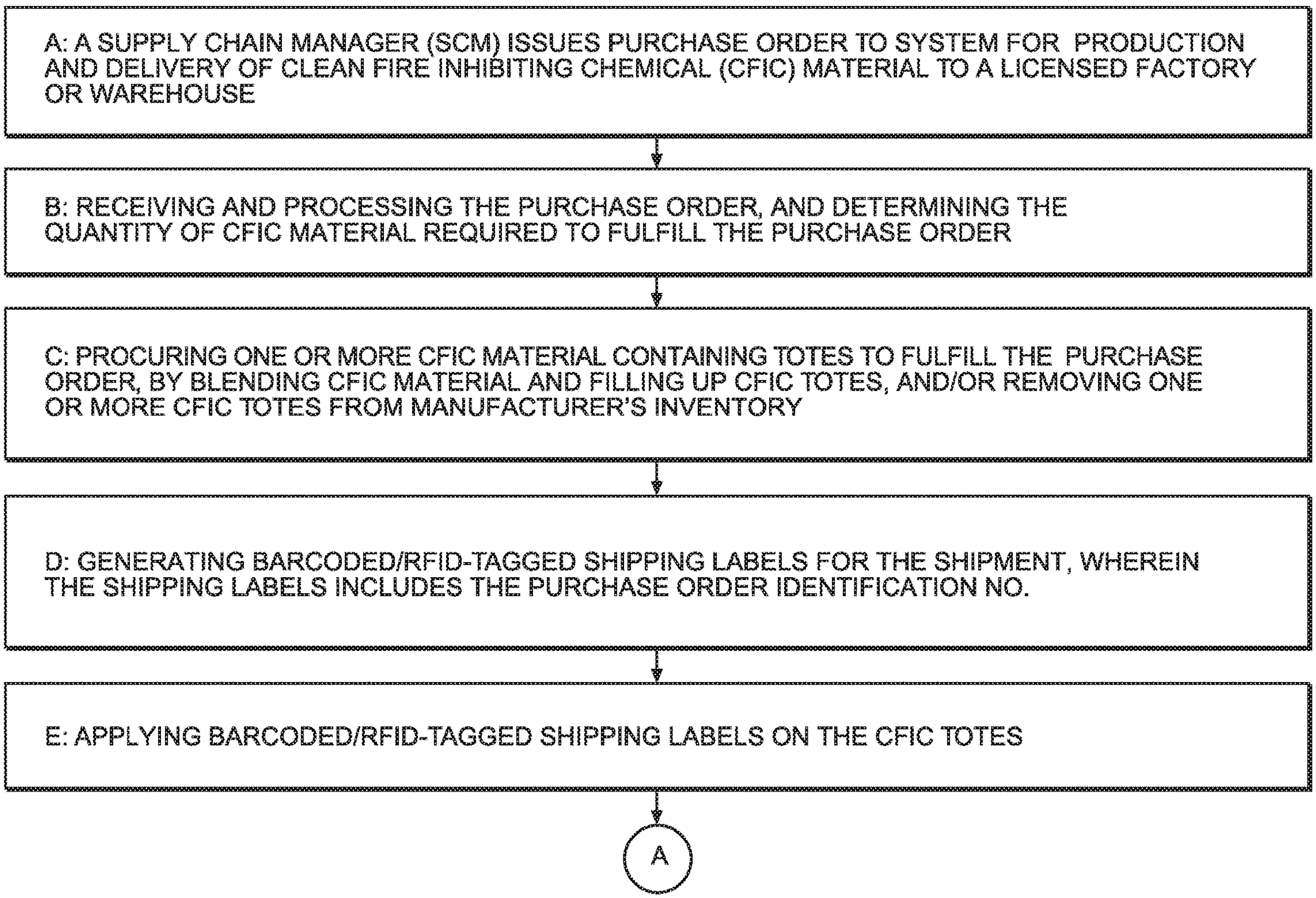
Figure 77B:
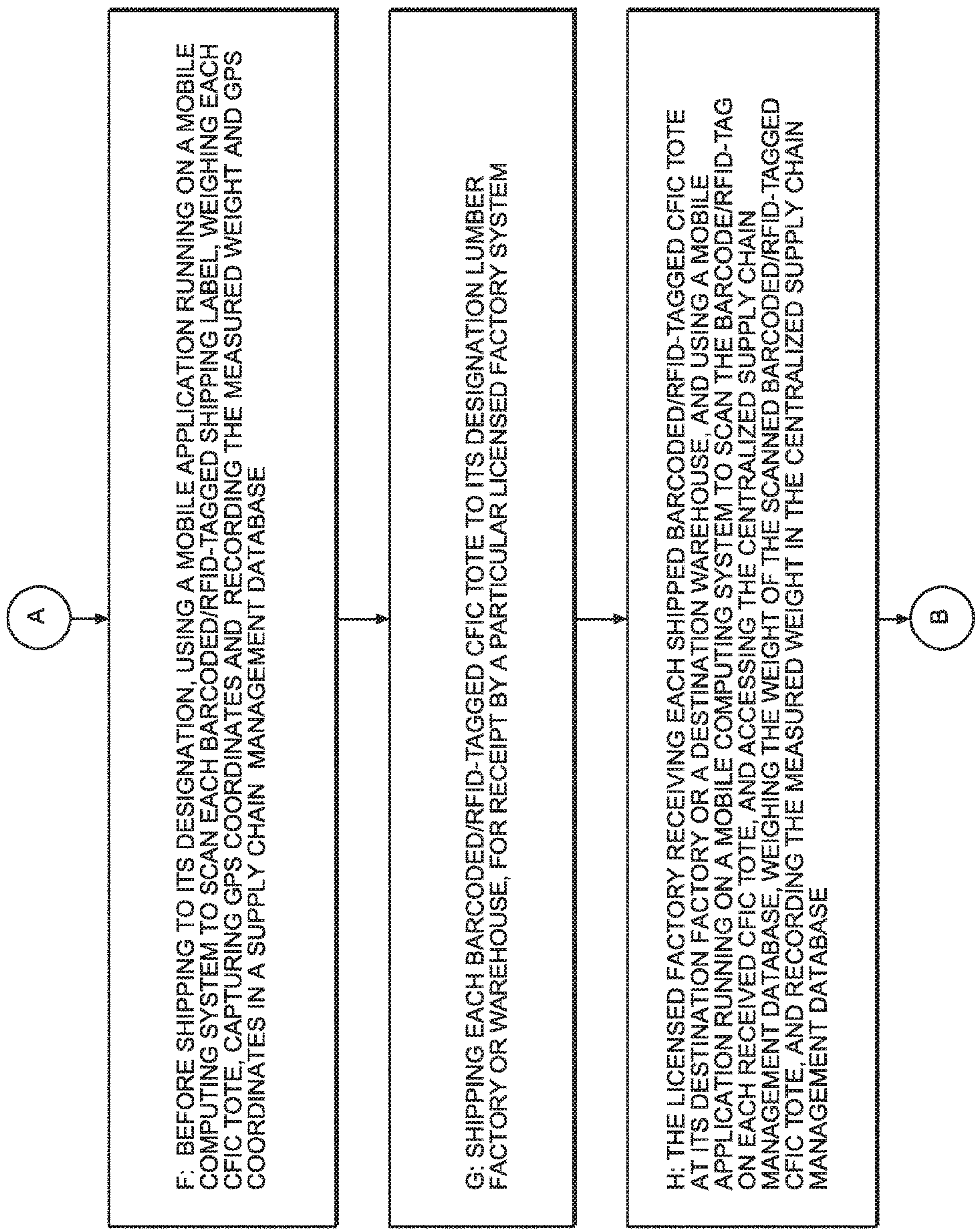
Figure 77C:
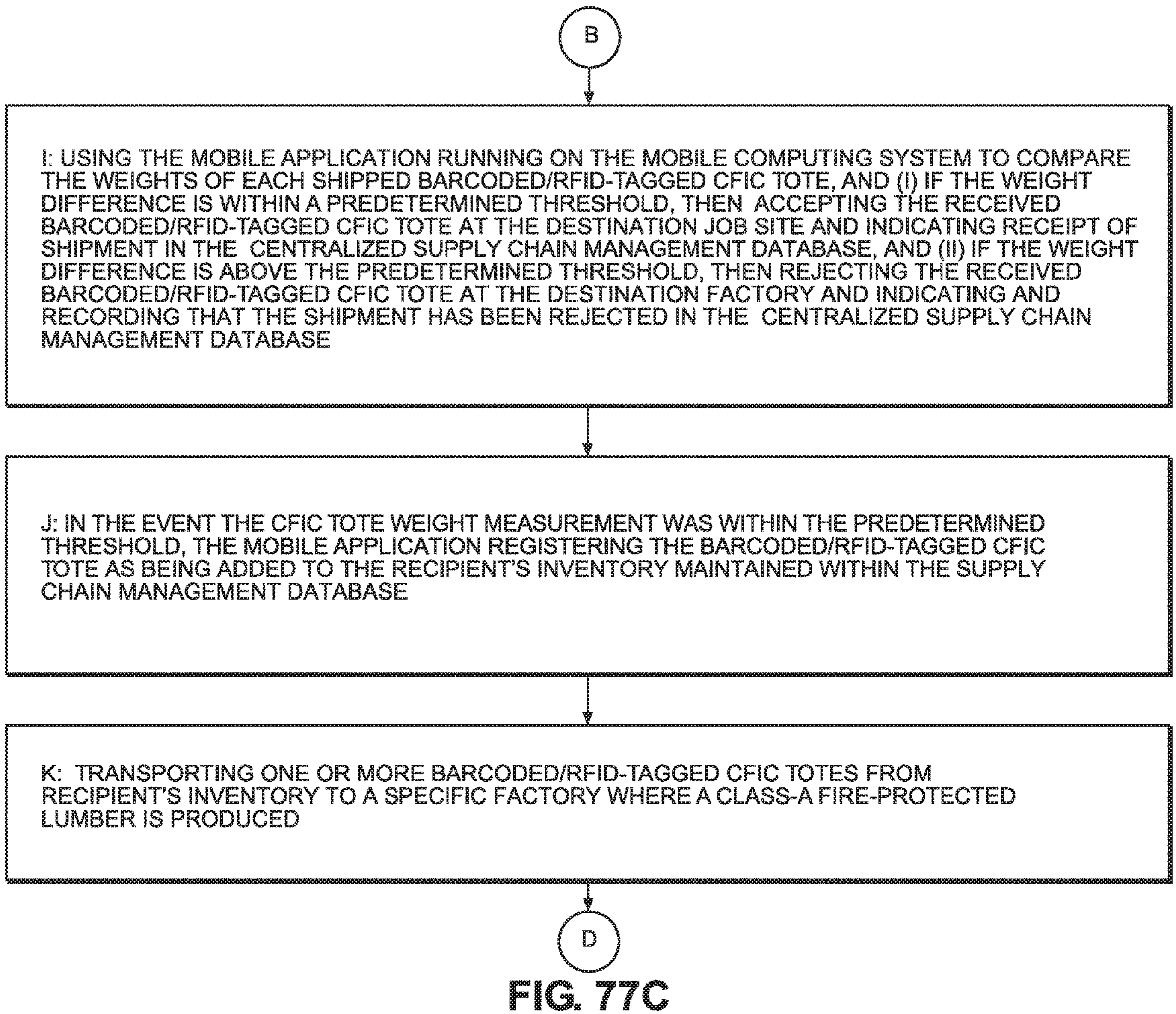

FIGS. 77A, 77B and 77C describes the high level steps carried out in a method of maintaining the chain of custody, quality control, tracking and inventory replenishment when producing and supplying clean fire inhibiting chemical (CFIC) material (e.g. liquid or dry powder) in locked totes 181' shipped from the chemical factory 130A, 130B and 130C to a network of Class-A fire-protected wood producing factory systems 130A (130B, 130C), as illustrated in FIG. 76.

Figure 79A:
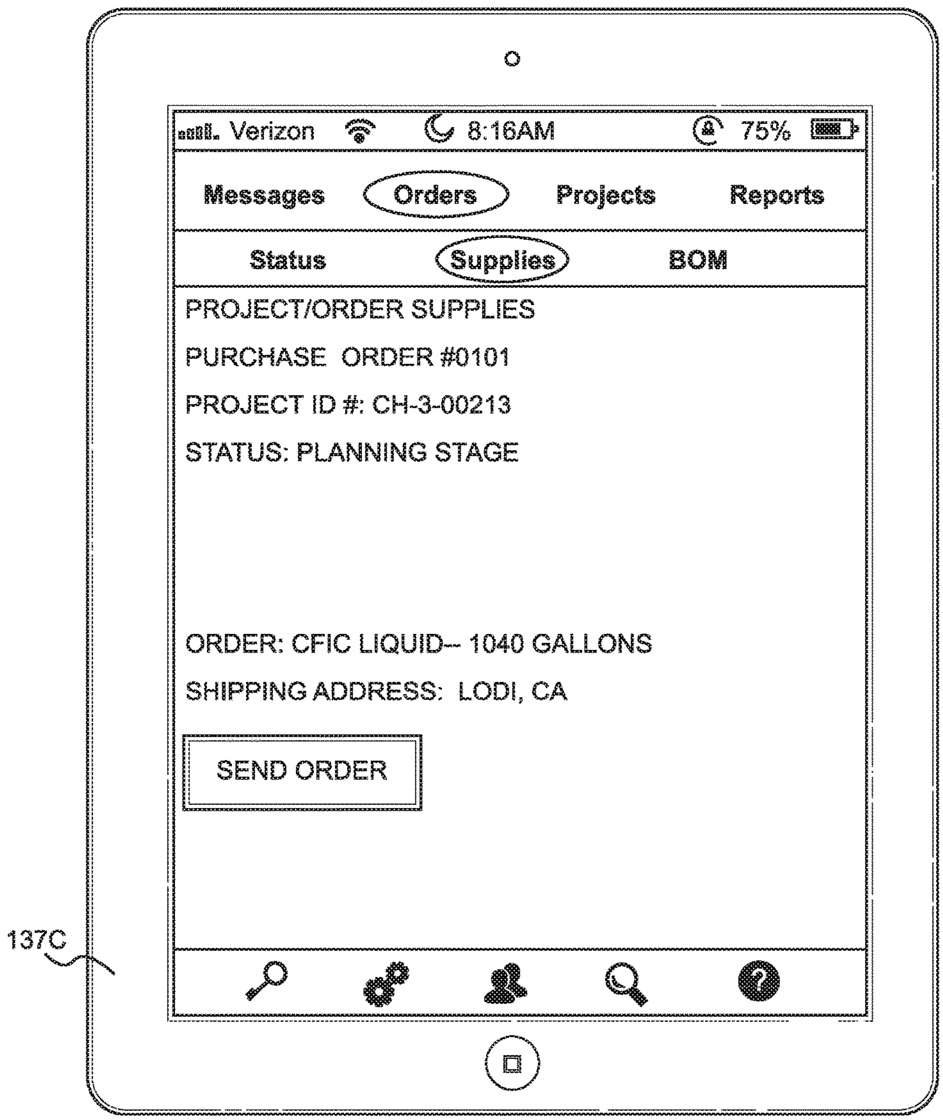

As indicated at Block A in FIG. 77A, a supply chain manager 186 shown in FIG. 76 issues a purchase order (PO) to a chemical factory system 180 for the production and delivery of clean fire inhibiting chemical (CFIC) liquid to a specified factory system 130A, as shown in FIGS. 76B and 77A, for producing Class-A fire-protected lumber using the CFIC liquid dipping and infusion process of the present invention, as illustrated in FIG. 79A. Notably, the supply chain manager 186 can be a human being, or an automated or artificially-intelligent (AI) computer system programmed to determined the amount of CFIC liquid required to treat a quantity of raw lumber, and produce a quantity of Class-A fire protected lumber in accordance with the principles of the present invention.

As indicated at Block B in FIG. 77A, the purchase order is received and processed, and the quantity of CFIC liquid is determined required to fulfill the purchase order.

As indicated at Block C in FIG. 77A, one or more CFIC powder or liquid containing totes 181' are procured to fulfill the purchase order, either by (i) blending CFIC powder and/or liquid, and filling up and CFIC totes 181', and/or (ii) removing one or more CFIC totes 181' from inventory maintained in a warehouse 187 as shown in FIG. 76. In the illustrative embodiment, each CFIC tote 181' has a combination lock mechanism that prevents others without the lock code from accessing the chemical contents of the CFIC tote 181'.

As indicated at Block D in FIG. 77A, barcoded/RFID-tagged shipping labels 200 are generated for the shipment. In the illustrative embodiment, the shipping labels 200 include the purchase order identification number contained in the purchase order. In the illustrative embodiment, each shipping label 200 includes the purchase order identification number contained in the purchase order. Preferably, the barcode and RFID-tag code structures will encode the purchase order identification number in one way or other, or be linked to this identification number using suitable techniques.

As indicated at Block E in FIG. 77A, the barcoded/RFID-tagged shipping labels 200 are applied on the CFIC totes 181', and will include a barcode symbol component 200A and an RFID-tag component 200B. In some embodiments, one or more of these identification components will be used for auto-identification of each CFIC tote 181' used on the system of the present invention.

In general, various kinds of barcode symbol and RFID-tag technologies can be used to realize the barcoded/RFID-tagged shipping labels 200 comprising barcode 200A and RFID-tag 200B. Various RFID-labels, RFID-tags and barcode labels are available from Zebra Technologies, Inc., Holtsville, NY Also, Zebra Technologies provides hand-held mobile computers, wearable computers, vehicle-mounted computers, tablets and hand-held RFID readers (i.e. mobile computing devices 117), and barcode symbol, RFID-label and RFID-tag printers and readers (i.e. scanners) for use in practicing the principles of the present invention disclosed herein.

Figure 79B:
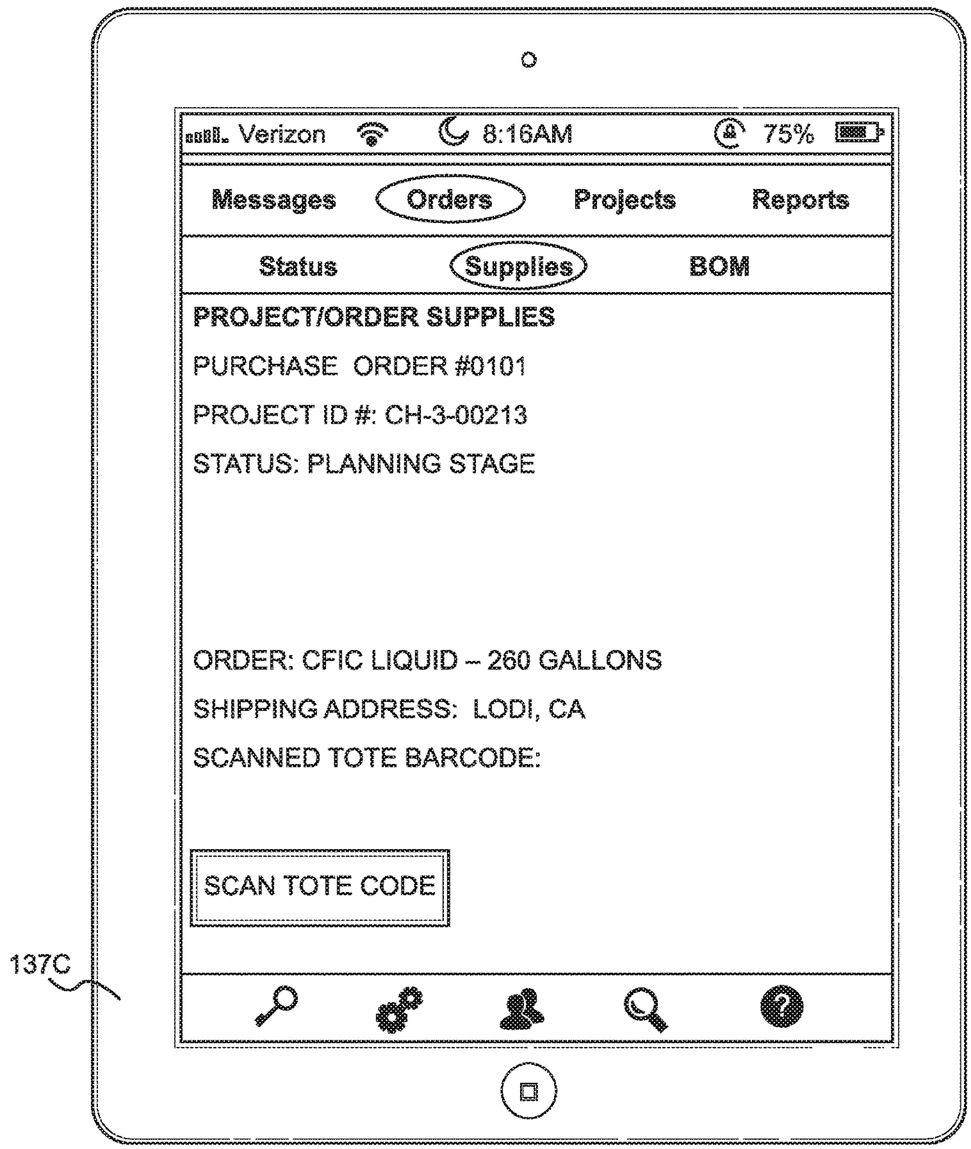
Figure 79C:
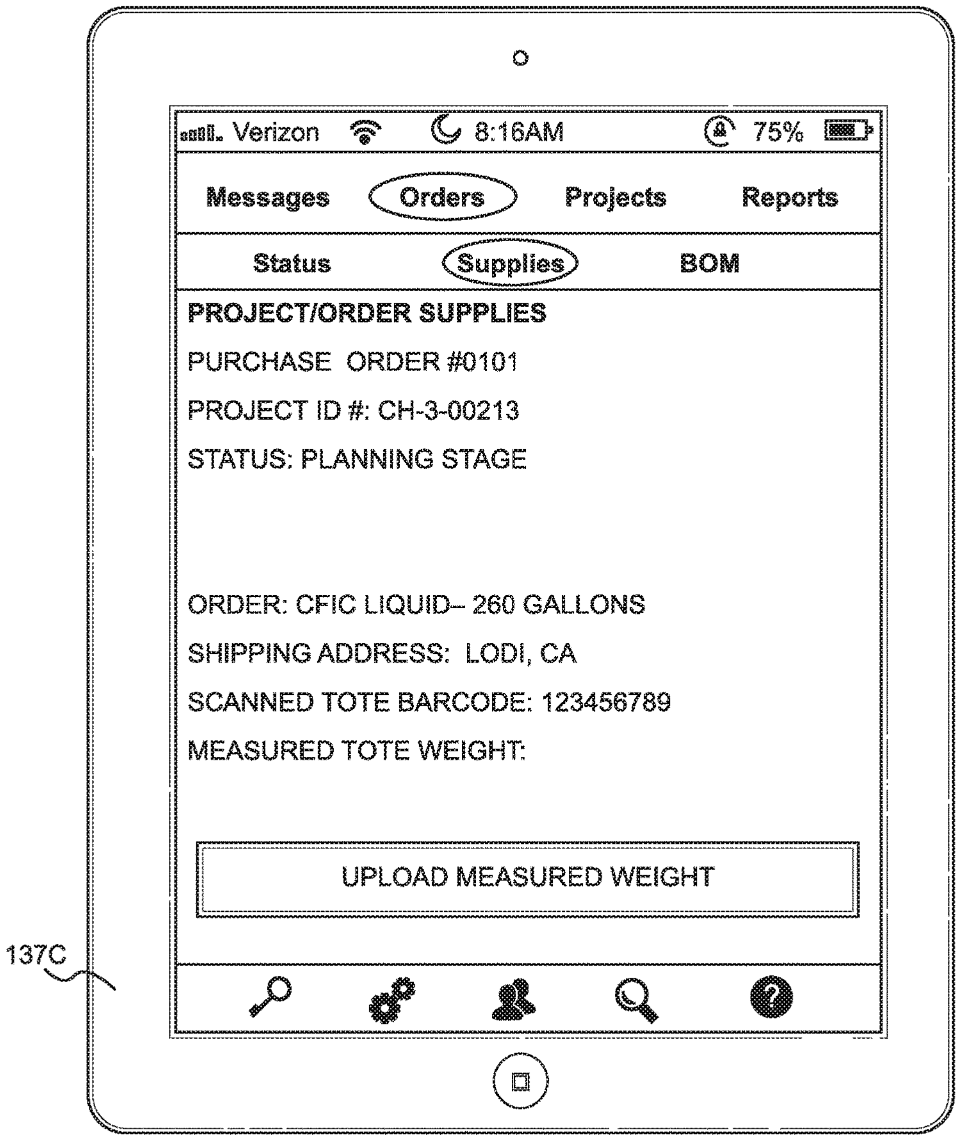
Figure 79D:
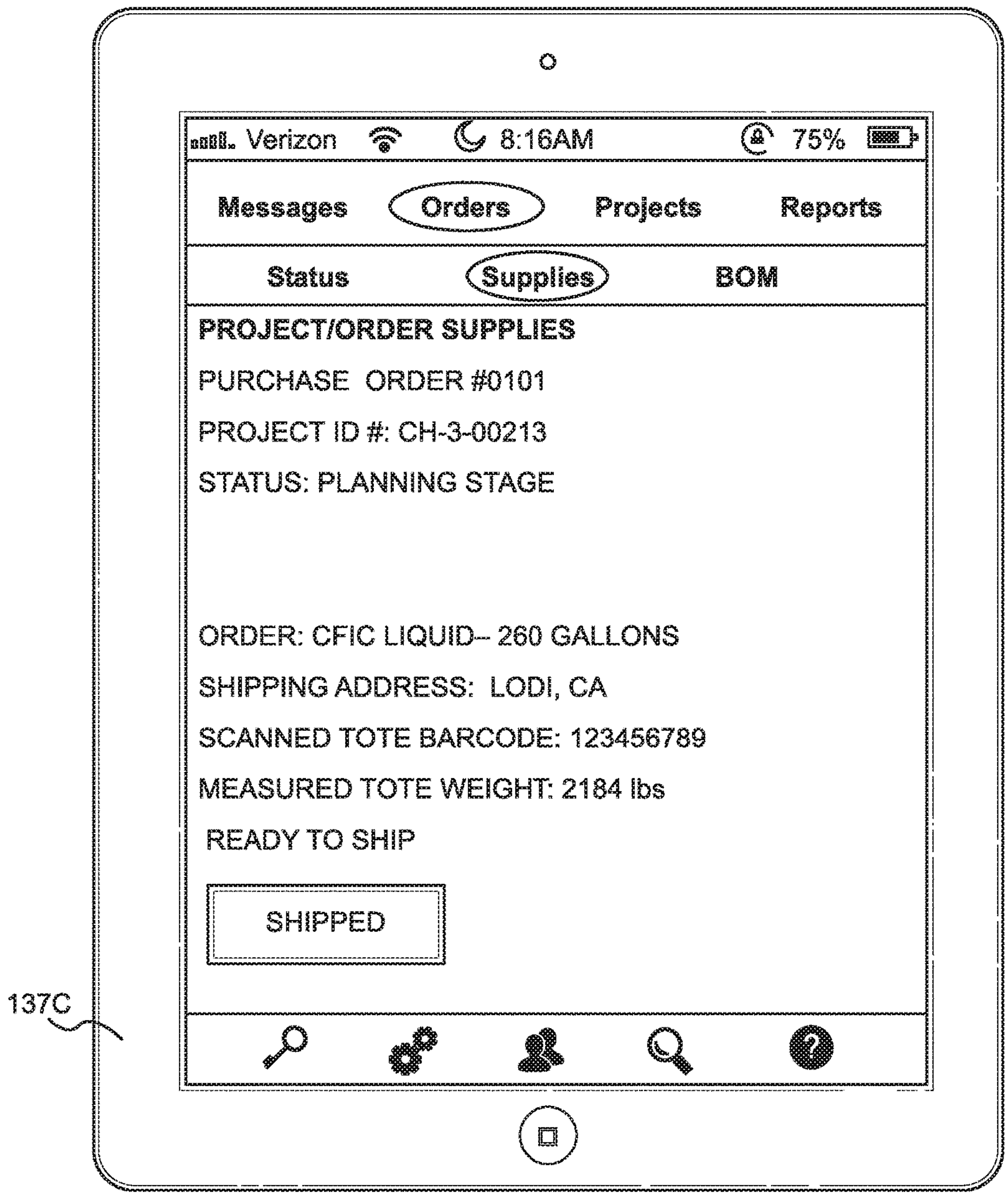

As indicated at Block F in FIG. 77B, before shipping to its designation, each barcoded/RFID-tagged shipping label on the CFIC tote 181' is scanned using a code symbol reader on the mobile computing system 117, as shown in FIG. 79B, then after a database socket connection is established, each barcoded/RFID-tagged CFIC tote 181' is weighed and its GPS coordinates are captured by the mobile computing device 120, and then its measured weight and GPS coordinates are uploaded and recorded in a centralized supply chain management database 113A, as illustrated in FIGS. 76A, 79A and 79C.

As indicated at Block G in FIG. 77B, each barcoded/RFID-tagged CFIC tote 181' is shipped to its designation lumber factory 130A (130B, 130C) within supply chain management system, as illustrated in FIG. 77D.

Figure 79E:
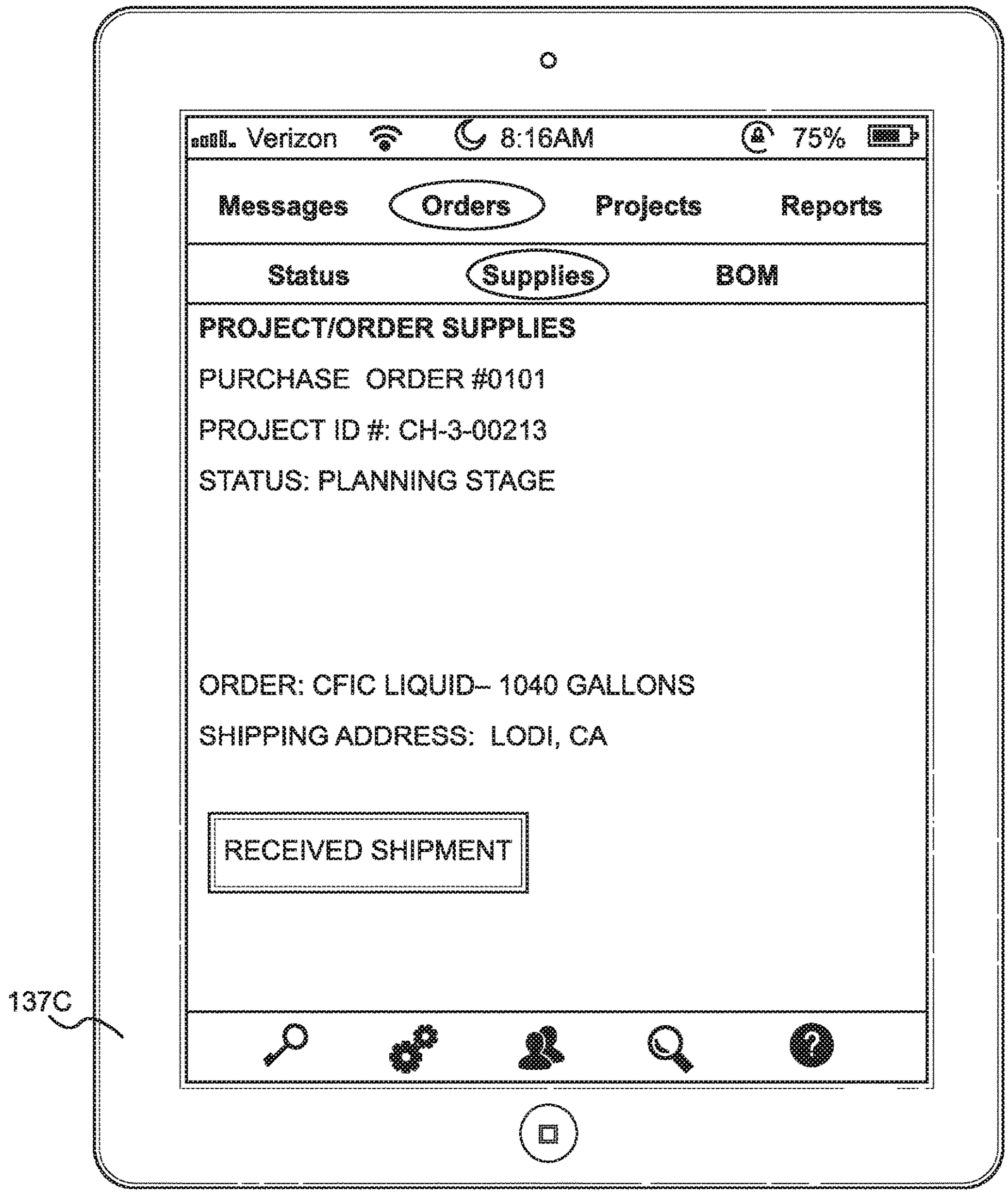
Figure 79F:
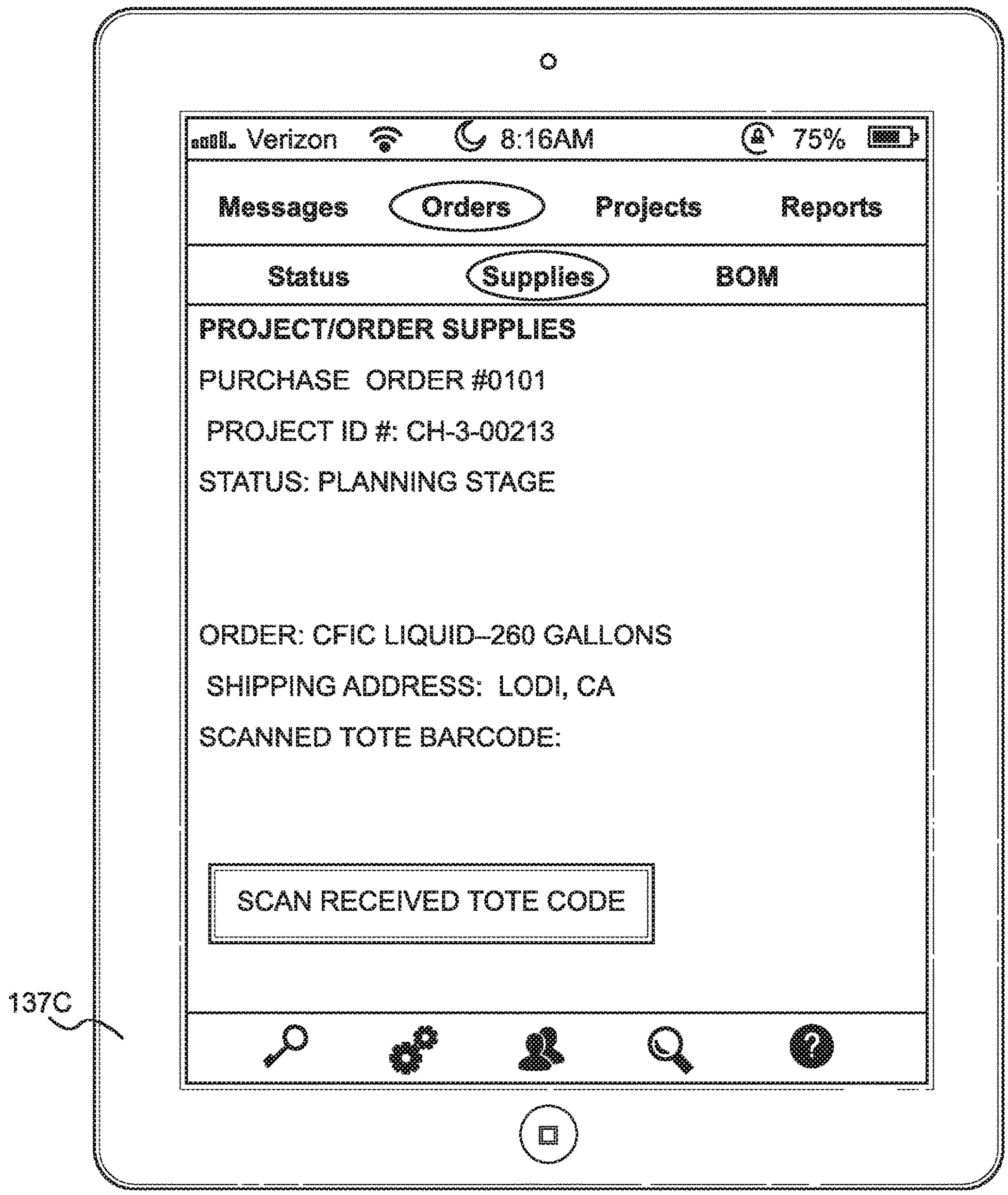
Figure 79G:
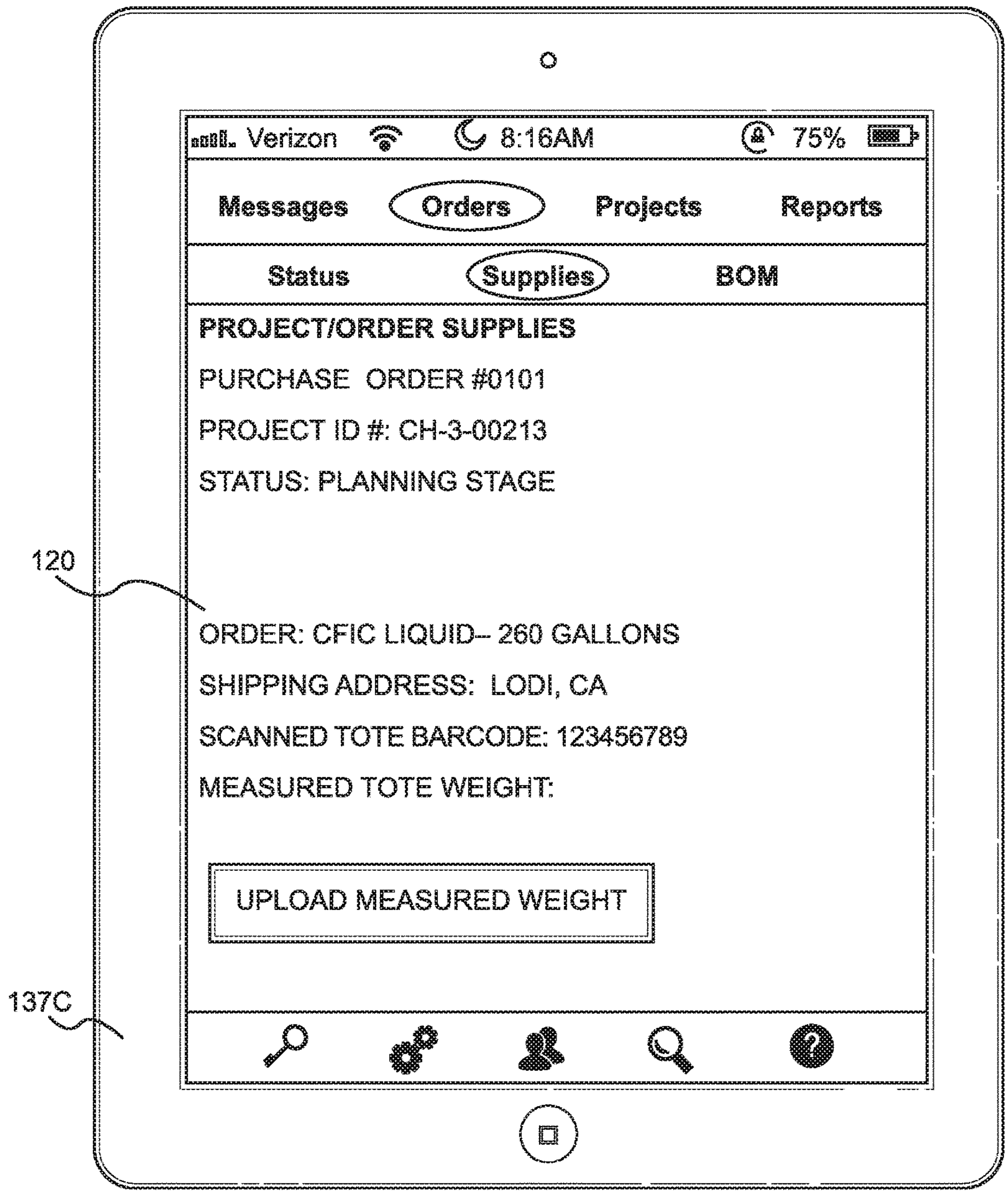

As indicated at Block H in FIG. 77B, each shipped barcoded/RFID-tagged CFIC tote 181' is received its destination job site 1 as illustrated in FIG. 79E, its barcode/RFID-tag is scanned using a code symbol scanner on mobile computing system 117 as shown in FIG. 79F, and then the mobile application 120 automatically accesses the centralized supply chain management database 113A, the weight of the scanned barcoded/RFID-tagged CFIC tote is weighed, and its measured weight is uploaded recorded in the centralized supply chain management database 113A as illustrated in FIG. 79G.

Figure 79H:
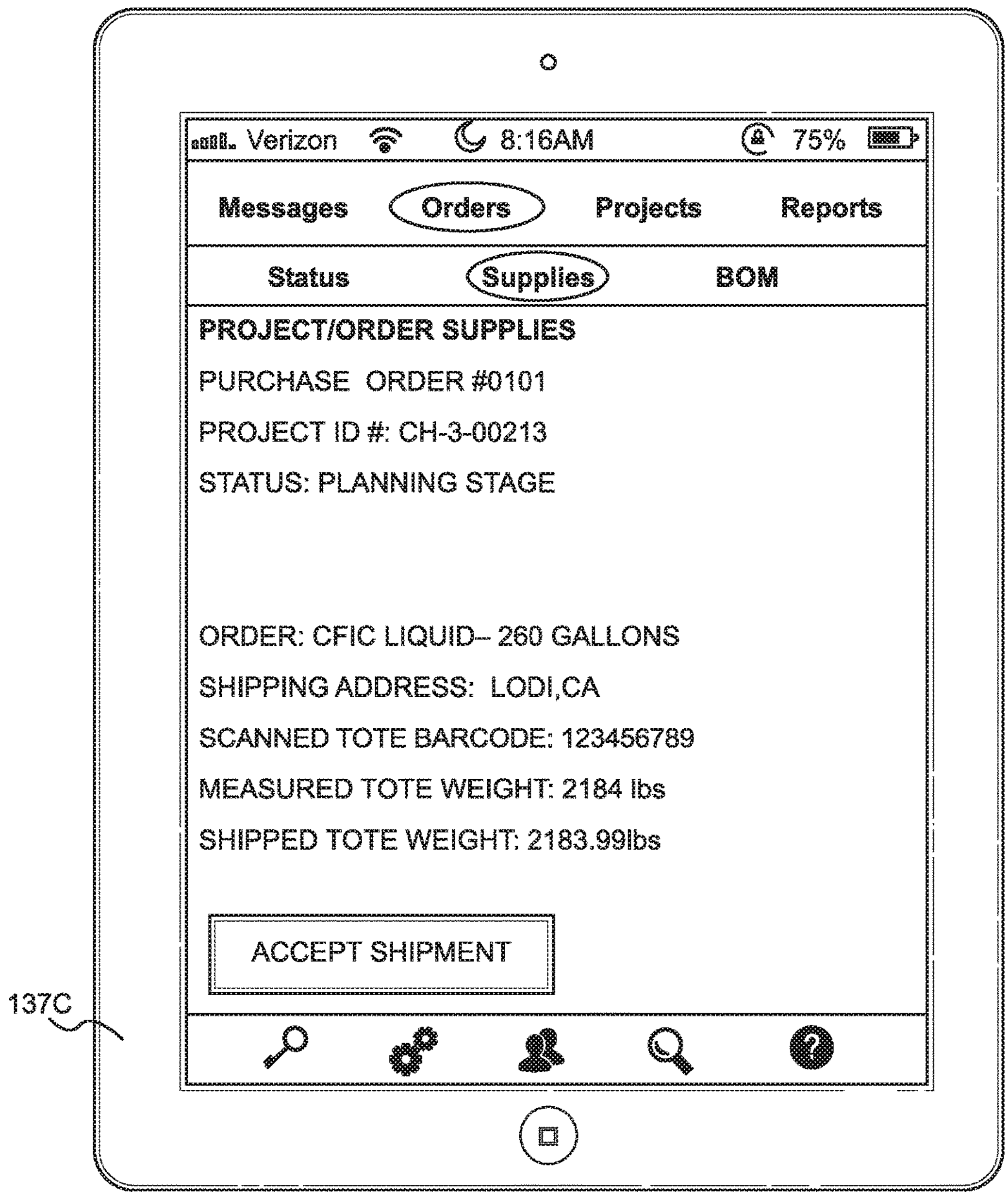
Figure 79I:
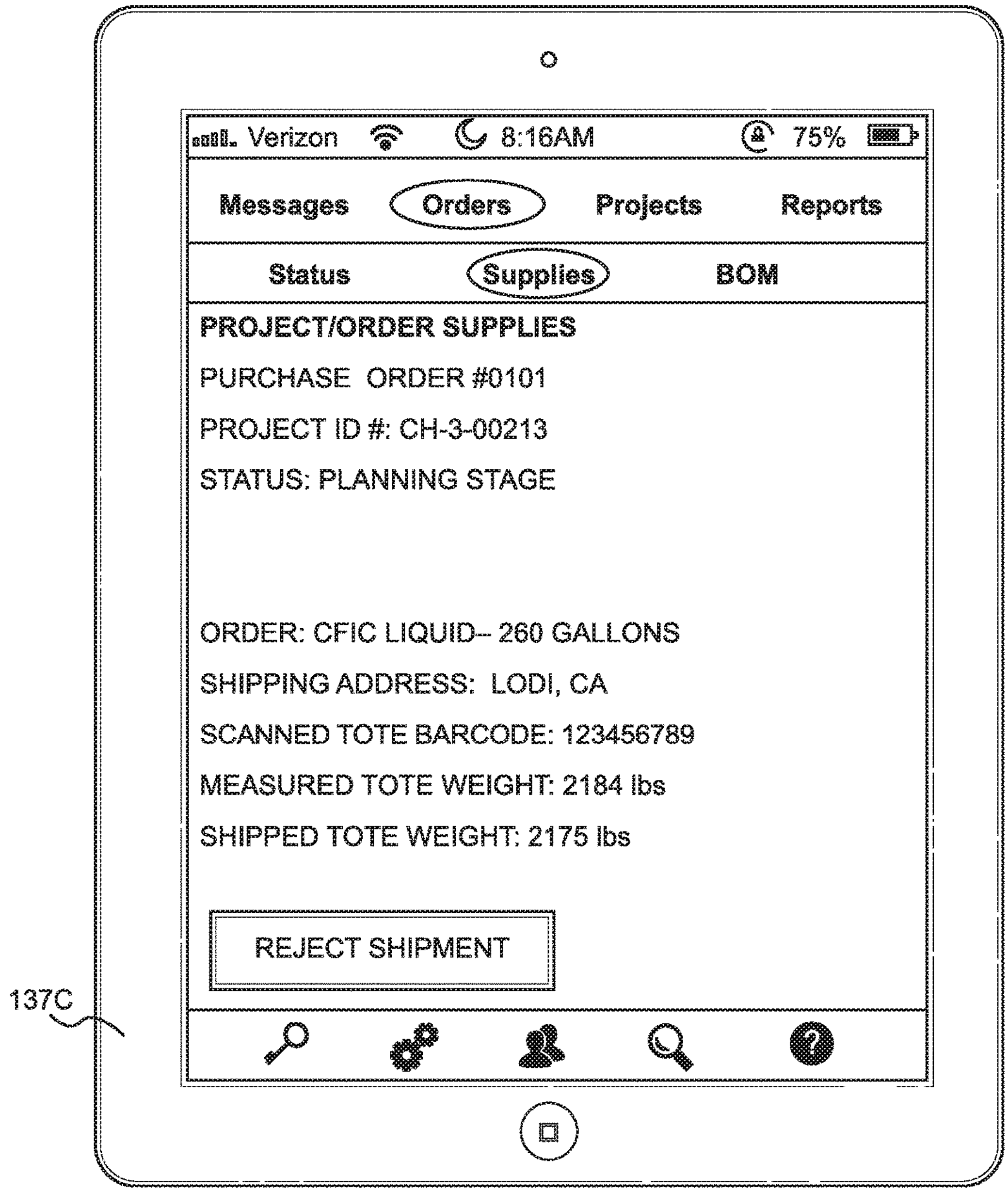

As indicated at Block I in FIG. 77C, the mobile application 120 running on the mobile computing system 117 is used to compare the weights of each shipped barcoded/RFID-tagged CFIC tote 181' with the measured weights of each shipped barcoded/RFID-tagged CFIC tote 181' stored at information servers 148A at the data center 110, applying following rules:

(i) if the weight difference is within a predetermined threshold (e.g. 5 oz.), then the received barcoded/RFID-tagged CFIC tote 181' can be accepted at the destination lumber factory 130A (130B, 139C) and receipt of shipment is indicated and registered in the centralized supply chain management database 113A as shown in FIG. 79H; and (ii) if the weight difference is above the predetermined threshold, then the received barcoded/RFID-tagged CFIC tote 181' is rejected at the destination lumber factory and that the shipment has been rejected is indicated in the centralized supply chain management database 113A as shown in FIG. 79I.

As indicated at Block J in FIG. 77C, in the event the CFIC tote weight measurement was within the predetermined threshold, using the CFIC powder or liquid in the barcoded/RFID-tagged CFIC tote 181' at the destination lumber factory 130A (130B, 130C). In the event CFIC powder is contained in the tote 181', then the end user will add the required amount of clean water to make the CFIC liquid for dipping lumber in a factory 130A (130B, 130C) during the production of Class-A fire-protected lumber.

As indicated at Block K in FIG. 77C, one or more barcoded/RFID-tagged CFIC totes 181' are transported from recipient's inventory (e.g. storage warehouse) to a specific factory location 130A where a Class-A fire-protected lumber is produced.

Figure 79J:
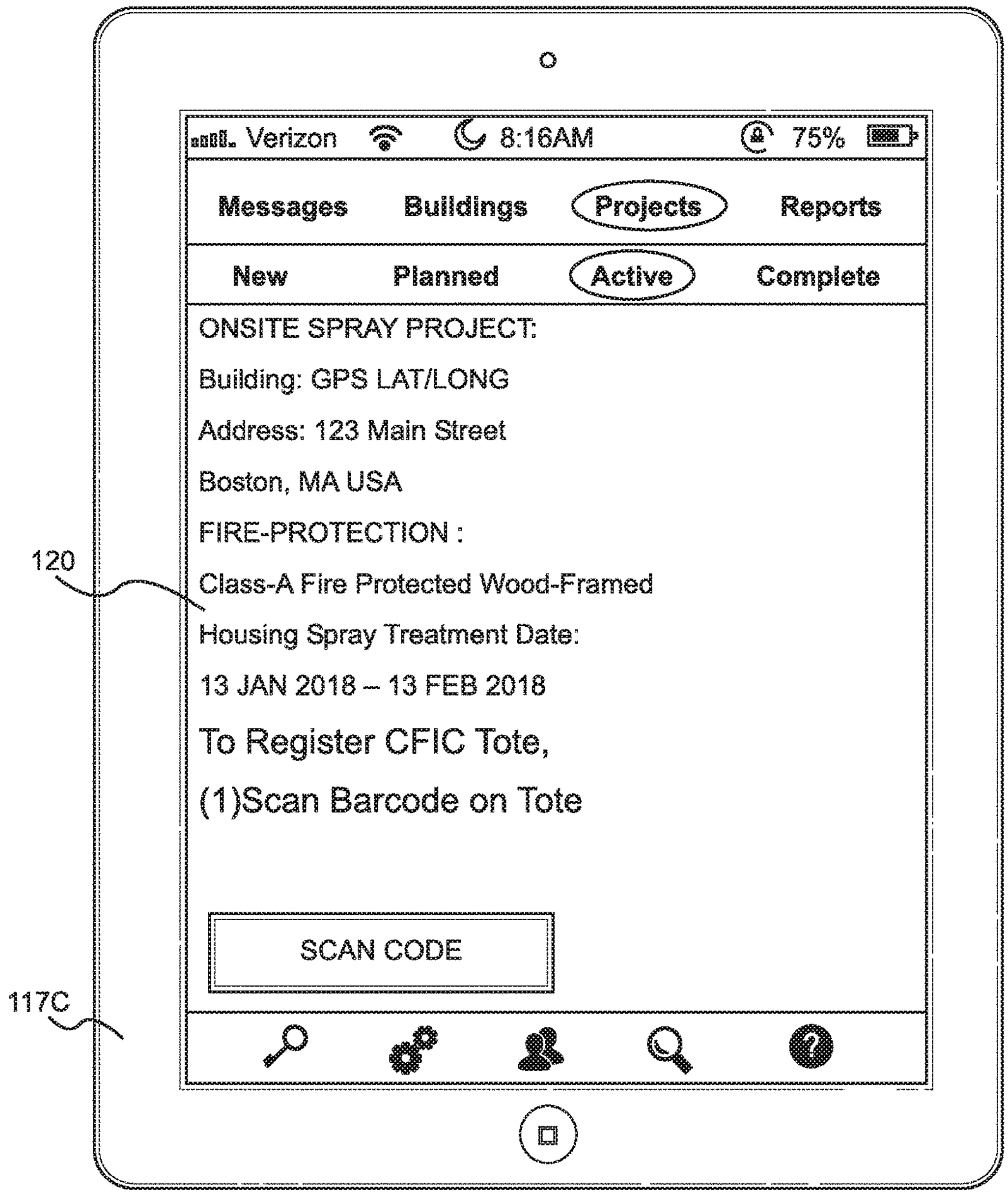

As indicated at Block L in FIG. 77D, an administrator or technician uses the mobile application 120 installed and running on a mobile computing device 117 to scan the barcode 20A (and/or RFID-tag 200B) on each CFIC tote 181' as the CFIC tote 181' is identified for use in the factory 130A (130B, 130C) in CFIC liquid dipping and infusion operations, as illustrated in FIG. 79J, and to automatically check out the specifically-identified CFIC tote using scanned code information from the recipient's inventory maintained in the supply chain management database 113A at the data center 110, shown in FIGS. 69, 76, 76B.

Figure 79K:
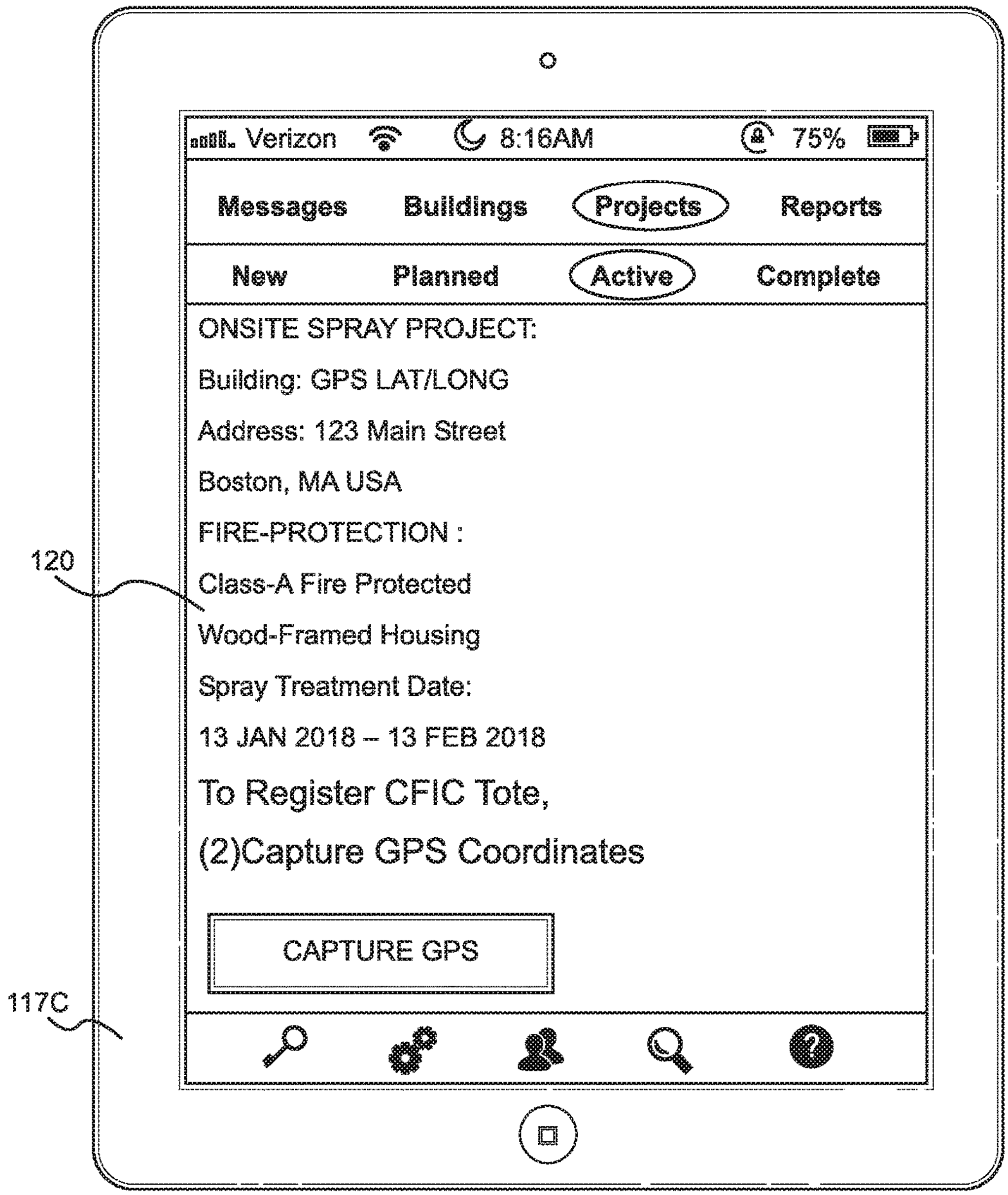

As indicated at Block M in FIG. 77D, the mobile application 120 is used to automatically detect, and record the GPS coordinates of the barcode-identified CFIC tote 181' where it is to be used for dipping and infusion in the factory 130A (130B, 130C), as illustrated in FIG. 79K, for documentation purposes under the licensing program so as to ensure that the CFIC tote 181' is being used by the licensed factory within a licensed territory.

Figure 79L:
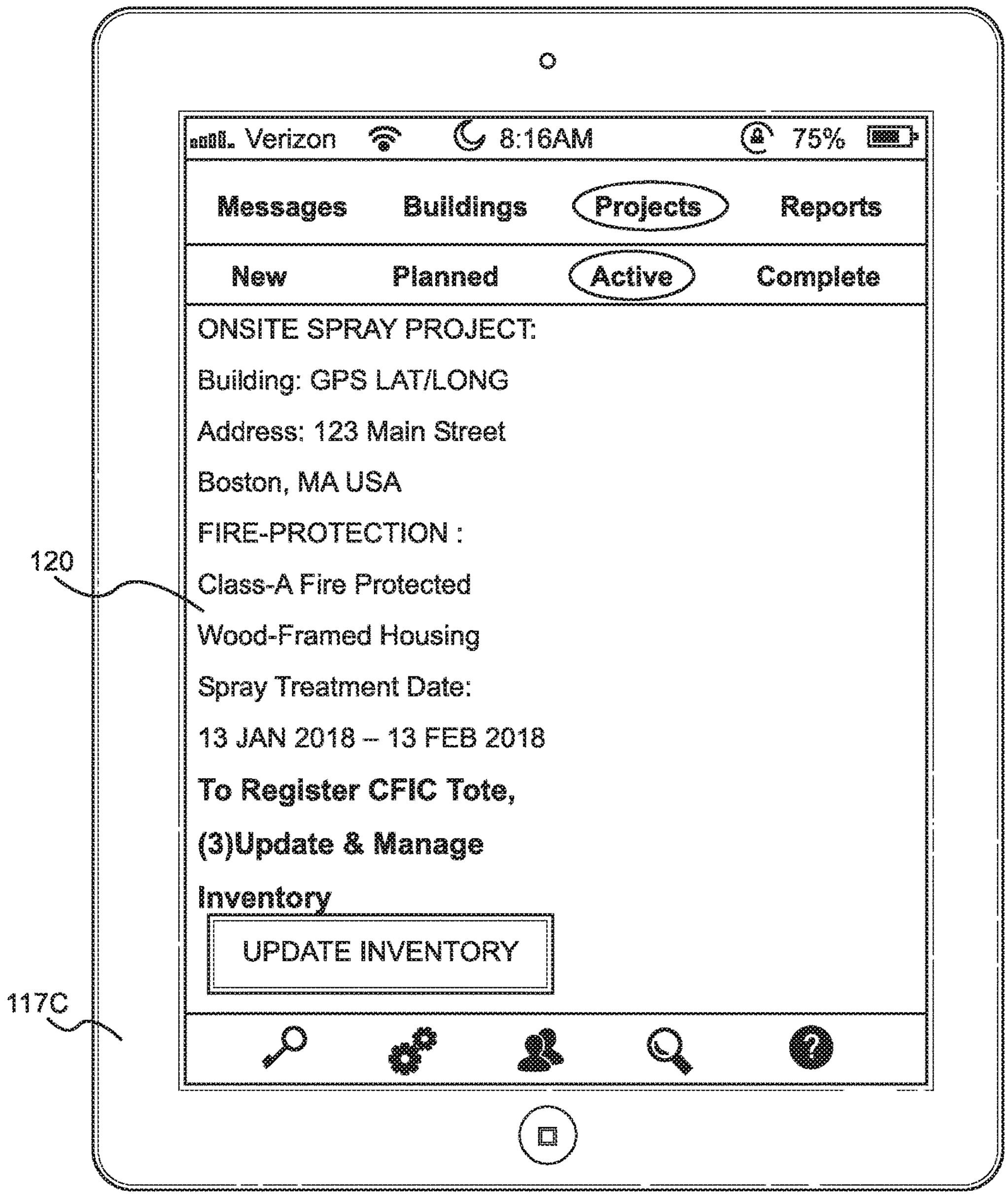

As indicated at Block N in FIG. 77D, the mobile application 120 automatically generates an inventory replenishment order if and when the recipient's CFIC tote inventory falls below a threshold inventory level maintained within the supply chain management network database 148A, as illustrated in FIG. 79L.

Construction Job-Site Fire-Protection Spray Service System for Delivering, Inspecting and Verifying Fire-Protection Spray Services at Wood-Framed and Mass Timber Building Construction Sites, while Supporting Various Stakeholders and their Interests Using Mobile Application Running on Mobile Computing Systems Deployed FIG. 80A describes the various stakeholders provided services by the enterprise-level systems of the present invention 100 shown in FIG. 55, using mobile computing systems 117 deployed on wireless communication networks. As shown, the stakeholders include property owners, financial institutions, building construction managers, job site construction managers, general contractors, building architects, job site construction workers, sales representative, logistics coordinators, supply chain managers, job site spray managers, job site spray technicians, local fire department, local police department, local building inspectors, local neighbors, construction insurance underwriters, property/building insurance underwriters, and risk engineering managers.

FIGS. 81A, 81B, 81C, 81D, 81E and 81F describe the primary steps carried out when practicing a method of ordering, delivering, inspecting, documenting and managing professional fire-protection liquid chemical spray services performed on wood-framed or mass timber building construction job-sites, while supporting diverse stakeholders and their interests using mobile computing systems deployed over wireless communication networks.

The Wood-Building Construction Job-Site Fire-Protection Spray Service System illustrated in FIGS. 49 through 67L, and FIGS. 80A through 85, and described throughout the present invention disclosure, supports the deployment of numerous instances of the Mobile Application ("Mobile App") 120 running on diverse kinds of mobile computing systems 117 deployed across the enterprise, and supporting the following services, specified below, for the stakeholders, including: property owner, financial institution, building construction manager, job site construction manager, general contractor; building architects; job site construction workers, spray service sales representative, spray service logistics coordinator, spray service supply chain manager, spray service site spray manager, job site spray technicians; local fire department, local police department, local building inspectors, and local neighbors; construction insurance underwriter, property/building insurance underwriter, and risk engineering managers. These services will described in detail below in the blocks defined in the process illustrated in FIGS. 81A through 81F.

Figure 81A:
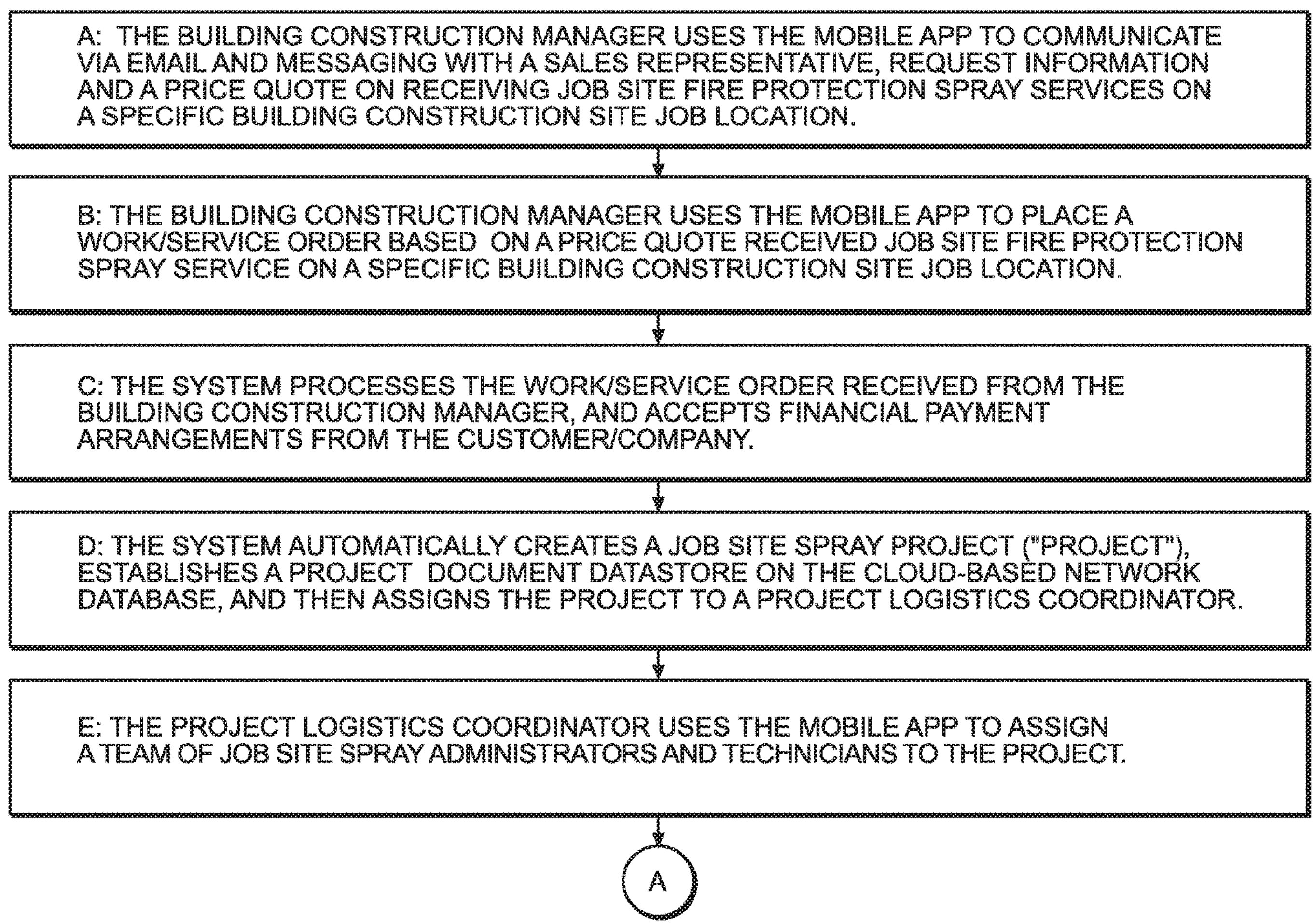

As indicated at Block A in FIG. 81A, the Building Construction Manager uses the Mobile App 120 of the present invention to communicate via email and messaging with a Sales Representative, requesting information and a price quote on receiving the job site fire protection spray services on a specific building construction site job location.

As indicated at Block B in FIG. 81A, the Building Construction Manager uses the mobile app 120 to place a work/service order with the based on a price quote received the job site fire protection spray service on a specific building construction site job location.

As indicated at Block C in FIG. 81A, the system 100 processes the work/service order received from the Building Construction Manager, and accepts financial payment arrangements from the Customer/Company.

As indicated at Block D in FIG. 81A, the system 100 automatically creates a Job Site Spray Project ("Project"), establishes a Project Document Datastore on the Cloud-based Network Database 113, and then assigns the Project to a Project Logistics Coordinator.

As indicated at Block E in FIG. 81A, the Project Logistics Coordinator uses the mobile app 120 to assign a Team of Job Site Spray Administrators and Technicians to the Project.

Figure 81B:
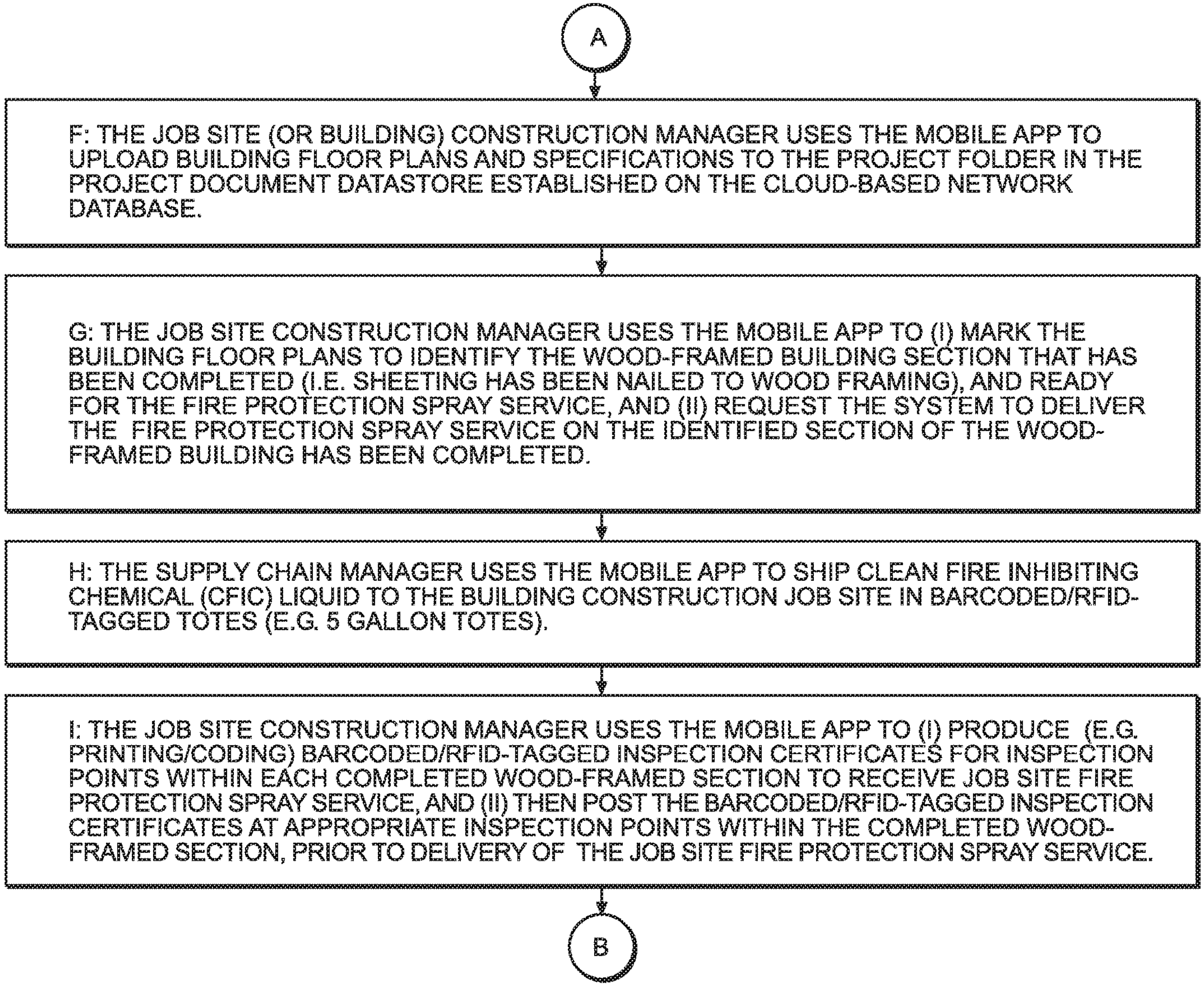

As indicated at Block F in FIG. 81B, the Job Site (or Building) Construction Manager uses the mobile app 120 to upload Building Floor Plans and Specifications to the Project folder in the Project Document Datastore established on the Cloud-based Network Database.

As indicated at Block G in FIG. 81B, the Job Site Construction Manager uses the mobile app 120 to (i) mark the Building Floor Plans to identify the wood-framed building section that has been completed (i.e. sheeting has been nailed to wood framing), and ready for the job site fire protection spray service, and (ii) request the system 100 to deliver the fire protection spray service on the identified section of the wood-framed building has been completed.

As indicated at Block H in FIG. 81B, the Supply Chain Manager uses the mobile app 120 to ship clean fire inhibiting chemical (CFIC) liquid to the building construction job site in Barcoded/RFID-tagged Totes (e.g. 5 gallon Totes).

As indicated at Block I in FIG. 81B, the Job Site Construction Manager uses the mobile app 120 to (i) produce (e.g. printing/coding) Barcoded/RFID-tagged inspection certificates 300 for inspection points within each completed wood-framed section to receive the job site fire protection spray service, and (ii) then post the Barcoded/RFID-tagged inspection certificates 300 at appropriate inspection points within the completed wood-framed section, prior to delivery of the job site fire protection spray service.

Figure 81C:
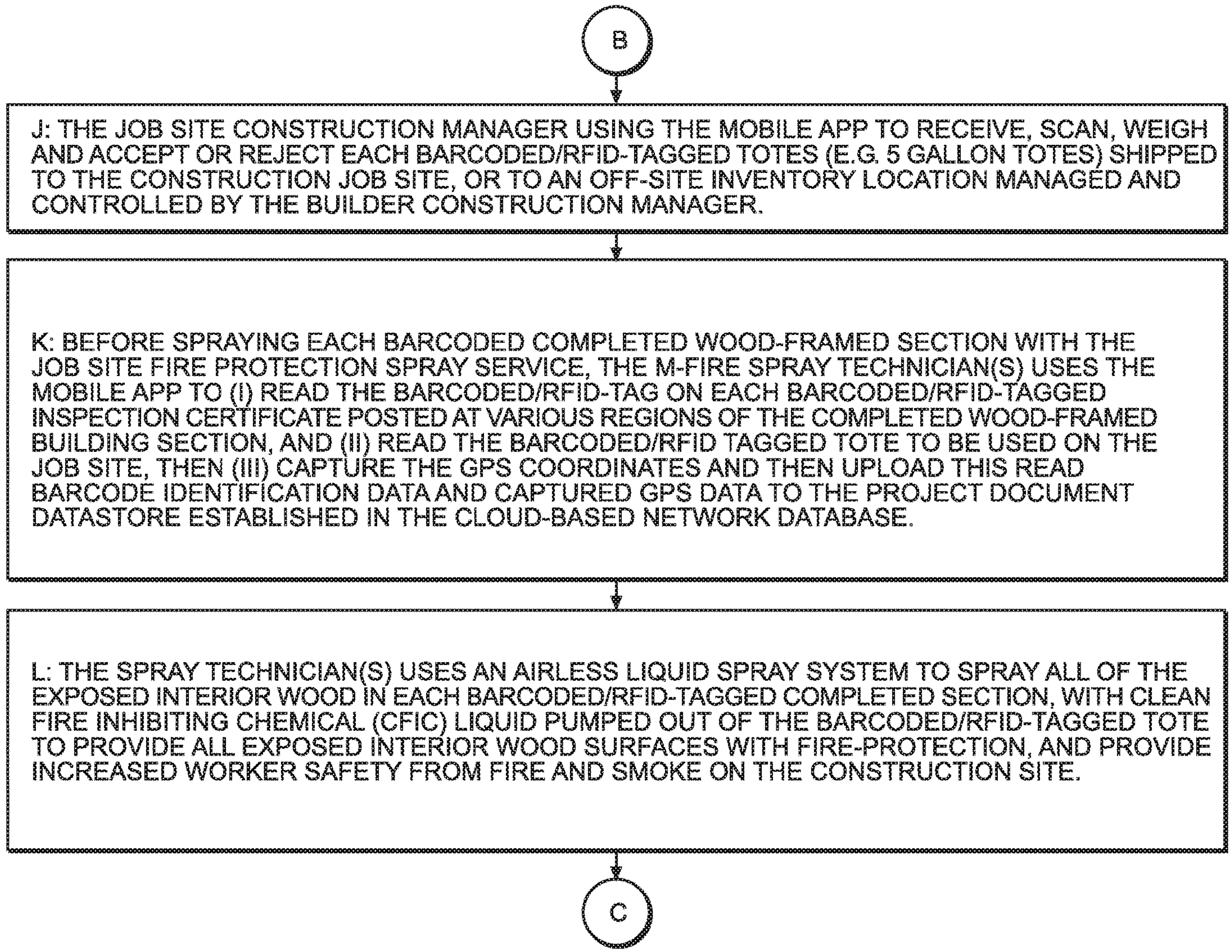

As indicated at Block J in FIG. 81C, the Job Site Construction Manager using the mobile app 120 to receive, scan, weigh and accept or reject each Barcoded/RFID-tagged Totes (e.g. 50 gallon Totes) 181 shipped to the construction Job Site, or to an off-site inventory location managed and controlled by the Builder Construction Manager.

As indicated at Block K in FIG. 81C, before spraying each Barcoded completed wood-framed section with job site fire protection spray service, the Spray Technician(s) uses the Mobile App to (i) read the barcoded/RFID-tag on each Barcoded/RFID-tagged inspection certificate 300 posted at various regions of the completed wood-framed building section, and (ii) read the barcoded/RFID tagged Tote 181 to be used on the job site, then (iii) capture the GPS coordinates and then upload this read barcode identification data and captured GPS data to the Project Document Datastore established in the Cloud-based Network Database 113A.

As indicated at Block L in FIG. 81A, the Spray Technician(s) uses an airless liquid spray system 101 to spray all of the exposed interior wood in each Barcoded/RFID-tagged completed section, with clean fire inhibiting chemical (CFIC) liquid pumped out of the Barcoded/RFID-tagged tote (e.g. pail) 181 to provide all exposed interior wood surfaces with fire-protection, and provide increased worker safety from fire and smoke on the construction site.

As indicated at Block M in FIG. 81D, after spraying each completed section, the Spray Technician signs each Barcoded/RFID-tagged certificate of spraying 300D, and then Job Site Spray Manager verifies the certificate of spraying 300D by signing.

As indicated at Block N in FIG. 81D, the Job Site Spray Manager verifies the certificate of spraying 300D by signing the certificate of inspection (located below the certificate of spraying) verifying that each sprayed section was sprayed by the Spray Technician who signed the certificate of spraying 300D.

As indicated at Block O in FIG. 81D, the Spray Manager uses the mobile app 120 to capture video and photographic evidence of signed barcoded-RFID-tagged certificates of spraying and inspection 300D, applied to each inspection point in a completed wood-framed section of the building, as shown in FIG. 62A, and then uploads this photographic/video evidence to the Project Document Datastore established on the Cloud-based Network Database 113A.

As indicated at Block P in FIG. 81D, the System 100 notifies local fire and police departments when each wood-framed building section has been completely fire-protected through the job site fire-protection spray process.

As indicated at Block Q in FIG. 81E, local fire and police departments use the mobile app 120 to receive push notifications and messages from the System, that a particular wood building job site has just been fire protected by the job site fire protection spray service, and that permitted documents can be reviewed in the Project Document Datastore established on the Cloud-based Network Database 113A.

As indicated at Block R in FIG. 81E, Building Owners, Construction Managers, Insurance Carriers, Architects and Building Inspectors use the mobile app 120 to the remotely monitor the progress of the fire protection spray process at each completed section of the wood-framed building, at any time during the construction phase of the building, including estimating and recording (i.e. quantization) of the quantity of fire-protected carbon mass (i.e. FPCUs) stored in the fire-protected wood of each completed building section. Upon completion of the spray process, the risk of fire and smoke from the wood-framed building is mitigated.

As indicated at Block S in FIG. 81E, the System automatically archives all collected job-site evidence, certifications and verifications in the Cloud-based Network Database 113A, to using the mobile app 120 to send reduced risk reports to insurance carriers to help qualify for reduced-risk insurance premiums offered by the property insurance carrier to the builder and building owner.

Figure 81F:
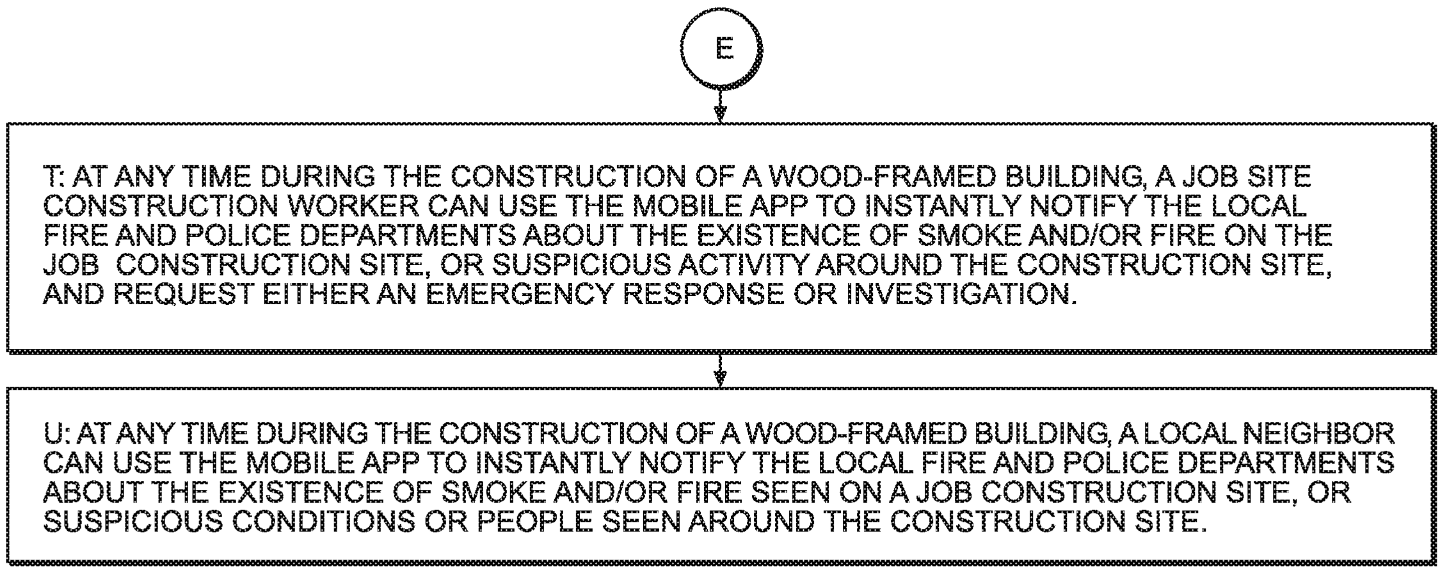

As indicated at Block T in FIG. 81F, at any time during the construction of a wood-framed building, a Job Site Construction Worker can use the mobile app 120 to instantly notify the local fire and police departments about the existence of smoke and/or fire on the job construction site, or suspicious activity around the construction site, and request either an emergency response or investigation.

As indicated at Block U in FIG. 81F, at any time during the construction of a wood-framed building, a local neighbor who has downloaded and registered with the system can use the mobile app 120 to instantly notify the local fire and police departments about the existence of smoke and/or fire seen on a job construction site, or suspicious conditions or people seen around the construction site. While the rights and privileges of this stakeholder will be very limited, neighbors can use the mobile app 120 running on a smartphone 117 to assist in ensuring the safety of wood-framed buildings under construction being fire-protected using the teachings of the present invention.

Various benefits will be experienced by each of the stakeholders using the system network of the present invention described above.

Property Owners will experience a reduced risk of liability and loss of property and life due to fire, during and after building construction.

Financial Institutions will experience an increased level of protection over its purchase money security interests in the wood products being used to construct buildings which they financed.

Building Construction Managers will experience a reduced risk of exposure, injury and loss by fire.

Job Site Construction Managers will experience a reduced risk of exposure, injury and loss by fire.

General Contractors (optional) will experience a reduced risk of liability for injury and loss by fire.

Building Architects will experience a reduced risk of liability for injury and/or loss by fire.

Sales Representatives will experience greater efficiencies while prospecting for new customer job leads, closing on new business projects, managing customer relationships, and tracking and managing the progress of every job project after the services contract is signed, to show the customer how much people care about their customers.

Logistics Coordinators will experience greater efficiencies and quality control as each Job Site Fire Protection Spray Service is delivered at the customer's (i.e. Builder's) construction job site.

Supply Chain Managers 186 will experience great control reviewing work order requests and issuing purchase orders for a certain quantity of clean fire inhibiting chemical (CFIC) totes to be procured and delivered to a specific job site, on a specific date, in secure and barcode/RFID-tag tracked tote containers (e.g. pails) 181 bearing specific Shipment Tracking Numbers linked back to the Purchase Order, and corresponding Work Service Order.

The Job Site Spray Managers will experience great efficiency in certifying and verifying, and collecting and storing video and photo evidence on site that each section of the job site has been properly sprayed with the Job Site Fire Protection Spray Process, carried out by a specified M-Fire Spray Technician on a specific date, and all this information is uploaded to a centralized Network Database 113A.

The Job Site Spray Technicians will experience great efficiency in certifying and documenting that each section of the job site has been properly sprayed with the CFIC liquid, shipped in specific Barcoded/RFID-tagged Totes 181, and sprayed by a specified Spray Technician on the surface of a specific completed wood-framed building section, on a specific date, and all this information is uploaded to a specific project folder maintained on the Centralized Network Database 113A at the data center 110.

Local Fire Departments will be informed that specific wood-framed building construction sites have been fire protected by the Job Site Fire Protection Spray Process, on a specific date, so that fire chiefs and men and women are fully informed of the reduced risks involved on the fire-protected job site, and may better decide how to fight a given fire that may breakout on the construction job site, or even after the building has been completed and received a certificate of occupancy.

Local Police Departments will be informed that specific wood-framed building construction sites have been fire-protected by the job site fire protection spray process, on a specific date, so that police chiefs and men and women are fully informed of the reduced risks involved on the fire-protected job site, and may better decide how to conduct a rescue mission on the construction job site, or even after the building has been completed and received a certificate of occupancy.

Local Building Inspectors will have fully access to all documents collected during the Job Site Fire Protection Spray Process, on the specific construction job site.

Construction Insurance Underwriters will be informed of the reduced risk of fire and smoke on the fire-protected wood-framed building during the risk appraisal process and when deciding on a reduction in insurance premiums, during the construction phase, based on the reduced risk of fire and smoke due to the fire protection spray treatment of all wood used on the construction job site.

Property/Building Insurance Underwriters will be informed of the reduced risk of fire and smoke on the fire protected wood-framed building during the risk appraisal process and when deciding on a reduction in insurance premiums, after the construction phase, based on the reduced risk of fire and smoke due to the fire protection spray treatment of all wood used on the construction job site.

Risk Engineering Managers will be informed of the reduced risk of fire and smoke on the fire protected wood-framed building, during the risk appraisal process and when deciding on a reduction in insurance premiums based on the reduced risk of fire and smoke due to the fire protection spray treatment of all wood used on the construction job site.

Using Virtual Reality (VR) and Augmented Reality (AR) Technologies to Support Inspection of an Actual Fire-Protected Job-Sites Based on 3D Virtual Models of the Fire-Protected Wood-Framed Buildings Under Construction, Augmented with Real Job-Site Collected Data Certifying and Verifying that the Fire Protection Spray Process of the Present Invention was Actually and Properly Applied to all Exposed Interior Wood Surfaces in the Wood-Framed Buildings FIGS. 82A and 82B show a sequence of screenshots of graphical user interfaces (GUIs) displayed during a virtual reality (VR) and augmented reality (AR) supported virtual inspection process of a fire-protected job-site supported by the enterprise-level system of the present invention, illustrated in FIGS. 55 and 69. As shown, the virtual process of inspecting a fire-protected job site is based on a 3D virtual model of the fire-protected wood-framed building under construction. At each virtual inspection checkpoint 300' in the 3D virtual model, collected and uploaded certifications, verifications and documents, and fire-protected carbon quantization figures from the carbon quantization engine 500, are reviewable during the inspection walkthrough, and allowing the reviewer to take and post notes to other stakeholders represented in the system. Each virtual inspection checkpoint 300' illustrated in a 3D VR model as shown in FIGS. 82A and 82B corresponds to an actual physical inspection checkpoint 300, as shown in FIGS. 51A, 51B, and 62A.

As shown in FIG. 82C, the system 100 of the present invention supports a virtual reality (VR) enabled walk-through inspection procedure for the fire-protection spray service process of the present invention. As shown, AR-inspection checkpoint icons (ICP #1 through ICP #9) 300', corresponding to barcoded/RFID-tagged inspection checkpoints 300 in a wood-framed building, are displayed along the VR-enabled walk-through which can be experienced by a fire risk engineer or other stakeholder using a client system 120 deployed on the system network of the present invention 100.

As shown in FIG. 82A, an AR-inspection checkpoint icon 300' (indicating e.g. "Click Here to View Confirmations, Verifications and Collected Documents") is displayed along a virtual reality (VR) enabled inspection walk-through process displayed on the client system 120. This process many be supported on any client system 120 deployed in the enterprise-level system of the present invention 100.

As shown in FIG. 82B, the AR-inspection checkpoint 300' is expanded by the user to show all signed certifications and verifications, captured from the actual spray job site, and displayed during the VR-enabled fire-protection spray service inspection walk-through process of the present invention.

Virtual Fire-Protection Job-Site Inspection Process of the Present Invention Using Virtual Reality (VR) and Augmented Reality (AR) Technologies to Support Virtual Inspection of an Actual Fire-Protected Job-Site Based on a 3D Virtual Model of the Actual Fire-Protected Wood-Framed Building Under Construction FIGS. 83A, 83B and 83C describe the primary steps performed during the virtual fire-protection job-site inspection process of the present invention, using virtual reality (VR) and augmented reality (AR) technologies to support virtual inspection of an actual fire-protected job-site based on a 3D virtual model of the actual fire-protected wood-framed building under construction.

Referring to FIGS. 83A through 83C, a novel VR/AR-based virtual fire-protection job-site inspection process is described. The process enables the reviewing of collected data during and after completion of a fire protection spray service carried out in accordance with the principles of the present invention, so that fire risk engineers and others can determine that the specific wood-framed building has been actually and properly fire-protected by the spray process of the present invention.

As indicated at Block A in FIG. 83A, the first step of the method involves building a 3D virtual model of wood-framed building being constructed on a job site located at specific GPS coordinates, that is to be fire-protected using the job-site fire protection spray service of the present invention.

As indicated at Block B in FIG. 83A, a complete set of barcoded/RFID-tagged inspection checkpoints 300 are identified and specified for each completed wood framed building section, and these checkpoints 300 linked to the specific job-site fire-protection spray service process, are adapted for posting at specific completed sections of the wood-framed building using an appropriate mounting substrate 300C.

As indicated at Block C in FIG. 83A, the complete set of barcoded/RFID-tagged inspection checkpoint labels 300 are printed out for mounting on plastic templates or substrates 300C with integrated RFID tags 300B.

As indicated at Block D in FIG. 83A, the barcoded/RFID-tagged inspection checkpoint labels 300A/300B are mounted on plastic templates 300C with integrated UHF-Class RFID tags 300B available from Zebra Technologies, Inc., and the section and project numbers are then programmed into each embedded UHF-Class RFID tag 300B using an RFID tag writer 117A well known in the art. A suitable RFID tag reader/writer would the 13.56 MHz Pistol Grip Handle RFID Reader/Writer made and sold by GAO RFID, Inc., or Honeywell 70 Series UHF-Class of RFID Hand-Held Readers.

As indicated at Block E in FIG. 83A, after each wood-framed building section has been completed, the construction job site supervisor/manager will request job site spray service for the completed section of the wood-framed building. At this stage, the proper barcoded/RFID-tagged inspection checkpoint 300 is permanently posted on the completed wood-framed building section, as illustrated in FIG. 62A. At this stage, the request will be translated into a purchase order to ship one or more CFIC totes from inventory storage to the building construction job site, that is, if there is not a sufficient quantity of CFIC liquid on the job site to spray the barcoded/RFID-tagged completed section of the wood-framed building.

As indicated at Block F in FIG. 83B, before spraying the completed wood-framed building section, the spray technician (i) reads the barcoded/RFID-tagged inspection checkpoint on the section, (ii) reads the barcoded label on the CFIC tote to be used to fire-protect spray the completed building section, and (iii) capture GPS coordinates of the spray technician, and then upload the read barcode data and GPS data to the Central Network Database 113A.

As indicated at Block G in FIG. 83B, the spray technician sprays the CFIC liquid on all exposed wood in the interior of the completed wood building section.

As indicated at Block H in FIG. 83B, the spray technician confirms spraying the completed wood building section by signing the Certificate of Spraying printed on the barcoded/RFID-tagged inspection checkpoint 300, and the spray manager/supervisor verifies that the spray technician sprayed the completed wood building section on the certified date/time by signing the Verification of Spraying printed below the Certificate of Spraying.

As indicated at Block I in FIG. 83B, the spray technician and/or spray manager or other party captures on-site visual data of the spraying event performed by the technician, and uploads the captured visual data of the event, including certificates, verifications, and photos and videos, to the Central Network Database 113A.

As indicated at Block J in FIG. 83B, upon completing each section of the wood-framed building, repeat Steps F, G, H and I above, so as to capture and upload, captured visual data of the event including certificates, verifications, and photos and videos, to the Central Network Database 113A.

As indicated at Block K in FIG. 83B, when all sections of the wood-framed building are completed and sprayed with job site fire protection, then the spray project manager issues a Certificate of Completion of fire-protection of all exposed interior wood used in the wood-framed building.

As indicated at Block L in FIG. 83C, uploaded data captured at each inspection checkpoint is linked to a corresponding virtual inspection checkpoint 300 represented in the 3D virtual model of the wood-framed building.

As indicated at Block M in FIG. 83C, authorized stakeholders are enabled to walk through the 3D virtual model of the wood-framed building, using a client computing system deployed on the system network. During the virtual walk-though, the authorized stakeholder can access and review the uploaded data linked to each AR-based virtual inspection checkpoint 300 augmented with real job-site collected data certifying and verifying that the fire protection spray process was properly applied to all exposed interior wood surfaces in the completed wood-framed building section, including displaying quantized carbon figures for each fire-protected section. The stakeholder can also make comments and leave notes at these AR-based virtual checkpoints 300.

As indicated at Block N in FIG. 83C, notes and comments made during step M are compiled to allow the spray manager address any concerns or issues raised by the stakeholder.

As indicated at Block O in FIG. 83C, fire risk engineers and insurance underwriters are enabled to assess the data collected and uploaded to the virtual checkpoints 300 in the 3D virtual model, and then issue (i) a reduction in the fire risk profile of the fire-protected wood framed building, and (ii) a corresponding reduction in fire insurance on the fire-protected wood-framed building during and/or after building construction.

By virtue of the present invention, fire and construction insurance underwriters, as well as fire risk engineers, will be provided unprecedented access to data, documents and documentation, in a virtual building inspection environment, whereby (i) the individuals who actually performed the professional services on specific dates and times, confirm and verify that such professional services were performed on the wood-framed building, and (ii) all of these actual confirmations and verifications by such professionals are captured, uploaded and stored as GPS, data and time stamped documents in a central network database system 113A, under a single project associated with a specific fire-protection services contract between two parties, upon which fire, construction and property insurance underwriters will have the confidence to grant insurance premium reductions (i.e. discounts or rewards) for confirmed and verified fire-risk reduction services actually rendered on a specific wood-framed or mass-timber building.

Construction Workers can Use the Mobile Application of the Present Invention on Construction Job Sites to Instantly Message Local Fire and/or Police Departments As described hereinabove, the mobile application of the present invention 120 provides many different services to the stakeholders. A few additional services relate to empower construction workers on the job site to instantly message (i) the local fire department of fire and/or smoke observed in the building in which they are working, and/or (ii) the local police department of suspicious activity in or around the building in which the construction workers are working.

Preferably, a number of different quick send messaging formats will be displayed on the GUI screen so the worker can quickly select and send with minimal screen clicks/taps, automatically sending the email, text/SMS to the local fire department and/or police station, calling for immediate attention, in the event of an emergency, without searching for phone numbers or the like. The message will automatically include the GPS coordinates of the message sender, and the job-site location indexed thereto, so that there is no guessing or ambiguity regarding from where the message originated. At the local fire department receiving the worker's message, the fire department personnel will automatically access fire risk profile records associated with the location of the building under construction, from where the message appears to have been originated, informing the fire department of what might be expected when the arrive at the building fire. The local fire department will be automatically notified by the system that the wood-framed building under construction has been either completely or partially fire-protected using the professional fire-protection spray service of the present invention, and access to spraying confirmations, verifications and other captured records (i.e. data, documents and documentation) on the way to the construction site.

FIG. 84A shows the mobile application 120 configured for use by job site construction workers enabling them to instantly select and send specific-kinds of emergency messages to the local fire department with a single screen click, using services supported by the system network. As shown in the exemplary GUI screen of FIG. 84A, the user (i.e. construction worker) is provided with a menu of restructured exemplary messages from the Fire Dept. Messages menu: (i) all workers exiting building now; (ii) workers are trapped on the upper level; (iii) fire on the second floor, both ends of building; and (iv) building has M-Fire™ Protection, come in and save it. These reconstructed messages allow instant messaging with minimal screen-clicks, and are very useful in emergency situations when job site construction fires break out.

FIG. 84B shows the mobile application 120 configured for use by job site construction workers enabling them to instantly select and send specific emergency messages to the local police department with a single screen click, using services supported by the system network. As shown in the exemplary GUI screen of FIG. 84B, the user (i.e. construction worker) is provided with a menu of restructured exemplary messages from the Police Dept. Messages menu: (i) suspicious arson outside building; (ii) arson ignited fire in building & on bike; and (iv) arson ignited fire in building and running away. These reconstructed messages allow instant messaging with minimal screen-clicks, and are very useful in emergency situations when job site construction fires break out.

Many illustrative embodiments of the present invention have been provided, showing the application of environmentally-safe aqueous-based free-radical chemical reaction breaking chemical liquid to the surface structure of diverse kinds of wood materials products used in building construction to provide Class-A and other levels of fire-protection to wood-framed and mass-timber buildings, and by significantly reducing the fire risk profiles of such wood building structures, logically entitle the building owners (and builders during construction) lower fire insurance premiums. Great efforts have been taken and disclosed herein to provide advanced technological measures to capture data on the construction site and document that in fact these wood-framed buildings have been professional treated with clean fire inhibiting chemicals (CFIC) to deliver the specified fire protection that has been contractually procured between the parties involved. Enterprise-level carried grade cloud-based wireless networks have been disclosed for practicing the various fire prevention and documentation inventions taught in great technical detail herein.

Using Visible Fire-Protection Badges on Wood-Framed Fire-Protected Buildings to Inform Firefighters, First Responders and Police Personal that any Particular Home, Residential or Commercial Building has Received Fire-Protection Treatment Another object of the present invention is to provide a visible and electromagnetically-detectable way for firefighters, first responders and police personal to instantly ascertain and confirm that any particular home, residential or commercial building has received fire-protection treatment in accordance with the principles of the present invention. As illustrated in FIG. 85, such methods may include mounting visible fire-protection badges (e.g. barcoded/RFID-tagged badges) 310 on the outside of each fire-protected building (e.g. over or about the exterior of each doorway frame) so as to signal to any firefighter approaching the building that it has been fire-protected in a certain way, providing assurance and knowledge how best to fight any fire that may have broken out in the building. The barcoded/RFID-tagged fire-protection indication badge 310 can be easy read by firemen and other first responders using their human vision, or using mobile electro-optical and/or electromagnetic scanners and readers to instantly ascertain that the house is fire-protected with an extended fire rating, as documented in an accessible central network database, and/or Internet-based registry, and/or encoded within the barcoded/RFID-tagged fire-protection indication badge itself, as is possible using suitable barcode symbology and/or RFID code structures known in the art.

Various methods and apparatus have been disclosed herein for registering each wood-framed and mass timber building within an Internet-based central network database after the building has been fire-protected using the job-site spray service of the present invention, so that mobile computing devices running the application of the present invention can be used to instantly access and determine, the fire risk treatment and profile of any specific building registered in the web-based database system. This way, using the address of the building recorded in a database and presented on an electronic map, or reading a physical barcoded/RFID-tagged badge 310 mounted on the exterior of the doorway of the any fire-protected building, firefighters, police and first responders can instantly access the fire protection and prevention records associated with the wood-framed building, and make informed decisions on how best to respond, rescue and fight any given fire within the building. Insurance companies underwriting fire insurance policies on fire-protected and badged wood-framed buildings, mass-timber timber CLT buildings, or even hybrid material buildings, can instantly access such fire risk prevention records maintained on the building in the central network base, which may be accessed by any and every insurance company on the planet, once provided with the appropriate application programming interface (API) well known in the networked database arts.

Virtual Reality (VR) Enabled Walkthrough Inspection of Prefabricated Fire-Protected Wood-Framed Building Components (e.g. Panels) Supported on a Client Computing System Deployed in the Enterprise System of the Present Invention FIG. 86 shows a set of prefabricated fire-protected carbon-quantized wood-framed building panels manufactured in a prefabricated building panel factory, as illustrated in FIGS. 68A through 79L, and described hereinabove.

FIG. 87 illustrates a VR-enabled walkthrough inspection of prefabricated fire-protected carbon-quantized wood-framed building components (e.g. panels) supported on a client computing system deployed in the enterprise system of the present invention. As shown, one of the AR-Inspection Checkpoint Icons 138' is expanded to the show a digital image of the actual signed inspection checkpoint 138 captured and uploaded to the network database 148A during the factory-applied fire-protection confirmation and verification process.

FIG. 88 shows a VR-enabled walk-through inspection of the factory-applied fire-protection process of the present invention applied to a prefabricated wood-framed building manufactured in a factory. A sequence of AR-Inspection Checkpoint Icons (ICP #1 through ICP #9) 138' displayed along the VR-enabled walk-through, containing signed certification and verification documents and data collected from the factory, for display, review and downloading during the inspection walk-through.

FIGS. 89A and 89B describes the remote factory-applied fire-protection inspection process of the present invention. This process, similar to the process illustrated in FIGS. 82A, 82B and 82C, uses VR and AR technologies to support virtual inspection of a factory-applied fire-protected wood-building components, based on a 3D virtual model of the fire-protected wood-framed building components manufactured in the factory.

Referring to FIGS. 89A and 89B, a novel VR/AR-based virtual fire-protection inspection process is described. The process enables the reviewing of collected data during and after completion of a factory-applied fire protection service carried out in accordance with the principles of the present invention, so that fire risk engineers and others can determine that the specific prefabricated wood-framed building or components 132 have been actually and properly fire-protected by the CFIC liquid infusion process of the present invention.

As indicated at Block A in FIG. 89A, the first step of the method involves building a 3D virtual model of prefabricated wood-framed building 132 being constructed within a factory system 130 located at specific GPS coordinates, that is to be fire-protected using the factory-applied fire protection process of the present invention.

As indicated at Block B in FIG. 89A, a complete set of barcoded/RFID-tagged inspection checkpoints 138 are identified and specified for each completed wood framed building section, and these barcoded/RFID-tagged inspection checkpoints 138 linked to the specific factory-applied fire-protection process, are adapted for posting on wood-framed building components using an appropriate mounting substrate 138C.

As indicated at Block C in FIG. 89A, the complete set of barcoded/RFID-tagged inspection checkpoint labels 138 are printed out for mounting on plastic templates or substrates 138C with integrated barcode symbols 138A and UHF-Class RFID tags 138B.

As indicated at Block D in FIG. 89A, the barcoded/RFID-tagged inspection checkpoint labels 138A/138B are mounted on plastic templates 138C with integrated UHF-Class RFID tags 138B available from Zebra Technologies, Inc., and the section and project numbers are then programmed into each embedded UHF-Class RFID tag 138B using an RFID tag writer 117A well known in the art. A suitable RFID tag reader/writer would the 13.56 MHz Pistol Grip Handle RFID Reader/Writer made and sold by GAO RFID, Inc., or Honeywell 70 Series UHF-Class of RFID Hand-Held Readers.

As indicated at Block E in FIG. 89A, after a prefabricated wood-framed building component 132 has been completed and fire-protected, then the barcoded/RFID-tagged inspection checkpoint 138 is posted on the prefabricated wood-framed building component 132, showing carbon-quantization (FPCU) figures, and it is signed by the technician applying fire-protection, and verified by the supervisor of the fire protection technician.

As indicated at Block F in FIG. 89B, before fire-protecting the prefabricated wood-framed building section 132, the fire-protection technician (i) reads the barcoded/RFID-tagged inspection checkpoint 138 on the prefabricated fire-protected building component 132, (ii) reads the barcoded label on the CFIC tote used to fire-protect the wood-framed building component 132, and (iii) capture GPS coordinates of the fire-protected technician, and then upload the read barcode data and GPS data to the network database 148A.

As indicated at Block G in FIG. 89B, the uploaded data captured at each inspection checkpoint 138 is linked to a corresponding AR-virtual inspection checkpoint 138' represented in the 3D virtual model of the prefabricated wood-framed building component 132.

As indicated at Block H in FIG. 89B, authorized stakeholders then walk through the 3D virtual model of the fire-protected wood-framed building component 132', and (i) reviewing and viewing the uploaded data linked to each AR-based virtual inspection checkpoint 138' including carbon-quantization figures, and (ii) making comments and leaving notes at these AR-based virtual checkpoints.

As indicated at Block I in FIG. 89B, fire risk engineers and insurance underwriters are enabled to assess the data collected and uploaded to the virtual checkpoints 138 in the 3D virtual model, and then issue (i) a reduction in the fire risk profile of the fire-protected carbon-quantized wood framed building component 132, and (ii) a corresponding reduction in fire insurance on the fire-protected wood-framed building 132 during and/or after building construction.

Modifications to the Present Invention which Readily Come to Mind

The illustrative embodiments disclose the use of clean fire inhibiting chemicals (CFIC) from Hartindo Chemicatama Industri, particular Hartindo AAF21 and AAF31 and Dectan chemical, for applying and forming CFIC-coatings to the surface of wood, lumber, and timber, and other engineering wood products. However, it is understood that alternative CFIC liquids will be known and available to those with ordinary skill in the art to practice the various methods of Class-A fire-protection according to the principles of the present invention.

Also, in many applications, there will be a desire to protect the Class-A fire protection provided to wood products from UV radiation, moisture, and mold and rot, and applying UV/moisture/mold protective polymer-based coatings over the Class-A fire protection. This can be achieved as taught herein for Class-A fire-protected OSB panels, wherein the UV/moisture/mold protective coating can serve this purpose. Many alternative methods of UV/moisture/mold protection can be practiced to provide protection to the Class-A fire protection using CFIC liquid materials.

These and other variations and modifications will come to mind in view of the present invention disclosure.

While the on-site applied spray of CFIC liquid was shown for newly constructed prefabricated Class-A fire-protected wood-framed buildings, it is understood that this method of Class-A fire-protection treatment also can be practiced on older buildings having: (i) open unfinished attic spaces disposed above roof-trusses with open, unfinished ceiling surfaces, wall and floor surfaces, where bare interior wood surfaces made from raw OSB panels are exposed and at high-risk to fire; and (ii) open unfinished basement spaces, where wall panels are open, exposed and at high-risk to fire. In such environments, the Class-A fire-protection spray-treatment method of the present invention can be practiced with excellent results.

While several modifications to the illustrative embodiments have been described above, it is understood that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. In a prefabricated wood-building component factory for manufacturing prefabricated wood-building assemblies, a method of protecting carbon mass stored in wood materials contained in prefabricated wood-building assemblies, from the destructive energy of fire and release back into the atmosphere in the form of carbon dioxide and/or other greenhouse gases that contribute to global warming, and estimating and tracking the quantity of carbon mass stored in each fire-protected prefabricated wood-building assembly, said method comprising the steps of:

(a) using lumber and/or wood materials to produce prefabricated wood-building assemblies along a production line within said prefabricated wood-building component factory, for use in constructing wood-buildings including prefabricated wood-framed buildings and prefabricated mass-timber buildings;

(b) within said prefabricated wood-building component factory, applying clean fire inhibiting chemical (CFIC) liquid to the surfaces of each said prefabricated wood-building assembly completed along a said production line within said prefabricated wood-building component factory, so as to produce a Class-A fire-protected prefabricated wood-building assembly that is inhibited from ignition by fire, flame spread and smoke development by inhibiting free-radical chemical reactions in the combustion phase of fire;

(c) using a carbon quantizing engine supported within said prefabricated wood-building component factory to estimate the quantity of carbon mass, measured in quantized fire-protected carbon units (FPCUs), and stored in each Class-A fire-protected prefabricated wood-building assembly by natural carbon sequestration when said lumber and/or wood materials were growing within one or more trees in a forest, from which each said Class-A fire-protected prefabricated wood-building assembly was made;

(d) generating and applying a unique machine-readable code for each Class-A fire-protected prefabricated wood-building assembly produced in said prefabricated wood-building component factory, wherein one or more of said Class-A fire-protected prefabricated wood-building assemblies are intended for use in constructing a fire-protected prefabricated wood building, selected from the group consisting of fire-protected prefabricated wood buildings selected from the group consisting of fire-protected prefabricated wood-framed buildings and fire protected prefabricated mass-timber building;

(e) recording in an information database supported on a wireless communication network, said quantized fire-protected carbon units (FPCUs) estimated by said carbon quantizing engine, and linked to said unique machine-readable code for each Class-A fire-protected prefabricated wood-building assembly, along with the time and date when, and location where Class-A fire-protection was provided to each said Class-A fire-protected prefabricated wood-building assembly;

(f) shipping said Class-A fire-protected prefabricated wood-building assemblies intended for use in constructing said fire-protected prefabricated wood building to a remote location for use in constructing said fire-protected prefabricated wood building;

(g) constructing said fire-protected prefabricated wood building using said Class-A fire-protected prefabricated wood-building assemblies; and (h) after constructing said fire-protected prefabricated wood building using said Class-A fire-protected prefabricated wood-building assemblies, accessing said information database over said wireless communication network, and reviewing (i) the recorded information linked to said unique machine-readable codes associated with said Class-A fire-protected prefabricated wood-building assemblies produced in said prefabricated wood-building component factory and used to construct said fire-protected prefabricated wood building, and (ii) the recorded quantized fire-protected carbon units (FPCUs) and the time and date when, and location where Class-A fire-protection was provided to each said Class-A fire-protected prefabricated wood-building assembly used to construct said fire-protected prefabricated wood building.

2. The method of claim 1, wherein during step (c), said carbon quantizing engine estimates the quantity of carbon mass stored in each Class-A fire-protected prefabricated wood-building assembly, employing: (i) data representative of parameters characterizing particular species of wood including the percentage of carbon stored in a specific quantity of the species of wood under certain circumstances, used in manufacturing each Class-A fire-protected wood-building assembly within said prefabricated wood-building component factory, and (ii) data representative of parameters characterizing the quantity and quality of specific species of wood and engineered wood products (EWPs), used in the manufacture of said wood-building assemblies in said prefabricated wood-building component factory.

3. The method of claim 1, wherein after step (e), said unique machine-readable code is read using a code scanner to access said information database and read the fire-protected carbon units (FPCUs) associated with said Class-A fire-protected prefabricated wood-building assembly.

4. The method of claim 1, wherein step (b) comprises spraying each Class-A fire-protected prefabricated wood-building assembly with clean fire inhibiting chemical (CFIC) liquid, so as to chemically treat the surface of said Class-A fire-protected prefabricated wood-building assembly, and when dried, form a coating on said Class-A fire-protected prefabricated wood-building assembly that inhibits ignition of fire, spread of flames, and smoke development.

5. The method of claim 1, wherein step (d) further comprises said unique machine readable code including said quantized fire-protected carbon units (FPCUs) printed in human readable form.

6. The method of claim 1, wherein during step (a), said prefabricated wood-building assembly comprises a prefabricated wood-framed panel assembly.

7. The method of claim 6, wherein said prefabricated wood-framed panel assembly comprises components selected from the group consisting of finger-jointed pieces of lumber, oriented strand board (OSB), and engineered wood products (EWPs).

8. The method of claim 1, wherein during step (a), said prefabricated wood-building assembly comprises a prefabricated mass-timber building component assembly.

9. The method of claim 8, wherein said prefabricated mass-timber building component assembly comprises said mass timber is selected from the group consisting of cross-laminated lumber (CLT) panels, nail-laminated timber (NLT) panels, and glue-laminated timber (GLT) panels.

10. The method of claim 1, wherein during step (d), said unique machine-readable code is a unique barcode code generated for each Class-A fire-protected wood-building assembly produced along the production line of said prefabricated wood-building component factory.

11. The method of claim 10, wherein said unique barcode code includes an RFID label.

12. The method of claim 1, wherein step (c) further comprises converting said quantity of carbon mass into equivalent amounts of carbon dioxide $CO_2$ sequestered by growing trees to produce this equivalent amount of fire-protected carbon units (FPCUs) measured in kg or tons.

13. The method of claim 1, wherein said fire-protected carbon units (FPCUs) are registered on a network and used as a carbon tax credit.

14. The method of claim 1, wherein after step (g), mounting a scannable badge on an exterior surface of said constructed fire-protected prefabricated wood building and configuring said scannable badge so as to provide access to information records stored in said information database on said wireless communication network and linked to said fire-protected prefabricated wood building and each said Class-A fire-protected prefabricated wood-building assembly used to construct said fire-protected prefabricated wood building.

15. The method of claim 14, wherein said scannable badge comprises a barcoded/RFID-tagged badge readable by a barcode reader and/or an RFID tag reader, so as to access said information database on said wireless communication network after step (g) and read information records stored in said information database and linked to each said Class-A fire-protected prefabricated wood-building assembly used to construct said fire-protected prefabricated wood building.

16. The method of claim 1, wherein step (e) comprises using a virtual reality and/or augmented reality terminal to support (i) a virtual inspection of said Class-A fire-protected prefabricated wood-building assembly being produced in said prefabricated wood-building component factory, and (i) updating said information database on said wireless communication network.

* * * * *